US011972693B2

(12) United States Patent
Aharonson et al.

(10) Patent No.: US 11,972,693 B2
(45) Date of Patent: Apr. 30, 2024

(54) METHOD, DEVICE, SYSTEM AND APPARATUS FOR CREATING AND/OR SELECTING EXERCISES FOR LEARNING PLAYING A MUSIC INSTRUMENT

(71) Applicant: Joytunes Ltd., Tel Aviv (IL)

(72) Inventors: Eran Aharonson, Tel Aviv (IL); Yuval Kaminka, Tel Aviv (IL); Oded Zewi, Tel Aviv (IL); Amitay Dobo, Tel Aviv (IL)

(73) Assignee: Joytunes Ltd., Kfar Saba (IL)

( * ) Notice: Subject to any disclaimer, the term of this patent is extended or adjusted under 35 U.S.C. 154(b) by 0 days.

(21) Appl. No.: 17/529,704

(22) Filed: Nov. 18, 2021

(65) Prior Publication Data

US 2022/0172640 A1 Jun. 2, 2022

Related U.S. Application Data

(63) Continuation-in-part of application No. 17/467,228, filed on Sep. 5, 2021, now Pat. No. 11,900,825, which (Continued)

(51) Int. Cl.

*G09B 15/02* (2006.01)
*G09B 5/02* (2006.01)
*G10G 1/00* (2006.01)

(52) U.S. Cl.

CPC ............. *G09B 15/023* (2013.01); *G09B 5/02* (2013.01); *G10G 1/00* (2013.01)

(58) Field of Classification Search

CPC ........... G09B 15/023; G09B 5/02; G10G 1/00
See application file for complete search history.

(56) References Cited

U.S. PATENT DOCUMENTS 4,248,123 A 2/1981 Bunger et al.
4,496,149 A 1/1985 Schwartzberg (Continued)

FOREIGN PATENT DOCUMENTS

CN 109493686 A 3/2019
CN 109493686 B 3/2021

(Continued)

OTHER PUBLICATIONS

Non-Final Office Action dated Dec. 27, 2022 on for U.S. Appl. No. 17/467,224, filed Sep. 5, 2021, 12 pages.

(Continued)

*Primary Examiner* — Robert W Horn
(74) *Attorney, Agent, or Firm* — Nathan & Associates; Menachem Nathan

(57) ABSTRACT

Embodiments pertain to a system configured to provide a music learning session to a user. The system comprises a memory for storing data and executable instructions; and a processor that is configured to execute the executable instructions to result in performing the following steps: presenting the user with a representation of a musical piece to be played by the user with a music instrument; receiving an audio signal relating to an instrument output provided by the music instrument played by the user; and determining a level of correspondence between the received audio signal and the representation of the musical piece presented to the user. The steps may further comprises identifying an audio signal portion for which a determined level of correspondence does not meet a correspondence criterion; and determining an error characteristic for the identified audio signal portion.

20 Claims, 74 Drawing Sheets

Related U.S. Application Data is a continuation-in-part of application No. 17/388,050, filed on Jul. 29, 2021, now Pat. No. 11,670,188.

(60) Provisional application No. 63/162,823, filed on Mar. 18, 2021, provisional application No. 63/120,434, filed on Dec. 2, 2020.

(56) References Cited

U.S. PATENT DOCUMENTS

| | | | | |
|---|---|---|---|---|
| 4,516,260 | A | 5/1985 | Breedlove et al. | |
| 4,796,891 | A | 1/1989 | Milner | |
| 4,840,602 | A | 6/1989 | Rose | |
| 4,968,255 | A | 11/1990 | Lee et al. | |
| 5,167,816 | A | 12/1992 | Kruger et al. | |
| 5,214,231 | A | 5/1993 | Ernst et al. | |
| 5,349,129 | A | 9/1994 | Wisniewski et al. | |
| 5,521,323 | A | 5/1996 | Paulson et al. | |
| 5,544,562 | A | 8/1996 | Jeon | |
| 5,739,759 | A | 4/1998 | Nakazawa et al. | |
| 5,889,224 | A * | 3/1999 | Tanaka | G10H 1/361 84/645 |
| 6,066,791 | A | 5/2000 | Renard et al. | |
| 6,069,310 | A | 5/2000 | James | |
| 6,084,168 | A * | 7/2000 | Sitrick | G09B 15/023 84/478 |
| 6,132,281 | A | 10/2000 | Klitsner et al. | |
| 6,143,973 | A | 11/2000 | Kikuchi | |
| 6,166,314 | A * | 12/2000 | Weinstock | G10H 1/366 84/484 |
| 6,527,611 | B2 | 3/2003 | Cummings | |
| 6,912,386 | B1 | 6/2005 | Himberg et al. | |
| 7,030,307 | B2 * | 4/2006 | Wedel | G09B 15/02 84/477 R |
| 7,050,462 | B2 | 5/2006 | Tsunoda et al. | |
| 7,129,408 | B2 | 10/2006 | Uehara | |
| 7,157,638 | B1 * | 1/2007 | Sitrick | G09B 15/023 84/610 |
| 7,162,041 | B2 | 1/2007 | Haapapuro et al. | |
| 7,174,510 | B2 | 2/2007 | Salter | |
| 7,199,298 | B2 | 4/2007 | Funaki | |
| 7,248,708 | B2 | 7/2007 | Vaudrey et al. | |
| 7,271,329 | B2 * | 9/2007 | Franzblau | G09B 5/02 84/649 |
| 7,297,856 | B2 * | 11/2007 | Sitrick | G09B 15/002 84/478 |
| 7,297,858 | B2 | 11/2007 | Paepcke | |
| 7,405,355 | B2 | 7/2008 | Both et al. | |
| 7,414,186 | B2 | 8/2008 | Scarpa et al. | |
| 7,423,213 | B2 * | 9/2008 | Sitrick | G09B 15/023 84/645 |
| 7,482,529 | B1 | 1/2009 | Flamini et al. | |
| 7,511,215 | B2 | 3/2009 | Bicker | |
| 7,576,280 | B2 * | 8/2009 | Lauffer | G10H 1/0008 84/626 |
| 7,714,222 | B2 | 5/2010 | Taub et al. | |
| 7,754,955 | B2 | 7/2010 | Egan | |
| 7,853,342 | B2 | 12/2010 | Redmann | |
| 7,893,337 | B2 | 2/2011 | Lenz | |
| 8,106,281 | B2 | 1/2012 | Minamitaka | |
| 8,183,454 | B2 | 5/2012 | Luedecke et al. | |
| 8,199,934 | B2 | 6/2012 | Osborne | |
| 8,338,684 | B2 * | 12/2012 | Pillhofer | G09B 15/00 84/483.2 |
| 8,481,839 | B2 | 7/2013 | Shaffer et al. | |
| 8,515,093 | B2 | 8/2013 | Bhandari et al. | |
| 8,525,013 | B2 | 9/2013 | Bicker | |
| 8,559,656 | B2 | 10/2013 | Shu et al. | |
| 8,629,342 | B2 * | 1/2014 | Lee | G10H 3/186 84/610 |
| 8,642,871 | B2 | 2/2014 | Feidner | |
| 8,660,678 | B1 | 2/2014 | Lavi et al. | |
| 8,697,972 | B2 * | 4/2014 | Dripps | G09B 15/023 84/483.1 |

| | | | | |
|---|---|---|---|---|
| 8,826,355 | B2 | 9/2014 | DeLlorme, Sr. et al. | |
| 8,907,193 | B2 | 12/2014 | Cross et al. | |
| 8,986,090 | B2 | 3/2015 | Epstein | |
| 8,987,572 | B2 * | 3/2015 | Shimizu | G09B 15/00 84/649 |
| 9,029,678 | B2 * | 5/2015 | Ye | G09B 15/023 84/478 |
| 9,082,380 | B1 | 7/2015 | Hamilton et al. | |
| 9,106,790 | B2 | 8/2015 | Bicker | |
| 9,120,016 | B2 | 9/2015 | Epstein | |
| 9,218,705 | B2 | 12/2015 | Taylor | |
| 9,218,748 | B2 * | 12/2015 | Kaipainen | G09B 5/06 |
| 9,333,418 | B2 | 5/2016 | Lee et al. | |
| 9,478,201 | B1 | 10/2016 | Begelfor et al. | |
| 9,492,756 | B2 | 11/2016 | Izkovsky et al. | |
| 9,576,564 | B2 * | 2/2017 | Yamauchi | G06V 30/40 |
| 9,578,413 | B2 | 2/2017 | Sawa et al. | |
| 9,672,799 | B1 | 6/2017 | Kim et al. | |
| 9,699,414 | B2 | 7/2017 | Kitazawa et al. | |
| 9,711,121 | B1 | 7/2017 | Ahmaniemi | |
| 9,721,479 | B2 | 8/2017 | Citron et al. | |
| 9,767,705 | B1 * | 9/2017 | Klapuri | G09B 15/00 |
| 9,807,491 | B2 | 10/2017 | Kim | |
| 9,839,852 | B2 | 12/2017 | Epstein | |
| 9,860,635 | B2 | 1/2018 | Fukuda et al. | |
| 9,866,731 | B2 | 1/2018 | Godfrey et al. | |
| 10,008,190 | B1 | 6/2018 | Elson | |
| 10,026,416 | B2 | 7/2018 | Takasu et al. | |
| 10,032,443 | B2 | 7/2018 | Braasch et al. | |
| 10,034,083 | B2 | 7/2018 | Bostick et al. | |
| 10,068,558 | B2 | 9/2018 | Polak | |
| 10,182,093 | B1 | 1/2019 | Klapuri | |
| 10,207,192 | B2 | 2/2019 | Cross et al. | |
| 10,235,898 | B1 * | 3/2019 | Ryynänen | G09B 15/003 |
| 10,311,843 | B2 | 6/2019 | Joshi | |
| 10,410,614 | B2 | 9/2019 | Elson | |
| 10,418,008 | B2 | 9/2019 | Bencar et al. | |
| 10,425,718 | B2 | 9/2019 | Cha et al. | |
| 10,482,862 | B2 | 11/2019 | Hamalainen et al. | |
| 10,490,096 | B2 | 11/2019 | Sorenson et al. | |
| 10,504,498 | B2 | 12/2019 | Ryynanen et al. | |
| 10,614,786 | B2 | 4/2020 | Barry | |
| 10,795,638 | B2 | 10/2020 | Sabin et al. | |
| 10,854,181 | B2 | 12/2020 | Joshi | |
| 10,964,298 | B2 | 3/2021 | Elson | |
| 10,991,367 | B2 | 4/2021 | Aoki | |
| 11,086,597 | B2 | 8/2021 | Yuan et al. | |
| 11,288,975 | B2 * | 3/2022 | Jancsy | G09B 15/023 |
| 11,310,538 | B2 | 4/2022 | Holmberg et al. | |
| 11,348,561 | B2 * | 5/2022 | Maezawa | G10H 1/0008 |
| 11,792,557 | B1 | 10/2023 | Lazarus | |
| 2005/0081702 | A1 | 4/2005 | Jung | |
| 2005/0120866 | A1 | 6/2005 | Brinkman et al. | |
| 2006/0123976 | A1 | 6/2006 | Both et al. | |
| 2007/0039449 | A1 | 2/2007 | Redmann | |
| 2008/0302233 | A1 * | 12/2008 | Ding | G09B 15/023 84/609 |
| 2009/0173213 | A1 * | 7/2009 | Jiang | G09B 15/02 84/484 |
| 2010/0000040 | A1 | 1/2010 | Shaw et al. | |
| 2010/0137049 | A1 | 6/2010 | Epstein | |
| 2011/0036231 | A1 | 2/2011 | Nakadai et al. | |
| 2011/0087975 | A1 | 4/2011 | Karsten | |
| 2011/0207513 | A1 | 8/2011 | Cross et al. | |
| 2012/0295679 | A1 | 11/2012 | Izkovsky et al. | |
| 2015/0013381 | A1 | 1/2015 | Duffy | |
| 2015/0310841 | A1 | 10/2015 | Semenzato | |
| 2016/0284228 | A1 * | 9/2016 | McCarthy | G10G 1/02 |
| 2017/0221377 | A1 | 8/2017 | Uemura et al. | |
| 2018/0122260 | A1 * | 5/2018 | Walder | G09B 15/023 |
| 2018/0308382 | A1 * | 10/2018 | Koren | G10L 25/51 |
| 2019/0156807 | A1 | 5/2019 | Ryynänen et al. | |
| 2020/0052667 | A1 | 2/2020 | Jeon et al. | |
| 2020/0074876 | A1 * | 3/2020 | Jancsy | G10H 1/0008 |
| 2020/0372419 | A1 | 11/2020 | Knickrehm et al. | |
| 2021/0104169 | A1 | 4/2021 | Si | |
| 2021/0151017 | A1 | 5/2021 | La | |

(56) References Cited

U.S. PATENT DOCUMENTS

| | | | | |
|---|---|---|---|---|
| 2022/0172638 | A1 | 6/2022 | Aharonson et al. | |
| 2022/0172640 | A1* | 6/2022 | Aharonson | G10G 1/00 |
| 2022/0180767 | A1 | 6/2022 | Aharonson et al. | |

FOREIGN PATENT DOCUMENTS

| | | | |
|---|---|---|---|
| KR | 20170138135 | A | 12/2017 |
| WO | 2009156901 | A2 | 12/2009 |
| WO | 2009156901 | A3 | 6/2010 |
| WO | 2015113360 | A1 | 8/2015 |
| WO | 2017037342 | A1 | 3/2017 |

OTHER PUBLICATIONS

Notice of Allowance dated Dec. 29, 2022, for U.S. Appl. No. 17/388,050, filed Jul. 29, 2021, 10 pages.
Non-Final Office Action dated Jan. 18, 2023 on for U.S. Appl. No. 17/467,228, filed Sep. 5, 2021, 12 pages.
Notice of Allowance dated Jan. 12, 2023, for U.S. Appl. No. 17/388,050 , filed Jul. 29, 2021, 4 pages.
Notice of Allowance dated Jan. 5, 2023, for U.S. Appl. No. 17/388,050, filed Jul. 29, 2021, 4 pages.
"A. P. Klapuri, "Multiple fundamental frequency estimation based on harmonicity and spectral smoothness," IEEE Trans. Speech and Audio Proc., 11(6), 804-816, 2003."
"Anne-Mar ie Burns et al., "Visual Methods for t he Retrieval of Guitarist Fingering", Proceedings of the 2006 International Conference on New Interfaces for Musical Expression, NIME06, Jun. 4-8, 2006, Paris, France Paris, France".
"Sébastien, V., Ralambondrainy, H., Sébastien, O., & Conruyt, N. (Oct. 2012). Score analyzer: Automatically determining scores difficulty level for instrumental e-learning. In 13th International Society for Music Information Retrieval Conference (ISMIR 2012) (pp. 571-576)".
"Chiu et al., "Automatic System for the Arrangement of Piano Reductions", Conference Paper—Jan. 2009, DOI: 10.1109/ISM. 2009.105 • Source: DBLP".
"Schulz, D. (2016), "Pianote: a sight-reading program that algorithmically generates music based on human performance", A Thesis presented to the Faculty of California Polytechnic State University, San Luis Obispo. DOI: https://doi.org/10.15368/theses. 2016.53".
"Ethan G. Holder, "Musiplectics: Computational Assessment of the Complexity of Music Scores", Thesis submitted to the Faculty of the Virginia Polytechnic Institute and State University in partial fulfillment of the requirements for the degree of Master of Science in Computer Science and Applications, Apr. 23, 2015 Blacksburg, Virginia".
"Shih-Chuan Chiu et al. "A Study on Difficulty Level Recognition of Piano Sheet Music" dia 978-0-7695-4875-3/12 $26.00 © 2012 IEEE DOI 10.1109/ISM.2012.11 17 2012 IEEE International Symposium on Multimedia 978-0-7695-4875-3/12 $26.00 © 2012 IEEE DOI 10.1109/ISM.2012.11 17".
"Huang et al., "Towards an Automatic Music Arrangement Framework Using Score Reduction", ACM Transactions on Multimedia Computing, Communications and Applications, vol. 8, No. 1, Article 8, Publication date: Jan. 2012."
Jean-Marc Valin, "Speex: A Free Codec For Free Speech" CSIRO ICT Centre, Cnr Vimiera & Pembroke Roads, Marsfield NSW 2122, Australia Xiph.Org Foundation.
"Jiang et al., "Analyzing Chroma Feature Types for Automated Chord Recognition", AES 42nd International Conference, Ilmenau, Germany, Jul. 22-24, 2011".
"Klapuri, A. (Oct. 2006). Multiple fundamental frequency estimation by summing harmonic amplitudes. In ISMIR (pp. 216-221)".
"Korzeniowski, F., & Widmer, G. (2018) "Improved chord recognition by combining duration and harmonic language models", arXiv: 1808.05335v1 [cs.SD] Aug. 16, 2018".
"Lee, K. (Nov. 2006). Automatic chord recognition from audio using enhanced pitch class profile. In ICMC".
"Lees, Kim and MacNamara, "Non-Invasive Determination of Core Temperature During Anesthesia", South Med J . Oct. 1980;73(10):1322-4. doi: 10.1097/00007611-198010000-00010."
"Muller et al., "Chroma Toolbox: Matlab Implementations for Extracting Variants of Chroma-Based Audio Features", Proceedings of the International Society for Music Information Retrieval Conference: 215-220".
"Nakamura et al. "Statistical piano reduction controlling performance difficulty", SIP (2018), vol. 7, e13, p. 1 of 12 © The Authors, 2018."
"Song, Y. E., & Lee, Y. K. (2016). A Method for Measuring the Difficulty of Music Scores. Journal of the Korea Society of Computer and Information, 21(4), 39-46".
"Pritish Chandna et al, "Monoaural Audio Source Separation Using Deep Convolutional Neural Networks", Music Technology Group, Universitat Pompeu Fabra, Barcelona".
Uhlich et al. "Improving Music Source Separation Based on Deep Neural Networks Through Data Augmentation and Network Blending", Conference Paper • Mar. 2017, DOI: 10.1109/ICASSP.2017. 7952158.
"Yuksel, B. F., Oleson, K. B., Harrison, L., Peck, E. M., Afergan, D., Chang, R., & Jacob, R. J. (May 2016). Learn piano with BACh: An adaptive learning interface that adjusts task difficulty based on brain state. In Proceedings of the 2016 chi conference on human factors in computing systems (pp. 5372-5384)".
Gallo A., "A Refresher of A/B Testing," Harvard Business Review, Jun. 28, 2017.
Non-Final Office Action dated May 5, 2023 on for U.S. Appl. No. 17/561,772, filed Dec. 24, 2021, 19 pages.
Notice of Allowance dated Jun. 9, 2023, for U.S. Appl. No. 17/467,224, filed Sep. 5, 2021, 11 pages.
Notice of Allowance dated Jul. 14, 2023, for U.S. Appl. No. 17/467,228, filed Sep. 5, 2021, 11 pages.
Notice of Allowance dated Mar. 28, 2023, for U.S. Appl. No. 17/388,050, filed Jul. 29, 2021, 7 pages.
Notice of Allowance dated Aug. 7, 2023, for U.S. Appl. No. 17/467,228, filed Sep. 5, 2021, 9 pages.
U.S. Appl. No. 16/074,230 Final office action dated May 4, 2023.
Final Office Action mailed Nov. 15, 2023 on for U.S. Appl. No. 17/561,772, filed Dec. 24, 2021, 16 pages.

* cited by examiner

60b

| Name / ID | Type | Tempo | File |
|---|---|---|---|
| Piece#1 | Aria | Largo | sheet1.xml |
| Piece#2 | Song | Allegro | sheet2.pdf |
| Piece#3 | Song | Vivace | sheet3.doc |
| Piece#4 | Poem | Presto | sheet4.pdf |
| ... | ... | ... | ... |
| Piece#N | Sonata | Adagio | sheetN.mid |

160

| | 87a | 87b | 87c | 87d |
|---|---|---|---|---|
| 88 | Name / ID | Type | Tempo | File |
| 88a | Piece#1 | Aria | Largo | sheet1.xml |
| 88b | Piece#2 | Song | Allegro | sheet2.pdf |
| 88c | Piece#3 | Song | Vivace | sheet3.doc |
| 88d | Piece#4 | Poem | Presto | sheet4.pdf |
| | ... | ... | ... | ... |
| 88N | Piece#N | Sonata | Adagio | sheetN.mid |

89a

| | 163a | 163b | 163c |
|---|---|---|---|
| 162 | Instrument | Sheet Music | Audio File |
| 162a | Guitar | Guitar-sheet.pdf | guitar.mp3 |
| 162b | Drums | Drums-sheet.doc | Drums.mp3 |
| 162c | Piano | Piano-sheet.docx | Piano.wav |
| 162d | Bass | Bass-sheet.pdf | Bass.wav |
| 162e | Vocal | Vocal-sheet.doc | Vocal.aac |
| 162f | Flute | Flute-sheet.docx | Flute.aac |

| 162 | Instrument (163a) | Source (164) |
|---|---|---|
| 162a | Guitar | None |
| 162b | Drums | None |
| 162c | Piano | Self |
| 162d | Bass | None |
| 162e | Vocal | None |
| 162f | Flute | None |

160b

| 162 | Instrument (163a) | Source (164) |
|---|---|---|
| 162a | Guitar | System |
| 162b | Drums | User#1 |
| 162c | Piano | None |
| 162d | Bass | User#3 |
| 162e | Vocal | System |
| 162f | Flute | Self |

| | 163a | 164 |
|---|---|---|
| 162 | Instrument | Source |
| 162a | Guitar | None |
| 162b | Drums | User#4 |
| 162c | Piano | Self |
| 162d | Bass | None |
| 162e | Vocal | None |
| 162f | Flute | None |

180a

| | 163a | 164a |
|---|---|---|
| 162 | Instrument | Source |
| 162a | Guitar | None |
| 162b | Drums | None |
| 162c | Piano | None |
| 162d | Bass | User#1 |
| 162e | Vocal | None |
| 162f | Flute | Self |

180b

| | 163a | 164b |
|---|---|---|
| 162 | Instrument | Source |
| 162a | Guitar | Self |
| 162b | Drums | None |
| 162c | Piano | None |
| 162d | Bass | None |
| 162e | Vocal | System |
| 162f | Flute | None |

| | 163a | 164 |
|---|---|---|
| 162 | Instrument | Source |
| 162a | Guitar | None |
| 162b | Drums | None |
| 162c | Piano | Self |
| 162d | Bass | None |
| 162e | Vocal | None |
| 162f | Flute | None |

190a

| | 163a | 164a |
|---|---|---|
| 162 | Instrument | Source |
| 162a | Guitar | None |
| 162b | Drums | None |
| 162c | Piano | None |
| 162d | Bass | None |
| 162e | Vocal | None |
| 162f | Flute | Self |

190b

| | 163a | 164b |
|---|---|---|
| 162 | Instrument | Source |
| 162a | Guitar | Self |
| 162b | Drums | None |
| 162c | Piano | None |
| 162d | Bass | None |
| 162e | Vocal | None |
| 162f | Flute | None |

| | 163a | 164 |
|---|---|---|
| 162 | Instrument | Source |
| 162a | Guitar | System |
| 162b | Drums | None |
| 162c | Piano | Self |
| 162d | Bass | None |
| 162e | Vocal | None |
| 162f | Flute | None |

200a

| | 163a | 164a |
|---|---|---|
| 162 | Instrument | Source |
| 162a | Guitar | None |
| 162b | Drums | None |
| 162c | Piano | None |
| 162d | Bass | None |
| 162e | Vocal | None |
| 162f | Flute | Self |

200b

| | 163a | 164b |
|---|---|---|
| 162 | Instrument | Source |
| 162a | Guitar | Self |
| 162b | Drums | None |
| 162c | Piano | System |
| 162d | Bass | None |
| 162e | Vocal | System |
| 162f | Flute | None |

| | 163a | 164 |
|---|---|---|
| 162 | Instrument | Source |
| 162a | Guitar | System |
| 162b | Drums | None |
| 162c | Piano | Self |
| 162d | Bass | None |
| 162e | Vocal | None |
| 162f | Flute | None |

210a

| | 163a | 164a |
|---|---|---|
| 162 | Instrument | Source |
| 162a | Guitar | None |
| 162b | Drums | None |
| 162c | Piano | User#1 |
| 162d | Bass | None |
| 162e | Vocal | None |
| 162f | Flute | Self |

210b

| | 163a | 164b |
|---|---|---|
| 162 | Instrument | Source |
| 162a | Guitar | Self |
| 162b | Drums | None |
| 162c | Piano | User#1 |
| 162d | Bass | None |
| 162e | Vocal | System |
| 162f | Flute | User#2 |

| | Instrument (163a) | Source (164) |
|---|---|---|
| 162 | Instrument | Source |
| 162a | Guitar | User#3 |
| 162b | Drums | None |
| 162c | Piano | Self |
| 162d | Bass | None |
| 162e | Vocal | None |
| 162f | Flute | User#2 |

220a

| | Instrument (163a) | Source (164a) |
|---|---|---|
| 162 | Instrument | Source |
| 162a | Guitar | User#3 |
| 162b | Drums | None |
| 162c | Piano | User#1 |
| 162d | Bass | None |
| 162e | Vocal | None |
| 162f | Flute | Self |

220b

| | Instrument (163a) | Source (164b) |
|---|---|---|
| 162 | Instrument | Source |
| 162a | Guitar | Self |
| 162b | Drums | None |
| 162c | Piano | User#1 |
| 162d | Bass | None |
| 162e | Vocal | System |
| 162f | Flute | User#2 |

METHOD, DEVICE, SYSTEM AND APPARATUS FOR CREATING AND/OR SELECTING EXERCISES FOR LEARNING PLAYING A MUSIC INSTRUMENT

CROSS-REFERENCE TO RELATED APPLICATIONS

This application is a Continuation-in-Part of U.S. non-provisional patent application Ser. No. 17/467,228, filed 5 Sep. 2021, which is a Continuation-in-Part of U.S. non-provisional patent application Ser. No. 17/388,050, filed 29 Jul. 2021, which is related to and claims priority from U.S. provisional patent application No. 63/120,434, filed 2 Dec. 2020, and U.S. provisional patent application No. 63/162,823, filed 18 Mar. 2021, all of which are incorporated herein by reference in their entirety.

TECHNICAL FIELD

This disclosure relates generally to an apparatus and method for teaching of playing of a musical instrument.

BACKGROUND

Unless otherwise indicated herein, the materials described in this section are for the purpose of generally presenting the background context of the disclosure and are not prior-art to the claims in this application, and are not expressly or impliedly admitted to be prior art by inclusion in this section.

FIG. 1 shows a block diagram that illustrates a system 10 including a computer system 11, and an associated Internet 22 connection. Such configuration is typically used for computers (hosts) connected to the Internet 22 and executing a server, or a client (or a combination) software. The computer system 11 may be used as a portable electronic device such as a notebook/laptop computer, a media player (e.g., MP3 based or video player), a desktop computer, a laptop computer, a cellular phone, a smartphone, a tablet, or a Personal Digital Assistant (PDA), an image processing device (e.g., a digital camera or video recorder), any other handheld or fixed location computing devices, or a combination of any of these devices. Note that while FIG. 1 illustrates various components of the computer system 11, it is not intended to represent any particular architecture or manner of interconnecting the components.

Network computers, handheld computers, cell phones and other data processing systems that have fewer or more components, may also be used. For example, the computer system 11 of FIG. 1 may be any personal computer. The computer system 11 may include a bus 13, an interconnect, or other communication mechanism for communicating information, and a processor 12, commonly in the form of an integrated circuit, coupled to the bus 13 for processing information, and for executing the computer executable instructions. The computer system 11 may also include a main memory 15*a*, such as a Random Access Memory (RAM), or other dynamic storage device, coupled to the bus 13 for storing information and instructions to be executed by the processor 12. The main memory 15*a* also may be used for storing temporary variables or other intermediate information during execution of instructions to be executed by the processor 12.

The computer system 11 further includes a Read Only Memory (ROM) 15*b* (or other non-volatile memory) or other static storage device coupled to the bus 13 for storing static information and instructions for the processor 12. A storage device 15*c*, may comprise a magnetic disk or optical disk, such as a hard disk drive (HDD) for reading from and writing to a hard disk, a Solid State Drive (SSD) for reading from and writing to a solid state disk, a flash storage for reading and writing from flash drive, a magnetic disk drive for reading from and writing to a magnetic disk, an optical disk drive (such as DVD) for reading from and writing to a removable optical disk, or any combination thereof, that is coupled to the bus 13 for storing information and instructions. The hard disk drive, magnetic disk drive, and optical disk drive may be connected to the system bus 13 by a hard disk drive interface, a magnetic disk drive interface, and an optical disk drive interface, respectively. The drives and their associated computer-readable media provide non-volatile storage of computer readable instructions, data structures, program modules and other data for the general-purpose computing devices.

Typically, the computer system 11 includes an Operating System (OS) stored in a non-volatile storage 15*b* for managing the computer resources and provides the applications and programs with access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The computer system 11 may be coupled via the bus 13 to a display 17, such as a Liquid Crystal Display (LCD), a flat screen monitor, a touch screen monitor or similar means for displaying text and graphical data to a user. The display 17 may be connected via a video adapter for supporting the display. The display 17 allows a user to view, enter, and/or edit information that is relevant to the operation of the system 10. An input device 18, including alphanumeric and other keys, is coupled to the bus 13 for communicating information and command selections to the processor 12. Another type of user input device is a cursor control 18*a*, such as a mouse, a trackball, or cursor direction keys for communicating direction information and command selections to the processor 12 and for controlling cursor movement on the display 17. This cursor control 18*a* typically has two degrees of freedom in two axes, a first axis (e.g., x) and a second axis (e.g., y), that allows the device to specify positions in a plane.

The computer system 11 may be used for implementing the methods and techniques described herein. According to one embodiment, these methods and techniques are performed by the computer system 11 in response to the processor 12 executing one or more sequences of one or more instructions contained in the main memory 15*a*. Such instructions may be read into the main memory 15*a* from another computer-readable medium, such as the storage device 15*c*. Execution of the sequences of instructions contained in the main memory 15*a* causes the processor 12 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "processor" is used herein to include, but not limited to, any integrated circuit or any other electronic device (or collection of electronic devices) capable of performing an operation on at least one instruction, including, without limitation, a microprocessor (μP), a microcontroller (μC), a Digital Signal Processor (DSP), or any combination thereof. A processor, such as the processor 12, may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor 12 may be integrated onto a single substrate (e.g., silicon "die"), or distributed among two or more substrates. Furthermore, various functional aspects of the processor 12 may be implemented solely as a software (or firmware) associated with the processor 12.

A memory can store computer programs or any other sequence of computer readable instructions, or data, such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in the form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD), an external Solid State Disk (SSD), or any combination thereof.

Various forms of computer-readable media may be involved in carrying one or more sequences of one or more instructions to the processor 12 for execution. For example, the instructions may initially be carried on a magnetic disk of a remote computer. The bus 13 carries the data to the main memory 15*a*, from which the processor 12 retrieves and executes the instructions. The instructions received by the main memory 15*a* may optionally be stored on the storage device 15*c* either before or after execution by the processor 12.

The computer system 11 commonly includes a communication interface 9 coupled to the bus 13. The communication interface 9 provides a two-way data communication coupling to a network link 8 that is connected to a Local Area Network (LAN) 14. As a non-limiting example, the communication interface 9 may be a Local Area Network (LAN) card to provide a data communication connection to a compatible LAN. For example, Ethernet-based connection based on IEEE802.3 standard may be used, such as 10/100BaseT, 1000BaseT (gigabit Ethernet), 10 gigabit Ethernet (10 GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 1999), "Internetworking Technologies Handbook", Chapter 7: "Ethernet Technologies", pages 7-1 to 7-38, which is incorporated in its entirety for all purposes as if fully set forth herein. In such a case, the communication interface 9 typically includes a LAN transceiver or a modem, such as a Standard Microsystems Corporation (SMSC) LAN91C111 10/100 Ethernet transceiver, described in the Standard Microsystems Corporation (SMSC) data-sheet "*LAN91C111 10/100 Non-PCI Ethernet Single Chip MAC+PHY*" Data-Sheet, Rev. 15 (Feb. 20, 2004), which is incorporated in its entirety for all purposes as if fully set forth herein.

An Internet Service Provider (ISP) 16 is an organization that provides services for accessing, using, or participating in the Internet 22. The Internet Service Provider 16 may be organized in various forms, such as commercial, community-owned, non-profit, or otherwise privately owned. Internet services, typically provided by ISPs, include Internet access, Internet transit, domain name registration, web hosting, and collocation. ISPs may engage in peering, where multiple ISPs interconnect at peering points or Internet exchange points (IXs), allowing routing of data between each network, without charging one another for the data transmitted—data that would otherwise have passed through a third upstream ISP, incurring charges from the upstream ISP. ISPs requiring no upstream and having only customers (end customers and/or peer ISPs) are referred to as Tier 1 ISPs.

An arrangement 10*a* of a computer system connected to the Internet 22 is shown in FIG. 1*a*. A computer system or a workstation 7 includes a main unit box 6 with an enclosed motherboard that has the processor 12 and the memories 15*a*, 15*b*, and 15*c* are mounted. The workstation 7 may include a keyboard 2 (corresponding to the input device 18), a printer 4, a computer mouse 3 (corresponding to the cursor control 18*a*), and a display 5 (corresponding to the display 17). FIG. 1*a* further illustrates various devices connected via the Internet 22, such as a client device #1 24, a client device #2 24*a*, a data server #1 23*a*, a data server #2 23*b*, and the workstation 7, connected to the Internet 22 over a LAN 14 and via the router or gateway 19 and the ISP 16.

The client device #1 24 and the client device #2 24*a* may communicate over the Internet 22 for exchanging or obtaining data from the data server #1 23*a* and the data server #2 23*b*. In one example, the servers are HTTP servers, sometimes known as web servers.

The term "computer-readable medium" (or "machine-readable medium") is used herein to include, but not limited to, any medium or any memory, that participates in providing instructions to a processor, (such as the processor 12) for execution, or any mechanism for storing or transmitting information in a form readable by a machine (e.g., a computer). Such a medium may store computer-executable instructions to be executed by a processing element and/or control logic and data, which is manipulated by a processing element and/or control logic, and may take many forms, including but not limited to, non-volatile medium, volatile medium, and transmission medium. Transmission media includes coaxial cables, copper wire, and fiber optics, including the wires that comprise the bus 13. Transmission media may also take the form of acoustic or light waves, such as those generated during radio-wave and infra-red data communications, or other form of propagating signals (e.g., carrier waves, infrared signals, digital signals, etc.). Common forms of computer-readable media include a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer may read.

Various forms of computer-readable media may be involved in carrying one or more sequences of one or more instructions to the processor 12 for execution. For example, the instructions may initially be carried on a magnetic disk of a remote computer. The remote computer may load the instructions into its dynamic memory and send the instructions over a telephone line using a modem. A modem local to the computer system 11 can receive the data on the telephone line, using an infrared transmitter to convert the data to an infrared signal. An infrared detector can receive the data carried in the infrared signal and appropriate circuitry may place the data on the bus 13. The bus 13 carries the data to the main memory 15*a*, from which the processor 12 retrieves and executes the instructions. The instructions received by the main memory 15*a* may optionally be stored on the storage device 15*c* either before or after execution by the processor 12.

The Internet is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers on the Internet. These data routers are hosted by commercial, government, academic, and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Internet Protocol is responsible for addressing hosts and routing datagrams (packets) from a source host to the destination host across one or more IP networks. For this purpose, the Internet Protocol defines an addressing system that has two functions: Identifying hosts addresses and providing a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The Hypertext Transfer Protocol (HTTP) is an application protocol for distributed, collaborative, hypermedia information systems, commonly used for communication over the Internet. HTTP is the protocol to exchange or transfer hypertext, which is a structured text that uses logical links (hyperlinks) between nodes containing text. HTTP version 1.1 was standardized as RFC 2616 (June 1999), which was replaced by a set of standards (obsoleting RFC 2616), including RFC 7230—'HTTP/1.1: Message Syntax and Routing', RFC 7231—'HTTP/1.1: Semantics and Content', RFC 7232—'HTTP/1.1: Conditional Requests', RFC 7233—'HTTP/1.1: Range Requests', RFC 7234—'HTTP/1.1: Caching', and RFC 7235—'HTTP/1.1: Authentication'. HTTP functions as a request-response protocol in the client-server computing model. A web browser, for example, may be the client and an application running on a computer hosting a website may be the server. The client submits an HTTP request message to the server. The server, which provides resources such as HTML files and other content, or performs other functions on behalf of the client, returns a response message to the client. The response contains completion status information about the request and may further contain a requested content in its message body. A web browser is an example of a User Agent (UA). Other types of user agent include the indexing software used by search providers (web crawlers), voice browsers, mobile apps and other software that accesses, consumes, or displays web content.

User. The term "user" is used herein to include, but not limited to, the principal using a client device or application to interactively retrieve and render resources or resource manifestation, such as a person using a web browser, a person using an e-mail reader, or a person using a display such as the display 17.

Virtualization. The term virtualization typically refers to the technology that allows for the creation of software-based virtual machines that can run multiple operating systems from a single physical machine. In one example, virtual machines can be used to consolidate the workloads of several under-utilized servers to fewer machines, perhaps a single machine (server consolidation), providing benefits (perceived or real, but often cited by vendors) such as savings on hardware, environmental costs, management, and administration of the server infrastructure. Virtualization scheme allows for the creation of substitutes for real resources, that is, substitutes that have the same functions and external interfaces as their counterparts, but that differ in attributes, such as size, performance, and cost. These substitutes are called virtual resources, and their users are typically unaware of the substitution.

Virtualization is commonly applied to physical hardware resources by combining multiple physical resources into shared pools from which users receive virtual resources. With virtualization, you can make one physical resource look like multiple virtual resources. Virtual resources can have functions or features that are not available in their underlying physical resources. Virtualization can provide the benefits of consolidation to reduce hardware cost, such as to efficiently access and manage resources to reduce operations and systems management costs while maintaining needed capacity, and to have a single server function as multiple virtual servers. In addition, virtualization can provide optimization of workloads, such as to respond dynamically to the application needs of its users, and to increase the use of existing resources by enabling dynamic sharing of resource pools. Further, virtualization may be used for IT flexibility and responsiveness, such as by having a single, consolidated view of, and easy access to, all available resources in the network, regardless of location, and reducing the management of your environment by providing emulation for compatibility and improved interoperability.

Virtual machine (VM). Virtual machine is a representation of a real machine using software that provides an operating environment which can run or host a guest operating system. In one example, a virtual machine may include a self-contained software emulation of a machine, which does not physically exist, but shares resources of an underlying physical machine. Like a physical computer, a virtual machine runs an operating system and applications. Multiple virtual machines can operate concurrently on a single host system. There are different kinds of virtual machines, each with different functions: System virtual machines (also termed full virtualization VMs) provide a substitute for a real machine. They provide functionality needed to execute entire operating systems. A hypervisor uses native execution to share and manage hardware, allowing for multiple environments which are isolated from one another, yet exist on the same physical machine. Modern hypervisors use hardware-assisted virtualization, virtualization-specific hardware, primarily from the host CPUs. Process virtual machines are designed to execute computer programs in a platform-independent environment. Some virtual machines, such as QEMU, are designed to also emulate different architectures and allow execution of software applications and operating systems written for another CPU or architecture. Operating-system-level virtualization allows the resources of a computer to be partitioned via the kernel's support for multiple isolated user space instances, which are usually called containers and may look and feel like real machines to the end users.

Guest Operating System. A guest operating system is an operating system running in a virtual machine environment that would otherwise run directly on a separate physical system. Operating-system-level virtualization, also known as containerization, refers to an operating system feature in which the kernel allows the existence of multiple isolated user-space instances. Such instances, called containers, partitions, Virtualization Engines (VEs) or jails (FreeBSD jail or chroot jail), may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container. In addition to isolation mechanisms, the kernel often provides resource-management features to limit the impact of one container's activities on other containers. With operating-system-virtualization, or containerization, it is possible to run programs within containers, to which only parts of these resources are allocated. A program expecting to see the whole computer, once run inside a container, can only see the allocated resources and believes them to be all that is available. Several containers can be created on each operating system, to each of which a subset of the computer's resources is allocated. Each container may contain any number of computer programs. These programs may run concurrently or separately, even interact with each other.

Hypervisor. Hypervisor commonly refers to a thin layer of software that generally provides virtual partitioning capabilities which runs directly on hardware, but underneath higher-level virtualization services. The hypervisor typically manages virtual machines, allowing them to interact directly with the underlying hardware. System virtualization creates many virtual systems within a single physical system. Virtual systems are independent operating environments that use virtual resources. System virtualization can be approached through hardware partitioning or hypervisor technology. Hardware partitioning subdivides a physical server into fractions, each of which can run an operating system. These fractions are typically created with coarse units of allocation, such as whole processors or physical boards. This type of virtualization allows for hardware consolidation, but does not have the full benefits of resource sharing and emulation offered by hypervisors. Hypervisors use a thin layer of code in software or firmware to achieve fine-grained, dynamic resource sharing. Because hypervisors provide the greatest level of flexibility in how virtual resources are defined and managed, they are the primary technology for system virtualization.

Virtual Machine Monitor. A Virtual Machine Monitor (VMM) is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and macOS instances can all run on a single physical x86 machine. This contrasts with operating-system-level virtualization, where all instances (usually called containers) must share a single kernel, though the guest operating systems can differ in user space, such as different Linux distributions with the same kernel. Typically, a VMM refers to a software that runs in a layer between a hypervisor or host operating system and one or more virtual machines that provides the virtual machines abstraction to the guest operating systems. With full virtualization, the VMM exports a virtual machine abstraction identical to the physical machine, so the standard operating system can run just as they would on physical hardware.

Hardware virtualization or platform virtualization refers to the creation of a virtual machine that acts like a real computer with an operating system. Software executed on these virtual machines is separated from the underlying hardware resources. In hardware virtualization, the host machine is the actual machine on which the virtualization takes place, and the guest machine is the virtual machine. The words host and guest are used to distinguish the software that runs on the physical machine from the software that runs on the virtual machine. The software or firmware that creates a virtual machine on the host hardware is called a hypervisor or Virtual Machine Manager. Different types of hardware virtualization include full-virtualization, where almost complete simulation of the actual hardware to allow software, which typically consists of a guest operating system, to run unmodified, and Para-virtualization, where a hardware environment is not simulated; however, the guest programs are executed in their own isolated domains, as if they are running on a separate system. Guest programs need to be specifically modified to run in this environment.

Hardware-assisted virtualization is a way of improving overall efficiency of virtualization. It involves CPUs that provide support for virtualization in hardware, and other hardware components that help improve the performance of a guest environment. Hardware virtualization can be viewed as part of an overall trend in enterprise IT that includes autonomic computing, a scenario in which the IT environment will be able to manage itself based on perceived activity, and utility computing, in which computer processing power is seen as a utility that clients can pay for only as needed. The usual goal of virtualization is to centralize administrative tasks while improving scalability and overall hardware-resource utilization. With virtualization, several operating systems can be run in parallel on a single central processing unit (CPU). This parallelism tends to reduce overhead costs and differs from multitasking, which involves running several programs on the same OS. Using virtualization, an enterprise can better manage updates and rapid changes to the operating system and applications without disrupting the user.

Server Virtualization. Server virtualization is a virtualization technique that involves partitioning a physical server into a number of small, virtual servers with the help of virtualization software. In server virtualization, each virtual server runs multiple operating system instances at the same time. A Virtual Private Server (VPS) is a virtual machine sold as a service by an Internet hosting service, that runs its own copy of an Operating System (OS), and customers may have superuser-level access to that operating system instance, so they can install almost any software that runs on that OS. For many purposes they are functionally equivalent to a dedicated physical server, and being software-defined, are able to be much more easily created and configured. They are typically priced much lower than an equivalent physical server. However, as they share the underlying physical hardware with other VPS's, performance may be lower, depending on the workload of any other executing virtual machines. Dedicated Servers may also be more efficient with CPU dependent processes such as hashing algorithms.

Application Virtualization. Application virtualization is software technology that encapsulates computer programs from the underlying operating system on which it is executed. A fully virtualized application is not installed in the traditional sense, although it is still executed as if it were. The application behaves at runtime like it is directly interfacing with the original operating system and all the resources managed by it, but can be isolated or sandboxed to varying degrees. Application virtualization is layered on top of other virtualization technologies, allowing computing resources to be distributed dynamically in real-time. In this context, the term "virtualization" commonly refers to the artifact being encapsulated (application), which is quite different from its meaning in hardware virtualization, where it refers to the artifact being abstracted (physical hardware).

Network Virtualization. Network Virtualization refers to the process of combining hardware and software network resources to create a single pool of resources that make up a virtual network that can be accessed without regard to the physical component. Network virtualization typically involves combining hardware and software network resources and network functionality into a single, software-based administrative entity, a virtual network. Network virtualization involves platform virtualization, often combined with resource virtualization. Network virtualization is categorized as either external virtualization, combining many networks or parts of networks into a virtual unit, or internal virtualization, providing network-like functionality to software containers on a single network server.

Storage Virtualization. Storage virtualization refers to the process of consolidating the physical storage from multiple network storage devices so that it appears to be a single storage unit. Within the context of a storage system, there are two primary types of virtualization that can occur: Block virtualization used in this context refers to the abstraction (separation) of logical storage (partition) from physical storage so that it may be accessed without regard to physical storage or heterogeneous structure. This separation allows the administrators of the storage system greater flexibility in how they manage storage for end users. File virtualization addresses the NAS challenges by eliminating the dependencies between the data accessed at the file level and the location where the files are physically stored. This provides opportunities to optimize storage use and server consolidation and to perform non-disruptive file migrations.

Desktop Virtualization. Desktop virtualization refers to the process of virtualizing desktop computers using virtualization software, such that the desktop computer and the associated operating system and applications are separated from the physical client device that is used to access it. Desktop virtualization is software technology that separates the desktop environment and associated application software from the physical client device that is used to access it.

Desktop virtualization can be used in conjunction with application virtualization and user profile management systems, now termed "user virtualization," to provide a comprehensive desktop environment management system. In this mode, all the components of the desktop are virtualized, which allows for a highly flexible and much more secure desktop delivery model. In addition, this approach supports a more complete desktop disaster recovery strategy as all components are essentially saved in the data center and backed up through traditional redundant maintenance systems. If a user's device or hardware is lost, the restore is straightforward and simple, because the components will be present at login from another device. In addition, because no data is saved to the user's device, if that device is lost, there is much less chance that any critical data can be retrieved and compromised. Virtual Desktop Infrastructure (VDI)—The practice of hosting a desktop environment within a virtual machine that runs on a centralized or remote server.

An example of a virtualization architecture 900 is shown in FIG. 2, where three virtual machines are exemplified. A Virtual Machine (VM) #1 910*a* provides virtualization for the application 901*a* that uses the guest OS 902*a*, which in turn interfaces with the virtual hardware 903*a* that emulates the actual hardware. Similarly, a Virtual Machine (VM) #2 910*b* provides virtualization for the application 901*b* that uses the guest OS 902*b*, which in turn interfaces with the virtual hardware 903*b* that emulates the associated actual hardware, and a Virtual Machine (VM) #3 910*c* provides virtualization for the application 901*c* that uses the guest OS 902*c*, which in turn interfaces with the virtual hardware 903*c* that emulates the associated actual hardware. The abstraction layer is provided by VMM 904, allowing of hardware-independence of operating system and applications, provisioning on any single physical system, and managing the applications and the OSs as a single encapsulated unit.

A hosted architecture 900*a* for virtualization is shown in FIG. 2*a*, where a wide range of actual host hardware 906 may be used by implementing a host operating system 905 layer between the actual hardware 906 and the VMM 904. Such configuration relies on the host OS 905 for device support and physical resource management. In contrast, a bare-metal architecture 900*b* is shown in FIG. 2*b*, where a hypervisor layer (in addition to, or as part of, the VMM 904) is used as the first layer, allowing the VMM 904 to have direct access to the hardware resources, hence providing more efficient, and greater scalability, robustness, and performance.

Cloud. The term "Cloud" or "Cloud computing" as used herein is defined as a technology infrastructure facilitating supplement, consumption and delivery of IT services, and generally refers to any group of networked computers capable of delivering computing services (such as computations, applications, data access, and data management and storage resources) to end users. This disclosure does not limit the type (such as public or private) of the cloud as well as the underlying system architecture used by the cloud. The IT services are internet based and may involve elastic provisioning of dynamically scalable and time virtualized resources. Although such virtualization environments can be privately deployed and used within local area or wide area networks owned by an enterprise, a number of "cloud service providers" host virtualization environments accessible through the public internet (the "public cloud") that is generally open to anyone, or through private IP or other type of network accessible only by entities given access to it (a "private cloud."). Using a cloud-based control server or using the system above may allow for reduced capital or operational expenditures. The users may further access the system using a web browser regardless of their location or what device they are using, and the virtualization technology allows servers and storage devices to be shared and utilization be increased. Examples of public cloud providers include Amazon AWS, Microsoft Azure and Google GCP. Comparison of service features such as computation, storage, and infrastructure of the three cloud service providers (AWS, Microsoft Azure, GCP) is disclosed in an article entitled: "*Highlight the Features of AWS, GCP and Microsoft Azure that Have an Impact when Choosing a Cloud Service Provider*" by Muhammad Ayoub Kamal, Hafiz Wahab Raza, Muhammad Mansoor Alam, and Mazliham Mohd Su'ud, published January 2020 in 'International Journal of Recent Technology and Engineering (IJRTE)' ISSN: 2277-3878, Volume-8 by Blue Eyes Intelligence Engineering & Sciences Publication [DOI:10.35940/ijrte.D8573.018520], which is incorporated in its entirety for all purposes as if fully set forth herein.

The term "Software as a Service (SaaS)" as used herein in this application, is defined as a model of software deployment whereby a provider licenses a Software Application (SA) to customers for use as a service on demand. Similarly, an "Infrastructure as a Service" (IaaS) allows enterprises to access virtualized computing systems through the public Internet. The term "customer" as used herein in this application, is defined as a business entity that is served by an SA, provided on the SaaS platform. A customer may be a person or an organization and may be represented by a user that responsible for the administration of the application in aspects of permissions configuration, user related configuration, and data security policy. The service is supplied and consumed over the Internet, thus eliminating requirements to install and run applications locally on a site of a customer as well as simplifying maintenance and support. Particularly it is advantageous in massive business applications. Licensing is a common form of billing for the service and it is paid periodically. SaaS is becoming ever more common as a form of SA delivery over the Internet and is being facilitated in a technology infrastructure called "Cloud Computing". In this form of SA delivery, where the SA is controlled by a service provider, a customer may experience stability and data security issues. In many cases, the customer is a business organization that is using the SaaS for business purposes such as business software; hence, stability and data security are primary requirements. As part of a cloud service arrangement, any computer system may also be emulated using software running on a hardware computer system. This virtualization allows for multiple instances of a computer system, each referred to as virtual machine, to run on a single machine. Each virtual machine behaves like a computer system running directly on hardware. It is isolated from the other virtual machines, as would two hardware computers. Each virtual machine comprises an instance of an operating system (the "guest operating system"). There is a host operating system running directly on the hardware that supports the software that emulates the hardware, and the emulation software is referred to as a hypervisor.

The term "cloud-based" generally refers to a hosted service that is remotely located from a data source and configured to receive, store and process data delivered by the data source over a network. Cloud-based systems may be configured to operate as a public cloud-based service, a private cloud-based service or a hybrid cloud-based service. A "public cloud-based service" may include a third-party provider that supplies one or more servers to host multi-tenant services. Examples of a public cloud-based service include Amazon Web Services® (AWS®), Microsoft® Azure™, and Google® Compute Engine™ (GCP) as examples. In contrast, a "private" cloud-based service may include one or more servers that host services provided to a single subscriber (enterprise) and a hybrid cloud-based service may be a combination of certain functionality from a public cloud-based service and a private cloud-based service.

Cloud computing and virtualization is described in a book entitled "Cloud Computing and Virtualization" authored by Dac-Nhuong Le (Faculty of Information Technology, Haiphong University, Haiphong, Vietnam), Raghvendra Kumar (Department of Computer Science and Engineering, LNCT, Jabalpur, India), Gia Nhu Nguyen (Graduate School, Duy Tan University, Da Nang, Vietnam), and Jyotir Moy Chatterjee (Department of Computer Science and Engineering at GD-RCET, Bhilai, India), and published 2018 by John Wiley & Sons, Inc. [ISBN 978-1-119-48790-6], which is incorporated in its entirety for all purposes as if fully set forth herein. The book describes the adoption of virtualization in data centers creates the need for a new class of networks designed to support elasticity of resource allocation, increasing mobile workloads and the shift to production of virtual workloads, requiring maximum availability. Building a network that spans both physical servers and virtual machines with consistent capabilities demands a new architectural approach to designing and building the IT infrastructure. Performance, elasticity, and logical addressing structures must be considered as well as the management of the physical and virtual networking infrastructure. Once deployed, a network that is virtualization-ready can offer many revolutionary services over a common shared infrastructure. Virtualization technologies from VMware, Citrix and Microsoft encapsulate existing applications and extract them from the physical hardware. Unlike physical machines, virtual machines are represented by a portable software image, which can be instantiated on physical hardware at a moment's notice. With virtualization, comes elasticity where computer capacity can be scaled up or down on demand by adjusting the number of virtual machines actively executing on a given physical server. Additionally, virtual machines can be migrated while in service from one physical server to another.

Extending this further, virtualization creates "location freedom" enabling virtual machines to become portable across an ever-increasing geographical distance. As cloud architectures and multi-tenancy capabilities continue to develop and mature, there is an economy of scale that can be realized by aggregating resources across applications, business units, and separate corporations to a common shared, yet segmented, infrastructure. Elasticity, mobility, automation, and density of virtual machines demand new network architectures focusing on high performance, addressing portability, and the innate understanding of the virtual machine as the new building block of the data center. Consistent network-supported and virtualization-driven policy and controls are necessary for visibility to virtual machines' state and location as they are created and moved across a virtualized infrastructure.

Virtualization technologies in data center environments are described in a eBook authored by Gustavo Alessandro Andrade Santana and published 2014 by Cisco Systems, Inc. (Cisco Press) [ISBN-13: 978-1-58714-324-3] entitled: "*Data Center Virtualization Fundamentals*", which is incorporated in its entirety for all purposes as if fully set forth herein. PowerVM technology for virtualization is described in IBM RedBook entitled: "*IBM PowerVM Virtualization—Introduction and Configuration*" published by IBM Corporation June 2013, and virtualization basics is described in a paper by IBM Corporation published 2009 entitled: "*Power Systems—Introduction to virtualization*", which are both incorporated in their entirety for all purposes as if fully set forth herein.

Server. The Internet architecture employs a client-server model, among other arrangements. The terms 'server' or 'server computer' relates herein to a device or computer (or a plurality of computers) connected to the Internet and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or to a device or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

A server device (in server/client architecture) typically offers information resources, services, and applications to clients, using a server dedicated or oriented operating system. A server device may consist of, be based on, include, or be included in the work-station 7 shown in FIG. 2, the computer system 10 shown in FIG. 1, or the computer 11 shown in FIG. 1. Current popular server operating systems are based on Microsoft Windows (by Microsoft Corporation, headquartered in Redmond, Washington, U.S.A.), Unix, and Linux-based solutions, such as the 'Windows Server 2012' server operating system, which is a part of the Microsoft 'Windows Server' OS family, that was released by Microsoft in 2012. 'Windows Server 2012' provides enterprise-class datacenter and hybrid cloud solutions that are simple to deploy, cost-effective, application-specific, and user-centric, and is described in Microsoft publication entitled: "*Inside-Out Windows Server* 2012", by William R. Stanek, published 2013 by Microsoft Press, which is incorporated in its entirety for all purposes as if fully set forth herein.

Unix operating system is widely used in servers. It is a multitasking, multiuser computer operating system that exists in many variants, and is characterized by a modular design that is sometimes called the "Unix philosophy", meaning the OS provides a set of simple tools, which each performs a limited, well-defined function, with a unified filesystem as the primary means of communication, and a shell scripting and command language to combine the tools to perform complex workflows. Unix was designed to be portable, multi-tasking and multi-user in a time-sharing configuration, and Unix systems are characterized by various concepts: the use of plain text for storing data, a hierarchical file system, treating devices and certain types of Inter-Process Communication (IPC) as files, the use of a large number of software tools, and small programs that can be strung together through a command line interpreter using pipes, as opposed to using a single monolithic program that includes all of the same functionality. Unix operating system consists of many utilities along with the master control program, the kernel. The kernel provides services to start and stop programs, handles the file system and other common "low level" tasks that most programs share, and schedules access to avoid conflicts when programs try to access the same resource, or device simultaneously. To mediate such access, the kernel has special rights, reflected in the division between user-space and kernel-space. Unix is described in a publication entitled: "*UNIX Tutorial*" by tutorialspoint.com, downloaded on July 2014, which is incorporated in its entirety for all purposes as if fully set forth herein.

Client. The term 'client' typically refers to an application (or a device executing the application) used for retrieving or rendering resources, or resource manifestations, such as a web browser, an e-mail reader, or a Usenet reader, while the term 'server' typically refers to an application (or a device executing the application) used for supplying resources or resource manifestations, and typically offers (or hosts) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

A client device (in server/client architecture) typically receives information resources, services, and applications from servers, and is using a client dedicated or oriented operating system. The client device may consist of, be based on, include, or be included in, the workstation 7, the computer system 10 or the computer 11. Current popular client operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "*Windows Internals—Part* 1" and "*Windows Internals—Part* 2", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows* 8—*An Overview for IT Professionals*" by Jerry Honeycutt, which is incorporated in its entirety for all purposes as if fully set forth herein.

Chrome OS is a Linux kernel-based operating system designed by Google Inc. out of Mountain View, California, U.S.A., to work primarily with web applications. The user interface takes a minimalist approach and consists almost entirely of just the Google Chrome web browser; since the operating system is aimed at users who spend most of their computer time on the Web, the only "native" applications on Chrome OS are a browser, media player and file manager, and hence the Chrome OS is almost a pure web thin client OS.

The Chrome OS is described as including a three-tier architecture: firmware, browser and window manager, and system-level software and userland services. The firmware contributes to fast boot time by not probing for hardware, such as floppy disk drives, that are no longer common on computers, especially netbooks. The firmware also contributes to security by verifying each step in the boot process and incorporating system recovery. The system-level software includes the Linux kernel that has been patched to improve boot performance. The userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "*Google™ Chrome OS USER GUIDE" published* 2011, which is incorporated in its entirety for all purposes as if fully set forth herein.

RTOS. A Real-Time Operating System (RTOS) is an Operating System (OS) intended to serve real-time applications that process data as it comes in, typically without buffer delays. Processing time requirements (including any OS delay) are typically measured in tenths of seconds or shorter increments of time, and is a time bound system which has well defined fixed time constraints. Processing is commonly to be done within the defined constraints, or the system will fail. They either are event driven or time sharing, where event driven systems switch between tasks based on their priorities while time sharing systems switch the task based on clock interrupts. A key characteristic of an RTOS is the level of its consistency concerning the amount of time it takes to accept and complete an application's task; the variability is jitter. A hard real-time operating system has less jitter than a soft real-time operating system. The chief design goal is not high throughput, but rather a guarantee of a soft or hard performance category. An RTOS that can usually or generally meet a deadline is a soft real-time OS, but if it can meet a deadline deterministically it is a hard real-time OS. An RTOS has an advanced algorithm for scheduling, and includes a scheduler flexibility that enables a wider, computer-system orchestration of process priorities. Key factors in a real-time OS are minimal interrupt latency and minimal thread switching latency; a real-time OS is valued more for how quickly or how predictably it can respond than for the amount of work it can perform in a given period of time.

Common designs of RTOS include event-driven, where tasks are switched only when an event of higher priority needs servicing; called preemptive priority, or priority scheduling, and time-sharing, where task are switched on a regular clocked interrupt, and on events; called round robin. Time sharing designs switch tasks more often than strictly needed, but give smoother multitasking, giving the illusion that a process or user has sole use of a machine. In typical designs, a task has three states: Running (executing on the CPU); Ready (ready to be executed); and Blocked (waiting for an event, I/O for example). Most tasks are blocked or ready most of the time because generally only one task can run at a time per CPU. The number of items in the ready queue can vary greatly, depending on the number of tasks the system needs to perform and the type of scheduler that the system uses. On simpler non-preemptive but still multitasking systems, a task has to give up its time on the CPU to other tasks, which can cause the ready queue to have a greater number of overall tasks in the ready to be executed state (resource starvation).

RTOS concepts and implementations are described in an Application Note No. RES05600008-0100/Rec. 1.00 published January 2010 by Renesas Technology Corp. entitled: "*R8C Family—General RTOS Concepts*", in JAJA Technology Review article published February 2007 [1535-5535/$32.00] by The Association for Laboratory Automation [doi:10.1016/j.jala.2006.10.016] entitled: "*An Overview of Real-Time Operating Systems*", and in Chapter 2 entitled: "*Basic Concepts of Real Time Operating Systems*" of a book published 2009 [ISBN—978-1-4020-9435-4] by Springer Science+Business Media B.V. entitled: "*Hardware-Dependent Software—Principles and Practice*", which are all incorporated in their entirety for all purposes as if fully set forth herein.

QNX. One example of RTOS is QNX, which is a commercial Unix-like real-time operating system, aimed primarily at the embedded systems market. QNX was one of the first commercially successful microkernel operating systems and is used in a variety of devices including cars and mobile phones. As a microkernel-based OS, QNX is based on the idea of running most of the operating system kernel in the form of a number of small tasks, known as Resource Managers. In the case of QNX, the use of a microkernel allows users (developers) to turn off any functionality they do not require without having to change the OS itself; instead, those services will simply not run.

FreeRTOS. FreeRTOS™ is a free and open-source Real-Time Operating system developed by Real Time Engineers Ltd., designed to fit on small embedded systems and implements only a very minimalist set of functions: very basic handle of tasks and memory management, and just sufficient API concerning synchronization. Its features include characteristics such as preemptive tasks, support for multiple microcontroller architectures, a small footprint (4.3 Kbytes on an ARM7 after compilation), written in C, and compiled with various C compilers. It also allows an unlimited number of tasks to run at the same time, and no limitation about their priorities as long as used hardware can afford it.

FreeRTOS™ provides methods for multiple threads or tasks, mutexes, semaphores and software timers. A tick-less mode is provided for low power applications, and thread priorities are supported. Four schemes of memory allocation are provided: allocate only; allocate and free with a very simple, fast, algorithm; a more complex but fast allocate and free algorithm with memory coalescence; and C library allocate and free with some mutual exclusion protection. While the emphasis is on compactness and speed of execution, a command line interface and POSIX-like IO abstraction add-ons are supported. FreeRTOS™ implements multiple threads by having the host program call a thread tick method at regular short intervals.

The thread tick method switches tasks depending on priority and a round-robin scheduling scheme. The usual interval is 1/1000 of a second to 1/100 of a second, via an interrupt from a hardware timer, but this interval is often changed to suit a particular application. FreeRTOS™ is described in a paper by Nicolas Melot (downloaded July 2015) entitled: "*Study of an operating system: FreeRTOS—Operating systems for embedded devices*", in a paper (dated Sep. 23, 2013) by Dr. Richard Wall entitled: "*Carebot PIC32 MX7ck implementation of Free RTOS*", FreeRTOS™ modules are described in web pages entitled: "*FreeRTOS™ Modules*" published in the www.freertos.org web-site dated 26 Nov. 2006, and FreeRTOS kernel is described in a paper published 1 April 2007 by Rich Goyette of Carleton University as part of 'SYSC5701: Operating System Methods for Real-Time Applications', entitled: "*An Analysis and Description of the Inner Workings of the FreeRTOS Kernel*", which are all incorporated in their entirety for all purposes as if fully set forth herein.

SafeRTOS. SafeRTOS was constructed as a complementary offering to FreeRTOS, with common functionality but with a uniquely designed safety-critical implementation. When the FreeRTOS functional model was subjected to a full HAZOP, weakness with respect to user misuse and hardware failure within the functional model and API were identified and resolved. Both SafeRTOS and FreeRTOS share the same scheduling algorithm, have similar APIs, and are otherwise very similar, but they were developed with differing objectives. SafeRTOS was developed solely in the C language to meet requirements for certification to IEC61508. SafeRTOS is known for its ability to reside solely in the on-chip read only memory of a microcontroller for standards compliance. When implemented in hardware memory, SafeRTOS code can only be utilized in its original configuration, so certification testing of systems using this OS need not re-test this portion of their designs during the functional safety certification process.

VxWorks. VxWorks is an RTOS developed as proprietary software and designed for use in embedded systems requiring real-time, deterministic performance and, in many cases, safety and security certification, for industries, such as aerospace and defense, medical devices, industrial equipment, robotics, energy, transportation, network infrastructure, automotive, and consumer electronics. VxWorks supports Intel architecture, POWER architecture, and ARM architectures. The VxWorks may be used in multicore asymmetric multiprocessing (AMP), symmetric multiprocessing (SMP), and mixed modes and multi-OS (via Type 1 hypervisor) designs on 32- and 64-bit processors. VxWorks comes with the kernel, middleware, board support packages, Wind River Workbench development suite and complementary third-party software and hardware technologies. In its latest release, VxWorks 7, the RTOS has been re-engineered for modularity and upgradeability so the OS kernel is separate from middleware, applications and other packages. Scalability, security, safety, connectivity, and graphics have been improved to address Internet of Things (IoT) needs.

μC/OS. Micro-Controller Operating Systems (MicroC/OS, stylized as μC/OS) is a real-time operating system (RTOS) that is a priority-based preemptive real-time kernel for microprocessors, written mostly in the programming language C, and is intended for use in embedded systems. MicroC/OS allows defining several functions in C, each of which can execute as an independent thread or task. Each task runs at a different priority, and runs as if it owns the central processing unit (CPU). Lower priority tasks can be preempted by higher priority tasks at any time. Higher priority tasks use operating system (OS) services (such as a delay or event) to allow lower priority tasks to execute. OS services are provided for managing tasks and memory, communicating between tasks, and timing.

In one example, part of, or all of, the steps, methods, or flow charts described herein are executed (independently or in cooperation) by a client device, or any device such as the device 35 shown in FIG. 3. Alternatively or in addition, part of, or all of, the steps, methods, or flow charts described herein are executed (independently or in cooperation) by a server device, such as server 23*a* shown as part on the arrangement 30 shown in FIG. 3. In one example, a client device (such as the device 35) and a server (such as the server 23*a*) cooperatively perform part of, or all of, the steps, methods, or flow charts described herein. For example, lower computing power processor 12 may be used in the device 35, since the heavy or resourceful computations are performed at a remote server. Such scheme may obviate the need for expensive and resourceful device. In another example, memory resources may be saved at the client device by using data stored at a server. The storage 33 in the device 35 may store the Instructions 37*a* and the Operating System 37*b*. The device 35 may mainly be used for interfacing the user 36, while the major storing and processing resources and activities are provided by the server 23*a*.

The output component 34 may include a color display for displaying screen elements or for organizing on-screen items and controls for data entry. Further, the device may support the display of split-screen views. The input component 38 may include dedicated hard controls for frequently used/accessed functions (e.g., repeat system message). Many systems used re-configurable keys/buttons whose function change depending on the application. For example, a switch may be used to activate the voice recognition system and it may increase system reliability. The input component 38 and the output component 34 may further cooperate to provide both auditory and visual feedback to confirm driver inputs and availability of the speech command. Further, a strategy to alert drivers through auditory tones/beeps in advance of the presentation of information, and/or changes in display status, may be used. This may limit the need for drivers to continuously monitor the system, or repeat system messages.

The device 35 may serve as a client device and may access data, such as retrieving data from, or sending data to, the server 23*a* over the Internet 22, such as via the ISP 16 as described in FIG. 1 above. The communication with the server 23*a* may be via a wireless network 39, by using the antenna 29 and the wireless transceiver 28 in the device 35.

A diagrammatic representation of a machine in the example form of the computing device 35 within which a set of instructions, for causing the machine to perform any one or more of the methods discussed herein, may be executed. An example of the device 35 that may be used with any of the steps, methods, or flow-charts herein is schematically described as part of an arrangement 30 shown in FIG. 3. The components in the device 35 communicate over a bus 32, which may correspond with the bus 13 in the computer 11. The computing device 35 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in an LAN, an intranet, an extranet, or the Internet. The machine may operate in the capacity of a server machine in client-server network environment. The machine may be a Personal Computer (PC), a Set-Top Box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The device 35 may also include an interface bus for facilitating communication from various interface devices (for example, one or more output components 34, one or more peripheral interfaces, and one or more communication components such as the wireless transceiver 28) to the basic configuration via the bus/interface controller that controls the bus 32. Some of the example output components include a graphics processing unit and an audio processing unit, which may be configured to communicate to various external devices such as a display or speakers via one or more A/V ports. One or more example peripheral interfaces may include a serial interface controller or a parallel interface controller, which may be configured to communicate with external devices such as input components (for example, keyboard, mouse, pen, voice input device, touch input device, etc.) or other peripheral output devices (for example, printer, scanner, etc.) via one or more I/O ports.

The device 35 may be part of, may include, or may be integrated with, a general purpose computing device, arranged in accordance with at least some embodiments described herein. In an example basic configuration, the device 35 may include one or more processors 12 and one or more memories or any other computer readable media. A dedicated memory bus may be used to communicate between the processor 12 and the device memories, such as the ROM 15*b*, the main memory 15*a*, and a storage 33. Depending on the desired configuration, the processor 12 may be of any type, including but not limited to a microprocessor (μP), a microcontroller (μC), a digital signal processor (DSP), or any combination thereof. The processor 12 may include one or more levels of caching, such as a cache memory, a processor core, and registers. The example processor core may include an Arithmetic Logic Unit (ALU), a Floating Point Unit (FPU), a Digital Signal Processing core (DSP Core), or any combination thereof. An example memory controller may also be used with the processor 12, or in some implementations, the memory controller may be an internal part of the processor 12.

Depending on the desired configuration, the device memories may be of any type including but not limited to volatile memory (such as RAM), non-volatile memory (such as ROM, flash memory, etc.) or any combination thereof. The storage 33 may correspond to the storage device 15*c*, and may be part of, may comprise, or may be integrated with the ROM 15*b* and the main memory 15*a*. The storage 33 may include an operating system 37*c*, instruction set 37*b* that may include steps or part of, or whole of, the flow-charts described herein. The storage 33 may further include a control module, and program data, which may include path data. Any of the memories or storages of the device 35 may include read-only memory (ROM), such as ROM 15*b*, flash memory, Dynamic Random Access Memory (DRAM) such as Synchronous DRAM (SDRAM)), a static memory (e.g., flash memory, Static Random Access Memory (SRAM)) and a data storage device, which communicate with each other via the bus 32.

The device 35 may have additional features or functionality, and additional interfaces to facilitate communications between the basic configuration shown in FIG. 3 and any desired devices and interfaces. For example, a bus/interface controller may be used to facilitate communications between the basic configuration and one or more data storage devices via a storage interface bus. The data storage devices may be one or more removable storage devices, one or more non-removable storage devices, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The device 35 may receive inputs from a user 36 via an input component 38, which may correspond with the input device 18 or cursor control 18*a* shown as part of the computer 11 in FIG. 1, or may correspond with the pointing device 3 or the keyboard 2 shown as part of the computer system 7 in FIG. 1*a*. In one example, the input component 38 may be used for receiving instructions from the user 36. The device 35 notifies or outputs information to the user 36 using an output component 34, which may correspond to the display 17 shown as part of the computer 11 in FIG. 1, or may correspond with the printer 4 or the screen 5 shown as part of the computer system 7 in FIG. 1*a*. In one example, the output component 34 may be used for displaying guidance to the user 36.

The interface with the user 36 may be based on the input component 38 and the output component 34. For example, receiving input (visually or acoustically) from the user 36 via the input component 38. Similarly, outputting data (visually or acoustically) to the user 36 via the output component 34. The input component 38 may be a piece of computer hardware equipment used to provide data and control signals to an information processing system such as a computer or information appliance. Such input component 38 may be an integrated or a peripheral input device (e.g., hard/soft keyboard, mouse, resistive or capacitive touch display, etc.). Examples of input components include keyboards, mouse, scanners, digital cameras and joysticks. Input components 38 can be categorized based on the modality of input (e.g., mechanical motion, audio, visual, etc.), whether the input is discrete (e.g. pressing of key) or continuous (e.g., a mouse's position, though digitized into a discrete quantity, is fast enough to be considered continuous), the number of degrees of freedom involved (e.g., two-dimensional traditional mice, or three-dimensional navigators designed for CAD applications). Pointing devices (such as 'computer mouse'), which are input components used to specify a position in space, can further be classified according to whether the input is direct or indirect. With direct input, the input space coincides with the display space, i.e., pointing is done in the space where visual feedback or the pointer appears. Touchscreens and light pens involve direct input. Examples involving indirect input include the mouse and trackball, and whether the positional information is absolute (e.g., on a touch screen) or relative (e.g., with a mouse that can be lifted and repositioned). Direct input is almost necessarily absolute, but indirect input may be either absolute or relative. For example, digitizing graphics tablets that do not have an embedded screen involve indirect input and sense absolute positions and are often run in an absolute input mode, but they may also be set up to simulate a relative input mode like that of a touchpad, where the stylus or puck can be lifted and repositioned.

In the case of wireless networking, the wireless network 39 may use any type of modulation, such as Amplitude Modulation (AM), a Frequency Modulation (FM), or a Phase Modulation (PM). Further, the wireless network 39 may be a control network (such as ZigBee or Z-Wave), a home network, a WPAN (Wireless Personal Area Network), a WLAN (wireless Local Area Network), a WWAN (Wireless Wide Area Network), or a cellular network. An example of a Bluetooth-based wireless controller that may be included in a wireless transceiver is SPBT2632C1A Bluetooth module available from STMicroelectronics NV and described in the data sheet DocID022930 Rev. 6 dated April 2015 entitled: "SPBT2632C1A—Bluetooth® technology class-1 module", which is incorporated in its entirety for all purposes as if fully set forth herein.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on, or may be compatible with, wireless technologies that are described in Chapter 20: *"Wireless Technologies"* of the publication number 1-587005-001-3 by Cisco Systems, Inc. (July 1999) entitled: "*Internetworking Technologies Handbook*", which is incorporated in its entirety for all purposes as if fully set forth herein.

Alternatively or in addition, the networking or the communication with the of the wireless-capable device 35 with the server 23*a* over the wireless network 39 may be using, may be according to, may be compatible with, or may be based on, Near Field Communication (NFC) using passive or active communication mode, and may use the 13.56 MHz frequency band, and data rate may be 106 Kb/s, 212 Kb/s, or 424 Kb/s, and the modulation may be Amplitude-Shift-Keying (ASK), and may be according to, may be compatible with, or based on, ISO/IEC 18092, ECMA-340, ISO/IEC 21481, or ECMA-352. In such a case, the wireless transceiver 28 may be an NFC transceiver and the respective antenna 29 may be an NFC antenna.

Alternatively or in addition, the networking or the communication with the of the wireless-capable device 35 with the server 23*a* over the wireless network 39 may be using, may be according to, may be compatible with, or may be based on, a Wireless Personal Area Network (WPAN) that may be according to, may be compatible with, or based on, Bluetooth™ or IEEE 802.15.1-2005 standards, and the wireless transceiver 28 may be a WPAN modem, and the respective antenna 29 may be a WPAN antenna. The WPAN may be a wireless control network according to, may be compatible with, or based on, ZigBee™ or Z-Wave™ standards, such as IEEE 802.15.4-2003.

Alternatively or in addition, the networking or the communication with the of the wireless-capable device 35 with the server 23*a* over the wireless network 39 may be using, may be according to, may be compatible with, or may be based on, a Wireless Local Area Network (WLAN) that may be according to, may be compatible with, or based on, IEEE 802.11a, IEEE 802.11b, IEEE 802.11g, IEEE 802.11n, or IEEE 802.11ac standards, and the wireless transceiver 28 may be a WLAN modem, and the respective antenna 29 may be a WLAN antenna.

Alternatively or in addition, the networking or the communication with the of the wireless-capable device 35 with the server 23*a* over the wireless network 39 may be using, may be according to, may be compatible with, or may be based on, a wireless broadband network or a Wireless Wide Area Network (WWAN), and the wireless transceiver 28 may be a WWAN modem, and the respective antenna 29 may be a WWAN antenna. The WWAN may be a WiMAX network such as according to, may be compatible with, or based on, IEEE 802.16-2009, and the wireless transceiver 28 may be a WiMAX modem, and the respective antenna 29 may be a WiMAX antenna. Alternatively or in addition, the WWAN may be a cellular telephone network and the wireless transceiver 28 may be a cellular modem, and the respective antenna 29 may be a cellular antenna. The WWAN may be a Third Generation (3G) network and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on, or may be compatible with, IEEE 802.20-2008. Alternatively or in addition, the WWAN may be a satellite network, and the wireless transceiver 28 may be a satellite modem, and the respective antenna 29 may be a satellite antenna.

Alternatively or in addition, the networking or the communication with the of the wireless-capable device 35 with the server 23*a* over the wireless network 39 may be using, may be according to, may be compatible with, or may be based on, a licensed or an unlicensed radio frequency band, such as the Industrial, Scientific and Medical (ISM) radio band. For example, an unlicensed radio frequency band may be used that may be about 60 GHz, may be based on beamforming, and may support a data rate of above 7 Gb/s, such as according to, may be compatible with, or based on, WiGig™, IEEE 802.11ad, WirelessHD™ or IEEE 802.15.3c-2009, and may be operative to carry uncompressed video data, and may be according to, may be compatible with, or based on, WHDI™. Alternatively or in addition, the wireless network may use a white space spectrum that may be an analog television channel consisting of a 6 MHz, 7 MHz or 8 MHz frequency band, and allocated in the 54-806 MHz band. The wireless network may be operative for channel bonding, and may use two or more analog television channels, and may be based on Wireless Regional Area Network (WRAN) standard using OFDMA modulation. Further, the wireless communication may be based on geographically-based cognitive radio, and may be according to, may be compatible with, or based on, IEEE 802.22 or IEEE 802.11af standards. Real-Time Clock (RTC) ICs measure time even when the power of the main device is off. During these times, RTC ICs draw power from an auxiliary battery or supercapacitor. Most modern RTC ICs reduce package pin count by supporting a serial interface. An example of an RTC IC is model No. DS1339A available from Maxim Integrated Products, Inc. (Headquartered in San Jose, California, U.S.A.), described in a data sheet No. 19-6425; Rev 2; January 2015 (2015) by Maxim Integrated Products, Inc. entitled: "*DS1339A—Low-Current, PC, Serial Real-Time Clock*", which is incorporated in its entirety for all purposes as if fully set forth herein, and may be used as described in a tutorial 5791 (dated Mar. 28, 2014) by Maxim Integrated Products, Inc. entitled: "*Tips for Writing Bulletproof Real-Time Clock Control Code*", which is incorporated in its entirety for all purposes as if fully set forth herein.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi, and mobile broadband access. In addition to telephony, the Smartphones may support a wide variety of other services such as text messaging, MMS, email, Internet access, short-range wireless communications (infrared, Bluetooth), business applications, gaming and photography.

An example of a contemporary smartphone is model iPhone 12 Pro Max available from Apple Inc., headquartered in Cupertino, California, U.S.A. and described in iPhone 12 Pro Max technical specification and in a web-page by Apple Inc. entitled: "*About iOS* 14 *Updates*" (both retrieved November 2020 from www.apple.com), which are both incorporated in their entirety for all purposes as if fully set forth herein. Another example of a smartphone is Samsung Galaxy S20 available from Samsung Electronics headquartered in Suwon, South-Korea, described in a document number UNL_STR_G981U_G986U_G988U_EN_UM_TN_TAW_021220_FINAL entitled: "*Galaxy S*20|*S*20+ |*S*20 *Untra*5*G—User manual*" (retrieved November 2020 from www.samsung.com), which is incorporated in its entirety for all purposes as if fully set forth herein.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example, adjusting the screen from portrait to landscape depending on how the device is oriented, or allowing the user to steer a vehicle in a racing game by rotating the device by simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS OS is described in a publication entitled: "*IOS Tutorial*", downloaded from tutorialspoint.com on July 2014, which is incorporated in its entirety for all purposes as if fully set forth herein.

Tablet. A tablet computer, commonly referred to as 'tablet', is a mobile device, typically with a mobile operating system and touchscreen display processing circuitry, and a rechargeable battery in a single, thin and flat package. Modern tablets largely resemble modern smartphones and are used for personal, educational and workplace applications, and the only differences being that tablets are relatively larger than smartphones, with screens 7 inches (18 cm) or larger, measured diagonally, and may not support access to a cellular network. The touchscreen display is typically operated by gestures executed by finger or digital pen (stylus), instead of the mouse, trackpad, and keyboard of larger computers. Portable computers can be classified according to the presence and appearance of physical keyboards. Two species of tablet, the slate and booklet, do not have physical keyboards and usually accept text and other input by use of a virtual keyboard shown on their touchscreen displays. To compensate for their lack of a physical keyboard, most tablets can connect to independent physical keyboards by Bluetooth or USB.

The size of a slate shaped tablets varies, but commonly slates begin at 6 inches (approximately 15 cm). Some models in the larger than 10-inch (25 cm). Mini tablets are smaller and weigh less than slates, with typical screen sizes between 7-8 inches (18-20 cm). Smartphones and tablets are similar devices, differentiated by the former typically having smaller screens and most tablets lacking cellular network capability.

Two major architectures dominate the tablet market, ARM Holdings' ARM architecture and Intel's and AMD's x86. A key component among tablet computers is touch input on a touchscreen display. This allows the user to navigate easily and type with a virtual keyboard on the screen or press other icons on the screen to open apps or files. The system must respond to on-screen touches rather than clicks of a keyboard or mouse. This operation makes precise use of our eye-hand coordination. Touchscreens usually come in one of two forms—resistive and capacitive. Resistive touchscreens are passive and respond to pressure on the screen. They allow a high level of precision, useful in emulating a pointer (as is common in tablet computers) but may require calibration. Because of the high resolution, a stylus or fingernail is often used. Stylus-oriented systems are less suited to multi-touch. Capacitive touchscreens tend to be less accurate, but more responsive than resistive devices. Because they require a conductive material, such as a fingertip, for input, they are not common among stylus-oriented devices but are prominent on consumer devices. Most finger-driven capacitive screens do not currently support pressure input, but some tablets use a pressure-sensitive stylus or active pen. Some tablets can recognize individual palms, while some professional-grade tablets use pressure-sensitive films, such as those on graphics tablets. Some capacitive touch-screens can detect the size of the touched area and the pressure used.

Operating system. A mobile operating system (also referred to as mobile OS), is an operating system that operates a smartphone, tablet, PDA, or another mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently, the popular mobile OSs include Android, Symbian, Apple iOS, BlackBerry, MeeGo, Windows Phone, and Bada. Mobile devices with mobile communications capabilities (e.g. smartphones) typically contain two mobile operating systems: a main user-facing software platform is supplemented by a second low-level proprietary real-time operating system that operates the radio and other hardware.

Android is a Linux-based, open source mobile operating system (OS) based on the Linux kernel that is currently offered by Google. With a user interface based on direct manipulation, Android is designed primarily for touchscreen mobile devices such as smartphones and tablet computers with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions. For example, adjusting the screen from portrait to landscape depending on the device orientation, or allowing the user to steer a vehicle in a racing game by rotating the device, a process that simulates control of a steering wheel.

Android devices boot to the homescreen, the primary navigation and information point on the device, which is similar to the desktop found on PCs. The homescreens on Android are typically made up of app icons and widgets. App icons launch the associated app, whereas widgets display live, auto-updating content such as the weather forecast, the user's email inbox, or a news ticker directly on the homescreen. A homescreen may be made up of several pages that the user can swipe back and forth between pages. A heavily-customizable Android homescreen interface allows the user to adjust the look and feel of the device to their liking. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command), or rotating it in three dimensions (one common result is switching from portrait to landscape mode). The iOS is described in a publication entitled: "*IOS Tutorial*", downloaded from tutorialspoint.com on July 2014, which is incorporated in its entirety for all purposes as if fully set forth herein.

Wireless. Any embodiment herein may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), Second Generation (2G), 2.5G, Third Generation (3G), 3.5G, Enhanced Data rates for GSM Evolution (EDGE), Fourth Generation (4G), Fifth Generation (5G), or the like. Any wireless network or wireless connection herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, a wireless communication may be based on wireless technologies that are described in Chapter 20: "*Wireless Technologies*" of the publication number 1-587005-001-3 by Cisco Systems, Inc. (July 1999) entitled: "*Internetworking Technologies Handbook*", which is incorporated in its entirety for all purposes as if fully set forth herein. Wireless technologies and networks are further described in a book published 2005 by Pearson Education, Inc. William Stallings [ISBN: 0-13-191835-4] entitled: "*Wireless Communications and Networks—second Edition*", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

ISM. The Industrial, Scientific and Medical (ISM) radio bands are radio bands (portions of the radio spectrum) reserved internationally for the use of radio frequency (RF) energy for industrial, scientific and medical purposes other than telecommunications. In general, communications equipment operating in these bands must tolerate any interference generated by ISM equipment, and users have no regulatory protection from ISM device operation. The ISM bands are defined by the ITU-R in 5.138, 5.150, and 5.280 of the Radio Regulations. Individual countries use of the bands designated in these sections may differ due to variations in national radio regulations. Because communication devices using the ISM bands must tolerate any interference from ISM equipment, unlicensed operations are typically permitted to use these bands, since unlicensed operation typically needs to be tolerant of interference from other devices anyway. The ISM bands share allocations with unlicensed and licensed operations; however, due to the high likelihood of harmful interference, licensed use of the bands is typically low. In the United States, uses of the ISM bands are governed by Part 18 of the Federal Communications Commission (FCC) rules, while Part 15 contains the rules for unlicensed communication devices, even those that share ISM frequencies. In Europe, the ETSI is responsible for governing ISM bands.

Commonly used ISM bands include a 2.45 GHz band (also known as 2.4 GHz band) that includes the frequency band between 2.400 GHz and 2.500 GHz, a 5.8 GHz band that includes the frequency band 5.725-5.875 GHz, a 24 GHz band that includes the frequency band 24.000-24.250 GHz, a 61 GHz band that includes the frequency band 61.000-61.500 GHz, a 122 GHz band that includes the frequency band 122.000-123.000 GHz, and a 244 GHz band that includes the frequency band 244.000-246.000 GHz.

ZigBee. ZigBee is a standard for a suite of high-level communication protocols using small, low-power digital radios based on an IEEE 802 standard for Personal Area Network (PAN). Applications include wireless light switches, electrical meters with in-home-displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include keeping of device roles, management of requests to join a network, device discovery, and security. Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus the average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device and forms the root of the network tree and might bridge to other networks. There is exactly one defined ZigBee coordinator in each network, since it is the device that started the network originally. It is able to store information about the network, including acting as the Trust Center & repository for security keys. ZigBee Router (ZR) may be running an application function as well as may be acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unclotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirement, may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms, and security sensors.

Z-Wave is a mesh networking technology where each node or device on the network is capable of sending and receiving control commands through walls or floors, and use intermediate nodes to route around household obstacles or radio dead spots that might occur in the home. Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); and 921.42 MHz (Australia/New Zealand).

Z-Wave uses a source-routed mesh network topology and has one or more master controllers that control routing and security. The devices can communicate to another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "WiFi Technology" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

Bluetooth. Bluetooth is a wireless technology standard for exchanging data over short distances (using short-wavelength UHF radio waves in the ISM band from 2.4 to 2.485 GHz) from fixed and mobile devices, and building personal area networks (PANS). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHz including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 μs intervals. Two clock ticks make up a slot of 625 μs, and two slots make up a slot pair of 1250 μs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection—but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: "*Master Table of Contents & Compliance Requirements—Specification Volume* 0", and in an article published 2012 in Sensors [ISSN 1424-8220] by Caries Gomez et al. [Sensors 2012, 12, 11734-11753; doi:10.3390/s120211734] entitled: "*Overview and Evaluation of Bluetooth Low Energy: An Emerging Low-Power Wireless Technology*", which are both incorporated in their entirety for all purposes as if fully set forth herein.

Bluetooth Smart technology operates in the same spectrum range (the 2.400 GHz-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

Cellular. Cellular telephone network may be according to, compatible with, or may be based on, a Third Generation (3G) network that uses Universal Mobile Telecommunications System (UMTS), Wideband Code Division Multiple Access (W-CDMA) UMTS, High Speed Packet Access (HSPA), UMTS Time-Division Duplexing (TDD), CDMA2000 1×RTT, Evolution-Data Optimized (EV-DO), Global System for Mobile communications (GSM), or Enhanced Data rates for GSM Evolution (EDGE) EDGE-Evolution. Further, a cellular telephone network is a Fourth Generation (4G) network that uses Evolved High Speed Packet Access (HSPA+), Mobile Worldwide Interoperability for Microwave Access (WiMAX), Long-Term Evolution (LTE), LTE-Advanced, Mobile Broadband Wireless Access (MBWA), or is based on IEEE 802.20-2008.

5G. 5G refers to the fifth generation technology standard for cellular networks, as the successor to the 4G networks which provide connectivity to most current cellphones. 5G networks are cellular networks, in which the service area is divided into small geographical areas called cells. All 5G wireless devices in a cell are connected to the Internet and telephone network by radio waves through a local antenna in the cell. The main advantage of the new networks is that they will have greater bandwidth, giving higher download speeds, eventually up to 10 gigabits per second (Gbit/s).

The increased speed is achieved partly by using higher-frequency radio waves than current cellular networks. However, higher-frequency radio waves have a shorter range than the frequencies used by previous cell phone towers, requiring smaller cells. So to ensure wide service, 5G networks operate on up to three frequency bands, low, medium, and high. A 5G network will be composed of networks of up to 3 different types of cells, each requiring different antennas, each type giving a different tradeoff of download speed vs. distance and service area. 5G cellphones and wireless devices will connect to the network through the highest speed antenna within range at their location:

Low-band 5G uses a similar frequency range to current 4G cellphones, 600-700 MHz, giving download speeds a little higher than 4G: 30-250 Megabits per Second (Mbit/s). Low-band cell towers will have a range and coverage area similar to current 4G towers. Mid-band 5G uses microwaves of 2.5-3.7 GHz, currently allowing speeds of 100-900 Mbit/s, with each cell tower providing service up to several miles in radius. High-band 5G currently uses frequencies of 25-39 GHz, near the bottom of the millimeter wave band, although higher frequencies may be used in the future. It often achieves download speeds of a gigabit per second (Gbit/s), comparable to cable internet. The industry consortium setting standards for 5G is the 3rd Generation Partnership Project (3GPP).

Random. Randomness is commonly implemented by using random numbers, defined as a sequence of numbers or symbols that lack any pattern and thus appear random, are often generated by a random number generator. Randomness for security is also described in IETF RFC 1750 "*Randomness Recommendations for Security*" (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

The term 'random' herein is intended to cover not only pure random, non-deterministically and non-predicted generated signals, but also pseudo-random, deterministic signals such as the output of a shift-register arrangement provided with a feedback circuit as used to generate pseudo-random binary signals or as scramblers, and chaotic signals, and where a randomness factor may be used.

A digital random signal generator (known as random number generator) wherein numbers in binary form replaces the analog voltage value output may be used for any randomness. One approach to random number generation is based on using linear feedback shift registers. An example of random number generators is disclosed in U.S. Pat. No. 7,124,157 to Ikake entitled: "Random Number Generator", in U.S. Pat. No. 4,905,176 to Schulz entitled: "Random Number Generator Circuit", in U.S. Pat. No. 4,853,884 to Brown et al. entitled: "Random Number Generator with Digital Feedback" and in U.S. Pat. No. 7,145,933 to Szajnowski entitled: "Method and Apparatus for generating Random signals", which are incorporated in its entirety for all purposes as if fully set forth herein.

A digital random signal generator may be based on 'True Random Number Generation IC RPG100/RPG100B' available from FDK Corporation and described in the data sheet 'Physical Random number generator RPG100.RPG100B' REV. 08 publication number HM-RAE106-0812, which is incorporated in its entirety for all purposes as if fully set forth herein. The digital random signal generator can be hardware based, generating random numbers from a natural physical process or phenomenon, such as the thermal noise of semiconductor which has no periodicity. Typically, such hardware random number generators are based on microscopic phenomena such as thermal noise, shot noise, nuclear decaying radiation, photoelectric effect or other quantum phenomena, and typically contain a transducer to convert some aspect of the physical phenomenon to an electrical signal, an amplifier and other electronic to bring the output into a signal that can be converted into a digital representation by an analog to digital converter. In the case where digitized serial random number signals are generated, the output is converted to parallel, such as 8 bits data, with 256 values of random numbers (values from 0 to 255). Alternatively, a digital random signal generator may be software (or firmware) based, such as pseudo-random number generators. Such generators include a processor for executing software that includes an algorithm for generating numbers, which approximates the properties of random numbers. The random signal generator (either analog or digital) may output a signal having uniform distribution, in which there is a substantially or purely equal probability of a signal falling between two defined limits, having no appearance outside these limits. However, Gaussian and other distribution may be equally used.

Microphone. A transducer is a device for converting one form of energy into another. In an electroacoustic context, this means converting sound energy into electrical energy (or vice versa). Electroacoustic transducers include loudspeakers, microphones, hydrophones, and sonar projectors. These devices convert a sound pressure wave to or from an electric signal, and the most widely used transduction principles are electromagnetism, electrostatics and piezoelectricity. The transducers in most common loudspeakers (e.g. woofers and tweeters), are electromagnetic devices that generate waves using a suspended diaphragm driven by an electromagnetic voice coil, sending off pressure waves. Electret microphones and condenser microphones employ electrostatics—as the sound wave strikes the microphone's diaphragm, it moves and induces a voltage change. The ultrasonic systems used in medical ultrasonography employ piezoelectric transducers. These are made from special ceramics in which mechanical vibrations and electrical fields are interlinked through a property of the material itself.

In a common technique of acoustic measurement, acoustic signals are sampled in time, and then presented in more meaningful forms such as octave bands or time frequency plots. The entire spectrum can be divided into three sections: audio, ultrasonic, and infrasonic. The audio range falls between 20 Hz and 20,000 Hz, and is important because its frequencies can be detected by the human ear. This range has a number of applications, including speech communication and music. The ultrasonic range refers to the very high frequencies: 20,000 Hz and higher, and this range has shorter wavelengths which allow better resolution in imaging technologies. On the other end of the spectrum, the lowest frequencies are known as the infrasonic range, and these frequencies can be used to study geological phenomena such as earthquakes.

A microphone is an electroacoustic sensor that responds to sound waves (which are essentially vibrations transmitted through an elastic solid or a liquid or gas), and converts sound into electrical energy, usually by means of a ribbon or diaphragm set into motion by the sound waves. The sound may be audio or audible, having frequencies in the approximate range of 20 to 20,000 hertz, capable of being detected by human organs of hearing. Alternatively or in addition, the microphone may be used to sense inaudible frequencies, such as ultrasonic (a.k.a. ultrasound) acoustic frequencies that are above the range audible to the human ear, or above approximately 20,000 Hz. A microphone may be a condenser microphone (a.k.a. capacitor or electrostatic microphone) where the diaphragm acts as one plate of a two plates capacitor, and the vibrations changes the distance between plates, hence changing the capacitance. An electret microphone is a capacitor microphone based on a permanent charge of an electret or a polarized ferroelectric material. A dynamic microphone is based on electromagnetic induction, using a diaphragm attached to a small movable induction coil that is positioned in a magnetic field of a permanent magnet. The incident sound waves cause the diaphragm to vibrate, and the coil to move in the magnetic field, producing a current. Similarly, a ribbon microphone uses a thin, usually corrugated metal ribbon suspended in a magnetic field, and its vibration within the magnetic field generates the electrical signal. A loudspeaker is commonly constructed similar to a dynamic microphone, and thus may be used as a microphone as well. In a carbon microphone, the diaphragm vibrations apply varying pressure to a carbon, thus changing its electrical resistance. A piezoelectric microphone (a.k.a. crystal or piezo microphone) is based on the phenomenon of piezoelectricity in piezoelectric crystals such as potassium sodium tartrate. A microphone may be omnidirectional, unidirectional, bidirectional, or provide other directionality or polar patterns.

Noise-cancelling microphone. A noise-canceling microphone is a microphone that is designed to filter ambient noise from the desired sound, which is especially useful in noisy environments. The development is a special case of the differential microphone topology most commonly used to achieve directionality, and all such microphones have at least two ports through which sound enters; a front port normally oriented toward the desired sound and another port that's more distant. The microphone's diaphragm is placed between the two ports; sound arriving from an ambient sound field reaches both ports more or less equally. Sound that's much closer to the front port than to the rear will make more of a pressure gradient between the front and back of the diaphragm, causing it to move more. The microphone's proximity effect is adjusted so that flat frequency response is achieved for sound sources very close to the front of the mic—typically 1 to 3 cm. Sounds arriving from other angles are subject to steep midrange and bass rolloff.

Another technique uses two or more microphones and active or passive circuitry to reduce the noise. The primary microphone is closer to the desired source (like a person's mouth), while a second microphone receives ambient noise. In a noisy environment, both microphones receive noise at a similar level, but the primary mic receives the desired sounds more strongly. Thus if one signal is subtracted from the other (in the simplest sense, by connecting the microphones out of phase) much of the noise is canceled while the desired sound is retained. Other techniques may be used as well, such as using a directional primary mic, to maximize the difference between the two signals and make the cancellation easier to do. The internal electronic circuitry of an active noise-canceling mic attempts to subtract noise signal from the primary microphone. The circuit may employ passive or active noise canceling techniques to filter out the noise, producing an output signal that has a lower noise floor and a higher signal-to-noise ratio.

An improved noise canceling microphone including robust design features and advanced noise control and speech discrimination convergence characteristics is described in U.S. Pat. No. 7,248,708 to Vaudrey et al. entitled: "Noise canceling microphone", which is incorporated in its entirety for all purposes as if fully set forth herein. Two adaptive controllers are used to ensure robust performance in quickly changing acoustic environments ensuring an acceptable minimum performance characteristic. Additionally, a new real-time spectral estimation procedure is applied to a noise canceling communications microphone platform that permits continued and optimal adaptation of non-voice bandwidth frequencies during speech transients.

Certain embodiments of a noise-cancelling microphone with acoustically tuned ports are disclosed in U.S. Pat. No. 7,162,041 to Haapapuro et al. entitled: "Noise canceling microphone with acoustically tuned ports", which is incorporated in its entirety for all purposes as if fully set forth herein. The noise canceling microphone may comprise a housing, a transducer for converting received energy received into electrical signals, where the transducer is located in the housing, a front and rear sound pathways to a front and rear sound openings in the transducer, where the front and rear sound pathways may be located on opposite sides of the housing and may be displaced 180 degrees off a vertical axis. The noise canceling microphone may further comprising a boom for supporting the noise canceling microphone, where the boom may be deformed to place the noise canceling microphone near the mouth of the user. For example, the boom may be deformed to place the noise canceling microphone at least ten millimeters away from the edge of the mouth of the user.

Optical-based microphone. A fiber optic microphone converts acoustic waves into electrical signals by sensing changes in light intensity, instead of sensing changes in capacitance or magnetic fields as with conventional microphones. During operation, light from a laser source travels through an optical fiber to illuminate the surface of a reflective diaphragm. Sound vibrations of the diaphragm modulate the intensity of light reflecting off the diaphragm in a specific direction. The modulated light is then transmitted over a second optical fiber to a photo detector, which transforms the intensity-modulated light into analog or digital audio for transmission or recording. Fiber optic microphones possess high dynamic and frequency range, similar to the best high-fidelity conventional microphones. Fiber optic microphones do not react to or influence any electrical, magnetic, electrostatic or radioactive fields (this is called EMI/RFI immunity). The fiber optic microphone design is therefore ideal for use in areas where conventional microphones are ineffective or dangerous, such as inside industrial turbines or in Magnetic Resonance Imaging (MRI) equipment environments.

Fiber optic microphones are robust, resistant to environmental changes in heat and moisture, and can be produced for any directionality or impedance matching. The distance between the microphone's light source and its photo detector may be up to several kilometers without need for any preamplifier or other electrical device, making fiber optic microphones suitable for industrial and surveillance acoustic monitoring. Fiber optic microphones are used in very specific application areas such as for infrasound monitoring and noise-canceling. They have proven especially useful in medical applications, such as allowing radiologists, staff and patients within the powerful and noisy magnetic field to converse normally, inside the MRI suites as well as in remote control rooms. Other uses include industrial equipment monitoring and audio calibration and measurement, high-fidelity recording and law enforcement. An example of an optical microphone is IAS MO 2000 Set available from Sennheiser Electronic Corporation (Headquartered in Old Lyme, CT U.S.A.) and described in a Product Description entitled: "*MO* 20000 *Set and IAS MO* 2000 *Set*", which is incorporated in its entirety for all purposes as if fully set forth herein.

A head for an optical microphone/sensor is disclosed in U.S. Pat. No. 6,694,031 to Paritsky et al. entitled: "Optical Microphone/Sensors", which is incorporated in its entirety for all purposes as if fully set forth herein. The head including first and second light guides; the first light guide being coupled at an input end to a source of light and having an output end portion for transmitting light onto a membrane; the second light guide having an input end portion for receiving light reflected from the membrane and an output end coupled to a photodetector; the output end and input end portions each having an upper face and side surfaces and being disposed in close proximity to each other and optically separated along adjacent surfaces; characterized in that in order to utilize maximum light energy transmitted through the light guides by the light source, reflected by the membrane and received by the photodetector, at least one of the faces or surfaces is configured to extend along one or more planes which differ from the plane including the axes of the transmission of the light energy emitted from the light source and received by the photodetector.

A method of making optical transducers A head for an optical microphone/sensor is disclosed in U.S. Pat. No. 6,822,750 to Paritsky et al. entitled: "Optical Transducers and Methods of Making Same", which is incorporated in its entirety for all purposes as if fully set forth herein. The method involves producing an integrated structure including, in a rectangular matrix array, a plurality of discrete light sources, a plurality of discrete light detectors each laterally spaced from a light source, a light shield in the space between a light source and a light detector for shielding the light detector from direct exposure to the light source, and a transparent plastic potting material embedding the light sources, light detectors and light shield; and cutting the integrated structure, along lines of the matrix, into individual optical units, each including a light source, a light detector, a light shield therebetween all embedded in the transparent plastic potting material, and an optical window for outputting light from the light source and for transmitting to the light detector light reflected back from the light source. Also described are optical units of a structure facilitating mass production of such optical transducers and providing a sturdy construction permitting rough handling.

A small optical microphone/sensor for measuring distances to, and/or physical properties of, a reflective surface is disclosed in U.S. Pat. No. 6,462,808 to Paritsky et al. entitled: "Small Optical Microphone/Sensor", which is incorporated in its entirety for all purposes as if fully set forth herein. The small optical microphone/sensor comprising a source of light coupled to a light waveguide for transmitting a light beam through the waveguide; the waveguide having at one of its ends a pointed face with an angle determined by Snell's Law of Refraction wherein al is the angle of travel of the light beam through the waveguide media; $\alpha 2$ is the angle of travel of the light beam in a second media when exiting from the pointed face, and n1 and n2 are the light indices of the light waveguide media and the second media; the reflective surface being disposed at an optimal distance from the pointed face as determined by the angle $\alpha 2$; the waveguide having, at its outer surface, at least adjacent to the pointed face, means for preventing light waves impinging on the surface from being reflected back into the waveguide, and a light detector arranged to receive the light reflected from the surface.

An optical microphone for detecting an acoustic wave propagating in an ambient fluid is disclosed in U.S. Pat. No. 8,813,571 to Iwamoto et al. entitled: "Optical Microphone", which is incorporated in its entirety for all purposes as if fully set forth herein. The optical microphone including: a propagation medium section; a light source for emitting a light wave to be transmitted through a diffraction region in the propagation medium section; and a photoelectric conversion section for detecting the light wave having been transmitted through the propagation medium section. A first acoustic wave which is a portion of the acoustic wave and a second acoustic wave which is another portion thereof are allowed to propagate in the propagation medium section so as to simultaneously arrive at the diffraction region, and an interference component between a +1st order diffracted light wave and a −1st order diffracted light wave of the light wave generated based on a refractive index distribution of the propagation medium occurring in the diffraction region.

Sensors array. Multiple sensors may be used arranged as a sensor array (such as linear sensor array), for improving the sensitivity, accuracy, resolution, and other parameters of the sensed phenomenon. The sensor array may be directional, and better measure the parameters of the impinging signal to the array, such as the number, magnitudes, frequencies, Direction-Of-Arrival (DOA), distances, and speeds of the signals. The processing of the entire sensor array outputs, such as to obtain a single measurement or a single parameter, may be performed by a dedicated processor, which may be part of the sensor array assembly. The same component may serve both as a sensor and as actuator, such as during different times, and may be associated with the same or different phenomenon. A sensor operation may be based on an external or integral mechanism for generating a stimulus or an excitation to generate influence or create a phenomenon.

Microphone array. A microphone array is any number of microphones operating in tandem. There are many applications such as systems for extracting voice input from ambient noise (notably telephones, speech recognition systems, hearing aids), surround sound and related technologies, binaural recording, locating objects by sound: acoustic source localization, e.g., military use to locate the source(s) of artillery fire, aircraft location, and tracking, and high fidelity original recordings. Typically, an array is made up of omnidirectional microphones, directional microphones, or a mix of omnidirectional and directional microphones distributed about the perimeter of a space, linked to a computer that records and interprets the results into a coherent form. Arrays may also be formed using numbers of very closely spaced microphones. Given a fixed physical relationship in space between the different individual microphone transducer array elements, simultaneous DSP (digital signal processor) processing of the signals from each of the individual microphone array elements can create one or more "virtual" microphones. Different algorithms permit the creation of virtual microphones with extremely complex virtual polar patterns and even the possibility to steer the individual lobes of the virtual microphones patterns to home-in-on, or to reject, particular sources of sound.

In case the array consists of omnidirectional microphones they accept sound from all directions, so electrical signals of the microphones contain the information about the sounds coming from all directions. Joint processing of these sounds allow selecting the sound signal coming from the given direction. Hence, microphone array selects the sound coming from a given direction by processing multichannel signals. Using microphone arrays is described in an article by Rainer Zelinski (of the Deutsche Bundespost, Research Institute Berlin) published 1998 by IEEE (CH2561-9/88/0000-2578) entitled: "*A Microphone Array with Adaptive Post-Filtering for Noise Reduction in Reverberant Rooms*", and in a presentation by Sven Fischer et al. presented 2-6 Dec. 1996 at the 3rd Joint Meeting of the Acoustical Society of America and the Acoustical Society of Japan entitled: "*Adaptive Microphone Arrays for Speech Enhancement in Coherent and Incoherent Noise Fields*", which are both incorporated in their entirety for all purposes as if fully set forth herein.

Display. A display is used for presentation of visual data or information, commonly on a screen. A display is typically consists of an array of light emitters (typically in a matrix form), and commonly provides a visual depiction of a single, integrated, or organized set of information, such as text, graphics, image or video. A display may be a monochrome (a.k.a. black-and-white) type, which typically displays two colors, one for the background and one for the foreground. Old computer monitor displays commonly use black and white, green and black, or amber and black. A display may be a gray-scale type, which is capable of displaying different shades of gray, or may be a color type, capable of displaying multiple colors, anywhere from 16 to over many millions different colors, and may be based on Red, Green, and Blue (RGB) separate signals. A video display is designed for presenting video content. The screen is the actual location where the information is actually optically visualized by humans. The screen may be an integral part of the display.

Alternatively or in addition, the display may be an image or video projector, that projects an image (or a video consisting of moving images) onto a screen surface, which is a separate component and is not mechanically enclosed with the display housing. Most projectors create an image by shining a light through a small transparent image, but some newer types of projectors can project the image directly, by using lasers. A projector may be based on an Eidophor, Liquid Crystal on Silicon (LCoS or LCOS), or LCD, or may use Digital Light Processing (DLP™) technology, and may further be MEMS based. A virtual retinal display, or retinal projector, is a projector that projects an image directly on the retina instead of using an external projection screen.

Common display resolutions used today include SVGA (800×600 pixels), XGA (1024×768 pixels), 720p (1280×720 pixels), and 1080p (1920×1080 pixels). Standard-Definition (SD) standards, such as used in SD Television (SDTV), are referred to as 576i, derived from the European-developed PAL and SECAM systems with 576 interlaced lines of resolution; and 480i, based on the American National Television System Committee (ANTSC) NTSC system. High-Definition (H D) video refers to any video system of higher resolution than standard-definition (SD) video, and most commonly involves display resolutions of 1,280×720 pixels (720p) or 1,920×1,080 pixels (1080i/1080p). A display may be a 3D (3-Dimensions) display, which is the display device capable of conveying a stereoscopic perception of 3-D depth to the viewer. The basic technique is to present offset images that are displayed separately to the left and right eye. Both of these 2-D offset images are then combined in the brain to give the perception of 3-D depth. The display may present the information as scrolling, static, bold or flashing.

A display may be an analog display having an analog signal input. Analog displays are commonly using interfaces such as composite video such as NTSC, PAL or SECAM formats. Similarly, analog RGB, VGA (Video Graphics Array), SVGA (Super Video Graphics Array), SCART, S-video and other standard analog interfaces can be used. Alternatively or in addition, a display may be a digital display, having a digital input interface. Standard digital interfaces such as an IEEE1394 interface (a.k.a. FireWire™), may be used. Other digital interfaces that can be used are USB, SDI (Serial Digital Interface), HDMI (High-Definition Multimedia Interface), DVI (Digital Visual Interface), UDI (Unified Display Interface), DisplayPort, Digital Component Video and DVB (Digital Video Broadcast). In some cases, an adaptor is required in order to connect an analog display to the digital data. For example, the adaptor may convert between composite video (PAL, NTSC) or S-Video and DVI or HDTV signal. Various user controls can be available to allow the user to control and effect the display operations, such as an on/off switch, a reset button and others. Other exemplary controls involve display associated settings such as contrast, brightness and zoom.

A display may be a Cathode-Ray Tube (CRT) display, which is based on moving an electron beam back and forth across the back of the screen. Such a display commonly comprises a vacuum tube containing an electron gun (a source of electrons), and a fluorescent screen used to view images. It further has a means to accelerate and deflect the electron beam onto the fluorescent screen to create the images. Each time the beam makes a pass across the screen, it lights up phosphor dots on the inside of the glass tube, thereby illuminating the active portions of the screen. By drawing many such lines from the top to the bottom of the screen, it creates an entire image. A CRT display may be a shadow mask or an aperture grille type.

A display may be a Liquid Crystal Display (LCD) display, which utilize two sheets of polarizing material with a liquid crystal solution between them. An electric current passed through the liquid causes the crystals to align so that light cannot pass through them. Each crystal, therefore, is like a shutter, either allowing a backlit light to pass through or blocking the light. In monochrome LCD, images usually appear as blue or dark gray images on top of a grayish-white background. Color LCD displays commonly use passive matrix and Thin Film Transistor (TFT) (or active-matrix) for producing color. Recent passive-matrix displays are using new CSTN and DSTN technologies to produce sharp colors rivaling active-matrix displays.

Some LCD displays use Cold-Cathode Fluorescent Lamps (CCFLs) for backlight illumination. An LED-backlit LCD is a flat panel display that uses LED backlighting instead of the cold cathode fluorescent (CCFL) backlighting, allowing for a thinner panel, lower power consumption, better heat dissipation, a brighter display, and better contrast levels. Three forms of LED may be used: White edge-LEDs around the rim of the screen, using a special diffusion panel to spread the light evenly behind the screen (the most usual form currently), an array of LEDs arranged behind the screen whose brightness are not controlled individually, and a dynamic "local dimming" array of LEDs that are controlled individually or in clusters to achieve a modulated backlight light pattern. A Blue Phase Mode LCD is an LCD technology that uses highly twisted cholesteric phases in a blue phase, in order to improve the temporal response of liquid crystal displays (LCDs).

A Field Emission Display (FED) is a display technology that uses large-area field electron emission sources to provide the electrons that strike colored phosphor, to produce a color image as an electronic visual display. In a general sense, a FED consists of a matrix of cathode ray tubes, each tube producing a single sub-pixel, grouped in threes to form red-green-blue (RGB) pixels. FEDs combine the advantages of CRTs, namely their high contrast levels and very fast response times, with the packaging advantages of LCD and other flat panel technologies. They also offer the possibility of requiring less power, about half that of an LCD system. FED display operates like a conventional cathode ray tube (CRT) with an electron gun that uses high voltage (10 kV) to accelerate electrons which in turn excite the phosphors, but instead of a single electron gun, a FED display contains a grid of individual nanoscopic electron guns. A FED screen is constructed by laying down a series of metal stripes onto a glass plate to form a series of cathode lines.

A display may be an Organic Light-Emitting Diode (OLED) display, a display device that sandwiches carbon-based films between two charged electrodes, one a metallic cathode and one a transparent anode, usually being glass. The organic films consist of a hole-injection layer, a hole-transport layer, an emissive layer and an electron-transport layer. When voltage is applied to the OLED cell, the injected positive and negative charges recombine in the emissive layer and create electro luminescent light. Unlike LCDs, which require backlighting, OLED displays are emissive devices-they emit light rather than modulate transmitted or reflected light. There are two main families of OLEDs: those based on small molecules and those employing polymers. Adding mobile ions to an OLED creates a light-emitting electrochemical cell or LEC, which has a slightly different mode of operation. OLED displays can use either Passive-Matrix (PMOLED) or active-matrix addressing schemes. Active-Matrix OLEDs (AMOLED) require a thin-film transistor backplane to switch each individual pixel on or off, but allow for higher resolution and larger display sizes.

A display may be an Electroluminescent Displays (ELDs) type, which is a flat panel display created by sandwiching a layer of electroluminescent material such as GaAs between two layers of conductors. When current flows, the layer of material emits radiation in the form of visible light. Electroluminescence (EL) is an optical and electrical phenomenon where a material emits light in response to an electric current passed through it, or to a strong electric field.

A display may be based on an Electronic Paper Display (EPD) (a.k.a. e-paper and electronic ink) display technology which is designed to mimic the appearance of ordinary ink on paper. Unlike conventional backlit flat panel displays which emit light, electronic paper displays reflect light like ordinary paper. Many of the technologies can hold static text and images indefinitely without using electricity, while allowing images to be changed later. Flexible electronic paper uses plastic substrates and plastic electronics for the display backplane.

An EPD may be based on Gyricon technology, using polyethylene spheres between 75 and 106 micrometers across. Each sphere is a janus particle composed of negatively charged black plastic on one side and positively charged white plastic on the other (each bead is thus a dipole). The spheres are embedded in a transparent silicone sheet, with each sphere suspended in a bubble of oil so that they can rotate freely. The polarity of the voltage applied to each pair of electrodes then determines whether the white or black side is face-up, thus giving the pixel a white or black appearance. Alternatively or in addition, an EPD may be based on an electrophoretic display, where titanium dioxide (Titania) particles approximately one micrometer in diameter are dispersed in hydrocarbon oil. A dark-colored dye is also added to the oil, along with surfactants and charging agents that cause the particles to take on an electric charge. This mixture is placed between two parallel, conductive plates separated by a gap of 10 to 100 micrometers. When a voltage is applied across the two plates, the particles will migrate electrophoretically to the plate bearing the opposite charge from that on the particles.

Further, an EPD may be based on Electro-Wetting Display (EWD), which is based on controlling the shape of a confined water/oil interface by an applied voltage. With no voltage applied, the (colored) oil forms a flat film between the water and a hydrophobic (water-repellent) insulating coating of an electrode, resulting in a colored pixel. When a voltage is applied between the electrode and the water, it changes the interfacial tension between the water and the coating. As a result, the stacked state is no longer stable, causing the water to move the oil aside. Electrofluidic displays are a variation of an electrowetting display, involving the placing of aqueous pigment dispersion inside a tiny reservoir. Voltage is used to electromechanically pull the pigment out of the reservoir and spread it as a film directly behind the viewing substrate. As a result, the display takes on color and brightness similar to that of conventional pigments printed on paper. When voltage is removed liquid surface tension causes the pigment dispersion to rapidly recoil into the reservoir.

A display may be a Vacuum Fluorescent Display (VFD) that emits a very bright light with high contrast and can support display elements of various colors. VFDs can display seven-segment numerals, multi-segment alphanumeric characters or can be made in a dot-matrix to display different alphanumeric characters and symbols.

A display may be a laser video display or a laser video projector. A Laser display requires lasers in three distinct wavelengths—red, green, and blue. Frequency doubling can be used to provide the green wavelengths, and a small semiconductor laser such as Vertical-External-Cavity Surface-Emitting-Laser (VECSEL) or a Vertical-Cavity Surface-Emitting Laser (VCSEL) may be used. Several types of lasers can be used as the frequency doubled sources: fiber lasers, inter cavity doubled lasers, external cavity doubled lasers, eVCSELs, and OPSLs (Optically Pumped Semiconductor Lasers). Among the inter-cavity doubled lasers VCSELs have shown much promise and potential to be the basis for a mass-produced frequency doubled laser. A VECSEL is a vertical cavity, and is composed of two mirrors. On top of one of them is a diode as the active medium. These lasers combine high overall efficiency with good beam quality. The light from the high-power IR-laser diodes is converted into visible light by means of extra-cavity waveguided second harmonic generation. Laser-pulses with about 10 KHz repetition rate and various lengths are sent to a Digital Micromirror Device where each mirror directs the pulse either onto the screen or into the dump.

A display may be a segment display, such as a numerical or an alphanumerical display that can show only digits or alphanumeric characters, commonly composed of several segments that switch on and off to give the appearance of desired glyph, The segments are usually single LEDs or liquid crystals, and may further display visual display material beyond words and characters, such as arrows, symbols, ASCII and non-ASCII characters. Non-limiting examples are Seven-segment display (digits only), Fourteen-segment display, and Sixteen-segment display. A display may be a dot matrix display, used to display information on machines, clocks, railway departure indicators and many other devices requiring a simple display device of limited resolution. The display consists of a matrix of lights or mechanical indicators arranged in a rectangular configuration (other shapes are also possible, although not common) such that by switching on or off selected lights, text or graphics can be displayed. A dot matrix controller converts instructions from a processor into signals which turns on or off the lights in the matrix so that the required display is produced.

Sounder. A sounder converts electrical energy to sound waves transmitted through the air, an elastic solid material, or a liquid, usually by means of a vibrating or moving ribbon or diaphragm. The sound may be audio or audible, having frequencies in the approximate range of 20 to 20,000 hertz, capable of being detected by human organs of hearing. Alternatively or in addition, the sounder may be used to emit inaudible frequencies, such as ultrasonic (a.k.a. ultrasound) acoustic frequencies that are above the range audible to the human ear, or above approximately 20,000 Hz. A sounder may be omnidirectional, unidirectional, bidirectional, or provide other directionality or polar patterns.

A loudspeaker (a.k.a. speaker) is a sounder that produces sound in response to an electrical audio signal input, typically audible sound. The most common form of loudspeaker is the electromagnetic (or dynamic) type, uses a paper cone supporting a moving voice coil electromagnet acting on a permanent magnet. Where accurate reproduction of sound is required, multiple loudspeakers may be used, each reproducing a part of the audible frequency range. A loudspeaker is commonly optimized for middle frequencies; tweeters for high frequencies; and sometimes supertweeter is used which is optimized for the highest audible frequencies.

A loudspeaker may be a piezo (or piezoelectric) speaker contains a piezoelectric crystal coupled to a mechanical diaphragm and is based on the piezoelectric effect. An audio signal is applied to the crystal, which responds by flexing in proportion to the voltage applied across the crystal surfaces, thus converting electrical energy into mechanical. Piezoelectric speakers are frequently used as beepers in watches and other electronic devices, and are sometimes used as tweeters in less-expensive speaker systems, such as computer speakers and portable radios. A loudspeaker may be a magnetostrictive transducers, based on magnetostriction, have been predominantly used as sonar ultrasonic sound wave radiators, but their usage has spread also to audio speaker systems.

A loudspeaker may be an Electro-Static Loudspeaker (ESL), in which sound is generated by the force exerted on a membrane suspended in an electrostatic field. Such speakers use a thin flat diaphragm usually consisting of a plastic sheet coated with a conductive material such as graphite sandwiched between two electrically conductive grids, with a small air gap between the diaphragm and grids. The diaphragm is usually made from a polyester film (thickness 2-20 μm) with exceptional mechanical properties, such as PET film. By means of the conductive coating and an external high voltage supply the diaphragm is held at a DC potential of several kilovolts with respect to the grids. The grids are driven by the audio signal; and the front and rear grids are driven in antiphase. As a result, a uniform electrostatic field proportional to the audio signal is produced between both grids. This causes a force to be exerted on the charged diaphragm, and its resulting movement drives the air on either side of it.

A loudspeaker may be a magnetic loudspeaker, and may be a ribbon or planar type, is based on a magnetic field. A ribbon speaker consists of a thin metal-film ribbon suspended in a magnetic field. The electrical signal is applied to the ribbon, which moves with it to create the sound. Planar magnetic speakers are speakers with roughly rectangular flat surfaces that radiate in a bipolar (i.e., front and back) manner, and may be having printed or embedded conductors on a flat diaphragm. Planar magnetic speakers consist of a flexible membrane with a voice coil printed or mounted on it. The current flowing through the coil interacts with the magnetic field of carefully placed magnets on either side of the diaphragm, causing the membrane to vibrate more uniformly and without much bending or wrinkling. A loudspeaker may be a bending wave loudspeaker, which uses a diaphragm that is intentionally flexible.

A sounder may an electromechanical type, such as an electric bell, which may be based on an electromagnet, causing a metal ball to clap on cup or half-sphere bell. A sounder may be a buzzer (or beeper), a chime, a whistle or a ringer. Buzzers may be either electromechanical or ceramic-based piezoelectric sounders which make a high-pitch noise, and may be used for alerting. The sounder may emit a single or multiple tones, and can be in continuous or intermittent operation.

In one example, the sounder is used to play a stored digital audio. The digital audio content can be stored in the sounder, the actuator unit, the router, the control server, or any combination thereof. Further, few files may be stored (e.g., representing different announcements or songs), selected by the control logic. Alternatively or in addition, the digital audio data may be received by the sounder, the actuator unit, the router, the control server, or any combination thereof, from external sources via the above networks. Furthermore, the source of the digital audio may a microphone serving as a sensor, either after processing, storing, delaying, or any other manipulation, or as originally received resulting 'door-phone' or 'intercom' functionality between a microphone and a sounder in the building.

In another example, the sounder simulates the voice of a human being or generates music, typically by using an electronic circuit having a memory for storing the sounds (e.g., music, song, voice message, etc.), a digital to analog converter to reconstruct the electrical representation of the sound, and a driver for driving a loudspeaker, which is an electro-acoustic transducer that converts an electrical signal to sound. An example of a greeting card providing music and mechanical movement is disclosed in U.S. Patent Application No. 2007/0256337 to Segan entitled: "User Interactive Greeting Card", which is incorporated in its entirety for all purposes as if fully set forth herein.

It is noted that the expression "sound information" or "sound" as used herein may refer to acoustic wave energy produced when playing an instrument and/or singing. Some systems and methods may also operate in static mode, in which no BGM music is played, and the user plays the notes at his own pace. In some embodiments, a cursor may be displayed, which advances in accordance with the user's playing or with the expected pace.

In one example, the system is used for sound or music generation. For example, the sound produced can emulate the sounds of a conventional acoustical music instrument, such as a piano, tuba, harp, violin, flute, guitar and so forth. In one example, the sounder is an audible signaling device, emitting audible sounds that can be heard (having frequency components in the 20-20,000 Hz band). In one example the sound generated is music or song. The elements of the music such as pitch (which governs melody and harmony), rhythm (and its associated concepts tempo, meter, and articulation), dynamics, and the sonic qualities of timbre and texture, may be associated with the shape theme. For example, if a musical instrument shown in the picture, the music generated by that instrument will be played, e.g., drumming sound of drums and playing of a flute or guitar. In one example, a talking human voice is played by the sounder. The sound may be a syllable, a word, a phrase, a sentence, a short story or a long story, and can be based on speech synthesis or pre-recorded. Male or female voice can be used, further being young or old.

Some examples of toys that include generation of an audio signal such as music are disclosed in U.S. Pat. No. 4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al., entitled: "Electronic Instructional Apparatus", in U.S. Pat. No. 4,248,123 to Bunger et al., entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein. A music toy kit combining music toy instrument with a set of construction toy blocks is disclosed in U.S. Pat. No. 6,132,281 to Klitsner et al. entitled: "Music Toy Kit" and in U.S. Pat. No. 5,349,129 to Wisniewski et al. entitled: "Electronic Sound Generating Toy", which are incorporated in their entirety for all purposes as if fully set forth herein.

A speech synthesizer used to produce natural and intelligible artificial human speech may be implemented in hardware, in software, or combination thereof. A speech synthesizer may be Text-To-Speech (TTS) based, that converts normal language text to speech, or alternatively (or in addition) may be based on rendering symbolic linguistic representation like phonetic transcription. A TTS typically involves two steps, the front-end where the raw input text is pre-processed to fully write-out words replacing numbers and abbreviations, followed by assigning phonetic transcriptions to each word (text-to-phoneme), and the back-end (or synthesizer) where the symbolic linguistic representation is converted to output sound.

The generating of synthetic speech waveform typically uses a concatenative or formant synthesis. The concatenative synthesis commonly produces the most natural-sounding synthesized speech, and is based on the concatenation (or stringing together) of segments of recorded speech. There are three main types of concatenative synthesis: Unit selection, diphone synthesis, and domain-specific synthesis. Unit selection synthesis is based on large databases of recorded speech including individual phones, diphones, half-phones, syllables, morphemes, words, phrases, and sentences, indexed based on the segmentation and acoustic parameters like the fundamental frequency (pitch), duration, position in the syllable, and neighboring phones. At run time, the desired target utterance is created by determining (typically using a specially weighted decision tree) the best chain of candidate units from the database (unit selection). Diphone synthesis uses a minimal speech database containing all the diphones (sound-to-sound transitions) occurring in a language, and at runtime, the target prosody of a sentence is superimposed on these minimal units by means of digital signal processing techniques such as linear predictive coding. Domain-specific synthesis is used where the output is limited to a particular domain, using concatenates prerecorded words and phrases to create complete utterances. In formant synthesis the synthesized speech output is created using additive synthesis and an acoustic model (physical modeling synthesis), rather than on using human speech samples. Parameters such as fundamental frequency, voicing, and noise levels are varied over time to create a waveform of artificial speech. The synthesis may further be based on articulatory synthesis where computational techniques for synthesizing speech are based on models of the human vocal tract and the articulation processes occurring there, or may be HMM-based synthesis which is based on hidden Markov models, where the frequency spectrum (vocal tract), fundamental frequency (vocal source), and duration (prosody) of speech are modeled simultaneously by HMMs and generated based on the maximum likelihood criterion. The speech synthesizer may further be based on the book entitled: "Development in Speech Synthesis", by Mark Tatham and Katherine Morton, published 2005 by John Wiley & Sons Ltd., ISBN: 0-470-85538-X, and on the book entitled: "*Speech Synthesis and Recognition*" by John Holmes and Wendy Holmes, $2^{nd}$ Edition, published 2001 ISBN: 0-7484-0856-8, which are both incorporated in their entirety for all purposes as if fully set forth herein.

Haptic. Haptic technology, also known as kinaesthetic communication or 3D touch, refers to any technology that can create an experience of touch by applying forces, vibrations, or motions to the user. These technologies can be used to create virtual objects in a computer simulation, to control virtual objects, and to enhance remote control of machines and devices. Haptic devices may incorporate tactile sensors that measure forces exerted by the user on the interface, and simple haptic devices are common in the form of game controllers, joysticks, and steering wheels. Haptic technology facilitates investigation of how the human sense of touch works by allowing the creation of controlled haptic virtual objects. In general, three sensory systems related to sense of touch in humans are distinguished: cutaneous, kinaesthetic, and haptic.

The majority of electronics offering haptic feedback use vibrations, and most use a type of Eccentric Rotating Mass (ERM) actuator, consisting of an unbalanced weight attached to a motor shaft. As the shaft rotates, the spinning of this irregular mass causes the actuator and the attached device to shake. Some devices accomplish their vibrations with a Linear Resonant Actuator (LRA), which moves a mass in a reciprocal manner by means of a magnetic voice coil, similar to how AC electrical signals are translated into motion in the cone of a loudspeaker. LRAs are capable of quicker response times than ERMs, and thus can transmit more accurate haptic imagery. Piezoelectric actuators are also employed to produce vibrations, and offer even more precise motion than LRAs, with less noise and in a smaller platform, but require higher voltages than do ERMs and LRAs.

Some devices use motors to manipulate the movement of an item held by the user. A common use is in automobile driving video games and simulators, which turn the steering wheel to simulate forces experienced when cornering a real vehicle. Air vortex rings are donut-shaped air pockets made up of concentrated gusts of air. Focused air vortices can have the force to blow out a candle or disturb papers from a few yards away. Focused ultrasound beams can be used to create a localized sense of pressure on a finger without touching any physical object. The focal point that creates the sensation of pressure is generated by individually controlling the phase and intensity of each transducer in an array of ultrasound transducers. These beams can also be used to deliver sensations of vibration, and to give users the ability to feel virtual 3D objects.

Haptic rendering is described in a paper entitled: "*Introduction to Haptic Rendering*" by Miguel A. Otaduy and Ming C. Lin, published July 2005 [DOI: 10.1145/1198555.1198603], which is incorporated in its entirety for all purposes as if fully set forth herein. The term haptic the adjective used to describe something relating to or based on the sense of touch. Haptic is to touching as visual is to seeing and as auditory is to hearing. Typically, touch is one of the main avenues of sensation, and it can be divided into cutaneous, kinesthetic, and haptic systems, based on the underlying neural inputs. The cutaneous system employs receptors embedded in the skin, while the kinesthetic system employs receptors located in muscles, tendons, and joints. The haptic sensory system employs both cutaneous and kinesthetic receptors, but it differs in the sense that it is associated with an active procedure. Touch becomes active when the sensory inputs are combined with controlled body motion. For example, cutaneous touch becomes active when we explore a surface or grasp an object, while kinesthetic touch becomes active when we manipulate an object and touch other objects with it. Haptic rendering is defined as the process of computing and generating forces in response to user interactions with virtual objects. Several haptic rendering algorithms consider the paradigm of touching virtual objects with a single contact point. Rendering algorithms that follow this description are called 3-DoF haptic rendering algorithms, because a point in 3D has only three DoFs. Other haptic rendering algorithms deal with the problem of rendering the forces and torques arising from the interaction of two virtual objects. This problem is called 6-DoF haptic rendering, because the grasped object has six DoFs (position and orientation in 3D), and the haptic feedback comprises 3D force and torque. When we eat with a fork, write with a pen, or open a lock with a key, we are moving an object in 3D, and we feel the interaction with other objects. This is, in essence, 6-DoF object manipulation with force-and-torque feedback.

Characteristics of kinesthetic systems including their main function, historical evolution, commonly used technologies for construction and specific cases, and an analogical development of tactile systems, are described in an article entitled: "*HAPTIC INTERFACES: KINESTHETIC VS. TACTILE SYSTEMS*" by Zasúlich Pérez Ariza and Mauricio Santis-Chaves published 2016 [DOI: https://doi.org/10.24050/reia.v13i26.1065] in EIA, ISSN 1794-1237/Year XIII/Volume 13/Issue N.26/July-December 2016, which is incorporated in its entirety for all purposes as if fully set forth herein.

FFT. A Fast Fourier Transform (FFT) algorithm computes the discrete Fourier transform (DFT) of a sequence, or the inverse. Fourier analysis converts a signal from its original domain (often time or space) to a representation in the frequency domain and vice versa. An FFT rapidly computes such transformations by factorizing the DFT matrix into a product of sparse (mostly zero) factors. The DFT is obtained by decomposing a sequence of values into components of different frequencies. This operation is useful in many fields (see discrete Fourier transform for properties and applications of the transform) but computing it directly from the definition is often too slow to be practical. An FFT is a way to compute the same result more quickly: computing the DFT of N points in the naive way, using the definition, takes O(N2) arithmetical operations, while an FFT can compute the same DFT in only O(N log N) operations. The difference in speed can be enormous, especially for long data sets where N may be in the thousands or millions. In practice, the computation time can be reduced by several orders of magnitude in such cases, and the improvement is roughly proportional to N/log N. This huge improvement made the calculation of the DFT practical; FFTs are of great importance to a wide variety of applications, from digital signal processing and solving partial differential equations to algorithms for quick multiplication of large integers.

By far the most commonly used FFT is the Cooley-Tukey algorithm. This is a divide and conquer algorithm that recursively breaks down a DFT of any composite size N=N1N2 into many smaller DFTs of sizes N1 and N2, along with O(N) multiplications by complex roots of unity traditionally called twiddle factors. The best known use of the Cooley-Tukey algorithm is to divide the transform into two pieces of size N/2 at each step, and is therefore limited to power-of-two sizes, but any factorization can be used in general (as was known to both Gauss and Cooley/Tukey). These are called the radix-2 and mixed-radix cases, respectively (and other variants such as the split-radix FFT have their own names as well). Although the basic idea is recursive, most traditional implementations rearrange the algorithm to avoid explicit recursion. In addition, because the Cooley-Tukey algorithm breaks the DFT into smaller DFTs, it can be combined arbitrarily with any other algorithm for the DFT, such as those described below. FFT is described in an article by Paul Heckbert dated February 1995 (Revised 27 Jan. 1998) [Notes 3, Computer Graphics 2, 15-463] entitled: "*Fourier Transforms and the Fast Fourier Transform* (*FFT*) *Algorithm*", and in Freescale Semiconductor, Inc. Application Note, Document Number AN4255 Rev. 4, July 2015, entitled: "*FFT-Based Algorithm for Metering Applications*", which are both incorporated in their entirety for all purposes as if fully set forth herein.

Wearable. As used herein, the term "wearable device" (or "wearable") includes a body-borne device (or item) designed or intended to be worn by a human. Such devices are typically comfortably worn on, and are carried or transported by, the human body, and are commonly used to create constant, convenient, seamless, portable, and mostly hands-free access to electronics and computers. The wearable devices may be in direct contact with the human body (such as by touching, or attaching to, the body skin), or may be releasably attachable to clothes or other items intended or designed to be worn on the human body. In general, the goal of wearable technologies is to smoothly incorporate functional, portable electronics and computers into individuals' daily lives. Wearable devices may be releasably attached to the human body using attaching means such as straps, buckles, belts, or clasps. Alternatively or in addition, wearable devices may be shaped, structured, or having a form factor to be body releasably mountable or attachable, such as using eye-glass frames or headphones. Further, wearable devices may be worn under, with, or on top of, clothing.

Wearable devices may interact as sensors or actuators with an organ or part of the human body, such as a head mounted wearable device may include a screen suspended in front of a user's eye, without providing any aid to the user's vision. Examples of wearable devices include watches, glasses, contact lenses, pedometers, chest straps, wristbands, head bands, arm bands, belt, head wear, hats, glasses, watches, sneakers, clothing, pads, e-textiles and smart fabrics, headbands, beanies, and caps, as well as jewelry such as rings, bracelets, and hearing aid-like devices that are designed to look like earrings. A wearable device may be structured, designed, or have a form factor that is identical to, substantially similar to, or is at least in part substitute to, a traditional wearable item.

A wearable device may be a headwear that may be structured, designed, or have a form factor that is identical to, substantially similar to, or is at least in part substitute to, any headwear item. The headwear may be attached to, or be in contact with, a head part, such as a face, nose, right nostril, left nostril, right cheek, left cheek, right eye, left eye, right ear, or left ear, nose, mouth, lip, forehead, or chin. A wearable device may be structured, designed, or have a form factor that is identical to, substantially similar to, or is at least in part substitute to, a bonnet, a cap, a crown, a fillet, a hair cover, a hat, a helmet, a hood, a mask, a turban, a veil, or a wig.

A headwear device may be an eyewear that may be structured, designed, or have a form factor that is identical to, substantially similar to, or is at least in part substitute to, any eyewear item, such as glasses, sunglasses, a contact lens, a blindfold, or a goggle. A headwear device may be an earpiece that may be structured, designed, or have a form factor that is identical to, substantially similar to, or is at least in part substitute to, any earpiece item, such as a hearing aid, a headphone, a headset, or an earplug.

A wearable device may be releasably or permanently attach to, or be part of, a clothing article such as a tie, sweater, jacket, or hat. The attachment may use taping, gluing, pinning, enclosing, encapsulating, or any other method of attachment or integration known in the art. Furthermore, in some embodiments, there may be an attachment element such as a pin or a latch and hook system, of portion thereof (with the complementary element on the item to which it is to be affixed) or clip. In a non-limiting example, the attachment element has a clip-like design to allow attachment to pockets, belts, watches, bracelets, broaches, rings, shoes, hats, bike handles, necklaces, ties, spectacles, collars, socks, bags, purses, wallets, or cords.

A wearable device may be releasably or permanently attach to, or be part of, a top underwear such as a bra, camisole, or undershirt, a bottom underwear such as a diaper, panties, plastic pants, slip, thong, underpants, boxer briefs, boxer shorts, or briefs, or a full-body underwear such as bodysuit, long underwear, playsuit, or teddy. Similarly, a wearable device may be releasably or permanently attach to, or be part of, a headwear such as a Baseball cap, Beret, Cap, Fedora, hat, helmet, hood, knit cap, toque, turban, or veil. Similarly, a wearable device may be releasably or permanently attach to, or be part of, a footwear such as an athletic shoe, boot, court shoe, dress shoe, flip-flops, hosiery, sandal, shoe, spats, slipper, sock, or stocking. Further, a wearable device may be releasably or permanently attach to, or be part of, an accessory such as a bandana, belt, bow tie, coin purse, cufflink, cummerbund, gaiters, glasses, gloves, headband, handbag, handkerchief, jewellery, muff, necktie, pocket protector, pocketwatch, sash, scarf, sunglasses, suspenders, umbrella, wallet, or wristwatch.

A wearable device may be releasably or permanently attach to, or be part of, an outwear such as an apron, blazer, British warm, cagoule, cape, chesterfield, coat, covert coat, cut-off, duffle coat, flight jacket, gilet, goggle jacket, guards coat, Harrington jacket, hoodie, jacket, leather jacket, mess jacket, opera coat, overcoat, parka, paletot, pea coat, poncho, raincoat, robe, safari jacket, shawl, shrug, ski suit, sleeved blanket, smoking jacket, sport coat, trench coat, ulster coat, waistcoat, or windbreaker. Similarly, a wearable device may be releasably or permanently attach to, or be part of, a suit (or uniform) such as an academic dress, ball dress, black tie, boilersuit, cleanroom suit, clerical clothing, court dress, gymslip, jumpsuit, kasaya, lab coat, military uniform, morning dress, onesie, pantsuit, red sea rig, romper suit, school uniform, scrubs, stroller, tuxedo, or white tie. Further, a wearable device may be releasably or permanently attach to, or be part of, a dress such as a ball gown, bouffant gown, coatdress, cocktail dress, debutante dress, formal wear, frock, evening gown, gown, house dress, jumper, little black dress, princess line, sheath dress, shirtdress, slip dress, strapless dress, sundress, wedding dress, or wrap dress. Furthermore, a wearable device may be releasably or permanently attach to, or be part of, a skirt such as an A-line skirt, ballerina skirt, denim skirt, men's skirts, miniskirt, pencil skirt, prairie skirt, rah-rah skirt, sarong, Skort, tutu, or wrap. In one example, a wearable device may be releasably or permanently attach to, or be part of, a trousers (or shorts) such as bell-bottoms, bermuda shorts, bondage pants, capri pants, cargo pants, chaps, cycling shorts, dress pants, high water pants, lowrise pants, Jeans, jodhpurs, leggings, overall, Palazzo pants, parachute pants, pedal pushers, phat pants, shorts, slim-fit pants, sweatpants, windpants, or yoga pants. In one example, a wearable device may be releasably or permanently attach to, or be part of, a top such as a blouse, crop top, dress shirt, guayabera, guernsey, halterneck, henley shirt, hoodie, jersey, polo shirt, shirt, sleeveless shirt, sweater, sweater vest, t-shirt, tube top, turtleneck, or twinset.

A wearable device may be structured, designed, or have a form factor that is identical to, substantially similar to, or is at least in part substitute to, a fashion accessory. These accessories may be purely decorative, or have a utility beyond aesthetics. Examples of these accessories include, but are not limited to, rings, bracelets, necklaces, watches, watch bands, purses, wallets, earrings, body rings, headbands, glasses, belts, ties, tie bars, tie tacks, wallets, shoes, pendants, charms and bobbles. For example, wearable devices may also be incorporated into pockets, steering wheels, keyboards, pens, and bicycle handles.

In one example, the wearable device may be shaped as, or integrated with, a device that includes an annular member defining an aperture therethrough that is sized for receipt therein of a human body part. The body part may be part of a human hand such as upper arm, elbow, forearm, wrist (such as a wrist-band), or a finger (such as a ring). Alternatively or in addition, the body part may be part of a human head or neck, such as a forehead, ear, skull, or face. Alternatively or in addition, the body part may be part of a human thorax or abdomen, such as waist or hip. Alternatively or in addition, the body part may be part of a human leg or foot, such as thigh, calf, ankle, instep, knee, or toe.

In one example, the wearable device may be shaped as, or integrated with, a ring. The ring may comprise, consist essentially of or consist of a shank, which is the location that provides an opening for a finger, and a head, which comprises, consists essentially or consists of ornamental features of the ring and in some embodiments houses the signaling assembly of the present device. The head may be of any shape, e.g., a regular sphere, truncated sphere, cube, rectangular prism, cylinder, triangular prism, cone, pyramid, barrel, truncated cone, domed cylinder, truncated cylinder, ellipsoid, regular polygon prism or truncated three-dimensional polygon of e.g., 4-16 sides, such as a truncated pyramid (trapezoid), or combination thereof or it may be an irregular shape. Further, the head may comprise an upper face that contains and is configured to show one or more jewels and/or ornamental designs.

A mobile communication device configured to be worn on an index finger of a user's hand is described in U.S. Patent Application Publication No. 2015/0373443 to Carroll entitled: "Finger-wearable mobile communication device", which is incorporated in its entirety for all purposes as if fully set forth herein. The device includes a case, a microphone, a switch, and a power source. The microphone and the switch are strategically located along a shape of the case so that as worn on the user's index finger and when the switch is activated by the thumb of the user's hand, the hand naturally cups about the microphone to form a barrier to ambient noise. Further, the microphone can readily be located near a corner of the user's mouth for optimal speech-receiving conditions and to provide more private audio input.

A user controls an external electronic device with a finger-ring-mounted touchscreen is described in U.S. Patent Application Publication No. 2015/0277559 to Vescovi et al. entitled: "Devices and Methods for a Ring Computing Device", which is incorporated in its entirety for all purposes as if fully set forth herein. The device includes a computer processor, wireless transceiver, and rechargeable power source; the ring is worn on a first finger receives an input from a second finger, selects one of a plurality of touch events associated with the input, and wirelessly transmits a command associated with the touch event to the external electronic device.

A mobile communication device that comprises a fashion accessory and a signaling assembly is described in U.S. Patent Application Publication No. 2015/0349556 to Mercando et al. entitled: "Mobile Communication Devices", which is incorporated in its entirety for all purposes as if fully set forth herein. The signaling assembly may be configured to provide sensory stimuli such as a flashing LED light and a vibration. These stimuli may vary depending on the signal received from a remote communication device or from gestures made by a user or from information stored in the mobile communication device.

A wearable fitness-monitoring device is described in U.S. Pat. No. 8,948,832 to Hong et al. entitled: "Wearable Heart Rate Monitor", which is incorporated in its entirety for all purposes as if fully set forth herein. The device including a motion sensor and a photoplethysmographic (PPG) sensor. The PPG sensor includes (i) a periodic light source, (ii) a photo detector, and (iii) circuitry determining a user's heart rate from an output of the photo detector. Some embodiments provide methods for operating a heart rate monitor of a wearable fitness-monitoring device to measure one or more characteristics of a heartbeat waveform. Some embodiments provide methods for operating the wearable fitness monitoring device in a low power state when the device determines that the device is not worn by a user. Some embodiments provide methods for operating the wearable fitness-monitoring device in a normal power state when the device determines that the device is worn by a user.

A wearable device and method for processing mages to prolong battery life are described in U.S. Pat. No. 8,957,988 to Wexler et al. entitled: "Apparatus for processing images to prolong battery life", which is incorporated in its entirety for all purposes as if fully set forth herein. In one implementation, a wearable apparatus may include a wearable image sensor configured to capture a plurality of images from an environment of a user. The wearable apparatus may also include at least one processing device configured to, in a first processing-mode, process representations of the plurality of images to determine a value of at least one capturing parameter for use in capturing at least one subsequent image, and in a second processing-mode, process the representations of the plurality of images to extract information. In addition, the at least one processing device may operate in the first processing-mode when the wearable apparatus is powered by a mobile power source included in the wearable apparatus and may operate in the second processing-mode when the wearable apparatus is powered by an external power source.

A wearable device may be used for notifying a person, such as by using tactile, visual, or audible stimulus, as described for example in U.S. Patent Application No. 2015/0341901 to RYU et al. entitled: "Method and apparatus for providing notification", which is incorporated in its entirety for all purposes as if fully set forth herein, describing an electronic device that includes: a transceiver configured to communicate with at least one wearable device and receive, from the at least one wearable device, status information indicating whether the at least one wearable device is currently being worn; and a processor configured to determine whether to send a notification request to the at least one wearable device based on the status information received by the transceiver.

A communication device, system and method are described for example in U.S. Patent Application No. 2007/

0052672 to Ritter et al. entitled: "Communication device, system and method", which is incorporated in its entirety for all purposes as if fully set forth herein. It is discloses comprising a Virtual Retinal Display (VRD) in form of glasses (1), at least one haptic sensor (12) mounted on the frame of said glasses or connected by a short range communication interface (13) to said glasses (1), wherein it is possible to navigate by means of a cursor through an image displayed by the Virtual Retinal Display (VRD) with the at least one haptic sensor (12). A central control unit controls (11) the Virtual Retinal Display (VRD) and the at least one haptic sensor (12). When the Virtual Retinal Display (VRD) is connected to an external device (2, 9) by a short range communication interface (13), the user can navigate through the content of the external device (2, 9) by easy use of the haptic sensor (12).

Wearable communication devices, e.g. implemented in a watch, using short range communication to a cell phone, and facilitating natural and intuitive user interface with low-power implementation are described for example in U.S. Patent Application No. 2014/0045547 to Singamsetty et al. entitled: "Wearable Communication Device and User Interface", which is incorporated in its entirety for all purposes as if fully set forth herein. The devices allow a user to easily access all features of the phone, all while a phone is nearby but not visible. Notification is performed with vibration, an LED light and OLED text display of incoming calls, texts, and calendar events. It allows communicating hands-free. This allows using the communication device as "remote control" for home devices, etc. via voice and buttons. The device comprises interfaces motion sensors such as accelerometers, magnetometer and gyroscope, infrared proximity sensors, vibrator motor, and/or voice recognition. Low power consumption is achieved by dynamical configuration of sensor parameters to support only the necessary sensor functions at any given state of the device.

A wearable electronic device that is configured to control and command a variety of wireless devices within its proximity is described in U.S. Pat. No. 7,605,714 to Thompson et al. entitled: "System and method for command and control of wireless devices using a wearable device", which is incorporated in its entirety for all purposes as if fully set forth herein. The wearable device dynamically generates a user interface corresponding to the services of a particular wireless device. Through the user interface, the wireless device surface content to a user and allows a user select interactions with the wireless devices using the wearable device.

An apparatus and method for the remote control and/or interaction—with electronic-devices such as computers; home-entertainment-systems; media-centers; televisions; DVD-players; VCR-players; music systems; appliances; security systems; toys/games; and/or displays are described in U.S. Pat. No. 8,508,472 to Wieder entitled: "Wearable remote control with a single control button", which is incorporated in its entirety for all purposes as if fully set forth herein. A user may orient a pointer (e.g., laser pointer) to place a pointer-spot on/near object(s) on an active-display(s); and/or a fixed-display(s); and/or on real-world object(s) within a display region or pointer-spot detection-region. Detectors, imager(s) and/or camera(s) may be connected/attached to the display region and/or a structure that is connected/attached to display region. When the user initiates a "select", the detectors/cameras may detect the location of the pointer-spot within the display region. Corresponding to the user's selection(s); control action(s) may be performed on the device(s) being controlled/interacted—with and additional selection-menus may be optionally presented on an active-display.

A hand-worn controller consisting of a housing having a central opening sized to permit the controller to be worn as ring on the index finger of a human hand is described in U.S. Patent Application Publication No. 2006/0164383 to Machin et al. entitled: "Remote controller ring for user interaction", which is incorporated in its entirety for all purposes as if fully set forth herein. A joystick lever projects outwardly from said housing and is positioned to be manipulated by the user's thumb. The joystick operates on or more control devices, such as switches or potentiometers, that produce control signals. A wireless communications device, such as a Bluetooth module, mounted in said housing transmits command signals to a remote utilization device, which are indicative of the motion or position of said joystick lever.

A wearable augmented reality computing apparatus with a display screen, a reflective device, a computing device and a head mounted harness to contain these components is described in U.S. Patent Application Publication No. 2012/0050144 to Morlock entitled: "Wearable augmented reality computing apparatus", which is incorporated in its entirety for all purposes as if fully set forth herein. The display device and reflective device are configured such that a user can see the reflection from the display device superimposed on the view of reality. An embodiment uses a switchable mirror as the reflective device. One usage of the apparatus is for vehicle or pedestrian navigation. The portable display and general purpose computing device can be combined in a device such as a smartphone. Additional components consist of orientation sensors and non-handheld input devices.

In one example, a wearable device may use, or may be based on, a processor or a microcontroller that is designed for wearable applications, such as the CC2650 SimpleLink™ Multistandard Wireless MCU available from Texas Instruments Incorporated (headquartered in Dallas, Texas, U.S.A.) and described in a Texas Instrument 2015 publication #SWRT022 entitled: "*SimpleLink™ Ultra-Low Power—Wireless Microcontroller Platform*", and in a Texas Instrument 2015 datasheet #SWRS158A (published February 2015, Revised October 2015) entitled: "*CC2650 SimpleLink™ Multistandard Wireless MCU*", which are both incorporated in their entirety for all purposes as if fully set forth herein.

An example of a personal multimedia electronic device, and more particularly to a head-worn device such as an eyeglass frame, is described in U.S. Patent Application No. 2010/0110368 to Chaum entitled: "System and apparatus for eyeglass appliance platform", which is incorporated in its entirety for all purposes as if fully set forth herein. The device is having a plurality of interactive electrical/optical components. In one embodiment, a personal multimedia electronic device includes an eyeglass frame having a side arm and an optic frame; an output device for delivering an output to the wearer; an input device for obtaining an input; and a processor comprising a set of programming instructions for controlling the input device and the output device. The output device is supported by the eyeglass frame and is selected from the group consisting of a speaker, a bone conduction transmitter, an image projector, and a tactile actuator. The input device is supported by the eyeglass frame and is selected from the group consisting of an audio sensor, a tactile sensor, a bone conduction sensor, an image sensor, a body sensor, an environmental sensor, a global positioning system receiver, and an eye tracker. In one embodiment, the processor applies a user interface logic that determines a state of the eyeglass device and determines the output in response to the input and the state.

An example of an eyewear for a user is described in U.S. Patent Application No. 2012/0050668 Howell et al. entitled: "Eye wear with touch-sensitive input surface", which is incorporated in its entirety for all purposes as if fully set forth herein. The eyewear includes an eyewear frame, electrical circuitry at least partially in the eyewear frame, and a touch sensitive input surface on the eyewear frame configured to provide an input to the electrical circuitry to perform a function via touching the touch sensitive input surface. In another embodiment, the eyewear includes a switch with at least two operational states. The operational states of the switch can be configured to be changed by sliding a finger across the touch sensitive input surface of the frame.

An example of a wearable computing device is described in U.S. Patent Application No. 2013/0169513 to Heinrich et al. entitled: "Wearable computing device", which is incorporated in its entirety for all purposes as if fully set forth herein. The device includes a bone conduction transducer, an extension arm, a light pass hole, and a flexible touch pad input circuit. When a user wears the device, the transducer contacts the user's head. A display is attached to a free end of an extension arm. The extension arm is pivotable such that a distance between the display and the user's eye is adjustable to provide the display at an optimum position. The light pass hole may include a light emitting diode and a flash. The touch pad input circuit may be adhered to at least one side arm such that parting lines are not provided between edges of the circuit and the side arm.

Speech synthesis. A speech synthesizer is used to produce natural and intelligible artificial human speech may be implemented in hardware, in software, or combination thereof. A speech synthesizer may be Text-To-Speech (TTS) based, that converts normal language text to speech, or alternatively (or in addition) may be based on rendering symbolic linguistic representation like phonetic transcription. A TTS typically involves two steps, the front-end where the raw input text is pre-processed to fully write-out words replacing numbers and abbreviations, followed by assigning phonetic transcriptions to each word (text-to-phoneme), and the back-end (or synthesizer) where the symbolic linguistic representation is converted to output sound.

The generating of synthetic speech waveform typically uses a concatenative or formant synthesis. The concatenative synthesis commonly produces the most natural-sounding synthesized speech, and is based on the concatenation (or stringing together) of segments of recorded speech. There are three main types of concatenative synthesis: Unit selection, diphone synthesis, and domain-specific synthesis. Unit selection synthesis is based on large databases of recorded speech including individual phones, diphones, half-phones, syllables, morphemes, words, phrases, and sentences, indexed based on the segmentation and acoustic parameters like the fundamental frequency (pitch), duration, position in the syllable, and neighboring phones. At run time, the desired target utterance is created by determining (typically using a specially weighted decision tree) the best chain of candidate units from the database (unit selection). Diphone synthesis uses a minimal speech database containing all the diphones (sound-to-sound transitions) occurring in a language, and at runtime, the target prosody of a sentence is superimposed on these minimal units by means of digital signal processing techniques such as linear predictive coding. Domain-specific synthesis is used where the output is limited to a particular domain, using concatenated prerecorded words and phrases to create complete utterances. In formant synthesis the synthesized speech output is created using additive synthesis and an acoustic model (physical modeling synthesis), rather than on using human speech samples. Parameters such as fundamental frequency, voicing, and noise levels are varied over time to create a waveform of artificial speech. The synthesis may further be based on articulatory synthesis where computational techniques for synthesizing speech are based on models of the human vocal tract and the articulation processes occurring there, or may be HMM-based synthesis which is based on hidden Markov models, where the frequency spectrum (vocal tract), fundamental frequency (vocal source), and duration (prosody) of speech are modeled simultaneously by HMMs and generated based on the maximum likelihood criterion. The speech synthesizer may further be based on the book entitled: "*Development in Speech Synthesis*", by Mark Tatham and Katherine Morton, published 2005 by John Wiley & Sons Ltd., ISBN: 0-470-85538-X, on the book entitled: "*Speech Synthesis and Recognition*" by John Holmes and Wendy Holmes, $2^{nd}$ Edition, published 2001 ISBN: 0-7484-0856-8, on the book entitled: "*Techniques and Challenges in Speech Synthesis—Final Report*" by David Ferris [ELEC4840B] published Apr. 11, 2016, and on the book entitled: "*Text-to-Speech Synthesis*" by Paul Taylor [ISBN 978-0-521-89927-7] published 2009 by Cambridge University Press, which are all incorporated in their entirety for all purposes as if fully set forth herein.

A speech synthesizer may be software-based such as Apple VoiceOver utility which uses speech synthesis for accessibility, and is part of the Apple iOS operating system used on the iPhone, iPad and iPod Touch. Similarly, Microsoft uses SAPI 4.0 and SAPI 5.0 as part of Windows operating system. A speech synthesizer may be hardware based, such as based on Sensory Inc. NLP-5x described in the Data sheet "*Natural Language Processor with Motor, Sensor and Display Control*", P/N 80-0317-K, published 2010 by Sensory, Inc. of Santa-Clara, California, U.S.A., which is incorporated herein in its entirety for all purposes as if fully set forth herein.

In one example, the sounder may be used to play a stored digital audio. The digital audio content can be stored in the sounder. Further, few files may be stored (e.g., representing different announcements or songs), selected by the control logic. Alternatively or in addition, the digital audio data may be received by the sounder from external sources via any of the above networks. Furthermore, the source of the digital audio may be a microphone serving as a sensor, either after processing, storing, delaying, or any other manipulation, or as originally received resulting 'doorphone' or 'intercom' functionality between a microphone and a sounder in the building.

In another example, the sounder simulates the voice of a human being or generates music, typically by using an electronic circuit having a memory for storing the sounds (e.g., music, song, voice message, etc.), a digital to analog converter 62 to reconstruct the electrical representation of the sound, and a driver for driving a loudspeaker, which is an electro-acoustic transducer that converts an electrical signal to sound. An example of a greeting card providing music and mechanical movement is disclosed in U.S. Patent Application No. 2007/0256337 to Segan entitled: "User Interactive Greeting Card", which is incorporated in its entirety for all purposes as if fully set forth herein.

In one example, the system is used for sound or music generation. For example, the sound produced can emulate the sounds of a conventional acoustical music instrument, such as a piano, tuba, harp, violin, flute, guitar and so forth.

In one example, the sounder is an audible signaling device, emitting audible sounds that can be heard (having frequency components in the 20-20,000 Hz band). In one example the sound generated is music or song. The elements of the music such as pitch (which governs melody and harmony), rhythm (and its associated concepts tempo, meter, and articulation), dynamics, and the sonic qualities of timbre and texture, may be associated with the shape theme. For example, if a musical instrument shown in the picture, the music generated by that instrument will be played, e.g., drumming sound of drums and playing of a flute or guitar. In one example, a talking human voice is played by the sounder. The sound may be a syllable, a word, a phrase, a sentence, a short story or a long story, and can be based on speech synthesis or pre-recorded. Male or female voice can be used, further being young or old.

Some examples of toys that include generation of an audio signal such as music are disclosed in U.S. Pat. No. 4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al., entitled: "Electronic Instructional Apparatus", in U.S. Pat. No. 4,248,123 to Bunger et al., entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein. A music toy kit combining music toy instrument with a set of construction toy blocks is disclosed in U.S. Pat. No. 6,132,281 to Klitsner et al. entitled: "Music Toy Kit" and in U.S. Pat. No. 5,349,129 to Wisniewski et al. entitled: "Electronic Sound Generating Toy", which are incorporated in their entirety for all purposes as if fully set forth herein.

Database. A database is an organized collection of data, typically managed by a DataBase Management System (DBMS) that organizes the storage of data and performs other functions such as the creation, maintenance, and usage of the database storage structures. The data is typically organized to model aspects of reality in a way that supports processes requiring information. Databases commonly also provide users with a user interface and front-end that enables the users to query the database, often in complex manners that require processing and organization of the data. The term "database" is used herein to refer to a database, or to both a database and the DBMS used to manipulate it. Database Management Systems (DBMS) are typically computer software applications that interact with the user, other applications, and the database itself to capture and analyze data, typically providing various functions that allow entry, storage and retrieval of large quantities of information, as well as providing ways to manage how that information is organized. A general-purpose DBMS is designed to allow the definition, creation, querying, update, and administration of databases. Examples of DBMSs include MySQL, PostgreSQL, Microsoft SQL Server, Oracle, Sybase and IBM DB2. Database technology and application is described in a document published by Telemark University College entitled "Introduction to Database Systems", authored by Hans-Petter Halvorsen (dated 2014 Mar. 3), which is incorporated in its entirety for all purposes as if fully set forth herein.

SQL. Structured Query Language (SQL) is a widely-used programming language for working with relational databases, designed for managing data held in a relational database management system (RDBMS), or for stream processing in a relational data stream management system (RDSMS). SQL consists of a data definition language and a data manipulation language. The scope of SQL includes data insert, query, update and delete, schema creation and modification, and data access control. Although SQL is often described as, and largely is, a declarative language (4GL), it also includes procedural elements. SQL is designed for querying data contained in a relational database, and is a set-based, declarative query language. The SQL is standardized as ISO/IEC 9075:2011 standard: "*Information technology—Database languages—SQL*". The ISO/IEC 9075 standard is complemented by ISO/IEC 13249 standard: "*SQL Multimedia and Application Packages*" that defines interfaces and packages based on SQL. The aim is a unified access to typical database applications like text, pictures, data mining or spatial data. SQL is described in the tutorial entitled: "*Oracle/SQL Tutorial*" by Michael Gertz of University of California, which is incorporated in its entirety for all purposes as if fully set forth herein.

DSP. A Digital Signal Processor (DSP) is a specialized microprocessor (or a SIP block), with its architecture optimized for the operational needs of digital signal processing, serving the goal of DSPs is usually to measure, filter and/or compress continuous real-world analog signals. Most general-purpose microprocessors can also execute digital signal processing algorithms successfully, but dedicated DSPs usually have better power efficiency thus they are more suitable in portable devices such as mobile phones because of power consumption constraints. DSPs often use special memory architectures that are able to fetch multiple data and/or instructions at the same time. Digital signal processing algorithms typically require a large number of mathematical operations to be performed quickly and repeatedly on a series of data samples. Signals (perhaps from audio or video sensors) are constantly converted from analog to digital, manipulated digitally, and then converted back to analog form. Many DSP applications have constraints on latency; that is, for the system to work, the DSP operation must be completed within some fixed time, and deferred (or batch) processing is not viable. A specialized digital signal processor, however, will tend to provide a lower-cost solution, with better performance, lower latency, and no requirements for specialized cooling or large batteries. The architecture of a digital signal processor is optimized specifically for digital signal processing. Most also support some of the features as an applications processor or microcontroller, since signal processing is rarely the only task of a system. Some useful features for optimizing DSP algorithms are outlined below.

Hardware features visible through DSP instruction sets commonly include hardware modulo addressing, allowing circular buffers to be implemented without having to constantly test for wrapping; a memory architecture designed for streaming data, using DMA extensively and expecting code to be written to know about cache hierarchies and the associated delays; driving multiple arithmetic units may require memory architectures to support several accesses per instruction cycle; separate program and data memories (Harvard architecture), and sometimes concurrent access on multiple data buses; and specianalyzeal SIMD (single instruction, multiple data) operations. Digital signal processing is further described in a book by John G. Proakis and Dimitris G. Manolakis, published 1996 by Prentice-Hall Inc. [ISBN 0-13-394338-9] entitled: "*Third Edition—DIGITAL*

*SIGNAL PROCESSING—Principles, Algorithms, and Application*", and in a book by Steven W. Smith entitled: "*The Scientist and Engineer's Guide to—Digital Signal Processing—Second Edition*", published by California Technical Publishing [ISBN 0-9960176-7-6], which are both incorporated in their entirety for all purposes as if fully set forth herein.

ANN. Neural networks (or Artificial Neural Networks (ANNs)) are a family of statistical learning models inspired by biological neural networks (the central nervous systems of animals, in particular the brain) and are used to estimate or approximate functions that may depend on a large number of inputs and are generally unknown. Artificial neural networks are generally presented as systems of interconnected "neurons" which send messages to each other. The connections have numeric weights that can be tuned based on experience, making neural nets adaptive to inputs and capable of learning. For example, a neural network for handwriting recognition is defined by a set of input neurons that may be activated by the pixels of an input image. After being weighted and transformed by a function (determined by the network designer), the activations of these neurons are then passed on to other neurons, and this process is repeated until finally, an output neuron is activated, and determines which character was read. Like other machine learning methods—systems that learn from data—neural networks have been used to solve a wide variety of tasks that are hard to solve using ordinary rule-based programming, including computer vision and speech recognition. A class of statistical models is typically referred to as "Neural" if it contains sets of adaptive weights, i.e. numerical parameters that are tuned by a learning algorithm, and capability of approximating non-linear functions from their inputs. The adaptive weights can be thought of as connection strengths between neurons, which are activated during training and prediction. Neural Networks are described in a book by David Kriesel entitled: "*A Brief Introduction to Neural Networks*" (ZETA2-EN) [downloaded May 2015 from www.dkriesel.com], which is incorporated in its entirety for all purposes as if fully set forth herein. Neural Networks are further described in a book by Simon Haykin published 2009 by Pearson Education, Inc. [ISBN—978-0-13-147139-9] entitled: "*Neural Networks and Learning Machines—Third Edition*", which is incorporated in its entirety for all purposes as if fully set forth herein.

Neural networks based techniques may be used for image processing, as described in an article in Engineering Letters, 20:1, EL_20_1_09 (Advance online publication: 27 Feb. 2012) by Juan A. Ramirez-Quintana, Mario I. Cacon-Murguia, and F. Chacon-Hinojos entitled: "*Artificial Neural Image Processing Applications: A Survey*", in an article published 2002 by Pattern Recognition Society in Pattern Recognition 35 (2002) 2279-2301 [PII: S0031-3203(01) 00178-9] authored by M. Egmont-Petersen, D. de Ridder, and H. Handels entitled: "*Image processing with neural networks—a review*", and in an article by Dick de Ridder et al. (of the Utrecht University, Utrecht, The Netherlands) entitled: "*Nonlinear image processing using artificial neural networks*", which are all incorporated in their entirety for all purposes as if fully set forth herein.

Neural networks may be used for object detection as described in an article by Christian Szegedy, Alexander Toshev, and Dumitru Erhan (of Google, Inc.) (downloaded July 2015) entitled: "*Deep Neural Networks for Object Detection*", in a CVPR2014 paper provided by the Computer Vision Foundation by Dumitru Erhan, Christian Szegedy, Alexander Toshev, and Dragomir Anguelov (of Google, Inc., Mountain-View, California, U.S.A.) (downloaded July 2015) entitled: "*Scalable Object Detection using Deep Neural Networks*", and in an article by Shawn McCann and Jim Reesman (both of Stanford University) (downloaded July 2015) entitled: "*Object Detection using Convolutional Neural Networks*", which are all incorporated in their entirety for all purposes as if fully set forth herein.

Using neural networks for object recognition or classification is described in an article (downloaded July 2015) by Mehdi Ebady Manaa, Nawfal Turki Obies, and Dr. Tawfiq A. AI-Assadi (of Department of Computer Science, Babylon University), entitled: "*Object Classification using neural networks with Gray-level Co-occurrence Matrices (GLCM)*", in a technical report No. IDSIA-01-11 Jan. 2001 published by IDSIA/USI-SUPSI and authored by Dan C. Ciresan et al. entitled: "*High-Performance Neural Networks for Visual Object Classification*", in an article by Yuhua Zheng et al. (downloaded July 2015) entitled: "*Object Recognition using Neural Networks with Bottom-Up and top-Down Pathways*", and in an article (downloaded July 2015) by Karen Simonyan, Andrea Vedaldi, and Andrew Zisserman (all of Visual Geometry Group, University of Oxford), entitled: "*Deep Inside Convolutional Networks: Visualising Image Classification Models and Saliency Maps*", which are all incorporated in their entirety for all purposes as if fully set forth herein.

Using neural networks for object recognition or classification is further described in U.S. Pat. No. 6,018,728 to Spence et al. entitled: "Method and Apparatus for Training a Neural Network to Learn Hierarchical Representations of Objects and to Detect and Classify Objects with Uncertain Training Data", in U.S. Pat. No. 6,038,337 to Lawrence et al. entitled: "Method and Apparatus for Object Recognition", in U.S. Pat. No. 8,345,984 to Ji et al. entitled: "3D Convolutional Neural Networks for Automatic Human Action Recognition", and in U.S. Pat. No. 8,705,849 to Prokhorov entitled: "Method and System for Object Recognition Based on a Trainable Dynamic System", which are all incorporated in their entirety for all purposes as if fully set forth herein.

Actual ANN implementation may be based on, or may use, the MATLB® ANN described in the User's Guide Version 4 published July 2002 by The MathWorks, Inc. (Headquartered in Natick, MA, U.S.A.) entitled: "*Neural Network ToolBox—For Use with MATLAB®*" by Howard Demuth and Mark Beale, which is incorporated in its entirety for all purposes as if fully set forth herein. A VHDL IP core that is a configurable feedforward Artificial Neural Network (ANN) for implementation in FPGAs is available (under the Name: artificial_neural_network, created Jun. 2, 2016 and updated Oct. 11, 2016) from OpenCores organization, downloadable from http://opencores.org/. This IP performs full feedforward connections between consecutive layers. All neurons' outputs of a layer become the inputs for the next layer. This ANN architecture is also known as Multi-Layer Perceptron (MLP) when is trained with a supervised learning algorithm. Different kinds of activation functions can be added easily coding them in the provided VHDL template. This IP core is provided in two parts: kernel plus wrapper. The kernel is the optimized ANN with basic logic interfaces. The kernel should be instantiated inside a wrapper to connect it with the user's system buses. Currently, an example wrapper is provided for instantiate it on Xilinx Vivado, which uses AXI4 interfaces for AMBA buses.

Dynamic neural networks are the most advanced in that they dynamically can, based on rules, form new connections and even new neural units while disabling others. In a feedforward neural network (FNN), the information moves in only one direction—forward: From the input nodes data goes through the hidden nodes (if any) and to the output nodes. There are no cycles or loops in the network. Feedforward networks can be constructed from different types of units, e.g. binary McCulloch-Pitts neurons, the simplest example being the perceptron. Contrary to feedforward networks, Recurrent Neural Networks (RNNs) are models with bidirectional data flow. While a feedforward network propagates data linearly from input to output, RNNs also propagate data from later processing stages to earlier stages. RNNs can be used as general sequence processors.

Any ANN herein may be based on, may use, or may be trained or used, using the schemes, arrangements, or techniques described in the book by David Kriesel entitled: "*A Brief Introduction to Neural Networks*" (ZETA2-EN) [downloaded May 2015 from www.dkriesel.com], in the book by Simon Haykin published 2009 by Pearson Education, Inc. [ISBN—978-0-13-147139-9] entitled: "*Neural Networks and Learning Machines—Third Edition*", in the article in Engineering Letters, 20:1, EL_20_1_09 (Advance online publication: 27 Feb. 2012) by Juan A. Ramirez-Quintana, Mario I. Cacon-Murguia, and F. Chacon-Hinojos entitled: "*Artificial Neural Image Processing Applications: A Survey*", or in the article entitled: "*Image processing with neural networks—a review*", and in the article by Dick de Ridder et al. (of the Utrecht University, Utrecht, The Netherlands) entitled: "*Nonlinear image processing using artificial neural networks*".

Any object detection herein using ANN may be based on, may use, or may be trained or used, using the schemes, arrangements, or techniques described in the article by Christian Szegedy, Alexander Toshev, and Dumitru Erhan (of Google, Inc.) entitled: "*Deep Neural Networks for Object Detection*", in the CVPR2014 paper provided by the Computer Vision Foundation entitled: "*Scalable Object Detection using Deep Neural Networks*", in the article by Shawn McCann and Jim Reesman entitled: "*Object Detection using Convolutional Neural Networks*", or in any other document mentioned herein.

Any object recognition or classification herein using ANN may be based on, may use, or may be trained or used, using the schemes, arrangements, or techniques described in the article by Mehdi Ebady Manaa, Nawfal Turki Obies, and Dr. Tawfiq A. AI-Assadi entitled: "*Object Classification using neural networks with Gray-level Co-occurrence Matrices (GLCM)*", in the technical report No. IDSIA-01-11 entitled: "*High-Performance Neural Networks for Visual Object Classification*", in the article by Yuhua Zheng et al. entitled: "*Object Recognition using Neural Networks with Bottom-Up and top-Down Pathways*", in the article by Karen Simonyan, Andrea Vedaldi, and Andrew Zisserman, entitled: "*Deep Inside Convolutional Networks: Visualising Image Classification Models and Saliency Maps*", or in any other document mentioned herein.

A logical representation example of a simple feed-forward Artificial Neural Network (ANN) 40 is shown in FIG. 4. The ANN 40 provides three inputs designated as IN #1 42*a*, IN #2 42*b*, and IN #3 42*c*, which connects to three respective neuron units forming an input layer 41*a*. Each neural unit is linked some of, or to all of, a next layer 41*b*, with links that may be enforced or inhibit by associating weights as part of the training process. An output layer 41*d* consists of two neuron units that feeds two outputs OUT #1 43*a* and OUT #2 43*b*. Another layer 41*c* is coupled between the layer 41*b* and the output layer 41*d*. The intervening layers 41*b* and 41*c* are referred to as hidden layers. While three inputs are exampled in the ANN 40, any number of inputs may be equally used, and while two output are exampled in the ANN 40, any number of outputs may equally be used. Further, the ANN 40 uses four layers, consisting of an input layer, an output layer, and two hidden layers. However, any number of layers may be used. For example, the number of layers may be equal to, or above than, 3, 4, 5, 7, 10, 15, 20, 25, 30, 35, 40, 45, or 50 layers. Similarly, an ANN may have any number below 4, 5, 7, 10, 15, 20, 25, 30, 35, 40, 45, or 50 layers.

DNN. A Deep Neural Network (DNN) is an artificial neural network (ANN) with multiple layers between the input and output layers. For example, a DNN that is trained to recognize dog breeds will go over the given image and calculate the probability that the dog in the image is a certain breed. The user can review the results and select which probabilities the network should display (above a certain threshold, etc.) and return the proposed label. Each mathematical manipulation as such is considered a layer, and complex DNN have many layers, hence the name "deep" networks. DNNs can model complex non-linear relationships. DNN architectures generate compositional models where the object is expressed as a layered composition of primitives. The extra layers enable composition of features from lower layers, potentially modeling complex data with fewer units than a similarly performing shallow network. Deep architectures include many variants of a few basic approaches. Each architecture has found success in specific domains. It is not always possible to compare the performance of multiple architectures, unless they have been evaluated on the same data sets. DNN is described in a book entitled: "*Introduction to Deep Learning From Logical Calculus to Artificial Intelligence*" by Sandro Skansi [ISSN 1863-7310 ISSN 2197-1781, ISBN 978-3-319-73003-5], published 2018 by Springer International Publishing AG, which is incorporated in its entirety for all purposes as if fully set forth herein.

Deep Neural Networks (DNNs), which employ deep architectures can represent functions with higher complexity if the numbers of layers and units in a single layer are increased. Given enough labeled training datasets and suitable models, deep learning approaches can help humans establish mapping functions for operation convenience. In this paper, four main deep architectures are recalled and other methods (e.g. sparse coding) are also briefly discussed. Additionally, some recent advances in the field of deep learning are described. The purpose of this article is to provide a timely review and introduction on the deep learning technologies and their applications. It is aimed to provide the readers with a background on different deep learning architectures and also the latest development as well as achievements in this area. The rest of the paper is organized as follows. In Sections II-V, four main deep learning architectures, which are Restricted Boltzmann Machines (RBMs), Deep Belief Networks (DBNs), AutoEncoder (AE), and Convolutional Neural Networks (CNNs), are reviewed, respectively. Comparisons are made among these deep architectures and recent developments on these algorithms are discussed. A schematic diagram 40*a* of an RBM, a schematic diagram 40*b* of a DBN, and a schematic structure 40*c* of a CNN are shown in FIG. 4*a*.

DNNs are typically feedforward networks in which data flows from the input layer to the output layer without looping back. At first, the DNN creates a map of virtual neurons and assigns random numerical values, or "weights", to connections between them. The weights and inputs are multiplied and return an output between 0 and 1. If the network did not accurately recognize a particular pattern, an algorithm would adjust the weights. That way the algorithm can make certain parameters more influential, until it determines the correct mathematical manipulation to fully process the data. Recurrent neural networks (RNNs), in which data can flow in any direction, are used for applications such as language modeling. Long short-term memory is particularly effective for this use. Convolutional deep neural networks (CNNs) are used in computer vision. CNNs also have been applied to acoustic modeling for Automatic Speech Recognition (ASR).

Since the proposal of a fast learning algorithm for deep belief networks in 2006, the deep learning techniques have drawn ever-increasing research interests because of their inherent capability of overcoming the drawback of traditional algorithms dependent on hand-designed features. Deep learning approaches have also been found to be suitable for big data analysis with successful applications to computer vision, pattern recognition, speech recognition, natural language processing, and recommendation systems.

Widely-used deep learning architectures and their practical applications are discussed in a paper entitled: "*A Survey of Deep Neural Network Architectures and Their Applications*" by Weibo Liva, Zidong Wanga, Xiaohui Liva, Nianyin Zengb, Yurong Liuc, and Fuad E. Alsaadid, published December 2016 [DOI: 10.1016/j.neucom.2016.12.038] in Neurocomputing 234, which is incorporated in its entirety for all purposes as if fully set forth herein. An up-to-date overview is provided on four deep learning architectures, namely, autoencoder, convolutional neural network, deep belief network, and restricted Boltzmann machine. Different types of deep neural networks are surveyed and recent progresses are summarized. Applications of deep learning techniques on some selected areas (speech recognition, pattern recognition and computer vision) are highlighted. A list of future research topics are finally given with clear justifications.

RBM. Restricted Boltzmann machine (RBM) is a generative stochastic artificial neural network that can learn a probability distribution over its set of inputs. As their name implies, RBMs are a variant of Boltzmann machines, with the restriction that their neurons must form a bipartite graph: a pair of nodes from each of the two groups of units (commonly referred to as the "visible" and "hidden" units respectively) may have a symmetric connection between them; and there are no connections between nodes within a group. By contrast, "unrestricted" Boltzmann machines may have connections between hidden units. This restriction allows for more efficient training algorithms than are available for the general class of Boltzmann machines, in particular the gradient-based contrastive divergence algorithm. Restricted Boltzmann machines can also be used in deep learning networks. In particular, deep belief networks can be formed by "stacking" RBMs and optionally fine-tuning the resulting deep network with gradient descent and back-propagation DBN. A Deep Belief Network (DBN) is a generative graphical model, or alternatively a class of deep neural network, composed of multiple layers of latent variables ("hidden units"), with connections between the layers but not between units within each layer. When trained on a set of examples without supervision, a DBN can learn to probabilistically reconstruct its inputs. The layers then act as feature detectors. After this learning step, a DBN can be further trained with supervision to perform classification. DBNs can be viewed as a composition of simple, unsupervised networks such as restricted Boltzmann machines (RBMs) or autoencoders, where each sub-network's hidden layer serves as the visible layer for the next. An RBM is an undirected, generative energy-based model with a "visible" input layer and a hidden layer and connections between but not within layers. This composition leads to a fast, layer-by-layer unsupervised training procedure, where contrastive divergence is applied to each sub-network in turn, starting from the "lowest" pair of layers (the lowest visible layer is a training set).

Dynamic neural networks are the most advanced in that they dynamically can, based on rules, form new connections and even new neural units while disabling others. In a Feedforward Neural Network (FNN), the information moves in only one direction—forward: From the input nodes data goes through the hidden nodes (if any) and to the output nodes. There are no cycles or loops in the network. Feedforward networks can be constructed from different types of units, e.g. binary McCulloch-Pitts neurons, the simplest example being the perceptron. Contrary to feedforward networks, Recurrent Neural Networks (RNNs) are models with bidirectional data flow. While a feedforward network propagates data linearly from input to output, RNNs also propagate data from later processing stages to earlier stages. RNNs can be used as general sequence processors.

A waveform analysis assembly (10) that includes a sensor (12) for detecting physiological electrical and mechanical signals produced by the body is disclosed in U.S. Pat. No. 5,092,343 to Spitzer et al. entitled: "Waveform analysis apparatus and method using neural network techniques", which is incorporated in its entirety for all purposes as if fully set forth herein. An extraction neural network (22, 22') will learn a repetitive waveform of the electrical signal, store the waveform in memory (18), extract the waveform from the electrical signal, store the location times of occurrences of the waveform, and subtract the waveform from the electrical signal. Each significantly different waveform in the electrical signal is learned and extracted. A single or multilayer layer neural network (22, 22') accomplishes the learning and extraction with either multiple passes over the electrical signal or accomplishes the learning and extraction of all waveforms in a single pass over the electrical signal. A reducer (20) receives the stored waveforms and times and reduces them into features characterizing the waveforms. A classifier neural network (36) analyzes the features by classifying them through non-linear mapping techniques within the network representing diseased states and produces results of diseased states based on learned features of the normal and patient groups.

A real-time waveform analysis system that utilizes neural networks to perform various stages of the analysis is disclosed in U.S. Pat. No. 5,751,911 to Goldman entitled: "Real-time waveform analysis using artificial neural networks", which is incorporated in its entirety for all purposes as if fully set forth herein. The signal containing the waveform is first stored in a buffer and the buffer contents transmitted to a first and second neural network, which have been previously trained to recognize the start point and the end point of the waveform respectively. A third neural network receives the signal occurring between the start and end points and classifies that waveform as comprising either an incomplete waveform, a normal waveform or one of a variety of predetermined characteristic classifications. Ambiguities in the output of the third neural network are arbitrated by a fourth neural network, which may be given additional information, which serves to resolve these ambiguities. In accordance with the preferred embodiment, the present invention is applied to a system analyzing respiratory waveforms of a patient undergoing anesthesia and the classifications of the waveform correspond to normal or various categories of abnormal features functioning in the respiratory signal. The system performs the analysis rapidly enough to be used in real-time systems and can be operated with relatively low-cost hardware and with minimal software development required.

A method for analyzing data is disclosed in U.S. Pat. No. 8,898,093 to Helmsen entitled: "Systems and methods for analyzing data using deep belief networks (DBN) and identifying a pattern in a graph", which is incorporated in its entirety for all purposes as if fully set forth herein. The method includes generating, using a processing device, a graph from raw data, the graph including a plurality of nodes and edges, deriving, using the processing device, at least one label for each node using a deep belief network, and identifying, using the processing device, a predetermined pattern in the graph based at least in part on the labeled nodes.

Signal Analysis. Digital Signal Processing (DSP) is the use of digital processing, such as by computers, to perform a wide variety of signal processing operations. The signals processed in this manner are a sequence of numbers that represent samples of a continuous variable in a domain such as time, space, or frequency. Digital signal processing and analog signal processing are subfields of signal processing. DSP applications include audio and speech signal processing, sonar, radar and other sensor array processing, spectral estimation, statistical signal processing, digital image processing, signal processing for telecommunications, control of systems, biomedical engineering, seismic data processing, among others. Digital signal processing can involve linear or nonlinear operations. Nonlinear signal processing is closely related to nonlinear system identification and can be implemented in the time, frequency, and spatio-temporal domains.

In DSP, digital signals are analyzed in one of the following domains: time domain (one-dimensional signals), spatial domain (multidimensional signals), frequency domain, and wavelet domains. The domain in which to process a signal is determined by making an informed assumption (or by trying different possibilities) as to which domain best represents the essential characteristics of the signal. A sequence of samples from a measuring device produces a temporal or spatial domain representation, whereas a discrete Fourier transform produces the frequency domain information, that is, the frequency spectrum. Signal analysis is further described in Agilent Technologies Application Note 243 published 2000 [5952-8898E) entitled: "*The Fundamentals of Signal Processing*", which is incorporated in its entirety for all purposes as if fully set forth herein.

Time domain is the analysis of mathematical functions, physical signals or time series of economic or environmental data, with respect to time. In the time domain, the signal or function's value is known for all real numbers, for the case of continuous time, or at various separate instants in the case of discrete time. An oscilloscope is a tool commonly used to visualize real-world signals in the time domain. A time-domain graph shows how a signal changes with time, whereas a frequency-domain graph shows how much of the signal lies within each given frequency band over a range of frequencies.

In frequency domain analysis, also known as spectrum- or spectral analysis, Signals are converted from time or space domain to the frequency domain usually through the Fourier transform. The Fourier transform converts the signal information to a magnitude and phase component of each frequency. Often the Fourier transform is converted to the power spectrum, which is the magnitude of each frequency component squared. The most common purpose for analysis of signals in the frequency domain is analysis of signal properties. The engineer can study the spectrum to determine which frequencies are present in the input signal and which are missing. There are some commonly used frequency domain transformations. For example, the cepstrum converts a signal to the frequency domain through Fourier transform, takes the logarithm, then applies another Fourier transform. This emphasizes the harmonic structure of the original spectrum. Fourier Transform is described in Lectures Notes entitled: "*EE 261—The Fourier Transform and its Applications*" by Prof. Brad Osgood of the Electrical Engineering Department, Stanford University, downloaded from the Internet on November 2016, which is incorporated in its entirety for all purposes as if fully set forth herein.

A spectrum analyzer measures the magnitude of an input signal versus frequency within the full frequency range of the instrument. The primary use is to measure the power of the spectrum of known and unknown signals. The input signal that a spectrum analyzer measures is electrical; however, spectral compositions of other signals, such as acoustic pressure waves and optical light waves, can be considered through the use of an appropriate transducer. By analyzing the spectra of electrical signals, dominant frequency, power, distortion, harmonics, bandwidth, and other spectral components of a signal can be observed that are not easily detectable in time domain waveforms. These parameters are useful in the characterization of electronic devices, such as wireless transmitters.

Spectrum analyzer types are distinguished by the methods used to obtain the spectrum of a signal. There are swept-tuned and Fast Fourier Transform (FFT) based spectrum analyzers. A swept-tuned analyzer uses a superheterodyne receiver to down-convert a portion of the input signal spectrum to the center frequency of a narrow band-pass filter, whose instantaneous output power is recorded or displayed as a function of time. By sweeping the receiver's center-frequency (using a voltage-controlled oscillator) through a range of frequencies, the output is also a function of frequency. While the sweep centers on any particular frequency, it may be missing short-duration events at other frequencies. An FFT analyzer computes a time-sequence of periodograms. FFT refers to a particular mathematical algorithm used in the process. This is commonly used in conjunction with a receiver and analog-to-digital converter. As above, the receiver reduces the center-frequency of a portion of the input signal spectrum, but the portion is not swept. The purpose of the receiver is to reduce the sampling rate that is contended by the analyzer. With a sufficiently low sample-rate, FFT analyzers can process all the samples (100% duty-cycle), and are therefore able to avoid missing short-duration events. Spectrum analyzer basics are described in Agilent Technologies Application Note 150 published Feb. 25, 2014 [5952-0292] entitled: "*Spectrum Analysis Basics*", which is incorporated in its entirety for all purposes as if fully set forth herein.

Audio signal processing. Audio signal processing, sometimes referred to as audio processing, is the intentional alteration of auditory signals, or sound, often through an audio effect or effects unit. As audio signals may be electronically represented in either digital or analog format, signal processing may occur in either domain. Analog processors operate directly on the electrical signal, while digital processors operate mathematically on the digital representation of that signal. Audio signal processing is described in a book published 2003 by David Rocchesso (University di Verona) entitled: "*Introduction to Sound Processing*" [ISBN 88-901126-1-1], and in a book by Udo Zolzer of the Technical University of Hamburg-Harburg, Germany published 1995 by John Wiley & Sons, Ltd. [ISBN 0-47197226-6] entitled: "*Digital audio Signal Processing*", which are both incorporated in their entirety for all purposes as if fully set forth herein. An example of a digital audio processor is IC model TDA7590 available from STMicroelectronics NV, described in a data sheet Rev. 3 entitled: "*TDA*7590—*Digital signal processing IC for speech and audio applications*" published 2013 by STMicroelectronics, which is incorporated in its entirety for all purposes as if fully set forth herein. Another example of DSP IC is Model No. TMS320C6678 available from Texas Instruments Incorporated, headquartered in Dallas, Texas, U.S.A., described in a Texas Instruments data sheet SPRS691E—November 2010—Revised March 2014 entitled: "*TMS*320*C*6678—*Multicore Fixed and Floating-Point Digital Signal Processor*", which is incorporated in its entirety for all purposes as if fully set forth herein.

Audio signal processing typically involve analyzing, detecting, processing, simulating, or cancelling of the following affects or phenomena, or using the following techniques:

a. Echo: to simulate the effect of reverberation in a large hall or cavern, one or several delayed signals are added to the original signal. To be perceived as echo, the delay has to be of order 35 milliseconds or above. Short of actually playing a sound in the desired environment, the effect of echo can be implemented using either digital or analog methods. Analog echo effects are implemented using tape delays and/or spring reverbs. When large numbers of delayed signals are mixed over several seconds, the resulting sound has the effect of being presented in a large room, and it is more commonly called reverberation or reverb for short.

b. Flanger—to create an unusual sound, a delayed signal is added to the original signal with a continuously variable delay (usually smaller than 10 ms). This effect is now done electronically using a DSP, but originally the effect was created by playing the same recording on two synchronized tape players, and then mixing the signals together. As long as the machines were synchronized, the mix would sound more-or-less normal, but if the operator placed his finger on the flange of one of the players (hence "flanger"), that machine would slow down and its signal would fall out-of-phase with its partner, producing a phasing effect. Once the operator took his finger off, the player would speed up until its tachometer was back in phase with the master, and as this happened, the phasing effect would appear to slide up the frequency spectrum. This phasing up-and-down the register can be performed rhythmically.

c. Phaser—another way of creating an unusual sound; the signal is split, a portion is filtered with an all-pass filter to produce a phase-shift, and then the unfiltered and filtered signals are mixed. The phaser effect was originally a simpler implementation of the flanger effect since delays were difficult to implement with analog equipment. Phasers are often used to give a "synthesized" or electronic effect to natural sounds, such as human speech. The voice of C-3PO from Star Wars was created by taking the actor's voice and treating it with a phaser.

d. Chorus—a delayed signal is added to the original signal with a constant delay. The delay has to be short in order not to be perceived as echo, but above 5 ms to be audible. If the delay is too short, it will destructively interfere with the un-delayed signal and create a flanging effect. Often, the delayed signals will be slightly pitch shifted to more realistically convey the effect of multiple voices.

e. Equalization—different frequency bands are attenuated or boosted to produce desired spectral characteristics. Moderate use of equalization (often abbreviated as "EQ") can be used to "fine-tune" the tone quality of a recording; extreme use of equalization, such as heavily cutting a certain frequency can create more effects that are unusual.

f. Filtering—Equalization is a form of filtering. In the general sense, frequency ranges can be emphasized or attenuated using low-pass, high-pass, band-pass or band-stop filters. Band-pass filtering of voice can simulate the effect of a telephone because telephones use band-pass filters. overdrive effects such as the use of a fuzz box can be used to produce distorted sounds, such as for imitating robotic voices or to simulate distorted radiotelephone traffic. The most basic overdrive effect involves clipping the signal when its absolute value exceeds a certain threshold.

g. Pitch shift—this effect shifts a signal up or down in pitch. For example, a signal may be shifted an octave up or down. This is usually applied to the entire signal and not to each note separately. Blending the original signal with shifted duplicate(s) can create harmonies from one voice. Another application of pitch shifting is pitch correction. Here a musical signal is tuned to the correct pitch using digital signal processing techniques. This effect is ubiquitous in karaoke machines and is often used to assist pop singers who sing out of tune.

h. Time stretching—the complement of pitch shift, that is, the process of changing the speed of an audio signal without affecting its pitch.

i. Resonators—emphasize harmonic frequency content on specified frequencies. These may be created from parametric EQs or from delay-based comb-filters.

j. Synthesizer—generate artificially almost any sound by either imitating natural sounds or creating completely new sounds.

k. Modulation—to change the frequency or amplitude of a carrier signal in relation to a predefined signal. Ring modulation, also known as amplitude modulation, is an effect made famous by Doctor Who's Daleks and commonly used throughout sci-fi.

l. Compression—the reduction of the dynamic range of a sound to avoid unintentional fluctuation in the dynamics. Level compression is not to be confused with audio data compression, where the amount of data is reduced without affecting the amplitude of the sound it represents.

m. Reverse echo—a swelling effect created by reversing an audio signal and recording echo and/or delay while the signal runs in reverse. When played back forward the last echoes are heard before the effected sound creating a rush like swell preceding and during playback.

n. Active noise control—a method for reducing unwanted sound.

Mel-Frequency Cepstrum (MFC). The Mel-Frequency Cepstrum (MFC) is a representation of the short-term power spectrum of a sound, based on a linear cosine transform of a log power spectrum on a nonlinear Mel scale of frequency. Mel-Frequency Cepstral Coefficients (MFCCs) are coefficients that collectively make up an MFC. The difference between the Cepstrum and the Mel-frequency Cepstrum is that in the MFC, the frequency bands are equally spaced on the Mel scale, which approximates the human auditory system's response more closely than the linearly-spaced frequency bands used in the normal Cepstrum. This frequency warping can allow for better representation of sound, for example, in audio compression.

MFCCs are commonly derived by the steps of: taking the Fourier transform of (a windowed excerpt of) a signal, mapping the powers of the spectrum obtained above onto the Mel scale, using triangular overlapping windows; taking the logs of the powers at each of the Mel frequencies; taking the discrete cosine transform of the list of Mel log powers, as if it were a signal, and the MFCCs are the amplitudes of the resulting spectrum. There can be variations on this process, for example: differences in the shape or spacing of the windows used to map the scale, or addition of dynamics features such as "delta" and "delta-delta" (first- and second-order frame-to-frame difference) coefficients. Calculating and using MFCC is further described in European Telecommunications Standards Institute (ETSI) 2003 Standard ETSI ES 201 108 v1.1.3 (2003 September) entitled: "*Speech Processing, Transmission and quality Aspects* (*STQ*); *Distributed speech recognition; Front-end feature extraction algorithm; Compression algorithms*", in an article in J. Computer Science & Technology, 16(6):582-589, September 2001 by Fang Zheng, Guoliang Zhang, and Zhanjiang Song entitled: "*Comparison of Different Implementations of MFCC*", and in RWTH Aachen, University of Technology, Aachen Germany publication by Sirko Molau, Michael Pitz, Ralf Schluter, and Hermann Ney, entitled: "*Computing MEL-Frequency Cepstral Coefficients on the Power Spectrum*", which are all incorporated in their entirety for all purposes as if fully set forth herein.

LPC. Linear Predictive Coding (LPC) is a tool used mostly in audio signal processing and speech processing for representing the spectral envelope of a digital signal of speech in compressed form, using the information of a linear predictive model. It is one of the most powerful speech analysis techniques, and one of the most useful methods for encoding good quality speech at a low bit rate and provides extremely accurate estimates of speech parameters. LPC is described in a Technion—Haifa, Israel presentation by Nimrod Peleg (Updated March 2009) entitled: "*Linear Prediction Coding*", and in a book by P. P. Vaidyanathan entitled: "*The Theory of Linear Prediction*" published 2008 [ISBN: 1598295756], which are both incorporated in their entirety for all purposes as if fully set forth herein.

LPC starts with the assumption that a speech signal is produced by a buzzer at the end of a tube (voiced sounds), with occasional added hissing and popping sounds (sibilants and plosive sounds). Although apparently crude, this model is actually a close approximation of the reality of speech production. The glottis (the space between the vocal folds) produces the buzz, which is characterized by its intensity (loudness) and frequency (pitch). The vocal tract (the throat and mouth) forms the tube, which is characterized by its resonances, which give rise to formants, or enhanced frequency bands in the sound produced. Hisses and pops are generated by the action of the tongue, lips and throat during sibilants and plosives. LPC analyzes the speech signal by estimating the formants, removing their effects from the speech signal, and estimating the intensity and frequency of the remaining buzz. The process of removing the formants is called inverse filtering, and the remaining signal after the subtraction of the filtered modeled signal is called the residue.

The numbers that describe the intensity and frequency of the buzz, the formants, and the residue signal, can be stored or transmitted somewhere else. LPC synthesizes the speech signal by reversing the process: use the buzz parameters and the residue to create a source signal, use the formants to create a filter (which represents the tube), and run the source through the filter, resulting in speech. Because speech signals vary with time, this process is done on short chunks of the speech signal, which are called frames, generally 30 to 50 frames per second give intelligible speech with good compression. LPC is frequently used for transmitting spectral envelope information, and as thus has to be tolerant of transmission errors. Transmission of the filter coefficients directly is undesirable, since they are very sensitive to errors. In other words, a very small error can distort the whole spectrum, or worse, a small error might make the prediction filter unstable. There are more advanced representations such as Log Area Ratios (LAR), Line Spectral Pairs (LSP) decomposition and reflection coefficients. Of these, especially LSP decomposition has gained popularity, since it ensures stability of the predictor, and spectral errors are local for small coefficient deviations.

Time-frequency Analysis. A time-frequency analysis comprises those techniques that study a signal in both the time and frequency domains simultaneously, using various time-frequency representations. Rather than viewing a 1-dimensional signal (a function, real or complex-valued, whose domain is the real line) and some transform (another function whose domain is the real line, obtained from the original via some transform), time-frequency analysis studies a two-dimensional signal—a function whose domain is the two-dimensional real plane, obtained from the signal via a time-frequency transform. Time-Frequency analysis is described in an article by Rolf Hut (September 2004) entitled: "*Time Frequency Analysis—a Comparison between cochlear modeling and existing methods*", and in an article by Franz Hlawatsch and Gerald Matz (of the Institute of Communications and radio-Frequency Engineering, Vienna University of Technology) entitled: "*Time-Frequency Signal Processing: A Statistical Perspective*", which are both incorporated in their entirety for all purposes as if fully set forth herein. One of the most basic forms of time-frequency analysis is the Short-Time Fourier Transform (STFT), but techniques that are more sophisticated have been developed, such as wavelets.

There are several different ways to formulate a valid time-frequency distribution function, resulting in several well-known time-frequency distributions, such as: Short-time Fourier transform (including the Gabor transform); Wavelet transform; Bilinear time-frequency distribution function (Wigner distribution function, or WDF); and Modified Wigner distribution function or Gabor-Wigner distribution function.

To analyze the signals well, choosing an appropriate time-frequency distribution function is important. Which time-frequency distribution function should be used depends on the application being considered, as shown by reviewing a list of applications. The high clarity of the Wigner Distribution Function (WDF) obtained for some signals is due to the auto-correlation function inherent in its formulation; however, the latter also causes the cross-term problem. Therefore, if we want to analyze a single-term signal, using the WDF may be the best approach; if the signal is composed of multiple components, some other methods like the Gabor transform, Gabor-Wigner distribution or Modified B-Distribution functions may be better choices.

HMD. A Head-Mounted Display (or Helmet-Mounted Display, for aviation applications), both abbreviated HMD, is a display device, worn on the head or as part of a helmet, that has a small display optic in front of one (monocular HMD) or each eye (binocular HMD). There is also an Optical head-mounted display (OHMD), which is a wearable display that has the capability of reflecting projected images as well as allowing the user to see through it. A typical HMD has either one or two small displays with lenses and semi-transparent mirrors embedded in a helmet, eyeglasses (also known as data glasses) or visor. The display units are miniaturized and may include CRT, LCDs, Liquid crystal on silicon (LCos), or OLED. Some vendors employ multiple micro-displays to increase total resolution and field of view. An HMD 47*b* is pictorially depicted in FIG. 4*b*, and includes a horizontal strap 48*a* and a vertical strap 48*b* for head wearing by a person. A wireless-capable HMD 47*a* is pictorially depicted in FIG. 4*b*, shown to include an antenna 49*a* and an antenna 49*b* for wireless communication. The wireless-capable HMD 47*a* is shown worn by a person 36 in a view 47*c* shown in FIG. 4*c*.

HMDs differ in whether they can display just a Computer Generated Image (CGI), show live images from the real world or a combination of both. Most HMDs display only a computer-generated image, sometimes referred to as a virtual image. Some HMDs allow a CGI to be superimposed on a real-world view. This is sometimes referred to as augmented reality or mixed reality. Combining real-world view with CGI can be done by projecting the CGI through a partially reflective mirror and viewing the real world directly. This method is often called Optical See-Through. Combining real-world view with CGI can also be done electronically by accepting video from a camera and mixing it electronically with CGI. This method is often called Video See-Through.

An optical head-mounted display uses an optical mixer, which is made of partly silvered mirrors. It has the capability of reflecting artificial images as well as letting real images to cross the lens and let the user to look through it. Various techniques have existed for see-through HMD's. Most of these techniques can be summarized into two main families: "Curved Mirror" based and "Waveguide" based. Various waveguide techniques have existed for some time. These techniques include diffraction optics, holographic optics, polarized optics, and reflective optics. Major HMD applications include military, governmental (fire, police, etc.) and civilian/commercial (medicine, video gaming, sports, etc.).

The Virtual Reality (VR) technology most fundamental to the proposed research is the Head-Mounted Display (HMD). An HMD is a helmet or visor worn by the user with two screens, one for each eye, so that a stereoscopic "true 3D" image may be displayed to the user. This is achieved by displaying the same image in each screen, but offset by a distance equal to the distance between the user's eyes, mimicking how human vision perceives the world. HMDs can be opaque or see-through. In a see-through HMD, the screens are transparent so that the user can see the real world as well as what is being displayed on the screens. However, see-through HMDs often suffer from brightness problems that make them difficult to use in variable lighting conditions. Most opaque HMD designs block out the real world so that the user can only see the screens, thereby providing an immersive experience.

Some HMDs are used in conjunction with tracking systems. By tracking the user's position or orientation (or both), the system can allow the user to move naturally via locomotion and by turning their head and body, and update the graphical display accordingly. This allows for natural exploration of virtual environments without needing to rely on a keyboard, mouse, joystick, and similar interface hardware. Positional tracking is often accomplished by attaching markers (such as infrared markers) to the HMD or the user's body and using multiple special cameras to track the location of these markers in 3D space. Orientation tracking can be accomplished using an inertial tracker, which uses a sensor to detect velocities on three axes. Some systems use a combination of optical and inertial tracking, and other tracking techniques (e.g., magnetic) also exist. The output from the tracking systems is fed into the computer rendering the graphical display so that it can update the scene. Filtering is usually necessary to make the data usable since it comes in the form of noisy analog measurements. An HMD typically includes a horizontal strap and a vertical strap for head wearing by a person. A wireless-capable HMD typically includes an antenna for wireless communication.

Methods and systems for capturing an image are provided in U.S. Patent Application Publication No. 2013/0222638 to Wheeler et al. entitled: "Image Capture Based on Gaze Detection", which is incorporated in its entirety for all purposes as if fully set forth herein. In one example, a head-mounted device (HMD) having an image capturing device, a viewfinder, a gaze acquisition system, and a controller may be configured to capture an image. The image capturing device may be configured to have an imaging field of view including at least a portion of a field of view provided by the viewfinder. The gaze acquisition system may be configured to acquire a gaze direction of a wearer. The controller may be configured to determine whether the acquired gaze direction is through the viewfinder and generate an image capture instruction based on a determination that the acquired gaze direction indicates a gaze through the viewfinder. The controller may further be configured to cause the image capturing device to capture an image.

Methods and systems for capturing and storing an image are provided in U.S. Pat. No. 8,941,561 to Starner entitled: "Image Capture", which is incorporated in its entirety for all purposes as if fully set forth herein. In one example, eye-movement data associated with a head-mountable device (HMD) may be received. The HMD may include an image-capture device arranged to capture image data corresponding to a wearer-view associated with the HMD. In one case, the received eye-movement data may indicate sustained gaze. In this case, a location of the sustained gaze may be determined, and an image including a view of the location of the sustained gaze may be captured. At least one indication of a context of the captured image, such as time and/or geographic location of the HMD when the image was captured may be determined and stored in a data-item attribute database as part of a record of the captured image. In a further example, movements associated with the HMD may also be determined and based on to determine sustained gaze and the location of the sustained gaze.

A head mountable display (HMD) system is disclosed in U.S. Patent Application Publication No. 2014/0362446 to Bickerstaff et al. entitled: "Electronic Correction Based on Eye Tracking", which is incorporated in its entirety for all purposes as if fully set forth herein. The head mountable display (HMD) system comprises an eye position detector comprising one or more cameras configured to detect the position of each of the HMD user's eyes; a dominant eye detector configured to detect a dominant eye of the HMD user; and an image generator configured to generate images for display by the HMD in dependence upon the HMD user's eye positions, the image generator being configured to apply a greater weight to the detected position of the dominant eye than to the detected position of the non-dominant eye.

Methods and systems are described that involve a head-mountable display (HMD) or an associated device determining the orientation of a person's head relative to their body, are described in U.S. Pat. No. 9,268,136 to Patrick et al. entitled: "Use of Comparative Sensor Data to Determine Orientation of Head Relative to Body", which is incorporated in its entirety for all purposes as if fully set forth herein. To do so, example methods and systems may compare sensor data from the HMD to corresponding sensor data from a tracking device that is expected to move in a manner that follows the wearer's body, such a mobile phone that is located in the HMD wearer's pocket.

A Head Mountable Display (HMD) system in which images are generated for display to the user is described in Patent Cooperation Treaty (PCT) International Application (IA) Publication No. WO 2014/199155 to Ashforth et al. entitled: "Head-Mountable Apparatus and Systems", which is incorporated in its entirety for all purposes as if fully set forth herein. The head mountable display (HMD) system comprises a detector configured to detect the eye position and/or orientation and/or the head orientation of the HMD wearer, and a controller configured to control the generation of images for display, at least in part, according to the detection of the eye position and/or orientation and/or the head orientation of the HMD wearer; in which the controller is configured to change the display of one or more image features according to whether or not the user is currently looking at those image features, the image features are menu items or information items, by rendering an image feature so as to be more prominent on the display if the user is looking at it, such that the image feature is enlarged, moved from a peripheral display position, replaced by a larger image feature and/or brought forward in a 3D display space if the user is looking at it.

AR. Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects. The overlaid sensory information can be constructive (i.e., additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality.

The primary value of augmented reality is the manner in which components of the digital world blend into a person's perception of the real world, not as a simple display of data, but through the integration of immersive sensations, which are perceived as natural parts of an environment. Augmented reality is used to enhance natural environments or situations and offer perceptually enriched experiences. With the help of advanced AR technologies (e.g. adding computer vision, incorporating AR cameras into smartphone applications and object recognition) the information about the surrounding real world of the user becomes interactive and digitally manipulated. Information about the environment and its objects is overlaid on the real world. This information can be virtual or real, such as seeing other real sensed or measured information such as electromagnetic radio waves overlaid in exact alignment with where they actually are in space. Augmented reality also has a lot of potential in the gathering and sharing of tacit knowledge. Augmentation techniques are typically performed in real time and in semantic contexts with environmental elements. Immersive perceptual information is sometimes combined with supplemental information like scores over a live video feed of a sporting event. This combines the benefits of both augmented reality technology and heads up display technology (HUD).

Typical hardware components for augmented reality are: a processor, display, sensors and input devices. Modern mobile computing devices like smartphones and tablet computers contain these elements, which often include a camera and microelectromechanical systems (MEMS) sensors such as an accelerometer, GPS, and solid state compass, making them suitable AR platforms. There are two technologies used in augmented reality: diffractive waveguides and reflective waveguides.

Various technologies are used in augmented reality rendering, including optical projection systems, monitors, handheld devices, and display systems, which are worn on the human body. A Head-Mounted Display (HMD) is a display device worn on the forehead, such as a harness or helmet-mounted. HMDs place images of both the physical world and virtual objects over the user's field of view. Modern HMDs often employ sensors for six degrees of freedom monitoring that allow the system to align virtual information to the physical world and adjust accordingly with the user's head movements. HMDs can provide VR users with mobile and collaborative experiences.

AR displays can be rendered on devices resembling eyeglasses. Versions include eyewear that employs cameras to intercept the real world view and re-display its augmented view through the eyepieces and devices in which the AR imagery is projected through or reflected off the surfaces of the eyewear lens pieces.

HUD. A Head-Up Display (HUD) is a transparent display that presents data without requiring users to look away from their usual viewpoints. Near-eye augmented reality devices can be used as portable head-up displays as they can show data, information, and images while the user views the real world. Many definitions of augmented reality only define it as overlaying the information. This is basically what a head-up display does; however, practically speaking, augmented reality is expected to include registration and tracking between the superimposed perceptions, sensations, information, data, and images and some portion of the real world.

Contact lenses. Contact lenses that display AR imaging are in development. These bionic contact lenses might contain the elements for display embedded into the lens including integrated circuitry, LEDs and an antenna for wireless communication.

Virtual retinal display. A Virtual Retinal Display (VRD) is a personal display device where a display is scanned directly onto the retina of a viewer's eye. This results in bright images with high resolution and high contrast, and the viewer sees what appears to be a conventional display floating in space. Virtual retinal display creates images that can be seen in ambient daylight and ambient room light. The VRD is considered a preferred candidate to use in a surgical display due to its combination of high resolution and high contrast and brightness. Additional tests show high potential for VRD to be used as a display technology for patients that have low vision.

Handheld. A Handheld display employs a small display that fits in a user's hand. All handheld AR solutions to date opt for video see-through. Initially handheld AR employed fiducial markers, and later GPS units and MEMS sensors such as digital compasses and six degrees of freedom accelerometer-gyroscope. Today Simultaneous Localization and Mapping (SLAM) markerless trackers such as PTAM (Parallel Tracking and Mapping) are starting to come into use. Handheld display AR promises to be the first commercial success for AR technologies. The two main advantages of handheld AR are the portable nature of handheld devices and the ubiquitous nature of camera phones. The disadvantages are the physical constraints of the user having to hold the handheld device out in front of them at all times, as well as the distorting effect of classically wide-angled mobile phone cameras when compared to the real world as viewed through the eye.

Spatial Augmented Reality (SAR) augments real-world objects and scenes, without the use of special displays such as monitors, head-mounted displays or hand-held devices. SAR makes use of digital projectors to display graphical information onto physical objects. The key difference in SAR is that the display is separated from the users of the system. Since the displays are not associated with each user, SAR scales naturally up to groups of users, allowing for collocated collaboration between users.

Other applications include table and wall projections. One innovation, the Extended Virtual Table, separates the virtual from the real by including beam-splitter mirrors attached to the ceiling at an adjustable angle. Virtual showcases, which employ beam splitter mirrors together with multiple graphics displays, provide an interactive means of simultaneously engaging with the virtual and the real. Many more implementations and configurations make spatial augmented reality display an increasingly attractive interactive alternative. A SAR system can display on any number of surfaces in an indoor setting at once. SAR supports both a graphical visualization and passive haptic sensation for the end users. Users are able to touch physical objects in a process that provides passive haptic sensation.

A virtual reality composer platform and system (VRCPS) is described in U.S. Pat. No. 7,754,955 to Egan entitled: "Virtual reality composer platform system", which is incorporated in its entirety for all purposes as if fully set forth herein. The system includes a plurality of user input/output devices and signal input/output controllers interfaced to a central processing unit complete with plurality of memory means, a butterfly morpheus musical instrument with plurality of manual input means each with a first unique visible indicia interfaced to said central processing unit, a plurality of finger adapters each with a second unique visible indicia donned on respective fingers and at least one custom butterfly Morpheus music notation computer interface. The system is particularly suited for composing music for self-learning and teaching for all types of musical instruments for optimal virtual reality multimedia experience. The VRCPS platform and concepts disclosed are vari-dimensional acoustic environments, which are equally suited to all types of electronic learning and composing systems, game systems and computers. It is suitable for all levels of Do-It-Yourself learning from learning Beginners to Virtuoso Levels.

A method, apparatus, and User Interface, and product for assisting users learning to play the Chords of any selected Song are described in U.S. Pat. No. 10,614,786 to Barry entitled: "Musical chord identification, selection and playing method and means for physical and virtual musical instruments", which is incorporated in its entirety for all purposes as if fully set forth herein. The method, apparatus, and User Interface, and product quickly and easily provide means to quickly and easily generate the individual Note sounds for the Chords of the selected Song employing a broad range of Virtual and Physical Instrument.

An augmented reality based piano performance assistant method which enables a user who is not familiar with a sheet music to play a piano, and a device performing the same is provided in South-Korea Patent Application Publication KR20170138135 entitled: "Method of helping piano performance and based on augmented reality and apparatus performing the same", which is incorporated in its entirety for all purposes as if fully set forth herein. According to an embodiment of the present invention, the augmented reality based piano performance assistant method which is performed by an augmented reality based piano performance assistant device comprises the following steps of: recognizing a plurality of octave recognition labels located on a keyboard of the piano device; loading a virtual keyboard with respect to keyboard information in an augmented reality environment by using the information on the octave corresponding to the plurality of octave recognition labels; and displaying piano performance assistant information on the virtual keyboard loaded in the augmented reality environment according to performance information received from a performance information providing server when performance is started.

A kind of piano training system and method based on mixed reality is described in China Patent Application Publication CN109493686 entitled: "A kind of piano training system and method based on mixed reality", which is incorporated in its entirety for all purposes as if fully set forth herein. The piano training system includes the mixed reality helmet, piano, positioning device and processing unit; the piano is true. The positioning device is arranged on the piano or the mixed reality helmet, for relative position between the key and the mixed reality helmet of the real-time measurement piano. The processing unit, signal connect the mixed reality helmet, for loading and according to the corresponding virtual training scene of standard piano file generated, and by the virtual training scene transfer to the mixed reality helmet. The mixed reality helmet, signal connects the positioning device, for user's body-worn, the virtual training scene is shown in the upside of the key of the piano for relative position between the key and the key and the mixed reality helmet of the piano that detect according to the positioning device of the real piano. Its enjoyment that can increase piano training process and permission user adjust the sitting posture of oneself in the training process to prevent cervical vertebra over fatigue.

A computer implemented method for providing an augmented reality (AR) function is described in U.S. Pat. No. 10,482,862 to Hamalainen et al. entitled: "Computer implemented method for providing augmented reality (AR) function regarding music track", which is incorporated in its entirety for all purposes as if fully set forth herein. The method comprises receiving input information regarding a music track and an instrument; determining attribute information of the music track based on the received input information; receiving real time content of audiovisual (AV) input signals using at least one capturing device; generating visual information corresponding to visual data of the real time content, wherein the visual information corresponds to a view regarding at least one user limb and an instrument comprising a plurality of user operable elements; generating augmented reality (AR) instruction information based on the attribute information of the music track, the augmented reality (AR) instruction information comprising a plurality of layers; and generating augmented reality (AR) visual information by applying the augmented reality (AR) instruction information to the visual information so that a first layer of the augmented reality (AR) instruction information is applied above at least a portion of the visual information.

A system enabling the performance of sensory stimulating content including music and video using gaming in a cyber reality environment, such as using a virtual reality headset, is described in U.S. Pat. No. 10,418,008 to Bencar et al. entitled: "Cyber reality device including gaming based on a plurality of musical programs", which is incorporated in its entirety for all purposes as if fully set forth herein. This disclosure includes a system and method through which a performer can virtually trigger and control a presentation of pre-packaged sensory stimulating content including musical programs through gaming. A theme for the performer is that the pre-packaged sensory stimulating content is preferably chosen such that, even where the performer is a novice, the sensory stimulating data is presented in a pleasing and sympathetic manner and scoring is provided as a function of the performer's ability to provide a gesture in association with a displayed virtual trigger.

Musical notation. Music notation (or musical notation) is any system, convention, or standard used to visually represent aurally perceived music played with musical instruments or sung by the human voice through the use of written, printed, or otherwise-produced symbols, including notation for durations of absence of sound such as rests. Typically, in this framework pitches are indicated by placing oval noteheads on the staff lines or between the lines, and the pitch of the oval musical noteheads can be modified by accidentals. The duration (note length) is shown with different note values, which can be indicated by the notehead being a stemless hollow oval (a whole note or semibreve), a hollow rectangle or stemless hollow oval with one or two vertical lines on either side (double whole note or breve), a stemmed hollow oval (a half note or minim), or solid oval using stems to indicate quarter notes (crotchets) and stems with added flags or beams to indicate smaller subdivisions, and additional symbols such as dots and ties which lengthen the duration of a note. Notation is read from left to right, which makes setting music for right-to-left scripts difficult.

A staff (or stave, in British English) of written music generally begins with a clef, which indicates the position of one particular note on the staff. The treble clef or G clef was originally a letter G and it identifies the second line up on the five line staff as the note G above middle C. The bass clef or F clef shows the position of the note F below middle C. While the treble and bass clef are the most widely used clefs, other clefs are used, such as the alto clef (used for viola and alto trombone music) and the tenor clef (used for some cello, tenor trombone, and double bass music). Notes representing a pitch outside of the scope of the five line staff can be represented using ledger lines, which provide a single note with additional lines and spaces. Some instruments use mainly one clef, such as violin and flute, which use treble clef and double bass and tuba, which use bass clef. Some instruments regularly use both clefs, such as piano and pipe organ.

Following the clef, the key signature on a staff indicates the key of the piece or song by specifying that certain notes are flat or sharp throughout the piece, unless otherwise indicated with accidentals added before certain notes. When a sharp is placed before a note, this makes that note one semitone higher. When a flat is placed before a note, this makes that note one semitone lower. Double sharps and double flats are less common, but they are used. A double sharp is placed before a note to make it two semitones higher. A double flat is placed before a note to make it two semitones lower. A natural sign placed before a note renders that note in its "natural" form, which means that any sharps or flats applying to that note from the key signature or from accidentals are cancelled. Sometimes a courtesy accidental is used in music where it is not technically required, to remind the musician of what pitch the key signature requires. Following the key signature is the time signature. The time signature typically consists of two numbers, with one of the most common being The top "4" indicates that there are four beats per measure (also called bar). The bottom "4" indicates that each of those beats are quarter notes. Measures divide the piece into groups of beats, and the time signatures specify those groupings.

Musical symbols. Musical symbols are marks and symbols used in musical notation of musical scores. Some are used to notate pitch, tempo, metre, duration, and articulation of a note or a passage of music. In some cases, symbols provide information about the form of a piece (e.g., how many repeats of a section) or about how to play the note (e.g., with violin family instruments, a note may be bowed or plucked). Some symbols are instrument-specific notation giving the performer information about which finger, hand or foot to use. Selected examples of popular musical symbols according to a popular music notation convention are described in a view 60 shown in FIG. 6, and a correspondence of musical symbols to the associated piano keys is described in a view 60*a* shown in FIG. 6*a.*

Clefs define the pitch range, or tessitura, of the staff on which it is placed. A clef is usually the leftmost symbol on a staff. Additional clefs may appear in the middle of a staff to indicate a change in register for instruments with a wide range. In early music, clefs could be placed on any of several lines on a staff. Musical note and rest values are not absolutely defined, but are proportional in duration to all other note and rest values. The whole note is the reference value, and the other notes are named (in American usage) in comparison; i.e., a quarter note is a quarter of the length of a whole note. Accidentals modify the pitch of the notes that follow them on the same staff position within a measure, unless cancelled by an additional accidental. Key signatures define the prevailing key of the music that follows, thus avoiding the use of accidentals for many notes. If no key signature appears, the key is assumed to be C major/A minor, but can also signify a neutral key, employing individual accidentals as required for each note. The key signature examples shown here are described as they would appear on a treble staff.

Time signatures define the meter of the music. Music is "marked off" in uniform sections called bars or measures, and time signatures establish the number of beats in each. This does not necessarily indicate which beats to emphasize, however, so a time signature that conveys information about the way the piece actually sounds is thus chosen. Time signatures tend to suggest prevailing groupings of beats or pulses. Articulations (or accents) specify how to perform individual notes within a phrase or passage. They can be fine-tuned by combining more than one such symbol over or under a note. They may also appear in conjunction with phrasing marks listed above.

Sheet music. Sheet music is a handwritten or printed form of musical notation that uses musical symbols to indicate the pitches, rhythms, or chords of a song or instrumental musical piece. The medium of sheet music traditionally was a paper, however modern mediums include the presentation of musical notation on computer screens and the development of scorewriter computer programs that can notate a song or piece electronically, and, in some cases, "play back" the notated music using a synthesizer or virtual instruments.

Sheet music can be used as a record of, a guide to, or a means to perform, a song or a musical piece. Sheet music enables instrumental performers who are able to read music notation (a pianist, orchestral instrument players, a jazz band, etc.) or singers to perform a song or piece. The intended purpose of an edition of sheet music affects its design and layout. If sheet music is intended for study purposes, as in a music history class, the notes and staff can be made smaller and the editor does not have to be worried about page turns. In classical music, authoritative musical information about a piece can be gained by studying the written sketches and early versions of compositions that the composer might have retained, as well as the final autograph score and personal markings on proofs and printed scores. An example of a sheet music of a popular song is described in a view 60*b* shown in FIG. 6*b*.

Musical instrument. A musical instrument is a device created or adapted to make musical sounds. There are many different methods of classifying musical instruments. Various methods examine aspects such as the physical properties of the instrument (material, color, shape, etc.), the use for the instrument, the means by which music is produced with the instrument, the range of the instrument, and the instrument's place in an orchestra or other ensemble. Most methods are specific to a geographic area or cultural group and were developed to serve the unique classification requirements of the group.

The most commonly used system divides instruments into string instruments, woodwind instruments, brass instruments and percussion instruments. Musical instruments are also often classified by their musical range in comparison with other instruments in the same family. This may be useful when placing instruments in context of an orchestra or other ensemble. These terms are named after singing voice classifications, and include Soprano instruments, such as flute, violin, soprano saxophone, trumpet, clarinet, oboe, and piccolo; Alto instruments, such as alto saxophone, French horn, English horn, viola, and alto horn; Tenor instruments, such as trombone, tenoroon, tenor saxophone, tenor violin, guitar, and tenor drum; Baritone instruments, such as bassoon, baritone saxophone, bass clarinet, cello, baritone horn, and euphonium; and Bass instruments, such as double bass, bass guitar, contrabassoon, bass saxophone, tuba, and bass drum.

Some instruments fall into more than one category. For example, the cello may be considered tenor, baritone or bass, depending on how its music fits into the ensemble. The trombone and French horn may be alto, tenor, baritone, or bass depending on the range it is played in. Many instruments have their range as part of their name: soprano saxophone, tenor saxophone, baritone horn, alto flute, bass guitar, etc. Additional adjectives describe instruments above the soprano range or below the bass, for example the sopranino saxophone and contrabass clarinet. When used in the name of an instrument, these terms are relative, describing the instrument's range in comparison to other instruments of its family and not in comparison to the human voice range or instruments of other families.

The original Hornbostel-Sachs system classified instruments into four main groups: Idiophones, which produce sound by vibrating the primary body of the instrument itself; they are sorted into concussion, percussion, shaken, scraped, split, and plucked idiophones, such as claves, xylophone guiro, slit drum, mbira, and rattle; Membranophones, which produce sound by a vibrating a stretched membrane; they may be drums (further sorted by the shape of the shell), which are struck by hand, with a stick, or rubbed, but kazoos and other instruments that use a stretched membrane for the primary sound (not simply to modify sound produced in another way) are also considered membranophones; Chordophones, which produce sound by vibrating one or more strings; they are sorted into according to the relationship between the string(s) and the sounding board or chamber (for example, if the strings are laid out parallel to the sounding board and there is no neck, the instrument is a zither whether it is plucked like an autoharp or struck with hammers like a piano. If the instrument has strings parallel to the sounding board or chamber and the strings extend past the board with a neck, then the instrument is a lute, whether the sound chamber is constructed of wood like a guitar or uses a membrane like a banjo); Aerophones, which produce a sound with a vibrating column of air; they are sorted into free aerophones such as a bullroarer or whip, which move freely through the air; reedless aerophones, such as flutes and recorders, which cause the air to pass over a sharp edge; reed instruments, which use a vibrating reed (this category may be further divided into two classifications: single-reeded and double-reeded instruments. Examples of the former are clarinets and saxophones, while the latter includes oboes and bassoons); and lip-vibrated aerophones such as trumpets, trombones and tubas, for which the lips themselves function as vibrating reeds.

String instruments. String instruments, also known as stringed instruments, or chordophones, are musical instruments that produce sound from vibrating strings when the performer plays or sounds the strings in some manner. Musicians play some string instruments by plucking the strings with their fingers or a plectrum—and others by hitting the strings with a light wooden hammer or by rubbing the strings with a bow. In some keyboard instruments, such as the harpsichord, the musician presses a key that plucks the string. With bowed instruments, the player pulls a rosined horsehair bow across the strings, causing them to vibrate. With a hurdy-gurdy, the musician cranks a wheel whose rosined edge touches the strings. In most string instruments, the vibrations are transmitted to the body of the instrument, which often incorporates some sort of hollow or enclosed area. The body of the instrument also vibrates, along with the air inside it. The vibration of the body of the instrument and the enclosed hollow or chamber make the vibration of the string more audible to the performer and audience. The body of most string instruments is hollow. Some, however—such as electric guitar and other instruments that rely on electronic amplification—may have a solid wood body. The most common string instruments in the string family are guitar, electric bass, violin, viola, cello, double bass, banjo, mandolin, ukulele, and harp. Pictorial views of a violin 51, a guitar 51*a*, a mandolin 51*b*, a banjo 51*c*, and a harp 51*d*, are shown in FIG. 5.

Bowed instruments include the string section instruments of the Classical music orchestra (violin, viola, cello and double bass) and a number of other instruments (e.g., viols and gambas used in early music from the Baroque music era and fiddles used in many types of folk music). All of the bowed string instruments can also be plucked with the fingers, a technique called "pizzicato". A wide variety of techniques are used to sound notes on the electric guitar, including plucking with the fingernails or a plectrum, strumming and even "tapping" on the fingerboard and using feedback from a loud, distorted guitar amplifier to produce a sustained sound. Some types of string instrument are mainly plucked, such as the harp and the electric bass. Other examples include the sitar, rebab, banjo, mandolin, ukulele, and bouzouki.

String instruments can be divided in three groups: Lutes, which are instruments that support the strings via a neck and a bout ("gourd"), for instance a guitar, a violin, or a saz, Harps, which are instruments that contain the strings within a frame, and Zithers, which are instruments that have the strings mounted on a body, frame or tube, such as a guqin, a cimbalom, an autoharp, harpsichord, a piano, or a valiha.

It is also possible to divide the instruments into categories focused on how the instrument is played. An acoustic guitar being strummed. All string instruments produce sound from one or more vibrating strings, transferred to the air by the body of the instrument (or by a pickup in the case of electronically amplified instruments). They are usually categorised by the technique used to make the strings vibrate (or by the primary technique, in the case of instruments where more than one may apply). The three most common techniques are plucking, bowing, and striking. An important difference between bowing and plucking is that in the former the phenomenon is periodic so that the overtones are kept in a strictly harmonic relationship to the fundamental.

Plucking is a method of playing on instruments such as the veena, banjo, ukulele, guitar, harp, lute, mandolin, oud, and sitar, using either a finger, thumb, or quills (now plastic plectra) to pluck the strings. Instruments normally played by bowing may also be plucked, a technique referred to by the Italian term pizzicato.

Bowing is a method used in some string instruments, including the violin, viola, cello, and the double bass (of the violin family), and the old viol family. The bow consists of a stick with a "ribbon" of parallel horse tail hairs stretched between its ends. The hair is coated with rosin so it can grip the string; moving the hair across a string causes a stick-slip phenomenon, making the string vibrate, and prompting the instrument to emit sound. Darker grades of rosin grip well in cool, dry climates, but may be too sticky in warmer, more humid weather. Violin and viola players generally use harder, lighter-colored rosin than players of lower-pitched instruments, who tend to favor darker, softer rosin.

The third common method of sound production in stringed instruments is to strike the string. The piano and hammered dulcimer use this method of sound production. Even though the piano strikes the strings, the use of felt hammers means that the sound that is produced can nevertheless be mellow and rounded, in contrast to the sharp attack produced when a very hard hammer strikes the strings. Violin family string instrument players are occasionally instructed to strike the string with the stick of the bow, a technique called col legno. This yields a percussive sound along with the pitch of the note.

Acoustic instruments are based on a vibrating string strung on a very thick log, as a hypothetical example, would make only a very quiet sound, so string instruments are usually constructed in such a way that the vibrating string is coupled to a hollow resonating chamber, a soundboard, or both. On the violin, for example, the four strings pass over a thin wooden bridge resting on a hollow box (the body of the violin). The normal force applied to the body from the strings is supported in part by a small cylinder of wood called the soundpost. The violin body also has two "f-holes" carved on the top. The strings' vibrations are distributed via the bridge and soundpost to all surfaces of the instrument, and are thus made louder by matching of the acoustic impedance. The correct technical explanation is that they allow a better match to the acoustic impedance of the air.

All lute type instruments traditionally have a bridge, which holds the string at the proper action height from the fret/finger board at one end of the strings. On acoustic instruments, the bridge performs an equally important function of transmitting string energy into the "sound box" of the instrument, thereby increasing the sound volume. The specific design, and materials the used in the construction of the bridge of an instrument, have a dramatic impact upon both the sound and responsiveness of the instrument. Acoustic instruments can also be made out of artificial materials, such as carbon fiber and fiberglass (particularly the larger, lower-pitched instruments, such as cellos and basses).

String instruments may be based on electronic amplification, where they are fitted with piezoelectric or magnetic pickups to convert the string's vibrations into an electrical signal that is amplified and then converted back into sound by loudspeakers. Some players attach a pickup to their traditional string instrument to "electrify" it. Another option is to use a solid-bodied instrument, which reduces unwanted feedback howls or squeals. Amplified string instruments can be much louder than their acoustic counterparts, so musicians can play them in relatively loud rock, blues, and jazz ensembles. Amplified instruments can also have their amplified tone modified by using electronic effects such as distortion, reverb, or wah-wah. Bass-register string instruments such as the double bass and the electric bass are amplified with bass instrument amplifiers that are designed to reproduce low-frequency sounds. To modify the tone of amplified bass instruments, a range of electronic bass effects are available, such as distortion and chorus.

Woodwind instrument. A woodwind instrument is a musical instrument which produces sound when the player blows air against a sharp edge or through a reed, causing the air within its resonator (usually a column of air) to vibrate. Most of these instruments are made of wood but can be made of other materials, such as metals or plastics. Woodwind instruments are a family of musical instruments within the more general category of wind instruments. Common examples include flute, clarinet, oboe, saxophone, and bassoon. There are two main types of woodwind instruments: flutes and reed instruments (otherwise called reed pipes). The main distinction between these instruments and other wind instruments is the way in which they produce sound. All woodwinds produce sound by splitting the air blown into them on a sharp edge, such as a reed or a fipple. Despite the name, a woodwind may be made of any material, not just wood, and common examples include brass, silver, cane, as well as other metals such as gold and platinum. The saxophone, for example, though made of brass, is considered a woodwind because it requires a reed to produce sound.

The modern orchestra's woodwind section typically includes: flutes, oboes, clarinets, and bassoons. The piccolo, cor anglais, bass clarinet, E-flat clarinet, and contrabassoon are commonly used supplementary woodwind instruments. The section may also on occasion be expanded by the addition of saxophone(s). The concert band's woodwind section typically includes piccolos, flutes, oboes, bass clarinets, bassoons, alto saxophones, tenor saxophones, and baritone saxophones. Pictorial views of a Flute 52, a Piccolo 52*a*, a Clarinet 52*b*, a Bass Clarinet 52*c*, a Bassoon 52*d*, a Contra Bassoon 52*e*, an Oboe 52*f*, and an English Horn 52*g* are shown in FIG. 5*a*. Woodwind instruments are typically divided into 2 groups: flutes and reed instruments.

Flutes produce sound by directing a focused stream of air below the edge of a hole in a cylindrical tube. The flute family can be divided into two sub-families: open flutes and closed flutes. To produce a sound with an open flute, the player is required to blow a stream of air across a sharp edge that then splits the airstream. This split airstream then acts upon the air column contained within the flute's hollow causing it to vibrate and produce sound. To produce a sound with a closed flute, the player is required to blow air into a duct. This duct acts as a channel bringing the air to a sharp edge. As with the open flutes, the air is then split; this causes the column of air within the closed flute to vibrate and produce sound. Examples of this type of flute include the recorder, ocarina, and organ pipes.

Reed instruments produce sound by focusing air into a mouthpiece which then causes a reed, or reeds, to vibrate. Similarly to flutes, reed pipes are also further divided into two types: single reed and double reed. Single-reed woodwinds produce sound by fixing a reed onto the opening of a mouthpiece (using a ligature). When air is forced between the reed and the mouthpiece, the reed causes the air column in the instrument to vibrate and produce its unique sound. Single reed instruments include the clarinet, saxophone, and others such as the chalumeau. Double-reed instruments use two precisely cut, small pieces of cane bound together at the base. This form of sound production has been estimated to have originated in the middle to late Neolithic period; its discovery has been attributed to the observation of wind blowing through a split rush. The finished, bound reed is inserted into the instrument and vibrates as air is forced between the two pieces (again, causing the air within the instrument to vibrate as well). This family of reed pipes is subdivided further into another two sub-families: exposed double reed, and capped double reed instruments. Exposed double-reed instruments are played by having the double reed directly between the player's lips. This family includes instruments such as the oboe, cor anglais (also called English horn) and bassoon, and many types of shawms throughout the world. On the other hand, capped double-reed instruments have the double reed covered by a cap. The player blows through a hole in this cap that then directs the air through the reeds. This family includes the crumhorn.

Brass instrument. A brass instrument is a musical instrument that produces sound by sympathetic vibration of air in a tubular resonator in sympathy with the vibration of the player's lips. There are several factors involved in producing different pitches on a brass instrument. Slides, valves, crooks (though they are rarely used today), or keys are used to change vibratory length of tubing, thus changing the available harmonic series, while the player's embouchure, lip tension and air flow serve to select the specific harmonic produced from the available series.

Because the player of a brass instrument has direct control of the prime vibrator (the lips), brass instruments exploit the player's ability to select the harmonic at which the instrument's column of air vibrates. By making the instrument about twice as long as the equivalent woodwind instrument and starting with the second harmonic, players can get a good range of notes simply by varying the tension of their lips. Most brass instruments are fitted with a removable mouthpiece. Different shapes, sizes and styles of mouthpiece may be used to suit different embouchures, or to more easily produce certain tonal characteristics. Trumpets, trombones, and tubas are characteristically fitted with a cupped mouthpiece, while horns are fitted with a conical mouthpiece. One interesting difference between a woodwind instrument and a brass instrument is that woodwind instruments are non-directional. This means that the sound produced propagates in all directions with approximately equal volume. Brass instruments, on the other hand, are highly directional, with most of the sound produced traveling straight outward from the bell. This difference makes it significantly more difficult to record a brass instrument accurately. It also plays a major role in some performance situations, such as in marching bands. Pictorial views of a Trumpet 53, a Tuba 53*a*, a French Horn 53*b*, and a Cornet 53*d* are shown in FIG. 5*b*.

Modern brass instruments generally come in one of two families: Valved brass instruments use a set of valves (typically three or four but as many as seven or more in some cases) operated by the player's fingers that introduce additional tubing, or crooks, into the instrument, changing its overall length. This family includes all of the modern brass instruments except the trombone: the trumpet, horn (also called French horn), euphonium, and tuba, as well as the cornet, flugelhorn, tenor horn (alto horn), baritone horn, sousaphone, and the mellophone. As valved instruments are predominant among the brasses today, a more thorough discussion of their workings can be found below. The valves are usually piston valves, but can be rotary valves; the latter are the norm for the horn (except in France) and are also common on the tuba.

Slide brass instruments use a slide to change the length of tubing. The main instruments in this category are the trombone family, though valve trombones are occasionally used, especially in jazz. The trombone family's ancestor, the sackbut, and the folk instrument bazooka are also in the slide family. There are two other families that have, in general, become functionally obsolete for practical purposes. Instruments of both types, however, are sometimes used for period-instrument performances of Baroque or Classical pieces. In more modern compositions, they are occasionally used for their intonation or tone color.

Percussion instrument. A percussion instrument is a musical instrument that is sounded by being struck or scraped by a beater including attached or enclosed beaters or rattles struck, scraped or rubbed by hand or struck against another similar instrument. The percussion section of an orchestra most commonly contains instruments such as the timpani, snare drum, bass drum, cymbals, triangle and tambourine, as well as keyboard percussion instruments such as the glockenspiel and xylophone. However, the section can also contain non-percussive instruments, such as whistles and sirens, or a blown conch shell. Percussive techniques can even be applied to the human body itself, as in body percussion. Percussion instruments are most commonly divided into two classes: Pitched percussion instruments, which produce notes with an identifiable pitch, and unpitched percussion instruments, which produce notes or sounds in an indefinite pitch. A pictorial view of a common drum set 54 is shown in FIG. 5*c*, which includes a Floor tom 54*a*, a Snare drum 54*b*, Tom-toms 54*c*, a Hi-hat 54*d*, crash and ride cymbals 54*e*, and a bass drum 54*f*. Percussion instruments may play not only rhythm, but also melody and harmony. Because of the diversity of percussive instruments, it is not uncommon to find large musical ensembles composed entirely of percussion. Rhythm, melody, and harmony are all represented in these ensembles. Percussion instruments are classified by various criteria sometimes depending on their construction, ethnic origin, function within musical theory and orchestration, or their relative prevalence in common knowledge.

Piano. The piano is an acoustic, stringed musical instrument, in which the strings are struck by wooden hammers that are coated with a softer material (modern hammers are covered with dense wool felt; some early pianos used leather). It is played using a keyboard, which is a row of keys (small levers) that the performer presses down or strikes with the fingers and thumbs of both hands to cause the hammers to strike the strings. A piano usually has a protective wooden case surrounding the soundboard and metal strings, which are strung under great tension on a heavy metal frame. Pressing one or more keys on the piano's keyboard causes a wooden or plastic hammer (typically padded with firm felt) to strike the strings. The hammer rebounds from the strings, and the strings continue to vibrate at their resonant frequency. These vibrations are transmitted through a bridge to a soundboard that amplifies by more efficiently coupling the acoustic energy to the air. When the key is released, a damper stops the strings' vibration, ending the sound. Notes can be sustained, even when the keys are released by the fingers and thumbs, by the use of pedals at the base of the instrument. The sustain pedal enables pianists to play musical passages that would otherwise be impossible, such as sounding a 10-note chord in the lower register and then, while this chord is being continued with the sustain pedal, shifting both hands to the treble range to play a melody and arpeggios over the top of this sustained chord. Unlike the pipe organ and harpsichord, two major keyboard instruments widely used before the piano, the piano allows gradations of volume and tone according to how forcefully or softly a performer presses or strikes the keys.

Most modern pianos have a row of 88 black and white keys, 52 white keys for the notes of the C major scale (C, D, E, F, G, A and B) and 36 shorter black keys, which are raised above the white keys, and set further back on the keyboard. This means that the piano can play 88 different pitches (or "notes"), going from the deepest bass range to the highest treble. The black keys are for the "accidentals", which are needed to play in all twelve keys. More rarely, some pianos have additional keys (which require additional strings). Most notes have three strings, except for the bass, which graduates from one to two. The strings are sounded when keys are pressed or struck, and silenced by dampers when the hands are lifted from the keyboard. There are three primary types of pianos: Grand, Upright, and Electronic.

Grands are the largest piano type, and frequently the most majestic (as well as expensive). Grand pianos are characterized by horizontal soundboards, which sometimes stretch up to 4 ft. (front to back). The soundboard is encased in a supportable opening platform that lifts upwards on the right. Dampers lie on top of the strings, adjacent to the hammers (also horizontal). The internal construction is braced with form-holders, usually made of wood, as well as the small equipped metal reinforcements. The casing is essentially "bottomless", allowing one to see the soundboard support base, also of reinforced wood, which technically acts as the base. Keys consist of wood coated in ivory, or sometimes pure ivory, depending on the piano's manufacturers and classification. The grand piano has the standard 88 keys. Most of these pianos have sheet music stands. A retractable cover slides over, or folds down on the keys.

The baby grand piano, as the name implies, is essentially a smaller version of the regular grand piano. It has an 88-key set up, just like the regular grand does, but generally has a smaller soundboard and thus is not as loud as the regular grand.

Uprights are the most common type of acoustic piano and are a popular addition to a living room or parlor. The upright piano has been a favorite because it costs less, is more compact, and offers a warm sound. The soundboard is vertical, with strings that stretch downward and horizontal hammers and dampers. The hammers strike horizontally and are returned to resting position by springs, taking slightly longer than a grand piano's hammers (which are vertical and returned by the force of gravity). The support base of the soundboard is visible on the backside, as well as wooden reinforcements. Uprights usually cost less, depending on the model; however, some can exceed grands in total value. Although uprights often get depicted as inferior to the grand pianos, a five-foot upright can rival a typical grand in terms of tone quality and loudness. Like the grand, upright pianos vary in material construction.

Suitable for beginners or moving performers, electric pianos are usually the most affordable, and although they do not have the qualities of an acoustic, sound continues to improve for the high-end and midrange instruments. They vary greatly in quality, some have hollow keys, while others try to replicate the feel and weight of acoustic keyboards. In addition to the features of an acoustic piano, electric pianos have a variety of sounds and settings such as organ, guitar, string, choir, and percussion. The numerous sounds on some keyboards make it virtually a portable band. Other pianos have limited functions, but this is better for someone who is trying to replicate an acoustic and save money. True electric pianos (compared to the plain keyboards) have a professional appearance and good materials (most consist largely of plastic), as well as touch-sensitive features and sometimes equipped frames. Most have connectors for pedals and computer interactive abilities. They never need to be tuned, and rapidly becoming more popular in modern bands. The electric piano also has the advantage of allowing the user to practice silently with headphones at times when doing so would otherwise disturb people. The few drawbacks include technological infancy and the requirement of a power supply.

Tempo. A 'tempo' is the speed or pace of a given piece, and is typically indicated with an instruction at the start of a piece (often using conventional Italian terms) and is usually measured in beats per minute (or bpm). In modern classical compositions, a "metronome mark" in beats per minute may supplement or replace the normal tempo marking, while in modern genres like electronic dance music, tempo will typically simply be stated in bpm. While the ability to hold a steady tempo is a vital skill for a musical performer, tempo is changeable. Depending on the genre of a piece of music and the performers' interpretation, a piece may be played with slight tempo rubato or drastic variances. In ensembles, the tempo is often indicated by a conductor or by one of the instrumentalists, for instance the drummer. While tempo is described or indicated in many different ways, including with a range of words (e.g., "Slowly", "Adagio" and so on), it is typically measured in beats per minute (bpm or BPM). For example, a tempo of 60 beats per minute signifies one beat per second, while a tempo of 120 beats per minute is twice as rapid, signifying one beat every 0.5 seconds. The note value of a beat will typically be that indicated by the denominator of the time signature.

Tempo is not necessarily fixed throughout a musical piece. Within a piece (or within a movement of a longer work), a composer may indicate a complete change of tempo, often by using a double bar and introducing a new tempo indication, often with a new time signature and/or key signature.

Examples of common tempo markings, ranging from slowest to fastest tempo are: Larghissimo—very, very slowly (24 bpm and under); Adagissimo—very slowly; Grave—very slow (25-45 bpm), Largo—broadly (40-60 bpm); Lento—slowly (45-60 bpm); Larghetto—rather broadly (60-66 bpm); Adagio—slowly with great expression (66-76 bpm); Adagietto—slower than andante (72-76 bpm) or slightly faster than adagio (70-80 bpm); Andante—at a walking pace (76-108 bpm); Andantino—slightly faster than andante (although, in some cases, it can be taken to mean slightly slower than andante) (80-108 bpm); Marcia moderato—moderately, in the manner of a march (83-85 bpm); Andante moderato—between andante and moderato (thus the name) (92-98 bpm); Moderato—at a moderate speed (98-112 bpm); Allegretto—moderately fast (102-110 bpm); Allegro moderato—close to, but not quite allegro (116-120 bpm); Allegro—fast, quick, and bright (120-156 bpm) (molto allegro is slightly faster than allegro, but always in its range of 124-156 bpm); Vivace—lively and fast (156-176 bpm); Vivacissimo—very fast and lively (172-176 bpm); Allegrissimo or Allegro vivace—very fast (172-176 bpm); Presto—very, very fast (168-200 bpm); and Prestissimo—even faster than presto (200 bpm and over).

MIDI. Musical Instrument Digital Interface (MIDI) is a technical standard that describes a communications protocol, digital interface, and electrical connectors that connect a wide variety of electronic musical instruments, computers, and related audio devices for playing, editing and recording music. MIDI technology is standardized by the MIDI Manufacturers Association (MMA) and the MIDI Committee of the Association of Musical Electronics Industry (AMEI) in Tokyo. Version 1.0 of the MIDI standard is described in the standard entitled: "*The Complete MIDI* 1.0 *Detailed Specification Incorporating all Recommended Practices document*", version 96.1 third edition, Published 2014 by The MIDI Manufacturers Association Los Angeles, California, U.S.A., and Version 2.0 of the standard is entitled: "*MIDI* 2.0 *Specification Overview, MIDI* 2.0 *Specification Overview MIDI Capability Inquiry* (*MIDI-CI*) *Common Rules for MIDI-CI Profiles, Common Rules for MIDI-CI Property Exchange, Universal MIDI Packet* (*UMP*) *Format, and MIDI* 2.0 *Protocol*" Version 1.0 Published Feb. 20, 2020 by Association of Musical Electronics Industry AMEI and MIDI Manufacturers Association MMA, and an overview of MIDI is described in a document entitled: "*What is MIDI*?" by Paul D. Lehrman, published 2017 by Tufts University, which are all incorporated in their entirety for all purposes as if fully set forth herein.

A single MIDI link through a MIDI cable can carry up to sixteen channels of information, each of which can be routed to a separate device or instrument. This could be sixteen different digital instruments, for example. MIDI carries event messages; data that specify the instructions for music, including a note's notation, pitch, velocity (which is heard typically as loudness or softness of volume); vibrato; panning to the right or left of stereo; and clock signals (which set tempo). When a musician plays a MIDI instrument, all of the key presses, button presses, knob turns and slider changes are converted into MIDI data. One common MIDI application is to play a MIDI keyboard or other controller and use it to trigger a digital sound module (which contains synthesized musical sounds) to generate sounds, which the audience hears produced by a keyboard amplifier. MIDI data can be transferred via MIDI or USB cable, or recorded to a sequencer or digital audio workstation to be edited or played back.

MIDI file. The Standard MIDI File (SMF) is a file format that provides a standardized way for music sequences to be saved, transported, and opened in other systems. The standard was developed and is maintained by the MMA, and usually uses a .mid extension. The compact size of these files led to their widespread use in computers, mobile phone ringtones, webpage authoring and musical greeting cards. These files are intended for universal use and include such information as note values, timing and track names. Lyrics may be included as metadata, and can be displayed by karaoke machines. SMFs are created as an export format of software sequencers or hardware workstations. They organize MIDI messages into one or more parallel tracks and timestamp the events so that they can be played back in sequence. A header contains the arrangement's track count, tempo and an indicator of which of three SMF formats the file uses. A type 0 file contains the entire performance, merged onto a single track, while type 1 files may contain any number of tracks that are performed in synchrony. Type 2 files are rarely used and store multiple arrangements, with each arrangement having its own track and intended to be played in sequence. Microsoft Windows bundles SMFs together with Downloadable Sounds (DLS) in a Resource Interchange File Format (RIFF) wrapper, as RMID files with a .rmi extension. RIFF-RMID has been deprecated in favor of Extensible Music Files (XMF).

MIDI Controller. A MIDI controller is any hardware or software that generates and transmits Musical Instrument Digital Interface (MIDI) data to MIDI-enabled devices, typically to trigger sounds and control parameters of an electronic music performance. MIDI controllers typically have some type of interface which the performer presses, strikes, blows or touches. This action generates MIDI data (e.g., notes played and their intensity), which can then be transmitted to a MIDI-compatible sound module or synthesizer using a MIDI cable. The sound module or synthesizer in turn produces a sound which is amplified through a loudspeaker. The most commonly used MIDI controller is the electronic musical keyboard MIDI controller. When the keys are played, the MIDI controller sends MIDI data about the pitch of the note, how hard the note was played and its duration. Other common MIDI controllers are wind controllers, which a musician blows into and presses keys to transmit MIDI data, and electronic drums. The MIDI controller can be populated with any number of sliders, knobs, buttons, pedals and other sensors, and may or may not include a piano keyboard.

MIDI Keyboard. A MIDI keyboard or controller keyboard is typically a piano-style electronic musical keyboard, often with other buttons, wheels and sliders, used for sending MIDI signals or commands over a USB or MIDI 5-pin cable to other musical devices or computers. MIDI keyboards lacking an onboard sound module cannot produce sounds themselves, however some models of MIDI keyboards contain both a MIDI controller and sound module, allowing them to operate independently. When used as a MIDI controller, MIDI information on keys or buttons the performer has pressed is sent to a receiving device capable of creating sound through modeling synthesis, sample playback, or an analog hardware instrument.

Musical piece. A musical piece, also referred to as musical composition, music composition, or simply composition, typically refers to an original piece or work of music, either vocal or instrumental, the structure of a musical piece, or to the process of creating or writing a new piece of music. People who create new compositions are called composers. Composers of primarily songs are usually called songwriters; with songs, the person who writes lyrics for a song is the lyricist. In general, composition consists in two things—The first is the ordering and disposing of several sounds in such a manner that their succession pleases the ear, and the second is the rendering audible of two or more simultaneous sounds in such a manner that their combination is pleasant.

The most popular music genres are classical music and popular music. While in popular music, chords are much more predictable and repetitive than in classical music. For example, a typical Bach piece uses dozens of different chords in amazingly unique combinations. Further, popular tunes generally use a lot of repeated notes, short repeated melodic phrases, and very simple melodic lines. Songs are easy to learn, easy to remember, and simple and fun to sing or play. Classical melodies have a much more complex structure, tend to have longer repeated phrases, and can be much more challenging, and more rewarding, to learn and perform. The main advantage popular music has over classical music is that pop music tends to be more rhythmically sophisticated. Drum patterns in pop music layer different rhythms for bass drum, snare drum, and hi hat. Most classical music is typically not as rhythmically interesting. For instance, some Bach pieces consist of nothing but straight sixteenth notes.

Popular music. Popular music is music with wide appeal that is typically distributed to large audiences through the music industry. These forms and styles can be enjoyed and performed by people with little or no musical training. Typically, popular music, unlike art music, is conceived for mass distribution to large and often socioculturally heterogeneous groups of listeners, is stored and distributed in non-written form, is only possible in an industrial monetary economy where it becomes a commodity and is commonly subject to commercial considerations. Popular music is found on most commercial and public service radio stations, in most commercial music retailers and department stores, and movie and television soundtracks.

Common genres of popular music include 'Rock music' that originated as "rock and roll" in the United States in the early 1950s, and developed into a range of different styles in the 1960s and later, particularly in the United Kingdom and in the United States, Electronic music employs electronic musical instruments, digital instruments and circuitry-based music technology, 'Soul music' that originated in the African American community throughout the United States in the 1950s and early 1960s and combines elements of African-American gospel music, rhythm and blues and jazz, 'Funk music' that de-emphasizes melody and chord progressions and focuses on a strong rhythmic groove of a bassline played by an electric bassist and a drum part played by a drummer, often at slower tempos than other popular music, 'Country music' that often consists of ballads and dance tunes with generally simple forms, folk lyrics, and harmonies mostly accompanied by string instruments such as banjos, electric and acoustic guitars, steel guitars (such as pedal steels and dobros), and fiddles as well as harmonicas, 'Latin music' that comes from Spanish- and Portuguese-speaking areas of the world, 'Reggae music' that incorporates different stylistic techniques form rhythm and blues, jazz, African, Caribbean, and other genres as well but what makes reggae unique are the vocals and lyrics, 'Hip-hop music' that is broadly defined as a stylized rhythmic music that commonly accompanies rapping, a rhythmic and rhyming speech that is chanted, and 'Polka music' that is a dance music.

Classical music. Examples of classical music forms are Aria—which refers to a long accompanied song for a solo voice, typically one in an opera or oratorio, and is typically a formal musical composition that is a self-contained piece for one voice, with or without instrumental or orchestral accompaniment, normally part of a larger work; Cadenza—which refers to a virtuoso solo passage inserted into a movement in a concerto or other work, typically near the end, and generally includes an improvised or written-out ornamental passage played or sung by a soloist or soloists, usually in a "free" rhythmic style, and often allowing virtuosic display, while during this time the accompaniment will rest, or sustain a note or chord; Concerto—which is a musical composition for a solo instrument or instruments accompanied by an orchestra, especially one conceived on a relatively large scale, and includes an instrumental composition, written for one or more soloists accompanied by an orchestra or other ensemble. The typical three-movement structure, a slow movement (e.g., lento or adagio) preceded and followed by fast movements (e.g. presto or allegro); Chamber music—which is an instrumental music played by a small ensemble, with one player to a part, the most important form being the string quartet which developed in the 18th century, and typically is a form of classical music that is composed for a small group of instruments—traditionally a group that could fit in a palace chamber or a large room. Most broadly, it includes any art music that is performed by a small number of performers, with one performer to a part (in contrast to orchestral music, in which each string part is played by a number of performers); Movement—which is a principal division of a longer musical work, self-sufficient in terms of key, tempo, and structure, and while individual or selected movements from a composition are sometimes performed separately, a performance of the complete work requires all the movements to be performed in succession; Sonata—which is a composition for an instrumental soloist, often with a piano accompaniment, typically in several movements with one or more in sonata form; Opera—which is a dramatic work in one or more acts, set to music for singers and instrumentalists, and where the music has a leading role and the parts are taken by singers, but is distinct from musical theatre, typically involving a collaboration between a composer and a librettist and incorporating a number of the performing arts, such as acting, scenery, costume, and sometimes dance or ballet; and Overture—which is an orchestral piece at the beginning of an opera, suite, play, oratorio, or other extended composition, and Symphony—which is an elaborate musical composition for full orchestra, typically in four movements, at least one of which is traditionally in sonata form.

Vocal music. Vocal music is a type of singing performed by one or more singers, either with instrumental accompaniment, or without instrumental accompaniment (a cappella), in which singing provides the main focus of the piece. Music which employs singing but does not feature it prominently is generally considered to be instrumental music as is music without singing. Music without any non-vocal instrumental accompaniment is referred to as a cappella. Vocal music typically features sung words called lyrics, although there are notable examples of vocal music that are performed using non-linguistic syllables, sounds, or noises, sometimes as musical onomatopoeia, such as jazz scat singing. A short piece of vocal music with lyrics is broadly termed a song, although in different styles of music, it may be called an aria or hymn.

Vocal music often has a sequence of sustained pitches that rise and fall, creating a melody, but some vocal styles use less distinct pitches, such as chants or a rhythmic speech-like delivery, such as rapping. There are extended vocal techniques that may be used, such as screaming, growling, throat singing, or yodelling.

Chroma features. Chroma features or chromagram, also referred to as "pitch class profiles", relates to the twelve different pitch classes, and are a powerful tool for analyzing music whose pitches can be meaningfully categorized (often into twelve categories) and whose tuning approximates to the equal-tempered scale. One main property of chroma features is that they capture harmonic and melodic characteristics of music, while being robust to changes in timbre and instrumentation. The underlying observation is that humans perceive two musical pitches as similar in color if they differ by an octave. Based on this observation, a pitch can be separated into two components, which are referred to as tone height and chroma. Assuming the equal-tempered scale, one considers twelve chroma values represented by the set {C, C♯, D, D♯, E, F, F♯, G, G♯, A, A♯, B} that consists of the twelve pitch spelling attributes as used in Western music notation. Note that in the equal-tempered scale different pitch spellings such CO and Db refer to the same chroma. Enumerating the chroma values, one can identify the set of chroma values with the set of integers {1, 2, . . . , 12}, where 1 refers to chroma C, 2 to C♯, and so on. A pitch class is defined as the set of all pitches that share the same chroma. For example, using the scientific pitch notation, the pitch class corresponding to the chroma C is the set { . . . , C−2, C−1, C0, C1, C2, C3 . . . } consisting of all pitches separated by an integer number of octaves. Given a music representation (e.g. a musical score or an audio recording), the main idea of chroma features is to aggregate for a given local time window (e.g. specified in beats or in seconds) all information that relates to a given chroma into a single coefficient. Shifting the time window across the music representation results in a sequence of chroma features each expressing how the representation's pitch content within the time window is spread over the twelve chroma bands. The resulting time-chroma representation is also referred to as chromagram. The figure above shows chromagrams for a C-major scale, once obtained from a musical score and once from an audio recording. Because of the close relation between the terms chroma and pitch class, chroma features are also referred to as pitch class profiles.

A chroma toolbox is presented in a paper entitled: "*CHROMA TOOLBOX: MATLAB IMPLEMENTATIONS FOR EXTRACTING VARIANTS OF CHROMA-BASED AUDIO FEATURES*" by Meinard Muller and Sebastian Ewert, published 2011 by the International Society for Music Information Retrieval, which is incorporated in its entirety for all purposes as if fully set forth herein. Chroma-based audio features, which closely correlate to the aspect of harmony, are a well-established tool in processing and analyzing music data. There are many ways of computing and enhancing chroma features, which results in a large number of chroma variants with different properties. The toolbox contains MATLAB implementations for extracting various types of recently proposed pitch-based and chroma-based audio features. Providing the MATLAB implementations on a well-documented website under a GNU-GPL license, our aim is to foster research in music information retrieval. As another goal, we want to raise awareness that there is no single chroma variant that works best in all applications. To this end, we discuss two example applications showing that the final music analysis result may crucially depend on the initial feature design step.

Music Arrangement. As used herein, the term "arrangement" in the context of 'music arrangement' refers to any reworking of a musical piece (or part thereof), that may be any composition or any original piece of music. In one example, an arrangement may refer to adapted version of a musical piece, such as adaptation of the corresponding sheet music, so that it can be played by a different instrument or combination of instruments from the original. For example, a song written for one voice with piano accompaniment might be arranged so that it can be sung in parts by a choir, or a piece for violin might be arranged so that it can be played on a clarinet instead. In another example, an arrangement may refer to adapted version of a musical piece, such as simplifying or elaboration of the corresponding sheet music, so that it can be played by less skilled players or beginners, while retaining the general character of the original musical piece.

A statistical-modeling method for piano reduction, such as converting an ensemble score into piano scores that can control performance difficulty, is presented in an article entitled: "*Statistical piano reduction controlling performance difficulty*" by Eita Nakamura and Kazuyoshi Yoshii [doi:10.1017/ATSIP.2018.18], published 2018 in SIP (2018), vol. 7, e13, which is incorporated in its entirety for all purposes as if fully set forth herein. While previous studies have focused on describing the condition for playable piano scores, it depends on player's skill and can change continuously with the tempo. The article describes computationally quantifying performance difficulty as well as musical fidelity to the original score, and formulate the problem as optimization of musical fidelity under constraints on difficulty values. First, performance difficulty measures are developed by means of probabilistic generative models for piano scores and the relation to the rate of performance errors is studied. Second, to describe musical fidelity, we construct a probabilistic model integrating a prior piano-score model and a model representing how ensemble scores are likely to be edited. An iterative optimization algorithm for piano reduction is developed based on statistical inference of the model. We confirm the effect of the iterative procedure; we find that subjective difficulty and musical fidelity monotonically increase with controlled difficulty values; and we show that incorporating sequential dependence of pitches and fingering motion in the piano-score model improves the quality of reduction scores in high-difficulty cases.

An automatic arrangement system for piano reduction that arranges music algorithmically for the piano while considering various roles of the piano in music is presented in an article entitled: "*Automatic System for the Arrangement of Piano Reductions*" by Shih-Chuan Chiu, Man-Kwan Shan, and Jiun-Long Huang, published 2009 in the 11th IEEE International Symposium on Multimedia, which is incorporated in its entirety for all purposes as if fully set forth herein. The automatic arrangement system for piano reduction is achieved by first analyzing the original music in order to determine the type of arrangement element performed by an instrument. Then each phrase is identified and is associated with a weighted importance value. At last, a phrase selection algorithm is proposed to select phrases with maximum importance to arrangement under the constraint of piano playability. Our experiments demonstrate that the proposed system has the ability to create piano arrangement.

Looking for a piano sheet music with proper difficulty for a piano learner is always an important work to his/her teacher. A study on a new and challenging issue of recognizing the difficulty level of piano sheet music is described in an article entitled: "*A Study on Difficulty Level Recognition of Piano Sheet Music*" by Shih-Chuan Chiu and Min-Syan Chen, published December 2012 in the ISM '12: Proceedings of the 2012 IEEE International Symposium on Multimedia, which is incorporated in its entirety for all purposes as if fully set forth herein. To analyze the semantic content of music, we focus on symbolic music, i.e., sheet music or score. Specifically, difficulty level recognition is formulated as a regression problem to predict the difficulty level of piano sheet music. Since the existing symbolic music features are not able to capture the characteristics of difficulty, we propose a set of new features. To improve the performance, a feature selection approach, RReliefF, is used to select relevant features. An extensive performance study is conducted over two real datasets with different characteristics to evaluate the accuracy of the regression approach for predicting difficulty level. The best performance evaluated in terms of the R2 statistics over two datasets reaches 39.9% and 38.8%, respectively.

Huge sheet music collections exist on the Web, allowing people to access public domain scores for free. However, beginners may be lost in finding a score appropriate to their instrument level, and should often rely on themselves to start out on the chosen piece. In this instrumental e-Learning context, a Score Analyzer prototype in order to automatically extract the difficulty level of a MusicXML piece and suggest advice thanks to a Musical Sign Base (MSB) is proposed in an article entitled: "*SCORE ANALYZER: AUTOMATICALLY DETERMINING SCORES DIFFICULTY LEVEL FOR INSTRUMENTAL E-LEARNING*" by Véronique Sébastien, Henri Ralambondrainy, Olivier Sébastien, and Noël Conruyt of IREMIA—Laboratoire d'Informatique et de Mathématiques, EA2525 University of Reunion Island, Saint-Denis, Reunion (FRANCE), published October 2012 in 13th International Society for Music Information Retrieval Conference (ISMIR 2012), which is incorporated in its entirety for all purposes as if fully set forth herein. The article first review methods related to score performance information retrieval, and then identifies seven criteria to characterize technical instrumental difficulties and propose methods to extract them from a MusicXML score. The relevance of these criteria is then evaluated through a Principal Components Analysis and compared to human estimations. Lastly, the article discusses the integration of this work to @—MUSE, a collaborative score annotation platform based on multimedia contents indexation.

In the Western classical tradition, musicians play music from notated sheet music, called a score. When playing music from a score, a musician translates its visual symbols into sequences of instrument-specific physical motions. Hence, a music score's overall complexity represents a sum of the cognitive and mechanical acuity required for its performance. For a given instrument, different notes, intervals, articulations, dynamics, key signatures, and tempo represent dissimilar levels of difficulty, which vary depending on the performer's proficiency. Individual musicians embrace this tenet, but may disagree about the degrees of difficulty. A 'musiplectics', a systematic and objective approach to computational assessment of the complexity of a music score for any instrument, is introduced in a paper entitled: "*Musiplectics: Computational Assessment of the Complexity of Music Scores*" by Ethan Holder, Eli Tilevich, and Amy Gillick, published October 2015 in ONWARD '15 [ACM 978-1-4503-1995-9/13/10, http://dx.doi.org/10.1145/2508075.2514879], which is incorporated in its entirety for all purposes as if fully set forth herein. Musiplectics defines computing paradigms for automatically and accurately calculating the complexity of playing a music score on a given instrument. The core concept codifies a two-phase process. First, music experts rank the relative difficulty of individual musical components (e.g., notes, intervals, dynamics, etc.) for different playing proficiencies and instruments. Second, a computing engine automatically applies this ranking to music scores and calculates their respective complexity. As a proof of concept of musiplectics, we present an automated, Web-based application called Musical Complexity Scoring (MCS) for music educators and performers. Musiplectics can engender the creation of practical computing tools for objective and expeditious assessment of a music score's suitability for the abilities of intended performers.

While the difficulty of the music can be classified by a variety of standard, conventional methods are classified by the subjective judgment based on the experience of many musicians or conductors. Music score is difficult to evaluate as there is no quantitative criterion to determine the degree of difficulty. A new classification method for determining the degree of difficulty of the music is proposed in a paper entitled: "*A Method for Measuring the Difficulty of Music Scores*" by Yang-Eui Song and Yong Kyu Lee [www.ksci.re.kr http://dx.doi.org/10.9708/jksci.2016.21.4.039] published April 2016 in the Journal of The Korea Society of Computer and Information Vol. 21 No. 4, which is incorporated in its entirety for all purposes as if fully set forth herein. In order to determine the degree of difficulty, we convert the score, which is expressed as a traditional music score, into electronic music sheet. Moreover, we calculate information about the elements needed to play sheet music by distance of notes, tempo, and quantifying the ease of interpretation. Calculating a degree of difficulty of the entire music via the numerical data, we suggest the difficulty evaluation of the score, and show the difficulty of music through experiments.

Commercial application for writing music or songs are available, such as Ludwig (http://www.write-music.com/), which is a music software for Windows that helps you to write your own songs, while you simply enter or play a melody. Ludwig does the rest: he finds the proper chords and writes all parts of a professionally sounding band. It was never easier to compose, arrange or accompany songs, and AnthemScore (https://www.lunaverus.com/), which is the leading software for automatic music transcription. Convert mp3, way, and other audio formats into sheet music using a neural network trained on millions of data samples. Use powerful editing tools to tweak notes, beats, and time signatures. Print or save as PDF, MIDI, or XML.

Online music learning. Increasing Internet penetration, smartphones and tablets in the modern and emerging economies are boosting the growth of the online music learning market, as an alternative to the traditional personal one-on-one piano lessons. Various online courses and individual lessons that offer enhanced music skills are provided as applications for mobile phones and tablets, typically based on Windows, iOS, Android, and MacOS platforms, are offered by multiple key players, supporting various musical instruments such as guitar, ukulele, piano, vocal, drums, and bass. In addition to the reduced costs, such online music learning provides an interactive and fun experience, while providing more flexibility and being less bound by location and time, compared to personal based tutoring. A pictorial illustration of an online music learning is described in a view 60*c* in FIG. 6*c*, showing a user 36 that plays a piano 83 according to musical symbols visualized poon a display as part of a tablet 35*a*.

Methods and apparatus that help users learn to play one or more instruments by employing simplified note recognition techniques, improved feedback, and a simplified keyboard tablature are provided in U.S. Pat. No. 7,030,307 to Wedel entitled: "Music teaching device and method", which is incorporated in its entirety for all purposes as if fully set forth herein. In one aspect, users are encouraged to play specified notes within a specified time frame. The pitch and duration can be represented in any suitable manner, but are advantageously displayed together as a single icon (232A-232F). Preferably, the icon has an elongated shape in which the horizontal length correlates with duration of the note, and its vertical position on a display correlates with a pitch of the note. Notes can thus be represented by elongated lines, bars, ellipses, or even missiles or arrows. In another aspect, an improved musical tablature effectively clusters juxtaposed black keys (412A, 412C, 412E) and white keys (4123, 412D) on a display for easier visualization.

A musical keyboard that is connected to a computer is described in U.S. Pat. No. 7,174,510 to Salter entitled: "Interactive game providing instruction in musical notation and in learning an instrument", which is incorporated in its entirety for all purposes as if fully set forth herein. The computer implements a graphical user interface for teaching users to play the musical instrument. A computer readable music file, such as a MIDI file, is used to drive the creation of game objects that travel from a point of origination along a path toward a key of a virtual keyboard. In one form, when a user presses a key of the musical keyboard within a certain time window of arrival of the game object at the corresponding key of the virtual keyboard, the user is awarded with an audio presentation, a visual presentation and/or with game points. In a more structured learning mode, the game can be played with selectable, progressively more difficult challenges that the user masters on the road to proficiency.

A system and method for improving musical education through use of a game is disclosed in U.S. Pat. No. 9,492,756 to Izkovsky et al. entitled: "System and method for analyzing a digitalized musical performance", which is incorporated in its entirety for all purposes as if fully set forth herein. The method includes the steps of: receiving electrical signals associated with a musical piece provided by a user of the game; converting the electrical signals into digital samples; and analyzing the digital samples with use of auxiliary information, for purposes of improving signal analysis accuracy, resulting in determining various parameters of the musical piece provided by the user, wherein the auxiliary information is a-priori data related to at least one element selected from the group consisting of a musical instrument being played, a technical environment, the game, and information regarding the user of the game. Visual and/or audio feedback may also be provided to the user regarding the musical piece that they are providing.

A system and method for providing exercise in playing a music instrument is disclosed in U.S. Pat. No. 9,218,748 to Kaipainen et al. entitled: "System and method for providing exercise in playing a music instrument", which is incorporated in its entirety for all purposes as if fully set forth herein. With prior art solutions there is a common problem of inadequate motivation of the user to continue practicing, and inadequate learning of items which are difficult for a specific user. The present solution detects characteristics of the user's play detected and uses them to provide a suitable program of exercises and to provide feedback which enhances motivation of the user.

A system for providing a user a virtual exercise in playing a music instrument relative to the user's skill characteristics is disclosed in U.S. Pat. No. 9,767,705 to Klapuri et al. entitled: "System for estimating user's skill in playing a music instrument and determining virtual exercises thereof", which is incorporated in its entirety for all purposes as if fully set forth herein. The system includes: a processing entity and a memory entity for processing and storing data, respectively to execute the system functions, and a data transfer entity for receiving and transmitting data, the system configured to: obtain musical notation data, analyze it to assign the musical piece to which such data pertains a number of difficulty characteristics with scalar values, provide the user with a number of musical pieces, with known difficulty characteristics, as virtual exercises to be completed by playing an instrument, obtain user performance data of completed virtual exercises, analyze the user performance data to determine and assign the user with a number of skill characteristics values in accordance with the difficulty characteristic values of the completed musical pieces, and determine a musical piece for the user as a virtual exercise.

A system and method for providing exercise in playing a music instrument is disclosed in U.S. Pat. No. 9,218,748 to Kaipainen et al. entitled: "System and method for providing exercise in playing a music instrument", which is incorporated in its entirety for all purposes as if fully set forth herein. With prior art solutions there is a common problem of inadequate motivation of the user to continue practicing, and inadequate learning of items which are difficult for a specific user. The present solution detects characteristics of the user's play detected and uses them to provide a suitable program of exercises and to provide feedback which enhances motivation of the user.

Providing real-time interaction between a first player and a second player to collaborate for a musical performance over a network is disclosed in U.S. Pat. No. 10,182,093 to Klapuri entitled: "Computer implemented method for providing real-time interaction between first player and second player to collaborate for musical performance over network", which is incorporated in its entirety for all purposes as if fully set forth herein. The providing includes maintaining a reference data item generated using a musical instrument performed by a user; receiving first user input data generated using a first musical instrument, the received first user input data associated with the first musical instrument and the musical performance; receiving second user input data generated using a second musical instrument, the received second user input data associated with the second musical instrument and the musical performance; detecting a missing data packet within the received second user input data when generating real-time collaboration data for the musical performance; replacing the missing data packet using the reference data item to correct the second user input data; and generating real-time collaboration data for the musical performance based on the corrected second user input data.

A system and method for providing exercise in playing a music instrument is disclosed in U.S. Pat. No. 9,218,748 to Kaipainen et al. entitled: "System and method for providing exercise in playing a music instrument", which is incorporated in its entirety for all purposes as if fully set forth herein. With prior art solutions there is a common problem of inadequate motivation of the user to continue practicing, and inadequate learning of items which are difficult for a specific user. The present solution detects characteristics of the user's play detected and uses them to provide a suitable program of exercises and to provide feedback which enhances motivation of the user.

An apparatus, system and method are disclosed for teaching musical instruction is described in U.S. Pat. No. 9,721,479 to Citron et al. entitled: "Apparatus, system and method for teaching music and other art forms", which is incorporated in its entirety for all purposes as if fully set forth herein. The invention disclosed includes providing music instruction based upon a student's ability and preferred most dynamic efficient method of learning.

A computer implemented method for providing feedback of harmonic content relating to a music track is disclosed in U.S. Pat. No. 10,235,898 to Ryynänen et al. entitled: "Computer implemented method for providing feedback of harmonic content relating to music track", which is incorporated in its entirety for all purposes as if fully set forth herein. The method comprising: receiving music track information; generating harmonic music track parameters based on the received music track information; displaying notation information for a user for performing the music track at a given time for the music track based on the harmonic music track parameters; receiving harmonic user content generated by an instrument performed by the user, using at least one capturing device; generating real-time performance feedback for the user based on comparison of the harmonic user content and the harmonic music track parameters according to predefined settings; receiving reference harmonic user content from a plurality of reference users over a public network; adjusting, based on the reference harmonic user content, at least one of the following: the predefined settings; and the harmonic music track parameters.

Real-time jamming that is automatically assisted for musicians is disclosed in U.S. Pat. No. 10,504,498 to Ryynänen et al. entitled: "Real-time jamming assistance for groups of musicians", which is incorporated in its entirety for all purposes as if fully set forth herein. A real-time audio signal is received of played music that is played by at least one person. Beat is tracked of the played music from the real-time audio signal and accordingly a time of a next beat is predicted. At least one of chords; notes; and drum sounds is recognized from the real-time audio signal and repetitions in the played music are accordingly detected. A next development is predicted in the played music, based on the detected repetitions, including at least one of chords; notes; and drum sounds that will be played next, and respective timing based on the predicted time of the next beat. A real-time output is produced based on the predicted next development in the played music.

The Learner Interaction Monitoring Systems (LiMS) is a web-based application that can interface with any web-based course delivery platform to transform the online learning environment into an active observer of learner engagement, and is disclosed in U.S. Pat. No. 10,490,096 to Sorenson et al. entitled: "Learner interaction monitoring system", which is incorporated in its entirety for all purposes as if fully set forth herein. The LiMS 'event capture model' collects detailed real-time data on learner behavior in self-directed online learning environments, and interprets these data by drawing on behavioral research. The LiMS offers education and training managers in corporate contexts a valuable tool for the evaluation of learner performance and course design. By allowing more detailed demonstration of ROI in education and training, LiMS allows managers to make the case for web based courseware that reflects appropriate and evidence-based instructional design, rather than budgetary constraints.

A device (1) for monitoring the use accuracy of percussion instruments (5) is disclosed in U.S. Patent Application No. 2015/0310841 to SEMENZATO entitled: "Device for monitoring use accuracy of percussion instruments", which is incorporated in its entirety for all purposes as if fully set forth herein. The device includes a sensor (3) intended to detect musical data (T, I) from said instrument (5), an electronic device (9) adapted to sample at a sampling frequency Fc the musical data (T, I) detected by said sensor (3), which comprise the instant (T), detected with respect to an initial instant TO taken as a reference, and the intensity (I) of each stroke that reaches the percussion instrument (5) during an execution of a musical score (PMS) played by a user (100), and adapted to store said musical data (T, I) in a memory device (11). An external computing device (19) having a database (50) containing at least one musical sample score (PMC) intended to be considered as a reference score, or a microprocessor (6) comprised in the electronic device (9), compares the musical data (T, I) detected by the sensor (3) during the execution of a played musical score (PMS) by a user (100) with the corresponding musical data (Tc, Ic) of the musical sample score (PMC), and provides the deviation between the measured musical data (T, I) of the played musical score (PMS) and the corresponding ones (Tc, Ic) of the musical sample score (PMC).

Systems and methods capable of providing adaptive and responsive accompaniment to music with fixed chord progressions, such as jazz and pop, are disclosed in U.S. Pat. No. 10,032,443 to Braasch et al. entitled: "Interactive, expressive music accompaniment system", which is incorporated in its entirety for all purposes as if fully set forth herein. A system can include one or more sound-capturing devices, a signal analyzer to analyze captured sound signals, and an electronic sound-producing component that produces electronic sounds as an accompaniment.

A system (100) for teaching a user to play a musical instrument (114) from musical notation via virtual exercises is described in Patent Cooperation Treaty (PCT) International Publication Number WO 2017/037342 by LEHTONEN et al. entitled: "System for teaching a user to play a musical instrument from musical notation via virtual exercises and a method thereof", which is incorporated in its entirety for all purposes as if fully set forth herein. The system comprising: at least one electronic device (102) comprising at least a processing entity (104), a memory entity (106) and a display (108), means for forming or receiving at least one play signal (110) produced by a user on a musical instrument (114), the processing entity (104) being arranged to provide at least graphical musical notation content, such as a note or a chord, via the display (108), the processing entity (104) being further arranged to obtain at least play signal data via said means for forming or receiving at least one play signal (110), the processing entity (104) being further arranged to execute audio recognition to recognize the play signal data and compare it with data relating to the presented graphical content to at least determine if the play signal corresponds to said graphical content, the processing entity (104) being further arranged to assign a score to represent the result of said comparison and store said score, the processing entity (104) being further arranged to present the score to the user via the display (108), and to determine, at least on the basis of said score and other stored scores, further at least graphical musical notation content, to be presented to the user via the display (108). Corresponding method and computer program product are also presented.

Invention that relates to the field of audio recognition, in particular to computer implemented note recognition methods in a gaming application, is disclosed in U.S. Pat. No. 9,711,121 to Ahmaniemi entitled: "Latency enhanced note recognition method in gaming", which is incorporated in its entirety for all purposes as if fully set forth herein. Furthermore, the invention relates to improving latency of such audio recognition methods. One of the embodiments of the invention described herein is a method for note recognition of an audio source. The method includes: dividing an audio input into a plurality of frames, each frame having a predetermined length, conducting a frequency analysis of at least a set of the plurality of frames, based on the frequency analysis, determining if a frame is a transient frame with a frequency change between the beginning and end of the frame, comparing the frequency analysis of each said transient frame to the frequency analysis of an immediately preceding frame and, based on said comparison, determining at least one probable pitch present at the end of each transient frame, and for each transient frame, outputting pitch data indicative of the probable pitch present at the end of the transient frame.

A workstation system that produces a display presentation of a selected performance composition (e.g., a musical composition) responsive to composition data and responsive to one or both of input variables and a selected operating mode is disclosed in U.S. Pat. No. 7,157,638 to Sitrick entitled: "System and methodology for musical communication and display", which is incorporated in its entirety for all purposes as if fully set forth herein. The workstation can communicate with one or more external devices, such as other workstations, etc. The display system provides for selection of original compositions, creation of derivative compositions, distribution of compositions, monitoring of each performer's performance, group virtual performances, and for local and distributed retrieval and editing, which for music includes things such as changing keys, pitch, tempo, and other parameters. The musical composition's transformation can be performed locally or at the central or distributed music database. The musical composition data can be transposed via a controller, and can be transmitted to a plurality of the individual workstations that then display the musical composition. In one embodiment, a display system for use by a plurality of users provides a plurality of display presentations of a selected musical composition. The system is comprised of a plurality of individual workstations, each workstation comprising a communication interface providing for communications with the respective workstation of music data representative of the selected musical composition, memory for locally storing the data responsive to the communications interface, and a display apparatus provides a local visual display presentation representative of the selected musical composition responsive to the stored data. The system further provides for synchronizing the presentation on the plurality of local visual display presentations of the selected musical composition.

An interactive game designed for learning to play a guitar is disclosed in U.S. Pat. No. 8,986,090 to EPSTEIN entitled: "Interactive guitar game designed for learning to play the guitar", which is incorporated in its entirety for all purposes as if fully set forth herein. A guitar may be connected to a computer or other platform, capable of loading music and displaying notes and chords and other feedback and visual learning aids on a display screen, allowing a user to read music and play along. The goal of the software or interactive game engine is for players to learn how to play a guitar. Users may operate the game in a number of modes with different goals, playing mini-games throughout the levels of the game. The game provides feedback and statistics to help users learn how to play the guitar.

A system and method for learning, composing, accessing and playing music is disclosed in in Patent Cooperation Treaty (PCT) International Publication Number WO 2015/113360 by Shi entitled: "System and method for learning, composing, and playing music with physical objects", which is incorporated in its entirety for all purposes as if fully set forth herein. The system includes a plurality of physical objects each includes an identifier and assigned a music-related indicator. The system further includes an interactive surface configured to recognize the identifier and location information relative to the interactive surface of a physical object placed on top of the interactive surface. Upon a plurality of objects being placed on the interactive surface to form a structural pattern, the processor is configured to derive a music piece from the structural pattern.

A system is disclosed in U.S. Pat. No. 7,893,337 to Lenz entitled: "System and method for learning music in a computer game", which is incorporated in its entirety for all purposes as if fully set forth herein. The system comprising means for receiving a first input from an electronic device, said first input pertaining to performance of music by a user, means for receiving a second input, said second input pertaining at least to music intended to be performed by the user; and a comparison module software executing on a computer and adapted to receive said first input and to receive said second input, wherein the comparison module compares the first input from a user to the second input to produce at least one indicia of the user's success in performing the intended music correctly, the comparison module sends to a display module associated with the user information including at least the music intended to be performed by the user and the indicia of the user's success in performing the intended music correctly, and the comparison module further sends to the display module associated with the user a timing signal suitable for indicating the speed at which the music should be shown on the display and played by the user, said timing signal computed according to one or more tempo modes selectable by the user, is disclosed.

A music practice feedback method, system, and non-transitory computer readable medium including a displaying device configured to display sheet music, a collecting device configured to collect information related to a playing of the sheet music by a plurality of players, and a display changing device configured to change a display of the sheet music based on said collected information, are disclosed in U.S. Pat. No. 9,672,799 to Kim et al. entitled: "Music practice feedback system, method, and recording medium", which is incorporated in its entirety for all purposes as if fully set forth herein.

A self-adjusting music scrolling method is disclosed in U.S. Pat. No. 7,482,529 to Flamini et al. entitled: "Self-adjusting music scrolling system", which is incorporated in its entirety for all purposes as if fully set forth herein. The self-adjusting music method comprises providing a display screen, selecting a music score to be played by a musician, wherein the music score is cataloged and stored in a music score database as a first MIDI file, displaying a first portion of the selected music score on the display screen, recording musical notes played by a musician with a digital device, storing the recorded musical notes in memory as a WAV file, converting the WAV file into a second MIDI file, comparing the first MIDI file and the second MIDI file with a MIDI comparison algorithm, determining if the first MIDI file substantially matches the second MIDI file, automatically adjusting the music score on the display screen to show a second portion of the selected music score upon determining that the first MIDI file substantially matches the second MIDI file, and displaying one or more mistakes detected on the display screen upon determining that the first MIDI file does not substantially match the second MIDI file.

A system and method in a building or vehicle for an actuator operation in response to a sensor according to a control logic are disclosed in U.S. Patent Application Publication No. 2013/0201316 to Binder et al. entitled: "System and method for server based control", which is incorporated in its entirety for all purposes as if fully set forth herein. The system comprising a router or a gateway communicating with a device associated with the sensor and a device associated with the actuator over in-building or in-vehicle networks, and an external Internet-connected control server associated with the control logic implementing a PID closed linear control loop and communicating with the router over external network for controlling the in-building or in-vehicle phenomenon. The sensor may be a microphone or a camera, and the system may include voice or image processing as part of the control logic. A redundancy is used by using multiple sensors or actuators, or by using multiple data paths over the building or vehicle internal or external communication. The networks may be wired or wireless, and may be BAN, PAN, LAN, WAN, or home networks.

A method to visually detect and recognize fingering gestures of the left hand of a guitarist is described in an article by Anne-Marie Burns and Marcelo Wanderley entitled: "*Visual Methods for the Retrieval of Guitarist Fingering*", published Jun. 4-8, 2006 in a Conference Paper of "*Proceedings of the* 2006 *International Conference on New Interfaces for Musical Expression* (*NIME*06)", Paris, France, which is incorporated in its entirety for all purposes as if fully set forth herein. The method has been developed following preliminary manual and automated analysis of video recordings. These first analyses led to some important findings about the design methodology of a vision system for guitarist fingering, namely the focus on the effective gesture, the consideration of the action of each individual finger, and a recognition system not relying on comparison against a knowledge base of previously learned fingering positions. Motivated by these results, studies on three aspects of a complete fingering system were conducted: the first on finger tracking; the second on strings and frets detection; and the last one on movement segmentation. Finally, these concepts were integrated into a prototype and a system for left hand fingering detection was developed.

Sight-reading is the act of performing a piece of music at first sight. This can be a difficult task to master, because it requires extensive knowledge of music theory, practice, quick thinking, and most importantly, a wide variety of musical material. A musician can only effectively sight-read with a new piece of music. This not only requires many resources, but also musical pieces that are challenging while also within a player's abilities. A Thesis presented to the Faculty of California Polytechnic State University, San Luis Obispo, and published June 2016 by Drew Schulz entitled: "*Pianote: A Sight-Reading Program That Algorithmically Generates Music Based On Human Performance*", which is incorporated in its entirety for all purposes as if fully set forth herein, presents Piallote, a sight-reading web application for pianists that algorithmically generates music based on human performance. Piallote's goal is to alleviate some of the hassles that pianists face when sight-reading. Piallote presents musicians with algorithmically generated pieces, ensuring that a musician never sees the same piece of music twice. Piallote also monitors player performances in order to intelligently present music that is challenging, but within the player's abilities. As a result, Piallote offers a sight-reading experience that is tailored to the player. On a broader level, this thesis explores different methods in effectively creating a sight-reading application. We evaluate Piallote with a user study involving novice piano players. The players actively practice with Piallote over three fifteen-minute sessions. At the end of the study, users are asked to determine whether Piallote is an effective practice tool that improves both their confidence in sight-reading and their sight-reading abilities. Results suggest that Piallote does improve user's sightreading confidence and abilities, but further research must be conducted to clearly validate Piallote's effectiveness. We conclude that Piallote has potential to become an effective sight-reading application with slight improvements and further research.

A Brain Automated Chorales (BACh), an adaptive brain-computer system that dynamically increases the levels of difficulty in a musical learning task based on pianists' cognitive workload measured by functional near-infrared spectroscopy, is presented in an article in Bucknell University Conference Paper published May 2016 by Beste F. Yuksel, Kurt B. Oleson, Lane Harrison, Evan M. Peck, Daniel Afergan, Remco Chang, and Robert J K Jacob entitled: "*Learn Piano with BACh: An Adaptive Learning Interface that Adjusts Task Difficulty based on Brain State*", which is incorporated in its entirety for all purposes as if fully set forth herein. As users' cognitive workload fell below a certain threshold, suggesting that they had mastered the material and could handle more cognitive information, BACh automatically increased the difficulty of the learning task. We found that learners played with significantly increased accuracy and speed in the brain-based adaptive task compared to our control condition. Participant feedback indicated that they felt they learned better with BACh and they liked the timings of the level changes. The underlying premise of BACh can be applied to learning situations where a task can be broken down into increasing levels of difficulty.

In consideration of the foregoing, it would be an advancement in the art to provide a method, an apparatus, or a system, for improving the convenience, the usability, the enjoyment, or the time saving of enhancing music skills or teaching of playing a musical instrument. Preferably, such methods or systems may be providing an improved, simple, flexible, adaptive, more convenient, automatic, secure, cost-effective, reliable, versatile, time-saving, easy to install, use or monitor, has a minimum part count, portable, handheld, enclosed in a small or portable housing or vehicular, minimum hardware, and/or using existing and available components, protocols, programs and applications, and providing a better user practicing and learning experience, such as interactive and fun experience with minimum frustration, for enhancing of music skills or teaching of playing a musical instrument

SUMMARY

A method for teaching of playing of a musical instrument to a person, may be used with a client device that may comprise a microphone, a sounder (such as a speaker), and a display, may be used with a server device that may communicate over the Internet with the client device, may be used with a first database that may associate a respective skill level value to user identifiers, and may be used with a second database that may comprise sequences of musical symbols, where each of the sequences may be associated with a respective pace or tempo.

Any method herein may comprise obtaining, by the client device, an identifier of the person; sending, by the client device to the server device, the person identifier; receiving, by the server device from the client device, the person identifier; determining, by the server device by using the first database, a first skill level value associated with the received person identifier; selecting, by the server device, a first sequence of musical symbols from the second database that is associated with a first tempo or pace; sending, by the server device to the client device, the selected first sequence of musical symbols and the first pace; receiving, by the client device from the server device, the selected first sequence of musical symbols and the first pace; displaying, to the person by the display in the client device, the received first sequence of musical symbols at a second pace that is lower than the first pace and is based on the first pace and on the first skill level value; capturing, by the microphone in the client device, a sound from the musical instrument; sending, by the client device to the server device, the captured sound; receiving, by the server device from the client device, a digital representation of the captured sound; analyzing, by the server device, the captured sound and checking whether the captured sound matches the first sequence of musical symbols; determining, by the server device, the amount of musical symbols in the first sequence that do not match with the captured sound; and updating, by the server device, the skill level value associated with the person identifier in response to the amount of the musical symbols that do not match with the captured sound.

Any action or step herein, such as the displaying at the second pace comprises inducing, by the server device, by the client device, or by any combination thereof, a delay that is according to, or based on, the second pace.

Any method herein may be used with a second sequence of symbols that may be associated with the first pace and may be stored in the server device. The method may further comprise receiving, by the client device from the server device, the second sequence of musical symbols and the updated skill level value; displaying, to the person by the display in the client device, the received second sequence of musical symbols at a third pace that is based on the first pace and on the updated skill level value; capturing, by the microphone in the client device, a sound from the musical instrument; sending, by the client device to the server device, the captured sound; receiving, by the server device from the client device, a digital representation of the captured sound; analyzing, by the server device, the captured sound, and checking whether the captured sound matches the second sequence of musical symbols; determining, by the server device, the amount of musical symbols in the second sequence that do not match with the captured sound; and updating, by the server device, the skill level value associated with the person identifier in response to the amount of the musical symbols that do not match with the captured sound.

Any device herein, such as the server device, may comprise multiple parts of a musical piece, each represented by a distinct sequence of symbols Any method herein may further comprise selecting the second sequence from the multiple parts sequences. Any device herein, such as the server device, may comprise at least 2, 3, 4, 5, 7, 10, 12, 15, 20, 25, 30, 40, 50, 60, 80, or 100 parts, or may comprise less than 3, 4, 5, 7, 10, 12, 15, 20, 25, 30, 40, 50, 60, 80, 100, or 200 parts. Any parts herein, and any two parts herein, may be sequential or non-sequential in the musical piece. Any parts herein, and any two parts herein, may be overlapping or non-overlapping.

The duration of any one of the parts herein, of each of at least two of the parts herein, or of each one of the parts herein, may be at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the musical piece playing duration. Alternatively or in addition, the duration of any one of the parts herein, of each of at least two of the parts herein, or of each one of the parts herein, may be at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the musical piece playing duration. Alternatively or in addition, the duration of any one of the parts herein, of each of at least two of the parts herein, or of each one of the parts herein, may be at least at least 1, 2, 3, 5, 8, 10, 12, 15, 20, 25, 30, 40, 50, 60, 80, 100, 150, 200, 300, 500, or 1000 seconds, or may be less than 2, 3, 5, 8, 10, 12, 15, 20, 25, 30, 40, 50, 60, 80, 100, 150, 200, 300, 500, 1000 or 2000 seconds.

The number of symbols of any one of the parts herein, of each of at least two of the parts herein, or of each one of the parts herein, may be at least may be at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the number of symbols relating in the entire musical piece playing duration.

Any two sequences herein, such as the first and the second sequences herein, may be part of a musical piece or any part thereof, and any second sequence herein may be played immediately after, or mot immediately after, the first sequence in the musical piece. Alternatively or in addition, any two sequences herein, such as the first and the second sequences herein, may be overlapping, partially overlapping, or non-overlapping.

Any sequences herein, such as the first and the second sequences herein, may represent the same, or different, playing time. Further, any sequences herein, such as the first and the second sequences herein, may consist of, or may comprise, the same, or different, number of symbols.

Any method herein may be used with a threshold, and may further comprise comparing the amount of the non-matched musical symbols to the threshold, and acting in response to the number of non-matched musical symbols being above the threshold. Any acting herein may comprise storing, by the server device in the first database, an identifier of the first sequence associated with the person identifier. Alternatively or in addition, any acting herein may comprise sending, by the server device to the client device, a message; and receiving, by the client device from the server device, the message, and any message herein may comprise identification of the non-matching symbols. Any method herein may further comprise notifying, such as by the client device to the person, in response to the receiving of the message, of the non-matching symbols, such as by displaying, to the person on the display, of the non-matching symbols as marked.

Any threshold herein may be at least 1, 2, 3, 5, 8, 10, 12, 15, 20, 25, 30, 40, 50, 60, 80, 100, 150, 200, 300, 500, or 1000 non-matching symbols, or may be less than 2, 3, 5, 8, 10, 12, 15, 20, 25, 30, 40, 50, 60, 80, 100, 150, 200, 300, 500, 1000 or 2000 non-matching symbols. Alternatively or in addition, any threshold herein may be at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, of the number of symbols in any sequence, such as in the first sequence, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the number of symbols in any sequence, such as in the first sequence.

Any displaying herein may comprise displaying the musical symbols in the first sequence one at a time at the second pace, any capturing herein may comprise capturing the sound from the musical instrument that may be responsive to the last displayed music symbol, any analyzing herein of any captured sound and the checking may comprise analyzing of any received sound and comparing to the last displayed music symbol. Any determining herein of the amount of musical symbols may comprise counting the number of received sounds that may not match with the respective displayed symbols. Any method herein may further comprise, in response to counting of a single non-matching symbol, or in response to counting of two or more non-matching symbols, stopping of the displaying of the musical symbols in the first sequence. Alternatively or in addition, any method herein may be used with a second sequence of symbols that may be associated with the first pace and may be stored in the server device, and may further comprise in response to counting of a single non-matching symbol, or in response to counting of two or more non-matching symbols, displaying, to the person by the display in the client device, the second sequence of musical symbols at the second pace.

Alternatively or in addition, any method herein may be used with a second sequence of symbols that may be associated with the first pace and may be stored in the server device, and may further comprise in response to counting of a single non-matching symbol, or in response to counting of two or more non-matching symbols: sending, by the server device to the client device, a message; receiving, by the client device from the server device, the message; displaying, by the client device on the display, the received message; obtaining, by the client device from the person using an input component, a command; sending, by the client device to the server device, the obtained command; receiving, by the server device from the client device, the obtained command; and acting in response to the obtained command.

A method may be used with a musical piece, or part thereof, that may be cooperatively played by a first musical instrument according to first sequence of musical symbols, by a second musical instrument according to second sequence of musical symbols, and by a third musical instrument according to third sequence of musical symbols. Any method herein may be used with a first client device associated with the first musical instrument and operated by a first person that is identified by a first person identifier, with a second client device associated with the second musical instrument and operated by a second person that is identified by a second person identifier, and with a third client device associated with the third musical instrument and operated by a third person that is identified by a third person identifier, and each of the first, second, and third client devices may comprise a microphone, a sounder, and a display and communicates over the Internet with a server device that may store the first, second, and third sequences.

Any method herein may comprise (e.g., synchronously) sending, by the server device to the first, second, and third client devices, respectively the first, second, and third sequences of musical symbols; receiving, by first, second, and third client devices from the server device, respectively the first, second, and third sequences; displaying, to the first, second, and third persons by the respective display in the respective first, second, and third client devices, the respective received first, second, and third sequences; capturing, by the respective microphone in the first, second, and third client devices, respective first, second, and third sounds from the respective first, second, and third musical instruments; sending, by the first, second, and third client devices to the server device, the respective captured first, second, and third sounds; receiving, by the server device from the first, second, and third client devices, the respective captured first, second, and third sounds; analyzing, by the server device, the received captured first, second, and third sounds; sending, by the server device only to the second and third client devices, the received captured first sound; receiving, by the second and third client devices from the server device, the received captured first sound; emitting, by the sounder in the second and third client devices, the received captured first sound; sending, by the server device only to the third client device, the received captured second sound; receiving, by the third client device from the server device, the received captured second sound; and emitting, by the sounder in the third client devices, the received captured second sound.

Any method herein may further comprise sending, by the server device to the first client device, the received captured second and third sounds; receiving, by the first client devices from the server device, the received captured second and third sounds; and emitting, by the sounder in the first client device, the received captured second and third sounds. Any method herein may further comprise sending, by the server device to the second client device, the received captured third sound; receiving, by the second client device from the server device, the received captured third sound; and emitting, by the sounder in the second client device, the received captured third sound.

Any first musical instrument may consist of, or may comprise, a string instrument, and at least one of the first and second musical instruments consists of, or comprises, a string instrument, or at least one of the first and second musical instruments may consist of, or may comprise, an instrument that is not a string instrument. Alternatively or in addition, any first musical instrument may consist of, or may comprise, a woodwind instrument, and at least one of the first and second musical instruments consists of, or comprises, a woodwind instrument, or at least one of the first and second musical instruments may consist of, or may comprise, an instrument that is not a woodwind instrument.

Alternatively or in addition, any first musical instrument may consist of, or may comprise, a brass instrument, and at least one of the first and second musical instruments consists of, or comprises, a brass instrument, or at least one of the first and second musical instruments may consist of, or may comprise, an instrument that is not a brass instrument. Alternatively or in addition, any first musical instrument may consist of, or may comprise, a percussion instrument, and at least one of the first and second musical instruments consists of, or comprises, a percussion instrument, or at least one of the first and second musical instruments may consist of, or may comprise, an instrument that is not a percussion instrument.

Any one of, any of two of, each one of, any first, second, and third musical instruments herein may comprise or may consist of an instrument that may be selected from a group that consists of a soprano instrument, an alto instrument, a tenor instruments, a baritone instruments, and a bass instruments.

Any musical piece herein may be further cooperatively played by a fourth musical instrument according to a fourth sequence of musical symbols. Any method herein may further comprise sending, by the server device to the first, second, or third client device, the fourth sequence, (e.g., synchronized) with the sending of the first, second, and third sequences of musical symbols; receiving, by the respective first, second, or third client device from the server device, the fourth sequence; and emitting, by the sounder in the respective first, second, or third client device, a sound according to the fourth sequence that mimics the actual playing of the fourth musical instrument.

Any sending herein may comprise sending to the first, second, and third client devices, and any emitting herein may comprise emitting, by the sounder in each of the first, second, and third client device. Any fourth instrument herein may be is identical to, may be similar to, or may be different from, any first, second, or third musical instrument.

Any method herein may further comprise converting the musical symbols in the fourth sequence into corresponding sound data that may mimic the playing of the fourth sequence by the fourth musical instrument, and any emitting herein may comprise sounding of the converted sound data. Any converting herein may be performed by any server device herein or by any client device herein.

Any method herein may further comprise obtaining, by each of the client devices, the respective person identifier; sending, by each of the client devices to the server device, the respective person identifier; and receiving, by the server device from each of the client device, the respective person identifier. Any server device herein may further store a first skill level value associated with the first person identifier, a second skill level value associated with the second person identifier, and a third skill level value associated with the third person identifier, and any musical piece herein may be associated with a first pace.

Any (e.g., synchronously) sending of each of the first, second, and third sequences herein, or any displaying of each of the first, second, and third sequences, may be at a second pace that is equal to, or lower than, the first pace. Any second pace herein may be based on the first, second, and third skill level values, such as may be based on the lowest value of the first, second, and third skill level values.

Each of the skill level values herein may be represented by a numerical value, and any second pace herein may be calculated based on a linear or non-linear function of the numerical values multiplied by the first pace. Any (e.g., synchronously) sending herein and any displaying herein at the second pace may comprise inducing a delay that may be according to, or may be based on, the second pace. Any inducing of any delay herein may be performed by any server device or by each of the client devices.

Any method herein may further comprise checking, by any server device, whether the each of the received captured sounds matches the respective sequence; determining, by any server device, the amount of musical symbols in each of the sequences that do not match with the respective captured sound; and updating, by any server device, the skill level value associated with the respective person identifier in response to the amount of the musical symbols that do not match in the respective captured sound.

Any musical instrument herein may comprise a keyboard that may consist of a row of keys for being played by the person, and each of the musical symbols herein may be associated with one or more of the keys, and any checking herein may comprise comparing one or more symbols in the first sequence with the respective sounds when respective one or more keys are pressed by the person. Any analyzing of any captured sound herein may comprise extracting a feature of the captured sound, and any extracting of any feature herein may comprise, or may be based on, time-domain analysis, frequency-domain analysis, or time-frequency domain analysis. Any extracted feature herein may comprise, or may consist of, a tone frequency, an intensity of a tone, or a duration of a tone, a Chroma feature, zero crossings, a peak amplitude, a rise-time, an energy, or a time-delay.

Any analyzing of any captured sound herein may comprise, or may be based on, a time-domain analysis, or a frequency-domain analysis that may comprise, or may be based on, a frequency-domain representation that may be formed using, or may be based on, Fourier series, Fourier transform, Discrete Fourier Transform (DFT), Laplace transform, Z transform, or Wavelet transform. Alternatively or in addition, any feature herein may be extracted by using a Mel-Frequency Analysis, calculating Mel-Frequency Cepstral Coefficients (MFCC), using a Linear Predictive Coding (LPC), or calculating LPC coefficients.

Any analyzing or checking herein may be based on, or may use, an Artificial Neural Network (ANN) that may be trained to classify any captured sound to a musical symbol. Any ANN herein may consist of, may be based on, or may use, a Feedforward Neural Network (FNN), a Recurrent Neural Network (RNN), or a deep convolutional neural network. Further, Any ANN herein may consist of, may be based on, or may use, at least 3, 4, 5, 7, 10, 15, 20, 25, 30, 35, 40, 45, or 50 layers, or less than 4, 5, 7, 10, 15, 20, 25, 30, 35, 40, 45, or 50 layers.

Any ANN herein may be a Deep Neural Network (DNN), that may comprise, or may consist of, a Recurrent neural network (RNNs), a Convolutional deep Neural Network (CNNs), an AutoEncoder (AE), a Deep Belief Network (DBN), or a Restricted Boltzmann machine (RBM).

Any database herein, such as the second database, may further comprise a second sequence of musical symbols for playing of an additional musical instrument. Any method herein may further comprises sending, by the server device to the client device, the second sequence; receiving, by the client device from the server device, the second sequence; and emitting, by a sounder in the client device, a sound according to the second sequence that mimics the playing of the additional musical instrument. Any sequence herein, such as the first sequence, may be for playing of the musical instrument, and any musical piece herein or any part thereof may comprise any first and second sequences. Any emitting of any sound herein may be at any pace, such as at the second pace, and any displaying herein of the first sequence and the emitting of the sound are synchronized, such as being part of the musical piece.

Any method herein may further comprise converting, by any device such as by the server device or by the client device) any musical symbols in any sequence, such as in the second sequence, into corresponding sound data that may mimic the playing of the second sequence by the additional musical instrument, and any emitting herein may comprise sounding the converted sound data. Any method herein may further comprise selecting, by any person, any additional musical instrument, and sending, such as by the client device to the server device, the identification of the selected additional musical instrument. Any sounder herein may consist of, may comprise, may use, or may be based on, an electromagnetic loudspeaker, a piezoelectric speaker, an Electro-Static Loudspeaker (ESL), a ribbon magnetic loudspeaker, a planar magnetic loudspeaker, a bending wave loudspeaker, a piezoelectric transducer, crystal-based transducer, a capacitive transducer, or a magnetostrictive transducer.

Any method herein may be used with an additional client device that communicates over the Internet with the server device, and any method herein may further comprise sending, by the server device to the additional client device, the received captured sound.

Any method herein may be used with an additional client device that may communicate over the Internet with the server device, and may further comprise receiving, by the server device from the additional client device, a first sound; sending, by the server device to the client device, the first sound; and emitting, by a sounder in the client device, the first sound. Any sounder herein may consist of, may comprise, may use, or may be based on, an electromagnetic loudspeaker, a piezoelectric speaker, an Electro-Static Loudspeaker (ESL), a ribbon magnetic loudspeaker, a planar magnetic loudspeaker, a bending wave loudspeaker, a piezoelectric transducer, crystal-based transducer, a capacitive transducer, or a magnetostrictive transducer.

Any database herein, such as the second database may further comprise a second sequence of musical symbols for playing of an additional musical instrument, and may further comprise sending, by the server device to the additional client device, the second sequence. Any method herein may be used with a musical piece, and the first sequence may be for playing of the musical instrument, and the musical piece or a part thereof may comprise the first and second sequences. Any displaying herein of any sequence, such as the first sequence, and any emitting hereon of any sound, such as the first sound, may be synchronized.

Any method herein may further comprise obtaining, by the client device, a text that may include instructions or cues for playing on the musical instrument of the selected first sequence of musical symbols. Any text herein may comprise identification of the musical symbols in the selected first sequence of musical symbols, or may comprise instructions or cues associated with operating of the musical device. Any musical instrument herein may comprise a keyboard that may consist of a row of keys, and each of the instructions or cues herein may be associated with one or more keys.

Any method herein may further comprise converting the selected first sequence of musical symbols to generate the text, and any converting herein may be performed by the client device. Alternatively or in addition, any converting herein may be performed by the server device, and any method herein may further comprise sending the text, by the server device to the client device, and any obtaining by the client device may comprise receiving, by the client device from the server device, the text.

Any method herein may further comprise sounding, such as a human voice, by the client device, the text synchronized with the displaying of the received first sequence of musical symbols. Any sounding herein may comprise, or may be based on, a speech synthesizing or Text-to-Speech (TTS) scheme, that may use, or may be based on, a speech synthesizer that may be based on, or may use, a concatenative type, using unit selection, diphone synthesis, or domain-specific synthesis. Alternatively or in addition, any sounding herein may comprise, or may be based on, a speech synthesizing or Text-to-Speech (TTS) scheme, that may use, or may be based on, a speech synthesizer that may be based on, or may use, a formant type or may be Hidden Markov models (HMM) based. Alternatively or in addition, any sounding herein may comprise, or may be based on, a speech synthesizing or Text-to-Speech (TTS) scheme, that may use, or may be based on, stored prerecorded human voice.

Any method herein may further comprise haptic notifying, by the client device, in response to the selected first sequence of musical symbols. Any haptic notifying herein may comprise, may use, or may be based on, cutaneous, kinaesthetic, or orhaptic technology. Any haptic notifying herein may use vibration that may be produced by an Eccentric Rotating Mass (ERM) actuator, a Linear Resonant Actuator (LRA), piezoelectric actuators, an unbalanced motor, a loudspeaker, an ultrasound transducer, or an air vortex ring.

Any device herein, such as the client device, may comprise a projector, and any displaying herein may comprise illuminating, by the projector, elements of the musical instrument that may be associated with the received first sequence of musical symbols.

Any musical instrument herein may further comprise a keyboard that may consist of a row of keys, and any displaying herein may comprise illuminating, by the projector, on one or more keys that may be associated with the received first sequence of musical symbols. Any projector herein may comprise, or may consist of, an Eidophor projector, Liquid Crystal on Silicon (LCoS or LCOS) projector, LCD projector, MEMS projector, or Digital Light Processing (DLP™) projector.

Any method herein may further comprise notifying a feedback message, such as a text message, to the person in response to the amount of the musical symbols that do not match with the captured sound, or in response to updating the skill level value.

Any notification herein may comprise sounding as a human voice, by the client device, the text message, and any sounding herein may comprise, or may be based on, a speech synthesizing or Text-to-Speech (TTS) scheme. Any speech synthesizing or Text-to-Speech (TTS) herein may use, or may be based on, a speech synthesizer that may be based on, or may use, a concatenative type, using unit selection, diphone synthesis, domain-specific synthesis, a formant type or is Hidden Markov models (HMM) based. Alternatively or in addition, any notifying herein may comprise displaying, to the person by the display, the message.

Any method herein may be used with an electronic musical instrument that may comprise a port for outputting messages in response to actions of the person, and each of the musical symbols herein, such as in the selected first sequence, may correspond to a respective person action. Any method herein may comprise receiving, from the electronic musical instrument, the person actions; sending, by the client device to the server device, the received person actions; receiving, by the server device from the client device, the person actions; analyzing, by the server device, the person actions and checking whether the person actions match the first sequence of musical symbols; determining, by the server device, the amount of musical symbols in the first sequence that do not match with the person actions; and updating, by the server device, the skill level value associated with the person identifier in response to the amount of the musical symbols that do not match with the person actions.

Any receiving herein from any electronic musical instrument of the person actions may comprise receiving serial data stream according to an industry standard that may be according to, or may be based on, MIDI standard protocol. Further, any checking whether the person actions match the first sequence of musical symbols may be according to, or may be based on, MIDI standard protocol. Any electronic musical instrument herein may comprise, or may consist of, a MIDI controller or a MIDI keyboard.

Any port herein may comprise, or may consist of, a first antenna, and any receiving herein from the electronic musical instrument of the person actions may comprise receiving over a wireless communication by a second antenna using a wireless transceiver in the client device, and any wireless communication herein may comprise a Wireless Personal Area Network (WPAN), any wireless transceiver herein may comprise a WPAN transceiver, and any of the antennas herein may comprise an WPAN antenna. Any WPAN herein may be according to, may be compatible with, or may be based on, Bluetooth™, Bluetooth Low Energy (BLE), or IEEE 802.15.1-2005 standards, or wherein the WPAN is a wireless control network that may be according to, or may be based on, Zigbee™, IEEE 802.15.4-2003, or Z-Wave™ standards.

Alternatively or in addition, any port herein may comprise, or may consist of, a first connector, and any receiving herein from the electronic musical instrument of the person actions may comprise receiving over a wired point-to-point cable by a second connector in the client device. Any of the connectors herein may be a MIDI DIN connector, and any communication over the cable herein may be according to, or may be based on, MIDI standard protocol. Alternatively or in addition, any of the connectors herein may be a Universal Serial Bus (USB) connector, and any communication over any cable herein may be according to, or may be based on, USB 2.0 or USB 3.0 standard.

Any selecting herein any sequence of musical symbols, such as the first sequence of musical symbols, may comprises selecting, by the server device, a second sequence of musical symbols from the second database; and creating, by the server device, the first sequence of musical symbols from the selected second sequence of musical symbols by changing an arrangement of the selected second sequence of musical symbols for producing a simplified arrangement as the first sequence of musical symbols. Any changing herein of any arrangement to a simplified arrangement may be based on, or may be according to, a skill level value, such as the first skill level value Any sequence of musical symbols herein, such as the first sequence of musical symbols, may be associated with a distinct complexity or difficulty related value that may be equal to, or may be based on, any skill level value, such as the first skill level value, associated with the person identifier. Any method herein may be used with multiple musical pieces, and any selecting herein, such as by the server device or by the client device, of any sequence of musical symbols from any database, such as selecting of the second sequence of musical symbols from the second database, may comprises selecting of a musical piece from the multiple musical pieces. Any sequence of musical symbols herein, such as the second sequence of musical symbols, may be a non-simplified original sequence of musical symbols of the selected musical piece.

Any method herein may further comprise, responsive to any updating of the skill level value, creating, by any device such as the server device or the client device, a third sequence of musical symbols from the selected second sequence of musical symbols, such as by changing an arrangement of the selected second sequence of musical symbols for producing a simplified arrangement as the third sequence of musical symbols.

Any changing herein of any arrangement to a simplified arrangement may be based on, or may be according to, any skill level value, such as the updated skill level value. Any sequence of musical symbols herein, such as the third sequence of musical symbols, may be associated with a distinct complexity or difficulty related value that may be equal to, or may be based on, any skill level value that may be associated with the person identifier, such as the first skill level value that is associated with the person identifier.

Any method herein may further comprise, sending, by the server device to the client device, the third sequence of musical symbols; receiving, by the client device from the server device, the third sequence of musical symbols; displaying, to the person by the display in the client device, the third sequence of musical symbols; capturing, by the microphone in the client device, a sound from the musical instrument; sending, by the client device to the server device, a digital representation of captured sound; receiving, by the server device from the client device, the digital representation of the captured sound; analyzing, by the server device, the captured sound and checking whether the captured sound matches the third sequence of musical symbols; determining, by the server device, the amount of musical symbols in the third sequence that do not match with the captured sound; and updating, by the server device, the skill level value associated with the person identifier in response to the amount of the musical symbols that do not match with the captured sound.

Any producing herein of any simplified arrangement, such as the first or third sequence of musical symbols, may comprise changing a hand or finger motion relative to a geometry of the playing mechanism of the musical instrument; changing a playing speed, a note density, a Distinct Stroke Rate (DSR), a Pitch Entropy (PE), a Hand Displacement Rate (HDR), a Hand Stretch (HS), a PolyPhony Rate (PPR), an Altered Note Rate (ANR), or a fingering complexity (FCX); or a changing fingers positioning, a transition between symbols, a tempo, or decorations. Alternatively or in addition, any producing herein of any simplified arrangement, such as the first or third sequence of musical symbols, may comprise changing the physical difficulty of playing the sequence based on the physical structure of the musical instrument; changing a rhythmic difficulty that comprises a rate of playing and the irregularity of the musical symbols in time; changing a harmonic difficulty that comprises a combination complexity of simultaneously or sequentially played musical symbols; changing an expressivity difficulty that comprises a need to control and vary the loudness and timbre of the musical symbols; or changing the number of simultaneously played symbols or chords.

Any selecting herein, such as any selecting of a musical piece or a part thereof, may be based on, or may use, a First-In-First-Out (FIFO) scheme, a Last-In-First-Out (LIFO) scheme, a sequential or cyclic selection, a random selection, or any combination thereof. Alternatively or in addition, any selecting herein may be based on, or may use, a random selection that may be based on, or may use, one or more random numbers generated by a random number generator. Any random number generator herein may be hardware based, and may be based on, or may use, thermal noise, shot noise, nuclear decaying radiation, photoelectric effect, or quantum phenomena. Alternatively or in addition, any random number generator may be software based, such as based on executing an algorithm for generating pseudo-random numbers.

Any method herein may be used with a plurality of musical pieces, and any database herein, such as the second database, may comprise multiple sequences of musical symbols for each of the plurality of musical pieces, and a distinct complexity or difficulty related value may be associated with each of the multiple sequences of musical symbols of each of the plurality of musical pieces. Any selecting herein may comprise selecting of a musical piece from the plurality of musical pieces, and may further comprise selecting of a first sequence from the multiple sequences of musical symbols of the selected musical piece. Each of the plurality of musical pieces may be associated with an associated sequence of musical symbols that may be an original non-simplified version of the respective musical piece.

Any database herein, such as the second database, may further comprise a distinct complexity or difficulty related value associated with each of the multiple sequences of musical symbols, and any selecting herein may be based on comparing the complexity or difficulty values with the first skill level value associated with the person identifier. Each of the skill level values herein may be a numerical value, and each of the complexity or difficulty values may be a numerical value, and any selecting herein may be based on, or may use, selecting of a sequence of musical symbols that may be associated with a complexity or difficulty value that may be equal to, or lower than, the first skill level value associated with the person identifier.

Any method herein may further comprise estimating or calculating the complexity or difficulty related value that may be associated with at least one of, or all of, the multiple sequences of musical symbols. Any estimating or calculating of the complexity or difficulty related value herein may be performed by the server device, by the client device, or any combination thereof. Further, any estimating or calculating of the complexity or difficulty related value herein may be based on estimated complexity or difficulty of playing the at least one of the multiple sequences of musical symbols on the musical instrument.

Any method herein may further comprise, responsive to any updating the skill level value, selecting, such as based on comparing the complexity or difficulty values with the updated skill level value, a second sequence of musical symbols from the multiple sequences of musical symbols. Any two sequences herein, such as the first and second sequences, may be representations of the same musical piece, and the second sequence may follow the first sequence when playing the musical piece. Any method herein may further comprise sending, by the server device to the client device, the selected second sequence of musical symbols; receiving, by the client device from the server device, the selected second sequence of musical symbols; and displaying, to the person by the display in the client device, the received second sequence of musical symbols.

Any estimating or calculating herein of the complexity or difficulty related value of the at least one of the multiple sequences of musical symbols may be based on a required hand or finger motion and the geometry of the playing mechanism of the musical instrument, a playing speed, a note density, a pitch entropy, a hand displacement rate, a hand stretch, or fingering complexity.

Alternatively or in addition, any estimating or calculating herein of the complexity or difficulty related value of the at least one of the multiple sequences of musical symbols may be based on, or may comprise, associating identifying phrases in the sequence with a weighted importance value; estimating or calculating a distance of notes, tempo, or ease of interpretation; estimating or calculating fingers positioning, transition between symbols, tempo, or decorations; estimating or calculating motoric difficulty that comprises the physical difficulty of playing the sequence based on the physical structure of the musical instrument; rhythmic difficulty that comprises a rate of playing and the irregularity of the musical symbols in time; harmonic difficulty that comprises a combination complexity of simultaneously or sequentially played musical symbols; or expressivity difficulty that comprises a need to control and vary the loudness and timbre of the musical symbols.

Alternatively or in addition, any estimating or calculating herein of the complexity or difficulty related value of the at least one of the multiple sequences of musical symbols may be based on, or may comprise, extracting a feature of the sequence of musical symbols, and any extracting of any feature herein may comprise, or may be based on, time domain analysis, frequency domain analysis, or time-frequency domain analysis, using a Mel-Frequency Analysis, calculating Mel-Frequency Cepstral Coefficients (MFCC), using a Linear Predictive Coding (LPC), or calculating LPC coefficients. Any extracted feature herein may comprise, or may consist of, a tone frequency, an intensity of a tone, a duration of a tone, a Chroma feature, zero crossings, a peak amplitude, a rise-time, an energy, a time-delay, a frequency-domain representation that is formed using, or based on, Fourier series, Fourier transform, Discrete Fourier Transform (DFT), Laplace transform, Z transform, Wavelet transform, Any sequence of musical symbols herein may be based on, may consist of, or may comprise, instructions for playing a musical piece or a part thereof, and any pace herein may be based on, may consist of, or may comprise, a tempo that may be associated with the musical piece. Any tempo or pace herein may be based on, may consist of, or may comprise, Larghissimo, Adagissimo, Grave, Largo, Lento, Larghetto, Adagio, Adagietto, Andante, Andantino, Marcia moderato, Andante moderato, Moderato, Allegretto, Allegro moderato, Allegro, Molto Allegro, Vivace, Vivacissimo, Allegrissimo, Allegro vivace, Presto, or Prestissimo. Alternatively or in addition, any tempo herein may be above 24 beats per minute (bpm), may be above 200 bpm, or may be within one of the ranges of 25-45 bpm, 40-60 bpm, 45-60 bpm, 60-66 bpm, 66-76 bpm, 72-76 bpm, 70-80 bpm, 76-108 bpm, 80-108 bpm, 83-85 bpm, 92-98 bpm, 98-112 bpm, 102-110 bpm, 116-120 bpm, 120-156 bpm, 124-156 bpm, 156-176 bpm, 172-176 bpm, or 168-200 bpm.

Any pace or tempo herein that is based on another tempo or pace, may be less than 95%, 90%, 85%, 80%, 75%, 70%, 65%, 60%, 55%, 50%, 45%, 40%, 35%, 30%, 25%, 20%, 15%, or 10% of the another pace or tempo. Alternatively or in addition, any pace or tempo herein that is based on another tempo or pace, may be more than 90%, 85%, 80%, 75%, 70%, 65%, 60%, 55%, 50%, 45%, 40%, 35%, 30%, 25%, 20%, 15%, 10%, or 5% of the another pace or tempo. Alternatively or in addition, any pace or tempo value herein is calculated based on a linear or non-linear function of a numerical value multiplied by another pace or tempo value, and the numerical value may be a function of, or a representation of, a skill level such as the first skill level.

Any musical instrument herein may consists of, or may comprise, a Soprano instrument such as a flute, a violin, a soprano saxophone, a trumpet, a clarinet, an oboe, or a piccolo. Alternatively or in addition, any musical instrument herein may consists of, or may comprise, an Alto instrument, such as an alto saxophone, an French horn, an English horn, a viola, or an alto horn. Alternatively or in addition, any musical instrument herein may consists of, or may comprise, a Tenor instrument, such as a trombone, a tenoroon, a tenor saxophone, a tenor violin, a guitar, or a tenor drum. Alternatively or in addition, any musical instrument herein may consists of, or may comprise, a Baritone instrument, such as a bassoon, a baritone a saxophone, a bass clarinet, a cello, a baritone horn, or an euphonium. Alternatively or in addition, any musical instrument herein may consists of, or may comprise, a Bass instrument, such as a double bass, a bass guitar, a contrabassoon, a bass saxophone, a tuba, or a bass drum.

Any musical instrument herein may consist of, or may comprise, a string instrument that produces sound by means of vibrating strings, such as a guitar, an electric bass, a violin, a viola, a cello, a double bass, a banjo, a mandolin, an ukulele, or a harp. Any string instrument herein may consist of, or may comprise, a lute instrument in which the strings are supported by a neck and a bout, a harp instrument, in which the strings are contained within a frame, or a zither instrument, in which the strings are mounted on a body. Further, any string instrument herein be configured to be played by plucking, bowing, or striking. Furthermore, the string instrument any string instrument herein may be an acoustic instrument, or alternatively may comprise an electric amplification.

Any musical instrument herein may consist of, or may comprise, a woodwind instrument that produces sound when the player blows air against a sharp edge or through a reed, causing the air within its resonator to vibrate, such as a flute, a piccolo, an oboe, an English horn, a clarinet, a bass clarinet, a bassoon, a contrabassoon, or a saxophone. Any woodwind instrument herein may consist of, or may comprise, a flute that is configured to produce sound when air is blown across an edge, and any flute herein may consist of, or may comprise, an open flute, in which the player's lips form a stream of air which goes directly from the players lips to the edge, or a closed flute, in which in which the musical instrument has a channel to form and direct the air stream over an edge. Alternatively or in addition, any woodwind instrument herein may consist of, or may comprise, a reed instrument that is configured to produce sound by focusing air into a mouthpiece which then causes a reed, or reeds, to vibrate, and any reed instrument herein may consist of, or may comprise, a single reed instrument that uses a reed, which is a thin-cut piece of cane or plastic that is held against the aperture of a mouthpiece with a ligature, so that when air is forced between the reed and the mouthpiece, the reed vibrates to create a sound, a double reed instrument that uses two precisely cut small pieces of cane that are joined together at the base and are inserted into the top of the instrument to vibrate as air is forced between the two pieces, or a capped double reed instrument configured to vibrate when the player blows through a hole in a cap that covers the reed.

Any musical instrument herein may consist of, or may comprise, a brass instrument that produces sound by sympathetic vibration of air in a tubular resonator in sympathy with the vibration of the player's lips, such as a Trumpet, a Cornet, a Horn, a Trombone, a Saxhorn, or a Tuba. Any brass instrument herein may consist of, or may comprise, a valved brass instrument that uses a set of valves operated by the player's fingers that introduce additional tubing, or crooks, into the instrument for changing its overall length, or a slide brass instrument that uses a slide to change the length of tubing.

Any musical instrument herein may consist of, or may comprise, a percussion instrument that is configured to produce sound by being struck or scraped by a beater, such as a timpani, a snare drum, a bass drum, cymbals, a triangle, a tambourine, a glockenspiel, or a xylophone. Any percussion instrument herein may consist of, or may comprise, a pitched percussion instrument that produces notes with an identifiable pitch, or an unpitched percussion instrument that produces notes or sounds in an indefinite pitch.

Any musical instrument herein may comprise, or may be based on, an acoustic, stringed musical instrument, configured so that the strings are struck by wooden hammers that are coated with a softer material, and the musical instrument may further comprise a keyboard that may consist of a row of keys, may be configured so that the performer presses down or strikes with the fingers and thumbs of both hands to cause the hammers to strike the strings. Any musical instrument herein may comprise, or may consist of, a piano, that may comprise, or may consist of, a grand piano, an upright piano, or an electronic piano.

Any playing of any musical instrument herein may consists of, may comprises, or may be supplemented with, a vocal music, that may be with or without instrumental accompaniment, and may use lyrics, such as singing.

Any sequence herein may include musical symbols, and each of the musical symbols in the sequence may be according to a musical notation convention. Further, any sequence herein may be part of, or may consist of, a music sheet. Any sequence herein may include one or more clefs that may define the pitch range or the tessitura of the symbol on which it is placed, one or more musical notes that may denote a musical sound or the pitch and duration of a musical sound, one or more accidentals that may denote a pitch or a pitch class, one or more key signatures that may define the prevailing key of the music that follows, one or more time signatures that may define the meter of the music, one or more lines or a note relationships, one or more dynamics that may indicate the relative intensity or volume of a musical line, one or more articulations that may specify how to perform individual notes within a phrase or passage, one or more ornaments that may modify the pitch pattern of an individual note, one or more octave signs, repetitions or codas, one or more pedal marks, or any combination thereof.

Any method herein may be used with a threshold, and any updating herein may comprise raising or lowering of the skill level value associated with the person identifier in response to the amount of the non-matching musical symbols being less or more than the threshold. Any threshold herein may be at least 1, 2, 3, 5, 8, 10, 15, 20, 30, or 50 non-matching symbols, or may be less than 1, 2, 3, 5, 8, 10, 15, 20, 30, or 50 non-matching symbols. Alternatively or in addition, any threshold herein may be at least 0.1%, 0.2%, 0.5%, 0.8%, 1%, 2%, 3%, 5%, 8%, 10%, 15%, 20%, 30%, or 50% non-matching symbols out of the total number of symbols in the sequence, or may be less than 0.1%, 0.2%, 0.5%, 0.8%, 1%, 2%, 3%, 5%, 8%, 10%, 15%, 20%, 30%, or 50% non-matching symbols out of the total number of symbols in the sequence. Alternatively or in addition, any method herein may be used with low and high thresholds, and any updating herein may comprise unchanging the skill level value associated with the person identifier in response to the amount of the non-matching musical symbols being more than the low threshold and less than the high threshold.

Any sequence herein of any musical symbols may represents an entire of, or part of, a musical piece. Any musical piece herein may include symbols for multiple musical instruments, and any sequence herein may represent or include symbols adapted only for one specific musical instrument. Any musical piece herein may comprise, or may consist of a song, a vocal music work, or a classical music work, such as an Aria, an Cadenza, an Concerto, an Movement, an Overture, an Opera, an Sonata, an Chamber music, or an Symphony.

Alternatively or in addition, any musical piece herein may comprise, or may consist of, a popular music work, such as a song, a dance, or a Funk, Country, Latin, Reggae, Hip-hop, or Polka music genre.

Any sequence of the musical symbols herein may represent a part of the musical piece that may be associated with a duration of playing the entire musical piece, or that may define a number of symbols. Any duration of any part herein is at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95%, of the duration of the playing time of the musical piece. Alternatively or in addition, any duration of playing any sequence herein is at least 1, 2, 3, 5, 8, 10, 12, 15, 20, 25, 30, 40, 50, 60, 80, 100, 150, 200, 300, 500, or may be less than 2, 3, 5, 8, 10, 12, 15, 20, 25, 30, 40, 50, 60, 80, 100, 150, 200, 300, 500, 1000 or 2000 seconds. Alternatively or in addition, any sequence herein may comprise, or may consist of, at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, or may comprise, or may consist of, less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95%, of the number of symbols of the entire musical piece. Alternatively or in addition, any sequence herein may comprise, or may consist of, at least 1, 2, 3, 5, 8, 10, 12, 15, 20, 25, 30, 40, 50, 60, 80, 100, 150, 200, 300, 500, or 1000 symbols, or less than 2, 3, 5, 8, 10, 12, 15, 20, 25, 30, 40, 50, 60, 80, 100, 150, 200, 300, 500, 1000 or 2000 symbols.

Any microphone herein may be configured to respond to audible or inaudible sound, and may be an omnidirectional, unidirectional, or bidirectional microphone. Any microphone herein may be based on the sensing the incident sound-based motion of a diaphragm or a ribbon. Alternatively or in addition, any microphone herein may consist of, or may comprise, a condenser, an electret, a dynamic, a ribbon, a carbon, an optical microphone, or a piezoelectric microphone. Further, any microphone herein may consist of, may comprise, or may be based on, a microphone array for improving directivity.

Any display or any display screen herein may consist of, or may comprise, a monochrome, grayscale or color display and consists of an array of light emitters or light reflectors, or a projector that is based on an Eidophor, Liquid Crystal on Silicon (LCoS or LCOS), LCD, MEMS or Digital Light Processing (DLP™) technology. Any projector herein may consist of, or may comprise, a virtual retinal display. Further, any display or any display screen herein may consist of, or may comprise, a 2D or 3D video display that may support Standard-Definition (SD) or High-Definition (HD) standards, and may be capable of scrolling, static, bold or flashing the presented information.

Alternatively or in addition, any display or any display screen herein may consist of, or may comprise, an analog display having an analog input interface supporting NTSC, PAL or SECAM formats, and the analog input interface may include RGB, VGA (Video Graphics Array), SVGA (Super Video Graphics Array), SCART or S-video interface. Alternatively or in addition, any display or any display screen herein may consist of, or may comprise, a digital display having a digital input interface that may include IEEE1394, FireWire™, USB, SDI (Serial Digital Interface), HDMI (High-Definition Multimedia Interface), DVI (Digital Visual Interface), UDI (Unified Display Interface), DisplayPort, Digital Component Video or DVB (Digital Video Broadcast) interface. Alternatively or in addition, any display or any display screen herein may consist of, or may comprise, a Cathode-Ray Tube (CRT), a Field Emission Display (FED), an Electroluminescent Display (ELD), a Vacuum Fluorescent Display (VFD), or an Organic Light-Emitting Diode (OLED) display, a passive-matrix (PMOLED) display, an active-matrix OLEDs (AMOLED) display, a Liquid Crystal Display (LCD) display, a Thin Film Transistor (TFT) display, an LED-backlit LCD display, or an Electronic Paper Display (EPD) display that may be based on Gyricon technology, Electro-Wetting Display (EWD), or Electrofluidic display technology. Alternatively or in addition, any display or any display screen herein may consist of, or may comprise, a laser video display that is based on a Vertical-External-Cavity Surface-Emitting-Laser (VECSEL) or a Vertical-Cavity Surface-Emitting Laser (VCSEL). Further, any display or any display screen herein may consist of, or may comprise, a segment display based on a seven-segment display, a fourteen-segment display, a sixteen-segment display, or a dot matrix display, and may be operative to display digits, alphanumeric characters, words, characters, arrows, symbols, ASCII, non-ASCII characters, or any combination thereof.

Any sound herein may be audible or inaudible (or both), and may be omnidirectional, unidirectional, bidirectional, or provide other directionality or polar patterns. Any sounder herein may be an electromagnetic loudspeaker, a piezoelectric speaker, an Electro-Static Loudspeaker (ESL), a ribbon or planar magnetic loudspeaker, or a bending wave loudspeaker. Any sounder herein may consist of, may comprise, may use, or may be based on, an electric sound source that may convert electrical energy into sound waves, and the electric sound source may be configured to emit an audible or inaudible sound using omnidirectional, unidirectional, or bidirectional pattern. Further, any sounder herein may convert electrical energy to sound waves transmitted through the air, an elastic solid material, or a liquid, usually by means of a vibrating or moving ribbon or diaphragm.

Further, the electric sound source may consist of, may comprise, may use, or may be based on, an electromagnetic loudspeaker, a piezoelectric speaker, an electrostatic loudspeaker (ESL), a ribbon magnetic loudspeaker, a planar magnetic loudspeaker, or a bending wave loudspeaker. Alternatively or in addition, the electric sound source may consist of, may comprise, may use, or may be based on, an electromechanical scheme or a ceramic-based piezoelectric effect. Alternatively or in addition, the electric sound source may consist of, may comprise, may use, or may be based on, an ultrasonic transducer that may be a piezoelectric transducer, crystal-based transducer, a capacitive transducer, or a magnetostrictive transducer.

Any server herein may be storing, operating, or using, a server operating system, which may consist of, may comprise, or may be based on, one out of Microsoft Windows Server®, Linux, or UNIX, or may consist of, may comprise, or may be based on, one out of Microsoft Windows Server® 2003 R2, 2008, 2008 R2, 2012, or 2012 R2 variant, Linux™ or GNU/Linux-based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®.

Any software or firmware herein may comprise an operating system that may be a mobile operating system. The mobile operating system may consist of, may comprise, may be according to, or may be based on, Android version 2.2 (Froyo), Android version 2.3 (Gingerbread), Android version 4.0 (Ice Cream Sandwich), Android Version 4.2 (Jelly Bean), Android version 4.4 (KitKat), Android version 6.0 (Marshmallow), Android version 7.0 (Nougat), Android version 8.0 (Oreo), Android version 9.0 (Pie), Android 10, Android 11, Apple iOS version 3, Apple iOS version 4, Apple iOS version 5, Apple iOS version 6, Apple iOS version 7, Apple iOS version 8, Apple iOS version 9, Apple iOS version 10, Apple iOS version 11, Apple iOS version 12, Apple iOS version 13, Apple iOS version 14, Microsoft Windows® Phone version 7, Microsoft Windows® Phone version 8, Microsoft Windows® Phone version 9, or Blackberry® operating system. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (µC/OS).

Any device herein may consist of, may comprise, may be part of, or may integrated with, a client device that may comprise a single enclosure that may house the microphone and the display. Any device herein may consist of, may comprise, may be part of, or may integrated with, a client device, that may consist of, may comprise, may be part of, or may integrated with, a hand-held enclosure, a portable enclosure, or a surface mountable enclosure. Further, any client device herein may consist of, may comprise, may be part of, or may be integrated with, a notebook computer, a laptop computer, a media player, a cellular telephone, a tablet device, or a smartphone, which may consist of, may comprise, or may be based on, an Apple iPhone 12 or a Samsung Galaxy S20.

Any device herein, such as any client device herein, may be configured or shaped to be wearable on a person, such as on an organ of the person head, and the organ may be an eye, ear, face, cheek, nose, mouth, lip, forehead, or chin. Any device herein may include an enclosure that may be constructed to have a form substantially similar to, may be constructed to have a shape allowing mounting or wearing identical or similar to, or may be constructed to have a form to at least in part substitute for, headwear, eyewear, or earpiece.

Any headwear herein may consist of, may be structured as, or may comprise, a bonnet, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Any enclosure herein may be permanently or releasably attachable to, or is part of, a clothing piece of a person, and any attaching herein may use taping, gluing, pinning, enclosing, encapsulating, a pin, or a latch and hook clip. Any clothing piece herein may be a top, bottom, or full-body underwear, or a headwear, a footwear, an accessory, an outwear, a suit, a dress, a skirt, or a top. Any device herein may comprise an annular member defining an aperture therethrough that is sized for receipt therein of a part of a human body. Any human body part herein may be part of a human hand that may consist of, or may comprise, an upper arm, elbow, forearm, wrist, or a finger. Alternatively or in addition, any human body part herein may be part of a human head or neck that may consist of, or may comprise, a forehead, ear, skull, or face. Alternatively or in addition, any human body part herein may be a part of a human thorax or abdomen that may consist of, or may comprise, a waist or hip. Alternatively or in addition, any human body part herein may be part of a human leg or foot that may consist of, or may comprise, a thigh, calf, ankle, instep, knee, or toe.

Any method herein may be in combination with a Virtual Reality (VR) system that simulates a virtual environment to the person, and any communication herein with the VR system may be wired or wireless. Any VR system herein may comprises a Head-Mounted Display (HMD), and any device herein, such as any client device herein, may comprise, may be part of, may consist of, or may be integrated with, the HMD. Any method herein may further be used in an Augmented Reality (AR) system or a Spatial Augmented Reality (SAR), that simulates a virtual environment to the person, and any display herein may comprise, may be implemented as, or may be integrated with, an Head-Mounted Display (HMD), a Head-Up Display (HUD), contact lenses, a Virtual Retinal Display (VRD).

Any integration herein, such as integration of any client device herein with any musical instrument herein, may involve sharing a component, housing in same enclosure, sharing same processor, mounting onto same surface, or sharing a same connector, which may be a power connector for connecting to a power source. Alternatively or in addition, the integration may involve sharing the same connector for being powered from same power source, or the integration may involve sharing same power supply.

Any communication herein, such as between a client device and a server device, may be over the Internet. Alternatively or in addition, the communication may be over the Internet via a wireless network, and the client device may comprise an antenna and a wireless transceiver coupled to the antenna for communication via the wireless network.

Any wireless network herein may comprise a Wireless Wide Area Network (WWAN), any wireless transceiver herein may comprise a WWAN transceiver, and any antenna herein may comprise a WWAN antenna. Any WWAN herein may be a wireless broadband network. The WWAN may be a WiMAX network, the antenna may be a WiMAX antenna and the wireless transceiver may be a WiMAX modem, and the WiMAX network may be according to, compatible with, or based on, IEEE 802.16-2009. Alternatively or in addition, the WWAN may be a cellular telephone network, the antenna may be a cellular antenna, and the wireless transceiver may be a cellular modem, where the cellular telephone network may be a Third Generation (3G) network that may use a protocol selected from the group consisting of UMTS W-CDMA, UMTS HSPA, UMTS TDD, CDMA2000 1×RTT, CDMA2000 EV-DO, and GSM EDGE-Evolution, or the cellular telephone network may use a protocol selected from the group consisting of a Fourth Generation (4G) network that use HSPA+, Mobile WiMAX, LTE, LTE-Advanced, MBWA, or may be based on IEEE 802.20-2008.

Any wireless network herein may comprise a Wireless Personal Area Network (WPAN), the wireless transceiver may comprise a WPAN transceiver, and the antenna may comprise a WPAN antenna. The WPAN may be according to, compatible with, or based on, Bluetooth™, Bluetooth Low Energy (BLE), or IEEE 802.15.1-2005 standards, or the WPAN may be a wireless control network that may be according to, or may be based on, Zigbee™, IEEE 802.15.4-2003, or Z-Wave™ standards. Any wireless network herein may comprise a Wireless Local Area Network (WLAN), \ the wireless transceiver may comprise a WLAN transceiver, and the antenna may comprise an WLAN antenna. The WLAN may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac. Any wireless network herein may be over a licensed or unlicensed radio frequency band that may be an Industrial, Scientific and Medical (ISM) radio band.

Any method herein may be performed partly or in full by any device, such as any client device or any server device herein. Alternatively or in addition, any method herein may be split between two or more devices, such as between a client device and a server device. Any database herein may be a relational database system, and may be Structured Query Language (SQL) based.

Any method herein may comprise communicating, such as by the device, with an Internet-connected server. Any server herein may comprise a database, and any method herein may further comprise communicating with the server for using or accessing the database. Any communicating herein with the server may be via a wireless network that may use a wireless transceiver and an antenna in the device. Any method herein may further comprise sending, via the wireless network to the server, the identified items or the estimated current location of the device.

Any method herein may use, or may be used with, a virtualization, and any communication herein, such as between the device and the server, may be executed as a virtualized network as part of a Virtual Machine (VM). Any method herein may use, or may be used with, a host computer that may implement the VM, and any method herein may further comprise executing, by the host computer, a hypervisor or a Virtual Machine Monitor (VMM), and any virtualized network herein may use or may interface virtual hardware, and the virtualization may include, may be based on, or may use, full virtualization, para-virtualization, or hardware assisted virtualization.

Any network herein may be a wireless network, the first port may be an antenna for transmitting and receiving first Radio-Frequency (RF) signals over the air, and the first transceiver may be a wireless transceiver coupled to the antenna for wirelessly transmitting and receiving first data over the air using the wireless network. Alternatively or in addition, the network may be a wired network, the first port may be a connector for connecting to the network medium, and the first transceiver may be a wired transceiver coupled to the connector for transmitting and receiving first data over the wireless medium.

Any system, device, module, or circuit herein may be addressable in a wireless network (such as the Internet) using a digital address that may be a MAC layer address that may be MAC-48, EUI-48, or EUI-64 address type, or may be a layer 3 address and may be a static or dynamic IP address that may be of IPv4 or IPv6 type address. Any system, device, or module herein may be further configured as a wireless repeater, such as a WPAN, WLAN, or a WWAN repeater.

Any method herein, any step herein, any flow-chart herein, or any part thereof, may be used with a virtualization, and at least one of the steps or methods herein may be executed as part of a virtualized application as part of a Virtual Machine (VM). Any device herein, such as the analyzer device, the first device, or any part thereof, may be implemented as virtual hardware. Any virtualization herein may be used with an host computer that implement the VM, and may further comprising executing, by the host computer, a hypervisor or a Virtual Machine Monitor (VMM). Any virtualized application herein or any or hardware virtualization herein may use or may interface virtual hardware. Any virtualization herein may include, may be based on, or may use, full virtualization, para-virtualization, or hardware assisted virtualization.

Any operating system herein may be used with a virtualization, and any operating system herein may be executed as a guest operating system as part of a Virtual Machine (VM). The virtualization may be implemented by a host computer that may implement the VM, and any method herein may further comprise executing, by the host computer, a hypervisor or a Virtual Machine Monitor (VMM), and the guest operating system may use or interface virtual hardware. Any such virtualization herein may include, may be based on, or may use, full virtualization, para-virtualization, or hardware assisted virtualization.

Any element or entity herein may be implemented as virtualized entity. Any virtualization may include, may be based on, or may use, desktop virtualization, network virtualization, storage virtualization, application virtualization, server virtualization, or any combination thereof. Further, any virtualization herein may include, may be based on, or may use, full virtualization, para-virtualization, or hardware assisted virtualization. Further, any virtualization herein may include, may be based on, or may use, a Virtual Machine (VM) on a host computer that executes a hypervisor or Virtual Machine Monitor (VMM), and the operating system may be a guest operating system that may use or interface a virtual hardware.

Any method herein may be used with a virtualization, where at least one of the steps may be executed as part of a virtualized application as part of a Virtual Machine (VM). Alternatively or in addition, any device or server herein may be implemented as virtual hardware. Further, any method herein may be used with a host computer that may implement the VM, and any method herein may further comprise executing, by the host computer, a hypervisor or a Virtual Machine Monitor (VMM), and any virtualized application herein or any hardware herein may use or may interface virtual hardware. Any virtualization herein may include, may be based on, or may uses, full virtualization, para-virtualization, or hardware assisted virtualization. At least two devices may be virtualized by the same host computer that implements the VM.

Any selection herein, such as any selection from any list or group, may be based on, or may use, a load balancing, a First-In-First-Out (FIFO) scheme, a Last-In-First-Out (LIFO) scheme, a sequential or cyclic selection, a random selection, or any combination thereof. Any random selection herein may use, or may be based on, one or more random numbers generated by a random number generator. Any random number generator herein may be hardware based, and may be using thermal noise, shot noise, nuclear decaying radiation, photoelectric effect, or quantum phenomena. Alternatively or in addition, any random number generator herein may be software based, and may be based on executing an algorithm for generating pseudo-random numbers.

The above summary is not an exhaustive list of all aspects of the systems and methods described. Indeed, it is contemplated that this document covers all systems and methods that can be practiced from all suitable combinations and derivatives of the various aspects summarized above, as well as those disclosed in the detailed description below, and particularly pointed out in the claims filed with the application. Such combinations have particular advantages not specifically recited in the above summary.

BRIEF DESCRIPTION OF THE DRAWINGS

Various aspects of the system and method are herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 14 depicts schematically musical pieces database that includes multiple versions or variants for one or more of the musical pieces that corresponds to various complexity or difficulty levels.

FIG. 16 illustrates a simplified schematic table that associates to a musical piece various musical instruments and instructions for playing the musical piece.

FIG. 16*a* illustrates a simplified schematic practice tables that associate, for each user, a source of each musical instrument that is part of the musical piece.

FIG. 18*a* illustrates a simplified schematic practice tables that associate, for each user, a source of each musical instrument that is part of the musical piece in a scenario of playing at the same location.

FIG. 19*a* illustrates a simplified schematic practice tables that associate, for each user, a source of each musical instrument that is part of the musical piece in a scenario of playing at different locations, without cooperation between the users.

FIG. 20*a* illustrates a simplified schematic practice tables that associate, for each user, a source of each musical instrument that is part of the musical piece in a scenario of playing at different locations, while using artificially produced sound of various musical instruments.

FIG. 21*a* illustrates a simplified schematic practice tables that associate, for each user, a source of each musical instrument that is part of the musical piece in a scenario of playing at different locations, where two users hear the playing of other musical instruments by other users.

FIG. 22*a* illustrates a simplified schematic practice tables that associate, for each user, a source of each musical instrument that is part of the musical piece in a scenario of playing at different locations, where all the users hear the playing of other musical instruments by all other users.

DETAILED DESCRIPTION

Figure 1:
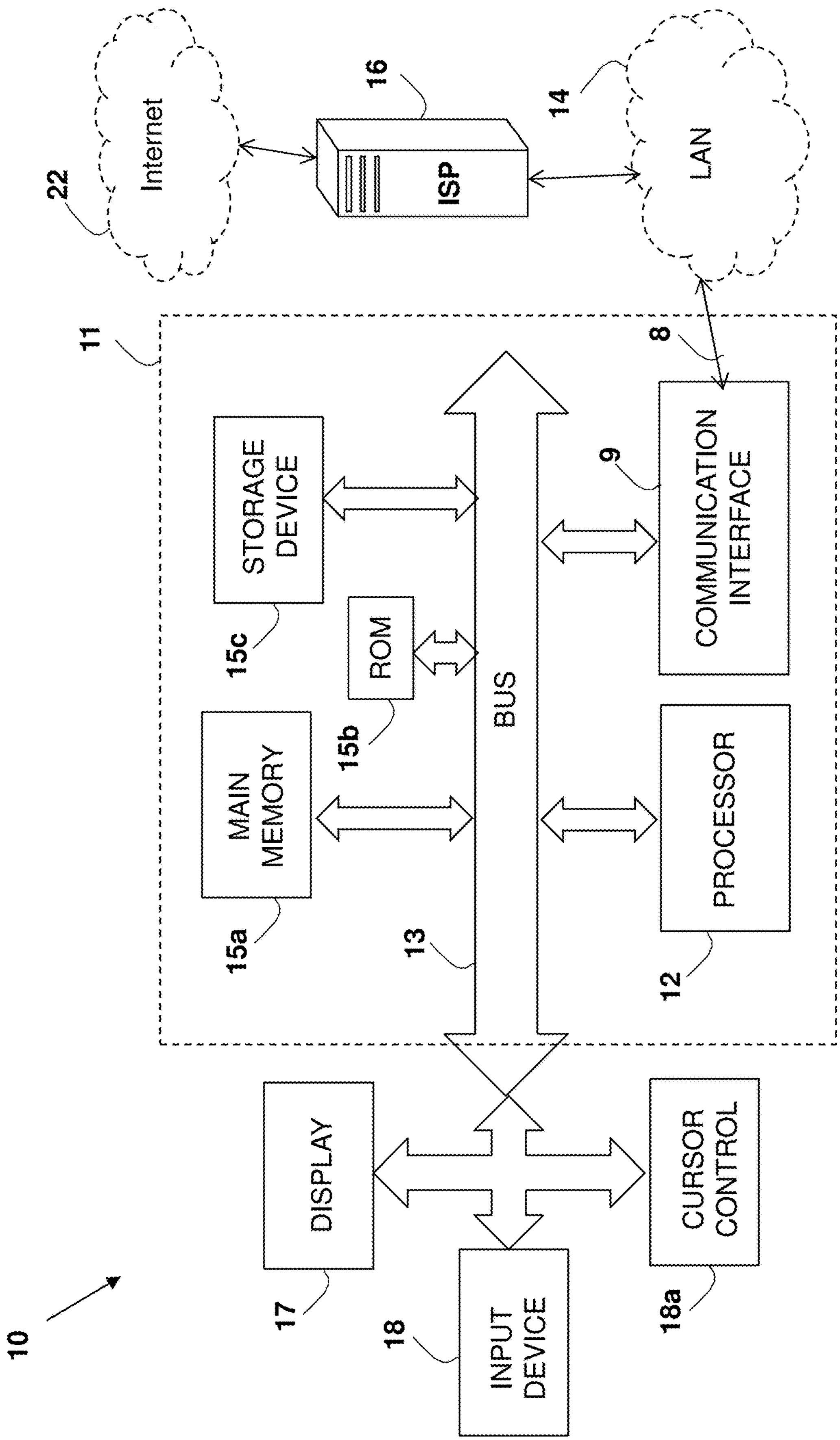
FIG. 1 illustrates schematically a block diagram of a prior-art computer connected to the Internet.
Figure 1A:
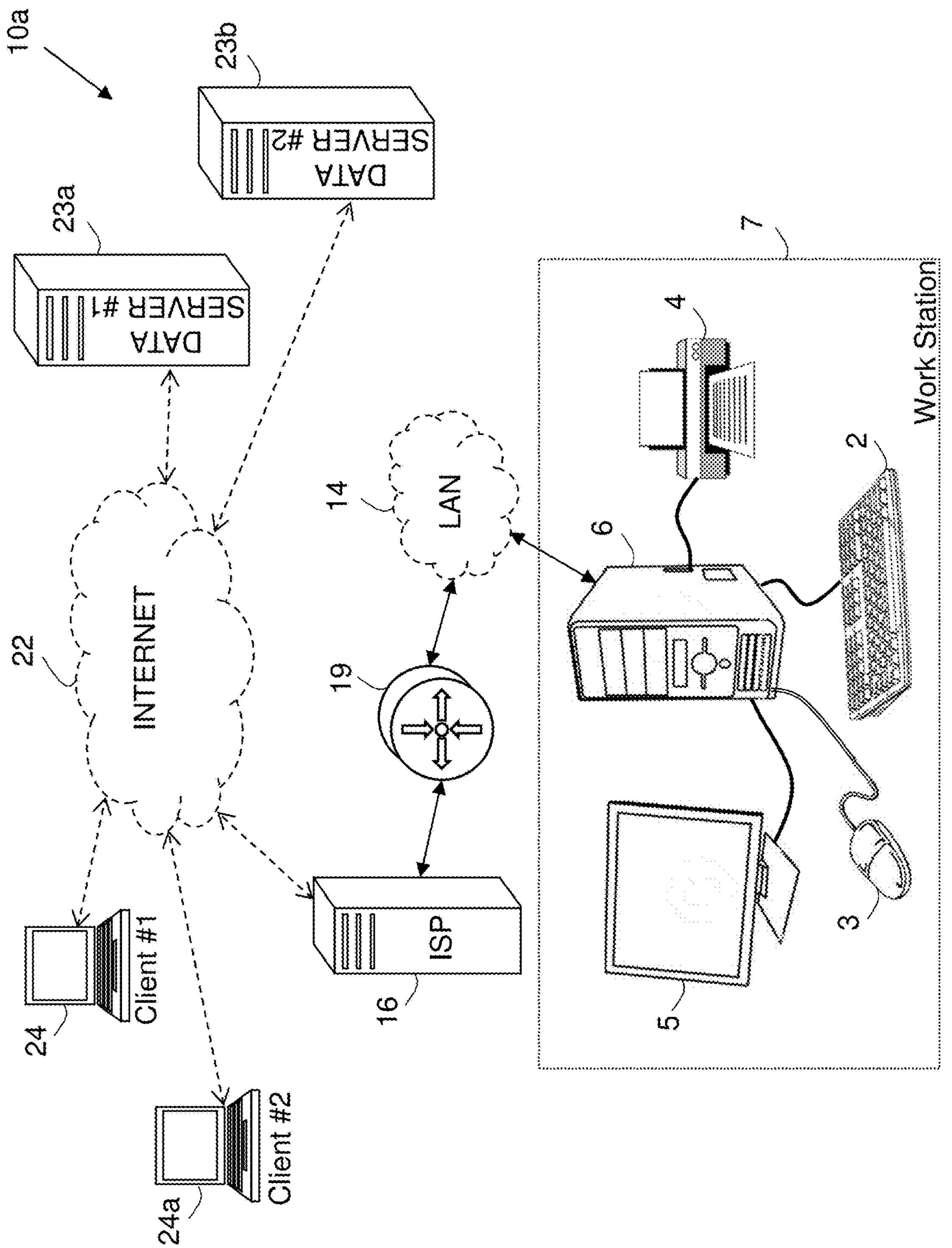
FIG. 1*a* illustrates schematically prior-art servers, clients, and a computer workstation connected via the Internet.
Figure 2:
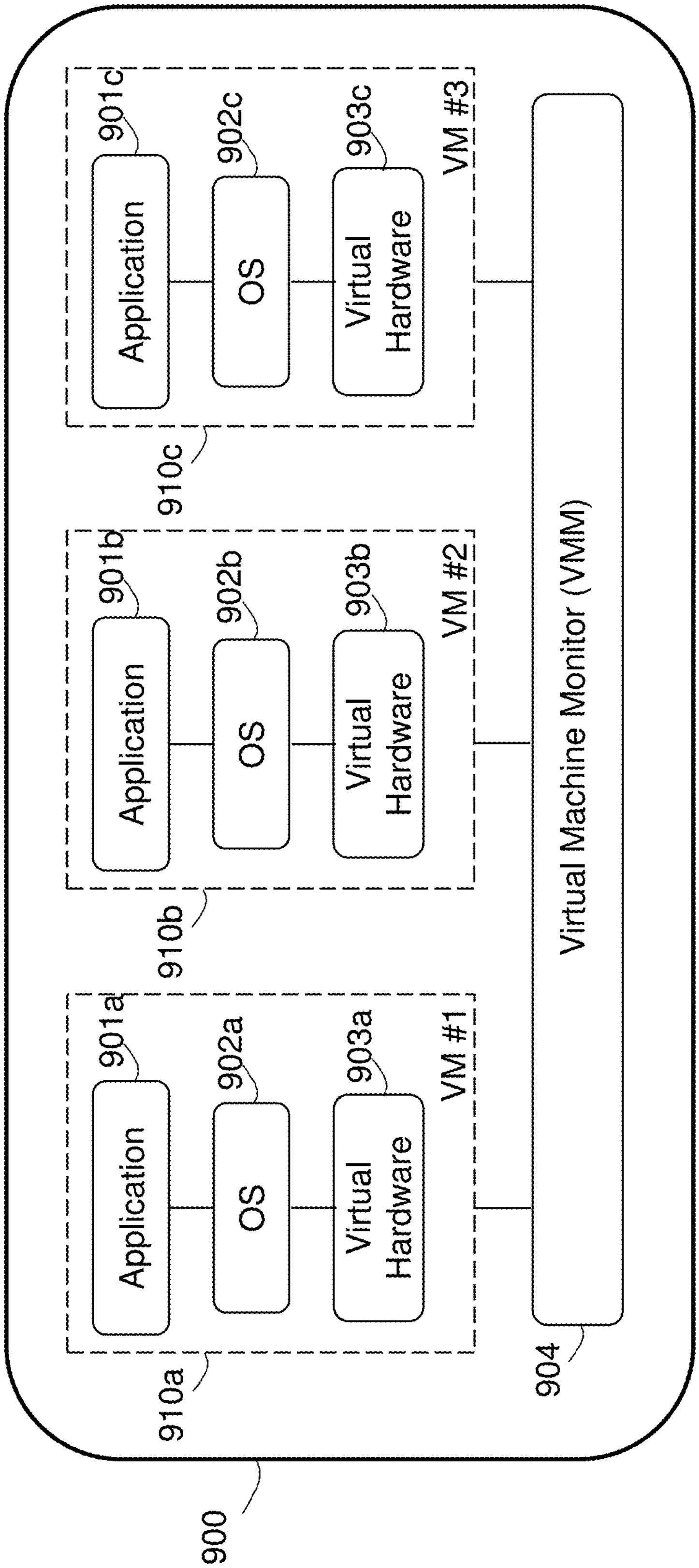
FIG. 2 illustrates schematically a prior-art arrangement of virtualization.
Figure 2A:
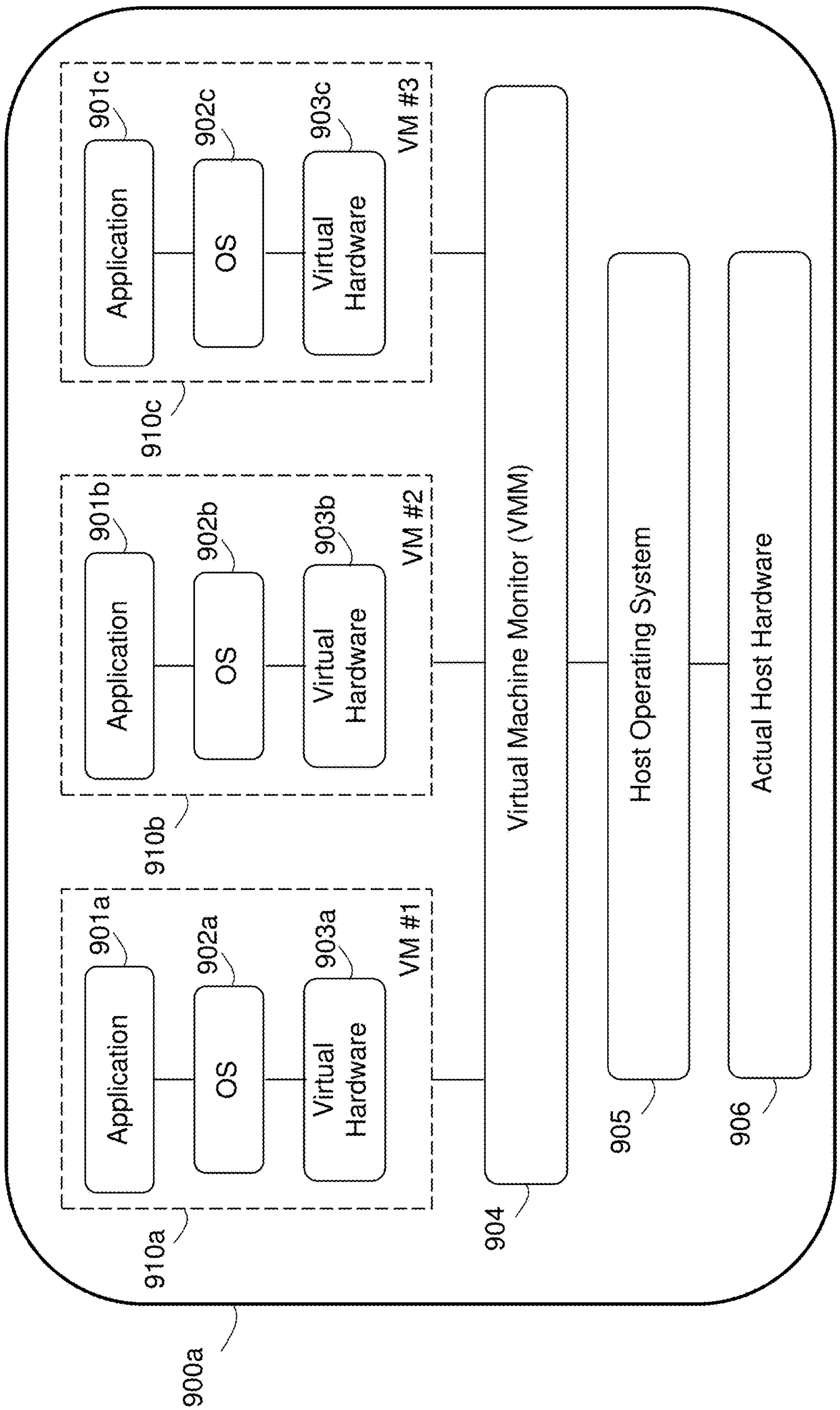
FIG. 2*a* illustrates schematically a prior-art arrangement of hosted architecture of virtualization.
Figure 2B:
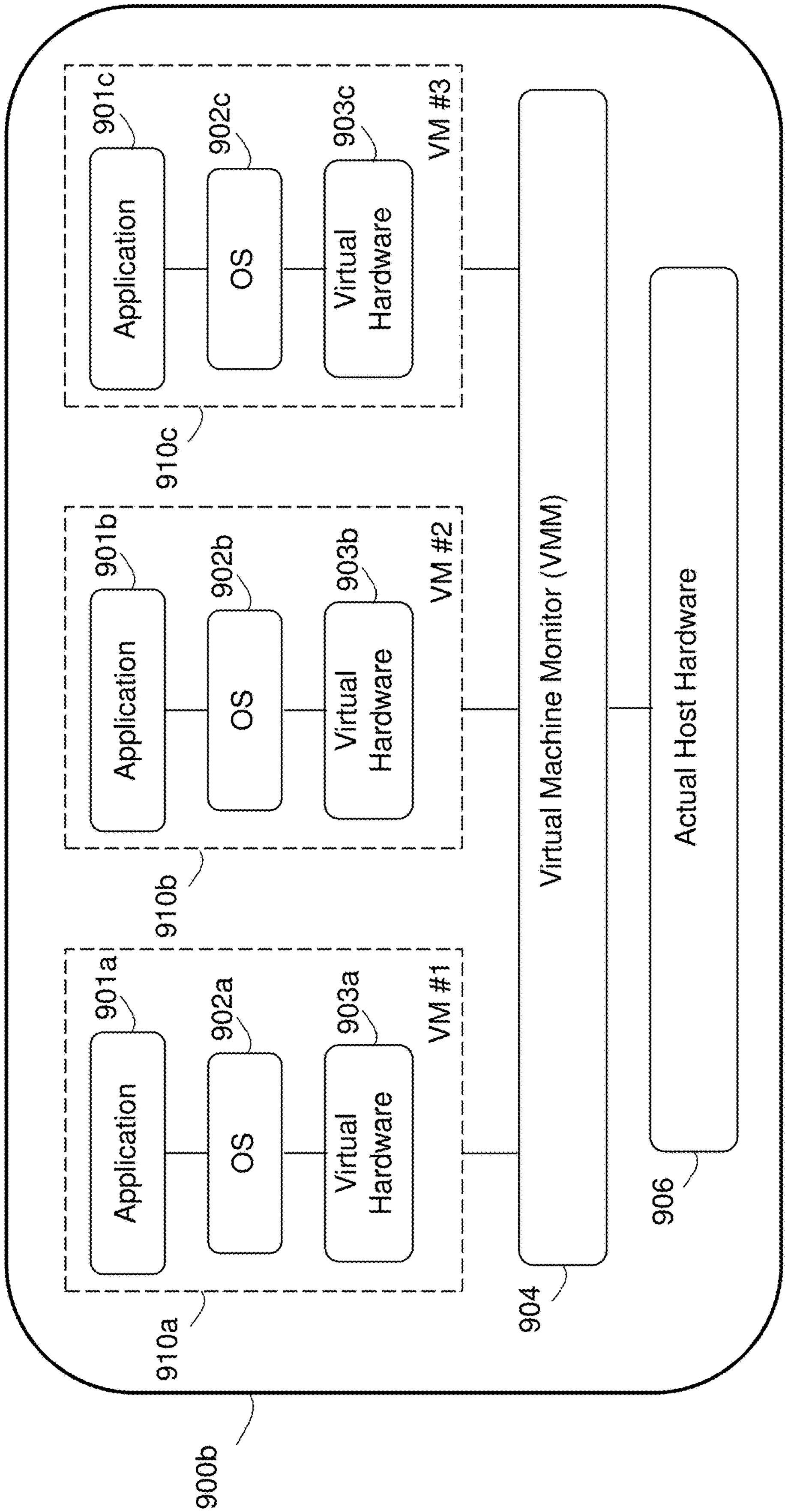
FIG. 2*b* illustrates schematically a prior-art arrangement of bare-metal (hypervisor) architecture of virtualization.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions. Alternatively or in addition, each function can be implemented by a plurality of components and devices. In the figures and descriptions, identical reference numerals indicate those components that are common to different embodiments or configurations. Identical numerical references (even in the case of using different suffix, such as 5, 5*a*, 5*b* and 5*c*) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely the representative embodiments of the invention. It is to be understood that the singular forms “a,” “an,” and “the” herein include plural referents unless the context clearly dictates otherwise. Thus, for example, reference to “a component surface” includes reference to one or more of such surfaces. By the term “substantially” it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner”, “outer”, “beneath”, “below”, “right”, left”, “upper”, “lower”, “above”, “front”, “rear”, “left”, “right” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

In one example, it may be beneficial to adapt a music learning practice session to the specific user skill or ability. For example, a sheet music may be transcribed to reduce complexity of difficulty, either off-line according to estimated or expected user playing ability, or ‘on the fly’ in real-time during the practice session, to better adapt to the student skill level, such as by executing a flow chart 70 shown in FIG. 7. A sequence of symbols that corresponds to playing of a musical piece on a musical instrument, such as in a sheet music form, is obtained as part of an “Obtain Sheet Music” step 71. The sequence of symbols may be retrieved from a local memory, or from a storage of a remote server over the Internet. In case where the sequence of symbols (such as the sheet music) is received from a remote location as part of the “Obtain Sheet Music” step 71, it may be locally stored for use as part of a “Store Version ‘5’” step 74.

The obtained sequence, referred to as the ‘original’ sequence or version ‘5’, is analyzed for estimating the playing complexity or difficulty as part of an “Estimate Complexity” step 72. The estimated (or calculated) complexity or difficulty level is stored as associated with the obtained sequence of symbols of the musical piece as part of a “Store Level” step 77.

The estimation of the playing complexity or difficulty in the “Estimate Complexity” step 72 may be based on, may use, or may be according to, computationally quantifying performance difficulty as well as musical fidelity to the original score, and formulating the problem as optimization of musical fidelity under constraints on difficulty values using a statistical-modeling as presented in the article entitled: “*Statistical piano reduction controlling performance difficulty*” by Eita Nakamura and Kazuyoshi Yoshii [doi:10.1017/ATSIP.2018.18], published 2018 in SIP (2018), vol. 7, e13; analyzing the original music in order to determine the type of arrangement element performed by an instrument, then identifying each phrase and associated it with a weighted importance value as described in the article entitled: “*Automatic System for the Arrangement of Piano Reductions*” by Shih-Chuan Chiu, Man-Kwan Shan, and Jiun-Long Huang, published 2009 in the 11th IEEE International Symposium on Multimedia; analyzing the semantic content of music by focusing on symbolic music, i.e., sheet music or score, formulating difficulty level recognition as a regression problem to predict the difficulty level of piano sheet music, and recognizing the difficulty level of piano sheet music as described in the article entitled: “*A Study on Difficulty Level Recognition of Piano Sheet Music*” by Shih-Chuan Chiu and Min-Syan Chen, published December 2012 in the ISM ’12: Proceedings of the 2012 IEEE International Symposium on Multimedia; Using Score Analyzer that is based on seven criteria to characterize technical instrumental difficulties in order to automatically extract the difficulty level of a MusicXML piece, and suggest advice based on a Musical Sign Base (MSB), as proposed in the article entitled: “SCORE ANALYZER: AUTOMATICALLY DETERMINING SCORES DIFFICULTY LEVEL FOR INSTRUMENTAL E-LEARNING” by Véronique Sébastien, Henri Ralambondrainy, Olivier Sébastien, and Noel Conruyt of IREMIA—Laboratoire d’Informatique et de Mathématiques, EA2525 University of Reunion Island, Saint-Denis, Reunion (FRANCE), published October 2012 in 13th International Society for Music Information Retrieval Conference (ISMIR 2012); using a systematic and objective approach to computational assessment of the complexity of a music score for any instrument, as introduced in the paper entitled: “*Musiplectics: Computational Assessment of the Complexity of Music Scores*” by Ethan Holder, Eli Tilevich, and Amy Gillick, published October 2015 in ONWARD ’15 [ACM 978-1-4503-1995-9/13/10, http://dx-.doi.org/10.1145/2508075.2514879], or determining the degree of difficulty by converting the score, which is expressed as a traditional music score, into electronic music sheet and calculating information about the elements needed to play sheet music by distance of notes, tempo, and quantifying the ease of interpretation, as proposed in the paper entitled: “A Method for Measuring the Difficulty of Music Scores” by Yang-Eui Song and Yong Kyu Lee [www.ksci.re.kr http://dx.doi.org/10.9708/jksci.2016.21.4.039] published April 2016 in the Journal of The Korea Society of Computer and Information Vol. 21 No. 4.

Alternatively or in addition, the estimation of the playing complexity or difficulty in the “Estimate Complexity” step 72 may be based on, may use, or may be according to, extracting features of the obtained sheet music as part of a "Extract Features" step 75, and calculating difficulty characteristics on the mapped features as part of a "Calculate Difficulty" step 76. The extracted features as part of the "Extract Features" step 75 may include notes or chords difficulty, pertaining to how the player fingers are required to be positioned, transition between notes/chords difficulty, defined Tempo, or associated decorations, such as excessive playing time or loudness.

In one example, the "Calculate Difficulty" step 76 may be based on, may use, or may be include, difficulty or skill characteristics, such as rhythmic difficulty, relating to how irregularly musical notes and chords are located in time, and what is the "speed" of music (the rate at which notes/chords should be played); motoric difficulty, relating to how difficult it is physically to produce the musical sounds using a musical instrument (usually mainly related to the complexity of the physical arrangement of user's fingers); harmonic difficulty, relating to how complex combinations of musical notes need to be played simultaneously (as chords) or sequentially (as very unpredictable melodies); or expressivity difficulty, relating to the user need to control and vary the loudness ("dynamics") and timbre ("tone color") of the musical sounds being produced. In one example, such analysis may be based on the U.S. Pat. No. 9,767,705 to Klapuri et al. entitled: "System for estimating user's skill in playing a music instrument and determining virtual exercises thereof", which is incorporated in its entirety for all purposes as if fully set forth herein.

In one example, multiple levels of complexity or difficulty are defined, where Level '5' corresponds to the most complex or difficult playing requirement, which is typically associated with the original arrangement that is obtained in the "Obtain Sheet Music" step 71. In some cases, the complexity or difficulty estimated as part of the Estimate Complexity" step 72 may be appropriate for playing by an experienced player, but not suitable to be played by a beginner or student. In such a case, it may be beneficial to transcribe the sequence of musical symbols (or sheet music) to provide lower complexity or less difficult sequence of symbols, while retaining the general character or feeling of the original musical piece. In one example, four versions of sequences of musical symbols, referred to as versions '4', '3', '2', and '1', are generated, which are all transcribed or derived of the original version '5'. For example, version '4' may be slightly simplified from the original version '5', thus suited to more experienced players, ranging to version '1', that is the most simplified version, which may be suitable to be played by novice players or beginners. While four versions are exampled, any number of transcribed versions may equally be produced, such as 1, 2, 3, 5, 7, 10, 15, 20, or more versions. The four versions are generated as part of a "Modify Arrangement" step 73, and then may be stored for future use, such as storing version '4' as part of a "Store Version '4'" step 74*a*, storing version '3' as part of a "Store Version '3'" step 74*b*, storing version '2' as part of a "Store Version '2'" step 74*c*, and storing version '1' as part of a "Store Version '1'" step 74*d*.

The transcribing or modifying of the original version '5' for producing simplified versions as part of "Modify Arrangement" step 73, may be based on, may use, or may be according to, the article entitled: "Statistical piano reduction controlling performance difficulty" by Eita Nakamura and Kazuyoshi Yoshii [doi:10.1017/ATSIP.2018.18], published 2018 in SIP (2018), vol. 7, e13; the article entitled: "*Automatic System for the Arrangement of Piano Reductions*" by Shih-Chuan Chiu, Man-Kwan Shan, and Jiun-Long Huang, published 2009 in the 11th IEEE International Symposium on Multimedia; the U.S. Pat. No. 9,767,705 to Klapuri et al. entitled: "System for estimating user's skill in playing a music instrument and determining virtual exercises thereof"; or by available commercial application such as Ludwig (www.write-music.com/) and AnthemScore (www.lunaverus.com/).

Figure 8:
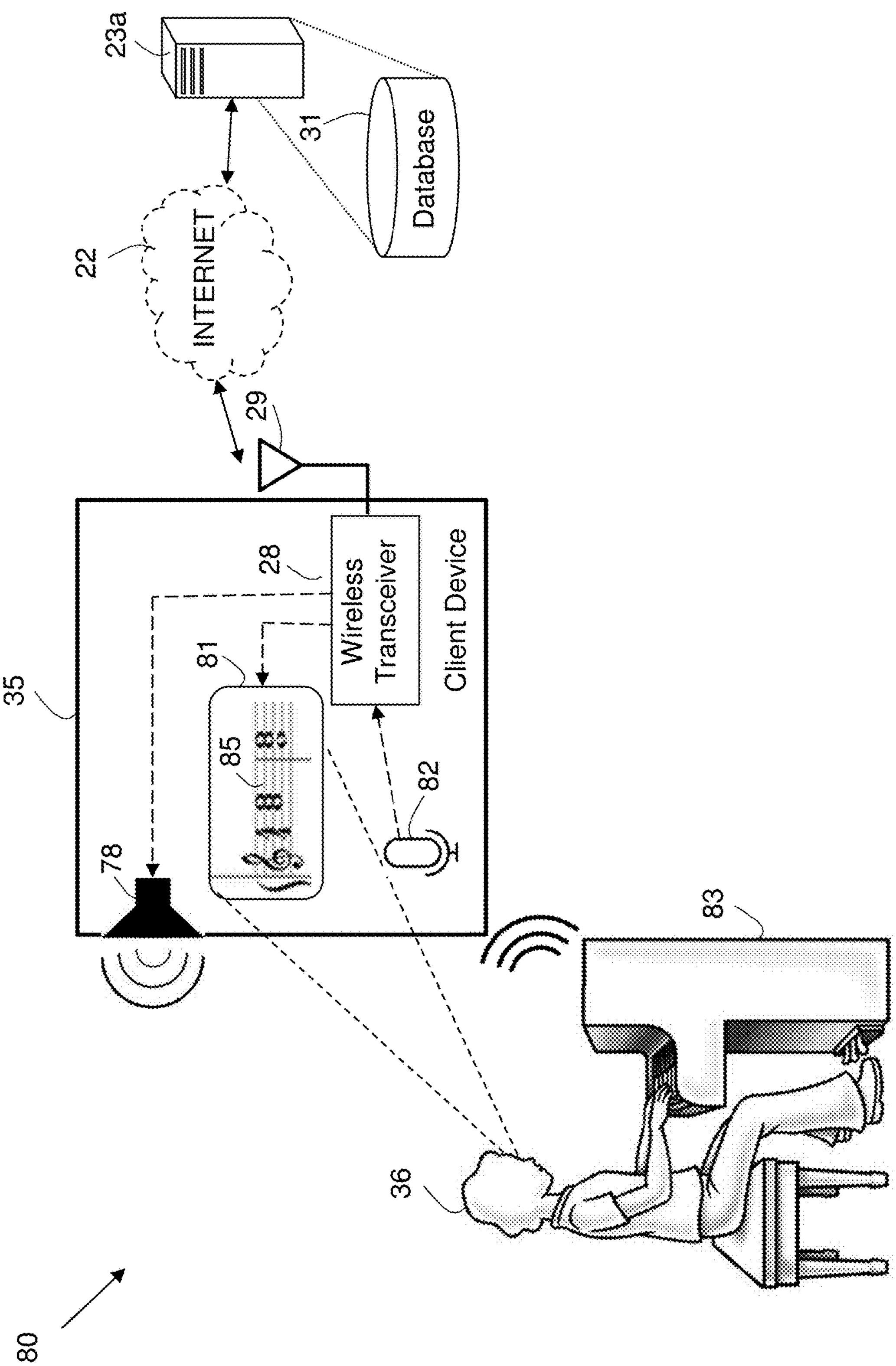
FIG. 8 depicts schematically an arrangement of an online piano playing learning using a client device and a server device.
Figure 8A:
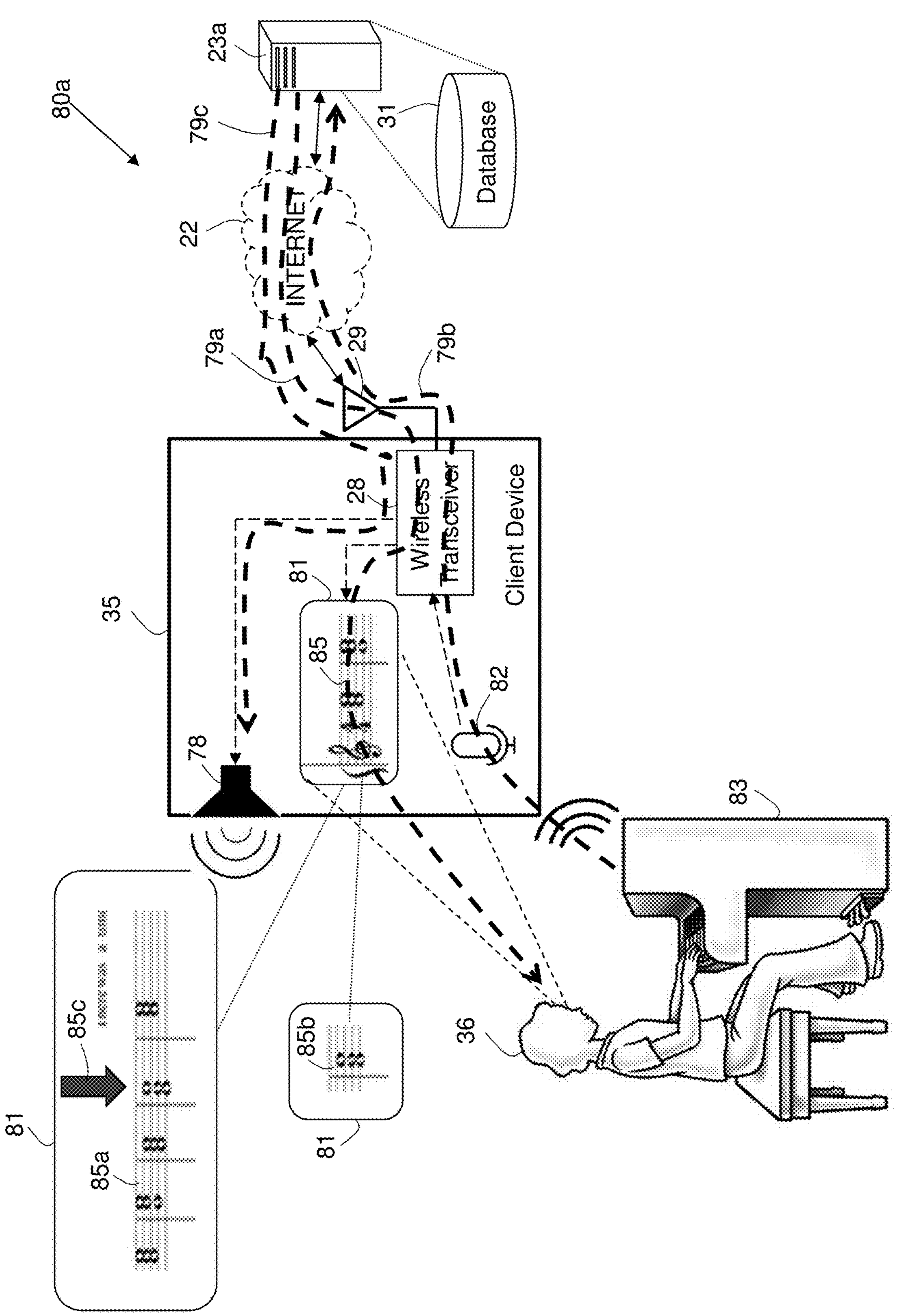
FIG. 8*a* depicts schematically an arrangement of an online piano playing learning with the data paths between the client device and the server device.
Figure 8B:
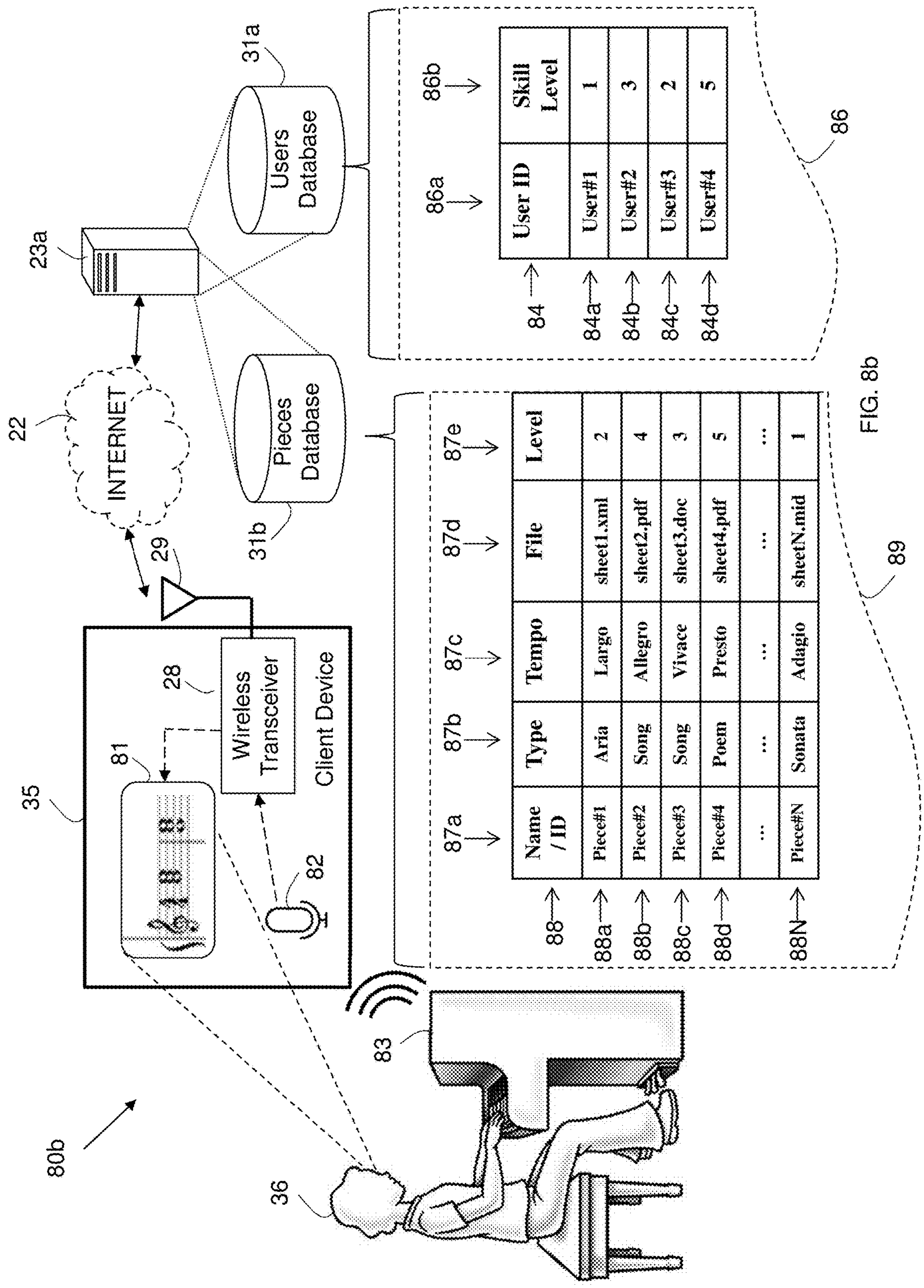
FIG. 8*b* depicts schematically an arrangement of an online piano playing learning with databases that relate to users and to musical pieces.

An example of a system for online music learning by the person 36 of playing a musical instrument, such as the piano 83, that is based on the client device 35 that communicates with a server device 23*a* over the Internet 22, is shown in an arrangement 80 shown in FIG. 8, in an arrangement 80*a* shown in FIG. 8*a*, and in an arrangement 80*b* shown in FIG. 8*b*. The client device 35 may be identical to, similar to, part of, comprise, or integrated with, the computer system 10 shown in FIG. 1 or the client device 35 shown in FIG. 3. In one example, the client device 35, which may be a smartphone or a tablet computer, is used mainly for the purpose of interacting with the user 36 and the piano 83, while the processing is mainly performed in the server device 23*a*. The client device 35 communicates with the server 23*a* over the Internet 22 using a wireless communication that involves the wireless transceiver 28 connected to the antenna 29. As shown in the arrangement 80*a* in FIG. 8*a*, the teaching scheme is based on the server device 23*a* sending visual data over a path 79*a* (shown in FIG. 8*a*) that includes the Internet 22, to be displayed to the user 36 via a display 81 in the client device 35. The sound generated by the piano 83 is captured by a microphone 82, where it is converted to a digital representation and sent to the server device 23*a* over the Internet 22 over a path 79*b* (shown in FIG. 8*a*), to be further processed therein.

The arrangement 80 shown in FIG. 8, or the client device 35, may be used with, integrated with, or used in combination with, a Virtual Reality (VR) system simulating a virtual environment to a person, and may be used by the VR system. The communication with the VR system may be wired or wireless, and the VR system may comprise a Head-Mounted Display (HMD).

Figure 3:
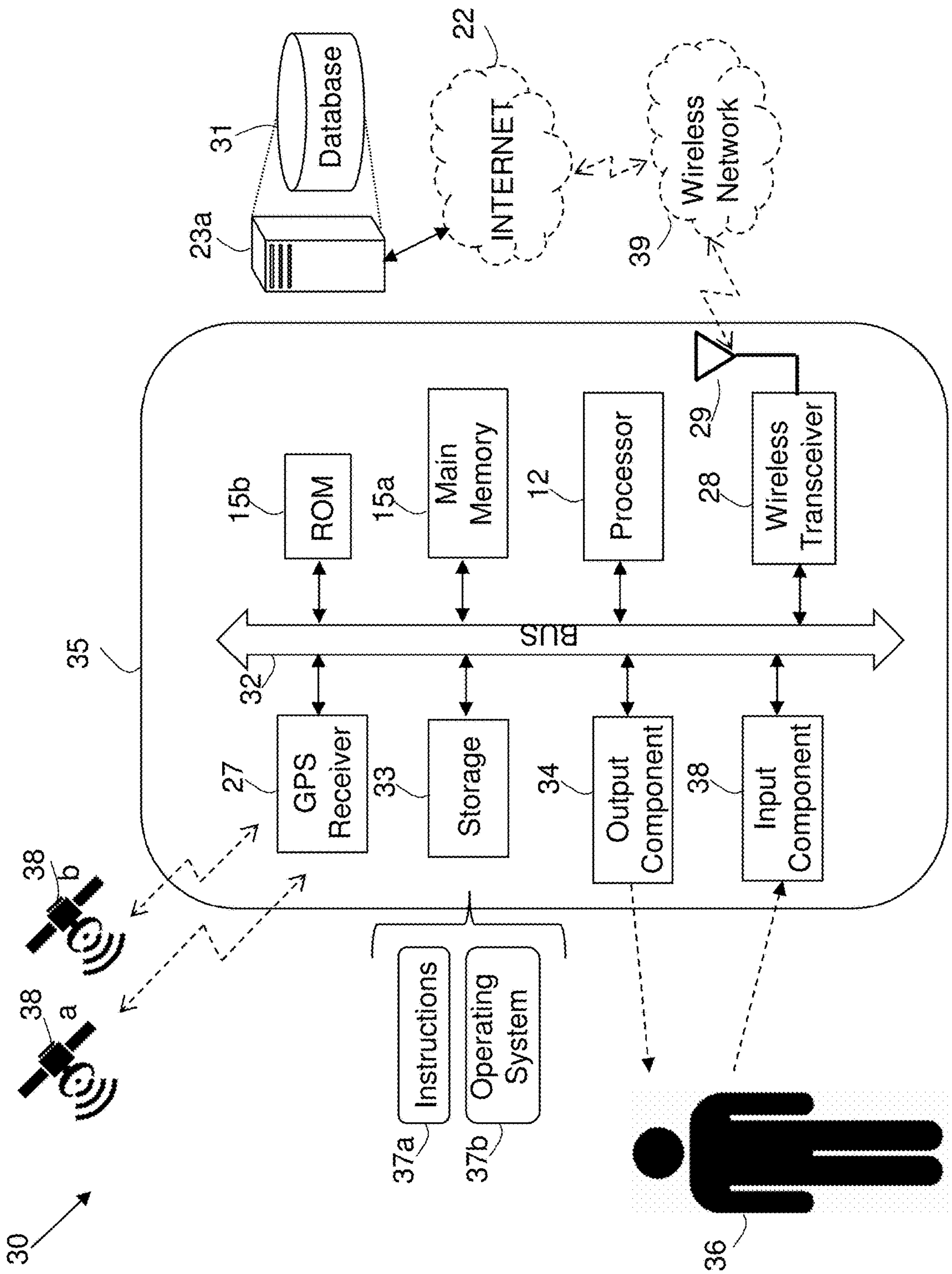
FIG. 3 illustrates schematically a block diagram of an arrangement that includes a server that communicates over the Internet with a client device such as a smartphone or tablet.
Figure 4:
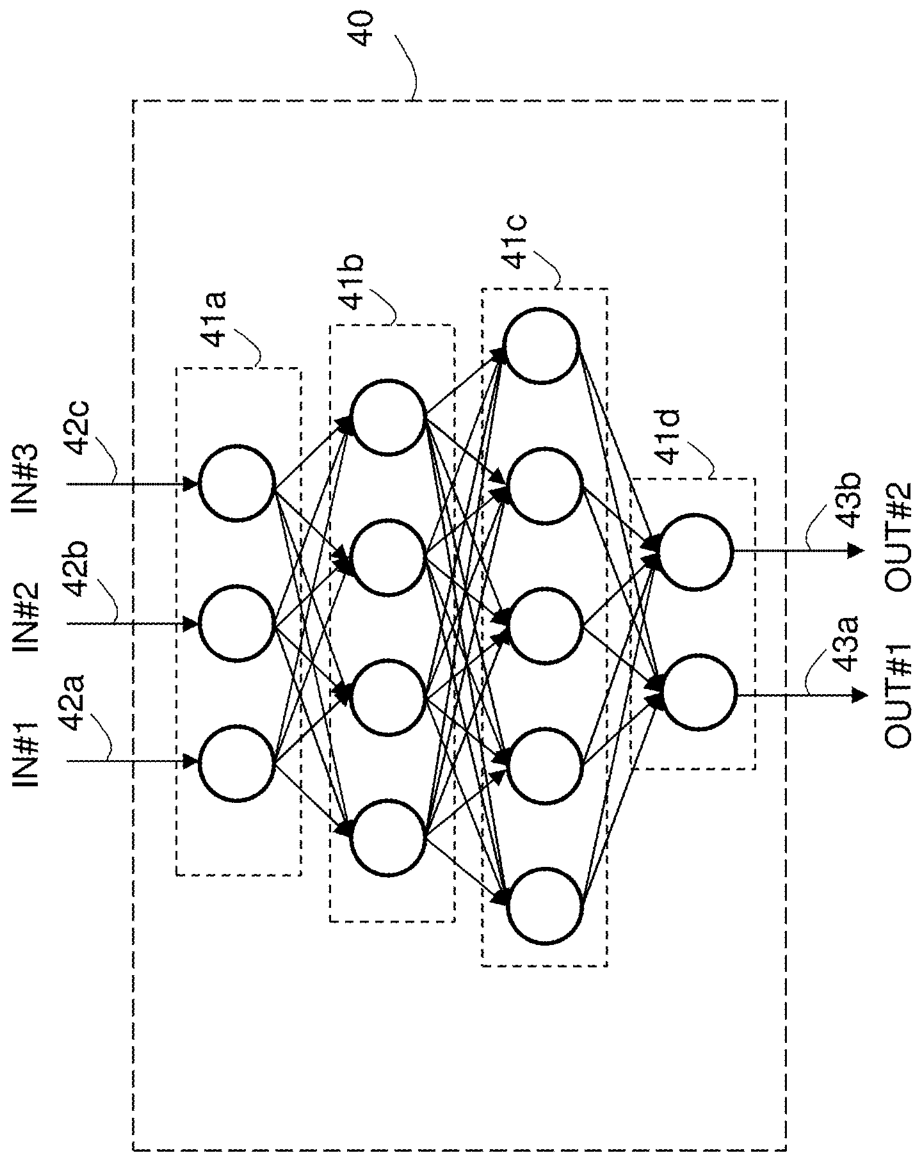
FIG. 4 schematically illustrates a schematic diagram of an example of a feed-forward Artificial Neural Network (ANN).
Figure 4A:
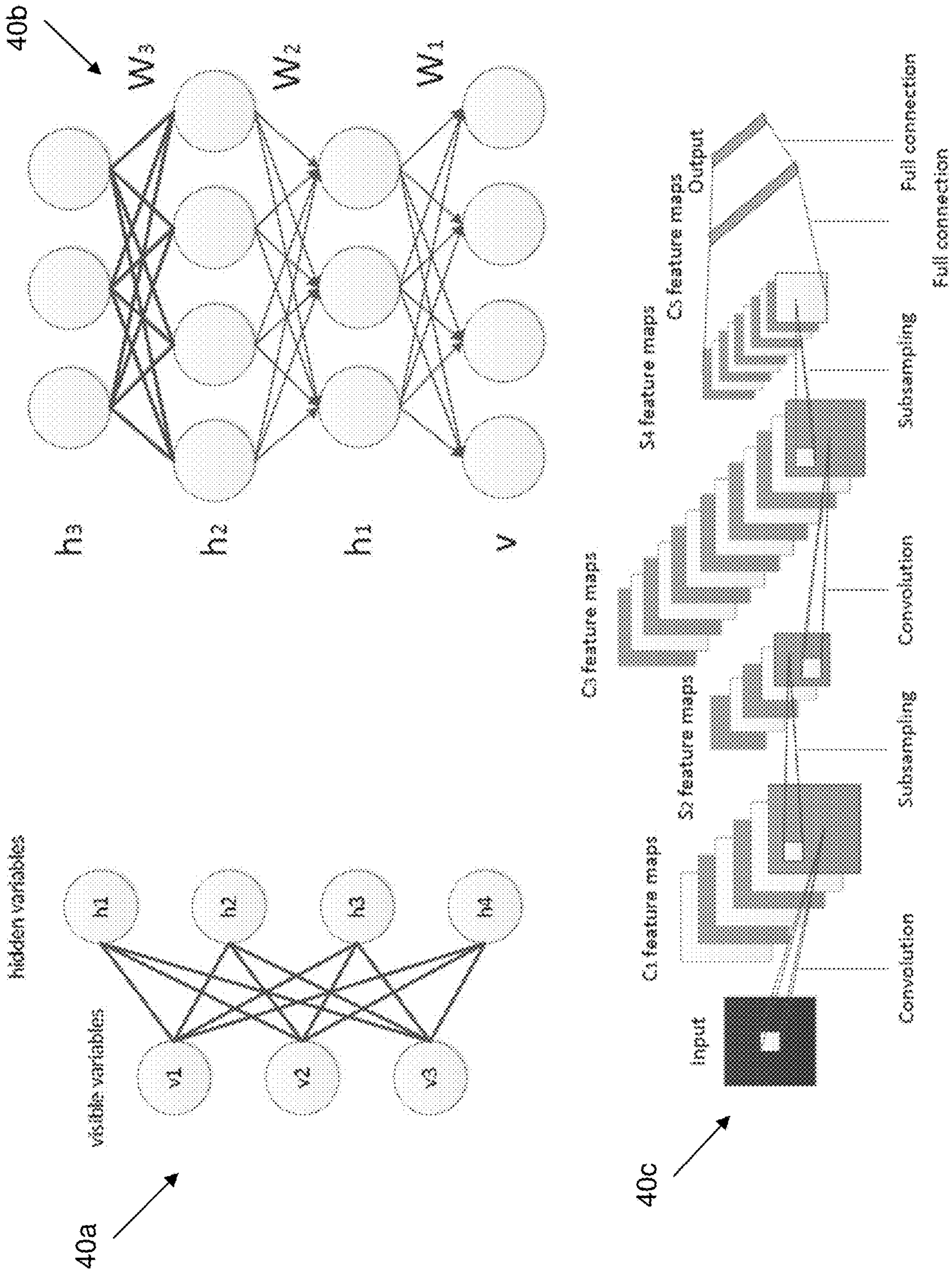
FIG. 4*a* schematically illustrates a schematic diagram of examples of a Deep Neural Network (DNN).
Figure 4B:
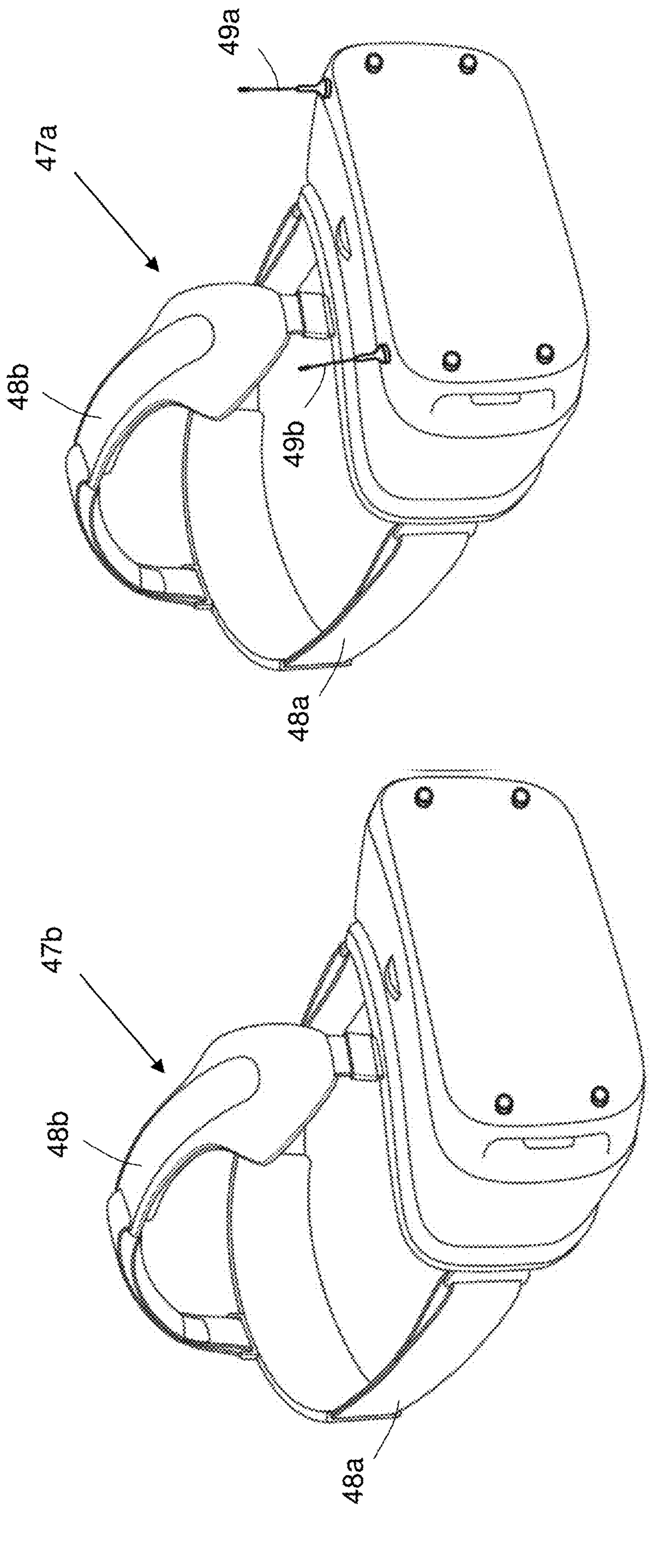
FIG. 4*b* depicts schematically an HMD with and without antennas.
Figure 4C:
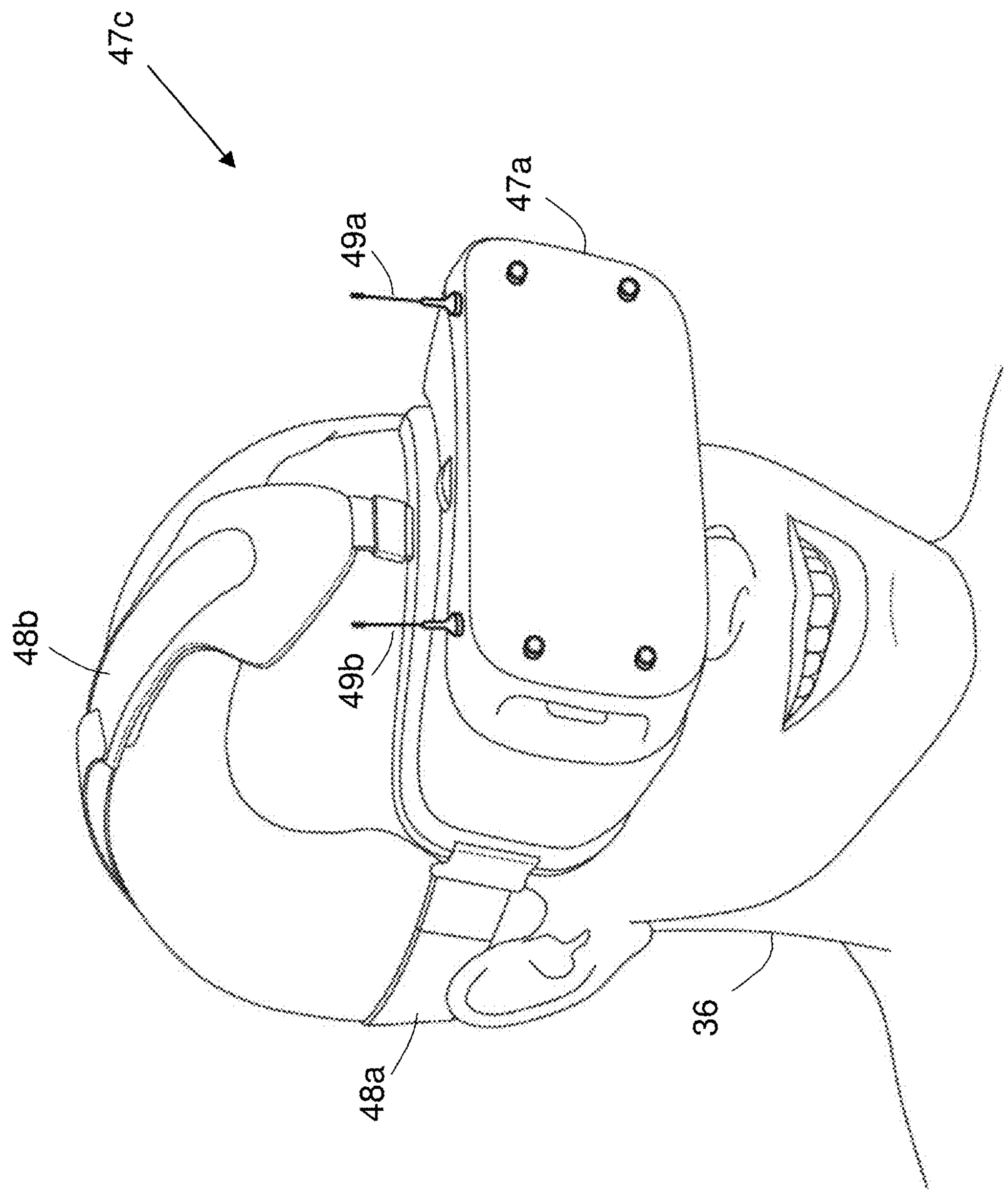
FIG. 4*c* depicts schematically a person wearing an HMD.
Figure 5:
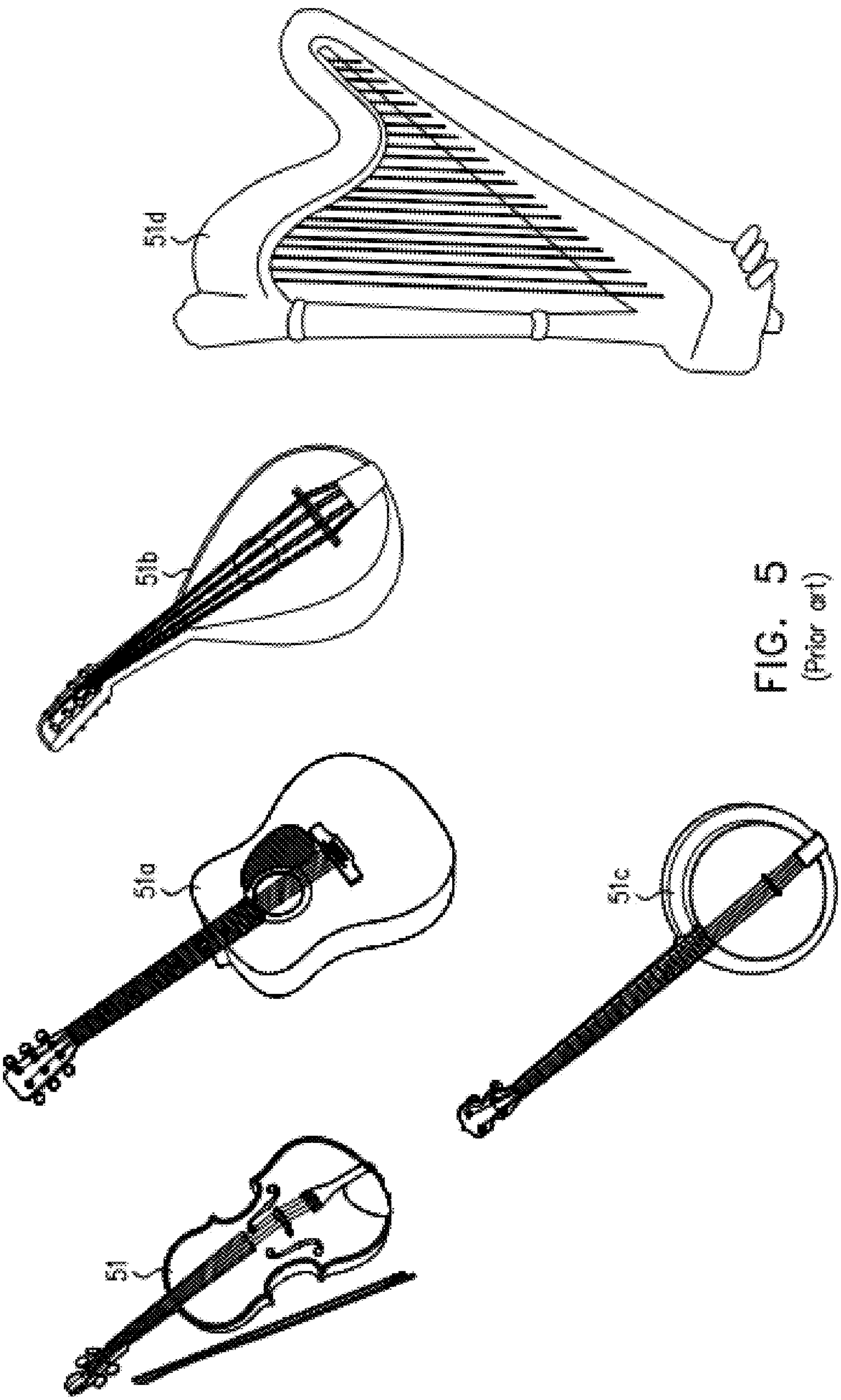
FIG. 5 depicts schematically general views of various string instruments.
Figure 5A:
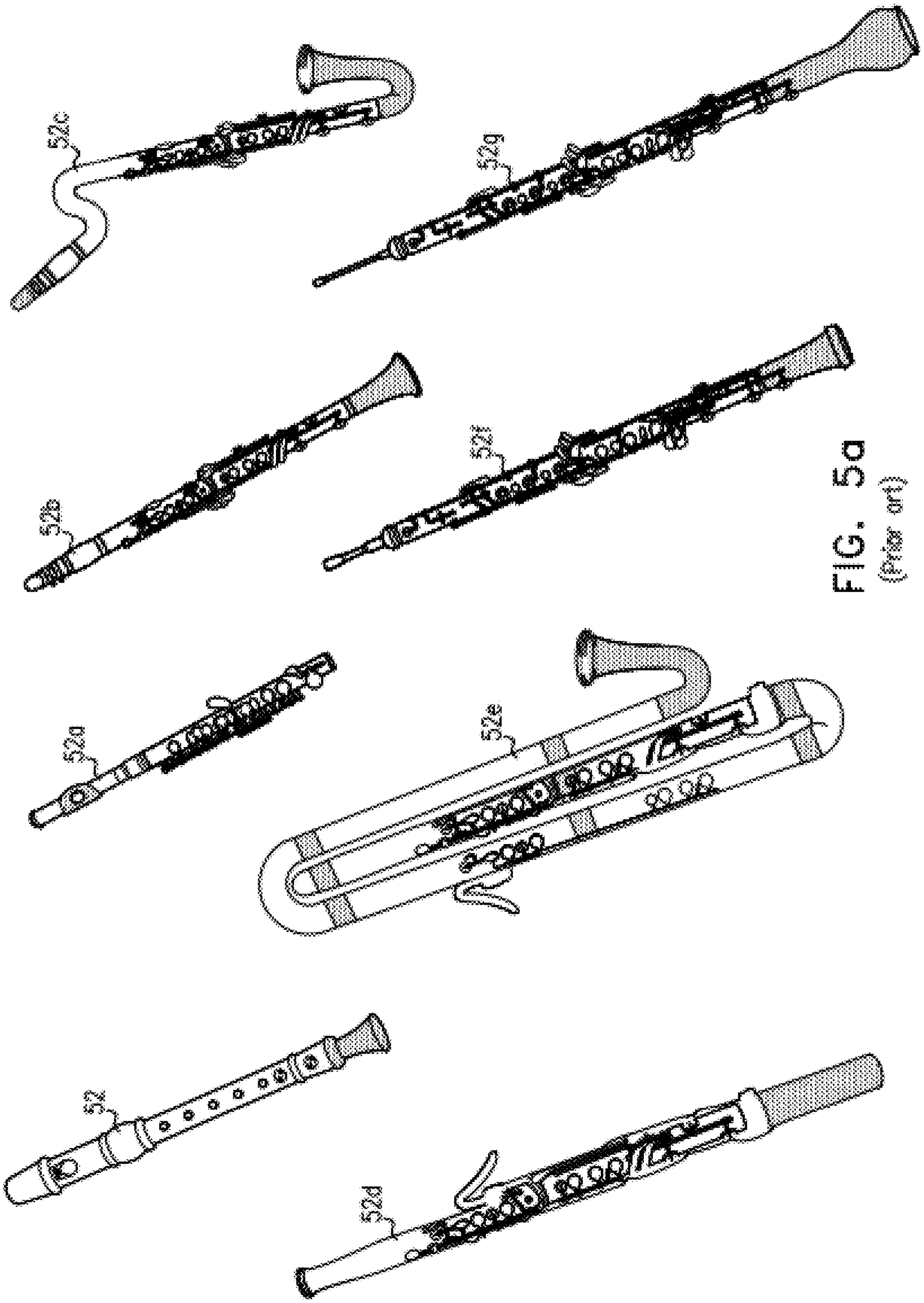
FIG. 5*a* depicts schematically general views of various woodwind instruments.
Figure 5B:
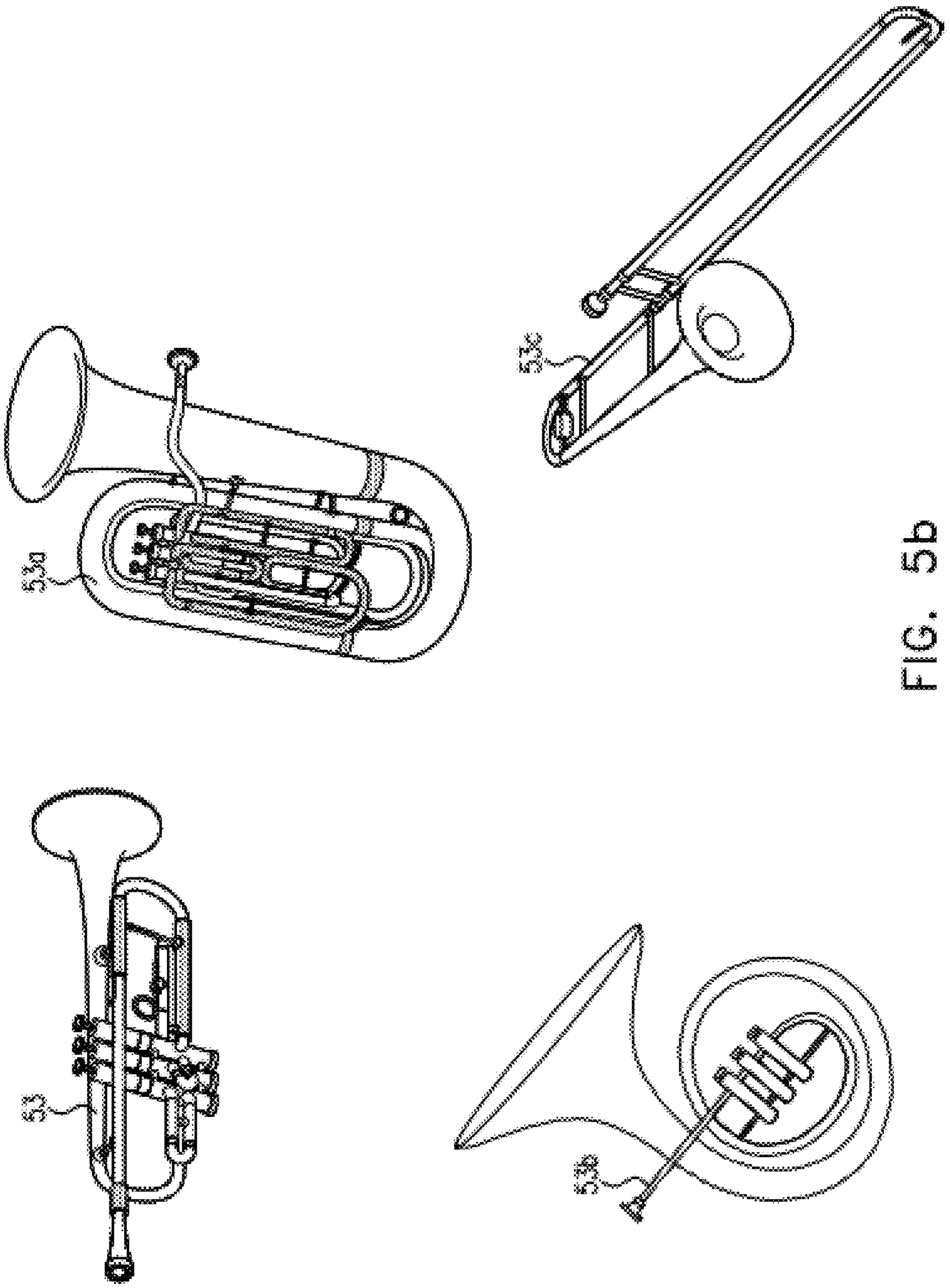
FIG. 5*b* depicts schematically general views of various brass instruments.
Figure 5C:
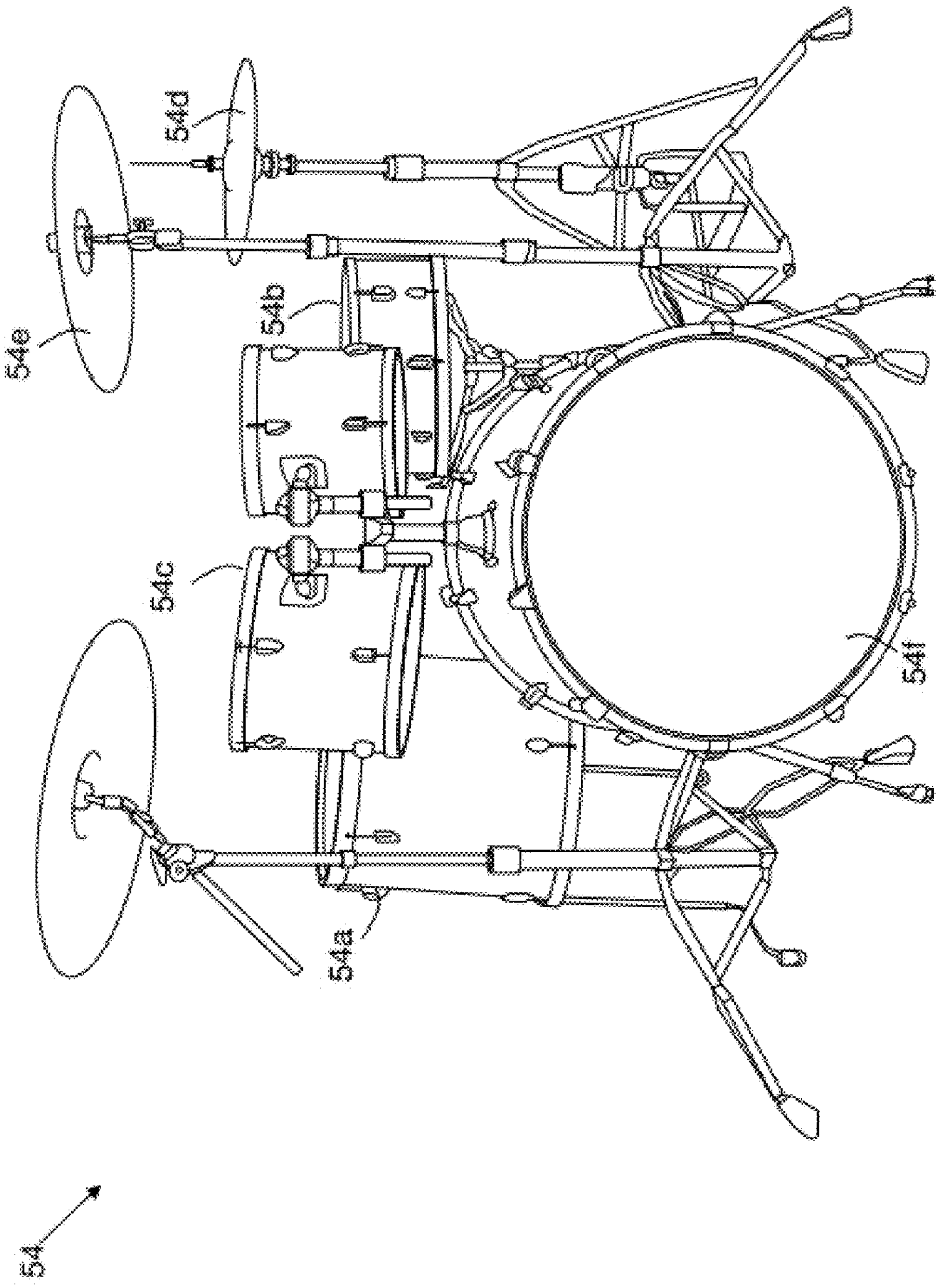
FIG. 5*c* depicts schematically general views of various percussion instruments.

The display 81 may be identical to, similar to, part of, comprise, or integrated with, the display 17 shown in FIG. 1, and may be identical to, similar to, part of, comprise, or integrated with, the output component 34 of the arrangement 30 in FIG. 3. The display 81 may consist of, or may comprise, a display screen for visually presenting information to the user 36, and the display or the display screen may consist of, or may comprise, a monochrome, grayscale or color display, having an array of light emitters or light reflectors.

Alternatively or in addition, the display 81 or the display screen may consist of, or may comprise, an analog display having an analog input interface that supports NTSC, PAL or SECAM formats, and the analog input interface may comprise of RGB, VGA (Video Graphics Array), SVGA (Super Video Graphics Array), SCART or S-video interface. Furthermore, the display 81 or the display screen may consist of, or may comprise, a digital display having a digital input interface that is IEEE1394, FireWire™, USB, SDI (Serial Digital Interface), HDMI (High-Definition Multimedia Interface), DVI (Digital Visual Interface), UDI (Unified Display Interface), DisplayPort, Digital Component Video, or DVB (Digital Video Broadcast) interface.

For example, the display 81 or the display screen may be based on, or use, a Cathode-Ray Tube (CRT) display, a Field Emission Display (FED), an Electroluminescent Display (ELD), a Vacuum Fluorescent Display (VFD), an Organic Light-Emitting Diode (OLED) display, a passive-matrix (PMOLED) display, an active-matrix OLEDs (AMOLED) display, a Liquid Crystal Display (LCD) display, a Thin Film Transistor (TFT) display, an LED-backlit LCD display, or an Electronic Paper Display (EPD) display that is based on Gyricon technology, Electro-Wetting Display (EWD), or Electrofluidic display technology. Further, the display 81 or the display screen may consist of, or may comprise, a laser video display that is based on a Vertical-External-Cavity Surface-Emitting-Laser (VECSEL) or a Vertical-Cavity Surface-Emitting Laser (VCSEL). Furthermore, the display 81 or the display screen may consist of, or may comprise, a segment display based on a seven-segment display, a fourteen-segment display, a sixteen-segment display, or a dot matrix display, and may be operative to only display at least one of digits, alphanumeric characters, words, characters, arrows, symbols, ASCII, and non-ASCII characters.

The microphone 82 may be identical to, similar to, part of, comprise, or integrated with, the input component 38 of the arrangement 30 in FIG. 3. The microphone 82 is configured to responds to audible or inaudible sound, and is an omnidirectional, unidirectional, or bidirectional microphone. The microphone 82 may be based on the sensing the incident sound-based motion of a diaphragm or a ribbon, or may consist of, or may comprise, a condenser, an electret, a dynamic, a ribbon, a carbon, an optical microphone, or a piezoelectric microphone. Further, the microphone 82 may consist of, may comprise, or may be based on, a microphone array for improving directivity.

The client device 35 may further comprise a sounder, such as a speaker 78, that may be identical to, similar to, part of, comprise, or integrated with, the output component 34 of the arrangement 30 in FIG. 3. The sound by any sounder such as the speaker 78 may be audible or inaudible (or both), and may be omnidirectional, unidirectional, bidirectional, or provide other directionality or polar patterns. The speaker 78 may be an electromagnetic loudspeaker, a piezoelectric speaker, an Electro-Static Loudspeaker (ESL), a ribbon or planar magnetic loudspeaker, or a bending wave loudspeaker. The sounder, such as the speaker 78, may consist of, may comprise, may use, or may be based on, an electric sound source that may convert electrical energy into sound waves, and the electric sound source may be configured to emit an audible or inaudible sound using omnidirectional, unidirectional, or bidirectional pattern. Further, the sounder, such as the speaker 78, may convert electrical energy to sound waves transmitted through the air, an elastic solid material, or a liquid, usually by means of a vibrating or moving ribbon or diaphragm.

Further, the sounder, such as the speaker 78, may comprise, may use, or may be based on, an electromagnetic loudspeaker, a piezoelectric speaker, an electrostatic loudspeaker (ESL), a ribbon magnetic loudspeaker, a planar magnetic loudspeaker, or a bending wave loudspeaker. Furthermore, the sounder may consist of, may comprise, may use, or may be based on, an electromechanical scheme or a ceramic-based piezoelectric effect. In addition, the sounder may consist of, may comprise, may use, or may be based on, an ultrasonic transducer that may be a piezoelectric transducer, crystal-based transducer, a capacitive transducer, or a magnetostrictive transducer.

While piano 83 is exampled in FIG. 8, any musical instrument may be equally used. For example, the musical instrument may consist of, or may comprise, a Soprano instrument such as a flute, a violin, a soprano saxophone, a trumpet, a clarinet, an oboe, or a piccolo. Alternatively or in addition, any musical instrument herein may consists of, or may comprise, an Alto instrument, such as an alto saxophone, an French horn, an English horn, a viola, or an alto horn. Alternatively or in addition, any musical instrument herein may consists of, or may comprise, a Tenor instrument, such as a trombone, a tenoroon, a tenor saxophone, a tenor violin, a guitar, or a tenor drum. Alternatively or in addition, any musical instrument herein may consists of, or may comprise, a Baritone instrument, such as a bassoon, a baritone a saxophone, a bass clarinet, a cello, a baritone horn, or an euphonium. Alternatively or in addition, any musical instrument herein may consists of, or may comprise, a Bass instrument, such as a double bass, a bass guitar, a contrabassoon, a bass saxophone, a tuba, or a bass drum.

Further, the musical instrument may consist of, or may comprise, a string instrument that produces sound by means of vibrating strings, such as a guitar, an electric bass, a violin, a viola, a cello, a double bass, a banjo, a mandolin, an ukulele, or a harp. Any string instrument herein may consist of, or may comprise, a lute instrument in which the strings are supported by a neck and a bout, a harp instrument, in which the strings are contained within a frame, or a zither instrument, in which the strings are mounted on a body. Further, any string instrument herein be configured to be played by plucking, bowing, or striking. Furthermore, the string instrument any string instrument herein may be an acoustic instrument, or alternatively may comprise an electric amplification.

Furthermore, the musical instrument may consist of, or may comprise, a woodwind instrument that produces sound when the player blows air against a sharp edge or through a reed, causing the air within its resonator to vibrate, such as a flute, a piccolo, an oboe, an English horn, a clarinet, a bass clarinet, a bassoon, a contrabassoon, or a Saxophone. Any woodwind instrument herein may consist of, or may comprise, a flute that is configured to produce sound when air is blown across an edge, and any flute herein may consist of, or may comprise, an open flute, in which the player's lips form a stream of air which goes directly from the players lips to the edge, or a closed flute, in which in which the musical instrument has a channel to form and direct the air stream over an edge. Alternatively or in addition, any woodwind instrument herein may consist of, or may comprise, a reed instrument that is configured to produce sound by focusing air into a mouthpiece which then causes a reed, or reeds, to vibrate, and any reed instrument herein may consist of, or may comprise, a single reed instrument that uses a reed, which is a thin-cut piece of cane or plastic that is held against the aperture of a mouthpiece with a ligature, so that when air is forced between the reed and the mouthpiece, the reed vibrates to create a sound, a double reed instrument that uses two precisely cut small pieces of cane that are joined together at the base and are inserted into the top of the instrument to vibrate as air is forced between the two pieces, or a capped double reed instrument configured to vibrate when the player blows through a hole in a cap that covers the reed.

In addition, the musical instrument may consist of, or may comprise, a brass instrument that produces sound by sympathetic vibration of air in a tubular resonator in sympathy with the vibration of the player's lips, such as a Trumpet, a Cornet, a Horn, a Trombone, a Saxhorn, or a Tuba. Any brass instrument herein may consist of, or may comprise, a valved brass instrument that uses a set of valves operated by the player's fingers that introduce additional tubing, or crooks, into the instrument for changing its overall length, or a slide brass instrument that uses a slide to change the length of tubing.

Even more, the musical instrument may consist of, or may comprise, a percussion instrument that is configured to produce sound by being struck or scraped by a beater, such as a timpani, a snare drum, a bass drum, cymbals, a triangle, a tambourine, a glockenspiel, or a xylophone. Any percussion instrument herein may consist of, or may comprise, a pitched percussion instrument that produces notes with an identifiable pitch, or an unpitched percussion instrument that produces notes or sounds in an indefinite pitch.

Alternatively or in addition, the musical instrument may comprise, or may be based on, an acoustic, stringed musical instrument, configured so that the strings are struck by wooden hammers that are coated with a softer material, and the musical instrument may further comprise a keyboard that may consist of a row of keys, may be configured so that the performer presses down or strikes with the fingers and thumbs of both hands to cause the hammers to strike the strings. Any musical instrument herein may comprise, or may consist of, a piano, such as the piano 83, which may comprise, or may consist of, a grand piano, an upright piano, or an electronic piano.

Further, any playing of any musical instrument herein may consists of, may comprises, or may be supplemented with, a vocal music, that may be with or without instrumental accompaniment, and may use lyrics, such as singing.

The display 81 in the client device 35 notifies the person 36 how to play the piano 83 by displaying a sequence 85 of musical symbols, which may be a simple training set for acquiring or enhancing the playing skills, or which may be according to musical notation standard or convention. For example, the sequence 85 shown on the display 81 may be part of, or an entire of, a musical piece. Further, the sequence 85 shown on the display 81 may be adapted to the specific played musical instrument, such as specially adapted to the piano 83. In one example, the sequence 85 shown on the display 81 is a part of, or an entire of, a sheet music of a musical piece, and each of the musical symbols in the sequence may be according to a musical notation convention and typically includes lines, clefs, notes, and rests, and may notate pitch, tempo, meter, duration, or articulation of a note or a passage of music, and wherein the sequence.

The sequence may include one or more clefs that defines the pitch range or the tessitura of the symbol on which it is placed, one or more musical notes that denote a musical sound or the pitch and duration of a musical sound, one or more accidentals that denote a pitch or a pitch class, one or more key signatures that define the prevailing key of the music that follows, one or more time signatures that defines the meter of the music, one or more lines or a note relationships, one or more dynamics that indicate the relative intensity or volume of a musical line, one or more articulations that specify how to perform individual notes within a phrase or passage, one or more ornaments that modify the pitch pattern of an individual note, one or more octave signs, repetitions or codas, one or more pedal marks, or any combination thereof.

As part of the teaching session, the user 36 is expected to follow the displayed sequence 85 of the musical symbols, and to timely and accurately play by pressing the piano 83 keys (and pedals) in response to the shown symbols. In one example, a single symbol is shown at a time, such as the symbol 85*b* shown in FIG. 8*a*. Alternatively or addition, multiple symbols 85*a* are displayed, such as the entire sheet music, or a part thereof of that includes one or more lines. In such a case, the symbol that is to be next played by the user 36 is specifically notified or marked on the display 81, such as by changing color, enclosing it in a frame (such as a rectangular shape), or by pointing at it using an arrow 85*c*, in order to clearly notify the player 36 what is the next symbol to be played. Preferably, the pace or tempo of displaying of the symbol in the sequence 85 are based on the skill level of the user 36, on the tempo or pace associated with the musical piece that is represented by the sequence 85 (such as the tempo that is set or recommended by the creator or composer of the piece, or by a performer), or a combination thereof. For example, in case where the sequence 85 is associated with a musical piece that defines a specific tempo, the actual pace of displaying the symbols to the user 36 may be less than 95%, 90%, 85%, 80%, 75%, 70%, 65%, 60%, 55%, 50%, 45%, 40%, 35%, 30%, 25%, 20%, 15%, or 10% of the defined tempo or pace, or may be at least 90%, 85%, 80%, 75%, 70%, 65%, 60%, 55%, 50%, 45%, 40%, 35%, 30%, 25%, 20%, 15%, 10%, or 5% of the defined tempo or pace.

The server device 23*a* may comprise, may communicate with, or may be connected to, a memory 31 that may store one or more databases, such as for managing and handling a service of online music learning. The memory 31 may store a user's database 31*a* that associates skill level values to various respective users, such as the user 36, as shown in a table 86 (or in any other data structure) in FIG. 8*b*. The skill level values may directly or indirectly map to the complexity or difficulty level that is calculated or estimated in the "Estimate Complexity" step 72 in the flow chart 70. For example, a user value of '5' corresponds to an expert that can play all musical pieces, a user value of '4' corresponds to an less experienced user that is skilled enough to play all musical pieces associated with complexity or difficulty level of '4' or less, and a user value of '1' corresponds to a beginner or novice user that can properly play only musical pieces associated with complexity or difficulty level of '1'.

A top row 84 indicates that a left column 86*a* includes identifiers of users, and a right column 86*b* associates a skill level value to each of the users. In the example of the table 86, a user identified as a User #1 84*a* is associated with a skill level value of '1', a user identified as an User #2 84*b* is associated with a skill level value of '3', a user identified as an User #3 84*c* is associated with a skill level value of '2', and a user identified as an User #4 84*d* is associated with skill level value of '5'. While only exampled for four users, any number of users may be equally used.

The identifiers of the user shown in the column 86*a* may typically comprise identifiers of the persons, such as the user 36, who are using, or are expected to use, the system 80. Such identifiers may comprise actual names, identification numbers (such as government identifying numbers), usernames, login names, e-mail address, telephone number, screennames (or screen names), account names, or nicknames, or any other identifiers of end users, which are the ultimate human users that operates, own, or use, the client device 35. Alternatively or in addition, the user may choose to be anonymous, and will not provide any identifying details.

For example, a skill level value of '1' may refer to a novice student, having no experience with music or with playing of the respective musical instrument, such as the piano 83, and thus is expected to make many errors while playing. Such a user requires the slowest pace or tempo, and/or simplified music arrangement, to keep up with the sequence 85 shown on the display 81. In contrast, a skill level value of '5' may refer to an experienced or competent level student, having substantial experience with playing of the respective musical instrument, such as the piano 83, and thus is expected to make no or minimal number of errors while playing. Such a user may easily track and play the fastest pace or tempo (or the defined tempo of a respective musical piece) and/or more complex music arrangement, and is easily able to keep up with the sequence 85 shown on the display 81. A skill level value of '3' may refer to a medium level student, having some experience with playing of the respective musical instrument, such as the piano 83, and thus is expected to make reasonable number of errors while playing. Such a user requires the somewhat lower pace or tempo of the maximum or defined tempo, and/or medium level music arrangement, to keep up with the sequence 85 shown on the display 81.

The memory 31 may further store a pieces-database 31*b* that may store sheet music for various musical pieces, together with respective metadata such as name or another identifier of the piece, type of the piece, the tempo associated with, or defined to, the piece, as shown in a table 8*b* (or in any other data structure) in FIG. 89.

Figure 7:
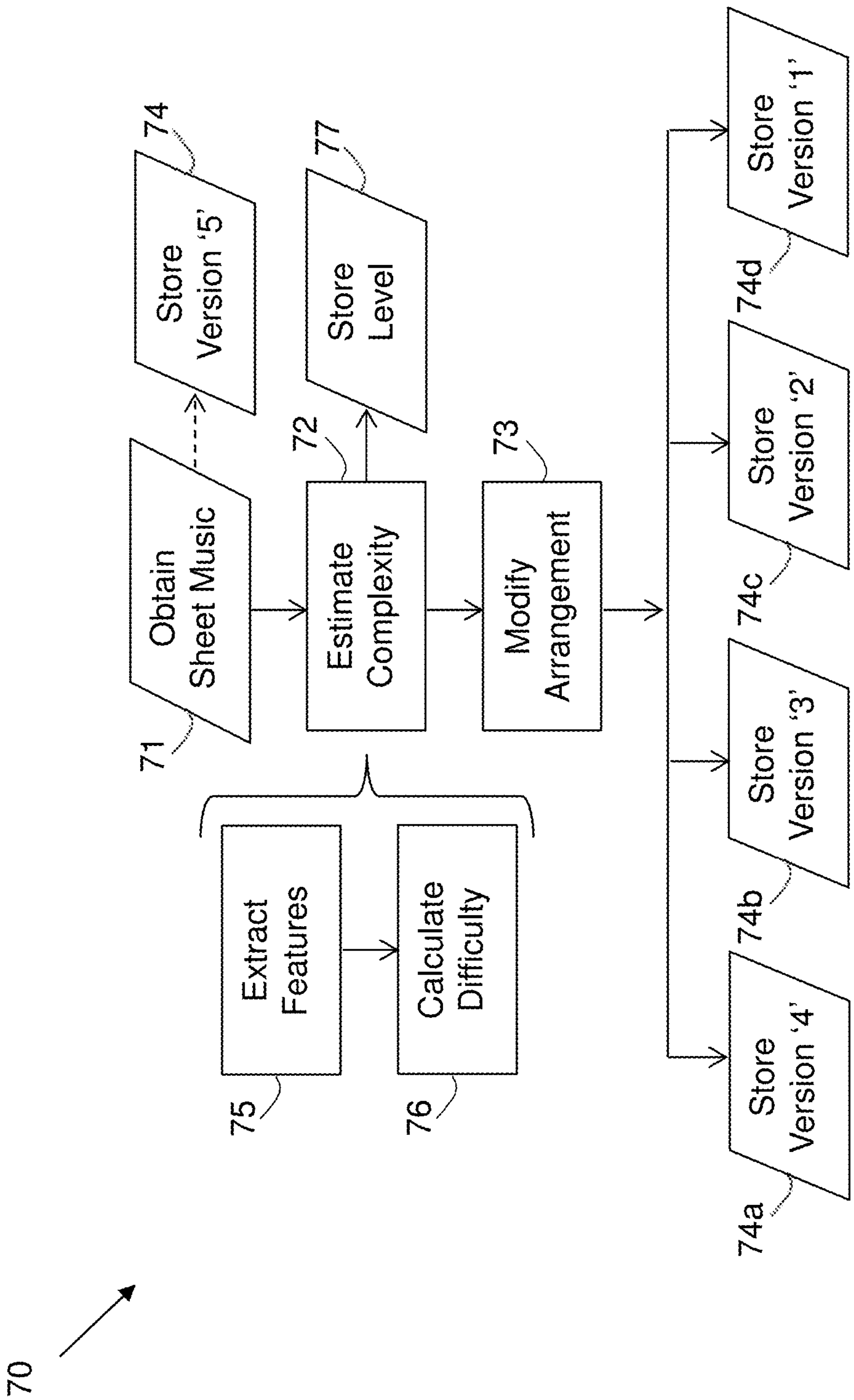
FIG. 7 illustrates a simplified schematic flow chart of a method for estimating and modifying complexity or difficulty of a sheet music.

A top row 88 identifies a first left column 87*a* as 'Name/ID', referring to an identifier of the musical piece, such as a name or a numeral identifier, a second column 87*b* as 'Type' referring to type or genre of the musical piece, a third column 87*c* as 'Tempo', referring to defined, suggested, or recommended tempo associated with the respective musical piece, and a fourth column 87*d* as 'File', identifying the filename that holds the respective sheet music (or other musical symbols sequence) of the respective musical piece. The complexity or difficulty level of the respective musical piece 88, which may be estimated or calculated as part of the "estimate Complexity" step 72 and may be stored in the table 86 as part of the "Store level" step 77 shown in the flow chart 70 in FIG. 7, are shown in a fifth column 87*e*. The table 89 examples N records of musical pieces, and N can be any number. In one example, the file may be a MIDI file or Music XML format.

In the example of the table 89, a musical piece 88*a* is identified by a name (or another identifier) Piece #1, the type of the piece is "Aria", the associated tempo is "Largo", the sheet music file is named sheet1.xml, denoting a MusicXML file format, and the corresponding complexity or difficulty level is '2'. Similarly, a musical piece 88*b* is identified by a name (or another identifier) Piece #2, the type of the piece is "Song", the associated tempo is "Allegro", the sheet music file is named sheet2.pdf, and the corresponding complexity or difficulty level is '4', a musical piece 88*c* is identified by a name (or another identifier) Piece #3, the type of the piece is "Song", the associated tempo is "Vivace", the sheet music file is named sheet3.doc, and the corresponding complexity or difficulty level is '3', a musical piece 88*d* is identified by a name (or another identifier) Piece #4, the type of the piece is "Poem", the associated tempo is "Presto", the sheet music file is named sheet4.pdf, and the corresponding complexity or difficulty level is '5', and a musical piece 88N is identified by a name (or another identifier) Piece #N, the type of the piece is "Sonata", the associated tempo is "Adagio", the sheet music file is named sheetN.mid (denoting a MIDI file format), and the corresponding complexity or difficulty level is '4'. In one example, another element of metadata may be to associate a respective skill level value. For example, in case a skill level value '3' is associated with a musical piece, it suggest that a user 36 with skill level of '3', such as the User #2 84*b* shown as part of the table 86, is adapted to reasonably play this difficulty level. While exampled using .pdf, .doc and .docx documents, any other format of a file or document may be equally used.

The tempo in the column 87*c* may be based on, may consist of, or may comprise, Larghissimo, Adagissimo, Grave, Largo, Lento, Larghetto, Adagio, Adagietto, Andante, Andantino, Marcia moderato, Andante moderato, Moderato, Allegretto, Allegro moderato, Allegro, Molto Allegro, Vivace, Vivacissimo, Allegrissimo, Allegro vivace, Presto, or Prestissimo. Alternatively or in addition, the tempo or pace in the column 87*c* may be equally represented in beats per minute (bpm), such as above 24 bpm, above 200 bpm, or within one of the ranges of 25-45 bpm, 40-60 bpm, 45-60 bpm, 60-66 bpm, 66-76 bpm, 72-76 bpm, 70-80 bpm, 76-108 bpm, 80-108 bpm, 83-85 bpm, 92-98 bpm, 98-112 bpm, 102-110 bpm, 116-120 bpm, 120-156 bpm, 124-156 bpm, 156-176 bpm, 172-176 bpm, or 168-200 bpm.

Each of the sequences of musical symbols 88*a*-88N may include or represent an entire of, or a part of, a musical piece. Further, in case of a musical piece that includes symbols for multiple musical instruments, the respective sequence may represent or include a sequence of symbols that is adapted only for the specific musical instrument, such as only for the piano 83. Each of, or part of, the musical pieces 88*a*-88N may comprise, may be part of, or may consist of, a song, a vocal music work, or a classical music work, such as an Aria, an Cadenza, an Concerto, an Movement, an Overture, an Opera, an Sonata, an Chamber music, or an Symphony. Alternatively or in addition, each of, or part of, the musical pieces 88*a*-88N may comprise, may be part of, or may consist of, a popular music work, such as a song, a dance, or a Funk, Country, Latin, Reggae, Hip-hop, or Polka music genre.

Figure 9:
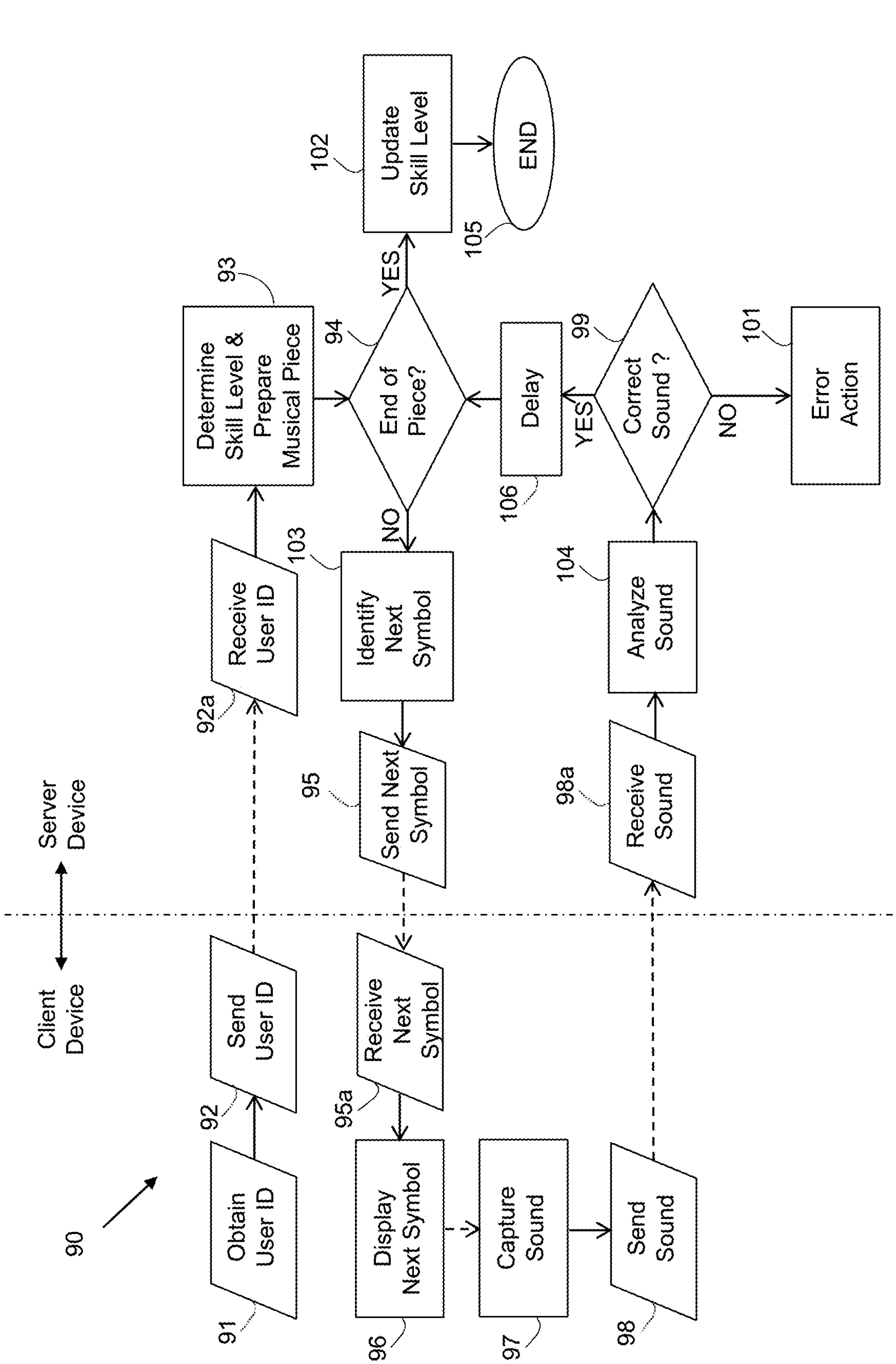
FIG. 9 illustrates a simplified schematic flow chart of a method for adaptive and interactive music learning based on a delay in the server device.

An example of the system 80 operation is presented as a flow chart 90 shown in FIG. 9. As part of an "Obtain User ID" step 91, the client device 35 identifies the person, such as the user 36, that operate the device. For example, such identifier or username may be inserted by the user 36 as part of a logging in to relevant application, for example by using the input component 38. Preferably, such user identification is the identical or directly and unambiguously corresponds to the one of the identifiers stored as 'User ID' column 86*a* in the table 86. The obtained user identifier is sent to the server device 23*a* over the Internet 22 via the wireless antenna 29 and the wireless transceiver 28, as part of a "Send User ID" step 92, and received by the server device 23*a* as part of a "Receive User ID" step 92*a*. Using the table 86, the server device 23*a* locates the received user identifier in the table 86, and determines the associated skill level value. For example, in case the user identifier is "User #3", the user 84*c* is located, and a skill level value of '2' is determined.

In one example, the musical piece to be played for the learning session is selected by the user 36, such as by using the input component 38, and sent to the server device 23*a* with the user identifier as part of the "Send User ID" step 92, and received by the server device 23*a* as part of the "Receive User ID" step 92*a*. Alternatively or in addition, the server device 23*a* selects a musical piece to play, such as from the table 89, preferably based on the user 36 determined skill level value. For example, is case of a User #3 84*c* and a skill level value of '2', the Piece #2 88*b* may be selected since Allegro tempo is best suited for this skill level. Alternatively or in addition, the last piece that was selected by the user 36, or the last piece played by the user 36, is selected for further playing and practicing. Alternatively or in addition, a piece (or part thereof) that was stored at a previous practice session since it was not well played (such as identified and stored as part of a "Store Part ID" step 135 or 135*a* described below), may be selected by the system, or recommended or offered to be selected by the user 36. The determining of the respective skill level value of the user and the selecting of the musical piece to be played are performed as part of a "Determine Skill Level & Prepare Musical Piece" step 93. In the case where the musical piece is selected or recommended by the system, the system may use a comparison between the user skill level value 86*b* and the complexity/difficulty level 87*e*. For example, the user #1 84*a* is associated with a skill level value of '1', and thus only the Piece #N 88N that is associated with the complexity/difficulty level of '1' may be suggested or selected, since all other pieces in the table 89 are associated with higher complexity/difficulty level values. Similarly, the user #3 84*c* is associated with a skill level value of '2', and thus only the Piece #N 88N that is associated with the complexity/difficulty level of '1' and the Piece #1 88*a* that is associated with the complexity/difficulty level of '2' may be suggested or selected, since all other pieces in the table 89 are associated with higher complexity/difficulty level values. In such a case, the Piece #1 88*a* may be preferred by the system or the user since the complexity/difficulty level of '1' associated with the Piece #N 88N may be too easy, and not be challenging enough or promoting the progress of the student. Further, the user #4 84*d* is associated with a skill level value of '5', and thus all the pieces in the table 89 are suitable, with preference to the Piece #4 88*d* that is associated with the same level '5'.

Upon selecting a musical piece as part of the "Determine Skill Level & Prepare Musical Piece" step 93, the respective music sheet file, such as the sheet2.pdf for the Piece #2 88*b*, and the respective sequence of musical symbols is sent. In one example, the musical symbols of the sequence are sent one at a time. As part of an "End of Piece?" step 94, the server device 23*a* checks whether all the symbols of the related sequence have been sent. As long as the sequence has not been sent in full, the next musical symbol in the sequence is sent as part of a "Send Next Symbol" step 95, and received by the client device 35 as part of a "Receive Next Symbol" step 95*a*. The received symbol is displayed by the display 81 as part of a "Display Next Symbol" step 96, such as the symbol 85*b* shown in FIG. 8*a*. Alternatively or in addition to sending the musical symbols of the sequence one at a time, part of, or all of, the symbols of the sequence are sent together, displayed together on the display 81, such as the sequence 85*a* shown in FIG. 8*a*, and the symbols are marked one at a time, such as by the arrow 85*c* shown in FIG. 8*a*. In such a case, an identification of the next symbol in the sequence is performed as part of a "Identify Next Symbol" step 103, sent to the client device 35 as part of the "Send Next Symbol" step 95, received by the client device 35 as part of the "Receive Next Symbol" step 95*a*, and the "Display Next Symbol" step 96 includes moving the marker (such as the arrow 85*c*) to the received next symbol.

In response to notifying the user 36 of the next musical symbol to be played, the player 36 is expected to timely and correctly play the piano 83 to produce the required sound that corresponds to the symbol that is displayed (or marked) on the display 81. As part of a "Capture Sound" step 97, the microphone 82 captures the received sound produced by the piano 83, and after digitization and encapsulation the digitized captured sound is sent, by the client device 35 as part of a "Send Sound" step 98, to the server device 23*a* over the Internet 22 via the antenna 29 and the wireless transceiver 28, where it is received as part of a "Receive Sound" step 98*a*.

Figure 6:
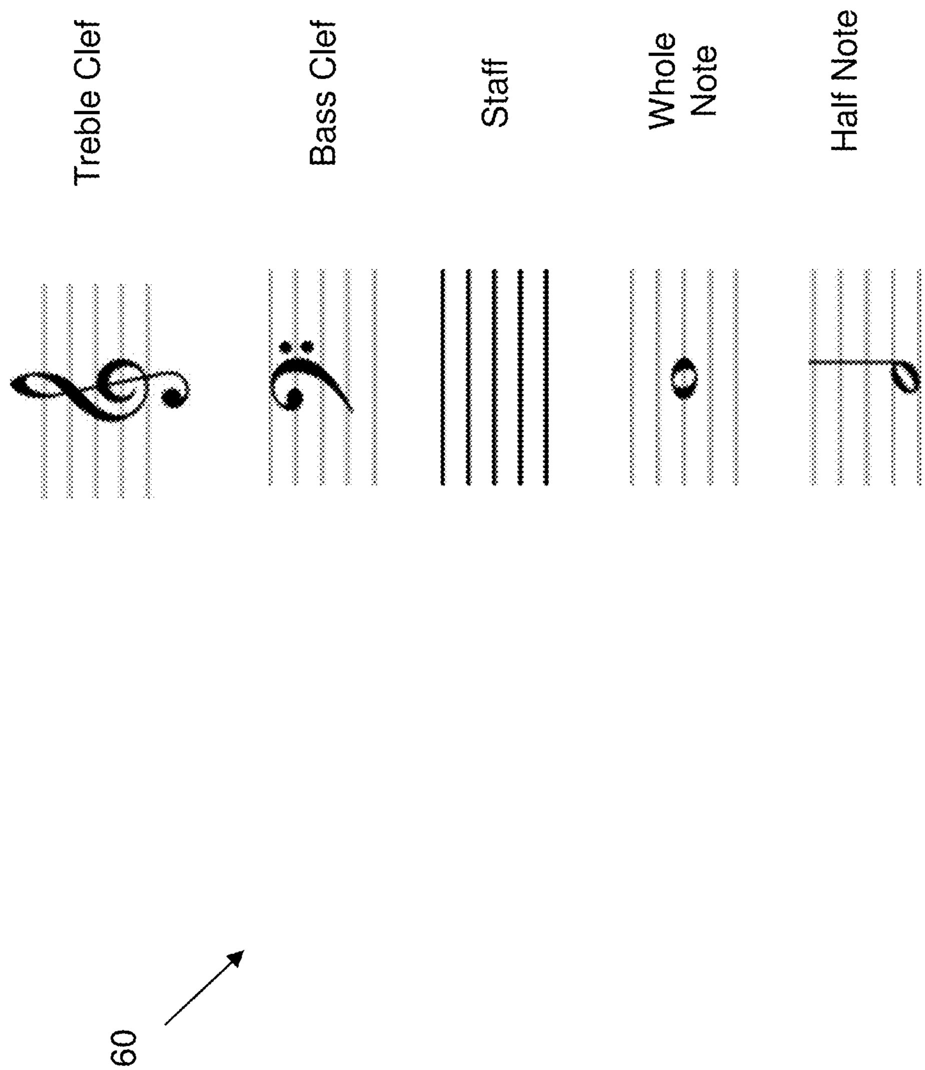
FIG. 6 depicts schematically examples of popular musical symbols according to a common music notation convention.
Figure 6A:
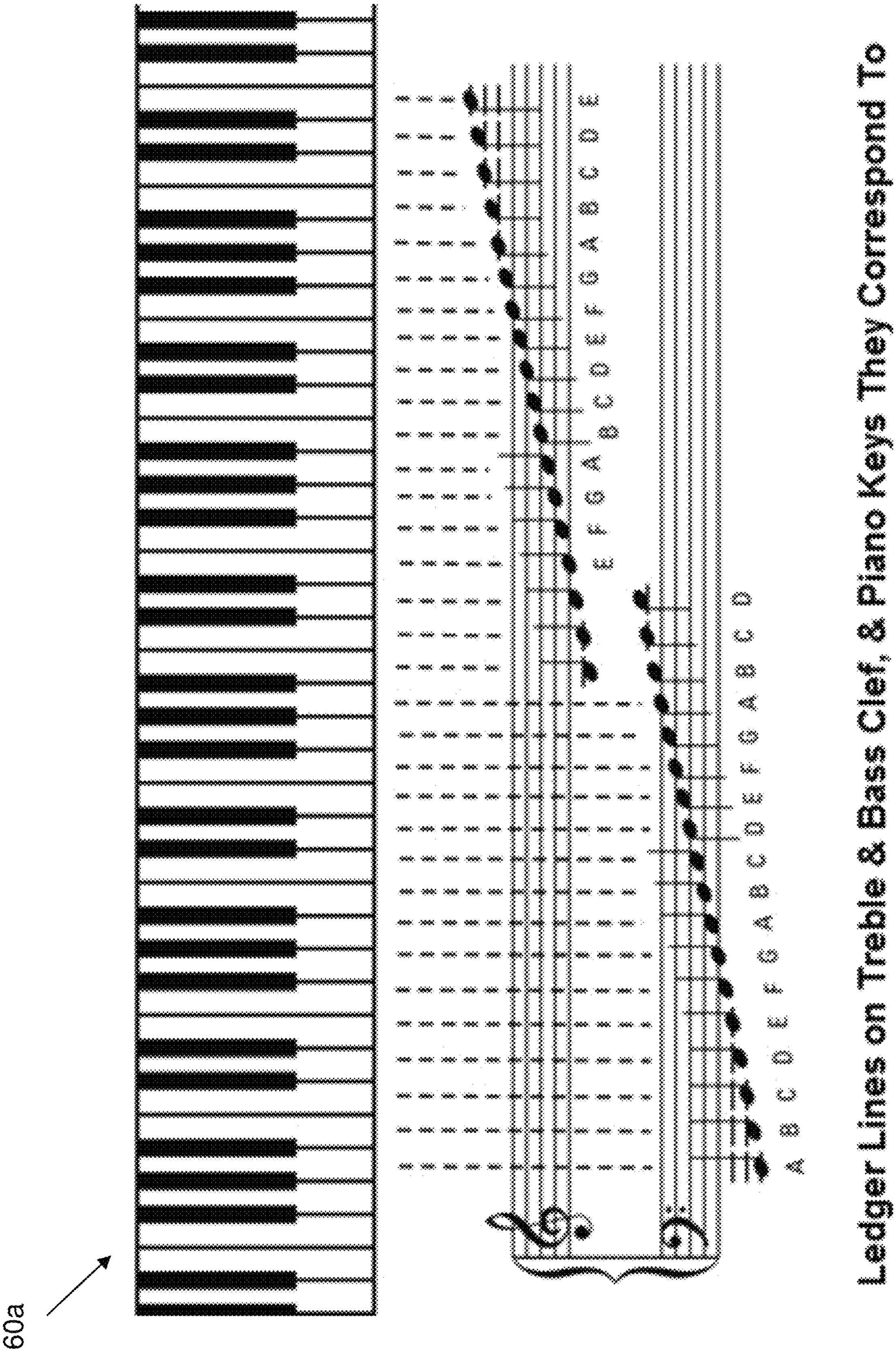
FIG. 6*a* depicts schematically a correspondence of musical symbols and the associated piano keys.
Figure 6B:
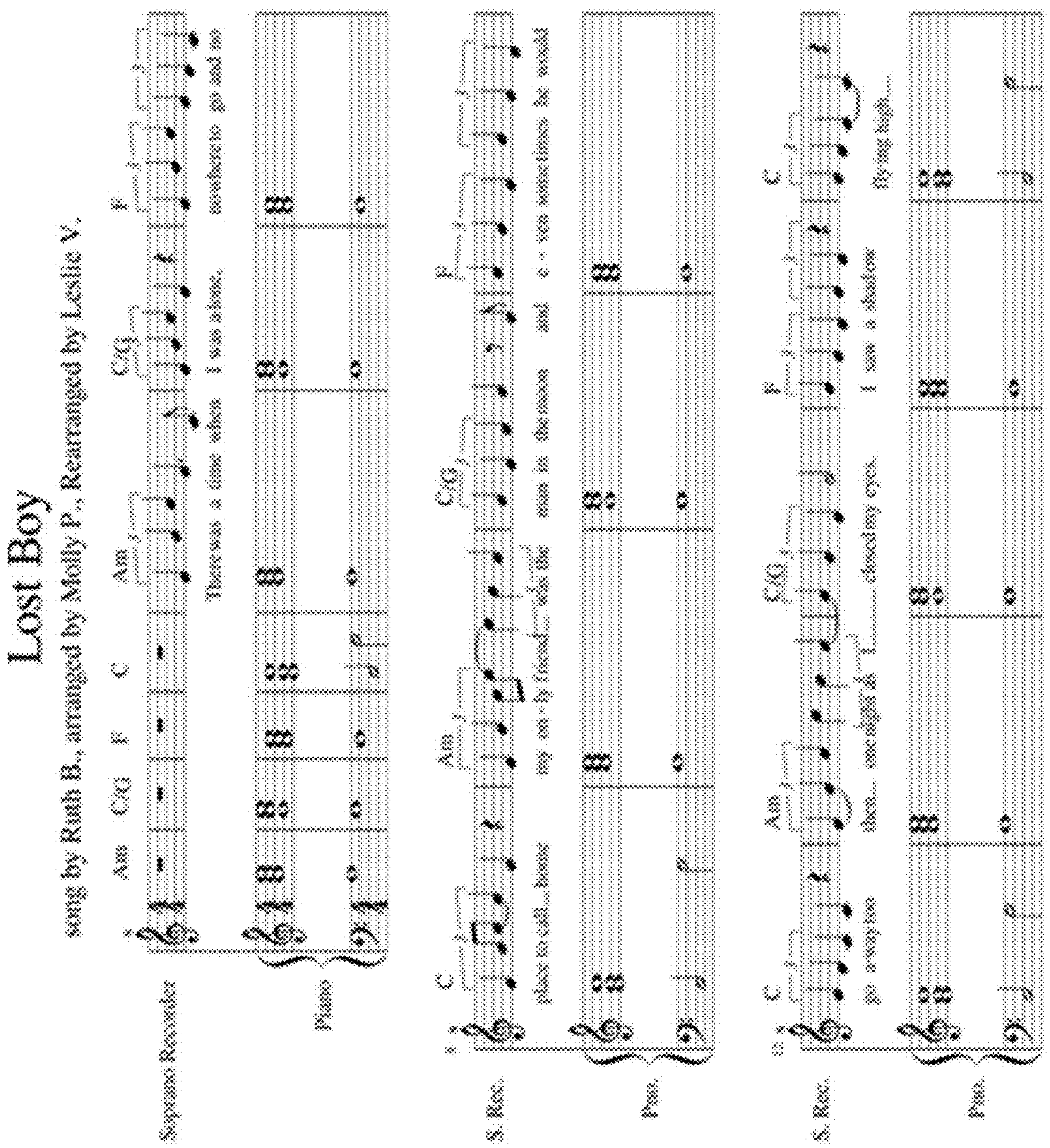
FIG. 6*b* depicts schematically a sheet music of a popular song.
Figure 6C:
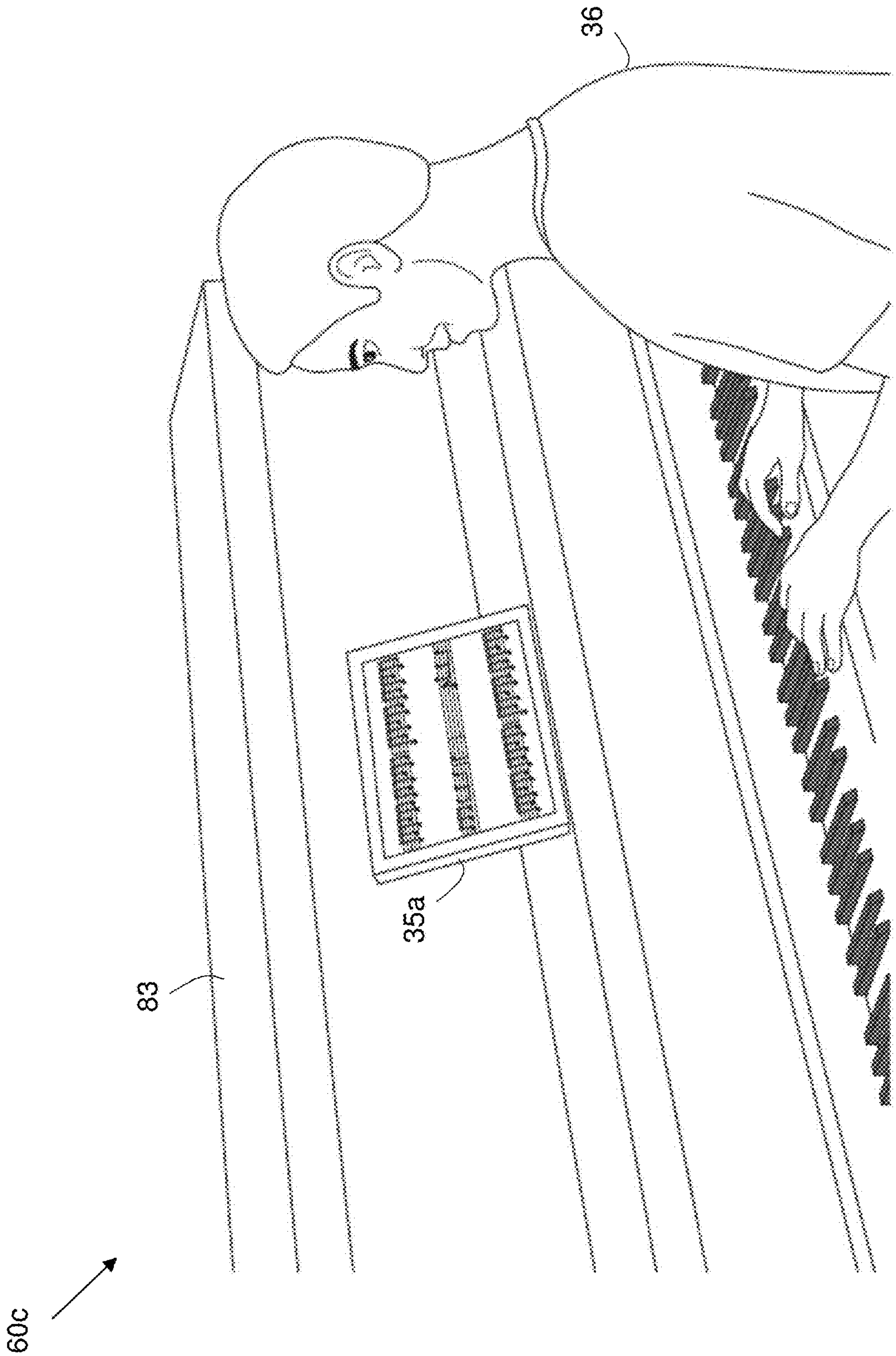
FIG. 6*c* depicts schematically an arrangement of a prior art online piano playing learning session using a tablet.

The received sound is analyzed as part of an "Analyze Sound" step 104. In one example, the received sound is obtained as a PCM audio data, and as part of a "Correct Sound?" step 99, the sound received as part of the "Receive Sound" step 98*a* is compared to the sound expected as a result of the musical symbol sent as part of the "Send Next Symbol" step 95 and identified as part of the "Identify Next Symbol" step 103. In the example of the piano 83 that includes 88 piano keys, the received sound stream is analyzed as part of the "Analyze Sound" step 104 to map the received sound to one (or more) played key out of the 88 piano keys, and as part of the "Correct Sound?" step 99, the mapped key (or multiple keys) is checked versus the key (or multiple keys) that is represented by the displayed musical symbol displayed as part of the "Display Next Symbol" step 96, for example according to the keys/symbols mapping scheme shown in FIG. 6*a*.

For example, the frequency response, the pitch, or the tonal or harmonic values of the received sound are compared to the expected values that corresponds to the sent symbol. In the case where it is determined as part of the "Correct Sound?" step 99 that the right key (and/or pedal) was pressed, and assuming that it was determined that this last symbol was not the last symbol of the sequence, as part of the "End of Piece?" step 94, the next symbol is repeatedly selected and sent as part of the "Send Next Symbol" step 95, after a delay as part of the "Delay" step 106.

The analysis of the captured sound signal as part of the "Analyze Sound" step 104 may be based on feature extraction using time-domain, frequency domain, or a combination thereof. The analysis is configured to handle harmonic instruments, such as the piano 83, where a single note or chord is composed of multiple frequencies (tones), playing multiple keys or notes together simultaneously, in an environment of environment noise, such as air conditioner, operating television set, street noise, and other general background noise in a building environment.

The analysis may use, may be based on, or may include Mel-Frequency Analysis, such as calculating the Mel-Frequency Cepstral Coefficients (MFCC). Alternatively or in addition, the analysis may use, may be based on, or may include Linear Predictive Coding (LPC), such as calculating the LPC coefficients. The extracted features may be, or may be based on (such as a function of), part of, or all of, the Mel-Frequency Cepstral Coefficients (MFCC), the LPC coefficients, or any combination thereof. Further, the analysis may use signal dominant frequency bands or a phase of the signal.

The feature extraction may be based on, or use, time-domain analysis, frequency-domain analysis, or both. A frequency-domain representation can also include information on the phase shift that must be applied to each sinusoid in order to be able to recombine the frequency components to recover the original time signal. An example for such conversion may be the Fourier transform, which converts the time-function into a sum of sine waves of different frequencies, each of which represents a frequency component. The 'spectrum' of frequency components is the frequency domain representation of the signal. The inverse Fourier transform converts the frequency domain function back to a time function. A spectrum analyzer is the tool commonly used to visualize real-world signals in the frequency domain. Some specialized signal processing techniques use transforms that result in a joint time-frequency domain, with the instantaneous frequency being a key link between the time domain and the frequency domain.

There are a number of different mathematical transforms that may be used to analyze time domain functions and are referred to as "frequency domain" methods. The most common transforms are Fourier series, Fourier transform, Laplace transform, Z transform, and Wavelet transform. The Fourier transform of a periodic signal only has energy at a base frequency and its harmonics. Another way of saying this is that a periodic signal can be analyzed using a discrete frequency domain. Dually, a discrete-time signal gives rise to a periodic frequency spectrum. Combining these two, if we start with a time signal that is both discrete and periodic, we get a frequency spectrum that is both periodic and discrete. This is the usual context for a discrete Fourier transform. Converting to frequency domain may include, may use, or may be based on, one or more of the methods described in articles by Boualem Boashash published in Proceedings of the IEEE, Vol. 80, No. 4, April 1992 (0018-9219/92$03.00, 1992 IEEE) entitled: "*Estimating and Interpreting The Instantaneous Frequency of a Signal—Part* 1: *Fundamentals*", and "*Estimating and Interpreting The Instantaneous Frequency of a Signal—Part* 2: *Algorithms and Applications*", and in an article by Jonatan Lerga (of University of Rijeka) entitled: "*Overview of Signal Instantaneous Frequency Estimation Methods*", which are all incorporated in their entirety for all purposes as if fully set forth herein.

The "Analyze Sound" step 104 may use, or may be based on, using a feature vector called the Enhanced Pitch Class Profile (EPCP) that introduced for automatic chord recognition from the raw audio in an article by Kyogu Lee Published 2006 by the center for Computer Research in Music and Acoustics Department of Music, Stanford University, entitled: "*Automatic Chord Recognition from Audio Using Enhanced Pitch Class Profile*", which is incorporated in its entirety for all purposes as if fully set forth herein. The Harmonic Product Spectrum is first obtained from the DFT of the input signal, and then an algorithm for computing a 12-dimensional pitch class profile is applied to it to give the EPCP feature vector. The EPCP vector is correlated with the pre-defined templates for 24 major/minor triads, and the template yielding maximum correlation is identified as the chord of the input signal. The experimental results show the EPCP yields less errors than the conventional PCP in frame-rate chord recognition.

Alternatively or in addition, the "Analyze Sound" step 104 may use, or may be based on, chord recognition systems that typically comprise an acoustic model that predicts chords for each audio frame, and a temporal model that casts these predictions into labelled chord segments, as described in an article by Filip Korzeniowski and Gerhard Widmer presented in the 19th International Society for Music Information Retrieval Conference, Paris, France, 2018, by the Institute of Computational Perception, Johannes Kepler University, Linz, Austria entitled: "*IMPROVED CHORD RECOGNITION BY COMBINING DURATION AND HARMONIC LANGUAGE MODELS*", which is incorporated in its entirety for all purposes as if fully set forth herein. Temporal models have been shown to only smooth predictions, without being able to incorporate musical information about chord progressions. Recent research discovered that it might be the low hierarchical level such models have been applied to (directly on audio frames) which prevents learning musical relationships, even for expressive models such as Recurrent Neural Networks (RNNs). However, if applied on the level of chord sequences, RNNs indeed can become powerful chord predictors. In this paper, we disentangle temporal models into a harmonic language model—to be applied on chord sequences—and a chord duration model that connects the chord-level predictions of the language model to the frame-level predictions of the acoustic model. In our experiments, we explore the impact of each model on the chord recognition score, and show that using harmonic language and duration models improves the results.

Alternatively or in addition, the "Analyze Sound" step 104 may use, or may be based on, a system and method for improving musical education through use of a game is disclosed in U.S. Pat. No. 9,492,756 to Izkovsky et al. entitled: "System and method for analyzing a digitalized musical performance", which is incorporated in its entirety for all purposes as if fully set forth herein. The method includes the steps of: receiving electrical signals associated with a musical piece provided by a user of the game; converting the electrical signals into digital samples; and analyzing the digital samples with use of auxiliary information, for purposes of improving signal analysis accuracy, resulting in determining various parameters of the musical piece provided by the user, wherein the auxiliary information is a-priori data related to at least one element selected from the group consisting of a musical instrument being played, a technical environment, the game, and information regarding the user of the game.

Alternatively or in addition, the "Analyze Sound" step 104 may use, or may be based on, extracting Chroma features, such as described in an article entitled: "*Analyzing Chroma Feature Types for Automated Chord Recognition*" by Nanzhu Jiang, Peter Grosche, Verena Konz, and Meinard Muller, published 2011 Jul. 22-24 in the AES 42ND INTERNATIONAL CONFERENCE, Ilmenau, Germany, which is incorporated in its entirety for all purposes as if fully set forth herein. The computer-based harmonic analysis of music recordings with the goal to automatically extract chord labels directly from the given audio data constitutes a major task in music information retrieval. In most automated chord recognition procedures, the given music recording is first converted into a sequence of chroma-based audio features and then pattern matching techniques are applied to map the chroma features to chord labels. In this paper, we analyze the role of the feature extraction step within the recognition pipeline of various chord recognition procedures based on template matching strategies and hidden Markov models. In particular, we report on numerous experiments which show how the various procedures depend on the type of the underlying chroma feature as well as on parameters that control temporal and spectral aspects.

Alternatively or in addition, the "Analyze Sound" step 104 may use, or may be based on, determining various parameters of the musical piece being played by the user. Examples of such parameters include, but are not limited to, the tone being played, the intensity of the tone, also referred to as the volume, the duration of the tone, and any additional characteristics that would assist in analyzing the playing of the musical piece by the user. Such additional characteristics may include, for example, instrument-specific measures, such as the volume of air that the user puts into a woodwind instrument, the accuracy of the timing and tempo a user plays a percussion instrument, the intensity that the user presses a piano key, or plays a guitar string, or other characteristics.

Alternatively or in addition, the "Analyze Sound" step 104 may use, or may be based on, estimating the fundamental frequencies of concurrent musical sounds, as described in an article by A. P. Klapuri entitled: "*Multiple fundamental frequency estimation based on harmonicity and spectral smoothness*" published in IEEE TRANSACTIONS ON SPEECH AND AUDIO PROCESSING, VOL. 11, NO. 6, November 2003 [11(6), 804-816, 2003], which is incorporated in its entirety for all purposes as if fully set forth herein. The method is based on an iterative approach, where the fundamental frequency of the most prominent sound is estimated, the sound is subtracted from the mixture, and the process is repeated for the residual signal. For the estimation stage, an algorithm is proposed which utilizes the frequency relationships of simultaneous spectral components, without assuming ideal harmonicity. For the subtraction stage, the spectral smoothness principle is proposed as an efficient new mechanism in estimating the spectral envelopes of detected sounds. With these techniques, multiple fundamental frequency estimation can be performed quite accurately in a single time frame, without the use of long-term temporal features. The experimental data comprised recorded samples of 30 musical instruments from four different sources. Multiple fundamental frequency estimation was performed for random sound source and pitch combinations. Error rates for mixtures ranging from one to six simultaneous sounds were 1.8%, 3.9%, 6.3%, 9.9%, 14%, and 18%, respectively. In musical interval and chord identification tasks, the algorithm outperformed the average of ten trained musicians. The method works robustly in noise, and is able to handle sounds that exhibit inharmonicities. The inharmonicity factor and spectral envelope of each sound is estimated along with the fundamental frequency.

Alternatively or in addition, the "Analyze Sound" step 104 may use, or may be based on, a conceptually simple and computationally efficient fundamental frequency (F0) estimator for polyphonic music signals, as described in an article by A. P. Klapuri entitled: "*Multiple Fundamental Frequency Estimation by Summing Harmonic Amplitudes*" published 2006 by the Institute of Signal Processing, Tampere University of Technology, University of Victoria, which is incorporated in its entirety for all purposes as if fully set forth herein. The studied class of estimators calculate the salience, or strength, of a F0 candidate as a weighted sum of the amplitudes of its harmonic partials. A mapping from the Fourier spectrum to a "F0 salience spectrum" is found by optimization using generated training material. Based on the resulting function, three different estimators are proposed: a "direct" method, an iterative estimation and cancellation method, and a method that estimates multiple FOs jointly. The latter two performed as well as a considerably more complex reference method. The number of concurrent sounds is estimated along with their FOs.

The "Delay" step 106 is operative to set the pace or tempo to the required one. Assuming the required pact or tempo is Allegro, corresponding to 120 bpm (a beat every 500 milliseconds (ms)), such as for the Piece #2 88*b* as part of table 89 shown in FIG. 8*b*, then as part of the "Delay" step 106, a delay is induced to ensure that the pace or rate of displaying musical symbol to be played is 500 ms. For example, in case there is a delay of 100 milliseconds from the time of the "Send Next Symbol" step 95 (or from the "Identify Next Symbol" step 103) to the end of checking of the correctness of the sound as part of the "Correct Sound?" step 99, a delay of an additional 400 ms is induced to arrive at the total of 500 ms.

In one example, the pace of displaying musical symbols on the display 81 to be played by the user 36 is reduced according to the skill level value, to better fit to the capability of the player 36, and to avoid frustrations due to hard to comply with speedy pace or tempo. In the example of skill level 1 to 5, where '1' is a beginner or novice and '5' is an expert level, the pace may be lowered accordingly. For example, in case of a tempo of Allegro that corresponds to 120 bpm, the Delay as part of the "Delay" step 106 is adapted so that in response to a skill level of '1' the affective bpm is reduced to 40 bpm (a total delay of 1.5 second), in response to a skill level of '2' the affective bpm is reduced to 60 bpm (a total delay of 1 second), in response to a skill level of '3' the affective bpm is reduced to 80 bpm (a total delay of 750 milliseconds), in response to a skill level of '4' the affective bpm is reduced to 100 bpm (a total delay of 600 milliseconds), and in response to a skill level of '5' the nominal tempo of 120 bpm is retained (a total delay of 500 milliseconds). In another example, in response to a skill level of '1' the affective bpm is reduced to 20% of the nominal value of 120 bpm-24 bpm (a total delay of 2.5 second), in response to a skill level of '2' the affective bpm is reduced to 40% of the nominal value of 120 bpm-48 bpm (a total delay of 1.25 seconds), in response to a skill level of '3' the affective bpm is reduced to 60% of the nominal value of 120 bpm-72 bpm (a total delay of 833 milliseconds), in response to a skill level of '4' the affective bpm is reduced to 80% of the nominal value of 120 bpm-96 bpm (a total delay of 625 milliseconds), and in response to a skill level of '5' the affective bpm is not changed and is 100% of the nominal value of 120 bpm.

Alternatively or in addition to the linear functions exampled herein, the correspondence between the skill level value and the displayed pace or tempo may be a non-linear function, such as where in response to a skill level of '1' the affective bpm is reduced to 40% of the nominal value, in response to a skill level of '2' the affective bpm is reduced to 65% of the nominal value, in response to a skill level of '3' the affective bpm is reduced to 75% of the nominal value, in response to a skill level of '4' the affective bpm is reduced to 90% of the nominal value, and in response to a skill level of '5' the affective bpm is not changed and is 100% of the nominal value.

Upon completion of the playing of the entire sequence, such as finalizing the playing of the entire musical piece, as checked by arriving at the last symbol of the sequence in the "End of Piece?" step 94, the sending of symbols stops and finalizing actions, such as updating the skill level value 86*b* of the specific user 86*a* in the table 86 as part of a "Update Skill Level" step 102, which may be based on the number of errors that are detected as part of the "Correct Sound?" step 99. In one example, the practicing session is ended as part of an "End" step 105. For example, a low threshold for the numbers of error in the played piece may be pre-defined, such as a different value for each skill level value. In case the number of errors is zero or less or less than the threshold value, the skill level value may be raised, such as from '3' to '4'. Similarly, a high threshold for the numbers of error in the played piece may be pre-defined, such as a different value for each skill level value. In case the number of errors is more than the threshold value, the skill level value may be lowered, such as from '3' to '2'. Similarly, in case where the number of errors is between the low and high thresholds, the skill level value remains unchanged.

A threshold, such as the low or high threshold, may be based on absolute number of errors, such as above 1, 2, 3, 5, 8, 10, 15, 20, 30, or 50 errors, or below 1, 2, 3, 5, 8, 10, 15, 20, 30, or 50 errors. Alternatively or in addition, a threshold, such as the low or high threshold, may be based on the relative errors versus the total number of symbols, such as being at least 0.1%, 0.2%, 0.5%, 0.8%, 1%, 2%, 3%, 5%, 8%, 10%, 15%, 20%, 30%, or 50% errors of the total number of symbols in the sequence, or being less than 0.1%, 0.2%, 0.5%, 0.8%, 1%, 2%, 3%, 5%, 8%, 10%, 15%, 20%, 30%, or 50% errors of the total number of symbols in the sequence.

Figure 10:
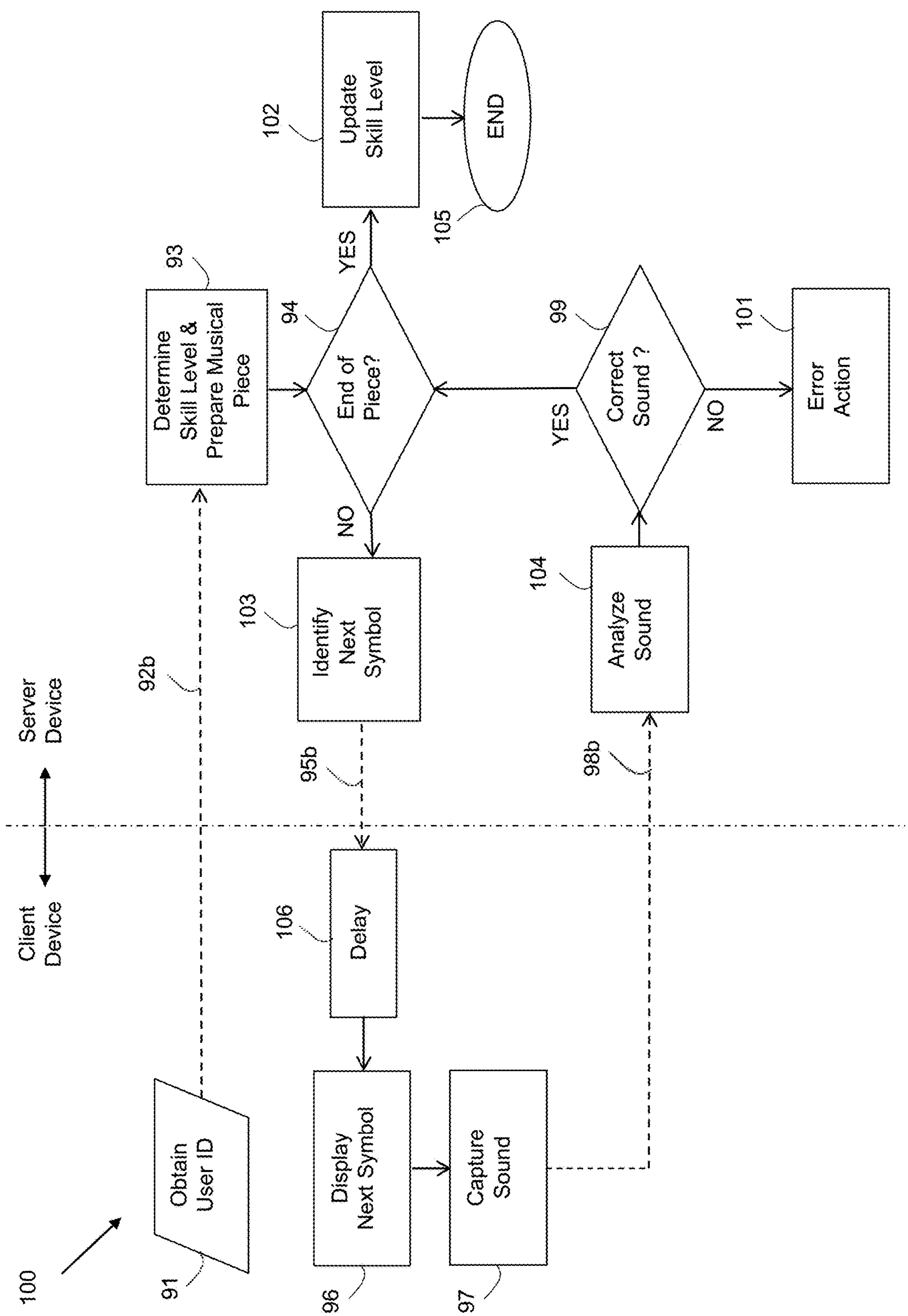
FIG. 10 illustrates a simplified schematic flow chart of a method for adaptive and interactive music learning based on a delay in the client device.

While in the flow chart 90 the "Delay" step 106 is executed by the server device 23*a*, this functionality may equally be performed at the client device 35, as exampled in a flow chart 100 shown in FIG. 10. Further, this function may be divided or cooperated between both devices.

In one example, the sequence of symbols that is displayed and checked in the flow chart 90 in FIG. 9 describes a practice that involves playing of the entirety of a musical piece. However, as an alternative or in addition, the sequence of symbols may equally represent only part of musical piece. In such a case, the items in rows 88 in the table 89 may refer to part of a musical piece, and not the entire piece.

A part of, or an entire of, musical piece may represent only a fraction of the piece length that is a partial duration of the entire piece. For example, in case of a musical piece that requires 20 minutes of playing, a part of it may be associated with 25% of the piece, specifically 5 minutes of playing. The 5-minutes duration part may be located anywhere in the piece, such as in the beginning of the piece (0-5 minutes), at the end of the piece (15-20 minutes), or in the middle of the piece, such as 5-10, or 10-15 minutes, parts. Similarly, the segment may be anywhere during the musical piece, such as in a 2-7, 8-13, 9.2-14.2 minutes of the piece playing. Similarly, the part duration may be defined in a relative term, such as at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, of the playing time of the musical piece, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the musical piece playing duration. Further, a part of a musical piece may be defined by its absolute duration that is less than the entire musical piece playing duration, such as at least 1, 2, 3, 5, 8, 10, 12, 15, 20, 25, 30, 40, 50, 60, 80, 100, 150, 200, 300, 500, or 1000 seconds, or may be less than 2, 3, 5, 8, 10, 12, 15, 20, 25, 30, 40, 50, 60, 80, 100, 150, 200, 300, 500, 1000 or 2000 seconds.

As an alternative or in addition, the duration of the part of the musical piece may be measured by means of number of symbols. For example, a musical piece may include 1200 symbols. In one example, a part may include a sequence of 100 symbols that may be the first 100 symbols (1-100), the last 100 symbols (1101-1200), or any sub-sequence in the middle of the piece, such as the symbols at the locations of 301-400, 979-1078, 1124-1223. Similarly, the part duration may be defined in a relative term, such as at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, of the number of symbols for the full playing time of the musical piece, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the number of symbols relating in the entire musical piece playing duration. Further, a part of a musical piece may be defined by its absolute number of symbols (that is less than the entire musical piece playing duration), such as at least 1, 2, 3, 5, 8, 10, 12, 15, 20, 25, 30, 40, 50, 60, 80, 100, 150, 200, 300, 500, or 1000 symbols, or may be less than 2, 3, 5, 8, 10, 12, 15, 20, 25, 30, 40, 50, 60, 80, 100, 150, 200, 300, 500, 1000 or 2000 symbols.

In one example, the duration of a part, wither by means of time duration or by means of number of symbols, may be determined in response to the skill level value of a specific user 84. A shorter part may be more suitable to lower skill level values compared with a longer parts that may be more suitable to higher skill level values, in order to reduce frustration of the player. For example, a user such as the User #1 84*a* that is associated with skill level value of '1', may be assigned for practice with a part that is shorter than a user, such as the User #2 84*b* that is associated with skill level value of '3', as described in the table 89.

As described in the flow chart 90 shown in FIG. 9, the skill level value 86*b* of the specific user 86*a* in the table 86 is updated as part of a "Update Skill Level" step 102, at the end of playing a piece as determined in the "End of Piece?" step 94. In this example, the updated skill level value influences the playing pace only on a next practicing session where a new musical piece (or the same one) is selected for use as part of the "Determine Skill Level & Prepare Musical Piece" step 93. Such scenario may frustrate the user if there is a substantial mismatch between the user actual skill level 86*b* and the skill level stored in the user database 31*a*.

Alternatively or in addition, the modification of the skill level value 86*b* and the associated playing pace may be performed in specified times within the playing period, without disrupting the practicing flow or affecting the progress momentum. For example, a musical piece may be partitioned into multiple parts that are sequentially played, and the assessment of the user 36 skill level value, and the associated playing pace, are updated at the end of each part, in a fluent real time manner, where the transition is not felt by the player 36. Such mechanism reduces the user 36 frustration, and allows for quick, on-the-fly, real-time adaptation of the user 36 skill level 86*b* and the respective playing pace along with a continuous practicing session.

Figure 11:
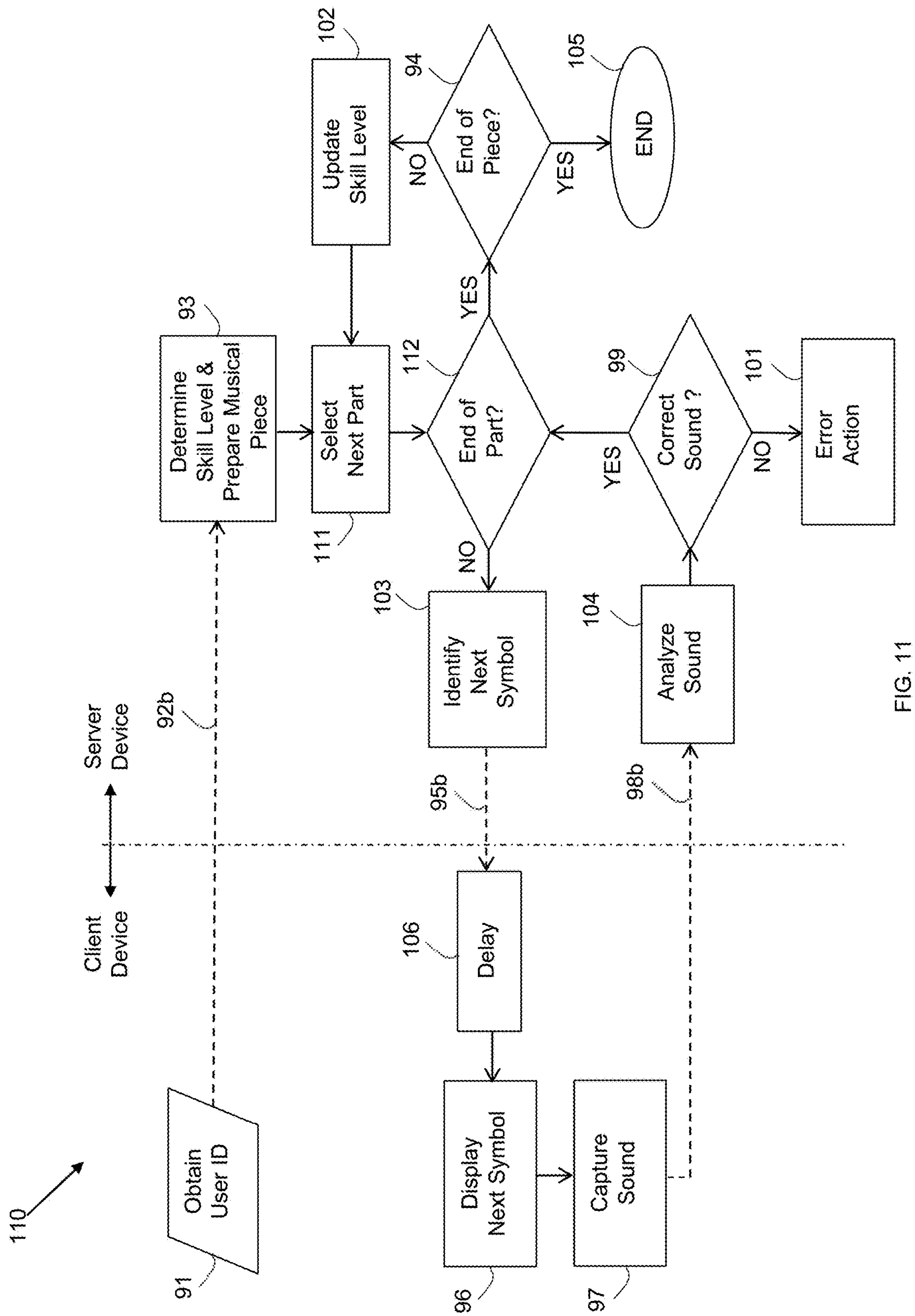
FIG. 11 illustrates a simplified schematic flow chart of a method for adaptive and interactive music learning based on sequentially displaying and playing parts of a musical piece.

A part-based updating of the skill level value 86*b* (and the associated pace) is described in a flow chart 110 shown in FIG. 11. Each of the musical pieces 88 in the table 89 is partitioned into multiple parts. After selecting a musical piece as part of the "Determine Skill Level & Prepare Musical Piece" step 93, a part of the selected musical piece is selected as part of a "Select Next Part" step 111. For example, the part that begins the piece may be first selected, followed sequentially by the other parts. As long as the all symbols of the selected part are not yet played, as determined in a "End of Part ?" step 112, the playing of the selected part continues, similar to the process described in the flow chart 90. After displaying (and playing) of the last symbol of the selected part, as detected in the "End of Part ?" step 112, it is determined, similar to the flow chart 90, whether the entire piece playing is completed, for example if the part that is ending of the piece has been played, as part of the "End of Piece ?" step 94. In case the musical piece has not been entirely played, the user skill level value is updated as part of the "Update Skill Level" step 102, based on the number of errors detected as part of the "Correct Sound ?" step 99. The next part to be played is then selected as part of the "Select Next Part" step 111, and the next selected part is played in a pace that corresponds to the user's updated skill level value. In such a scheme, a proper error-free (or minimally errored) played part may result in increasing of the user skill level value and accordingly increasing of the pace of playing of the parts, and an excessive error parts may result in lowering of the user skill level value and accordingly reducing the pace of playing of the parts.

A musical piece may be partitioned into any number of parts, such as at least 2, 3, 4, 5, 7, 10, 12, 15, 20, 25, 30, 40, 50, 60, 80, or 100 parts, or may be partitioned into less than 3, 4, 5, 7, 10, 12, 15, 20, 25, 30, 40, 50, 60, 80, 100, or 200 parts. The partition may be sequential in the musical piece, where each part (except the first part at the beginning of the piece) is following another part in the symbol sequence, or may be non-sequential, for example where there are symbols that do not belong to any one of the parts. Further, the partition may be non-overlapping, wherein each specified symbol in the piece is included in no more than a single part, or may be overlapping, wherein at least one specific symbol is included in two or more parts. In one example, the parts are of different playing duration or include different number of symbols. In another example, at least two of the parts, or all of the parts, are of the same playing duration or include the same number of symbols.

The partition may be time based, wherein one of the parts, at least two of the parts, or each of the parts, may be at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, of the playing time of the musical piece, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the musical piece playing duration. Similarly, one of the parts, at least two of the parts, or each of the parts, may be of a duration of at least 1, 2, 3, 5, 8, 10, 12, 15, 20, 25, 30, 40, 50, 60, 80, 100, 150, 200, 300, 500, or 1000 seconds, or may be less than 2, 3, 5, 8, 10, 12, 15, 20, 25, 30, 40, 50, 60, 80, 100, 150, 200, 300, 500, 1000 or 2000 seconds.

As an alternative or in addition, the partition may be symbol based, wherein one of the parts, at least two of the parts, or each of the parts, may be at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, of the number of symbols for the full playing time of the musical piece, or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the number of symbols relating in the entire musical piece playing duration.

Figure 11A:
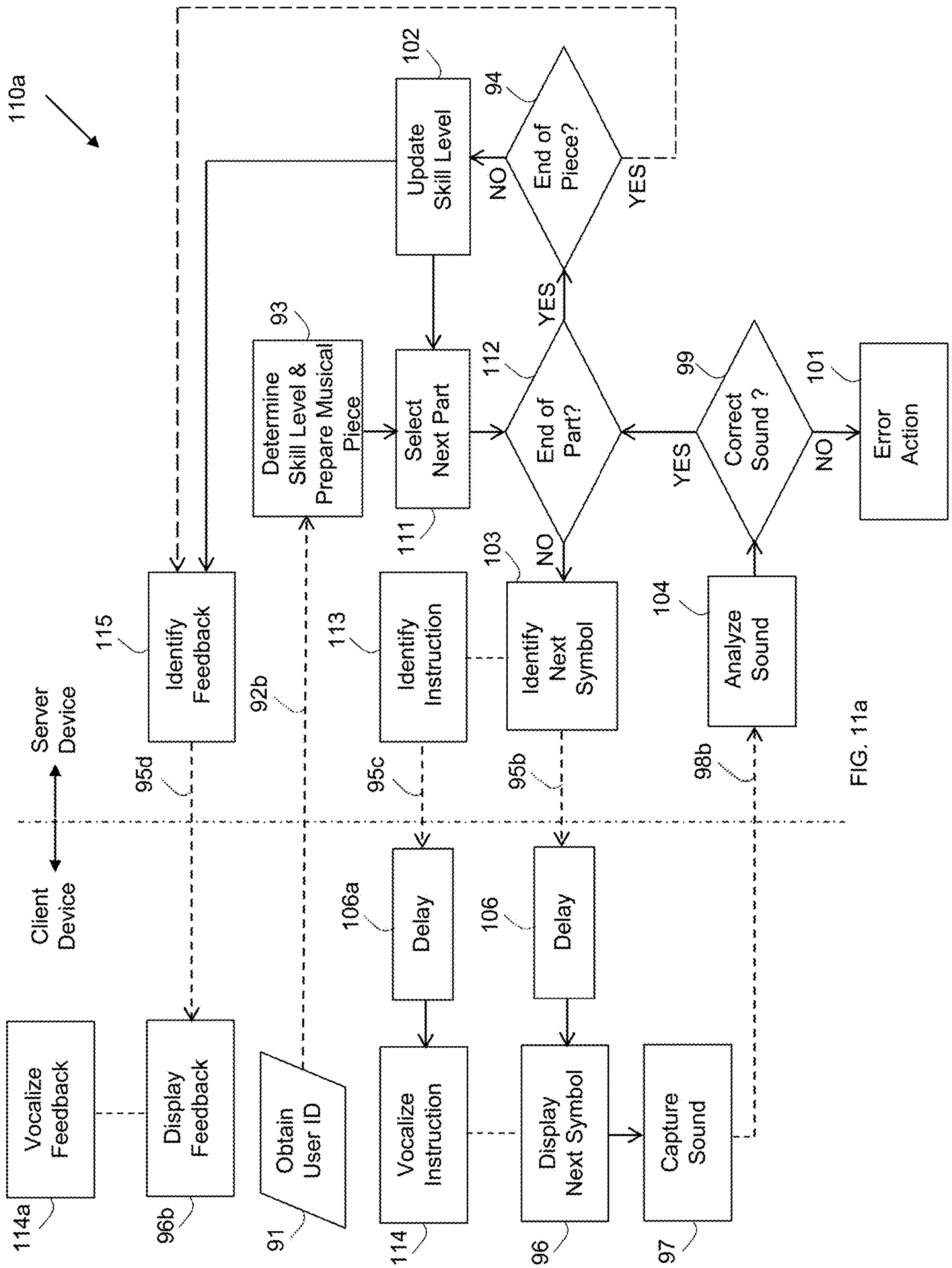
FIG. 11*a* illustrates a simplified schematic flow chart of a method for adaptive and interactive music learning based on sequentially displaying playing parts of a musical piece and on audible instructions or cues.

While exampled in the flow chart 110 in FIG. 11 that the user 36 is visually instructed how to play the musical instrument (such as the piano 83) using the display 81 in the client device 35, audible instruction or cues may be equally used, as an alternative or in addition to visual interaction with the user 36, as exampled in a flow chart 110*a* shown in FIG. 11*a*. As part of an "Identify Instruction" step 113, an audible instruction or cue is identified. In one example, the audible instruction may include, or may be associated with, an audible identifier of the symbol (such as a note or chord) that is identified as part of the "Identify Next Symbol" step 103, such as "play note X" or "chord Y". Alternatively or in addition, the audible instruction may include, or may be associated with, other instructions or cues pertaining to how to play the musical instrument 83. For example, each key of the piano 83 may be numbered, and the voice command may include identifying of the key number, such as 'key five' or 'play three and seven together'. The identified cue or instruction may then be sent over a communication path 95*c*, that may be the same as, identical to, similar to, or part of, the communication path 95*b*, and delayed as part of a "Delay" step 106*a*, which may be the same as, identical to, similar to, or part of, the "Delay" step 106, and then vocalized to be sounded to the user 36, such as by the sounder 78, as part of a "Vocalize Instruction" step 114. In case where instruction for playing the musical instrument 83 are provided by both the audible sounding as part of the "Vocalize Instruction" step 114 and the "Display Next Symbol" step 114, both instructions or cues should be synchronized and coordinated, in order not to confuse the user 36. The "Delay" step 106*a* may be used to provide a delay that provide coordination between both instructions (or cues) provided to the user 36. The audio instruction is shown in the flow chart 110*a* in FIG. 11*a* to be determined in the server device 23*a*. Alternatively or in addition, the determining as part of the "Identify Instruction" step 113 may be performed in the client device 35, in response to the received next symbol in the communication path 95*b*.

The sounding of the instructions or ques as part of the "Vocalize Instruction" step 114 may use, may be based on, or may comprise, and the sounded human speech may be produced using a hardware, software, or any combination thereof, of a speech synthesizer, which may be Text-To-Speech (TTS) based. The speech synthesizer may be a concatenative type, using unit selection, diphone synthesis, or domain-specific synthesis. Alternatively or in addition, the speech synthesizer may be a formant type, and may be based on articulatory synthesis or Hidden Markov Models (HMM) based. Further, any speech synthesizer herein may be based on, or may use, any of the schemes, techniques, technologies, or arrangements described in the book entitled: "*Development in Speech Synthesis*", by Mark Tatham and Katherine Morton, published 2005 by John Wiley & Sons Ltd., ISBN: 0-470-85538-X, in the book entitled: "*Speech Synthesis and Recognition*" by John Holmes and Wendy Holmes, 2nd Edition, published 2001 ISBN: 0-7484-0856-8, in the book entitled: "*Techniques and Challenges in Speech Synthesis—Final Report*" by David Ferris [ELEC4840B] published Apr. 11, 2016, or in the book entitled: "*Text-to-Speech Synthesis*" by Paul Taylor [ISBN 978-0-521-89927-7] published 2009 by Cambridge University Press, which are all incorporated in their entirety for all purposes as if fully set forth herein.

In one example, the interaction with the user 36 is enhanced by providing feedback that is based on the actual analysis of a practice session, such as playing a part of, or an entire of, a musical piece, to the user 36. For example, in case of no errors, or tolerable number of errors (that may correspond to the user skill level) in a practice session, a positive feedback may be provided or notified to the user visually or audibly, such as 'Good work', 'Great', 'Terrific', 'Impressive', 'Way to go', 'Exactly right!' or 'No errors', and in case of upgrading the skill level value as part of "Update Skill Level" step 102, accordingly notifying the user 36 in a message such as 'Skill level upgraded' or 'Congratulations, you got it right!'. Similarly, in case of poor performance, such as too many errors in playing, a negative or encouraging feedback may be provided or notified to the user visually or audibly, such as 'Keep practicing', 'Too many errors', 'Don't give up', or 'Come on! You can do it!'. A feedback mechanism is exampled in the flow chart 110*a* shown in FIG. 11*a*.

Upon completing the practice of a part of a musical piece as determined as part of the "End of Part" step 112, in addition to updating the skill level value as part of the "Update Skill Level" step 102, a feedback message is determined as part of an "Identify Feedback" step 115. The message identified to be provided or notified to the user 36 may be based on the number of errors detected through the practice session, such as part of the "Error Action" step 101. For example, the message may be base on any score, such as the cumulative number of errors N determined in the "N←N+1" step 132 described herein, may be based on comparing the number of cumulative errors to a threshold, such as in the "N>Nthres ?" step 133 described herein, may be based on the decision to change the skill level value as part of the "Update Skill Level" step 102, or any combination thereof. In one example, the message to be notified or otherwise provided to the user 36 is determined as part of the "Identify Feedback" step 115 in the client device 35. Alternatively or in addition, the message to be notified or otherwise provided to the user 36 may be determined as part of the "Identify Feedback" step 115 in the server device 23*a*, and sent to the client device 35 over a communication path 95*d*, and then the received message is then displayed on the display 81 as part of the "Display Feedback" step 96*b*.

As an alternative to, or in addition to, visually displaying the feedback message on the display 81, the feedback message may be sounded by the sounder 78 as part of a "Vocalize Feedback" step 114*a*. The sounding of the feedback message as part of the "Vocalize Feedback" step 114*a* may use, may be based on, or may comprise, and the sounded human speech may be produced using a hardware, software, or any combination thereof, of a speech synthesizer, which may be Text-To-Speech (TTS) based. The speech synthesizer may be a concatenative type, using unit selection, diphone synthesis, or domain-specific synthesis. Alternatively or in addition, the speech synthesizer may be a formant type, and may be based on articulatory synthesis or Hidden Markov Models (HMM) based. Further, any speech synthesizer herein may be based on, or may use, any of the schemes, techniques, technologies, or arrangements described in the book entitled: "*Development in Speech Synthesis*", by Mark Tatham and Katherine Morton, published 2005 by John Wiley & Sons Ltd., ISBN: 0-470-85538-X, in the book entitled: "*Speech Synthesis and Recognition*" by John Holmes and Wendy Holmes, 2nd Edition, published 2001 ISBN: 0-7484-0856-8, in the book entitled: "*Techniques and Challenges in Speech Synthesis—Final Report*" by David Ferris [ELEC4840B] published Apr. 11, 2016, or in the book entitled: "*Text-to-Speech Synthesis*" by Paul Taylor [ISBN 978-0-521-89927-7] published 2009 by Cambridge University Press, which are all incorporated in their entirety for all purposes as if fully set forth herein.

While exampled regarding notifying a feedback message to the user 36 as the end of a part of musical piece, such notifying may be activated, alternatively or in addition, at the end of the entire musical piece, shown by a dashed line in the flow chart 110*a*, where upon determining that the entire piece was played as part of the "End of Piece?" step 94, the feedback message is identified as part of the "Identify Feedback" step 115, and notified to the user 36 as part of the "Display Feedback" step 96*b* or the "Vocalize Feedback" step 114*a*.

In the example shown in the arrangement 80*a* shown in FIG. 8*a*, the symbols to be played are visually displayed to the user 36 using a display 81 in the client device 35. Alternatively or in addition, the display 81 may be a projector. Such projector may indicate by illuminating to the user 36 how to play the musical instruments. In the example of the piano 83, the projector may illuminate on the piano keyboard, identifying to the user 36 by illuminating what key (or multiple keys) are to be next played. The projector serving as the display 81 may consist of, or may comprise, an Eidophor projector, Liquid Crystal on Silicon (LCoS or LCOS) projector, an LCD projector, an MEMS projector, a virtual retinal display, or a Digital Light Processing (DLP™) projector. Further, the display 81 or the display screen may consist of, or may comprise, a video display, such as a 3D video display, that supports Standard-Definition (SD) or High-Definition (HD) standards, and may be capable of scrolling, static, bold or flashing the presented information.

Figure 12:
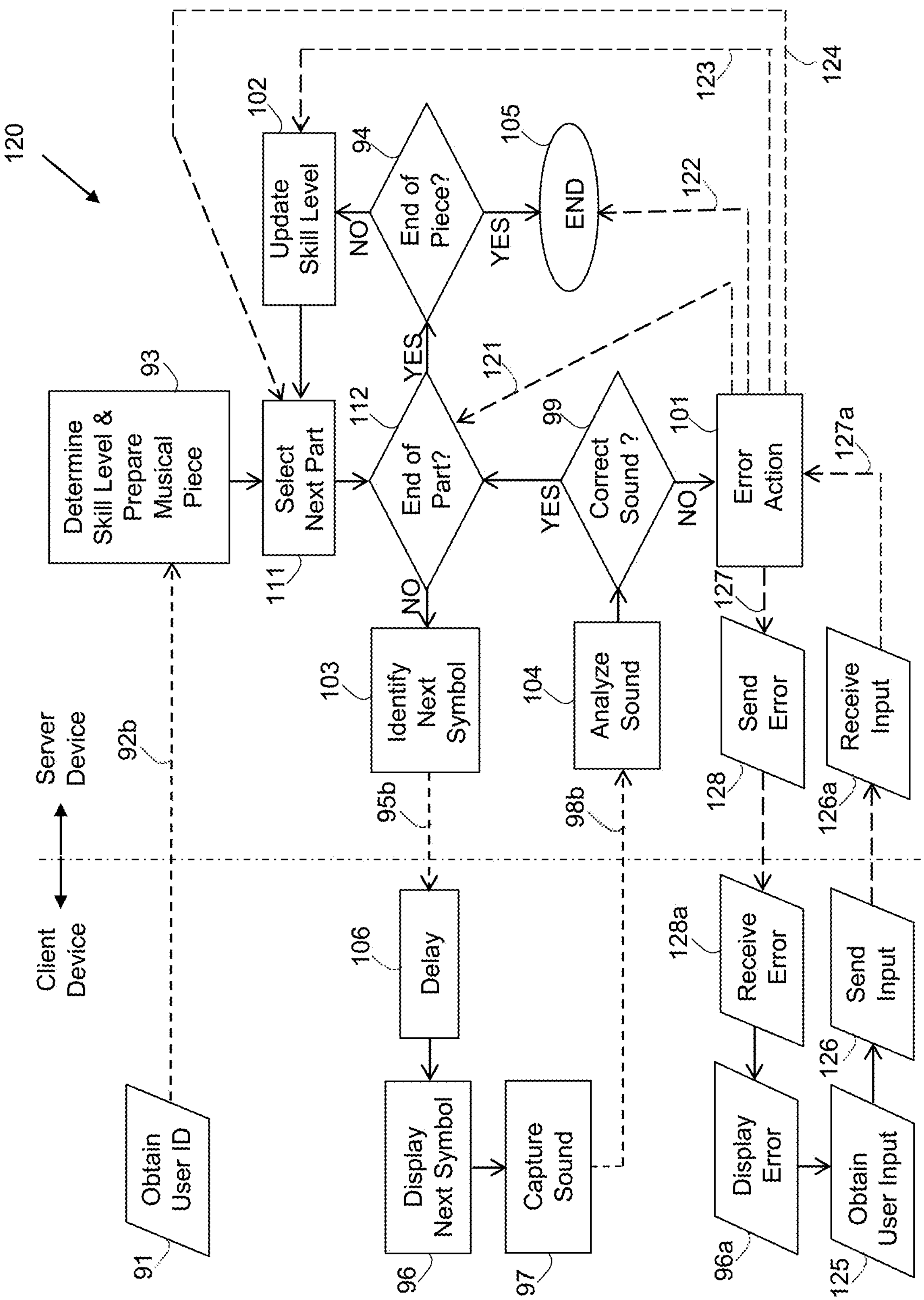
FIG. 12 illustrates a simplified schematic flow chart of a method for handling errors as part of an adaptive and interactive music learning.

Upon detecting an error as part of the "Correct Sound?" step 99, various error related actions may be performed, individually or in combination, as part of the "Error Action" step 101. The various alternatives for progress of playing practice session in response to an error are described in a flowchart 120 shown in FIG. 12. In one example, shown as dashed line 121, there is no stopping or delaying of the progress of the session, and even upon detecting of an error in playing a displayed musical symbol, the progress relating to the selecting and displaying of the next symbol is not affected, delayed, or changed in any way, and continues as part of the "End of Part" step 112. Such mechanism may be useful in particular for a low skill level player, who is expected to make a lot of errors, and any stop of the flow may create frustration and may result in negative user experience. As an alternative, a detection of an error (or in case of multiple errors) may lead to ending of the practice session as part of the "END" step 105, as shown by a dashed line 122. In case of multiple errors detected (or even in case of a single error), rather than ending the practice session altogether, the response may be to move to the next part as part of the "Select Next Part" step 111, as shown by a dashed line 124. In order to better adapt to the player 36 skill level, the associated skill level value 86*b* may be updated as part of the "Update Skill level" step 102, and only then the system may progress the next part as part of the "Select Next Part" step 111, where the pace associated with the updated skill level value is used. The selection between the four alternatives progress paths 121, 122, 123, and 124 may be based on pre-configuration logic that may be based on the user 36 skill level value and the level or the playing, such as based on a cumulative number or errors rather than based on a single error.

Alternatively or in addition, the selection between the four alternatives progress paths 121, 122, 123, and 124 may be based on the user 36 setting, as part of a configuration, installation, or logging procedure, for example by using the input component 38. Alternatively or in addition, the selection between the four alternatives progress paths 121, 122, 123, and 124 may be based on the user 36 setting upon the occurrence of an error (or of a series of errors), and the system may refer to the player 36 for a guidance how to progress. In such a configuration, which progress is shown by a dashed line 127, the server device 23*a* send an error message to the client device 35 as part of a "Send Error" step 128, and the error message is received by the client device 35 as part of a "receive Error" step 128*a*, and then the error message and the optional progress paths, such as to continue as before according to the path 121, to stop the session according to the path 122, to continue to the next part according to the path 124, or to update the skill level value and then to continue to the next part according to the path 123, are displayed to the user 36 as part of a "Display Error" step 96*a*. The player 36 may then select, such as by using the input component 38, the preferred path to progress, and the selection is sent by the client device 35 to the server device 23*a* as part of a "Send Input" step 126, to be received by the server device 23*a* as part of a "Receive Input" step 126*a*. The user 36 selection is then used, as shown by a dashed line 127*a*, as part of the "Error Action" step 101 for executing the progress path that was selected by the player 36. In one example, as an alternative or in addition to visually notifying the user 36, the "Display Error" step 96*a* may comprise an audible notification to the user 36 using the speaker 78.

In one example, an action as part of the "Error Action" step 101 may be initiated upon detecting a single error as part of the "Correct Sound ?" step 99. However, it is expected, in particular where low skill level user 36 is practicing, that many errors may occur. Hence, it may be preferred to define an 'error score' that is based on the occurrence of more than a single error, and make use of cumulative counting of errors in an entire musical piece, or any part thereof. Such an arrangement for counting the number of errors in an entire musical piece is described in a flow chart 130 shown in FIG. 13, where a counter 'N' is used to count the number of errors. The N is reset to zero as part of a "NO" step 131, at the beginning of playing of the selected musical piece. Each time an error is detected as part of the "Correct Sound ?" step 99, the N counter is incremented as part of a "N←N+1" step 132. The cumulative number of errors N, the 'error score', may be used to determine how to update the skill level value in the "Update Skill Level" step 102, after completing a part of the selected musical piece, as described herein. Upon completion of the playing of the musical piece, as determined as part of the "End of Piece?" step 94, the errors score N is compared versus a predefined threshold value Nthres, representing a maximum allowed number of errors that do not require a specific error action response, as part of a "N>Nthres ?" step 133. In case the errors score N is less than the set threshold, suggesting that the errors level is tolerable, such as zero errors or under the defined minimum, and may not require a specific action as part of the "Error Action" step 101, and thus the piece playing session is ended in the "END" step 105.

In a case where it is determined that the number of errors ('error score') is above the defined threshold Nthres as part of the "N>Nthres ?" step 133, various error relation actions may be performed. In one example, the identification, such as the row 88 of the musical piece is stored as part of a "Store Piece ID" step 135, for future use. Such use may be recommending to practice again on this musical piece until the required performance level is obtained, such as having an error score in this piece that is lower than the Nthres specified threshold.

Further, the user 36 may be notified of the error score being above the threshold, by sending an error message from the server device 23*a* to the client device 35 as part of the "Send Error" step 128, and receiving the message by the client device 35 as part of the "Receive Error" step 128*a*. The message may then be notified to the user 36 as part of a "Notify User" step 134, which may use any output component 34 in the client device 35. In one example, the notification to the user 36 as part of the "Notify User" step 134 uses the display 81, visualizing the error message to the user 36. For example, symbols that were not determined to be correct may be visualized as marked to the user 36, such as by highlighting these symbols, changing their color, flashing the symbols, and similar markings. In one example, as an alternative or in addition to visually notifying the user 36, the "Notify User" step 134 may comprise an audible notification to the user 36 using the speaker 78.

Figure 13:
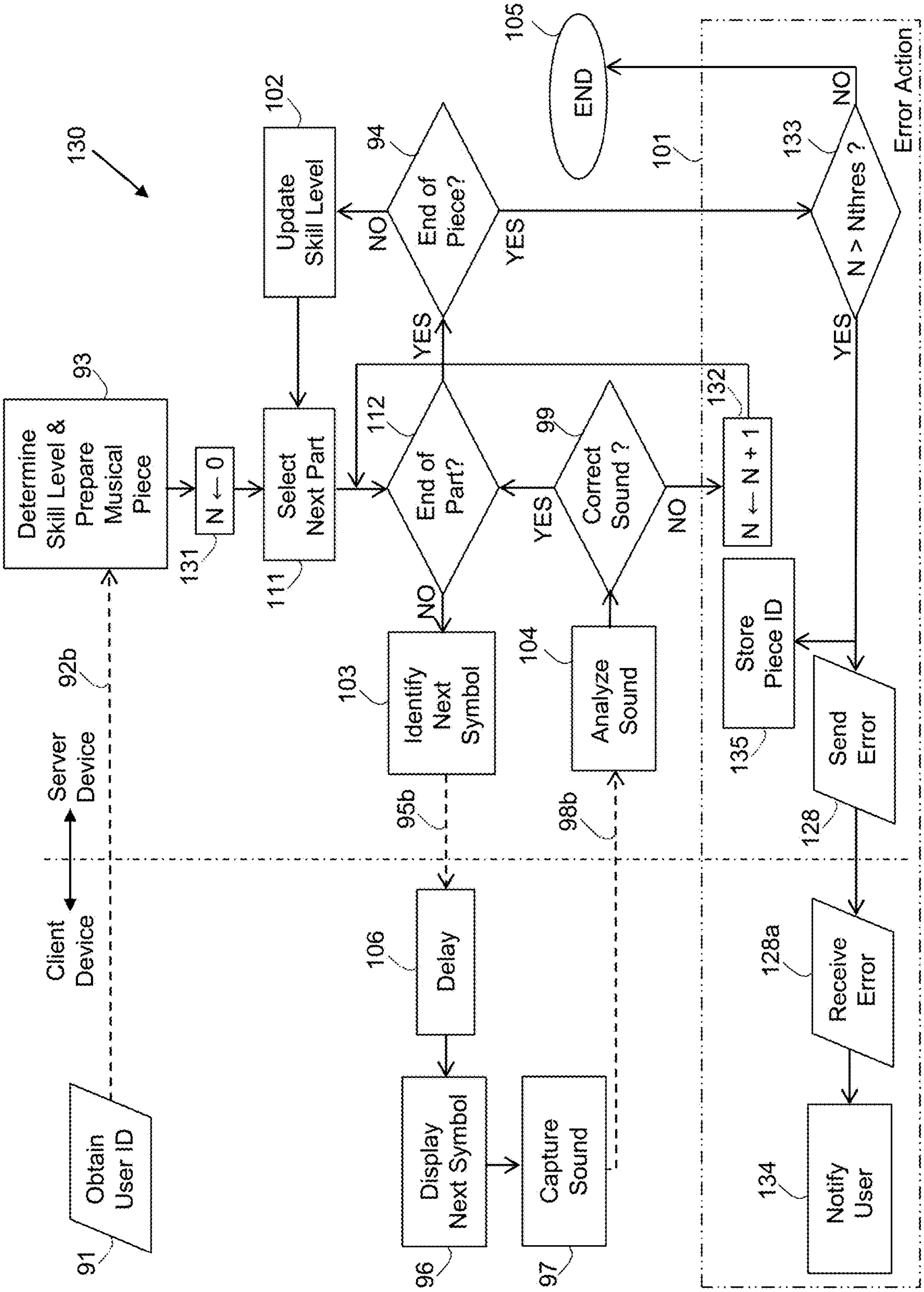
FIG. 13 illustrates a simplified schematic flow chart of a method for counting errors and acting according to the count obtained during practicing of a musical piece as part of an adaptive and interactive music learning.
Figure 13A:
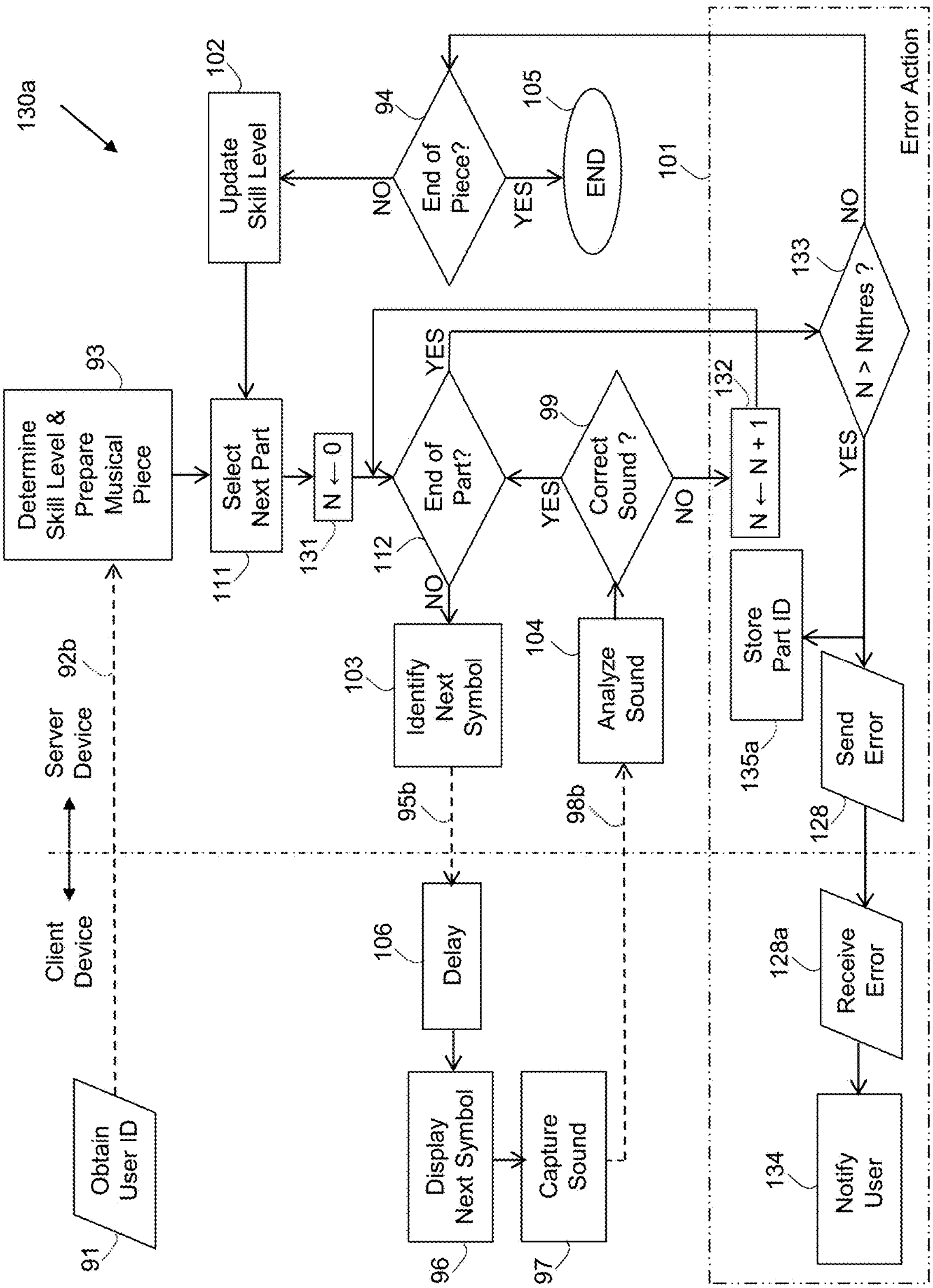
FIG. 13*a* illustrates a simplified schematic flow chart of a method for counting errors and acting according to the count obtained during practicing of part of a musical piece as part of an adaptive and interactive music learning.

While the flow chart 130 in FIG. 13 exampled the case of accumulating errors and acting accordingly in an entire musical piece, the errors may equally be accumulated and acted upon in a part of a musical piece, as described in a flow chart 130*a* shown in FIG. 13*a*. Similar to the flow chart 130, the N is reset to zero as part of a "N←0" step 131, at the beginning of playing of the selected part of the selected musical piece. Each time an error is detected as part of the "Correct Sound ?" step 99, the N counter is incremented as part of a "N←N+1" step 132. The cumulative number of errors N, the 'error score', may be used to determine how to update the skill level value in the "Update Skill Level" step 102, after completing the part of the selected musical piece, as described herein. Upon completion of the playing of the part of the musical piece, as determined as part of the "End of Part?" step 112, the errors score N is compared versus a predefined threshold value Nthres, representing a maximum allowed number of errors that do not require a specific error action response, as part of a "N>Nthres ?" step 133. In case the errors score N is less than the set threshold, suggesting that the errors level is tolerable, such as zero errors or under the defined minimum, and may not require a specific action as part of the "Error Action" step 101, and thus the next part of the piece is played.

In a case where it is determined that the number of errors ('error score') is above the defined threshold Nthres as part of the "N>Nthres ?" step 133, various error relation actions may be performed. In one example, the identification, such as the corresponding row 88 of the musical piece is stored as part of a "Store Part ID" step 135*a*, for future use. Such use may be recommending to practice again on this part of the musical piece until the required performance level is obtained, such as having an error score in this part that is lower than the Nthres specified threshold.

The predefined threshold value Nthres may be an absolute number that consists of a number of errored symbols, such as at least 1, 2, 3, 5, 8, 10, 12, 15, 20, 25, 30, 40, 50, 60, 80, 100, 150, 200, 300, 500, or 1000 errored symbols, or may be less than 2, 3, 5, 8, 10, 12, 15, 20, 25, 30, 40, 50, 60, 80, 100, 150, 200, 300, 500, 1000 or 2000 errored symbols. Alternatively or in addition, the predefined threshold value Nthres may be a value relative to the total number of symbols in the musical piece or the part thereof, such as at least 0.1%, 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, or 90%, of the number of symbols for the entire musical piece (or the part thereof), or may be less than 0.2%, 0.3%, 0.5%, 0.8%, 1%, 1.5%, 2%, 3%, 5%, 10%, 15%, 20%, 25%, 30%, 35%, 40%, 50%, 60%, 70%, 80%, 90%, or 95% of the number of symbols for the entire musical piece (or the part thereof).

In one example, inducing delay as part of the "Delay" step 106 may not be required, as the musical piece arrangement, such as the associated tempo, notes, or other decoration, already includes the required delay, thus no delay (affectively 0 delay) is required. No delay arrangement 130*b* is exampled in FIG. 13*b*.

The server device 23*a* is exampled herein as a dedicated device. Alternatively ort in addition, the functionalities provided by the server device 23*a* may be part of a cloud-based service, such as by a cloud 158 shown in the arrangement 150*c* in FIG. 15*c*, where the server device 23*a* is implemented as Infrastructure as a Service (IaaS) or as a Software as a Service (SaaS) (or as a Platform as a Service (PaaS)), providing the benefits of a cloud based computing, such as consolidation, virtualization, better cost, reliability, level of service, and automation. One benefit involves balancing between off-premises and on-premises cloud storage options, or a mixture of the two options, depending on relevant decision criteria that is complementary to initial direct cost savings potential. The cloud 158 may be a public cloud provider, such as by Amazon AWS, Microsoft Azure and Google GCP.

Figure 13B:
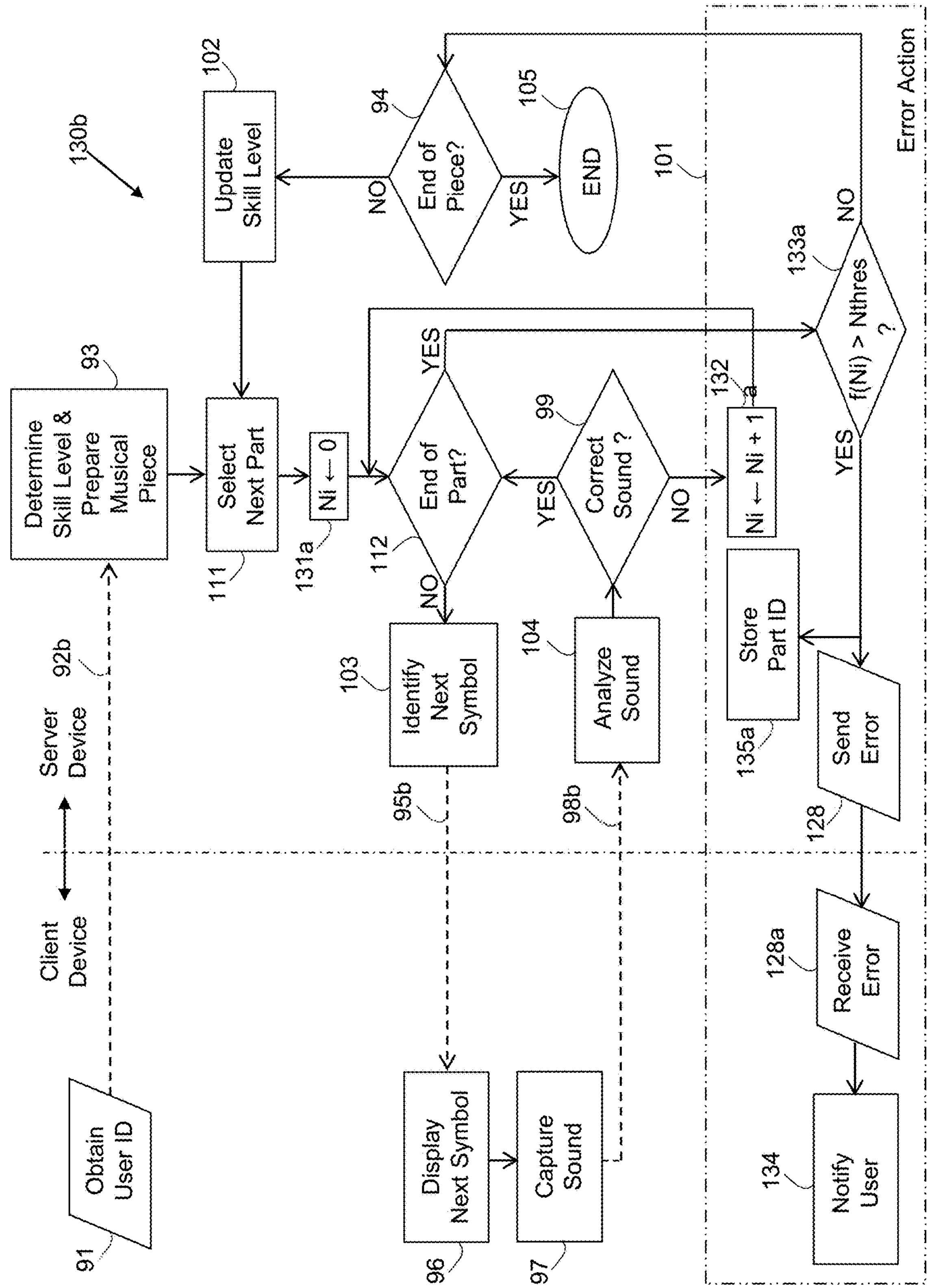
FIG. 13*b* illustrates a simplified schematic flow chart of a method for no delay practicing and for counting errors and acting according to the multiple complexity- or features-based count obtained during practicing of part of a musical piece as part of an adaptive and interactive music learning.

As shown in the flow chart 130*a* in FIG. 13*a*, the errors are accumulated and counted as part of the "N←N+1" step 132, and the action to be taken as part of Error Action Step 101 is based on the cumulative number of errors determined as part of the "N>Nthres ?" step 133. In one example, errors detected as part of the "Correct Sound ?" step 99 are further analyzed (such as in the "Analyze Sound" step 104) and categorized into multiple groups, and the errors are accumulated separately in each group Ni, where (i) is the identifier of the group of errors, as part of a "Ni←Ni+1" step 132*a* shown as part of the flow chart 130*b*. In such a case, all Ni counters are reset as part of a "Ni←0" step 131*a*, and the determination regarding the action to perform upon detecting too many errors may be defined as a function of the cumulative number of errors in all the error type groups, as part of a "f(Ni)>Nthres ?" step 133*a*, as shown in FIG. 13*b*. The function f(Ni) may be a linear function, such as weighted average function, where the assigned coefficients provides different weights for each errors group, or may be a non-linear function. The function f(Ni) may be based on, may use, or may comprise, a discrete, continuous, monotonic, non-monotonic, elementary, algebraic, linear, polynomial, quadratic, Cubic, Nth-root based, exponential, transcendental, quintic, quartic, logarithmic, hyperbolic, or trigonometric function.

The different error groups may be based on various erroring types of characteristics, which may be based on difficulty or skill characteristics. For example, a group may include errors related to rhythmic difficulty, relating to how irregularly musical notes and chords are located in time, and what is the "speed" of music (the rate at which notes/chords should be played), motoric difficulty, relating to how difficult it is physically to produce the musical sounds using a musical instrument (usually mainly related to the complexity of the physical arrangement of user's fingers), harmonic difficulty, relating to how complex combinations of musical notes need to be played simultaneously (as chords) or sequentially (as very unpredictable melodies), or expressivity difficulty, relating to the user need to control and vary the loudness ("dynamics") and timbre ("tone color") of the musical sounds being produced.

Alternatively or in addition, the different error groups may be based on, or may use, techniques, classifications, or features, described in an article entitled: "*Statistical piano reduction controlling performance difficulty*" by Eita Nakamura and Kazuyoshi Yoshii [doi:10.1017/ATSIP.2018.18], published 2018 in SIP (2018), vol. 7, e13, in an article entitled: "*Automatic System for the Arrangement of Piano Reductions*" by Shih-Chuan Chiu, Man-Kwan Shan, and Jiun-Long Huang, published 2009 in the 11th IEEE International Symposium on Multimedia, in an article entitled: "*A Study on Difficulty Level Recognition of Piano Sheet Music*" by Shih-Chuan Chiu and Min-Syan Chen, published December 2012 in the ISM '12: Proceedings of the 2012 IEEE International Symposium on Multimedia, in an article entitled: "SCORE ANALYZER: AUTOMATICALLY DETERMINING SCORES DIFFICULTY LEVEL FOR INSTRUMENTAL E-LEARNING" by Véronique Sébastien, Henri Ralambondrainy, Olivier Sébastien, and Noel Conruyt of IREMIA—Laboratoire d'Informatique et de Mathématiques, EA2525 University of Reunion Island, Saint-Denis, Reunion (FRANCE), published October 2012 in 13th International Society for Music Information Retrieval Conference (ISMIR 2012), in a paper entitled: "*Musiplectics: Computational Assessment of the Complexity of Music Scores*" by Ethan Holder, Eli Tilevich, and Amy Gillick, published October 2015 in ONWARD '15 [ACM 978-1-4503-1995-9/13/10, http://dx.doi.org/10.1145/2508075.2514879], in a paper entitled: "*A Method for Measuring the Difficulty of Music Scores*" by Yang-Eui Song and Yong Kyu Lee [www.ksci.re.kr http://dx.doi.org/10.9708/jksci.2016.21.4.039] published April 2016 in the Journal of The Korea Society of Computer and Information Vol. 21 No. 4, or on available commercial application for writing music or songs are available, such as Ludwig (http://www.write-music.com/), and AnthemScore (https://www.lunaverus.com/), which are all incorporated in their entirety for all purposes as if fully set forth herein.

The musical pieces database or table 89 shown as part of the arrangement 80*b* in FIG. 8*b* was exampled as storing a single version or variant for each of the stored physical pieces 88, such as the original version of the piece, for example as composed or created by a respective compositor or creator (referred to as version '5' in the flow chart 70 in the FIG. 7). However, the original version may be too complex or difficult to be played by a novice or learning player. In one example, it may be an advantage to transcribe or adapt the musical piece to better adapt or personalize the musical piece to fit to the user skill level or playing abilities. In one example, he "Update Skill Level" step 102 may include setting a pace or tempo adapted to fit the skill level value of the user 36. Alternatively, or in addition, to adapting the pace or tempo to the specific skill level of the user 36, the sequence of musical symbols that are presented to the user 36, may be transcribed to fit the specific skill level of the user 36.

An improved musical pieces-table or database 89*b*, that is based on the table 89 in FIG. 8*b* is described as part of a view 140 shown in FIG. 14. In one example, one of, part of, or all of, the musical pieces 88 stored in the table 89*b*, include multiple versions or variants, such as modified arrangements, in addition to the original version (referred to as version '5' in the flow chart 70 in the FIG. 7). Such version or variants may be a simplified complexity or difficulty versions, such as the version '4', '3', '2', and '1' described in the flow chart 70 in the FIG. 7.

In the example shown in the view 140 in FIG. 14, the table 89*b* stores five versions or variants of the musical Piece #4 88*d*, each version 141*a* is associated with a skill level value 141*b*, as described in a top row 142. In addition to the original version 142*a*, designated as version 'A' or level '5', that may be stored in the table 89*b* as part of the "Store Version '5'" step 74, the table 89*b* may comprise a least simplified version 142*b*, designated as version 'B' or level '4', that may be stored in the table 89*b* as part of the "Store Version '4'" step 74*a*, a more simplified version 142*c*, designated as version 'C' or level '3', that may be stored in the table 89*b* as part of the "Store Version '3'" step 74*b*, a simplified version 142*d*, designated as version 'D' or level '2', that may be stored in the table 89*b* as part of the "Store Version '2'" step 74*c*, and a more simplified version 142*e*, designated as version 'E' or level '1', that may be stored in the table 89*b* as part of the "Store Version '1'" step 74*d*. While five levels are exampled in the view 140 for the Piece #4 88*d*, any number of versions or variants, each associated with a different complexity or difficulty level, may be equally used, such as 2, 3, 4, 6, 7, 8, 9, 10, 12, 15, 20, or more. Further, each of the pieces 88 in the table 89*b* may be associated with a different number of versions or variants. For example, the original version of the Piece #3 88*c* is associated with level '3', and thus may include, for example, three versions, associated with levels '3', '2', and '1'.

Figure 14A:
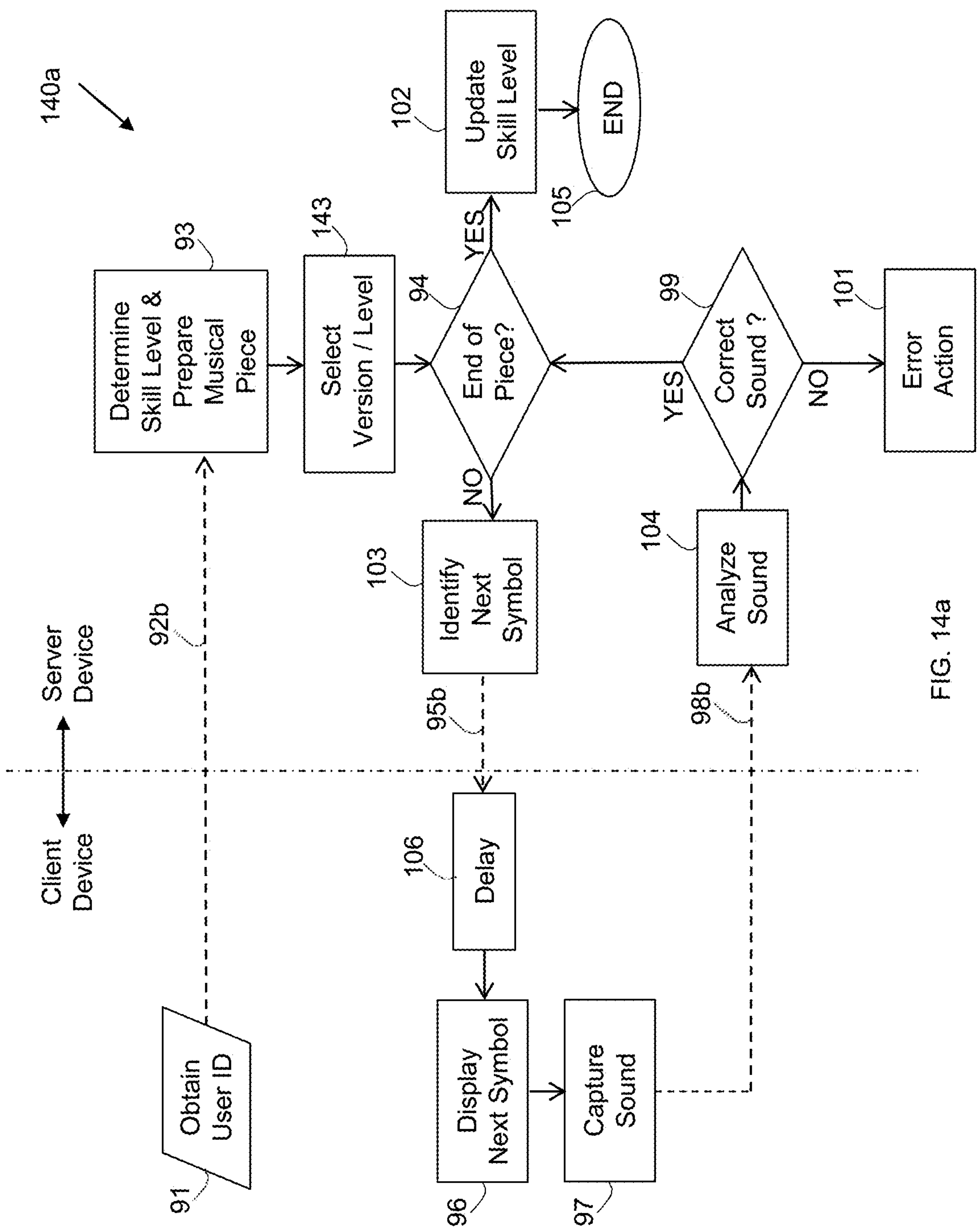
FIG. 14*a* illustrates a simplified schematic flow chart of a method for adapting a simplified version of a selected musical piece to a person skill level.

In one example, the table 89*b* shown in FIG. 14 may be used for adapting a version of a selected musical piece to a person skill level value, such as described in a flow chart 140*a* shown in FIG. 14*a*, that is based on the flow chart 100 shown in FIG. 10. As described above, the musical piece to be played is selected, by the system or by the user 36, as part of the "Determine Skill Level & Prepare Musical Piece" step 93. However, the actual original or simplified version, or the selected musical piece that is to be played, is selected as part of a "Select Version/Level" step 143, that uses the musical piece versions table 89*b*. The selection in the "Select Version/Level" step 143 may be based on selecting the version that best fits the user 36 skill level value, such as selecting the simplified version associated with the skill level value that is associated with the user 36. In one example, the user 36 is determined to be User #1 84*a*, and the Piece #4 88*d* is selected, as part of the "Determine Skill Level & Prepare Musical Piece" step 93. Since the User #1 84*a* is associated in the table 86 shown in FIG. 8*b* with a skill level value of '1', the corresponding level '1' version E 142*e* is selected as part of the "Select Version/Level" step 143. In another example, the user 36 is determined to be User #2 84*b*, that is associated in the table 86 shown in FIG. 8*b* with a skill level value of '3', and thus the corresponding level '3' version C 142*c* is selected as part of the "Select Version/Level" step 143. Similarly, in case where the user 36 is determined to be User #3 84*c*, that is associated in the table 86 shown in FIG. 8*b* with a skill level value of '2', and thus the corresponding level '2' version D 142*d* is selected as part of the "Select Version/Level" step 143, and in case where the user 36 is determined to be User #4 84*d*, that is associated in the table 86 shown in FIG. 8*b* with a skill level value of '5', and thus the corresponding original version (level '5') version A 142*a* is selected as part of the "Select Version/Level" step 143.

In the example described in the flow chart 140*a* shown in FIG. 14*a*, a version of a selected musical piece is selected once, based on, or according to, the user 36 skill level, as part of the "Select Version/Level" step 143, before the initiation of the practice session. Alternatively or in addition, the adapting of the corresponding version of the musical piece may be performed during the practice session. For example, when after playing part of a musical piece a skill level value of the player is updated, for example, as part of the "Update Skill level" step 102, such update is reflected (preferably immediately) in the version that is used, adapting to the updated user 36 skill level value, as exampled in a flow chart 140*b* shown in FIG. 14*b*, that is based on the flow chart 110 shown in FIG. 11. As described in the flow chart 140*b* shown in FIG. 14*b*, after updating the skill level value of the player 36 as part of the "Update Skill level" step 102, as an alternative to simple selection of the part to be played as part of the "Select Next Part" step 111, the next part is selected using a version of the musical piece that is based on, or adapted to, the updated skill level value, as part of a "Select Next Part Version/Level" step 144.

In one example, the user 36 is User #2 84*b* that is associated with a skill level value of '2', and the selected the Piece #4 88*d* is selected as part of the "Determine Skill Level & Prepare Musical Piece" step 93. It is further assumed that the playing is based on parts having equal lengths of 10 seconds. As explained in the flow chart 140*a*, the version C 142*c* that corresponds to a level of '3' is selected as part of the "Select Version/Level" step 143. Assuming, for example, that after playing of the 30-40 seconds of the musical piece using the version C 142*c* (that corresponds to the level of '3'), the skill level value is upgraded to '4' as part of the "Update Skill level" step 102. In such a case, the next part to be used is selected to be the version B 142*b* that is associated with a complexity or difficulty level of '4', and the symbols that are displayed to the user 36 as part of the "Display Next Symbol" step 96 during the next part of 40-50 seconds, are based on, or according to, the newly selected version B 142*b*. Similarly, in case of multiple playing errors, the skill level value may be downgraded to '2' as part of the "Update Skill level" step 102. In such a case, the next part to be used is selected to be the version D 142*d* that is associated with a complexity or difficulty level of '2', and the symbols that are displayed to the user 36 as part of the "Display Next Symbol" step 96 during the next part of 40-50 seconds, are based on, or according to, the newly selected version D 142*d*.

The flow chart 140*a* shown in FIG. 14*a* exampled the using of stored multiple simplified variants or versions of a musical piece (such as in the table 89*b*) that were formerly 'off line' created before the start of the flow chart 140*a*, such as by performing the flowchart 70 shown in FIG. 7. Alternatively or in addition, only one version (or few versions or variants) may be stored, such as the table 89 shown in FIG. 8*b*, and a simplified version or variant that adapt to the skill level value of the user 36 may be created from the stored version by applying a real-time 'on-the-fly' simplifying process, such as the "Modify Arrangement" step 73, as part of the practice session. For example, only the original version (designated as Version A in the flow chart 70 shown in FIG. 7, may be stored, as described above regarding the table 89 in the arrangement 80*b*. An example of such a flow chart 140*c* is shown in FIG. 14*c*, and is based on the flow chart 140*a* that is shown in FIG. 14*a*. As an alternative (or in addition) to selecting a pre-stored version as part of the "Select Version/Level" step 143, a simplified version is generated in real-time as part of the "Modify Arrangement" step 73. For example, in case the musical piece selected as part of the "Determine Skill Level & Prepare Musical Piece" step 93 is Piece #4 88*d* that is associated with a complexity level of '5', and the user 36 is identified as the User #2 84*b* that is associated with a skill level value of '3', then after the musical piece is selected as part of the "Determine Skill Level & Prepare Musical Piece" step 93, as part of the "Modify Arrangement" step 73 the version '3' is created, similar to the "Store Version '3'" step 74*b*, and this simplified version is used throughout the playing practice.

Figure 14B:
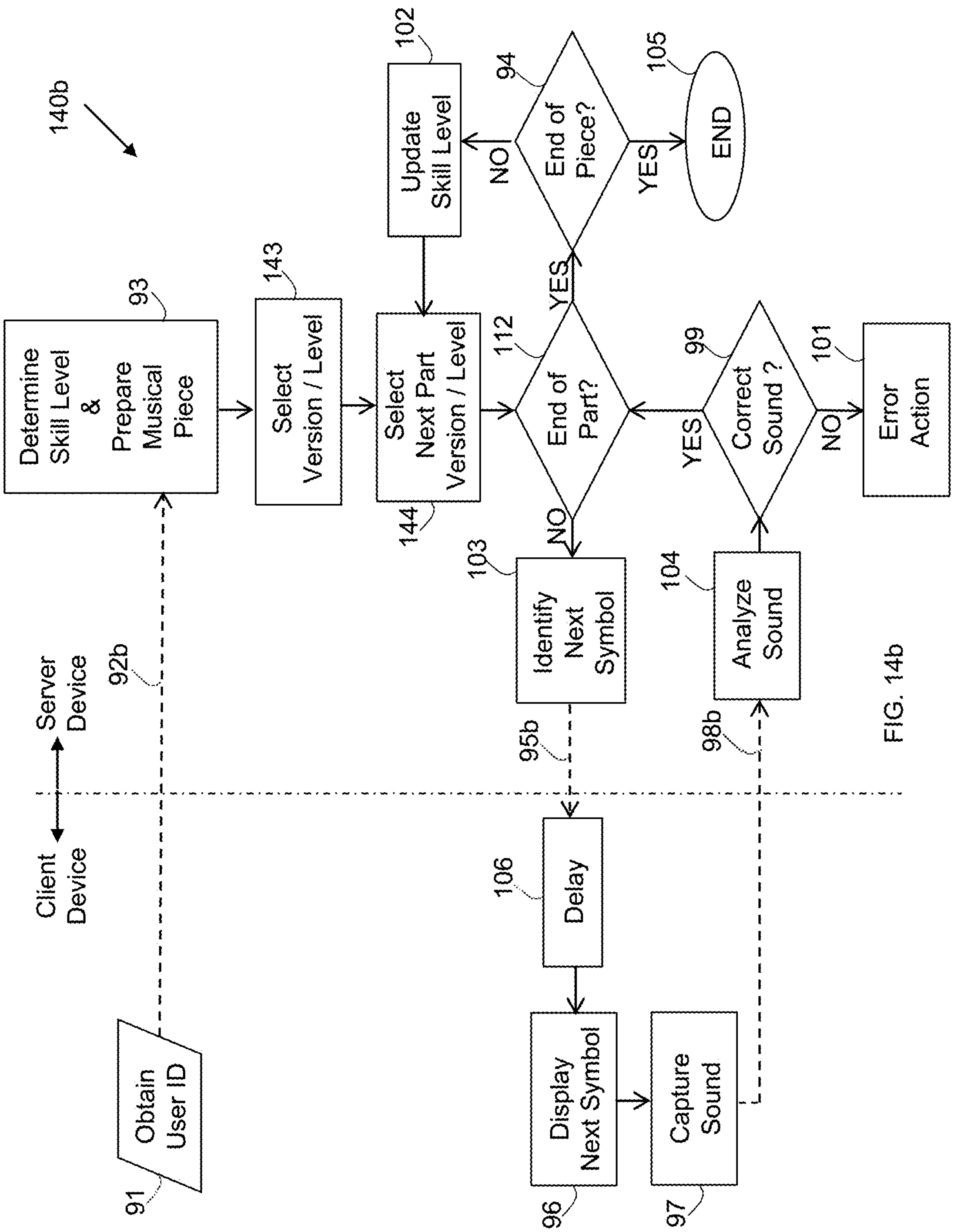
FIG. 14*b* illustrates a simplified schematic flow chart of a method for adapting a simplified version of part of a selected musical piece to a person skill level during playing using stored simplified version.
Figure 14C:
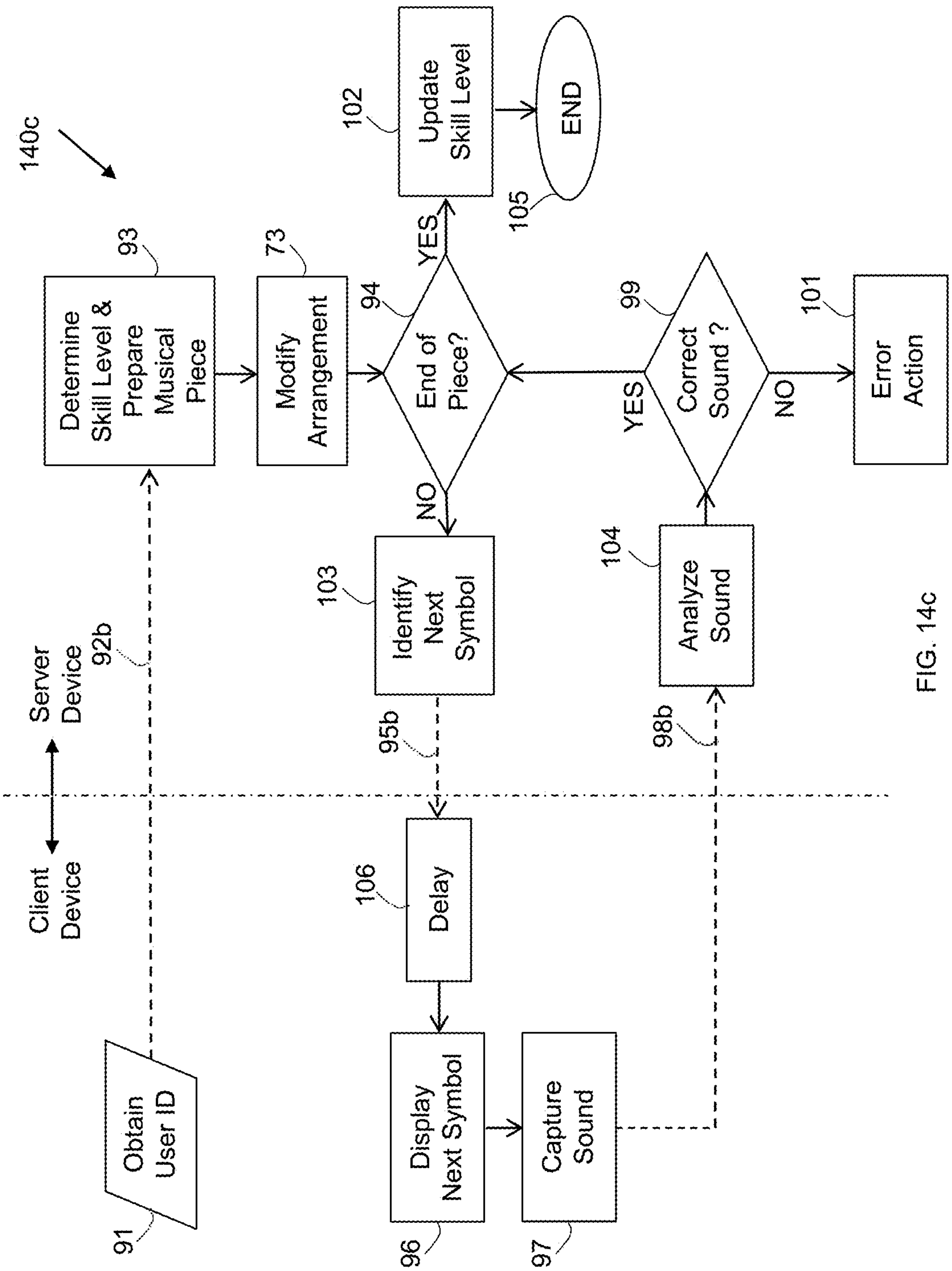
FIG. 14*c* illustrates a simplified schematic flow chart of a method for creating a simplified version of a selected musical piece according to a person skill level in real-time during the playing session.
Figure 14D:
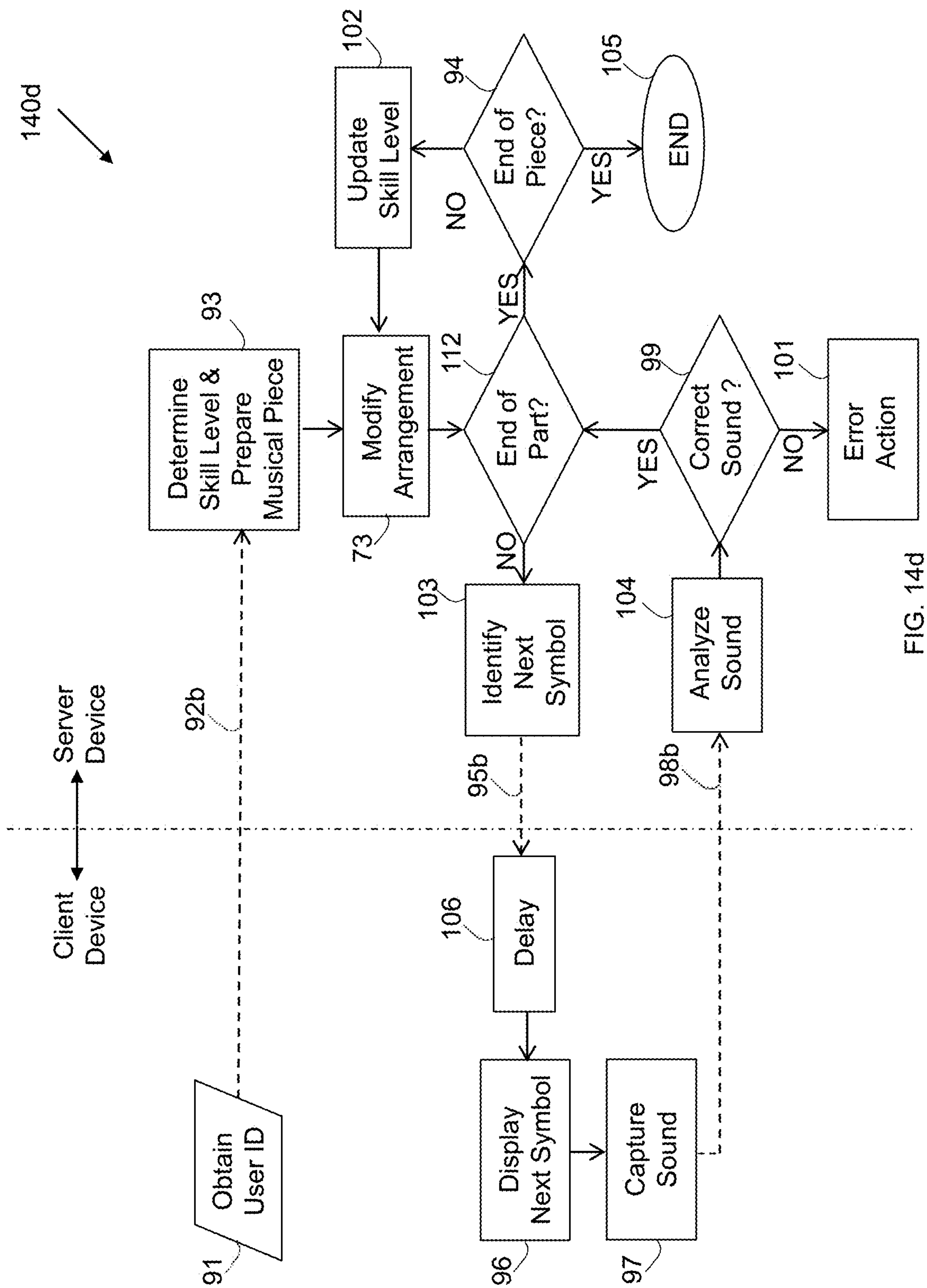
FIG. 14*d* illustrates a simplified schematic flow chart of a method for creating a simplified version of a selected part of a selected musical piece according to a person skill level in real-time during the playing session.

The flow chart 140*b* shown in FIG. 14*b* exampled the using of stored multiple simplified variants or versions of a musical piece (such as in the table 89*b*) that were formerly 'off line' created before the start of the flow chart 140*b*, such as by performing the flowchart 70 shown in FIG. 7. Alternatively or in addition, only one version (or few versions or variants) may be stored, such as the table 89 shown in FIG. 8*b*, and a simplified version or variant of the part to be played that adapt to the skill level value of the user 36 may be created when moving from part to part along the playing practice session, from the single stored version by applying a real-time 'on-the-fly' simplifying process, such as the "Modify Arrangement" step 73, as part of the practice session. For example, only the original version (designated as Version A in the flow chart 70 shown in FIG. 7, may be stored, as described above regarding the table 89 in the arrangement 80*b*. An example of such a flow chart 140*d* is shown in FIG. 14*d*, and is based on the flow chart 140*b* that is shown in FIG. 14*b*. As an alternative (or in addition) to selecting a pre-stored version of part of the musical pierce as part of the "Select Next Part Version/Level" step 144, a simplified version is generated in real-time as part of the "Modify Arrangement" step 73. For example, in case the musical piece selected as part of the "Determine Skill Level & Prepare Musical Piece" step 93 is Piece #4 88*d* that is associated with a complexity level of '5', and during the playing session, as part of the "Update Skill Level" step 102 the skill level value 85*b* of the user 36 is updated to a skill level of '2', then as part of the "Modify Arrangement" step 73 the version '2' is created, similar to the "Store Version '2'" step 74*c*, and this simplified version is used throughout the playing practice of the next part of the musical piece. For example, a user 36 may start with a complexity level of '4' that is adapted to a pre-stored value in the table 86, and the first 20 second may be played with a simplified version that corresponds to the skill level value of '4'. In case the user 36 skill level value is determined after this period to stay at level '4', the same simplified version will continue to be used in the practice session. Upon updating the user 36 skill level value after this part to level '5' (assuming to be the original version complexity level), the next part will use the original level version (version 'A' or '5') instead of the simplified version. However, is case the user 36 skill level value is determined after this period to be lowered to level '3', a level '3' simplified version is created and used in the following part of the musical piece.

While the arrangement 80 in FIG. 8 exampled the case of using the client device 35 that communicates over the Internet 22 with a server device 23*c* that is used for both the processing and the storing of the users database 31*a* and the pieces database 31*b*, the methods herein may equally be implemented where the processing and/or the databases storing are performed in the client device 35, and there is no need for any server device 23*a* or for an Internet 22 networking. Such configuration allows for performing the methods or steps herein even when or where Internet connection is not available, or where the using on an external device, such as the server device 23*a*, is not recommended or available.

Figure 15:
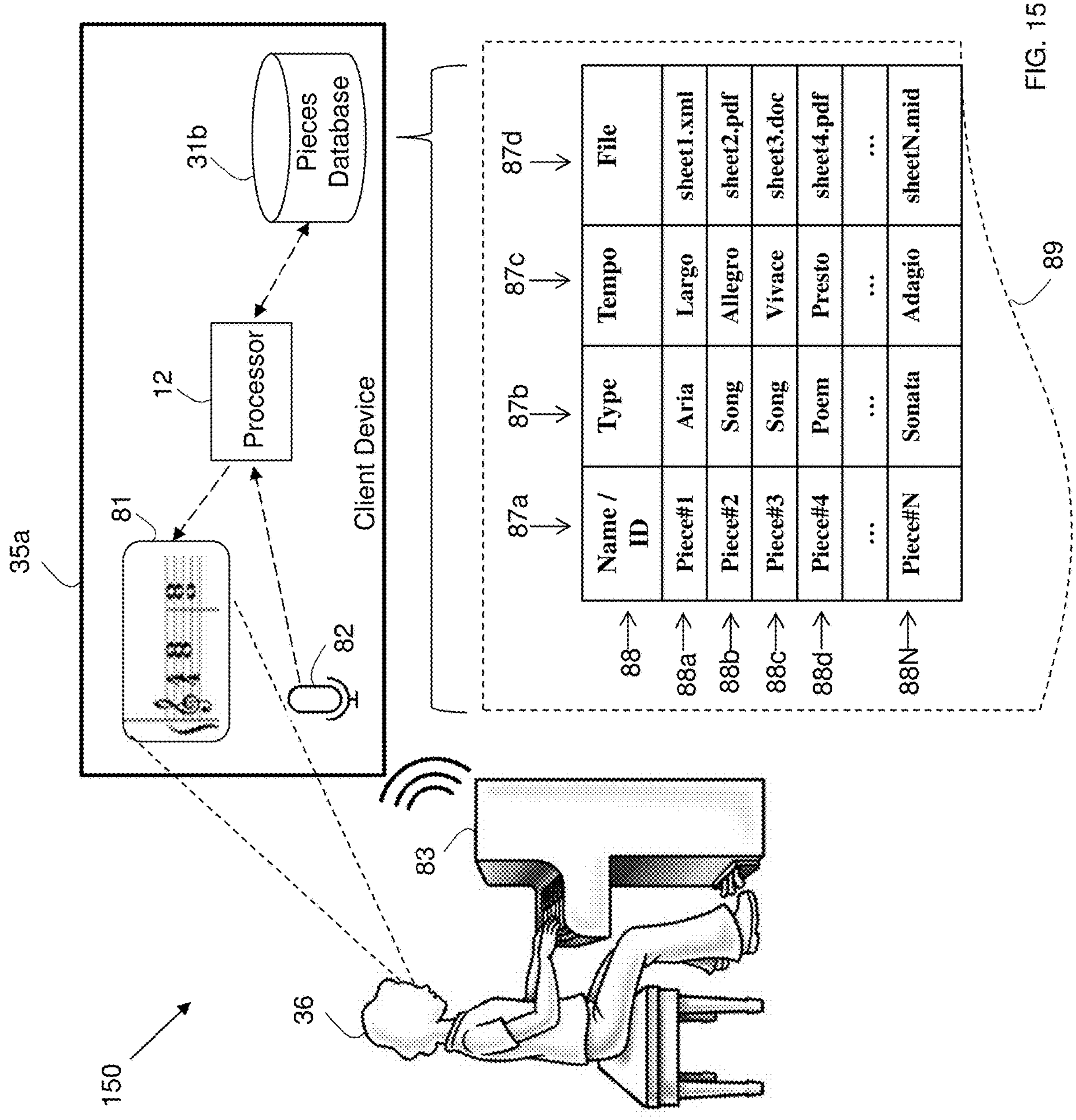
FIG. 15 depicts schematically an arrangement of an online piano playing learning using a client device.
Figure 15A:
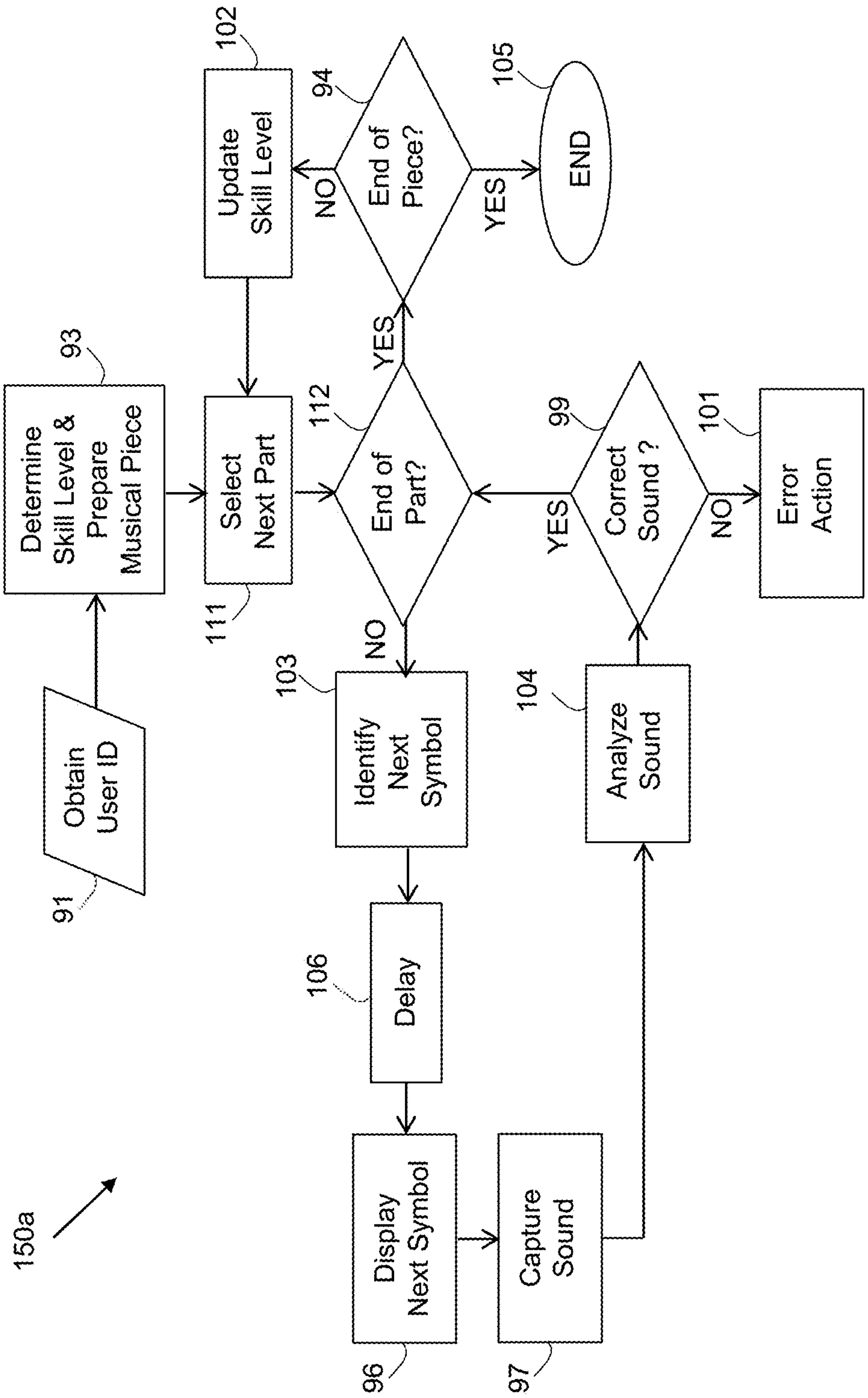
FIG. 15*a* illustrates a simplified schematic flow chart of a method for adaptive and interactive music learning based on sequentially playing parts of a musical piece using a client device.

Such an arrangement 150 is shown in FIG. 15, illustrating a client device 35*a*, which may be similar, identical, or different from the client device 35. The client device 35*a* stores the pieces database 31*b*, and its internal processor 12 performs the required analysis, as well as executing any of the methods or steps herein. A flow chart 150*a* shown in FIG. 15*a*, is based on the flow chart 110 shown in FIG. 11, but adapted to be executed solely by the client device 35*a* as part of the arrangement 150.

Many musical pieces are based on simultaneous playing of many musical instruments, and are composed to be played by a band or an orchestra. A user experience of learning to play of a musical instrument becomes more realistic and more enjoyable when the playing involves other musical instruments, either virtually where the sound of the other musical instruments is emulated by a system, or realistically when playing cooperatively with other users. In one example, the pieces database 31*b* that includes the table 89, further includes, for each of the stored musical pieces, information regarding the various musical instruments involved in the actual playing of the respective musical piece.

An example of a table 89*a* that is part of the pieces database 31*b* is illustrated in a view 160 shown in FIG. 16. In addition to the data associated with each of the stored musical pieces described in the table 89, the table 89*a* in the pieces database 31*b* further includes an ensemble data an example of additional stored information for the Piece #3 88*c*, as shown in a table 161 (or in any other data structure). For each musical instrument involved in the musical piece, the table 161 includes, as shown in a top row 162, a name or identifier 163*a* of the musical instrument, a sheet music 163*b* transcribed and adapted for the specific musical instrument, and an audio file 163*c* that includes the playing of the symbols that are associated with the specific musical instrument when the musical piece is played. While the example of the table 161 includes 6 musical instruments for playing the Piece #3 88*c*, any number of musical instruments may be equally used. While the audio files 163*c* are shown in the table 161 being of '.mp3', '.wav', '.xml', '.mid', or '.aac' types, any other format for music or audio may be equally used.

In the example of the table 161, the Piece #3 88*c* is composed of playing a guitar 162*a* that is associated with guitar sheet music file Guitar-sheet.pdf and an audio file guitar.mp3, drums 162*b* that are associated with drums sheet music file Drums-sheet.doc and an audio file drums.mp3, a piano 162*c* that is associated with guitar sheet music file Piano-sheet.docx and an audio file Piano.wav, a bass 162*d* that is associated with bass sheet music file Bass-sheet.pdf and an audio file Bass.wav, a vocal 162*e* that is associated with vocal sheet music file Vocal-sheet.doc and an audio file Vocal.aac, and a flute 162*f* that is associated with vocal sheet music file Flute-sheet.docx and an audio file Flute.aac.

For any practicing session, the user 36 may defines the session as one that includes only the specific musical instrument, or the interest of hearing other musical instruments in addition to its own played musical instrument. Such definition may use a practicing table, such as practice tables 160*a* and 160*b* shown in FIG. 16*a*, having a column 'Source' 164 that associates with each of the musical instruments 162 a value 'Self' denoting that this is the musical instrument to be practiced by the user 36, a value 'None' in case the specific musical instrument is not to be involved in the practicing, a value 'System' if the user 36 is interested is simulating the playing of this instrument by the system, and a value 'User #X' for hearing the playing of a specific other user that cooperates in the practicing session.

In the practice tables 160*a* or 160*b*, the user 36 defines the participation and role of each instrument, such as the guitar 162*a*, the drums 162*b*, the piano 162*c*, the bass 162*d*, the vocal 162*e*, and the flute 162*f*. In the example of the practice table 160*a* (or in any other data structure). the user 36 defines the piano as the practicing device (value of 'Self'), and all other instrument as defined as 'None'. Hence, only the piano is involved in the practice, and the user 36 will not hear any other instruments. In the example of the practice table 160*b*, the user 36 defines the Flute 162*f* as the practicing device (value of 'Self'), the piano 162*c* is not participating in the practice (value of 'None'), the guitar 162*a* and the vocal 162*e* are vocalized and emulated by the system and heard by the user 36 (value of 'System'), such as via the speaker 78, the drums 162*b* and the bass 162*d* are both played together with respective cooperative users User #1 84*a* and User #3 84*c*, where both players are heard via the speaker 78.

Figure 18:
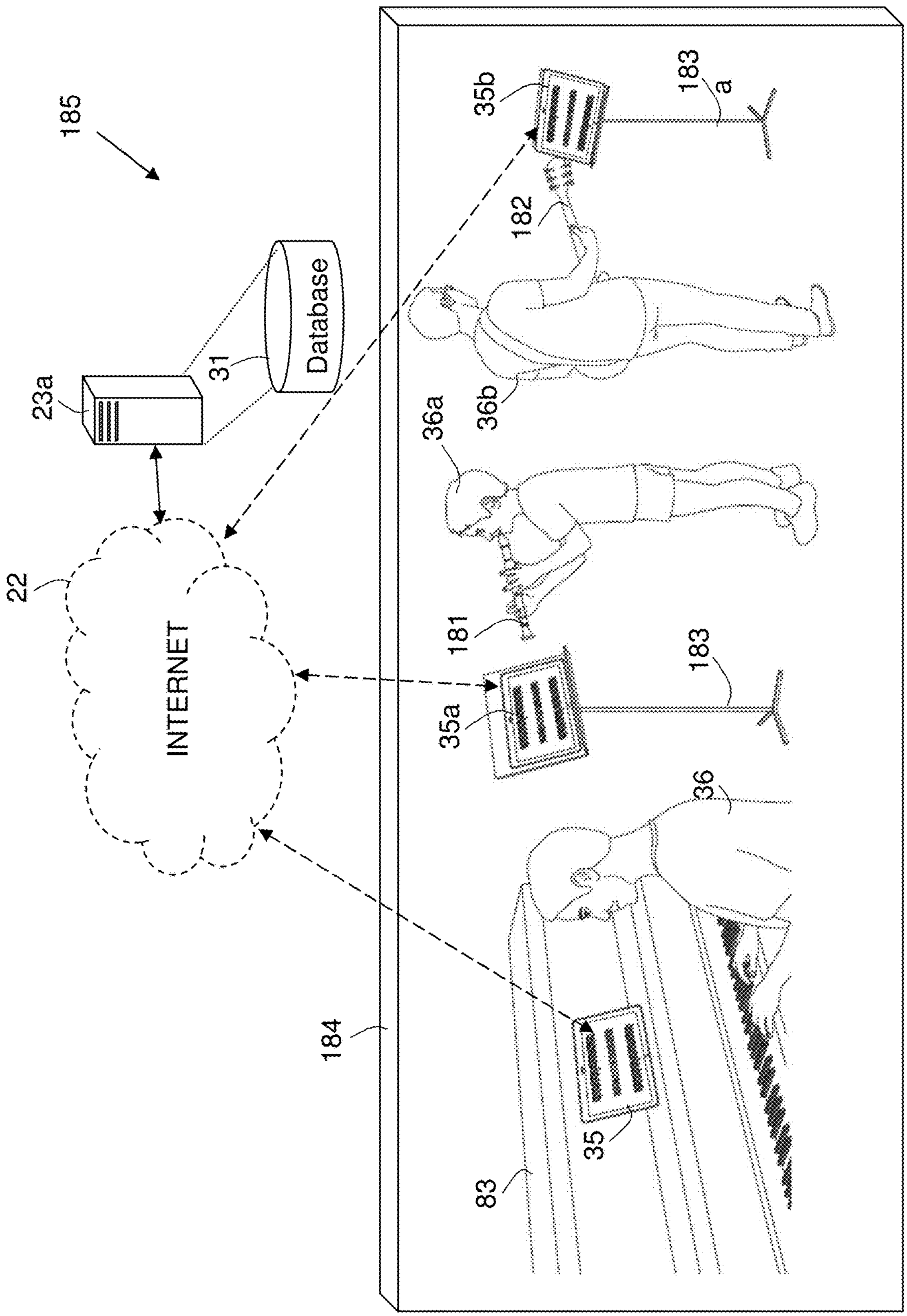
FIG. 18 depicts schematically an arrangement of three users practicing a musical piece at a same location using three different musical instruments.

An example of joint practice of three players acting as a band or orchestra is pictorially illustrated in a view 185 shown in FIG. 18. The first player 36 is practicing playing of the piano 83 and uses the client device 35, the second player 36*a* is practicing playing of a flute 181 and uses a client device (shown as a tablet) 35*a* placed on a stand 183, and the third player 36*b* is practicing playing of a guitar 182 and uses a client device 35*b* (shown as a tablet) placed on a stand 183*a*. The three players 36, 36*a*, and 36*b* are in a same location 184, where they can hear each other playing and each player can hear the sound emitted by all of the tablets. For example, the three players 36, 36*a*, and 36*b* may be in the same room, in the same apartment, or in the same building. While exampled in the arrangement 185 for three players, the systems and methods herein equally apply to any other number of players, such as 2, 4, 5, 6, 7, 8, 9, 10, 12, 15, 18, 20, or more players. The musical instruments may be different from each other. Alternatively, while different musical instruments are exampled in the arrangement 185, two or more of the musical instruments may be identical or similar.

Further, one of, each of two of, each of most of, or each of, the musical instruments may be a Soprano instrument, such as flute, violin, soprano saxophone, trumpet, clarinet, oboe, and piccolo. Alternatively or in addition, one of, each of two of, each of most of, or each of, the musical instruments may be an Alto instrument, such as alto saxophone, French horn, English horn, viola, and alto horn. Alternatively or in addition, one of, each of two of, each of most of, or each of, the musical instruments may be a Tenor instrument, such as trombone, tenoroon, tenor saxophone, tenor violin, guitar, and tenor drum. Alternatively or in addition, one of, each of two of, each of most of, or each of, the musical instruments may be a Baritone instrument, such as bassoon, baritone saxophone, bass clarinet, cello, baritone horn, and euphonium. Alternatively or in addition, one of, each of two of, each of most of, or each of, the musical instruments may be a Bass instrument, such as double bass, bass guitar, contrabassoon, bass saxophone, tuba, and bass drum. Alternatively or in addition, one of, each of two of, each of most of, or each of, the musical instruments may be a string instrument, a woodwind instrument, a brass instrument, or a percussion instrument.

A first practice table 180 (or any other data structure) that may be defined by the first user 36 may include a source definition 164, a second practice table 180*a* that may be defined by the second user 36*a* may include a source definition 164*a*, and a third practice table 180*b* that may be defined by the third user 36*b* may include a source definition 164*b*, are shown in FIG. 18*a*. Since the user 36 practices the piano 83, the piano row 162*c* is associated with 'Self'. The guitar row 162*a* is defined as 'None' since the user 36 is able to locally directly hear the guitar 182 played by the user 36*b*, and similarly the flute row 162*f* is defined as 'None' since the user 36 is able to locally directly hear the flute 181 played by the user 36*a*. The user 36 may prefer to hear drums played remotely by the User #4 84*d*, as defined by the 'User #4' on the drums row 162*b*. Further, the user 36 may prefer to not hear via the speaker 78 in the tablet 35 the bass and vocal, as defined by the 'None' value in the respective rows 162*d* and 162*e*.

Since the user 36*a* that defines the practice table 180*a* practices the flute 181, the flute row 162*f* is associated with 'Self'. The guitar row 162*a* is defined as 'None' since the user 36*a* is able to locally directly hear the guitar 182 played by the user 36*b*, and similarly the piano row 162*c* is defined as 'None' since the user 36*a* is able to locally directly hear the piano 83 played by the user 36. The user 36*a* may prefer to hear the bass played remotely by User #1 84*a*, as defined by 'User #1' on the bass row 162*d*. Further, the user 36*a* may prefer to not hear via the speaker 78 in the tablet 35*a* the drums and vocal, as defined by the 'None' value in the respective rows 162*b* and 162*e*. For example, the user 36*a* may hear the drums via the tablet 35 used by the user 36 that sources the sound from the User #4 84*d*, as shown in the practice table 180.

Similarly, since the user 36*b* that defines the practice table 180*b* practices the guitar 182, the guitar row 162*a* is associated with 'Self'. The flute row 162*f* is defined as 'None' since the user 36*b* is able to locally directly hear the flute 181 played by the user 36*a*, and similarly the piano row 162*c* is defined as 'None' since the user 36*b* is able to locally directly hear the piano 83 played by the user 36. The user 36*b* may prefer to hear the vocal played artificially by the system as defined by 'System' on the vocal row 162*e*. It may be assumed that the created vocal sound is heard by the users 36 and 36*b* from a speaker 78 in the tablet 35*b*.

Further, the user 36*b* may prefer to not hear via the speaker 78 in the tablet 35*b* the drums and bass, as defined by the 'None' value in the respective rows 162*b* and 162*d*. For example, the user 36*b* may hear the drums via the tablet 35 used by the user 36 that sources the sound from the User #4 84*d*, as shown in the practice table 180, and the bass via the tablet 35*a* used by the user 36*a* that sources the sound from the User #1 84*a*, as shown in the practice table 180*a*.

Figure 17:
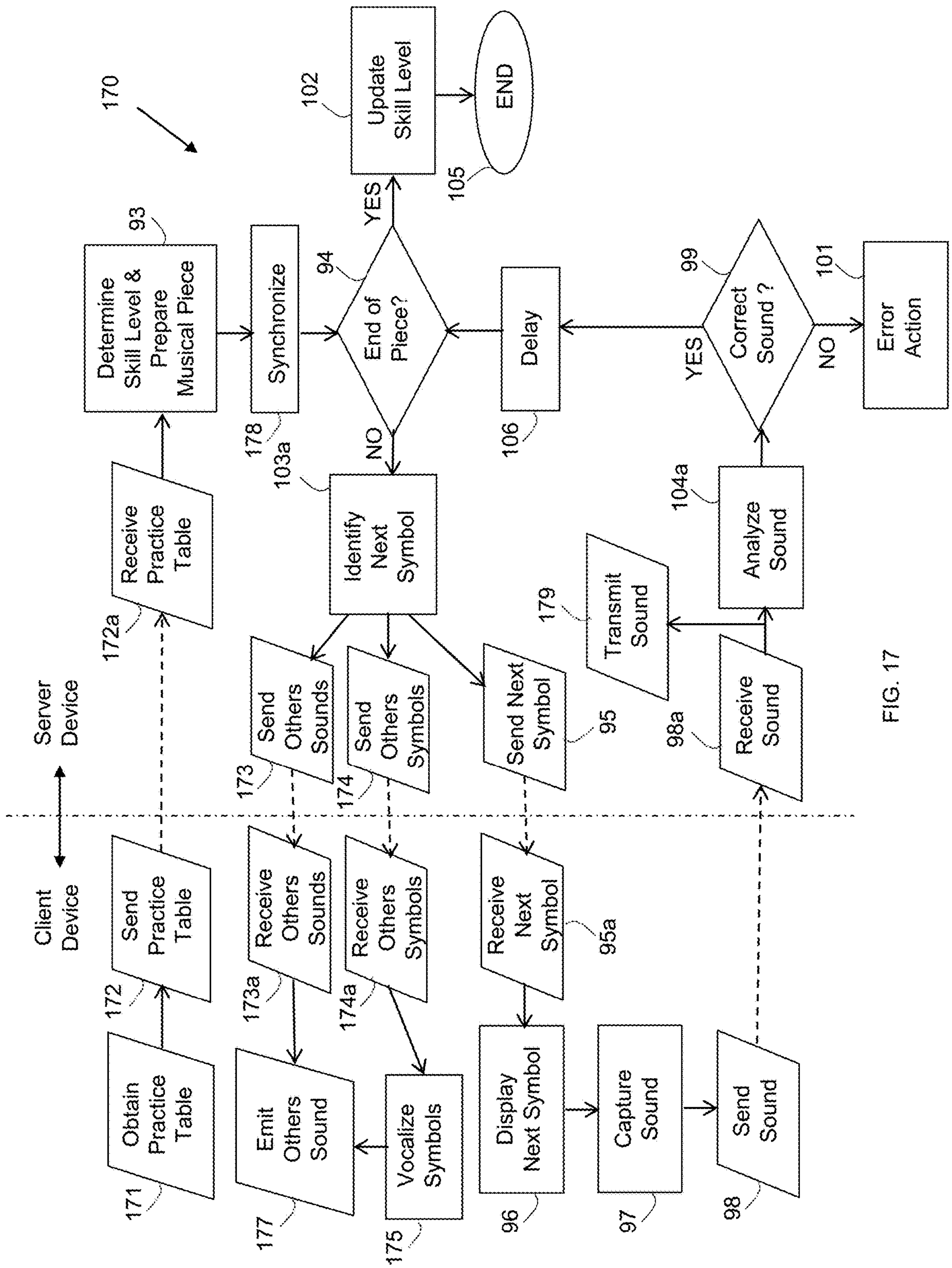
FIG. 17 illustrates a simplified schematic flow chart of a method for cooperatively practicing a musical piece by a musical instrument while hearing a background of additional musical instruments, where at least one of the additional musical instruments is artificially produced based on the vocalizing musical symbols.

An example of a flow chart 170 for use by the server device 23*a* and any of the client devices (such as the client device 35 used by the first player 36, the client device 35*a* used by the second player 36*a*, or the client device 35*b* used by the third player 36*b*), for a case of joint practice (such as shown in the arrangement 180) is shown in FIG. 17, and is based on the flow chart 110 shown in FIG. 11.

The respective user defines a practice table as part of an "Obtain Practice Table" step 171, such as by using an input component 38 of the respective client device 35. For example, the first user 36 may define the practice table 180, the second user 36*a* may define the practice table 180*a*, and the third user 36*b* may define the practice table 180*b*. The defined practice table is then sent, as part of a "Send Practice table" step 172, from the respective client device, such as the client device 35 used by the first player 36, the client device 35*a* used by the second player 36*a*, or the client device 35*b* used by the third player 36*b*, to the server device 23*a*, where it is received as part of a "Receive Practice Table" step 172*a*.

The symbols used, which are identified as part of an "Identify Next Symbol" 103*a*, sent as part of the "Send Next Symbol" 95, and displayed as part of the "Display Next Symbol" step 96, are selected from the table 161 based on the identification of 'Self' in the respective practice table. For example, for the first user 36, since the piano is defined as 'Self' on the row 162*c* in the respective practice table 180, the symbols that are displayed on the client device 35 are based on the Piano-sheet.docx based on the piano row 162*c* in the table 161. Similarly for the second user 36*a*, since the flute is defined as 'Self' on the row 162*f* in the respective practice table 180*a*, the symbols that are displayed on the client device 35*a* are based on the Flute-sheet.docx based on the flute row 162*f* in the table 161. Similarly, for the third user 36*b*, since the guitar is defined as 'Self' on the row 162*a* in the respective practice table 180*b*, the symbols that are displayed on the client device 35*b* are based on the Guitar-sheet.pdf based on the guitar row 162*a* in the table 161.

In a case where the user defines a 'System' as a source in a respective practice table, such as the vocal instrument 162*e* in the practice table 180*b* used by the user 36*b*, then the corresponding symbols of the respective instrument are identified as part of the "Identify Next Symbol" 103*a*. In the example of the vocal instrument 162*e* in the practice table 180*b* used by the user 36*b*, the symbols from the file Vocal-sheet.doc of the vocal row 162*e* of the table 161 are identified, and are sent by the server device 23*a* to the client device 35*b* as part of a "Send Other Symbols" step 174, and are received at the client device 35*b* as part of the "Receive Other Symbols" step 174*a*. In the case where few instruments are defined as 'System', then all the symbols associated with these musical instruments are identified as part of the "Identify Next Symbol" 103*a*, sent by the server device 23*a* to the client device 35*b* as part of a "Send Others Symbols" step 174, and are received at the client device 35*b* as part of the "Receive Others Symbols" step 174*a*.

The received symbols are converted to a sound signal as part of a "Vocalize Symbols" step 175, and are played by the respective speaker 78 of the client device 35*b* as part of an "Emit Others Sound" step 177, thus simulating the presence of a vocal instrument.

In a case where the user defines a 'User #X' as a source in a respective practice table, such as the 'User #1' value in the bass row 162*d* in the practice table 180*a* used by the user 36*a*, then the respective sound from the defined user #1 84*a* is sent from the server device 23*a* by the client device 35*a* as part of a "Send Others Sounds" step 173, and is received by the client device 35*a* as part of a "Receives Others Sounds" step 173*a*. The received sound is then played by the respective speaker 78 of the client device 35*b* as part of the "Emit Others Sound" step 177, thus simulating the local presence of a remote user. In the case where few instruments are defined as 'User #X' as a source, then all the sound signals received from these users are combined and sent from the server device 23*a* by the client device 35*a* as part of a "Send Others Sounds" step 173, are received by the client device 35*a* as part of a "Receives Others Sounds" step 173*a*, and are then sounded by the respective speaker 78 of the client device 35*b* as part of the "Emit Others Sound" step 177.

It is further noted that the captured sound by a microphone 82 of the respective client device 35 is analyzed as described above. However, such analysis as part of a "Analyze Sound" step 104*a* needs to take into account that the captured sound by the microphone 82 includes the sound emitted as part of the "Emit Others Sound" step 177 in addition to the sound emitted by the musical instrument that is part of the practice session, and thus this emitted background sound that is emitted as part of the "Emit Others Sound" step 177 needs to be reduced from the captured sound, such as by any noise cancellation technique, to allow proper analysis of the sound of interest that is the result of playing the musical instrument based on the displayed symbols as part of the "Display Next Symbol" step 96.

Figure 17A:
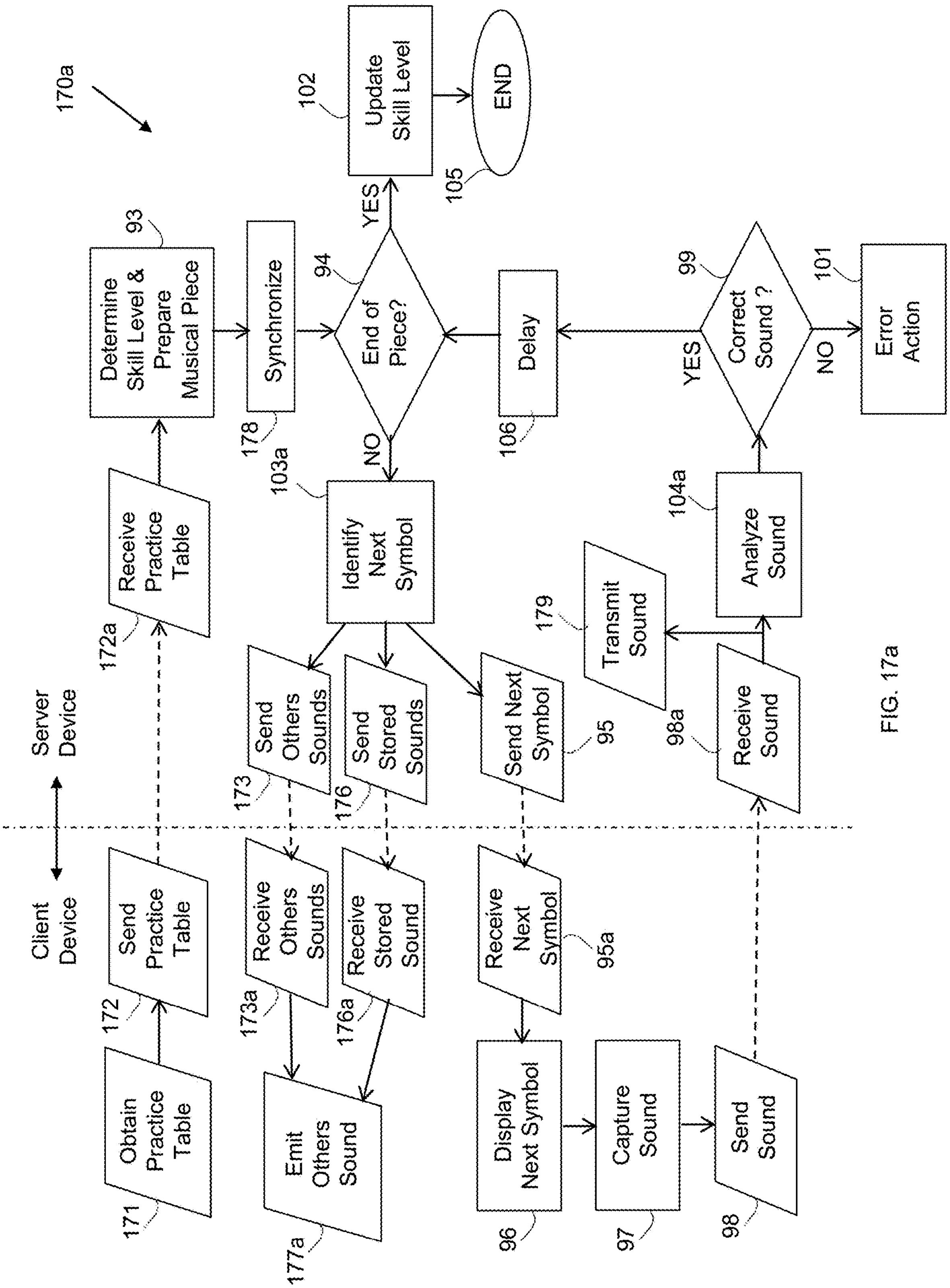
FIG. 17*a* illustrates a simplified schematic flow chart of a method for cooperatively practicing a musical piece by a musical instrument while hearing a background of additional musical instruments, where at least one of the additional musical instruments is artificially produced based on stored or received sound files.

The flow chart 170 shown in FIG. 17 describes handling a 'System' definition of a musical instrument by sending musical symbols of the selected musical instrument, and simulating the presence of the selected musical instrument by converting the symbols into sound that is played on the respective speaker 78 of the client device 35 as part of an "Emit Others Sound" step 177. Alternatively or in addition, the audio files 163*c* in the table 161, that may be recorded sound or an artificial sound after vocalizing, using any techniques that may be used in the "Vocalize Symbols" step 175. In such a case, described in a flowchart 170*a* shown in FIG. 17*a*, the sound file of the selected musical instrument, or of multiple musical instruments if more than one is selected, is sent from the server device 23*a* to the client device 35 as part of a "Send Stored Sounds" step 176, is received by the client device 35 as part of a "Receive Stored Sounds" step 176*a*, to be directly sounded by the speaker 78 of the respective client device 35 as part of a "Emit Others Sound" step 177*a*.

In the case of multiple users practicing in concert, the server device 23*a* needs to synchronize the users so that the symbols displayed as part of the "Display Next Symbol" step 96, in all the client devices of all users are all align according to the musical piece, and are displayed at the same pace or tempo. The synchronization is performed as part of a "Synchronize" step 178, that may comprise selecting a pace or tempo for all participants in the practice session, such as selecting the lower pace or tempo in order to accommodate the lower skill level participant. Further, the starting of the progress should be shared by all participants. For example, the flow may start as part of the "Synchronize" step 178 only after the last defined participant logged in and provided both the respective User ID as part of the "Receive User ID" step 92*a* and the respective practice table as part of the "Receive Practice Table" step 172*a*.

The user which operates the client device that is executing the flow chart 170 may be selected as a source for sound by other users. For example, the user may be identified as User #1 84*a*, which is selected as the background bass source as the user 36*a* that operates the client device 35*a*, as described in the respective practice table 180*a* at the bass row 162*d*. In such a case, the sound received from the user as part of the "Receive Sound" step 98*a* is transmitted to the requesting user 36*a* as part a "Transmit Sound" step 179.

Figure 19:
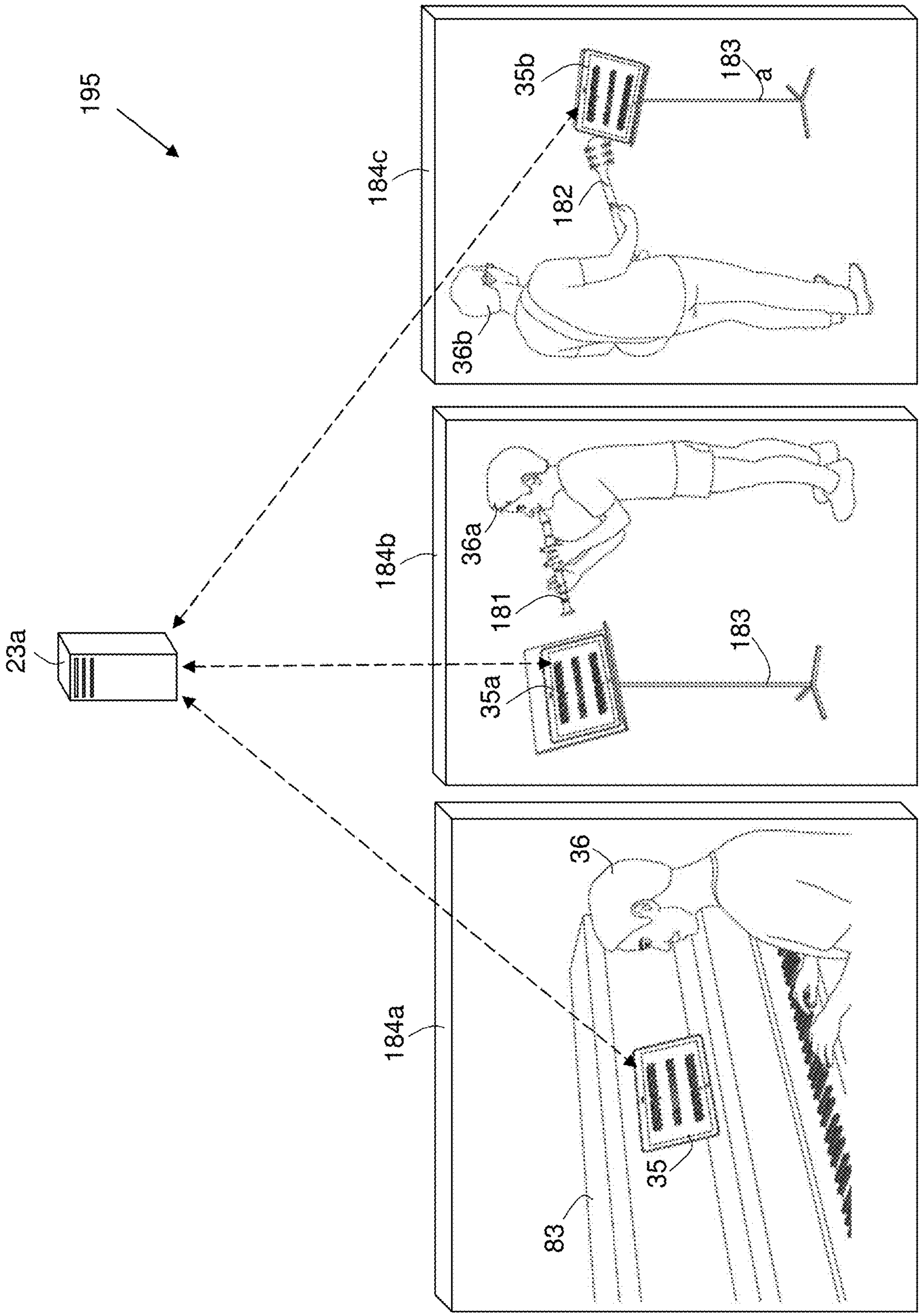
FIG. 19 depicts schematically an arrangement of three users practicing a musical piece at three different locations using three different musical instruments.

In the example of the arrangement 185 shown in FIG. 18, the students are located in the same location 184, where they can each (and maybe see) each other. Alternatively or in addition, the students may be located in different places, where they cannot hear each other, such as in different apartments, buildings, streets, cities, or counties, states, or countries. Such an arrangement 195 is shown in FIG. 19, illustrating the first player 36 that is located at a first location 184*a* is practicing playing of the piano 83 and uses the client device 35, the second player 36*a* that is located at a second location 184*b* is practicing playing of a flute 181 and uses a client device (shown as a tablet) 35*a* placed on a stand 183, and the third player 36*b* that is located at a third location 184*c* is practicing playing of a guitar 182 and uses a client device 35*b* (shown as a tablet) placed on a stand 183*a*.

In one scenario, the three players 36, 36*a*, and 36*b* may decide to individually practice their respective musical instrument, without any background sound or any participation of any other instruments. An example of respective practice tables, such as a first practice table 190 used by the first user 36, a second practice table 190*a* used by the second user 36*a*, and a third practice table 190*b* used by the third user 36*b*, are shown in FIG. 19*a*. The first practice table 190 defines only the piano as a participating musical instrument, shown as 'Self' in the piano row 162*c*, corresponding to the piano 83, the second practice table 190*a* defines only the flute as a participating musical instrument, shown as 'Self' in the flute row 162*f*, corresponding to the flute 181, and the third practice table 190*b* defines only the guitar as a participating musical instrument, shown as 'Self' in the guitar row 162*a*, corresponding to the guitar 182.

In such a scenario the "Send Others Sound" step 173 and the corresponding "Receive Others Sounds" step 173*a*, as well as the "Send Others Symbols" step 174 and the corresponding "Receive Others Symbols" step 174*a* of the flow chart 170 are not active, and no sound is emitted from the speaker 78 of any of the respective client devices 35, 35*a*, and 35*b*, as part of the "Emit Others Sound" step 177*a*. Similarly, no sound is transmitted as part of the "Transmit Sound" step 179.

Alternatively or in addition, one, two, or all of the players may decide to use an artificial background sound of other musical instruments. Such scenario is illustrated in an arrangement 205 shown in FIG. 20. The player 36*a* decides not to use such capability and not to hear any background or additional musical instruments, thus no sound is emitted from the speaker 78 of any of the respective client device 35*a*. However, the users 36 and 36*b* may select to hear artificial background sound of other musical instruments. A system generated sound of one or more other instruments is shown carried over a data path 201*a* to the location 184*a* to be received by the tablet 35, and similarly a system generated sound of one or more other instruments is shown carried over a data path 201*b* to the location 184*c* to be received by the tablet 35*b*.

An example of respective practice tables, such as a first practice table 200 used by the first user 36, a second practice table 200*a* used by the second user 36*a*, and a third practice table 200*b* used by the third user 36*b*, are shown in FIG. 20*a*. Similar to the arrangement 195, the second practice table 200*a* defines only the flute as a participating musical instrument, shown as 'Self' in the flute row 162*f*, corresponding to the flute 181.

In addition to defining the piano as a participating musical instrument, the first practice table 200 defines a guitar as an artificial accompanying musical instrument as shown in the guitar row 162*a* 'System', indicating that the data path 201*a* carries symbols or sound that is associated with guitar playing. The data path 201*a* may correspond to the "Send Others Symbols" step 174 and the corresponding "Receive Others Symbols" step 174*a* of the flow chart 170, where guitar related symbols, such as based on the Guitar-sheet.pdf as part of the guitar row 162*a* in the table 161, are transferred to the client device 35, and are then converted to sound as part of the "Vocalize Symbols" step 175, and then sounded from the speaker 78 of the respective client device 35. As an alternative to sending symbols, the server 23*a* may send sound files as part of a "Send Stored Sounds" step 176 in the flow chart 170*a*, such as based on the guitar.mp3 file as part of the guitar row 162*a* in the table 161, to be sounded by the speaker 78 of the respective client device 35.

Similarly, the third practice table 200*b* defines both the piano and the vocal as an artificial accompanying musical instruments shown as 'System' in the piano row 162*c* and in the vocal row 162*e*, indicating that the data path 201*b* carries symbols or sound that is associated with combined piano and vocal guitar playing. The data path 201*b* may similarly correspond to the "Send Others Symbols" step 174 and the corresponding "Receive Others Symbols" step 174*a* of the flow chart 170, where piano related symbols, such as based on the Piano-sheet.docx as part of the piano row 162*c* in the table 161, together with vocal related symbols, such as based on the Vocal-sheet.doc as part of the vocal row 162*e* in the table 161, are transferred to the client device 35*b*, and are then converted to sound as part of the "Vocalize Symbols" step 175, and then sounded from the speaker 78 of the respective client device 35*b*. In this scenario, no sound is transmitted as part of the "Transmit Sound" step 179 by any of the client devices.

Alternatively or in addition, one, two, or all of the players may decide to use an actual sound by other practicing participants of other musical instruments. Such scenario is illustrated in an arrangement 215 shown in FIG. 21. The first player 36 that is located at a first location 184*a* may be identified as User #1 84*a*, the second player 36*a* that is located at a second location 184*b* may be identified as User #2 84*b*, and the third player 36*b* that is located at a third location 184*c* may be identified as User #3 84*c*. In this example, the player 36 decides not to use such a capability and not to hear any background or additional musical instruments, thus no sound is emitted from the speaker 78 of any of the respective client device 35. However, the users 36*a* and 36*b* may select to hear background sound of other musical instruments. In the example of the arrangement 215, the sound from the piano 83 played by the user 36 is transmitted over a data path 211*a* to the server device 23*a*, where it is retransmitted over a data path 211*b* to the location 184*b* to be sounded by the tablet 35*a* to the user 36*a*, and simultaneously over a data path 211*c* to the location 184*c* to be sounded by the tablet 35*b* to the user 36*b*. Similarly, the sound from the flute 181 played by the user 36*a* is transmitted over a data path 212*a* to the server device 23*a*, where it is retransmitted over a data path 212*b* to the location 184*c* to be sounded by the tablet 35*b* to the user 36*b*.

An example of respective practice tables, such as a first practice table 210 used by the first user 36, a second practice table 210*a* used by the second user 36*a*, and a third practice table 210*b* used by the third user 36*b*, are shown in FIG. 21*a*. The first practice table 210 may be identical to the first practice table 200, denoting that the player 36 decides not to use the feature of hearing any background or additional musical instruments. The second practice table 210*a* defines the flute as a participating musical instrument, shown as 'Self' in the flute row 162*f*, corresponding to the flute 181. In addition, the piano row 162*c* includes the value of 'User #1', defining that the user 36*a* is interested in hearing the playing of the piano 83 by the user 36 at the location 184*a*.

The third practice table 210*b* defines the guitar as a participating musical instrument, shown as 'Self' in the guitar row 162*a*, corresponding to the guitar 182. In addition, the piano row 162*c* includes the value of 'User #1', defining that the user 36*b* is interested in hearing the playing of the piano 83 by the user 36 at the location 184*a*. Further, the flute row 162*f* includes the value of 'User #2', defining that the user 36*b* is interested in hearing the playing of the flute 181 by the user 36*a* at the location 184*b*.

The data path 211*a* involves the transmitting of the captured sound by the microphone 82 of the client device 35 to the server 23*a*, and may correspond to the "Send Sound" step 98 and the respective "Receive Sound" step 98*a*. Similarly, the data path 212*a* involves the transmitting of the captured sound by the microphone 82 of the client device 35*a* to the server 23*a*, and may similarly correspond to the may correspond to the "Send Sound" step 98 and the respective "Receive Sound" step 98*a*. The data path 211*b* involves the transmitting as part of the "Transmit Sound" step 179 of the tablet 35*a* of the sound captured by the tablet 35 that was received by the server device as part of the "Receive Sound" step 98*a*. Similarly, the data paths 212*b* and 211*c* respectively may involve the transmitting as part of the "Transmit Sound" step 179 of the sound captured by the tablets 35 and 35*a* that was received by the server device 23*a* as part of the "Receive Sound" step 98*a*.

Figure 22:
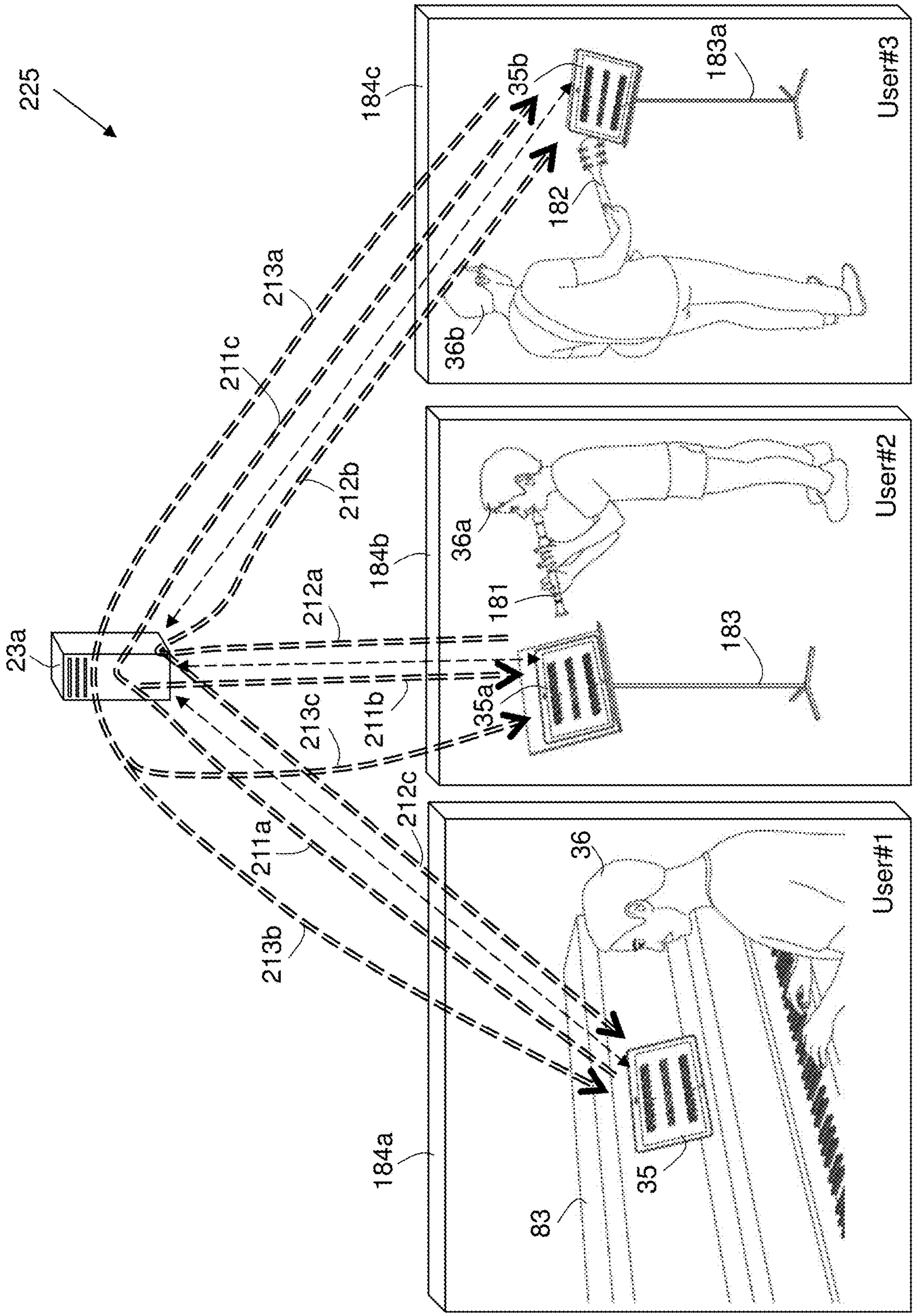
FIG. 22 depicts schematically an arrangement of three users practicing a musical piece at three different locations using three different musical instruments, where all the users hear the playing of other musical instruments by all other users.

In one example, all involved users are able to hear all other practicing participants of other musical instruments, providing a simulation or feeling of a band or orchestra that play together at the same location. Such scenario is illustrated in an arrangement 225 shown in FIG. 22. In this example, the sound captured by the client device 35 at the location 184*a* is carried over a data path 211*a* to the server device 23*a*, from which this captured sound is transmitted to the client device 35*a* at the location 184*b* over a data path 211*b* and to the client device 35*b* at the location 184*c* over a data path 211*c*.

Similarly, the sound captured by the client device 35*a* at the location 184*b* is carried over a data path 212*a* to the server device 23*a*, from which this captured sound is transmitted to the client device 35 at the location 184*a* over a data path 212*c* and to the client device 35*b* at the location 184*c* over a data path 212*b*, and the sound captured by the client device 35*b* at the location 184*c* is carried over a data path 213*a* to the server device 23*a*, from which this captured sound is transmitted to the client device 35 at the location 184*a* over a data path 213*b* and to the client device 35*a* at the location 184*b* over a data path 213*c*.

An example of respective practice tables, such as a first practice table 220 used by the first user 36, a second practice table 220*a* used by the second user 36*a*, and a third practice table 220*b* used by the third user 36*b*, are shown in FIG. 22*a*. The first practice table 220 defines the flute as a participating musical instrument, shown as 'User #2' in the flute row 162*f*, corresponding to the flute 181. In addition, the guitar row 162*a* includes the value of 'User #3', defining that the user 36 is interested in hearing the playing of the guitar 182 by the user 36*c* at the location 184*c*.

The second practice table 220*a* defines the piano as a participating musical instrument, shown as 'User #1' in the piano row 162*c*, corresponding to the piano 83. In addition, the guitar row 162*a* includes the value of 'User #3', defining that the user 36*a* is interested in hearing the playing of the guitar 182 by the user 36*c* at the location 184*c*. The third practice table 220*b* defines the piano as a participating musical instrument, shown as 'User #1' in the piano row 162*c*, corresponding to the piano 83. In addition, the flute is defined as a participating musical instrument, shown as 'User #2' in the flute row 162*f*, corresponding to the flute 181.

The example of the arrangement 180 involved multiple users at the same location, and the example of the arrangement 195 involved multiple users at different locations. Any combination of one or more students in a single location and one or more students in multiple locations may equally be applied. Each user is "receiving" musical; symbols, such as notes or chords, for their specific musical instrument that matches their respective playing level (and can be adapted in real time 'on the fly'). Each user may configure the system to simultaneously hear the complete background of the musical piece, preferably minus the other players he can hear as being in the same location, or virtually the sound produced in other locations over a fast and low-latency Internet connection (such as by using 5G). For example, a single musical piece can be played together (jammed) by 5 people that are located in 3 locations: 2 players are located at a home location practicing Guitar (for example at an entree level) and drums (for example at a mid-level), while they both hear the background music of the all involved musical instruments of the musical piece minus the guitar and drums, while a player at a work location, may simultaneously practice on a piano and hears all other players without ('minus') the piano sound, and 2 more players may be located at a school location and may simultaneously practice Bass (for example at an advanced level) and vocal (for example at mid-level), with a background music that includes all other players and instruments, but for example without guitar, drums, piano, bass, and vocals.

Each player may (e.g., synchronously) receive the musical symbols, such as musical notes, that match his specific musical instrument, to be displayed for practicing, where the symbols or the pace of displaying the symbols are adapted to the specific musical instrument and the specific user skill level, which may be adapted in real-time during the practice session. Further, each user may hear via his device the relevant background music and other players that may be locally or remotely located, using a low latency connection.

Figure 20:
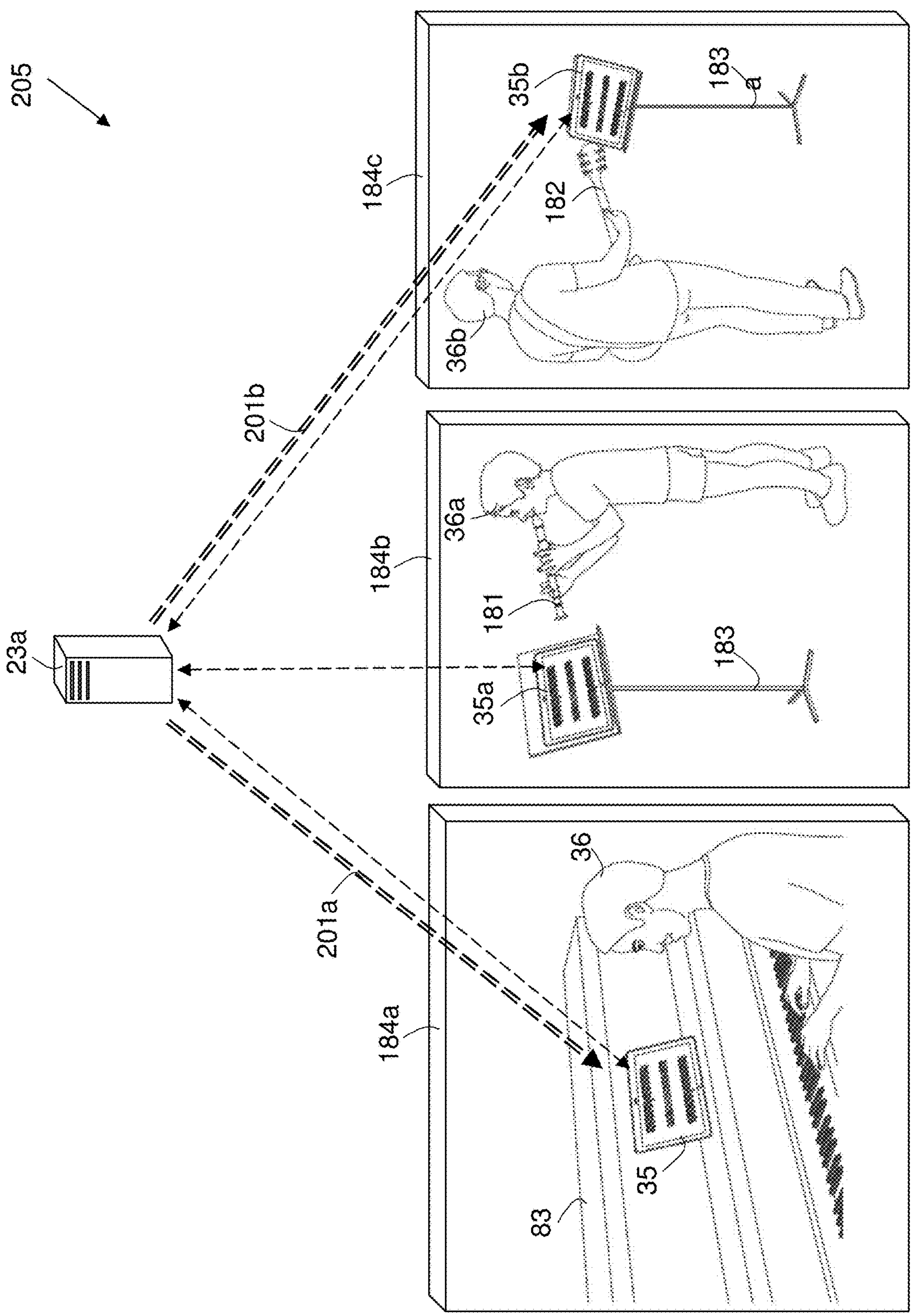
FIG. 20 depicts schematically an arrangement of three users practicing a musical piece at three different locations using three different musical instruments and using artificially produced sound of various musical instruments.
Figure 21:
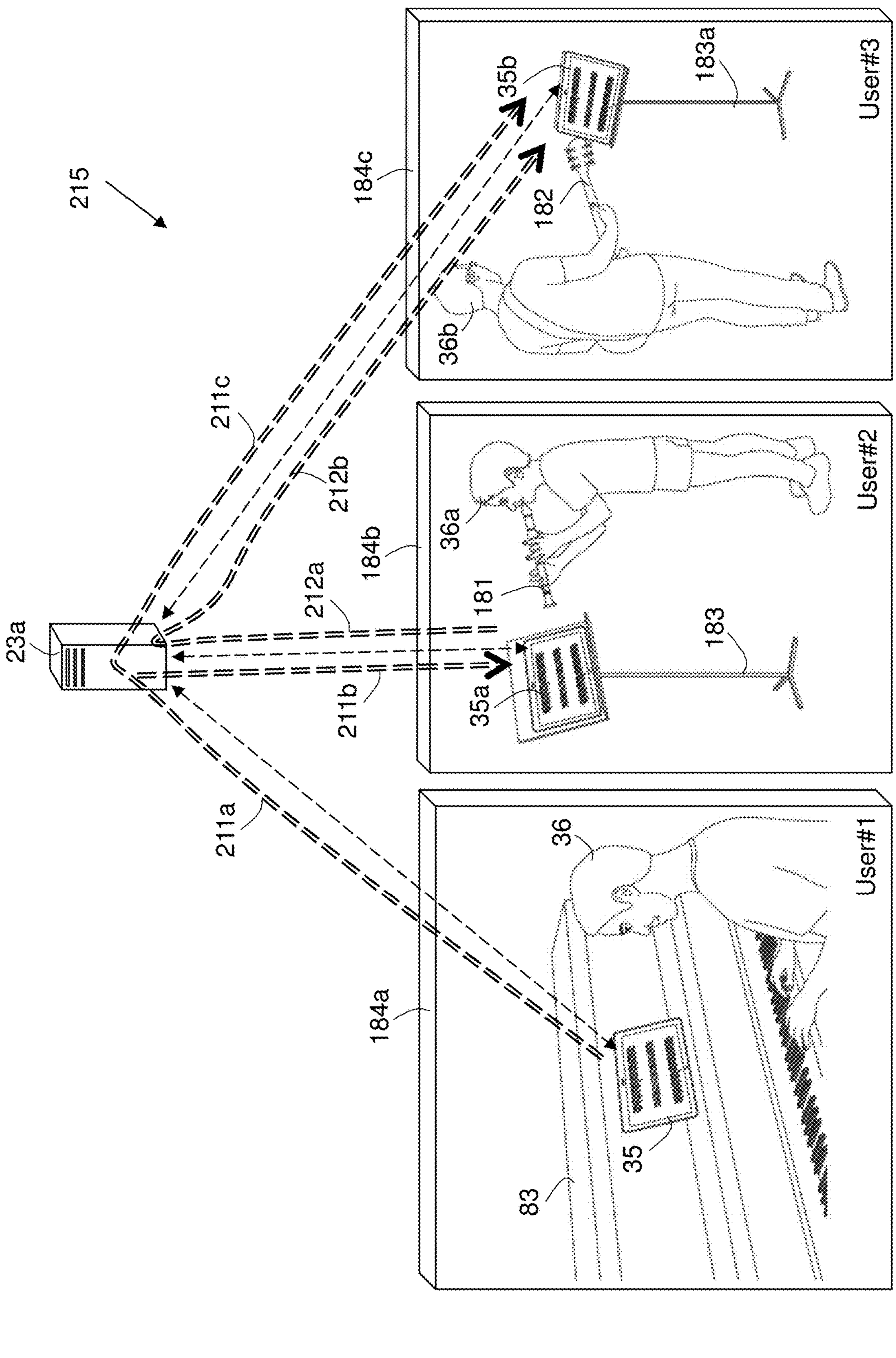
FIG. 21 depicts schematically an arrangement of three users practicing a musical piece at three different locations using three different musical instruments, where two users hear the playing of other musical instruments by other users.

The table 161 shown in the view 160, the table 160*a* and 160*b* shown in the FIG. 16*a*, the tables 180, 180*a*, and 180*b* shown in FIG. 18*a*, the tables 190, 190*a*, and 190*b* shown in FIG. 19*a*, the tables 200, 200*a*, and 200*b* shown in FIG. 20*a*, the tables 210, 210*a*, and 210*b* shown in FIG. 21*a*, and the tables 220, 220*a*, and 220*b* shown in FIG. 22*a*, as well as the arrangement 185 shown in FIG. 18, the arrangement 195 shown in FIG. 19, the arrangement 205 shown in FIG. 20, and the arrangement 215 shown in FIG. 21, all example the scenario of using different musical instruments, either as system generated sound or as being played by the cooperatively playing users. However, any two musical devices shown, either as system generated sound or as being cooperatively played by the users, may be identical or similar. For example, the user 36*a* shown as playing the flute 181 in the arrangement 185 shown in FIG. 18, may equally play a piano, which may be identical or similar to the piano 83 played by the user 36, or alternatively may play a guitar, which may be identical or similar to the guitar 182 played by the user 36*b*. Similarly, any system generated simulated music, such as the system generated guitar 162*a* shown as part of the table 200 in FIG. 20*a*, may be replaced with a system generated music of a musical instrument that is identical to, or similar to, one that is actually played by one of the actual players. For example, the system generated guitar 162*a* shown as part of the table 200 in FIG. 20*a* may be replaced with a piano generated music, that may be identical to, or similar to, the piano 83 played by the user 36, may be replaced with a flute generated music, that may be identical to, or similar to, the flute 181 played by the user 36*a*, or may be replaced with a guitar generated music, that may be identical to, or similar to, the guitar 182 played by the user 36*b*.

Figure 23:
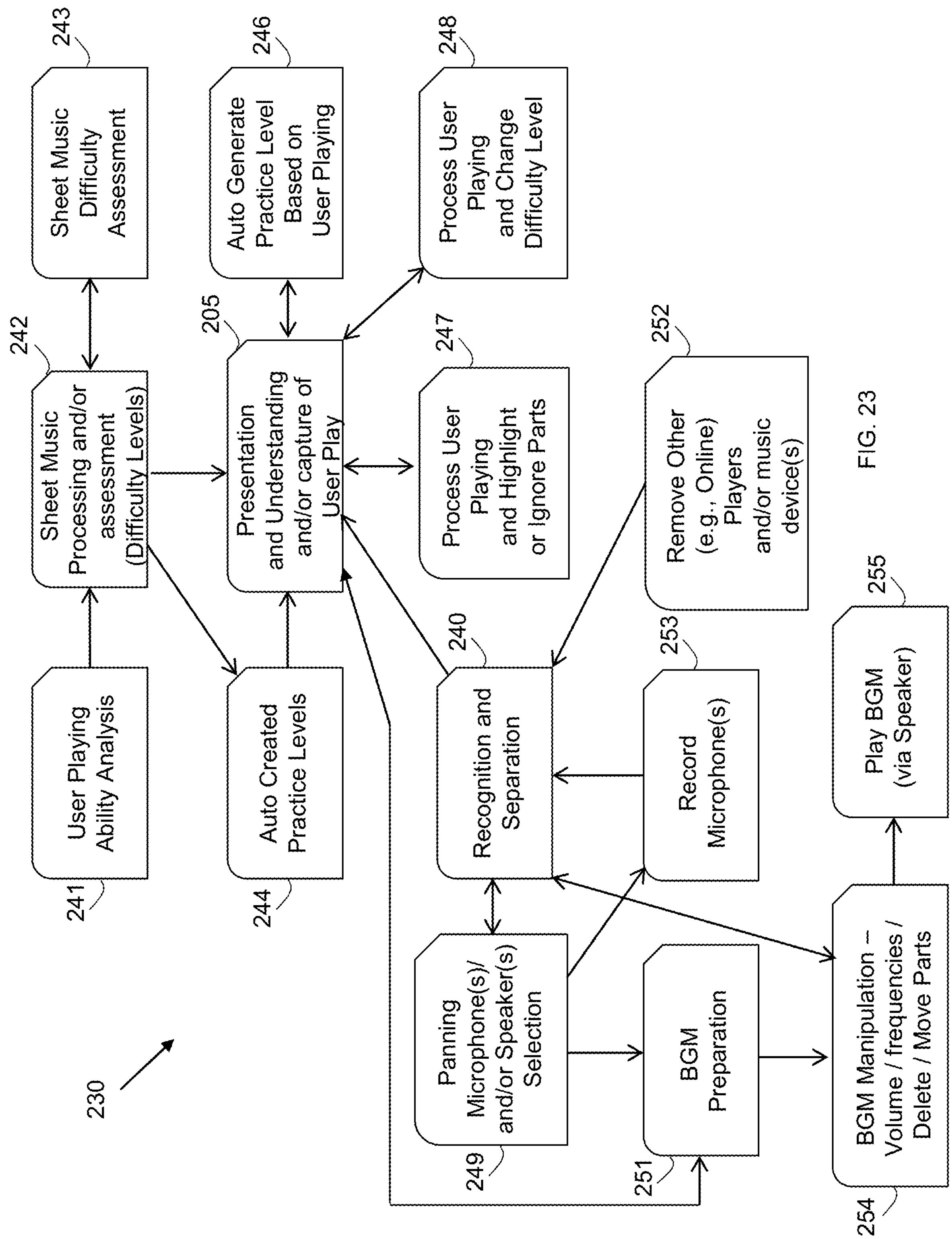
FIG. 23 depicts schematically an example of an architecture of software modules for teaching of practicing of a musical instrument that adapts to the user skill level.

An example of a software architecture 230 of software modules for performing one of more of the flow charts, steps, or methods herein is described in FIG. 23, that may be part of the client device 35, part of the server device 23*a*, or split between the two devices, so that they work cooperatively. Each of the modules in the software architecture 240, or any combination thereof, may be implemented as instruction in the instructions block 37*a* of the client device 35, and may use the services of the operating system 37*b*. Further, each of the modules in the software architecture 240, or any combination thereof, may comprises or may be used with a client-side API capable of providing web enabled function such as HTTP, for example using GET function, and may further be implemented as JavaScript Object Notation (JSON) representational stat transfer (REST) API. The exemplary arrangement 240 pictorially describes an example of the process a user is experiencing from the moment the user wishes to play a certain music piece or selects a music piece out of a musical pieces or songs library. The process may be tailor-made that music piece to the user 36 capability and focuses on the user ability and learning process while playing. Finally, an adequate Background Music (BGM) is generated based on the user playing and possible jamming together with other players in the same space or far away. The modules may be built for specific music instrument—and once the user 36 changes the musical instrument, new settings are accordingly configured.

An "User Playing Ability Analysis" 241 module is an optional module that estimates the user playing ability based on previous performances, current progress in the application journey, and what proficiency the user is expected to achieve. The user ability is a measurement of the characteristics of what the user played so far and the ability that the user already knows—such as notes, chords, technique, rhythm, and more. The assessment can be a score or comparison of computed features using AI learning from players at certain playing ability features.

A "Sheet Music Difficulty Assessment" 243 module is similar in computed features to the "User Playing Ability Analysis" module 241 (derived from the sheet music), but estimates the difficulty of sheet music—by scoring various features including note/chord knowledge, rhythm, transition complexity, tempo, and more. The scores include the average, minimum, maximum difficulty level and other statistical variants of a music piece arrangement.

Both of the "User Playing Ability Analysis" module 241 and "Sheet Music Difficulty Assessment" module 243 feed a "Sheet Music Processing (Difficulty Levels)" module 242 which is the sheet music difficulty level generation. The module 241 is the optional one, if no personal data is taken a generalized difficulty level is created for "standard" users without personalization. The module 242 creates an arrangement for a given difficulty level—either based on the user knowledge or an average one. The arrangement is done based on rules, or AI from other multi-level music pieces that are labeled. Each time a new arrangement has created the difficulty of it is measured using the "Sheet Music Difficulty Assessment" module 243. The result is one or more arrangements for the sheet music with various difficulty levels. The different difficulty levels arrangement can also be done either only by crowdsourcing or a combination of automation and then improvement by crowdsourcing and/or experts. The result of the "Sheet Music Processing (Difficulty Levels)" module 242 is an arrangement that is ready to fit the user needs and based on the user abilities. The next stage for the user is to start learning and eventually playing the music piece.

The playing is done via an "Presentation and Understanding User Play" module 205, using an application or utility. In an "Auto Created Practice Levels" 244 auto-generated practice levels are created based on the arrangement and difficulty level. The way to create the practice is based on learning from previously created sheet music with practice level or, by looking at the higher difficulty sequences and their importance in the arrangement and suggesting them as practice or, by learning where other users fail at that difficulty level and suggest them as practice. The practice can include educational videos—offline or live on-demand with real teachers, rhythm training, learning of new notes/chords or even AI/AR generated teaching videos.

Following preparation of the practice level the user can decide to practice, the user starts to play with the application or utility. The application actual UI can have many forms (Visual UI, voice instructions, AR, etc.). While the user is playing the notes and chords are presented to him along with score and the recognition quality results based on the recognition engine that comprises modules 249 to 255, which are processing the user playing, removing background music and output recognition and progress results.

While the user plays, the recognition engine in a "Recognition and Separation" module 240 performs recognition that can result in a few types of results, such as performing a "Process User Playing and Highlight or Ignore Parts" module 247,—OK recognition, NO recognition, error, and ignore (for repeated error). The "Process User Playing and Highlight or Ignore Parts" module 247 collects repeated sequences of bad recognition or ones the user is not able to play as expected. Once such a sequence is considered as "problematic" it is saved for later practice sessions. From that moment on this sequence is not shown as "error" anymore but as "keep playing" or "ignore". While the user plays the sequence again, the user also practices more and therefore can result in eventually playing that sequence in a satisfactory way. Once this happens this sequence will be extracted out of the "problematic" list. In sequence we refer to any issue with the user playing including tempo, rhythm, technique, note/chord playing, transitions, etc.

In parallel during the user play—a "Process User Playing and Change Difficulty Level" module 248 processes the user's ability to play the sheet music at the current difficulty level—if the assessment is that the arrangement is an easy one to user an increased difficulty level arrangement is presented and if the user fails too often decreased difficulty level is presented.

Once the playing ended the user is presented with score(s) and suggested to take a personalized new practice session that is based on the user's final difficulty level arrangement and the types of obstacles in playing the user faced. This is done by an "Auto Generate Practice Level Based on User Playing" module 246 that collects the sequences and other areas the user fails in during the play. If the user wishes to play the sheet music again—the newly created practice is presented and if the user chooses to do it—it is set as the new practice level which is later followed by the sheet musing playing with the adequate difficulty level arrangement.

Modules 249 to 255 are the actual processes to enable the whole actual music learning of that music piece to happen. The application is enabling the user to play alone or jam together with others, while playing together with BGM that match the extra music to make it a song—such as for example adding drums, guitar, trumpet, bass, and vocals when the user plays piano. The user is expected to play together with BGM. As modern devices include multiple speakers and microphones that is some cases the application can select via which to play the BGM and via which to listen. This selection is done in order to assist the recognition engine and the separation process of the BGM from the actual play.

The "Panning Microphone/Speaker Selection" module 249 is the basics for decision out of the multiple microphones and speakers—which combination yields the best experience for the user—hearing well the background music and at the same being able to separate the music device from the total recorded sound (music device(s), BGM and added external noise). The idea is to auto-select the best configuration that can be altered online to maximize performance. The selection of the microphone and speaker can influence the BGM preparation as part of a "BGM preparation" module 251—(music minus the played music device(s)) with matching to the difficulty level—the less difficulty the more concrete BGM is needed in general to compensate for minimal music played by the user. A "BGM Manipulation—Volume/frequencies/Delete/Move Parts" module 254 performs additional DSP on the BGM—such as lowering the volume, filters (such as high or low pass), removal or movement in time of some playing (such as in concurrent to the user playing), etc.

The modules 249, 251 and 254 are updated all the time based on the recognition and the separation assessment in real-time. The output of the BGM to be played is input to the recognition engine "Recognition and Separation" module 250, in parallel to the module 255—playing that BGM through the selected speaker(s). The recording of the sound is performed in a "Record Microphone" module 253 via the selected microphone(s). In case of joint practice ('jamming') a "Remove Other (e.g., Online) Players and/or music devices" module 252 is responsible for the input of other musical instruments that play together with the user in the same space and can be heard using the user microphones—those devices (user playing) expected playing (result of the module 252 also input to the recognition engine in parallel to the expected BGM in the "BGM Manipulation—Volume/frequencies/Delete/Move Parts" module 254.

Figure 24:
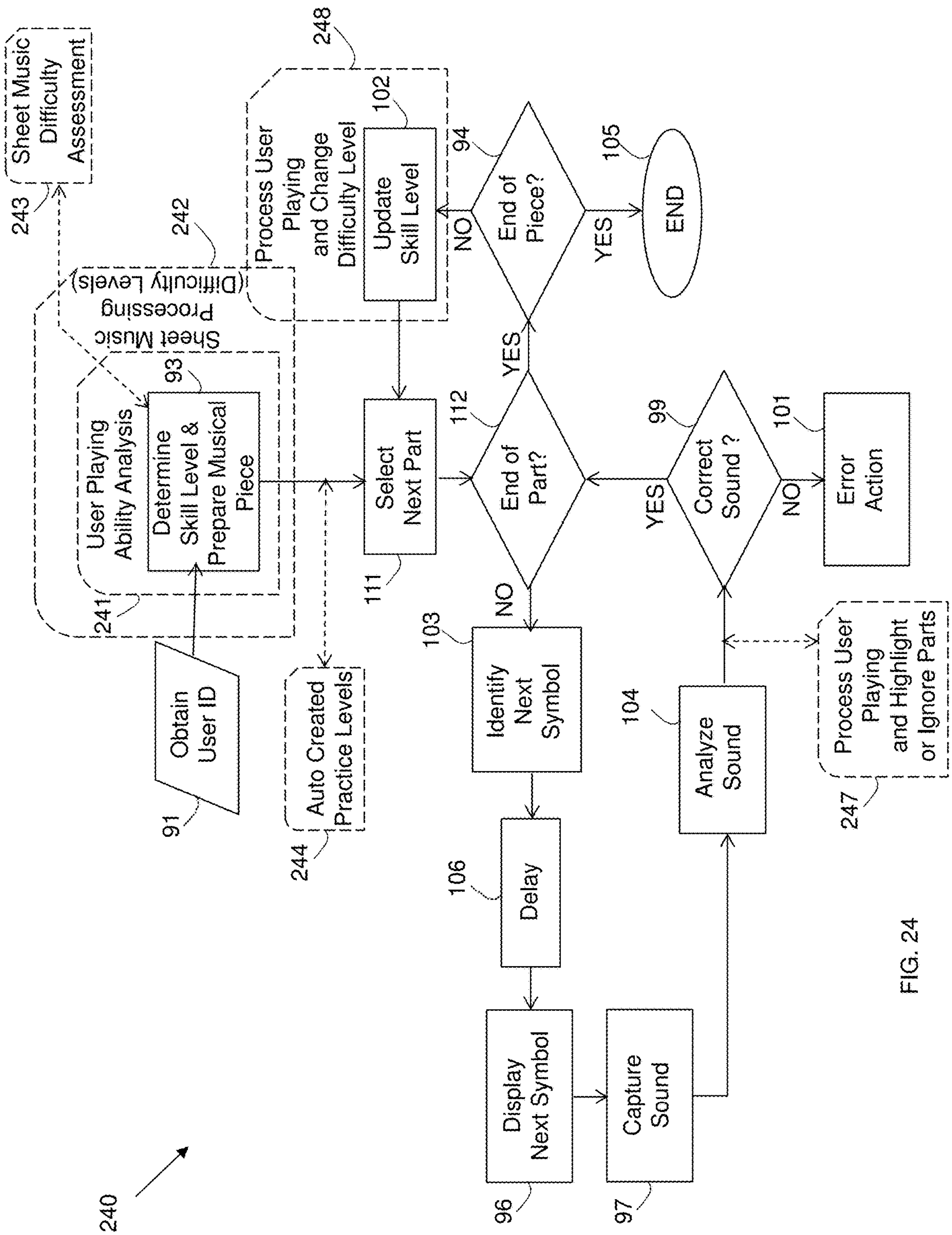
FIG. 24 illustrates a simplified schematic flow chart of a method for adaptive and interactive music learning based on sequentially playing parts of a musical piece using a client device overlayed with example of an architecture of associated software modules.

An example of associating of the software architecture 230 of software modules with the flow chart 150*a* shown in FIG. 15*a* is exampled as an arrangement 240 shown in FIG. 24.

The arrangement 80 shown in FIG. 8 described an example where the user 36 operates the musical instrument 83, and the generated sound by the musical instrument 83 in response to the user 36 action is captured by the microphone 82 in the client device 35, and then analyzed for monitoring the user 36 playing. Alternatively or in addition, the musical device may be an electronic one, such as a MIDI controller, that directly provides information regarding the user 36 action, thus allowing for directly monitoring the user 36 actions. Such an arrangement 150*b* is shown in FIG. 15*b*.

Figure 15B:
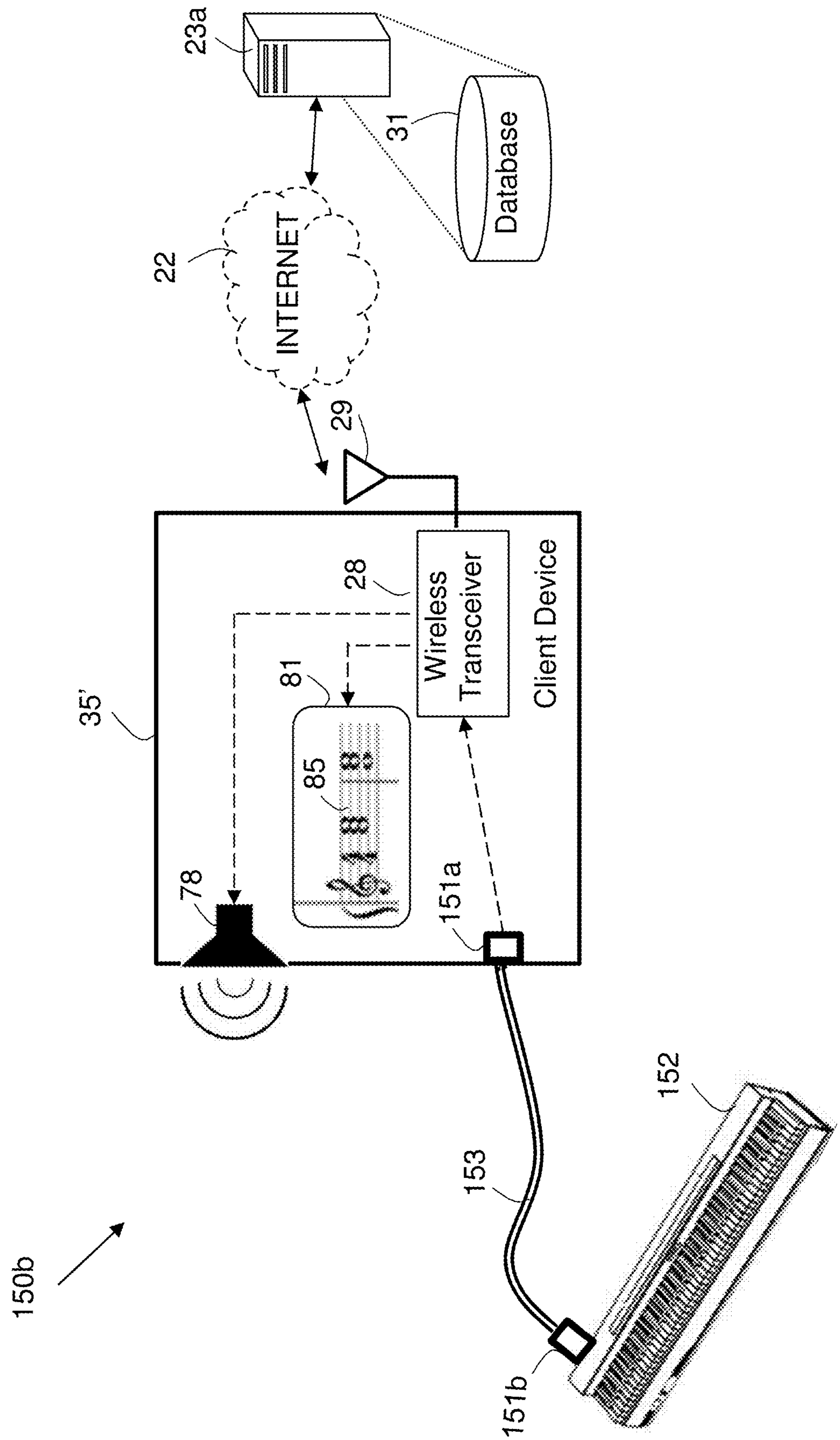
FIG. 15*b* depicts schematically an arrangement of a MIDI controller wiredly connected to a client device.

In the arrangement 150*b* shown in FIG. 15*b*, a MIDI controller 152 is wiredly connected to the client device 35', using a cable 153 that is connected between a connector 151*b* on the MIDI controller 152 and a mating connector 151*a* on the client device 35'. In one example, the wired connection is MIDI based, where each of the connectors 151*a* and 151*b* is a MIDI DIN-type connector, and the connecting cable 153 is a MIDI cable. Alternatively or in addition, the wired connection is Universal Serial Bus (USB) based, where each of the connectors 151*a* and 151*b* is a USB connector, and the connecting cable 153 is a USB cable. In both cases, the cable 153 provides a point-to-point connection and servers to carry serial, bytes-based messages (such as frames or packets) respectively according to MIDI or USB protocol.

The actual actions of the user 36, such as the identification of the actual key that is pressed, the amount of pressure on the pressed key, knob turns, and slider changes are converted into MIDI data, and sent over the cable 153 from the MIDI controller 152 to the client device 35', which may then analyze the received MIDI data, or transmit the data to the server device 23*a* for analysis. In such a case, the received actions data may be used to monitor the user 36 actions, as a supplement, or as an alternative, to the microphone 82. In one example, the MIDI controller 152 may comprise, or may consist of, a MIDI keyboard.

Figure 15C:
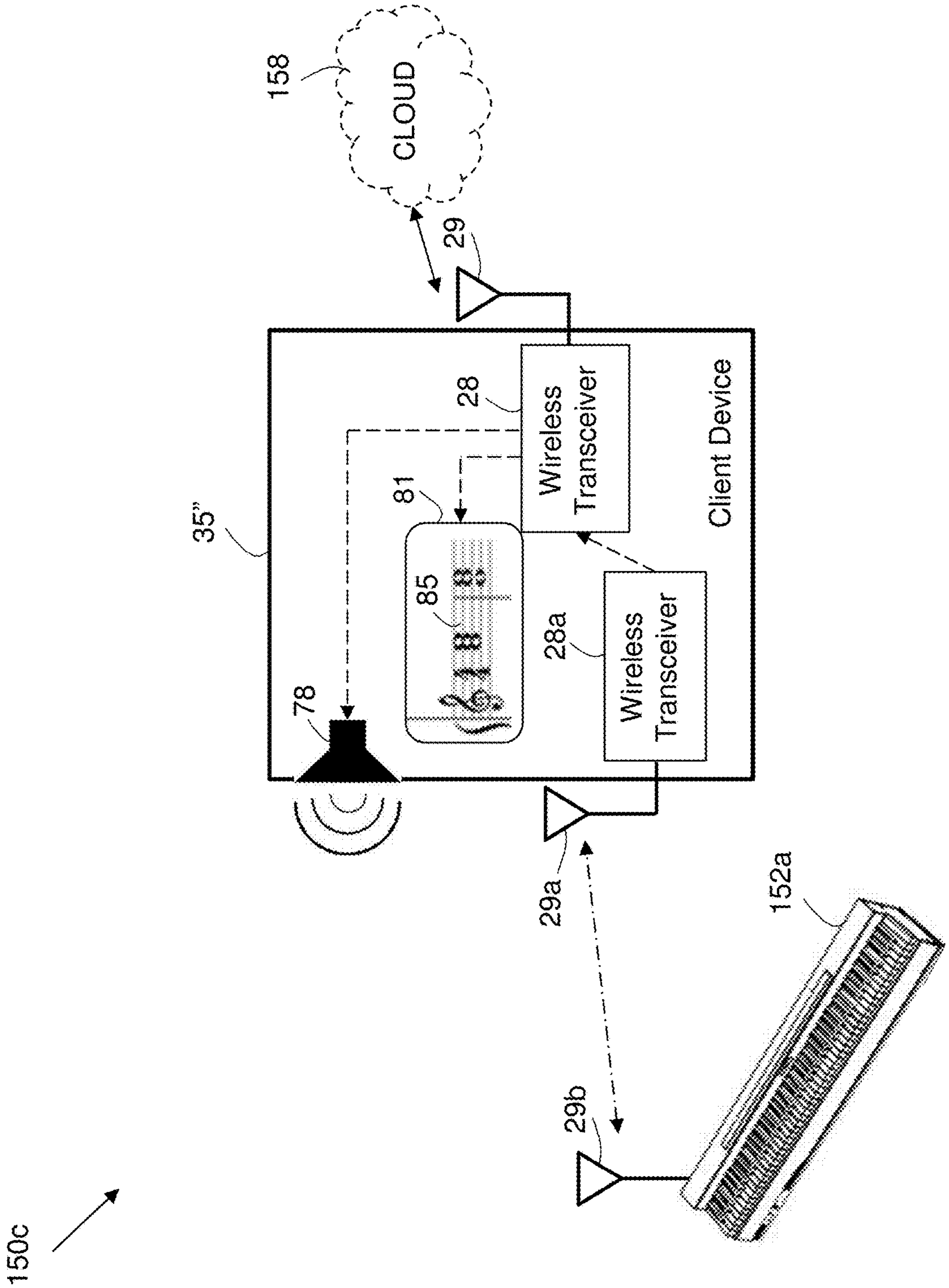
FIG. 15*c* depicts schematically an arrangement of a MIDI controller wirelessly connected to a client device that is connected for cloud-based service.

As an alternative or in addition to the wired connection illustrated in the arrangement 150*b* shown in FIG. 15*b*, a wireless connection may be used, as illustrated in an arrangement 150*c* shown in FIG. 15*c*. The cable 153 and the mating connectors 151*a* and 151*b* may be replaced, or be supplemented, with a wireless connection that uses the antenna 29*b* in a MIDI controller 152*a* and the antenna 29*a* in a client device 35". The antenna 29*a* in a client device 35" is connected to a wireless transceiver 28*a*, that may be the same as, identical to, similar to, or different from, the wireless transceiver 28 that is used communication over the Internet 22 with the server device 23*a*. In one example, the same wireless communication interface is used for communicating with both the server 23*a* via the Internet 22 and with the wireless MIDI controller 152, and in such scenario the antenna 29*a* is the same as antenna 29, and the wireless transceiver 28 is the same vas the wireless transceiver 28*a*.

The wireless communication or network connecting the MIDI controller 152*a* and the client device 35" may comprise a Wireless Personal Area Network (WPAN), the wireless transceiver 28*a* may comprise a WPAN transceiver, and each of the antennas 29*a* and 29*b* may comprise a WPAN antenna. The WPAN may be according to, compatible with, or based on, Bluetooth™, Bluetooth Low Energy (BLE), or IEEE 802.15.1-2005 standards, or the WPAN may be a wireless control network that may be according to, or may be based on, Zigbee™, IEEE 802.15.4-2003, or Z-Wave™ standards. Alternatively or in addition, the wireless communication or network connecting the MIDI controller 152*a* and the client device 35" may comprise a Wireless Local Area Network (WLAN), the wireless transceiver 28*a* may comprise a WLAN transceiver, and each of the antennas 29*a* and 29*b* may comprise a WLAN antenna. The WLAN may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac. Any wireless network herein may be over a licensed or unlicensed radio frequency band that may be an Industrial, Scientific and Medical (ISM) radio band.

Alternatively or in addition, the wireless communication or network connecting the MIDI controller 152*a* and the client device 35" may comprise a Wireless Wide Area Network (WWAN), the wireless transceiver 28*a* may comprise a WWAN transceiver, and each of the antennas 29*a* and 29*b* may comprise a WWAN antenna. Any WWAN herein may be a wireless broadband network. The WWAN may be a WiMAX network, the antenna may be a WiMAX antenna and the wireless transceiver may be a WiMAX modem, and the WiMAX network may be according to, compatible with, or based on, IEEE 802.16-2009. Alternatively or in addition, the WWAN may be a cellular telephone network, the antenna may be a cellular antenna, and the wireless transceiver may be a cellular modem, where the cellular telephone network may be a Third Generation (3G) network that may use a protocol selected from the group consisting of UMTS W-CDMA, UMTS HSPA, UMTS TDD, CDMA2000 1×RTT, CDMA2000 EV-DO, and GSM EDGE-Evolution, or the cellular telephone network may use a protocol selected from the group consisting of a Fifth Generation (5G) or Fourth Generation (4G) network that uses HSPA+, Mobile WiMAX, LTE, LTE-Advanced, MBWA, or may be based on IEEE 802.20-2008.

Figure 15D:
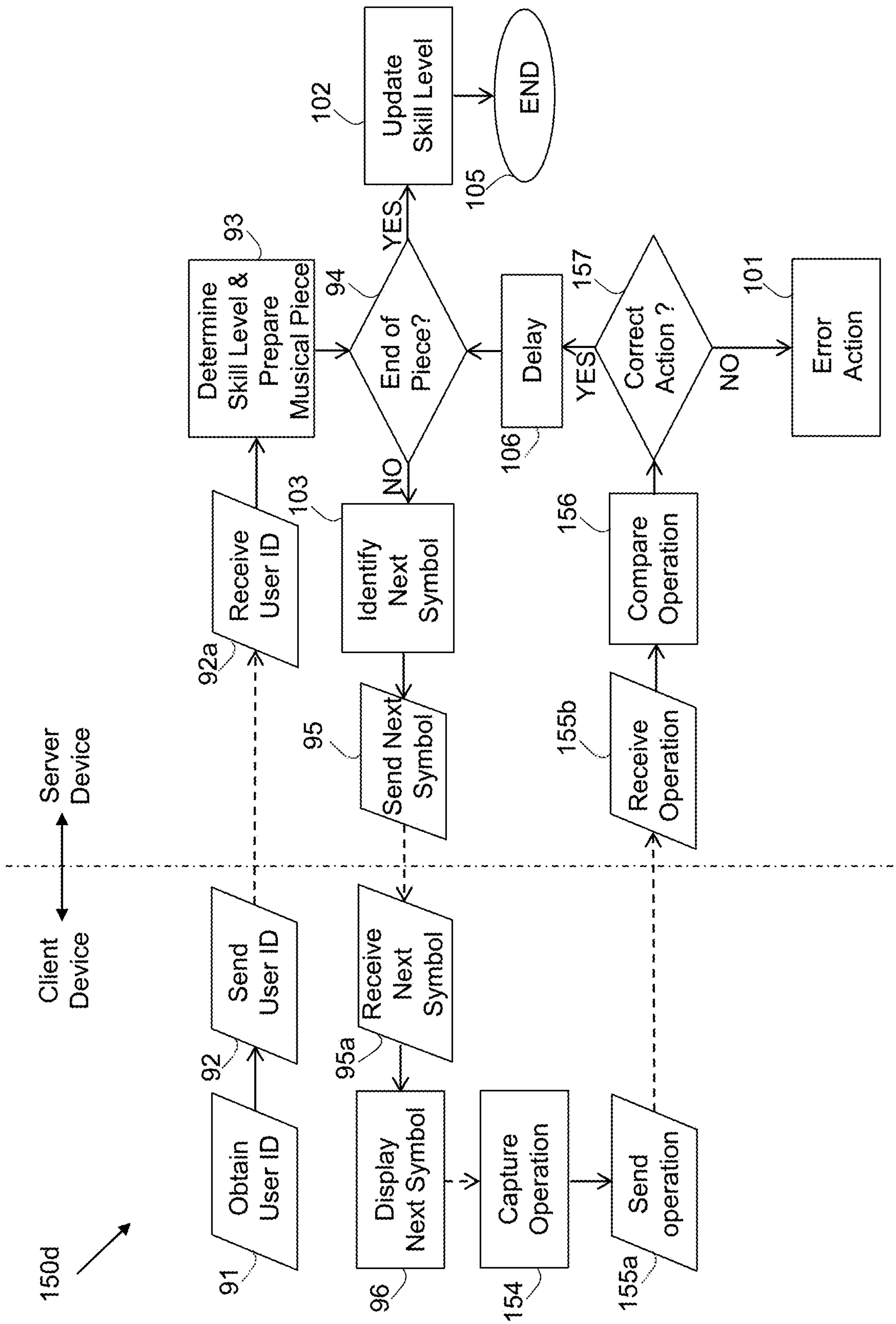
FIG. 15*d* illustrates a simplified schematic flow chart of a method for adaptive and interactive music learning using a MIDI controller based on a delay in the server device.

A flowchart 150*d* shown in FIG. 15*d*, which is based on the flowchart 90 shown in FIG. 9, describes the operation in case where the musical instrument is an electronic one that directly responds to the user 36 actions. As an alternative to capturing the sound generated by the musical instrument in response to the user 36 action as part of the "Capture Sound" step 97, the client device 35 receives from the electronic musical instrument, such as the wired MIDI controller 152 of the arrangement 150*b* or the wireless MIDI controller 152*a* of the arrangement 150*c*, as part of a "Capture Operation" step 154. The client device 35' receives a message that describes the user 36 operation from the MIDI controller 152 at the connector 151*a* via the cable 153, and the client device 35" receives a message that describes the user 36 operation from the wired MIDI controller 152 at the antenna 29*a* using the wireless transceiver 28*a* from the wireless MIDI controller 152*a*. In one example, the received action as part of the "Receive Operation" step 154 is analyzed and processed in the client device 35. Alternatively or in addition, the client device 35 sends the received user action as part of a "Send Operation" 155, and the server device 23*a* receives the sent user action as part of a "Receive Operation" step 155*b*, as an alternative to the "Receive Sound" step 98*a*.

As an alternative to the "Analyze Sound" step 104, the received user action is compared, as part of a "Compare Operation" step 156 with the corresponding symbol (such as note or chord) that was displayed to the user 36 as part of the "Display Next Symbol" step 96. Similarly, as an alternative to the "Correct Sound ?" step 99, as part of a "Correct Action" step 157, the received user action is determined to be correct is it corresponds to the displayed symbol.

Any music file herein, such as the files 87*d* in the table 89 or the files 87*d* in the table 89*a*, may be according to an industry standard format. In one example, these files may be according to, or based on, MusicXML standard, such as MusicXML 3.1 version, which is an XML-based file format for representing Western musical notation, developed by, and available from, the W3C Music Notation Community Group and released in December 2017. The MusicXML standard is designed for sharing sheet music files between applications, and for archiving sheet music files for use in the future.

Alternatively or in addition, any music file herein, such as the files 87*d* in the table 89 or the files 87*d* in the table 89*a*, may be according to, or based on, ABC notation, which is a shorthand form of musical notation. In basic form it uses the letters A through G, letter notation, to represent the given notes, with other elements used to place added value on these—sharp, flat, the length of the note, key, ornamentation. This form of notation began as an ASCII character set code that could facilitate the sharing of music online and also added a new and simple language for software developers, not unlike other notations designed for ease, such as tablature and solfège. ABC notation being ASCII-based, any text editor can be used to edit the code. Even so, there are now many ABC notation software packages available that offer a wide variety of features, including the ability to read and process ABC notation into MIDI files and as standard "dotted" notation.

Alternatively or in addition, any music file herein, such as the files 87*d* in the table 89 or the files 87*d* in the table 89*a*, may be according to, or based on, DARMS File Format (also known as the Ford-Columbia Format), GP*, which is Guitar Pro sheet music and tablature file, KERN, which is Kern File Format sheet music file, LY, which is LilyPond sheet music file, Music Encoding Initiative (MEI) file format that attempts to encode all musical notations, Finale sheet music file such as MUS or MUSX, MuseScore sheet music file such as MSCX or MSCZ, Standard Music Description Language (SMDL) sheet music file, or Sibelius (SIB) sheet music file.

While the client device is exampled in the arrangement 30 as communicating with the server device 23*a* via a wireless network 39 using the wireless transceiver 28 and the antenna 29, a wired communication may be equally used as an alternative or in addition to the wireless connectivity. In wired communication, the antenna 29 is replaced with a connector and the wireless transceiver 28 is replaced with a wired transceiver. The wires communication may use any wired network medium such as a single wire or two wires, and may comprise a Shielded Twisted Pair (STP) or an Unshielded Twisted Pair (UTP). Alternatively or in addition, the network medium may comprise a LAN cable that may be based on, or may be substantially according to, EIT/TIA-568 or EIA/TIA-570 standard, and may comprise UTP or STP twisted-pairs, and the connector may be an RJ-45 type connector. Alternatively or in addition, the network medium may comprise an optical cable and the connector may be an optical connector, and the optical cable may comprises, may use, or may be based on, Plastic Optical Fibers (POF). Alternatively or in addition, the network medium may comprise or may use a DC power carrying wires connected to a vehicle battery.

Any wired network herein may be a Personal Area Network (PAN), any connector herein may be a PAN connector, and any wired transceiver herein may be a PAN transceiver. Alternatively or in addition, any wired network herein may be a Local Area Network (LAN) that may be Ethernet-based, ant connector herein may be a LAN connector, and any transceiver herein may be a LAN transceiver. The LAN may be according to, may be compatible with, or may be based on, IEEE 802.3-2008 standard. Alternatively or in addition, the LAN may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T; and the LAN connector may be an RJ-45 type connector. Alternatively or in addition, the LAN may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and the LAN connector may be a fiber-optic connector. Alternatively or in addition, any network herein may be a packet-based or switched-based Wide Area Network (WAN), any connector herein may be a WAN connector, and any transceiver herein may be a WAN transceiver. Alternatively or in addition, any wired network herein may be according to, may be compatible with, or may be based on, a Serial Peripheral Interface (SPI) bus or Inter-Integrated Circuit ($I^2C$) bus.

Any method herein may be in combination with an Augmented Reality (AR) system that may simulate a virtual environment to the person. For example, the display 81 of the client device 35 may be implemented, as an alternative or as addition to the display 81 described herein, as an Head-Mounted Display (HMD) that may be worn on the forehead, such as a harness or helmet-mounted, as a device resembling eyeglasses, as a Head-Up Display (HUD) that is a transparent display that presents data without requiring users to look away from their usual viewpoints, as contact lenses, as Virtual Retinal Display (VRD) that is a personal display device where a display is scanned directly onto the retina of a viewer's eye, or as part of a Spatial Augmented Reality (SAR) that augments real-world objects and scenes, without the use of special displays such as monitors, head-mounted displays or hand-held devices.

The interaction or notification with the user 36 is described herein using visual displaying by the display 81, such as in the "Display Next Symbol" step 96, as part of the "Display Error" step 96*a*, as part of the "Display Feedback" step 96*b*, and alternatively or in addition by using audible sounding by the sounder 78, such as in the "Vocalize Instruction" step 114 or Vocalize Feedback" step 114*a*. Alternatively or in addition to the visual or audible (or both) notifications to the user 36, a haptic notification may be used. The haptic notification may use, or may be based on, cutaneous, kinaesthetic, orhaptic technologies. The haptic notification may be based on vibrations, that may be produced by an Eccentric Rotating Mass (ERM) actuator, a Linear Resonant Actuator (LRA), piezoelectric actuators, an unbalanced motor, a loudspeaker, an ultrasound transducer, or an air vortex ring.

A human speech herein may be produced using a hardware, software, or any combination thereof, of a speech synthesizer, which may be Text-To-Speech (TTS) based. The speech synthesizer may be a concatenative type, using unit selection, diphone synthesis, or domain-specific synthesis. Alternatively or in addition, the speech synthesizer may be a formant type, and may be based on articulatory synthesis or Hidden Markov Models (HMM) based. Further, any speech synthesizer herein may be based on, or may use, any of the schemes, techniques, technologies, or arrangements described in the book entitled: "*Development in Speech Synthesis*", by Mark Tatham and Katherine Morton, published 2005 by John Wiley & Sons Ltd., ISBN: 0-470-85538-X, in the book entitled: "*Speech Synthesis and Recognition*" by John Holmes and Wendy Holmes, 2nd Edition, published 2001 ISBN: 0-7484-0856-8, in the book entitled: "*Techniques and Challenges in Speech Synthesis—Final Report*" by David Ferris [ELEC4840B] published Apr. 11, 2016, or in the book entitled: "*Text-to-Speech Synthesis*" by Paul Taylor [ISBN 978-0-521-89927-7] published 2009 by Cambridge University Press, which are all incorporated in their entirety for all purposes as if fully set forth herein.

Any device, component, or apparatus herein, may be used with, integrated with, or used in combination with, a Virtual Reality (VR) system that simulates a virtual environment to a person. The communication with the VR system may be wired or wireless, and the VR system may comprise a Head-Mounted Display (HMD). The simulated virtual environment.

Any apparatus herein, which may be any of the systems, devices, modules, or functionalities described herein, may be integrated with a smartphone or a tablet. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

While any client device herein, such as the client device 35, is described herein as being separate and distinct device from any musical instrument herein, such as the piano 83, they may equally be integrated with each other. The integration of a client device with a musical instrument may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

Any device herein, such as each of the servers 23*a* and 23*b*, may consists of, may be part of, may comprises, or may be integrated with a server, and may be storing, operating, or using, a server operating system that may consist of, may comprise, or may be based on, one out of Microsoft Windows Server®, Linux, or UNIX. Alternatively or in addition, the server operating system may consist of, may comprise, or may be based on, one out of Microsoft Windows Server® 2003 R2, 2008, 2008 R2, 2012, or 2012 R2 variant, Linux™ or GNU/Linux-based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, Open BSD, and NetBSD®.

The device 35, or any other device or apparatus herein, may be a client device that may typically function as a client in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), Android version 6.0 (Marshmallow), Android version 7.0 (Nougat), Android version 8.0 (Oreo), Android version 9.0 (Pie), Android 10, Android 11, iOS (available from Apple Inc., and includes variants such as versions 3-7), Apple iOS version 8, Apple iOS version 9, Apple iOS version 10, Apple iOS version 11, Apple iOS version 12, Apple iOS version 13, Apple iOS version 14, Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as a server, may equally function as a server in the meaning of client/server architecture. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

The device 35, or any other client device or apparatus herein, may be housed in a single enclosure that is a hand-held enclosure, a portable enclosure, or a surface mountable enclosure. Further, the device 35, or any other client device or apparatus herein, may consist of, may comprise, may be part of, or may be integrated with, a notebook computer, a laptop computer, a media player, a cellular telephone, a tablet device, or a smartphone, such as a smartphone that consists of, comprises, or is based on, an Apple iPhone 12 or a Samsung Galaxy S20.

Any device, component, or apparatus herein, such as the device 35 or any other client device or apparatus herein, may be structured as, may be shaped or configured to serve as, or may be integrated with, a wearable device. For example, any apparatus or device herein may be wearable on an organ such as on the person head, and the organ may be eye, ear, face, cheek, nose, mouth, lip, forehead, or chin. Alternatively or in addition, any apparatus or device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any enclosure herein may be permanently or releasably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top. Existing methods and systems provide an application executed by a computing platform or computing device such as a mobile phone, smart phone, tablet, a laptop, a desktop computer, or the like. The application enables a user to choose a piece of music and level from a selection of musical pieces and playing levels.

Background music (BGM) (also: audio playback) provided by the application may then be played through one or more speakers associated with the device or external thereto, and the user can play and/or sing along with the BGM, which provides the user with an improved music experience. The sound generated by the user through playing an instrument and/or singing may herein also be referred to as "user-generated sound". The user-generated sound combined with, for example, the BGM, sound generated by other users playing an instrument and/or signing, and/or environment noises, may herein be referred to as "composite sound".

The user may also be provided with presented notes, tabs or other musical notations displayed on a display device such as a display associated with the computing platform. The accompanying BGM is played via one or more of the device speakers, external speakers, headphones, and/or even via another device.

As the user plays along with the BGM, the audio may be captured by the device through one or more microphones, wherein the used microphone(s) can also be internal or external to the device. The method and system can monitor the sound and provide feedback to the user regarding the user's playing, including for example indicating playing errors, suggesting a higher or lower playing level, lowering the volume of the BGM, or the like.

The system and method may have additional capabilities such as supporting jam sessions in which other users also play, wherein the other users are at the same location or at other locations from the user. In further embodiments, the user can hear the playing of other users synthesized as expected, rather than as played, such that the user is not influenced by others' errors, and wherein each player can play in accordance with his own schedule. The general operation of the system is detailed in association with FIG. 25 below.

However, existing methods and systems have a number of drawbacks. One such drawback relates to the deficient performance of such methods and systems due to sub-optimal usage of the available I/O devices.

Currently available devices such as but not limited to smartphones, comprise a plurality of I/O devices, such as one or more microphones and one or more speakers. Some devices may comprise three microphones, located for example on the bottom, upper front, and/or upper back of the device, and three speakers, one on the top and two at the bottom of the device. The plurality of I/O devices are generally required for the various operation modes and algorithms executed by the device, such as handset or speaker modes, video capture, noise reduction, echo cancellation, keyword triggering, or the like.

The exact characteristics of the speakers and the microphones including location, direction, frequency response, delayed playback, bandpass filters, polar pattern, sound enhancements, and/or recording may be unknown or undocumented, and can change even with different hardware suppliers or operating system updates. Additionally, the hardware itself can be blocked due to the device placement, malfunction due to hardware issues, cases, dirt, or the like.

By using a sub-optimal set of I/O devices the system and method can offer only deficient user experience, such as poor balance, incorrect detection of playing errors including false negative (missing playing errors) or false positives (identifying correctly played notes as erroneous), or the like, which may result in the user being frustrated and not completing tasks such as playing selected pieces.

Thus, in accordance with some embodiments of the disclosure, there is provided a method and system for selecting and configuring the I/O devices for playing sound to the user and receiving sound from the user, in accordance with the I/O device availability, acoustic environment, supported and used algorithms, or the like. Further consideration may include the possible device combination options. For example, in the iOS operating system, an application can access only one microphone at a time, and in order to produce spatial audio the upper speaker can be played together with one of the lower speakers, wherein the selected one depends on the device position.

The I/O device selection may be performed towards the specific target of optimizing the user's experience. This target may require separation of the user's playing from the rest of the captured audio including BGM, other users and external noises, recognizing the user's playing, enhancing the BGM and the other users if exist, and selecting and configuring the I/O devices according to any of the above. High quality separation may be required for enabling improved recognition of the user's playing, i.e., transcribing the played notes or chords. The separation may be enabled, among others, because the system and method have prior knowledge about the played BGM (and the sound or expected sound of other users), and because the BGM and other sounds are musical interfering signals rather than a random (e.g., spectrally homogenous) signal.

Once the sound is separated, updated enhancement of the BGM and updated I/O device selection may be performed, resulting in improved recognition, sound experience, and hence better user experience and satisfaction, which may be expressed in improved success in completing playing tasks, providing a high rating of the application, recommending the application to friends, or the like.

For example, if the BGM is of significantly lower volume or sound intensity than the music played by the user, or in different frequencies, separation is quite straightforward. However, in many situations there is overlap or similarity in the volume, sound intensity and/or frequencies. Additional sound may also be present which may include, or be affected by the environmental noise, the location and orientation of the device wherein certain speakers or microphones can be blocked or capture external noises, the user's playing capabilities, the used music instrument, or the like.

The I/O device selection can take into account many factors, including the model of the used device, the specific device configuration, the possible I/O device combinations, the played piece, the level, and others. For example, in iPhone 12 devices, the upper front microphone is located next to the upper speaker. Thus, for sound-to-noise ratio (SNR) reasons, it may be preferable to select the back microphone rather than the front one, and play BGM via the lower speaker. However, if the device has a cover which is close to the surface, the back microphone might be blocked, in which case it may be preferable to play the BGM from the upper speaker and use the microphone on the lower side, or the other way around, i.e., play from the lower speaker and use the front upper microphone. In another example, in devices including iPhone 12 devices, the device's internal audio processing makes the device play through the upper and lower speakers simultaneously. The signal played by the top speakers may saturate the upper microphone, therefore the lower microphone may be preferred. In another example, the upper speaker may not be suitable as the main playback speaker as it distorts the audio when driven at high amplitudes. In yet another example, the back microphone is empirically shown to provide better results.

It will be appreciated that the I/O device selection can vary over time as the user plays within the same session or in different sessions, depending on the recognition engine and results, the played BGM, the environmental noises, device orientation relative to the one or more players, and more.

In some embodiments, one or more audio processing algorithms can be applied to any components of the separated sound, such as volume reduction and/or compressing certain frequencies from the BGM and other external digitally produced sounds, which that can interfere with the user's expected playing.

A typical scenario in a music teaching application in accordance with the disclosure may thus be described as follows: a user may select an instrument to play, such as a guitar or a piano and a piece to play. The BGM may be played via one or more speakers, wherein the music, including the BGM and what the user is playing is recorded via one or more of the microphones. The selected speakers and microphones may be based on the available I/O devices, the position of the device within a room, room acoustics, the position of the device relative to the player, and possibly additional factors. The I/O devices are selected to yield an input for the separation and recognition process, such that the user's playing can be recognized and monitored, while maintaining a user experience that meets at least one sound quality criterion, for example, by silencing the BGM as little as possible, eliminating recognition interference, providing high Signal to Noise (SNR) ratio, thus enabling a user to play and recognize accurately, complete stages, etc.

The I/O device selection may be updated intra-session or inter-session to provide good separation and thus good recognition and feedback, as well as good quality BGM which improves the user experience, e.g., as defined by the at least one sound quality criterion. The separation and recognition may be performed using hardware and/or software audio processing algorithms such as echo cancellation, internal device acoustic echo cancellation (AEC), sound compression, source separation, and/or the like. Following recognition of the user's playing, the user may be provided with feedback indicating how well he played the expected notes or chords.

In some embodiments, additional sensors (inertial and/or non-inertial) may be used, such as cameras, linear acceleration sensors, angular acceleration sensors, gyroscopes, in order to identify a position and/or orientation of the device, the distance from the user and from the musical instrument, the type of music instrument being played by the player or players, and/or the like. In some embodiments, recognition may be performed by fusing visual and audio sources. For example, the back camera can identify that some obstacle covers a microphone.

The disclosed system and method thus provide for selecting and configuring the input devices through which a user learning to play is captured, and the output devices to be used for playing to the user the BGM and other roles of the arrangement in which the user is participating. The selections and configurations are such that on one hand separating the user's sound from the BGM, other users and background noise is better than in other selections or configurations, thereby providing for better monitoring of the user's playing. Furthermore, the selections or configurations improve the user's experience, in terms for example of the balance, interference, and other sound quality parameters, relative to other selections or configurations.

Figure 25:
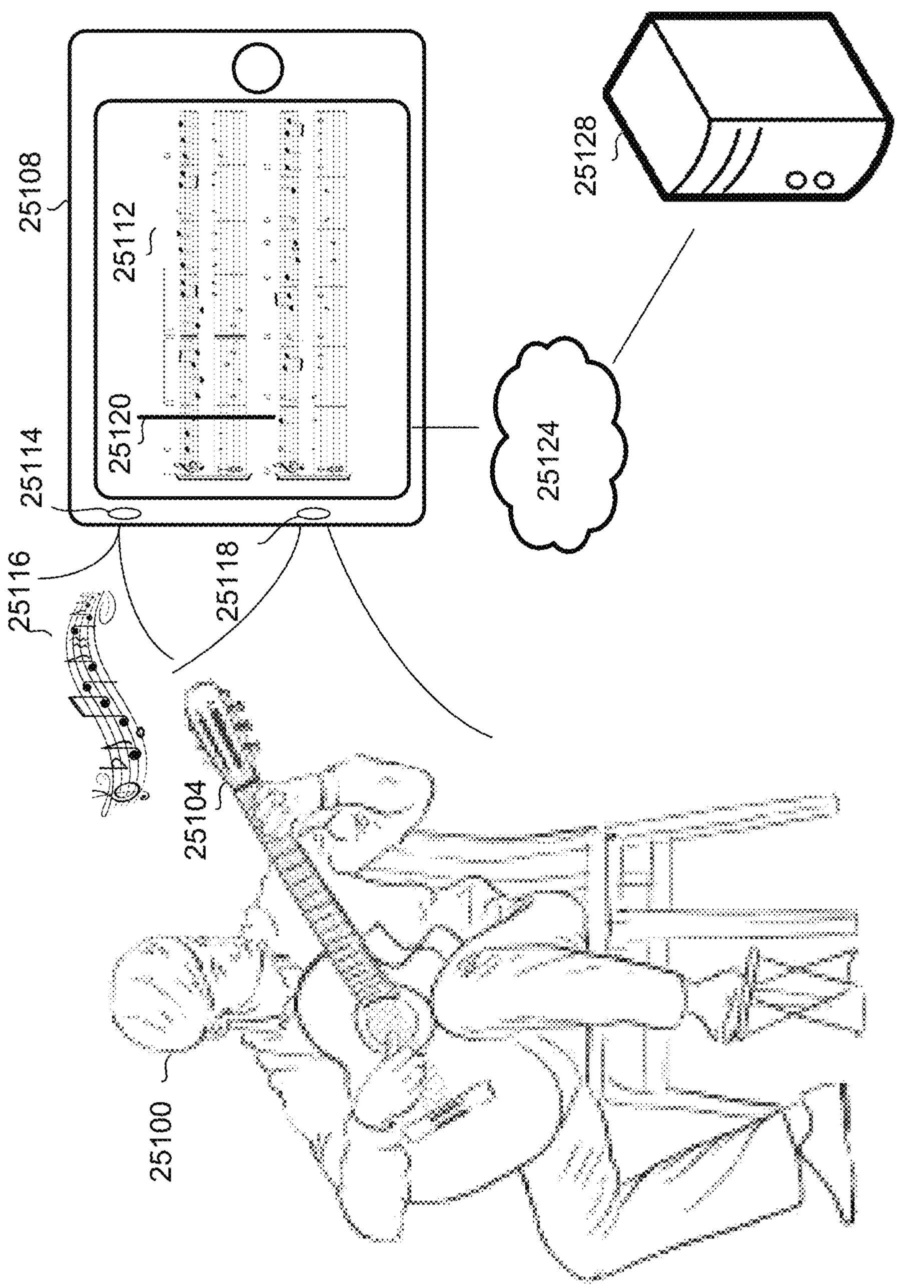
FIG. 25 is a schematic illustration of a user and the entities involved in a music learning system, in accordance with some embodiments of the disclosure.

Reference is now made to FIG. 25. A user 25100 is learning to play guitar 25104. User 25100 may activate an application installed on or executed by device 25108. Device 25108 may be a tablet computer, smart phone, a mobile phone, a desktop computer, a laptop computer or the like. User 25100 may select a song or another piece to learn, and optionally a difficulty level or player level.

User 25100 is then provided with musical instructions such as notes 25112 of the selected piece, and sound 25116 containing the BGM for the selected piece is played through one or more speakers of device 25108 such as speaker 25114, or another device such as earphones, external speaker, or the like. Musical instructions may also pertain to expression and/or temp including, for example, "accelerando", "adagio", "crescendo", "piano", "pizzicato", etc. Optionally, the roles of other users playing in the arrangement of the selected piece may also be played by the selected speaker. In some embodiments, the roles are played by the other users, while in other embodiments, sound 25116 comprises the expected roles of the other users. As the BGM is played, cursor 25120 may be displayed, showing user 25100 the current note to be played.

The user's playing, as well as the sound 25116 and optionally additional sound, such as environmental noises, are captured by one or more microphones of device 25108 such as microphone 25118 and/or external microphones, to generate processable audio-data for analysis.

In some embodiments, device 25108 may execute a standalone application, in which the BGM is obtained and provided by the application, and analysis of the user's playing is also performed by the application. In other embodiments, the application may be a client application, communicating with a corresponding server application. In this configuration, device 25108 may be in wired or wireless communication with server 25128, through channel 25124, such as the Internet, intranet, LAN, WAN, 5G, or the like. In such case, the music offering, the BGM generation and the analysis may be performed by either the client application, the server application, or a combination thereof. It will be appreciated that if further users are playing, device 25108 needs to be connected to a server or to another client application in order to communicate with the device used by the other user.

When user 25100 has finished playing the piece, user 25100 may be presented with the analysis results, comprising for example playing errors, general comments, music type or level change recommendations, or the like.

Figure 26:
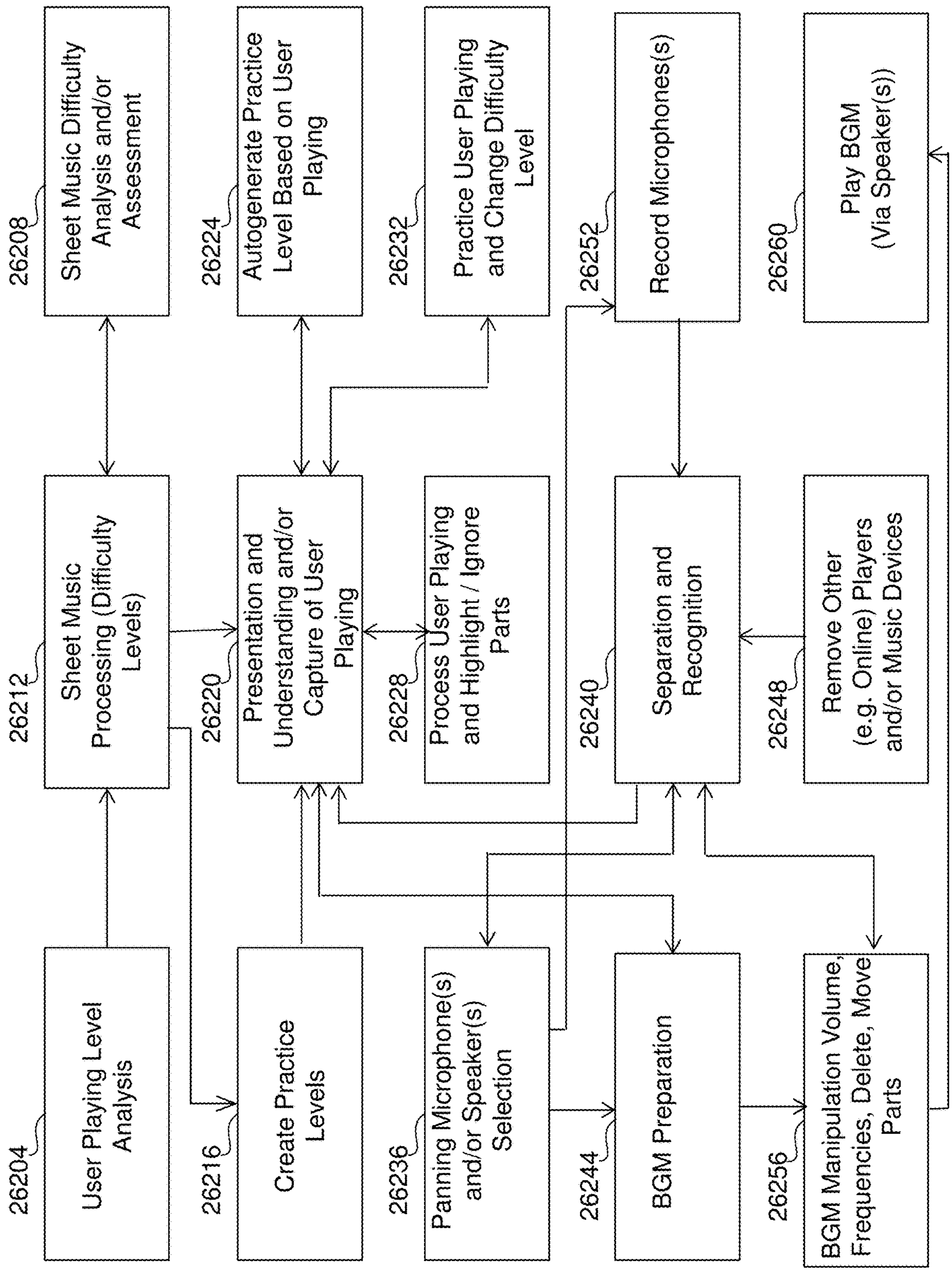
FIG. 26 is a flowchart of steps in a method for teaching playing a musical instrument, in accordance with some embodiments of the disclosure.

Referring now to FIG. 26, showing a flowchart of steps in a method for teaching playing a musical instrument, in accordance with some embodiments of the disclosure. The flowchart depicts the steps taken by an application or program since a user starts the application or program and selects a piece to play, wherein the process may be tailor-made to the user's selections, specific musical instrument and/or abilities.

Step 26204 ("USER PLAYING LEVEL ANALYSIS") may for example include: the user's playing level may be estimated. Estimation may be performed, for example, by letting the user select a level, by asking the user to play a piece, assessing the user's performance and presenting the user with more and more difficult pieces until his performance is below a certain threshold, for example he has more than a predetermined number of errors per minute on average. Further estimation may be performed by retrieving estimation results or playing results of previous sessions, by the user's answers to theoretical questions related to notes, chords, technique, rhythm, or the like. The estimation may also be based on artificial Intelligence (AI) techniques, such as Neural Networks (NN) used for assessing the user's level by comparison to known levels of other users.

Step 26208 ("Sheet music difficulty analysis and/or assessment") may for example include: the difficulty level of the piece the user selected may be assessed, based for example on scoring various features of the piece or the arrangement, including note or chords, rhythm, transition complexity, tempo, and more. The difficulty level may include an average, minimum or maximum difficulty level, and optionally other statistical variants of the arrangement of the piece.

Step 26212 ("SHEET MUSIC PROCESSING (DIFFICULTY LEVELS)") may for example include: a music sheet of an arrangement of the selected piece may be generated or retrieved in accordance with the appropriate difficulty level and the user's playing level. If no assessment of the user's level is available, a default level may be assumed. The arrangement may be generated human generated or based on rules, crowdsourcing, AI techniques using engines trained upon labeled multi-level music pieces, or the like. The music sheet may also be retrieved form a database comprising existing arrangements, or generated by a combination of the above (e.g., retrieving automatically creating an arrangement followed by human or crowd review or improvement), or the like. When a new arrangement has been created, it may be stored for future users, thus enriching a library of arrangements of various difficulty levels. Step 26212 may thus provide an arrangement that fits the user's selections and level.

Step 26216 ("CREATE PRACTICE LEVELS") may for example include: practice sessions may be generated based on the arrangement and difficulty level, comprising for example scraps of the arrangement, possibly of higher or lower difficulty levels. The practice sessions may be based on learning from previously created music sheets of the relevant levels, by offering higher difficulty sequences relevant to the arrangement, by learning where other users fail at that difficulty level and suggesting them as practice, or the like. The practice sessions may be manually arranged by a musician and/or crowd sourcing. In some examples, the practice sessions may be automatically created using, for example, an artificial intelligence functionality. The practice sessions can also include educational videos, such as offline or live on-demand with human teachers, rhythm training, learning of new notes or chords, or the like. The practice sessions may also include automatically generated teaching videos.

Step 26220 ("Presentation & Understanding and/or Capture of User playing") may for example include: the music sheet of the appropriate difficulty level may be presented to the user, and the user's playing may be captured. The presentation may take one or more forms, such as visual user interface, voice instructions, augmented reality, or the like.

The user may be playing alone or in a jam session together with others, with or without the BGM. For example, if the user plays the piano, the BGM may include drums, guitar, trumpet, bass, or vocals.

While the user is playing the displayed notes or chords, recognition quality results and scores may be generated, presented online, and stored, based on processing the user playing, suppressing background music and output recognition and progress results.

Step 26252 ("RECORD MICROPHONE(S)") may for example include: the sound, including the user's playing, the played BGM, environmental noises and optionally playing by other users, may be recorded by the selected microphone (s), and provided to recognition and separation step 26240.

Step 26240 ("SEPARATION AND RECOGNITION") may for example include: while the user plays, the sound information other than the user playing may be extracted from the received (e.g., captured and recorded) sound information, such that the component of the user's playing may be recognized, e.g., for the purpose of recognition and comparing with one or more corresponding notations.

Non-limiting examples of notations may include any visual expression of music being or to be played such as notes, chords, tabs, rhythm notations, color indications, scores, illustrations, figures of merit (also: scores), text, and/or the like. The notations may be descriptive of note pitch, length, note value, chords, key, tempo, instrumentation, and/or any other relevant music score information. In addition to the recognition results, recognition score may be determined, such as a numerical value or a verbal score, for example recognition OK, no recognition, error, unknown, probabilistic measure, compare to expected note(s), chord(s) or other music expressions instructions, and ignore (for repeated error). In some embodiments, a probabilistic measure, or a comparison to expected note(s) may be output. Segments or sequences in which the recognition is poor may be collected over time and saved for future practice. The term segment or sequence may relate to any issue with the user's performance, including a sequence of notes, tempo, rhythm, technique, notes, chords, transitions, or the like.

The separation and recognition results may be used on step 26228, wherein some parts of the displayed music sheet may be highlighted, for example parts in which the user needs to improve, while other parts may be left as is or just ignored. As the user practices and improves, the labeling of the segments or sequences may be changed indicating the user's progress, thus also providing the user with a sense of improvement and good experience.

Step 26232 ("Practice User Playing and Change Difficulty Level") may for example include: the user level estimation may be updated. For example, if the user plays the arrangement well, it may be assumed that the arrangement is easy, and vice versa. The difficulty level of the music sheet presented to the user on step 26220 may then be changed accordingly.

Step 26236 ("Panning microphone(s) and/or Speaker(s) selection") may for example include: the microphones and speakers to be used during the session may be selected, in order to obtain a combination that yields the best experience for the user including hearing well the background music, while enabling the system to separate well the user's playing from the total recorded sound, thus providing for high quality recognition and monitoring of the user's playing. The I/O devices and their configurations are selected and may be altered online to maximize performance. The selection of the I/O devices may also influence the BGM preparation. The I/O device selection and uses thereof are further detailed in association with FIG. 27 below.

Step 26244 ("BGM Preparation") may for example include: the BGM may be enhanced, for example in accordance with the difficulty level. Generally, a lower difficulty level implies a need for more concrete BGM, or in other words BGM that is closer to the tune, in order to compensate for the basic level of the music as played by the user.

Step 26256 ("BGM Manipulation Volume, frequencies, Delete/move parts") may for example include: the BGM may be manipulated by performing additional signal processing on the BGM, for example changing the volume, applying filters such as high or low pass filters, repeating or deleting parts in accordance with the user's playing, removal of frequencies expected in the user-generated sound, or the like.

Step 26240 ("SEPARATION AND RECOGNITION") may for example include: playing the BGM and monitoring the user's playing may receive the output of BGM manipulation step 26256.

In some examples, steps 26232, 26244 and 26256 may be performed continuously or periodically based in real time or near real time on the recognition and the separation assessment in real-time.

Step 26248 ("Remove other (e.g., online) players and/or music devices) may for example include: when the user is playing in a jam session with other users, whether present in the same location or heard through a speaker, the audio of the other users playing may also be suppressed or removed from the captured audio, using the knowledge about what the other users are expected to be playing.

Step 26260 ("Play BGM (via Speakers)") may for example include: the BGM as enhanced and updated on steps 26244 and 26256, respectively, may be played through the selected speakers.

Step 26224 ("Autogenerate Practice Level Based on User playing") may for example include: once the user has finished playing, the user may be presented with the analysis score(s), and suggested to take a personalized new practice session that is based on the user's performance in playing the presented music sheet, and the obstacles the user faced while playing. If the user wishes to play the music sheet again, a new music sheet may be created upon the playing performance with the adequate difficulty level arrangement.

The following is an example pseudocode implementation of the diagram shown in FIG. 26.

1. Initialization
   - Get device type
   - Get information on known default settings for that device
   - Load previous known settings for the user
   - If ((Device is the same as in setting) AND (Device orientation the same) AND (Device playing scenario is the same)) then
     - Skip initialization
   - Else // Initializing
     - If (exist default setting for device)
     - Load default settings according to orientation
     - Else
     - Set random or initial guess based on other devices configuration settings
2. Set Configuration based on initialization process
3. Predict configuration based on video, sound, static or moving mode with no BGM
   - When sound is played—instructions/video—find a preferred combination of microphone/speaker and/or settings for example, by employing a search & testing method (e.g., round robin manner)
   - Check the residuals after using BGM suppression algorithm
   - In static or moving mode without BGM—find the best microphone to pick the sound and check that all relevant frequencies can be heard
   - Integrate both checks—into a pair of microphone and speaker that yields "best" expected separation for this configuration (device, position, speaker, microphone, musical device, etc.)

Figure 27:
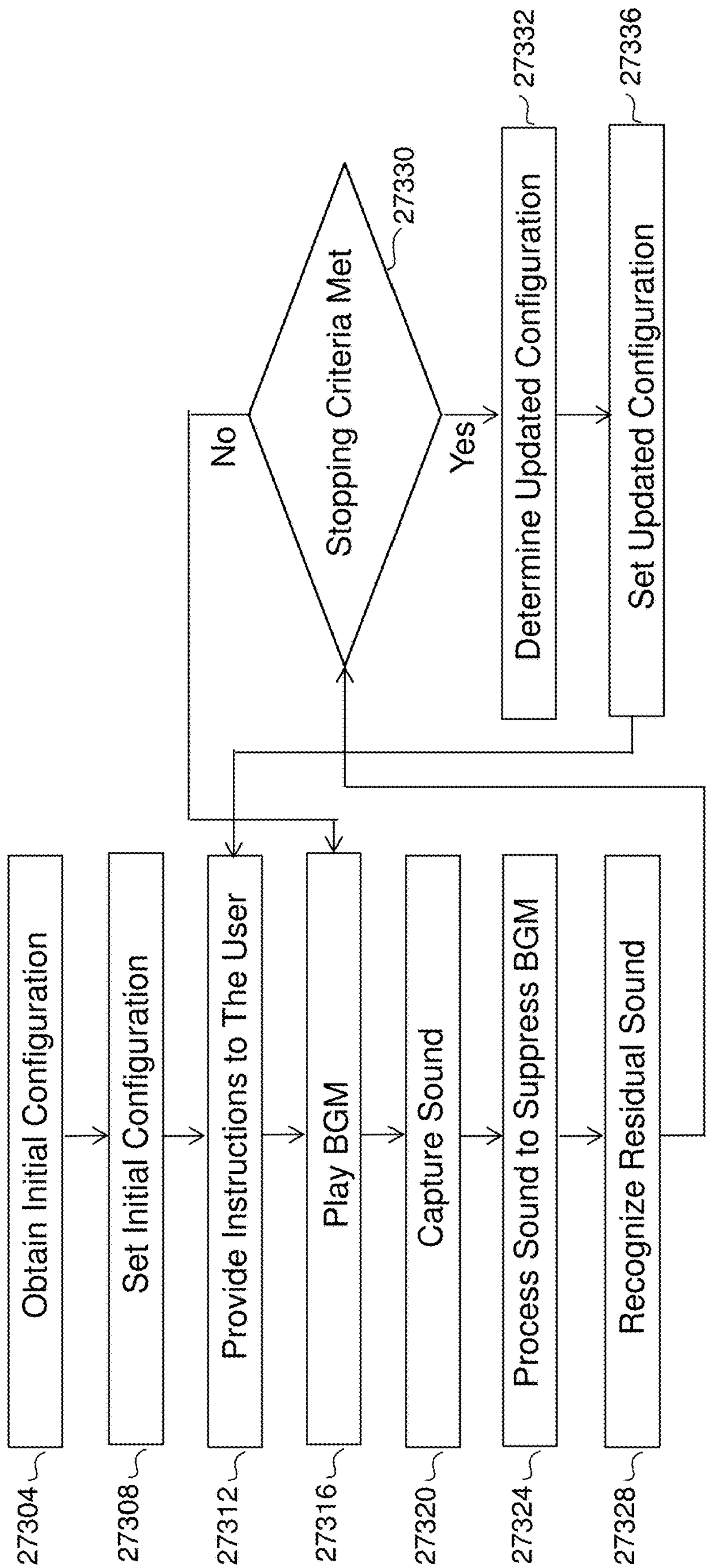
FIG. 27 is a flowchart of steps in a method for selecting and configuring I/O devices to be used when teaching a user to play, in accordance with some embodiments of the disclosure.

Referring now to FIG. 27 showing a flowchart of steps in a method for selecting and configuring I/O devices to be used when teaching a user to play, in accordance with some embodiments of the disclosure. The method may be used when the user is using the application or program for learning to play a musical instrument, optionally with BGM and further optionally with other users in a jam session.

Step 27304 ("OBTAIN INITIAL CONFIGURATION") may for example include: initial configuration and settings may be obtained, obtaining an initial configuration including selection of at least one speaker and at least one microphone of a computerized device used by the user. Step 304 may further include preparing manipulation of the BGM, such as volume, frequency filtering, deletion or shifting of notes, or the like.

Step 27308 ("SET INITIAL CONFIGURATION") may for example include: the initial configuration and settings may be applied, e.g., by setting a first parameter of the at least one speaker or the at least one microphone in accordance with the initial configuration, or setting the manipulation of the BGM as prepared on step 27304.

Step 27312 ("PROVIDE INSTRUCTIONS TO USER") may for example include: an application used by the user may provide to the user music expressions instructions to be played, for example by displaying notes or chords over a display device associated with the computing platform executing the application.

Step 27316 ("PLAY BGM") may for example include: the application may further play the manipulated BGM of a piece selected by the user through the at least one speaker configured in accordance with the initial configuration.

Step 27320 ("CAPTURE SOUND") may for example include: capturing sound including the user playing, and optionally the BGM, other users and/or ambient noise may be captured through the at least one microphone.

Step 27324 ("PROCESS SOUND TO SUPPRESS BGM") may for example include: the captured sound may be processed, using for example signal processing algorithms, to suppress the BGM and optionally other users or background noise, to generate (e.g., filter out) a residual signal that is mainly or solely descriptive of the user-generated sound. In other words the residual signal pertains a core signal or signal of interest based on which, for example, a feedback is provided to the user, e.g., in real-time when playing an instrument and/or when singing.

Step 27328 ("RECOGNIZE RESIDUAL SOUND") may for example include: the residual sound may be recognized to transcribe notes, chords or other music expressions instructions played by the user.

If or when a stopping criteria is met (step 27330), for example the recognition results, or other parameter such as the sound quality of the captured sound, the BGM, the user's sound, success of the user in completing playing tasks or others is below a threshold, then the following steps may be taken:

Step 27332 ("Determine Updated Configuration") may for example include: an updated configuration and setting comprising an updated selection of the at least one speaker and at least one microphone may be determined, in accordance with the recognition results, and the sound quality; and manipulation of the BGM. such as updating the volume, filtering frequencies, deletion or shifting of notes, etc.

Step 27336 ("SET UPDATED CONFIGURATION") may for example include: the updated configuration and settings may be applied, by setting a second parameter of the at least one speaker or the at least one microphone in accordance with the updated configuration and manipulation of the BGM, thereby improving the recognition results. Applying the updated configuration and setting may also improve the sound quality of the captured sound, the BGM, the user's sound or the like. In some embodiments, determining and updating the configuration may be performed without checking the stopping criteria, regardless of whether it is met or not.

Figure 28:
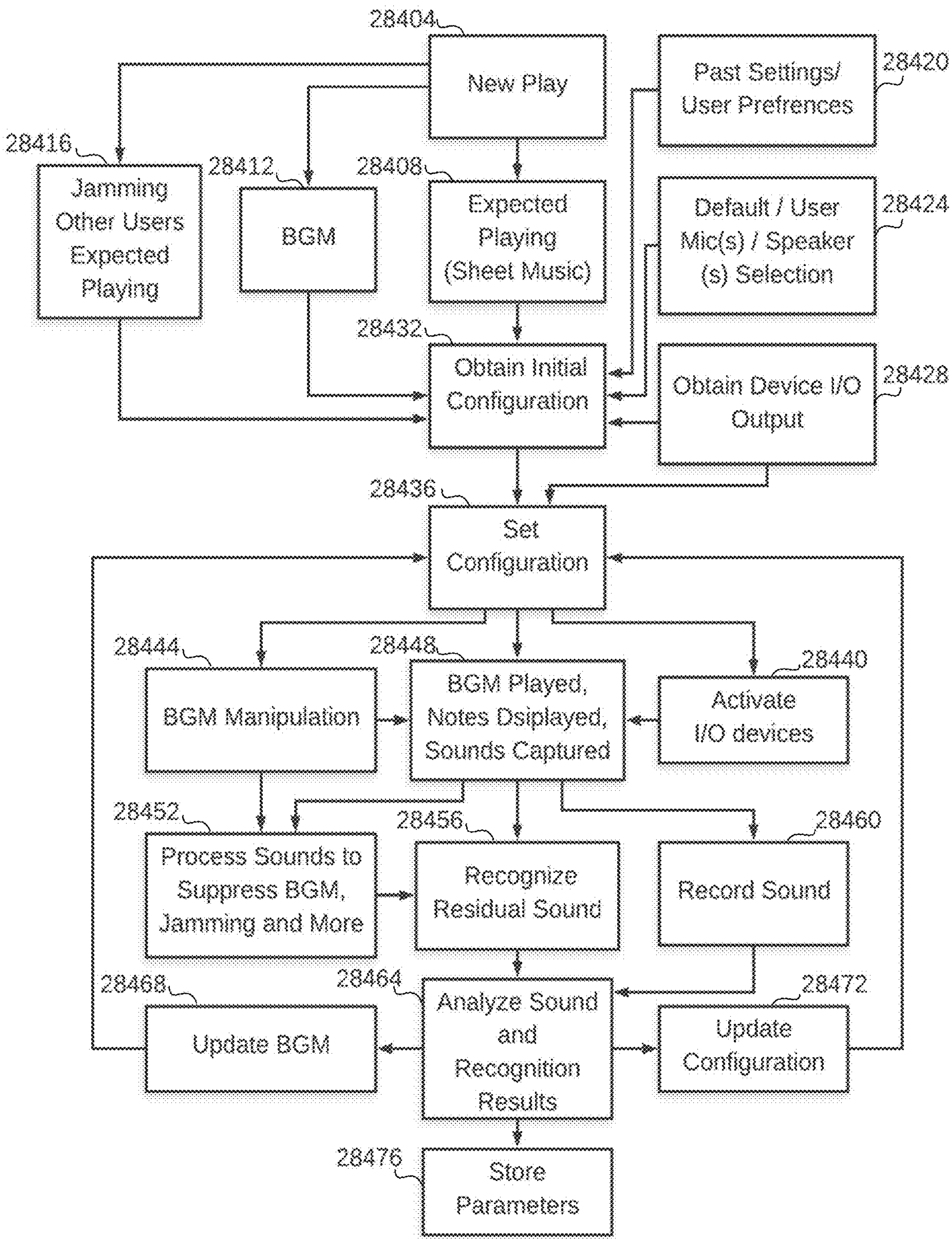
FIG. 28 is a detailed flowchart of steps in a method for selecting and configuring I/O devices to be used when teaching a user to play, in accordance with some embodiments of the disclosure.

Referring now to FIG. 28, showing a detailed flowchart of steps in a method for selecting and configuring I/O devices to be used when teaching a user to play, in accordance with some embodiments of the disclosure.

Step 28404 ("NEW PLAY") may for example include: the user may initiate a new playing session, and indicate a piece he wishes to play.

Step 28408 ("Expected playing (e.g., sheet music)") may for example include: a music sheet of an arrangement to be played by the user may be obtained, for example retrieved from a database, composed by an artificial intelligence engine and optionally enhanced by a human or by crowd-sourcing, or the like.

Step 28412 ("BGM") may for example include: the BGM to be played with the arrangements may be obtained similar to the music sheet, comprising for example music by drums or other instruments, singing, or the like.

Step 28416 ("Jamming other users expected playing") may for example include: music sheets to be played by other users participating in a jam session with the user may be obtained as above.

Steps 28420 ("Past settings/user preferences"), 28424 ("Default/user mic(s)/speaker(s) selection") and 28428 ("Obtain Device I/O output") may for example include: information may be obtained, which may contain data relevant for selecting and configuring the I/O devices. The information may be obtained from a storage device associated with the computing platform used by the user, from a remote database accessible to the computing platform, provided by the user, or the like.

Step 28420 ("Past settings/user preferences") may for example include: information regarding the user's past performance and preferences in playing notes or chords, sequences, or other techniques. The information may be collected during past sessions in which the user played.

Step 28424 ("Default/user mic(s)/speaker(s) selection") may for example include: information regarding past or default settings and selections related to the I/O devices selected by or for the user may be obtained.

Step 28428 ("Obtain Device I/O output") may for example include: input may be received from sensors associated with the device, such as cameras, gyros, or others, which may provide information useful for determining the device current situation, such as position and/or orientation, whether an I/O device is blocked, what is the environment of the user (for example indoor/outdoor), whether the device is stably located or not, how noisy the environment is, or the like.

In some examples, information gathered on one or more of the above steps, e.g., 28408, 28412, 28416, 28420, 28424 or 28428 may be gathered and used on initial configuration and settings obtaining step 28432 ("Obtain initial configuration"). Obtaining may relate to computing the configuration by taking into account past configurations, and updating them in accordance with the music sheet and the additional audio, such as the BGM and the other users, and further enhancing in accordance with data obtained from additional sensors which may provide information on the status of the device, the user, and availability of the I/O devices.

In some embodiments, obtaining may relate to retrieving the configuration from a storage device, receiving the configuration over a communication channel, or the like.

It will be appreciated that additional factors may also be considered in determining the initial configuration and settings, such as feasible and infeasible I/O device combinations.

Step 28436 ("Set configuration") may for example include: the initial configuration and settings may be applied, e.g., the relevant I/O devices may be set with the selected settings, comprising setting at least one parameter of a selected speaker or a selected microphone in accordance with the obtained configuration.

Step 28440 ("Activate I/O devices") may for example include: one or more I/O devices may be activated, for example, in accordance with the initial settings and configurations applied in step 28436.

Step 28444 ("BGM Manipulation") may for example include: the BGM may be manipulated in accordance with the I/O device selection and configuration. For example, a speaker playing the BGM may be set with the correct volume level, certain frequencies may be compressed, the BGM may be shifted in time to comply with the user's pace, or the like. Since, as detailed below the sound is to be separated and the user's playing is to be recognized, it will be appreciated that if two or more manipulation options are expected to provide the same or similar separation result, for example a result that differs from another result in no more than a predetermined threshold, the manipulation option that introduces fewer and smaller changes to the BGM may be preferred.

Step 28448 ("BGM played, notes displayed, sound captured") may for example include: optionally equivalent to step 26220 of FIG. 26, the application may display to the user notes to be played over the display device associated with the computing platform executing the application. The application may further play the BGM as manipulated and optionally play music by other users, and capture the sound comprising the user's playing, the BGM and the other user's playing.

Step 28452 ("Process sound to suppress BGM, Jamming and/or Noise") may for example include: the sound captured on step 28448 may be processed, using signal processing to suppress the BGM and the sound by other jamming users, to obtain residual sound. The suppression may be performed by multiple codec algorithms, such as Speex available from https://www.speex.org/, Opus available from https://opus-codec.org/or webrtc available from https://webrtc.org/.

Step 28456 ("Recognize residual sound") may for example include: the residual sound may be recognized, i.e., the notes or chords played by the user may be transcribed. In some embodiments, recognition may be performed on the sound as captured, as well as on the residual sound, and the results may be combined, compared, or the like. The recognition quality, which may be measured according to one or more aspects, e.g., the number or percentage of notes that were successfully recognized, may be evaluated.

Step 28460 ("Record Sound") may for example include: simultaneously with steps 28452 and 28456, the audio may be recorded.

Step 28464 ("Analyze Sound and recognition results") may for example include: the recognition quality or results, as well as the recorded audio being the combination of the BGM, the residual sound and optionally other users and background noise may be analyzed. Low recognition quality means that the system was unable to recognize correctly a sufficient number or percentage of the notes or chords played by the user, and will thus provide poor feedback to the user regarding a level of correspondence between the displayed musical notations and the user-generated sound regarding, for example, correctness of the played notes, the rhythm, the intensity, and/or the like. Therefore, it is preferred that the system is configured such that the BGM and other users' playing suppression can be performed in a satisfactory manner to enable high or sufficient quality recognition, for example by having a volume, pitch or another difference exceeding a predetermined threshold. In some embodiments, the feedback may be provided in real-time.

The expression "real-time" as used herein generally refers to the updating of information at essentially the same rate as the data is received. For example, in the context of the present disclosure, "real-time" is intended to mean that the sound is captured, processed for providing, for example, a feedback at a short enough time delay such that the feedback is provided without user-noticeable judder, latency and/or lag.

Thus, if at least one aspect of the recognition quality is below a predetermined threshold, for example the system was unable to recognize at least a predetermined number or percentage of the notes played by the user, changes may be introduced to the BGM and to the configuration on steps 28468 and 28472, respectively, as detailed below.

Analyzing the sound may also include determining feedback to be provided to the user, for example whether and where the user has erred, what are the user's errors for example wrong notes, rhythm, or other problems, or the like. The feedback may then be provided to the user, for example displayed over the display device of the computing platform used by the user.

Step 28468 ("Update BGM") may for example include: the BGM may be updated in accordance with the analysis results, for example some frequencies may be increased or silenced if the recognition rate is lower than a threshold, or the BGM may be made closer to the tune if the user's error rate or error number exceeded a threshold, or vice versa. Additionally, recommendations may be determined, such as telling the user to play louder, prompt the user that the environment is too noisy, or the like.

Step 28472 ("Update configuration") may for example include: the I/O devices selection and settings may be updated in accordance with the analysis results and with the current status of the I/O devices. In some embodiments, a configuration from a plurality of candidate configurations of one or more microphones and/or settings, and, optionally, where applicable, one or more speakers and/or settings, may be obtained (e.g., selected), for example by employing a search and/or testing method such as, for instance, an exhaustive search (e.g., round robin algorithm), a heuristic method and/or the like. The selected combination may herein be referred to as a "preferred" combination, for providing an improved or optimized user experience.

The residual sound obtained on step 28452 may then be evaluated per each such combination, and the combination may be assigned a score, depending on the quality of the sound separation. The separation quality may be assessed in accordance with the SNR for each combination, the recognition rate, success of the user in completing playing tasks, or the like.

In situations where the user is playing without BGM and/or without other users, and/or in a static manner, in which the user is only displayed with the notes and plays at his own pace, it may be determined which of the one or more microphones and/or microphone settings (e.g., frequency processing settings) provides comparatively improved or optimized user experience. The user experience may be assessed, for example, in accordance with the SNR for each combination, a recognition rate, success of the user in completing playing tasks, and/or the like.

In some embodiments, if one or more speakers and/or microphones becomes unavailable and/or is covered due to change in the position of the device, and/or if the BGM frequencies are better adapted to another speaker, then the used I/O devices or their parameters may be changed, comprising selecting another I/O device or setting at least one parameter of a speaker and/or a microphone to a different value.

The updated configuration may also be aimed at improving the user experience, e.g., providing better balance in intensity between the BGM, other users and the user's playing.

Step 28476 ("Store Parameters") may for example include: the selected devices and settings may be stored. The selections and settings may be retrieved on step 28420 in a future session.

The following is an example pseudocode implementation of the diagram shown in FIG. 28.

Start using the application—playing with BGM

Application start—BGM playing and presenting the part to be played

Microphone and speaker are open based on decision

Manipulation to the BGM to yield better results (if needed)

Compression of frequencies

Change volume

Shift the BGM in time

Remove/suppress the BGM from the recoding

Perform recognition based on the input (recording with/without BGM suppression and expected notes (if any)

In parallel record the original microphone input

Analyze the recognition results, given the settings, sound quality and the BGM. If recognition is insufficient perform one or more of the following:

Change microphone/speaker selection—round robin or another method Change the manipulation of the BGM Set a new configuration if needed—input back into the setting module, start the process over.

If (End of piece)

End of BGM playing

Save the final parameters for next session

Figure 29:
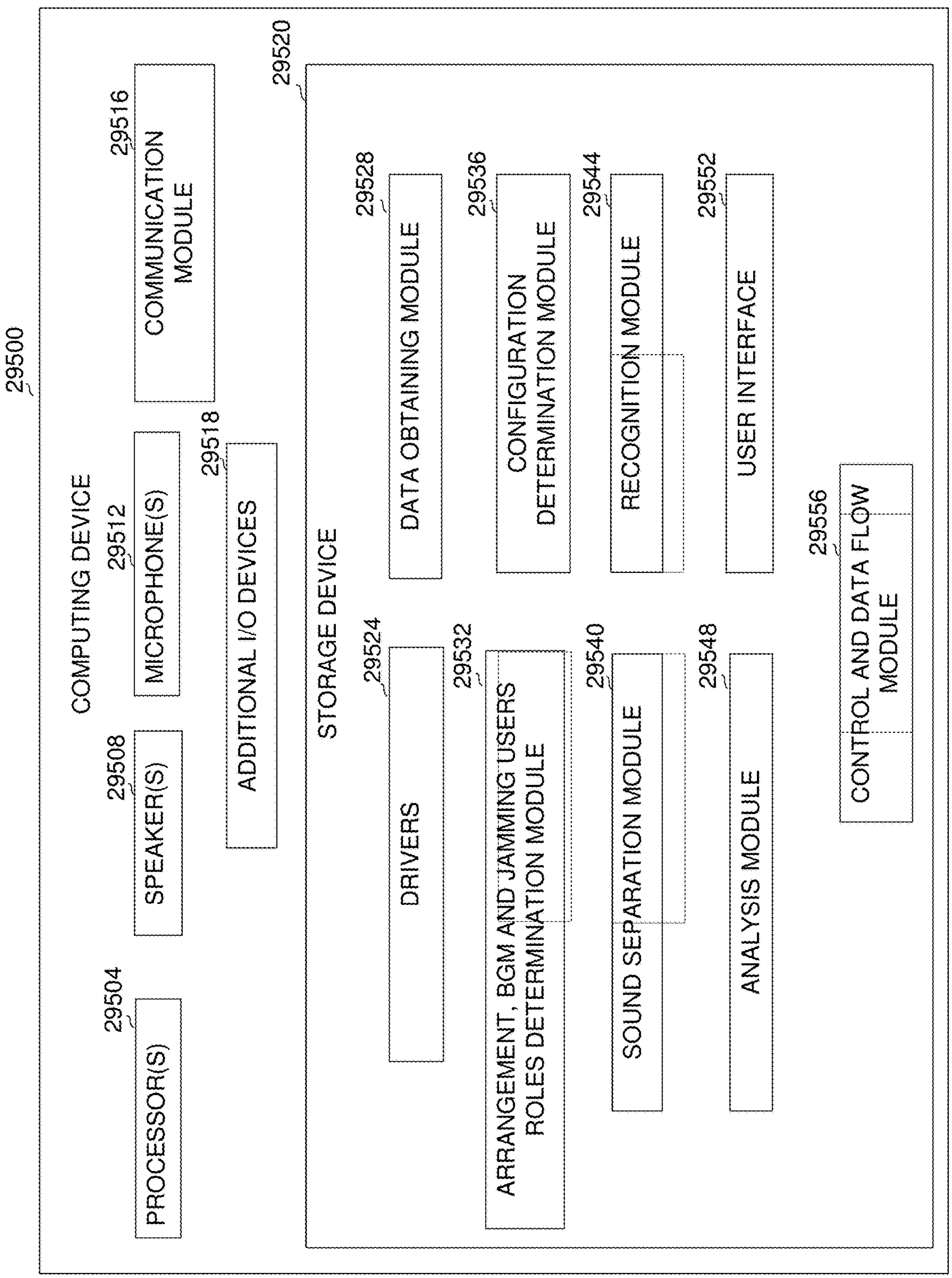
FIG. 29 is a block diagram of a system for selecting I/O devices when teaching a user to play, in accordance with some embodiments of the disclosure.

Additional reference is now to FIG. 29, showing a block diagram of a system for selecting I/O devices when teaching a user to play, in accordance with some embodiments of the disclosure.

FIG. 29 shows components related to selection and setting of the I/O devices. It will be appreciated that other components may be included in order to provide a full system for teaching a user to play a musical instrument in accordance with the disclosure.

The apparatus may comprise computing device 29500 such as tablet or smartphone 25108 of FIG. 25. Computing device 29500 may comprise one or more processors 29504. Any of processors 29504 may be a Central Processing Unit (CPU), a microprocessor, an electronic circuit, an Integrated Circuit (IC) or the like. Processors 29504 may be utilized to perform computations required by computing device 29500 or any of it subcomponents, for example steps in the methods of FIG. 26, FIG. 27 or FIG. 28 above.

Computing device 29500 may comprise one or more speakers 29508. In some embodiments, one or more of speakers 29508 may be external to computing device 29500.

Computing device 29500 may comprise one or more microphones 29512. In some embodiments, one or more of microphones 29512 may be external to computing device 29500.

Computing device 29500 may comprise communication module 516, for communicating with a server such as server 25128 of FIG. 25, with databases storing music pieces and arrangements, or the like.

Computing device 29500 may comprise additional I/O devices and/or sensors 29518 including, for example, inertial and/or non-inertial sensors such as cameras, linear acceleration sensors, angular acceleration sensors, gyroscopes, satellite-based navigation systems (e.g., the US-based Global Positioning System). Microphones 29512 and/or additional I/O devices and/or sensors 29518 may be may employed, for example, to identify the position of the device, the distance from the user and from the musical instrument, the type of music instrument being played by the player or players, and/or the like. In some embodiments, recognition may be performed by fusing visual and audio sources. For example, a back camera can identify that the back cover covers a microphone.

Computing device 29500 may comprise one or more storage devices 29520 for storing data structures and/or program code, executable by processor 29504 to result in the implementation and/or execution of one or more modules and/or processes. For example, storage device 29520 may retain data structures and program code which, when executed by any of processors 504 and/or processors 29504 to perform acts associated with any of the methods, processes, procedures and/or steps described herein, e.g., as described with respect to FIG. 26, FIG. 27 or FIG. 28.

Storage device 29520 may be persistent or volatile. For example, storage device 29520 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like.

The components detailed below may be implemented as one or more sets of interrelated computer instructions, executed for example by any of processors 29504 and/or by another processor. In some embodiments, some of the components may be executed by computing device 29500 while others may be executed by another computing platform such as server 25128. The components may be arranged as one or more executable files, dynamic libraries, static libraries, methods, functions, services, or the like, programmed in any programming language and under any computing environment.

In some exemplary embodiments of the disclosed subject matter, computing device 29500 (e.g., storage device 29520) may accommodate one or more drivers 29524, for receiving data from any devices, and in particular any of speakers 29508 and microphones 29512. Drivers 29524 may also be operative in setting the operational parameters of the devices s determined, for improving the user experience and enabling recognition of the sound.

Computing device 29500 (e.g., storage device 29520) may accommodate data obtaining module 29528 for obtaining past user selections and preferences, past selected I/O devices and relevant settings, or the like. The data may be obtained from a database, for example a database being stored on storage device 29520 or another storage device operatively connected to computing device 29500. Data obtaining module 29528 may be further operative in obtaining available musical pieces, arrangements, BGM or the like.

Computing device 29500 (e.g., storage device 29520) may accommodate arrangement, BGM and jam users' roles determination module 29532, for determining the roles for the user, for additional users if any, and corresponding BGM music to be played, in accordance with a selected piece, and difficulty level.

Computing device 29500 (e.g., storage device 29520) may accommodate configuration determination module 29536, for determining an I/O configuration, including selecting speaker(s) through which the BGM music and playing by additional users (or expected playing) is to be played, microphone(s) through which the user's playing, the BGM and the additional users' playing are to be captured, and the relevant settings thereof.

Computing device 29500 (e.g., storage device 29520) may accommodate sound separation module 29540 for suppressing from the captured audio the BGM, the other users' playing and environmental noises. Suppressing may use the available knowledge about the BGM and of the other user's playing, or at least their expected sound.

Computing device 29500 (e.g., storage device 29520) may accommodate recognition module 29544 for transcribing the audio comprising only or mainly the user's playing, and obtaining the notes or chords played by the user.

Computing device 29500 (e.g., storage device 29520) may accommodate analysis module 29548, for comparing the transcribed notes or chords and their timing to the expected notes or chords according to the music sheet provided to the user, identifying errors, determining if a difficulty level change is required, or the like.

Computing device 29500 (e.g., storage device 29520) may accommodate user interface 29552, for displaying a music sheet to a user over a display device, displaying a cursor tracking the user's playing or what the user is expected to be playing, displaying results such as error report to the user, receiving user's preferences, or the like.

Computing device 29500 (e.g., storage device 29520) may accommodate control and data flow module 29556 for invoking the relevant modules, providing the required data or access to the data to each module, collecting results, or the like.

Computing device 29500 (e.g., storage device 29520) may also store execution results, for example the selected configuration and settings per user, per device orientation and position, per arrangement, per difficulty level, or the like. Once stored, the configuration and settings may be retrieved and used as an initial configuration and settings for another session by the same user or by other users, for example users with similar preferences and level.

It will be appreciated that processor 29504 and/or a processor of server 25128 is operable to execute methods, processes and/or operations described herein. For instance, processor 29504 may execute program code instructions resulting in the implementation of, for example, modules 29524, 29528, 29532, 29536, 29540, 29544, 29548, 29552 and 29556 and/or result in the implementation of a method for providing a music learning session, including, for example, selecting and setting I/O devices for improving the recognition quality and enhancing the user experience.

It may be appreciated that making mistakes (i.e., incorrect playing of notes or chords) when learning to play a musical instrument are relatively common and that most probably every learner makes mistakes. Furthermore, the music recognition engines may also make mistakes. These mistakes (hereinafter interchangeably referred to "error" or "error") may include a mismatch between a pitch of one or more audio or sound signals produced with the musical instrument compared to the pitch of one or more notes presented to the learner in a musical piece; a mismatch in timing of playing of one or more notes with the musical instrument, compared to the timing for playing the one or more notes as presented in the musical piece; and/or cleanliness of one or more notes or chords produced by the musical instrument played by the learner.

Examples of measures of cleanliness may relate to the balance (or lack thereof) between played notes of a chord; may relate as to whether a note that should have been is played is not played or played comparatively weakly; may relate to the cleanliness of a single or a plurality of notes being to be played (sequentially or simultaneously) without inadvertently playing another note (e.g., by inadvertently pressing another key or plucking another string), a temporal relationship between notes being played (e.g., level of synchronism between played chord notes), and/or the like. In a string instrument, cleanliness may also relate to string buzzing (presence or lack thereof).

Mistakes made by user playing and/or by the music recognition engine may include two kinds, random mistakes and recurring mistakes. Random mistakes occur when the learner is playing a musical piece and, despite correctly playing a series of notes, an incorrect note may be suddenly mistakenly played. Recurring mistakes occur when the learner repeatedly makes a mistake playing the same one or more notes presented in the music piece (hereinafter may also be referred to as "presented pattern") for two or more temporally separated same presented pattern in the music piece.

Known systems and methods for interactive teaching of playing a musical instrument may prove to be tedious and somewhat inefficient. Some rely on a learner repeatedly playing a musical piece until there are no mistakes (regardless of whether random or recurring) and only then may the learner move on to a next "more difficult" (more complex) musical piece. Others, seeing that a learner makes mistakes while playing a musical piece may choose to reduce the level of difficulty and provide the learner with a "simpler" musical piece.

The present invention, in some embodiments, relates to a system and method for adaptive and interactive teaching of playing a musical instrument which includes providing a learner (hereinafter referred to as "user") with feedback responsive to correct and incorrect playing of a music piece, and, optionally, creating corrective targeted exercises for practice based on recurring mistakes performed by the user when playing the music piece. The use of feedback may serve to reinforce a user's morale and to increase user awareness to more careful and/or skillful playing, thereby contributing to a reduction in the occurrence of errors, such as recurring errors. The use of the corrective targeted exercises may further serve as a training tool to condition the user to properly recognize the presented pattern in the music piece which triggers the recurring mistakes, thereby (e.g., substantially) reducing or preventing future recurrences of errors and increasing practicing efficiency.

In some examples, the targeted exercises may be created by the system using a "smart exercise creation engine" using artificial intelligence functionalities such as machine learning models (e.g., supervised and/or unsupervised), and/or may he selected from a database of exercises which may be stored in a local database, a distributed database, and/or a cloud-based database, among other possible sources.

Selected exercises may include exercises created by composers and teachers such as Behringer, Bartok, etc. In some examples, predefined or existing exercises may be adapted or modified by the smart exercise creation engine. In some examples, exercises may be suggested and/or created by other users or players for display to a certain user playing an instrument. In some examples, user-created or suggested exercises may be adapted or modified by the smart exercise creation engine.

In some embodiments, a user-specific: exercise may be displayed to the user in a variety of manners including, for example, at variety of tempos, rhythms, keys, etc. In some examples, a same exercise may be altered (e.g., "on-the-fly") according to the player's level, analogous to what is for example described in co-owned U.S. application Ser. No. 17/388,050, filed 29 Jul. 2021, titled "METHOD AND APPARATUS FOR AN ADAPTIVE AND INTERACTIVE TEACHING OF PLAYING A MUSICAL INSTRUMENT", which is incorporated herein by reference in its entirety.

In some embodiments, a musical piece (or a section thereof, hereinafter also referred to as "musical piece" for convenience) may be presented to a user by a computing device, for example, on the computing device's display. It is noted that a display device other than that of the computing device may additionally or alternatively be used. The user, responsive to the musical piece presented to him, may play a musical instrument following the musical notations displayed.

The computing device may acquire the output signal from the musical instrument, which may be an acoustic signal (sound waves) or an electric signal (audio signal), and may process the acquired signal to determine its level of correspondence with the displayed musical piece. A level of correspondences may be defined by a threshold of one or more correspondence parameter values, as outlined herein.

In some examples, a level of correspondence of may not only be determined with respect to audio outputs produced a single player but also in relation with audio outputs produced a plurality of players playing together ("jamming"), for example, as described in co-owned US patent application 17,467,224 filed 5 Sep. 2021, titled "METHOD AND APPARATUS FOR AN ADAPTIVE AND INTERACTIVE TEACHING OF PLAYING A MUSICAL INSTRUMENT", which is incorporated herein by reference in its entirety.

In some examples, determining the level of correspondence may also take into consideration the cleanliness of the played musical sequence.

If the level of correspondence meets a predetermined correspondence criterion, for example, if the level of correspondence is below a deviation threshold, the computing device may provide the user with positive feedback indicative of correct playing. For example, if the deviation threshold is 10% and the system determines less than 10% deviation between the played pitch(es) and the presented pitch(es), and/or less than 10% deviation between the played timing and presented timing the computing device may provide the user with positive feedback indicative of correct playing.

If the level of correspondence does not meet the predetermined error criteria, e.g., if the level of correspondence is equal or above the deviation threshold, the computing device may further process the acquired information to determine if the mistake is a random mistake or a recurring mistake.

It is noted that, in some embodiments, different thresholds may define different criteria with regards to a level of correspondence. For example, a low deviation threshold can be a threshold below which the system or computing device may provide the user with a positive feedback. The low deviation threshold may be lower than a high deviation threshold above which the computing device may further process the acquired information to determine if the mistake is a random mistake or a recurring mistake.

In some examples, as outlined herein, different thresholds may be employed to determine whether the mistake is random mistake or a recurring mistake. For example, if a rate of incidence of a certain errors is below a recurring error threshold but higher than a random error threshold, the error may be identified (e.g., classified) as a random error. If the level of incidence is higher than a recurring threshold, than the error may be identified classified) as a recurring error.

In some examples, a measure relating to playing cleanliness may be taken into consideration, outlined herein.

A level of correspondence may be determined in a variety of ways including, for example, cross-correlation between a signal descriptive of a portion of a musical piece displayed to the user and an output signal produced by the instrument played by the user, a likelihood measure descriptive that the output signal and the displayed musical piece signal match, the number of (e.g., same and/or different)s mistakes made in a number of played bars or beats ("rate of mistakes"), e.g., of a musical piece, a plurality of same or different musical pieces, exercises, and/or the like.

For example, this determination may be done by calculating an incidence rate associated with a number of times the same mistake is repeated in the same musical piece and/or in different musical pieces, and comparing the incidence rate with a predetermined recurrence rate criterion.

An example of a recurrence rate criterion may be "at least the same mistake in two temporally separated, same pattern, in the musical piece and/or exercise, or a plurality of same or different musical pieces and/or exercises, e.g., made within a certain number of sequential beats or bars.

Optionally, the recurrence rate criterion may take into consideration the number of practice sessions that the user later did or did not manage to play correctly (as the user practiced more while playing)". Based on the type of mistake, the computing device may provide the user with negative feedback indicative of incorrect playing, the negative feedback including a differentiation between random mistakes and recurring mistakes, as explained in more detail further on below.

In some embodiments, the feedback may be provided to the user in real-time while playing the music piece and may include use of positive feedback indicators to represent correct playing of notes and use of negative feedback indicators to represent incorrect playing of notes.

As previously mentioned, the negative feedback may include differentiation between random mistakes and recurring mistakes and may be so indicated to the user by means of different types of negative feedback indicators to make the user aware of the type of error made. The indicators, both positive feedback and negative feedback may include visual and/or audible indicators. Optionally, for random errors, the feedback may include, aside from visual and/or audible indicators, a real-time repetition of the presented musical piece.

In a non-limiting, exemplary implementation of the real-time visual feedback indication, the notes in the musical piece may be initially displayed by the computing device in a first color, for example, yellow. During the course of the playing session, every note that is correctly played by the user may have its color changed in real-time to a second color, for example from yellow to green (positive feedback indicator); every note that is incorrectly played and is associated with a random error may be changed in real-time from the first color to a third color, for example from yellow to red (negative feedback indicator); and every note or group of notes that is incorrectly played and is associated with a recurring error may remain with the same color, for example, yellow (differentiated negative feedback indicator), or may be alternatively changed to a fourth color, for example, purple.

In some embodiments, the system may not provide any feedback to the user but make an initial analysis of the played musical notes for a certain time period to determine for later played musical notes which errors are more likely to be recurring errors and which are more likely to be random errors. For example, the system may store a first set of played patterns which include errors associated with one or more sequences in a musical piece without determining the type of error. The system may then compare the stored patterns with a later played second set of similar patterns to determine if the errors made in the first set patterns are recurring or random (e.g., if the second set does not exhibit the same error or errors, the error(s) in the first set may be classified as random, and if the error(s) occurs also in the second set, they may be classified as recurring).

In some embodiments, recurring errors may be identified by the system by analyzing if in a last number of same sequences "x" played by the user, more than a certain percentage threshold of the sequences were not played correctly (e.g., more than 30% of the sequences were not played correctly (error), or for example more than 40%, 50%, 60%, 70% were not played correctly, or about 30% and 100% of the sequences, bars, and/or beats were not played correctly). In some example implementations, if the user in the beginning repeatedly made mistakes playing the same sequence and in the last "x" sequences played, 70% or more of the sequences were played correctly, for example, 75%, 80%, 85%, 90%, 95%, or more or less in the range between 70% and 100%, the system may remove the sequence as an "error" sequence.

In some examples, the distribution of mistakes made by the user may be take into consideration. For example, mistakes made during a "warming up period" may be disregarded. For example, if past a certain length of an initial sequence, which may be defined a warming-up time period (e.g., defined by a certain beat number of the total number of sequential beats of a musical piece, a Warming-up exercise period, a minimum number of beats played by the user in a given exercise session, etc.), the incidence rate of mistakes is below a deviation threshold, the errors made by the player up during the warming-up period may be disregarded for determining a level of correspondence.

In some embodiments, random errors may be identified by the system by analyzing if in a last number of same sequences "x" played by the user, less than a certain percentage threshold of the sequences were not played correctly (e.g., less than 30% of the sequences were not played correctly (error), or for example less than 40%, 50%, 60%, 70% were not played correctly, or about 30% and 100% of the sequences, bars, and/or beats were not played correctly).

In some embodiments, the system may have database storing data descriptive of patterns of recurring mistakes and of random mistakes. Initially, in some examples, the played musical notes may be compared against these patterns stored in the database. The database may be continuously updated for ail users or only for a specific users based on statistics being performed while the user is playing. Updating can mean that what was initially associated with a recurring mistake becomes, for a certain user, a random mistake, and an error pattern that was initially associated with a random mistake becomes a recurring mistake.

In some embodiments, the system may include artificial intelligence functionalities such as machine learning models (ML) to classify the errors as recurring or random, and may include a database of errors or patterns of errors associated with the types of errors. ML models used may include classification models such as neural networks, decision tree, random forest, and Naïve Bayes, among others.

In some embodiments, ML training may be based on analyzing whether the corrective exercises managed to eliminate the errors. If not, it can be derived that certain errors are random, if personalized exercises proved to be successful of reducing errors, then it can be derived that error was a recurring error.

In some embodiments, the system may determine statistics about the distribution of different types of error made by the user while playing, the instrument. Different statistics may lead to different conclusions as to the type of error made by the user. Examples of may include determining use of Poisson distribution and/or exponential distribution to present the probability of the same error sequence being played.

In some embodiments, the presented pattern which triggers the player to make a recurring or "systematic" mistake in a musical piece may be stored in a memory for later use in one or more corrective targeted exercise. The corrective targeted exercises may be especially tailored to emphasize user playing of the presented pattern, optionally unrelated to its location within the original musical piece.

It may be noted that the corrective targeted or personalized exercises may be different for different select patterns, although one or more presented patterns may also be combined into a single corrective targeted exercise. Optionally, one or more notes which were Mistakenly played and may be associated with random errors may also be stored in the memory for later use in practice sessions. The stored presented patterns and the optional stored one or more notes associated with random errors may be removed from the memory upon their being correctly played by the user according to a predetermined criteria (e.g., correctly played three times consecutively).

It may be appreciated that the system and method, in some embodiments, through identification of correct and incorrect playing of musical notes in real-time, through classification of user mistakes as random or recurring, and through performing actions to reinforce user morale, increase user awareness, and improve user recognition of presented patterns which trigger recurring mistakes, may allow a user to advance through a music learning course independently of making mistakes. It may also allow for relatively rapid transitions from playing less complex music pieces to progressively more complex music pieces.

Reference is now made to AG. 30 which is a block diagram illustrating a system 301 for adaptive and interactive teaching of playing a musical instrument 3010, according to an exemplary embodiment of the present invention. As shown by AG. 30 the system may include a computing device 30100 and an interface unit 3020 suitable to interlace between the musical instrument and the computing device.

The musical instrument 3010, may be, for example, a piano, which may be played by a user, although one having ordinary skill in the are: may appreciate that any musical instrument may be supplemented, whether the instrument is of the bowed strings, woodwind, brass, percussion, keyboard, vocals, or the guitar family.

The interface unit 3020 may be, for example, a microphone for receiving sound produced by the musical instrument 3010. The microphone transforms received sound waves and converts the sound waves into electrical signals for processing by computing device 30100. Alternatively, the interface unit 3020 may include other means to either receive sound waves from the musical instrument 3010 and convert the sound waves to electrical signals for processing by the computing device 30100.

Alternatively, the interface unit 3020 may provide connectivity for electrical signals from the musical instrument for processing audio signals produced by the musical instrument, optionally including instructional signals such as MIDI, by the computing device 30100.

The computing device 30100 may receive the electrical signals from the interface unit 3020, may process the electrical signals as described hereinbelow, and may run a music learning application in accordance with the processed electrical signals, also as described hereinbelow.

The computing device 30100 may receive the electrical signals from the interlace unit 3020 and may process them to determine a level of correspondence with a musical piece presented to the user. The musical piece may be presented to the user by means of a display connected to the computing device 30100, optionally integral to the computing device. Optionally, the processing is done in real-time. A more detailed explanation of the processing, is provided herein below with reference to FIG. 31, FIG. 32, and FIG. 34 which describes the execution of a method of operation of the system.

Based on the level of correspondence, the computing device 30100 may determine if the user is correctly playing the presented the musical piece, or if mistakes are made. If there are no mistakes, the computing device may provide a positive feedback indication to the user. The indication may be visual, for example, on the display, and/or auditory, for example, by emitting a sound through a speaker which the user may identify with a positive feedback indication. If there are mistakes, the computing device 30100 may further process the received electrical signal to calculate an incidence rate associated with a number of times the same mistake is repeated in the musical piece.

The computing device 30100 may then compare the incidence rate with a predetermined recurrence rate criterion to determine if the mistake is a random mistake or a recurring mistake. Responsive to the determination the computing device 30100 may provide a negative feedback indication to the user, again visually on the display and/or audibly, distinguishing between a random mistake and a recurring mistake. If the mistake is determined to be a recurring error, the computing device 30100 may additionally store the presented pattern in its memory for further use in the preparation of corrective targeted exercises. If the mistake is identified (e.g., classified) as a random error, the feedback may optionally include a real-time repetition of the presented musical piece and/or may be stored in the memory for later practice. Alternatively, the random error may be obviated and the user may continue playing the music piece.

The computing device 30100 may be any device having a memory and a processor. These may include a general purpose computer, a smart phone, a personal computer, a laptop, a tablet, an augmented reality helmet, or other suitable computing device having a memory and processor. It should also be noted that the interface unit 3020 may be located within the computing device 30100 itself instead of located separately as shown by FIG. 30.

In some embodiments, the musical instrument 3010 may have a direct connection to the computing device 30100 for transmitting audio signals to the computing device without need of the interface unit 3020. It may be appreciated that, in some embodiments, the connection of the instrument to the to the computing device may be direct, eliminating the use of sound waves. For example, a digital midi connection, a USB connection, Bluetooth, Wi-Fi, and/or other suitable hardware, may provide input electrical signals to the computing device.

Figure 30:
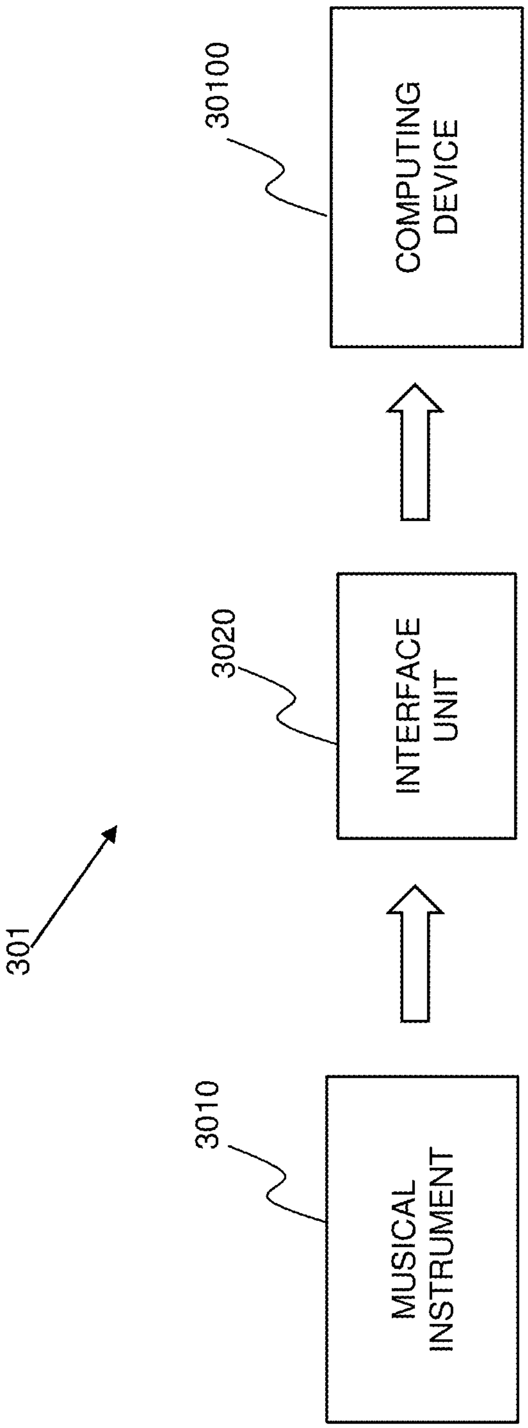
FIG. 30 is a block diagram of a system for adaptive and interactive teaching of playing a musical instrument, according some embodiments.
Figure 31:
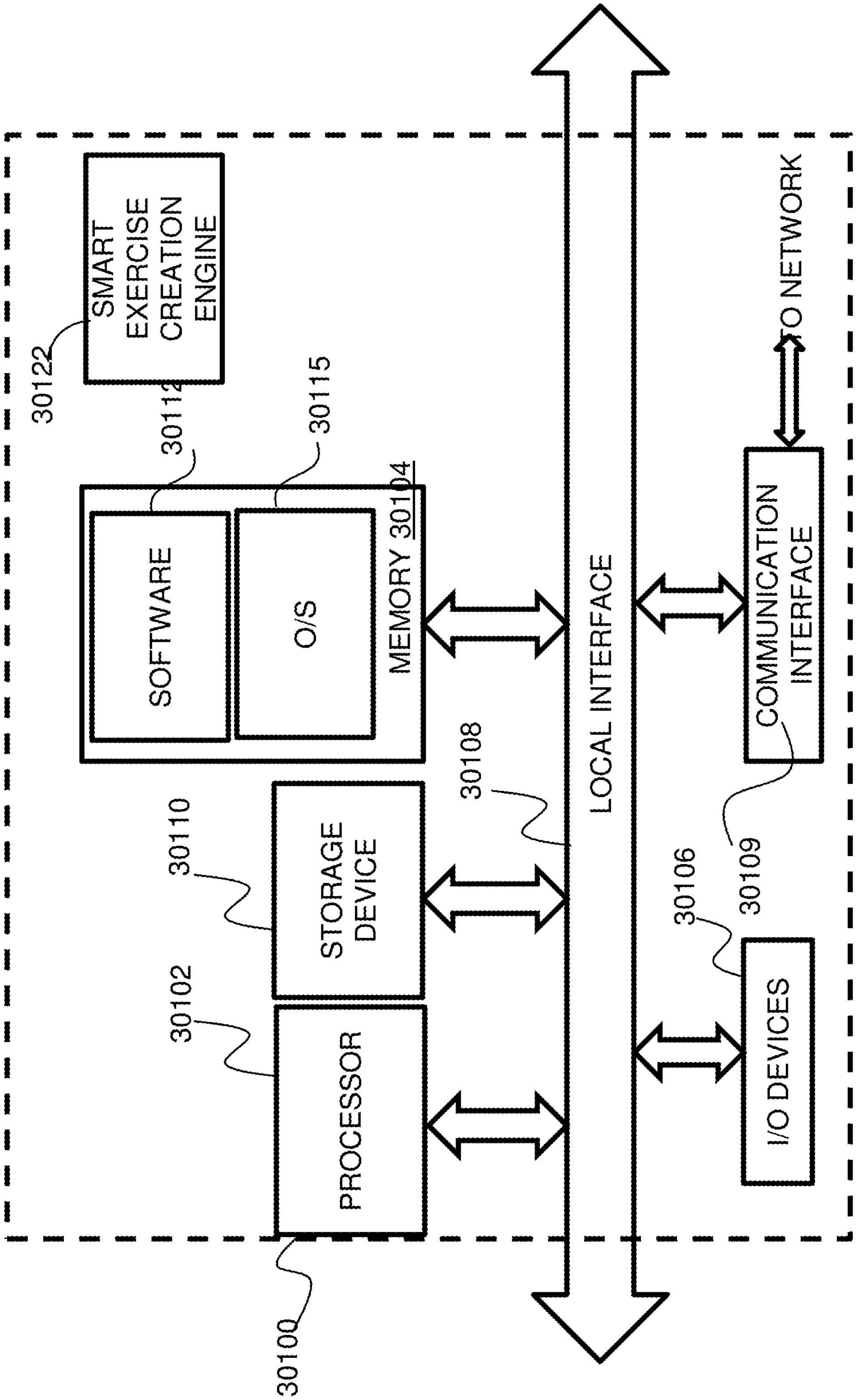
FIG. 31 is a block diagram of the computing device shown in FIG. 30, according to some embodiments.

Reference is now made to FIG. 31 which is a block diagram of the computing device 30100 of FIG. 30, according to an exemplary embodiment of the invention. Functionality performed by the computing device 30100 may be partially implemented in software, as an executable program, where the computing device may be a general-purpose digital computer, such as a personal computer, workstation, minicomputer, or mainframe computer, or other type of computing device such as a smart phone, a laptop, a tablet, augmented reality helmet, among others. Generally, in terms of hardware architecture, as shown in FIG. 31, the computing device 30100 may include processor(s) 30102, a memory 30104, one or more input and/or output (I/O) devices 30106 (or peripherals) that are communicatively coupled via a local interface 30108, a communication interface 30109, and a storage device 30110. Alternatively, the one or more I/O devices 30106 may be external to the computing device 30100.

The local interface 30108 may be, for example but not limited to, one or more buses or other wired or wireless connections, e.g., as is known in the art. The local interface 30106 may have additional elements, which are omitted for simplicity, such as controllers, buffers (caches), and drivers. Further, the local interface 30106 may include address, control, and/or data connections to enable appropriate communications among the aforementioned components.

The communication interface 30109 may serve to provide the computing device 30100 with two-way communication through a network to external systems and devices. The network may include a local area network (LAN) and/or a wide area network (WAN). Communications may include use of a wired and/or wireless infrastructure for data transmission and reception. Optionally, an optical communications infrastructure (i.e., fiber optics) may be used for data transmission and reception between the computing device 30100 and the external systems and devices.

The storage device 30110 may be any nonvolatile memory element (e.g., ROM, hard drive, tape, SSD, CDROM, etc.) or alternatively, may he a volatile memory element, although the loss of memory contents when power is removed may not: be desirable. In some embodiments, data stored within the storage device 30110 as described herein, may be stored in a different location such as, for example, at a remote location separate from the computing device 30100.

The storage device 30110 may include auxiliary information stored therein. The auxiliary information may be defined as a-priori data regarding the musical instrument being played, the environment, and the musical application, as described herein. A-priori data may be used by the computing device 30100 for improving audio recognition, and may include, for example, general statistical characteristics of specific musical instruments being used by a user or other users, the expected tones to be played, expected volume and duration the user(s) plays at each moment, background music accompaniment being played by computer speakers or other audible devices, and other noise measurements on the physical environment. Other examples of a-priori data may include, but are not limited to, information on the player itself, such as gender, level of expertise, and playing method preferences. There are many other examples of a-priori data and the present invention is not intended to be limited to the examples provided herein.

The use of auxiliary information may allow for the use of non-conventional information in music signal analysis, such as, for example, but not limited to, what instrument is supposed to be played and what note is supposed to be played at a specific time. By using auxiliary information, identification errors are strongly reduced. As a result, the a-priori knowledge is used to greatly improve signal analysis accuracy.

A first type of identification error is not identifying a tone as the user is playing it. The a-priori knowledge of the instrument characteristic helps better define what to expect in the audio samples as the tone is played, thus making it: easier to identify when that happened. The knowledge of when the user is supposed to play a given tone is used to look "more carefully" in that time for the expected patterns in the audio sample related to that tone being played.

A second type of identification error is a false-positive, identifying that a tone is being played even though the user does not play it. Here, for example, using the knowledge of the accompaniment background music, its effect can be cancelled out from the audio samples reducing or preventing dominant tones in the background musk: from being falsely identified as played tones. The former are only a low possible examples of the usage of auxiliary information in the audio recognition process and serve to set forth for a clear understanding of its usage for reducing the number of identification errors.

In addition, the storage device 30110 may include a model input stored therein. The model input may include tone, volume, duration, and additional characteristics associated with a musical piece being played by the user. The model input may include any combination of the tone, volume, duration, and additional characteristics.

Additional characteristics may be typically instrument specific, although additional characteristics may not be instrument specific. When instrument specific, additional characteristics may include, but are not limited to, the volume of air that a user puts into a woodwind instrument, vocal output, the accuracy of the timing and tempo a user plays a percussion instrument, the intensity that: the user presses a key on a piano, or the intensity that a user plays a guitar string. In addition, more cross-instrument characteristics may be provided, such as, but not limited to, stability of a tone. Further, as is explained in further detail hereinbelow with reference to FIG. 34, the storage device 30110 may have stored therein recurring player mistakes.

The processor 30102 may be a hardware device for executing the software 30112 stored in memory 30104. The processor 30102 may be any custom made or commercially available processor, a central processing unit (CPU), an auxiliary processor among several processors associated with the computer, a semiconductor based microprocessor (in the form of a microchip or chip set), a microprocessor, or generally any device for executing software instructions.

The memory 30104 may include any one or combination of volatile memory elements (e.g., random access memory (RAM, such as DRAM, SRAM, SDRAM, etc.) and nonvolatile memory elements. Moreover, the memory 30108 may incorporate electronic, magnetic, optical, and/or other types of storage media. In some embodiments, the memory 30104 may have a distributed architecture, where various components are situated remote from one another, but may be accessed by the processor 30102.

The software 30112 located in the memory 30104 may include one or more separate programs, each of which may include an ordered listing of executable instructions for execution by the processor 30102, resulting in the implementation of a smart exercise creation engine 30122 providing a variety of recognition, processing and/or personalized exercise selection and/or creation functionalities, as outlined herein.

These may include instructions for providing adaptive and interactive teaching of playing a musical instrument to a user including providing the user with feedback responsive to correct and incorrect playing of a musical piece, and for creating corrective targeted exercises for practice based on recurring mistakes performed by the user when playing the musical piece. A more detailed description of the implementation of these instructions is provided hereinbelow with reference to FIG. 34.

The software 30112 may include a source program, executable program (object code), script, or any other entity containing a set of instructions to be performed. As a source program, the program may be translated via a compiler, assembler, interpreter, or the like, which may or may not be included within the memory 30104, to operate properly in connection with a suitable operating system (O/S) 30115 in the memory 30104.

Furthermore, the software 30112 may be written as an object oriented programming language, which has classes of data and methods, or a procedure programming language, which has routines, subroutines, and/or functions. The O/S 30115 may control the execution of other computer programs, such as the software 30112 associated with the computing device 30100, and may provide scheduling, input-output control, file and data management, memory management, and communication control and related services.

The I/O devices 30106 may include input devices, for example but: not limited to, the interface unit 3020, a keyboard, mouse, scanner, touch screen, camera, or other input devices. Furthermore, the devices 30106 may also include output devices, for example but not limited to, a printer, a display, or other output devices.

Finally, the I/O devices 30106 may further include devices that communicate both as inputs and outputs, for instance but: not limited to, a modulator/demodulator (modem; for accessing another device, system, or network), a radio frequency (RF) or other wireless or wired transceiver, a telephonic interface, a bridge, a router, or other devices that communicate both as inputs and outputs.

When the computing device 30100 is in operation, the processor 30102 may execute the software 30112 stored within the memory 30104, to communicate data to and from the memory, and to generally control operations of the computing device 30100 pursuant to the software, including the execution of the programs associated with providing adaptive and interactive teaching of playing the musical instrument including providing the user with feedback responsive to correct and incorrect playing of a musical piece, and creating corrective targeted exercises for practice based on recurring mistakes performed by the user when playing the musical piece. The software 30112 and the O/S 30115, in whole or in part, may be read by the processor 30102, optionally buffered within the processor 30102, and then executed.

When at least a portion of the computing device 30102 functionality is implemented in software 30112, as is shown in FIG. 31, the software 30112 may be stored on any computer readable medium for use by or in connection with any computer related system or method. A computer readable medium may be an electronic, magnetic, optical, or other physical device or means that may include or store a computer program for use by or in connection with a computer related system or method. The software 30112 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. A "computer-readable medium" may be any means that may store, communicate, propagate, or transport the program for use by or in connection with the instruction execution system, apparatus, or device. The computer readable medium may be, for example but not limited to, an electronic, magnetic, optical, electromagnetic, infrared, or semiconductor system, apparatus, device, or propagation medium. More specific examples of the computer-readable medium may include an electrical connection having one or more wires, a portable computer diskette (magnetic), a random access memory (RAM), a read-only memory (ROM), an erasable programmable read-only memory (EPROM, EEPROM, or Flash memory), an optical fiber, and a portable compact disc read-only memory (CDROM), SSD. The computer-readable medium may include paper or another suitable medium upon which the program is printed, as the program may be electronically captured, via for instance optical scanning of the paper or other medium, then compiled, interpreted or otherwise processed in a suitable manner if necessary, and then stored in a computer memory.

In some embodiments, the computing device 30100 may be implemented as a web application. The computing device 30100 may be hosted in a Web server, where the Web server may be a general-purpose digital computer, such as a personal computer, workstation, minicomputer, or mainframe computer as described above.

In some embodiments, the computing device 30100 may be implemented in hardware. The computing device 30100 may be implemented with any or a combination of technologies, e.g., which are each well known in the art. These may include discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 32:
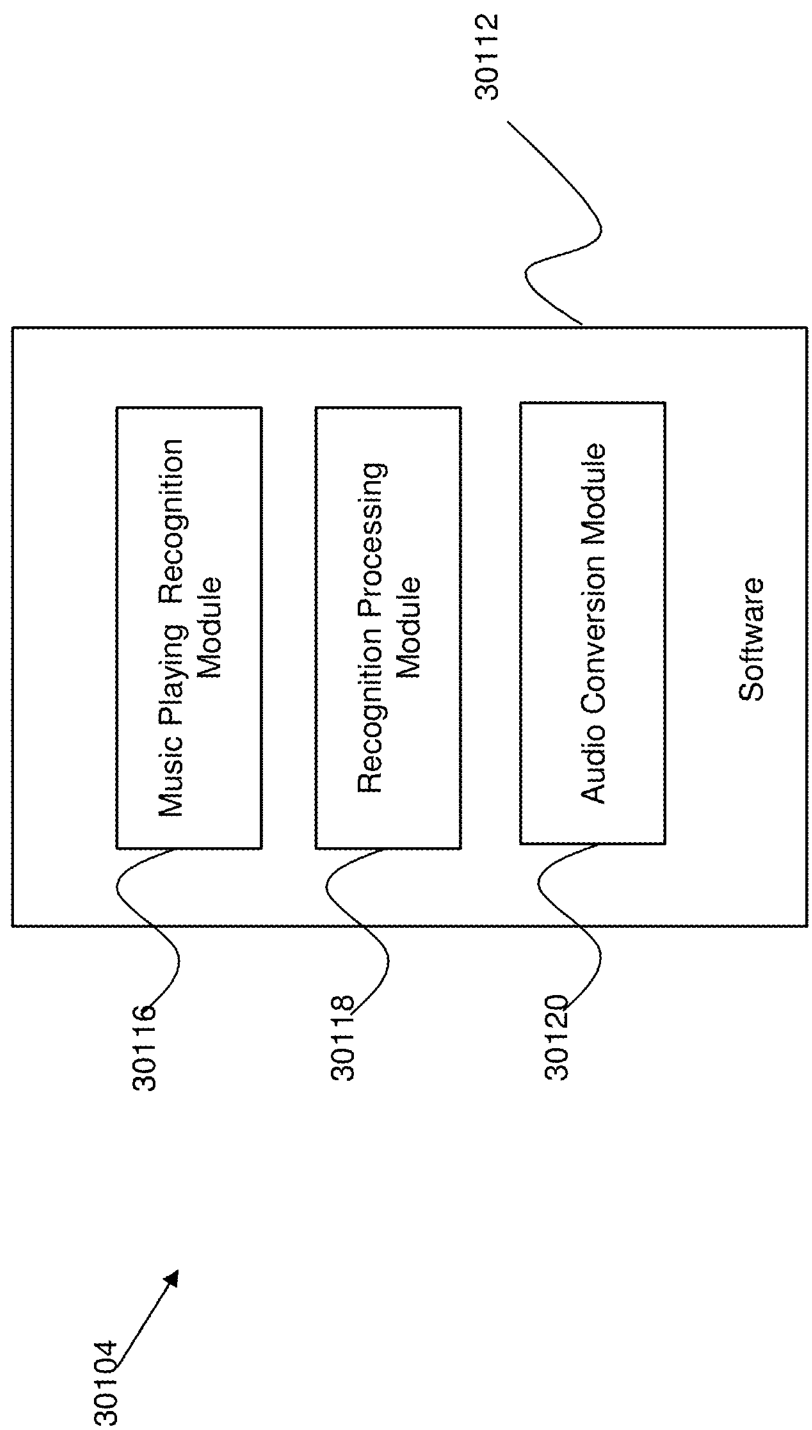
FIG. 32 is a block diagram of We software module in the memory in FIG. 31, according to some embodiments.

Reference is made to FIG. 32 which is a block diagram further illustrating modules within the software 30112 of the memory 30104, according to an exemplary embodiment: of the present: invention. The software 30112 may be employed to implement a music playing recognition module 30116, a recognition processing module 30118, and an audio conversion module 30120.

The music playing recognition module 30116 may include (e.g., known) algorithms incorporated into programs executable by processor 30102 for recognition analysis of audio signals associated with musical notes played by the musical instrument 3010. The recognition processing module 30118 may include (e.g., known) algorithms incorporated into programs executable by the processor 102 for comparing the analyzed audio signals with stored information associated with corresponding musical notes of the musical piece which are presented to the user and played by the user on the musical instrument 3010. The audio conversion module 30120 may include (e.g., known) functionality for converting electrical signals received from the interface unit 3020 into digital samples that may be processed by the music playing recognition module 30116.

The recognition analysis of the audio signals by the music playing recognition module 30116 may be based on an algorithm described in U.S. Pat. No. 9,492,756, assigned to the Applicant of the present invention and incorporated herein in its entirety by reference. It may be appreciated that other sound recognition algorithms (e.g., known) may be used. These may include use of feature extraction using time-domain, frequency domain, or a combination thereof. The analysis may be configured to handle harmonic instruments, such as a piano, where a single note or chord is composed of multiple frequencies (tones), playing multiple keys or notes together simultaneously, in an environment of environment noise, such as air conditioner, operating television set, street noise, and other general background noise in a building environment.

In some embodiments, the analysis may include use of Mel-Frequency Analysis, such as calculating the Mel-Frequency Cepstral Coefficients (MFCC). Alternatively, or additionally, the analysis may include use of Linear Predictive Coding (LPC), such as calculating the LPC coefficients. The extracted features may be, or may be based on (such as a function of), part of, or all of, the Mei-Frequency Cepstral Coefficients (MFCC), the LPC coefficients, or any combination thereof. Further, the analysis may use signal dominant frequency bands or a phase of the signal.

In some embodiments, the analysis may include using a feature vector called the Enhanced Pitch Class Profile (EPCP). This may involve first obtaining the harmonic product spectrum from the DFT of the received audio signal, and then applying to it an algorithm for computing a 12-dimensional pitch class profile to yield the EPCP feature vector. The EPCP vector may be correlated with the predefined templates for 24 major/minor triads, and the template yielding maximum correlation may then be identified as the chord of the input signal.

In some embodiments, the analysis may include using chord recognition systems which typically comprise an acoustic model that predicts chords for each audio frame, and a temporal model that casts these predictions into labelled chord segments. Additionally, or alternatively, the analysis may include extracting Chroma which may include first converting the received audio signal into a sequence of chroma-based audio features and then applying pattern matching techniques to map the chroma features to chord labels.

In some embodiments, the analysis may include determining various parameters of the musical piece being played by the user. Examples of such parameters include, but are not limited to, the tone being played, the intensity of the tone, also referred to as the volume, the duration of the tone, and any additional characteristics that would assist in analyzing the playing of the musical piece by the user. Such additional characteristics may include, for example, instrument-specific measures, such as the volume of air that the user puts into a woodwind instrument, the accuracy of the timing and tempo a user plays a percussion instrument, the intensity that the user presses a piano key, or plays a guitar string, or other characteristics.

In some embodiments, the analysis may include estimating the fundamental frequencies of concurrent musical sounds. Additionally, or alternatively, the analysis may include use of a computationally efficient fundamental frequency (F0) estimator for polyphonic music signals, which may include calculating the salience, or strength, of a F0 candidate as a weighted sum of the amplitudes of its harmonic partials and mapping from the Fourier spectrum to a F0 salience spectrum.

Figure 33A:
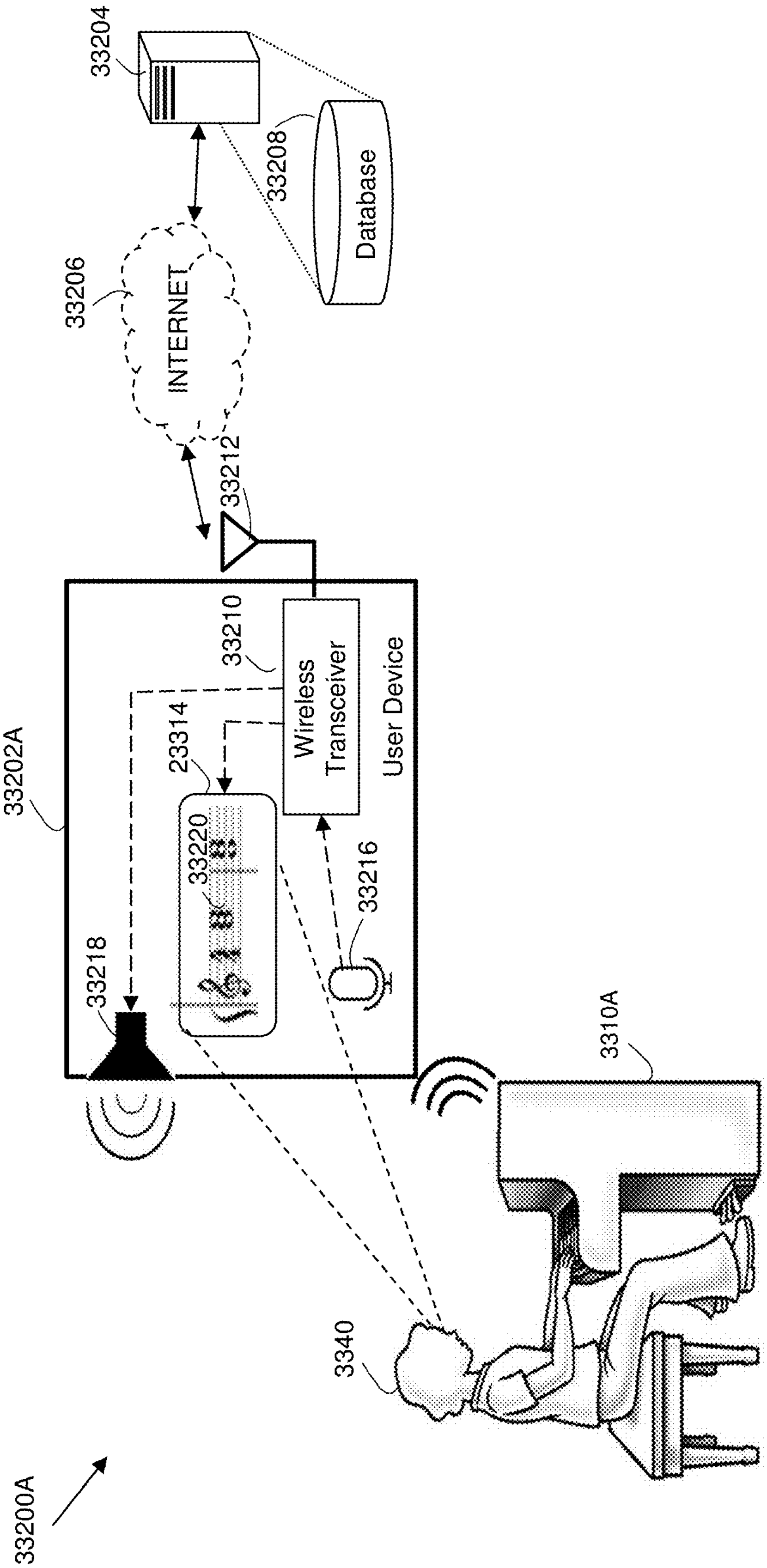
FIG. 33A schematically illustrates a system for adaptive and interactive teaching of music instrument playing, including a user device adapted to receive acoustic signals, and an external server and database configured to operatively interface with the user device over the Internet, according to some embodiments.

Reference is now made to FIG. 33A which schematically illustrates a system 33200A for adaptive and interactive teaching of music instrument playing, according to an exemplary embodiment of the present invention. The system 33200A may include a user device 33202A and a server 33204 which may communicate with one another over the Internet 33206, and a database 33208 operatively integrated with the server and which may store a library of musical pieces for playing by a user 3340 and a library of portions of musical pieces associated with recurring errors made by the user while practicing playing the musical pieces. Optionally, also stored in the database 33208 may be a library of corrective training exercises.

The user device 33202A may be identical to, similar to, part of, comprise, or integrated with, the computing device 100 shown in FIG. 30. In one example, the user device 33202A may be a smartphone or a tablet used mainly for the purpose of interacting with the user 3340 and the piano 3310A, while the processing is mainly performed in the server 33204. The user device 33202A may communicate with the server 33204 over the Internet 33206 through the wireless transceiver 33210 connected to the antenna 33212. It may be appreciated that, although reference is made to a piano 3310A in the exemplary system 33200A, other instruments of the bowed strings, woodwind, brass, percussion, keyboard, vocals, or the guitar family may be used.

The user device 33202A may receive the musical piece from the server 33204, over the Internet 33206, which may be displayed to the user 3340 via a display 33214 in the user device. Optionally, the display may be external to the user device 33202A. The sound generated by the piano 3310A may be captured by a microphone 33216 in the user device, where it is converted to a digital representation and sent to the server 204 over the Internet 33206 to be further processed therein. The user device 33202A may further comprise a device for emitting sound, such as a speaker 33218, which may audibly emit: the musical notes played by the user 3340 on the piano 3310A during a practice session.

In some embodiments, the system 33200A shown in FIG. 33A, or the user device 33202A, may be used with, integrated with, or used in combination with, a Virtual Reality (VR) system simulating a virtual environment to a person, and may be used by the VR system. The communication with the VR system may be wired or wireless, and the VR system may comprise a Head-Mounted Display (HMD).

The display 33214 in the user device 33202A may provide the person 3340 instructions on how to play the piano 3310A by displaying a sequence 33220 of musical symbols, which may be a simple training set for acquiring or enhancing the playing skills, or which may be according to musical notation standard or convention. For example, the sequence 33220 shown on the display 33214 may be part of, or an entire of, a musical piece. Further, the sequence 33220 shown on the display 33214 may be adapted to the specific played musical instrument, such as specially adapted to the piano 3310*k* in one example, the sequence 33220 shown on the display 33214 is a part of, or an entire of, a sheet music of a musical piece, and each of the musical symbols in the sequence may be according to a musical notation convention and typically includes lines, clefs, notes, and rests, and may notate pitch, tempo, meter, duration, or articulation of a note or a passage of music, and wherein the sequence.

The sequence 33220 may include one or more clefs that defines the pitch range or the tessitura of the symbol on which it is placed, one or more musical notes that denote a musical sound or the pitch and duration of a musical sound, one or more accidentals that denote a pitch or a pitch class, one or more key signatures that define the prevailing key of the music that follows, one or more time signatures that defines the meter of the music, one or more lines or a note relationships, one or more dynamics that indicate the relative intensity or volume of a musical line, one or more articulations that specify how to perform individual notes within a phrase or passage, one or more ornaments that modify the pitch pattern of an individual note, one or more octave signs, repetitions or codas, one or more pedal marks, or any combination thereof. To further illustrate how a sequence may appear on the display 33214, reference is also made to AG. 33E which schematically illustrates an exemplary displayed sequence 33221.

Figure 33B:
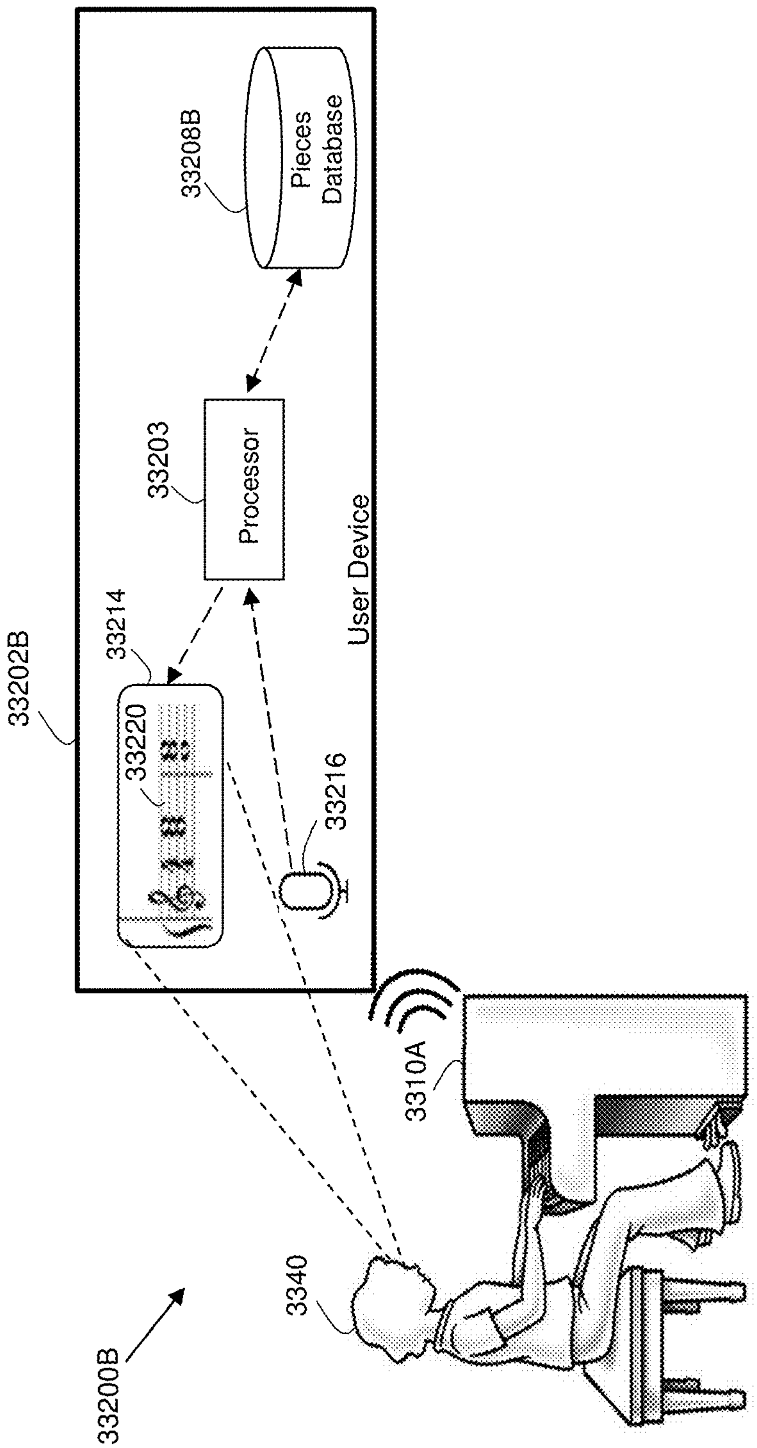
FIG. 33B schematically illustrates a system for adaptive and interactive teaching of music instrument playing including a user device adapted to receive acoustic signals from a musical instrument, and including an internal processor and database, according to some embodiments.
Figure 33C:
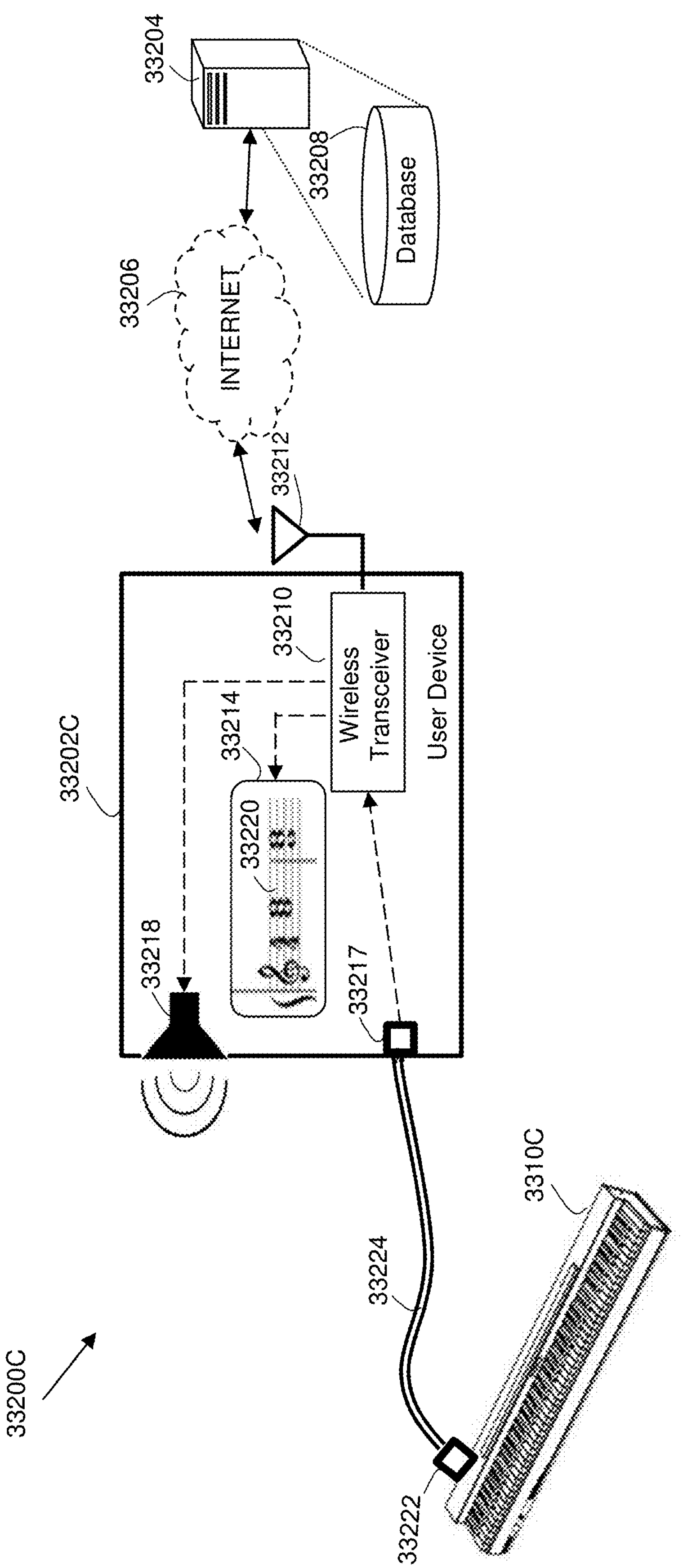
FIG. 33C schematically illustrates a system for adaptive and interactive teaching of music instrument playing including a user device adapted to receive audio (electric) signals from an electric musical instrument, and an external server and database configured to operatively interface with the user device over the Internet, according to some embodiments.

Reference is now made to FIG. 33B, FIG. 33C, and FIG. 330 which schematically illustrate systems 332008, 33200C and 33200D for adaptive and interactive teaching of music instrument playing, respectively, according to exemplary embodiments of the present invention.

The systems 33200B, 33200C, and 332000 may be functionally similar to system 33200A in AG. 33A in that they may allow for adaptive and interactive teaching of playing a musical instrument, and more particularly, providing a user with immediate feedback while playing a music piece. Additionally, the systems 332008, 33200C and 332000 (also 33200A) may allow creating corrective training exercises for subsequent practice by the user based on recurring mistakes performed by the user while playing the music piece.

In contrast with system shown in FIG. 33A, in FIG. 33B tile system 33200B may include processor 33203 and database 33208B stored in the user device 33202B, optionally obviating the need for the server 33204 and external database 33208, or for a connection to the Internet 33206. The user device 33202B may be wholly or partially functionally similar to user device 33202A in AG. 33A. Differences may include database storage of the music pieces and the common and recurring errors may be performed inside the user device in a database 33208B, and the processor 33203 may execute all necessary instructions to perform the required analyses without having to access the server 33204 and the external database 33208.

In FIG. 33C, the system 33200C is shown with a musical instrument which includes an electric piano 3310C and a user device 33202C configured to operate with the electric piano. The user device 33202C may be wholly or partially functionally similar to user device 33202A in FIG. 33A, the difference including that the user device is configured to receive electric signals from the electric piano 33100. This is in contract with the user device 33202A which includes a microphone to receive acoustic signals from the piano 3310A, as shown in FIG. 33A. The user device 33202C may include a connector 33217 which may be connected to a cable 33224 which may be additionally connected to a connector 33222 in the electric piano 33100, all of which allow electric signals to be transmitted from the electric piano to the user device 33202C. Optionally, the connector 33217 and 33222 may include midi connectors, and the cable may be a midi cable. Inside the user device 33202C, a connection enables the electric signals to be passed on to the wireless transceiver 33210 for transmitting the received electric signals by means of antenna 33212 over the Internet 33206 to the server 33204, and for receiving the musical pieces and corrective training exercises from the server 33204 among other data which may be interchanged between the user device 202C and the server 33204.

Figure 33D:
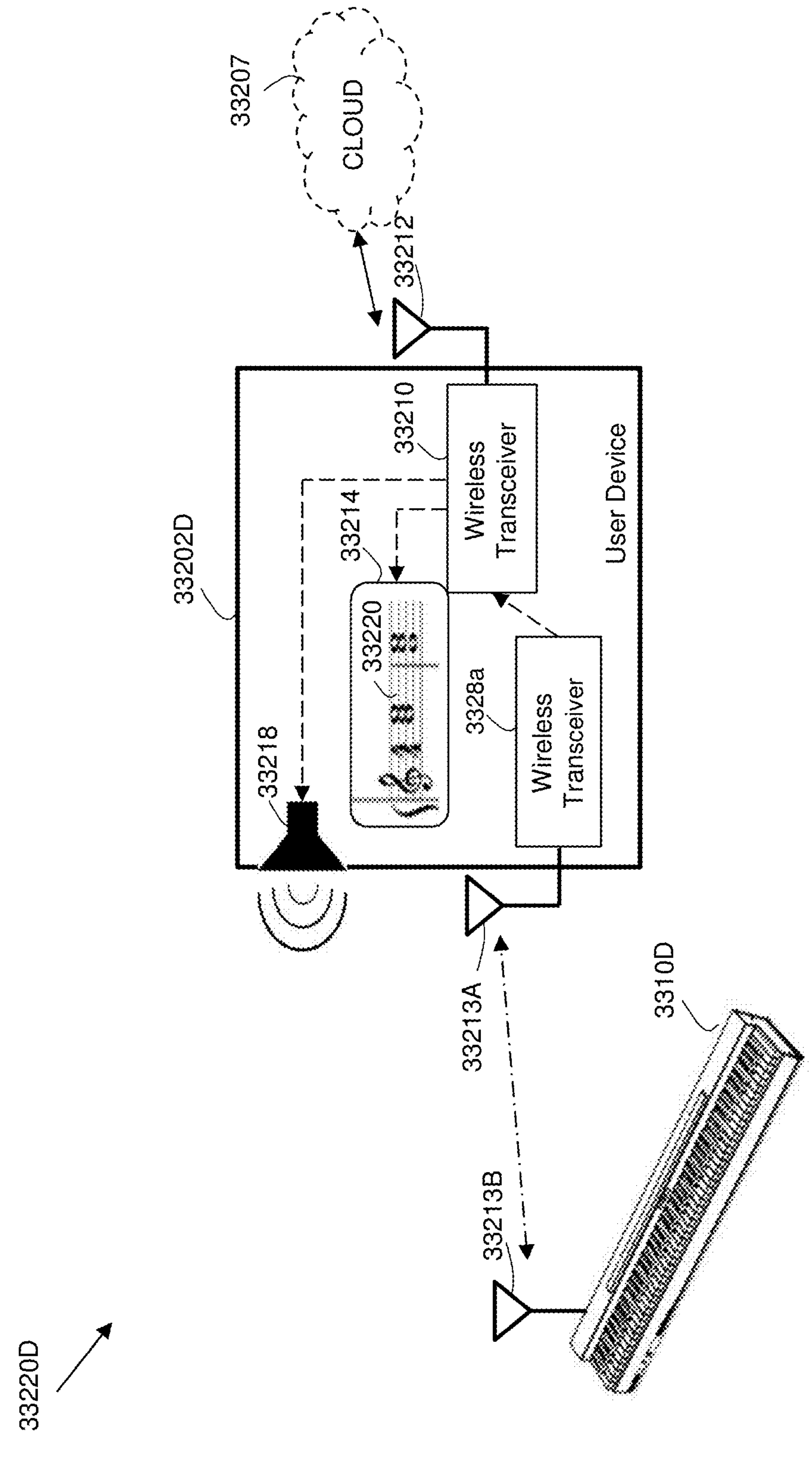
FIG. 33D schematically illustrates a system for adaptive and interactive teaching of music instrument playing including a user device adapted to receive audio (electric) signals from an electric musical instrument, and a cloud-based server and database configured to operatively interface with the user device over a wireless network, according to some embodiments.
Figure 33E:
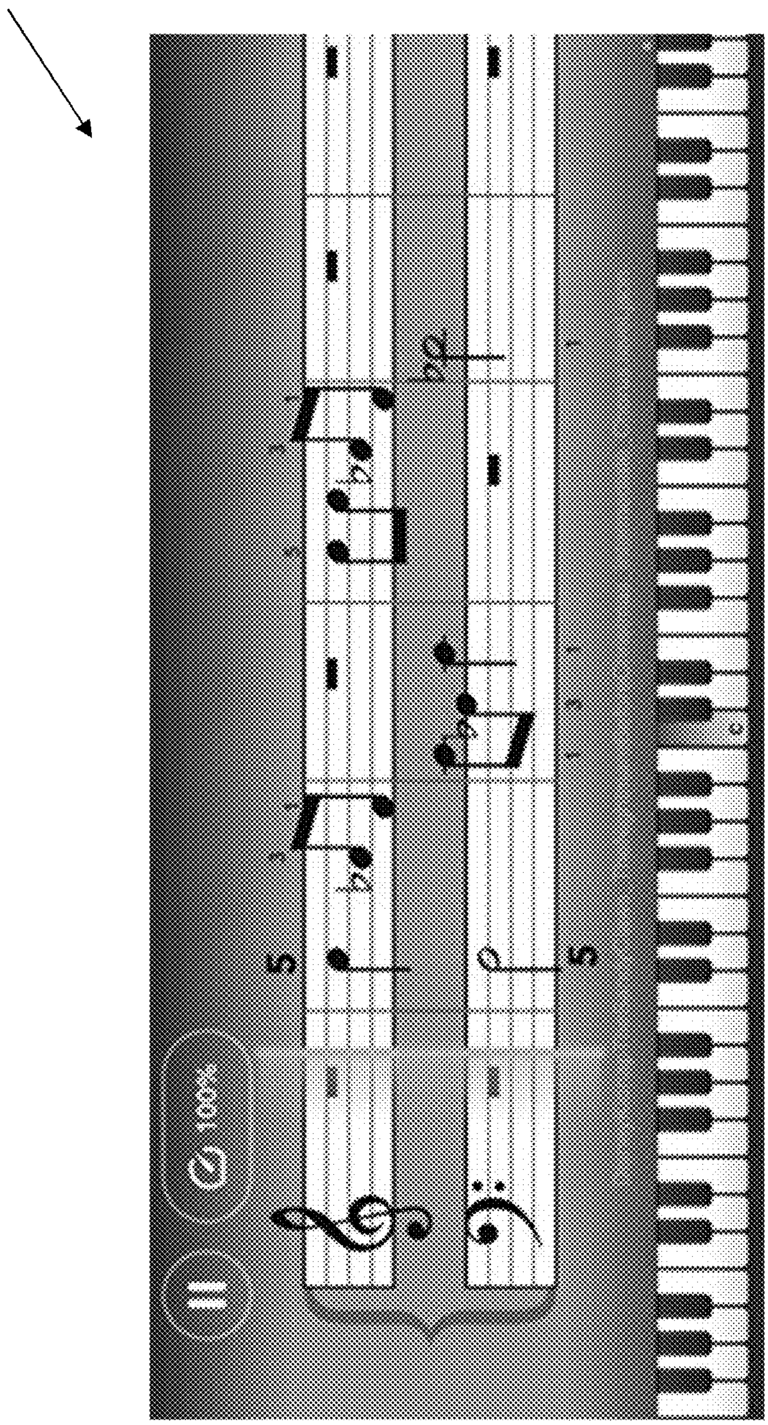
FIG. 33E schematically illustrates a sequence of a musical piece displayed to a user during a Music practice or exercise session, according to some embodiments.

In FIG. 33D, the system 33200D is shown with a musical instrument which includes a wireless electric piano 3310D and a user device 33202D configured to operate with the electric piano. The user device 33202D may be wholly or partially functionally similar to user device 33202A in FIG. 33A, the difference including that the user device is configured to receive electric signals from the electric piano 3310D by means of wireless communications. The wireless communications may include Wi-Fi, Bluetooth, or other suitable wireless communication means. This is in contrast with the user device 33202A which includes a microphone to receive acoustic signals from the piano 3310A, as shown in FIG. 33A. The user device 33202D may include a wireless antenna 33213A to receive electric signals which may be transmitted using wireless communications from a wireless antenna 33213B in the electric piano. Inside the user device 33202D, a connection enables the electric signals to be passed on to the wireless transceiver 33212 for transmitting by antenna 33212 to the cloud 33207, and for receiving the musical pieces and corrective training exercises from the cloud among other data which may be interchanged between the user device 332020 and the cloud.

Figure 34:
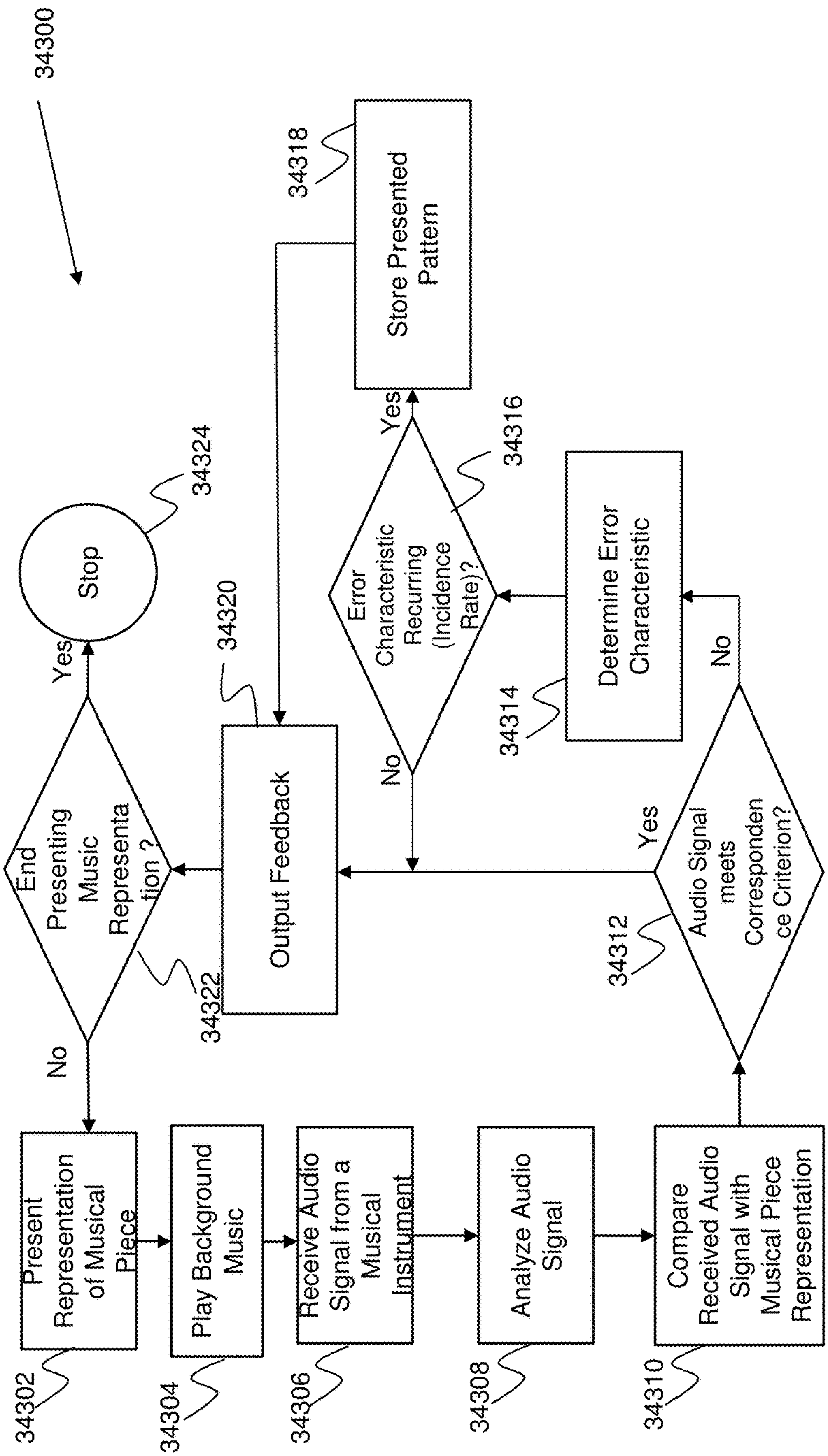
FIG. 34 is a flow chart showing steps of execution of a method of operation of a system for adaptive and interactive teaching of playing a musical instrument, according to some embodiments.

Reference is now made to FIG. 34 which is a flow chart showing steps of execution of a method 34300 of operation of the system for adaptive and interactive teaching of playing a musical instrument, according to an exemplary embodiment of the present invention. For exemplary purposes, in describing the execution of the method 34300, reference may be made to the system and the system components shown in FIG. 30-FIG. 33D. The skilled person may appreciate that the method may be practiced using more or less steps, skipping steps, or with a different sequence of steps.

At optional step 34302, the computing device 30100 may exhibit a musical piece on a display which may be integral to the computing device or may be an external display connected to the device. The musical piece may be retrieved by the processor 30102 from the storage device 30110 and transferred through the local interface 30108 to I/O devices 30106 which may include the integral display. Alternatively, the musical piece may be transferred through the local interface 30108 to the externally connected display.

At optional step 34304, the computing device 30100 may play background music to accompany the user during a learning session. The background music, which may also be stored in the storage device 30110, may be retrieved by the processor 30102 for playing through the I/O devices 30106 which may include the speaker 33218. Alternatively, the speaker may be external to the computing device 30100 and may be accessed from the computing device through a wired or wireless connection.

At optional step 34306, the computing device 30100 may receive an audio signal from the musical instrument 3010. The audio signal may be received through the interface unit 3020 which may convert sound waves from the instrument 3010 into electrical signals. Alternatively, the audio signal may be an electric signal produced by the instrument 3010 and which may be transferred through the interface unit 3020 to the computing device 30100. Initial processing of the received audio signal may be done by the processor 30102 using the audio conversion module 30120 in software 30112. Using the audio conversion module 30120, the audio signals may be digitally sampled for further processing using the music playing recognition module 30116.

At optional step 34308, the digitally sampled audio signal is recognition analyzed by the processor 102 using the music playing recognition module 30116 in the software 30112. The analysis includes use of (e.g., known) sound recognition algorithms, some examples of which were previously mentioned with reference to the description of FIG. 31. The sound recognition algorithms may serve to reconstruct the characteristics of the musical note (or notes) played by the instrument 3010 and represented by the audio signal.

At optional step 34310, the processor 30102 using the recognition processing module 30118 may compare the characteristics of the musical note (or notes) represented by the audio signal with that (or those) of the corresponding music note (or notes) in the displayed musical piece. The recognition processing module 30118 may include (e.g., known) algorithms suitable for performing the comparison.

At optional step 34312, the processor 30102, based on the comparison, may determine if the audio signal meets the predetermined correspondence criterion. If yes, the note (or notes) played by the instrument 3010 and represented by the audio signal were played correctly, and the method may continue at optional step 34320, If no, there is a mistake in the note (or notes) played by instrument 3010, in which case the method continues at optional step 34314.

At optional step 34314, the processor 30102 may determine the characteristic of the mistake (error characteristic) to further evaluate if it is a random mistake or a recurring mistake. The error characteristic may include, for example, a mismatch in pitch in the played note (or notes) compared to the corresponding note (or notes) in the displayed musical piece, a mismatch in timing of playing of the played note (or notes) compared to the corresponding note (or notes) in the displayed musical piece, and the degree of cleanliness in the played note (or notes).

At optional step 3431, the processor 30102 may determine if the mistake is a random error or a recurring mistake optionally based on the error characteristic. A mistake which is not repeated at all, or not repeated at a certain rate and/or with certain associated statistics, such as mistakes occurring less than a predetermined percentage of times, for example, less than 30%, less than 20%, less than 1.0%, less than 5%, or never more than twice in a row may he considered a random error.

A mistake which is repeated (e.g., in associate with certain statistics), such as is mistake which is repeated more than predetermined percentage of times, or appears more than a predetermined number of times repeatedly may undergo further evaluation to determine if it is a recurring mistake or a random mistake. For example, a mistake in a presented pattern which involves a mismatch in timing and a second mistake in a temporally spaced same pattern which involves a mismatch in pitch may not be considered a recurring error as the error characteristic is not the same. Instead, it may be considered a random error. On the other hand, for example, if both mistakes may be attributed to an error in timing, these may then be considered potentially recurring mistakes. Once potentially recurring mistakes have been identified, the processor 30102 may calculate an incidence rate associated with a number of times the same mistake is repeated in the musical piece and compare the incidence rate with a predetermined recurrence rate criterion. The predetermined recurrence rate criterion may define a threshold at which the number of repeated mistakes made within a certain period of time, and/or number of repeated mistakes made while playing a musical piece and/or exercise, or a plurality of same or different musical pieces and/or exercises, is equal to or exceeds the threshold, in which case the potentially recurring mistake may be classified as a recurring mistake. A potentially recurring mistake below the threshold may be classified as a random mistake. If the mistake is a random mistake, continue to step 34320. If the mistake is a recurring mistake continue to step 34318.

At optional step 34318, the processor 30102 may store the presented pattern associated with recurring mistakes in the storage device 30110 for use in the preparation of corrective training exercises for practice sessions. Optionally (not shown), the displayed note (or notes) associated with random mistakes committed by the user may also be stored in the storage device 110 for subsequent practice. The stored information may be removed once the user correctly plays the presented patterns (and optionally the note or notes associated with random errors), conforming to a predetermined criteria for removal of the stored information.

At optional step 34320, feedback information may be provided, optionally in real-time, by the computing device 30100 for improving the user's playing. The feedback may include visual display of the positive and negative feedback indications, as shown in the non-limiting examples of FIG. 35A-35C.

Figure 35A:
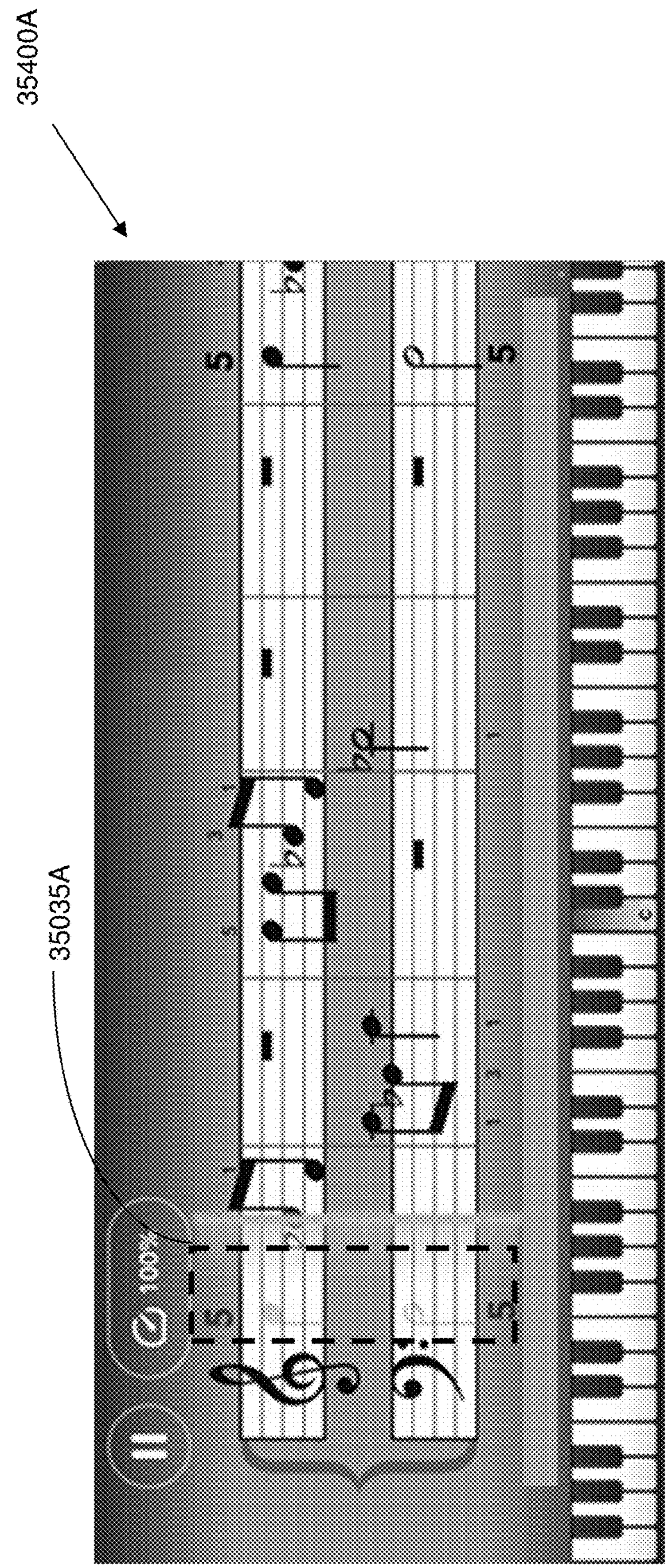
FIG. 35A schematically illustrates a positive feedback indication associated with correct playing of the sequence (or a portion thereof) displayed on a sequence of a musical piece displayed to the user during a music practice or exercise session, according to some embodiments.

In FIG. 35A is shown the positive feedback indication on the displayed musical piece 35400A by representing the correctly played notes in "green", schematically designated by means of dash-type frame 35035A.

Figure 35B:
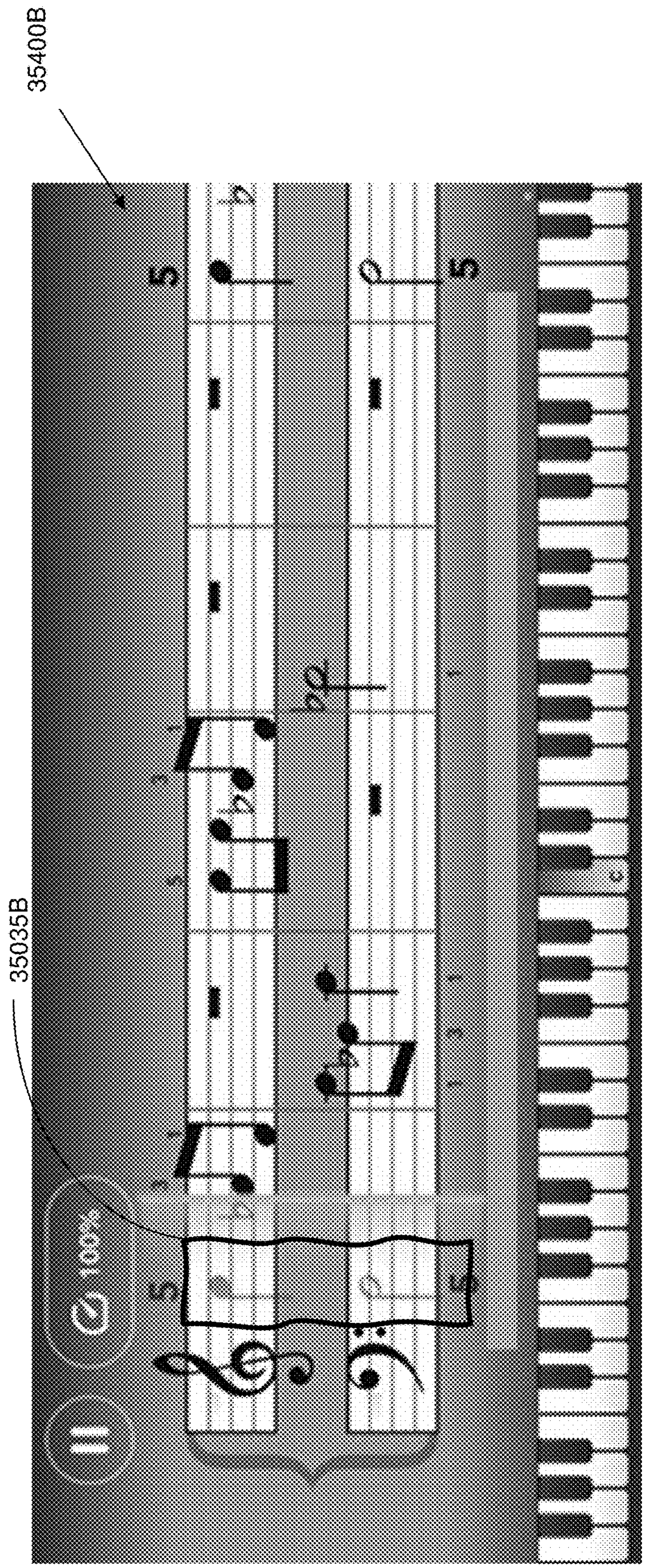
FIG. 35B schematically illustrates a negative feedback indication associated with random mistakes (errors) made by the user or erroneously generated by the system, as displayed on a sequence of a musical piece displayed to the user during a Music practice or exercise session, according to some embodiments.

In FIG. 35B is shown the negative feedback indication associated with random mistakes on the displayed musical piece 35400B by representing the incorrectly played notes in "red", schematically designated by means of scribble and solid-type frame 35035B.

Figure 35C:
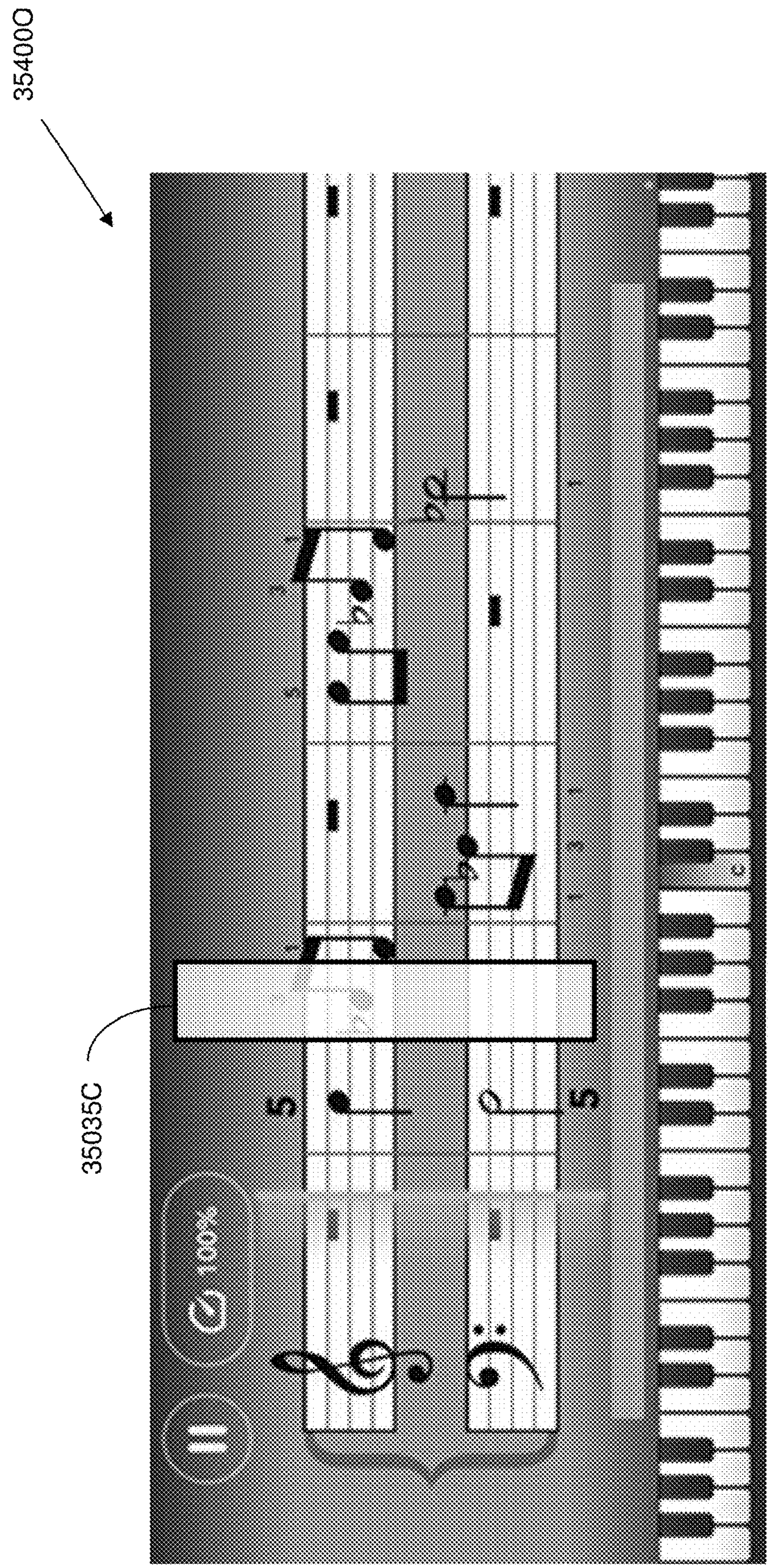
FIG. 35C schematically illustrates a negative feedback indication associated with recurring mistakes (errors) made by the user or erroneously generated by the system, as displayed on a sequence of a musical piece displayed to the user during a music practice or exercise session, according to some embodiments.

In FIG. 35C is shown the negative feedback indication associated with recurring mistakes on the displayed musical piece 35400C by representing the incorrectly played notes in "gray", schematically designated by grayed rectangular "ignore" area 35035C.

It may be appreciated that there may be numerous other ways of visually providing the positive and negative feedback indication. Furthermore, the positive and negative feedback indications may additionally or alternatively include use of sound which may be emitted through the speaker, for example, using different types of tones to represent the different types of feedback indication. It may be further appreciated that, in the case of mistakes associated with random errors, the incorrectly played notes may be presented in real-time for the user to repeat playing of the notes, additionally or alternatively to the visual and/or audible feedback indicators.

At optional step 34322, the processor 30102 may evaluate if the complete musical piece (all of the sections) has been displayed to the user. If no, the computing device 30100 may display a new section and steps 34302-345322 may be repeated for the section and for the following sections which have not been displayed until the whole musical piece has been displayed. Once finished, the execution of the method of operation is completed, as indicated by Stop at optional step 34324. Optionally, the user may stop the execution of the method of operation, as indicated by Stop at optional step 34324.

At optional step 34324, the computing device 30100 may prepare a new set of practice sessions for the user, optionally based on the corrective training exercises, and may provide a grade score associated with the correctness of the playing of the musical piece.

The corrective training exercises may be suggested by the system to the user based on ranking (or weighted), or displayed to the user depending on the rate of recurrence of the corresponding mistake. The exercises may include an indication to the user as to which exercise addresses which mistake (tempo, pitch, fingering, touch (e.g., staccato, legato, non-legato,) a etc.), replaying the mistake made by the user, and providing some tutorial how it should be played.

Figure 36:
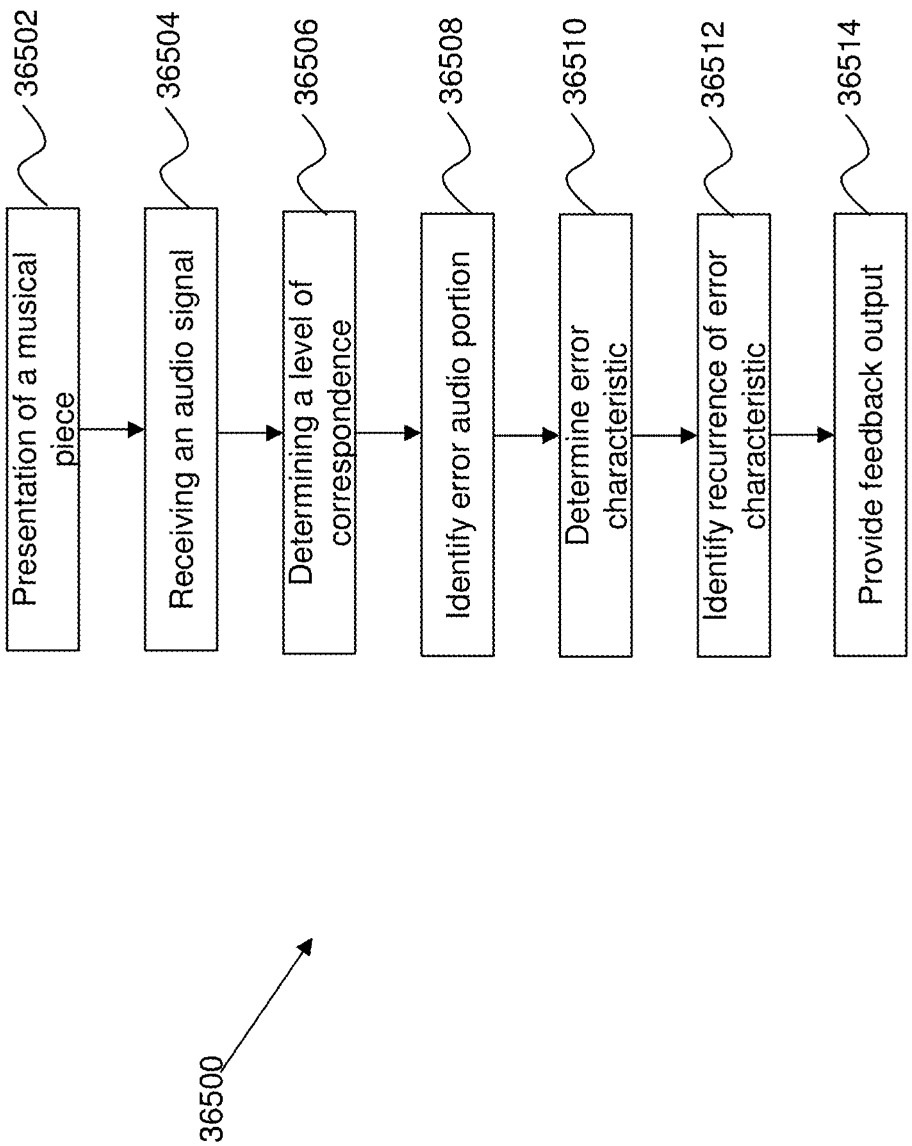
FIG. 36 is a flow chart of a method of operation of the system for adaptive and interactive teaching of playing a musical instrument, according to some embodiments.

Reference is now made to FIG. 36 which is a flow chart of a method 36500 of operation of the system for adaptive and interactive teaching of playing a musical instrument, according to an exemplary alternate embodiment of the present invention. For exemplary purposes, in describing the execution of the method 36500, reference may be made to the system and to one or more of the system components shown in FIG. 30 and FIG. 31. The steps described present the process of generating a feedback output to the user playing a music piece along. The skilled person may appreciate that the method may be practiced using more or less steps, skipping steps, or with a different sequence of steps.

At optional step 36502, the computing device 30100 may present the user with a representation of the musical piece to be played by the user.

At optional step 36504, the computing device 30100 may receive the audio signal relating to the instrument output provided by the music instrument played by the user.

At optional step 36506, the computing device 30100 may determine the level of correspondence between the received audio signal and the representation of the musical piece presented to the user.

At optional step 36508, the computing device 30100 may identify the audio signal portion for which the determined level of correspondence does not meet a correspondence criterion.

At optional step 36510, the computing device 30100 may determine the error characteristic for the identified audio signal portion.

At optional step 36512, the computing device 30100 may identify whether there is a recurrence of the error characteristic for at least one other received audio signal portion.

At optional step 36514, the computing device 30100 may provide a feedback output related to identified recurrences of the error characteristic.

Figure 37:
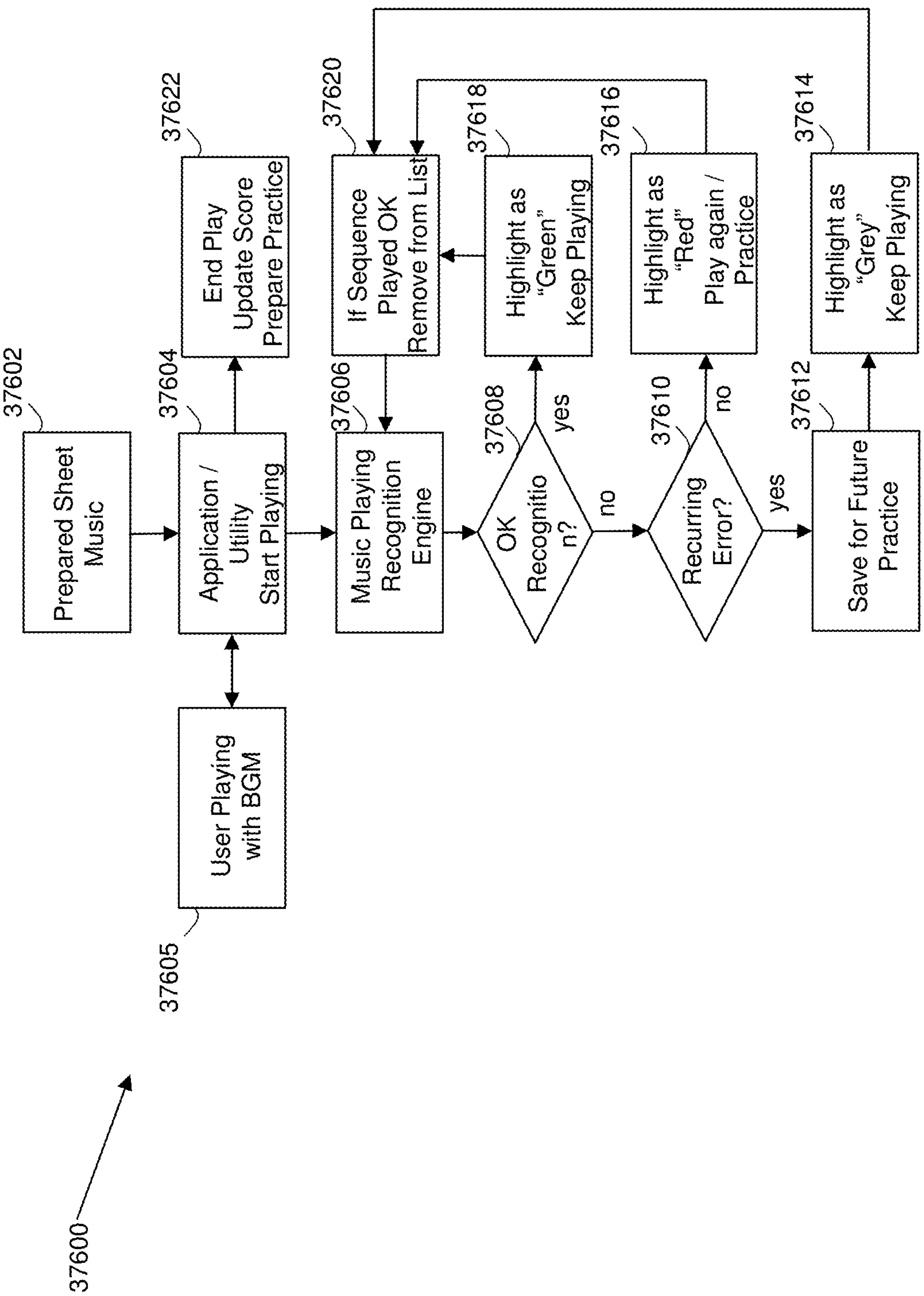
FIG. 37 is a flow chart of a method of operation of the system for adaptive and interactive teaching of playing a musical instrument, according to some alternative embodiments.

Reference is now made to FIG. 37 which is a flow chart of a method 37600 of operation of the system for adaptive and interactive teaching of playing, a musical instrument, according to an exemplary alternate embodiment of the present invention. For exemplary purposes, in describing the execution of the method 37600, reference may be made to the system shown in FIG. 30 and FIG. 31. The steps described present the process of feedback to the user while playing a music piece along with the processing of what will be the user's future practice based on the user's current playing abilities. The skilled person may appreciate that the method may be practiced using more or less steps, skipping steps, or with a different sequence of steps.

At optional step 37502, the computing device may extract a prepared musical piece from storage for display to the user.

At optional step 37604, the computing device 30100 may exhibit a musical piece on the display.

At optional step 37605, the computing device 30100 may play background music to accompany the user during a learning session. A jamming session may be included as part of the background music.

At optional step 37606, the result of the playing is passed to an online recognition engine in computing device 30100 which performs recognition and compares it to the expected rate/chard and possibly other technique related features such as strumming, rhythm, transition, tempo, etc.

At optional step 37608, if the recognition is OK, go to optional step 37618. If the recognition is bad or there is no recognition (no playing) continue.

At optional step 37610, test if the error encountered in the previous playing corresponds with the error now resulting in a recurring error. If the error is a recurring error go to 37612. If not a recurring error, go to optional step 37616.

At optional step 37612, the sequence (sequence of notes/chords, technique, the sound of a single chord, rhythm, tempo, strumming, etc.) is saved for the future.

At optional step 37614, a visual indication is provided in the sequence in "grey" indicative of a recurring error (e.g., see AG. 35C). The user may continue to play. Go to optional step 37620.

At optional step 37616, a visual indication is provided in the sequence in "red" indicative of a non-recurring error or non-playing (e.g., see FIG. 35B), The user may continue to play again the error sequence as practice. Go to step 37620.

At optional step 37618, a visual indication is provided in the sequence in "green" indicative of correct playing (e.g., see FIG. 35A). The next section is examined.

At optional step 37620, if the user plays the sequence OK, also in later stages for playing which had included errors, possibly as a result of improvement due to continued practice, the sequence is removed from the list.

At optional step 37622, once the playing is finished, either by the user or because the end of the music piece has been reached, the current list of recurring errors is processed and a new set of practice sessions (tutorial) is created, and optionally in parallel, a score is assigned to the user for the playing and other indications are prepared and may be presented to the user.

Additional Examples

Example 1 pertains to a method for providing a session of music learning to a user, comprising

- setting a sound capturing configuration relating to at least one microphone of a computerized device;
- providing the user with musical notations to be executed through the user for generating user-generated sound;
- capturing, through the at least one microphone, sound which includes user-generated sound produced by the user to produce user-generated or captured sound data;
- processing the user-generated sound data; and
- determining, based on the processing of the user-generated sound data, whether the sound capturing configuration is to be adapted or not.

In Example 2, the subject matter of Example 1 may optionally further include adapting the sound capturing configuration based on the user-generated or captured sound data.

In Example 3, the subject matter of Examples 1 or 2 may optionally further include, wherein a sound capturing configuration pertains to a configuration of at least one microphone.

In example 4, the subject matter of any one or more of the preceding examples may optionally include wherein a sound capturing configuration pertains to a selection of one or more microphones of a plurality of microphones.

In example 5, the subject matter of any one or more of the preceding examples may optionally include, wherein adapting the sound capturing configuration includes adapting a configuration of the at least one microphone.

In example 6, the subject matter of any one or more of the examples 2 to 4 may optionally include wherein adapting the sound capturing configuration includes adapting a microphone selection.

In example 7, the subject matter of any one or more of the preceding examples may optionally include, wherein the captured sound further includes an audio playback.

In example 8, the subject matter of example 7 may optionally include comprising recognizing the user-generated sound from the captured sound.

In example 9, the subject matter of example 8 may optionally comprise adapting the sound capturing configuration to improve recognition of the user-generated sound from the captured sound also comprising the audio playback.

In example 10, the subject: matter of example 9 may further comprise determining, based on the user-generated sound data, whether an audio playback configuration is to he adapted to improve recognizing of the user-generated sound.

In example 11, the subject matter of example 10 may further comprise adapting, based on the user-generated sound data, the audio playback configuration to improve recognizing of the user-generated sound.

In example 12, the subject matter of examples 10 and/or 11 may optionally include, wherein the audio playback configuration pertains to a speaker configuration.

In example 13, the subject matter of example 12 may optionally include wherein the speaker configuration pertains to a speaker output configuration and/or to a speaker selection.

In example 14, the subject matter of any one or more of the examples 1 to 13 may optionally comprise transcribing the user-generated sound into corresponding notation.

In example 15, the subject matter of example 14 may optionally include wherein the notation is descriptive of one or more of the following: a note pitch, note value, tempo, meter, and key.

Example 16 pertains to a method for providing a session of music learning to a user, comprising:

- obtaining a sound capturing and playback configuration;
- setting a first parameter of the at least one speaker or the at least one microphone in accordance with the initial configuration;
- displaying to the user musical notations based on which the user produces user-generated sound;
- playing background music (BGM) of a piece selected by the user through the at least one speaker configured in accordance with the initial configuration;
- capturing, through the at least one microphone, composite sound including, for example, user-generated sound, the BGM and/or environmental noise;
- processing the captured composite sound to recognize the User-generated sound; and
- determining, based on the processing, whether the sound capturing and/or playback configuration is to be adapted to improve recognizing the user-generated sound.

In Example 17, the subject matter of example 16 may further comprise adapting, based on the recognized user-generated sound, the sound capturing and/or playback configuration to improve recognizing the user-generated sound.

In example 18, the subject matter of example 17 may further comprise, optionally, wherein the adapting of the sound capturing and/or playback configuration includes setting a microphone and/or audio playback configuration, and/or selecting at least one speaker of a plurality of speakers and/or selecting at least one microphone of a plurality of microphones.

In example 19, the subject matter of examples 17 and/or 18 may optionally further comprise wherein the processing includes suppressing the BGM.

In example 20, the subject matter of any one or more of the examples 16 to 20 may optionally further comprise seizing displaying to the user musical notations if a stopping criterion is met.

In example 21, the subject: matter of example 20 may optionally further comprise wherein the stopping criteria pertains to recognition results being below a predetermined passing threshold in at least one aspect and/or failure of the user in completing playing tasks.

In example 22, the subject matter of any one or more of the examples 16 to 21 may further comprise wherein the musical notations are descriptive of one of the following: note pitch, length, chords, note value, key, tempo, instrumentation, or any combination of the aforesaid.

In example 23, the subject matter of any one or more of the examples 16 to 22 may further comprise recognizing the user-generated sound comprises determining a sound quality of the captured composite sound comprising the BGM and the user-generated sound.

In example 24, the subject matter of example 23 may optionally further comprise adapting the sound capturing and/or playback configuration to improve the sound quality of the captured composite sound.

In example 25, the subject matter of example 24 may optionally further comprise wherein an adapted sound capturing and/or playback configuration provides an improved user experience compared to a user experience prior to the adaptation.

In example 26, the subject matter of example 25 may optionally further comprise wherein the user experience is determined in accordance with a success in completing instrument playing and/or singing tasks in accordance with the displayed musical notations.

In example 27, the subject matter of examples 25 or 26 may optionally further comprise determining a level of correspondence between user-generated sound and the displayed musical notes.

In example 28, the subject matter of example 27 may optionally further comprise wherein the user experience is determined based on the level of correspondence.

In example 29 the subject matter of examples 27 or 28 may optionally further comprise updating the BGM in accordance with the level of correspondence.

In example 30, the subject matter of any one or more of the examples 16 to 29 may optionally further comprise wherein the processing of the captured composite sound includes:

- determining a feedback relating to the user-generated sound; and
- providing the feedback to the user.

In example 31, the subject matter of any one or more of the examples 16 to 30 may further comprise capturing through the at least one microphone, user-generated sound produced by at: least one other user in a collaborative playing setting; and

- providing, through the at least one speaker, an audio output relating to the user-generated sound produced by the at least one other user such that the composite sound additionally includes user-generated sound produced by the at least one other users.

In example 32, the subject matter of example 31 may optionally further comprise, wherein the processing of the composite sound is performed to recognize the user-generated sound of a selected user.

In example 33 the subject matter of example 32 may optionally further comprise wherein the processing comprises suppressing the role of the at least one other user in the captured composite sound to recognize the user-generated sound of the selected user.

In example 34 the subject matter of any one or more of the examples 16 to 33 may optionally further comprise wherein the adapting of the sound capturing and/or playback configuration is performed based on an output received from a sensor including one or more of the following: a camera, a linear acceleration sensor, an angular acceleration sensor and, a gyroscope.

Example 35 pertains to a system configured to provide a music learning session, comprising;

- a memory for storing data and executable instructions; and
- a processor that is configured to execute the execution instructions to result in the following:
- setting a sound capturing configuration relating to at least one microphone of a computerized device;
- providing the user with musical notations to be executed through the user for generating user-generated sound;
- capturing, through the at least one microphone, sound which includes user-generated sound produced by the user to produce user-generated sound data;
- processing the user-generated sound data; and
- determining, based on the processing of the user-generated sound data, whether the sound capturing configuration is to be adapted or not.

In example 36, the subject matter of example 35 may optionally further comprise adapting the sound capturing configuration based on the user-generated sound data.

In example 37, examples 35 or 36 may optionally further comprise wherein a sound capturing configuration pertains to a configuration of at least one microphone.

In example 38, any one or more of the examples 35 to 37 may optionally further comprise, wherein a sound capturing configuration pertains to a selection of one or more microphones of a plurality of microphones.

In example 39, the subject matter of any or more of the examples 35 to 38 may optionally further comprise wherein adapting the sound capturing configuration includes adapting a configuration of the at least one microphone.

In example 40, the subject matter of any one or more of the examples 35 to 39 may optionally further comprise adapting the sound capturing configuration includes adapting a microphone selection.

In example 41, the subject matter of any one or more of the examples 35 to 40 may optionally further comprise wherein the captured sound further includes an audio playback.

In example 42, the subject matter of example 41 may optionally further comprise recognizing the user-generated sound from the captured sound.

In example 43, the subject matter of example 42 may optionally further comprise adapting the sound capturing configuration to improve the recognizing of the user-generated sound from the captured sound also comprising the audio playback.

In example 44 the subject matter of any one or more of the examples 35 to 43 may optionally further comprise determining, based on the user-generated sound data, whether an audio playback configuration is to he adapted to improve recognizing of the user-generated sound.

In example 45, the subject matter of example 44 may optionally further comprise adapting, based on the user-generated sound data, the audio playback configuration to improve recognizing of the user-generated sound.

In example 46, the subject matter of examples 44 and/or 45 may optionally further comprise wherein the audio playback configuration pertains to a speaker configuration.

In example 47 the subject matter of example 46 may optionally further comprise wherein the speaker configuration pertains to a speaker output configuration and/or to a speaker selection.

In example 48 the subject matter of any one or more of the examples 35 to 47 may optionally further comprise transcribing the user-generated sound into corresponding notation.

In example 49 the subject: matter of example 48 may optionally further comprise wherein the notation is descriptive of one or more of the following: a note pitch, note value, tempo, meter, and key.

Example 50 pertains to a system configured to provide a session of music learning to a user, comprising:

- a memory for storing data and executable instructions; and
- a processor that is configured to execute the execution instructions to result in the following:
- obtaining a sound capturing and playback configuration;
- setting a first parameter of the at least one speaker or the at least one microphone in accordance with the initial configuration;
- displaying to the user musical notations based on which the user produces user-generated sound;
- playing background music (BGM) of a piece selected by the user through the at least one speaker configured in accordance with the initial configuration;
- capturing, through the at: least one microphone, composite sound including the BGM and user-generated sound;
- processing the captured composite sound to recognize the user-generated sound; and
- determining, based on the processing, whether the sound capturing and/or playback configuration is to be adapted to improve recognizing the user-generated sound.

In example 51, the subject matter of example 50 may further comprise adapting, based on the recognized user-generated sound, the sound capturing and/or playback configuration to improve recognizing the user-generated sound.

In example 52 the subject matter of example 51 may further comprise wherein the adapting of the sound capturing and/or playback configuration includes setting a microphone and/or audio playback configuration, and/or selecting at least one speaker of a plurality of speakers and/or selecting at: least: one microphone of a plurality of microphones.

In example 53 the subject matter of any one or more of the examples 50 to 52 may further comprise wherein the processing includes suppressing the BGM.

In example 54 the subject matter of any one or more of the examples 50 to 53 may further comprise, further comprising seizing displaying to the user musical notations when a stopping criterion is met.

In example 55 the subject matter of example 54 may optionally further comprise wherein the stopping criteria pertains to recognition results being below a predetermined passing threshold in at least one aspect and/or failure of the user in completing playing tasks.

In example 56 the subject matter of any one or more of the examples 50 to 55 may optionally further comprise wherein the musical notations are descriptive of one of the following: note pitch, length, chords, note value, key, tempo, instrumentation, or any combination of the aforesaid In example 57 the subject matter of any one or more of the examples 50 to 56 may optionally further comprise wherein recognizing the user-generated sound comprises determining a sound quality of the captured composite sound comprising the BGM and the user-generated sound.

In example 58 the subject matter of example 57 may optionally further comprise: adapting the sound capturing and/or playback configuration to improve the sound quality of the captured composite sound.

In example 59 the subject matter of example 58 may optionally further comprise wherein an adapted sound capturing and/or playback configuration provides an improved user experience compared to a user experience prior to the adaptation.

In example 60 the subject matter of example 59 may optionally further comprise wherein the user experience is determined in accordance with a success in completing instrument playing and/or singing tasks in accordance with the displayed musical notations.

In example 61 the subject: matter any one or more of the examples 50 to 60 may optionally further comprise: determining a level of correspondence between user-generated sound and the displayed musical notations In example 62, the subject matter of example 61 may optionally further comprise wherein the user experience is determined based on the level of correspondence.

In example 63, the subject matter of examples 61 and/or 62 may optionally further comprise updating the BGM in accordance with the level of correspondence.

In example 64, the subject matter of any one or more of the examples 50 to 63 may optionally further comprise wherein the processing of the captured composite sound includes:

- determining a feedback rebating to the user-generated sound; and
- providing the feedback to the user.

In example 65, the subject matter of any one or more of the examples 50 to 64 may optionally further comprise:

- capturing through the at least one microphone, user-generated sound produced by at least one other user in a collaborative playing setting; and
- providing, through the at least one speaker, an audio output relating to the user-generated sound produced by the at least one other user such that the composite sound additionally includes user-generated sound produced by the at least one other users.

In example 66 the subject matter of example 65 may optionally further comprise, wherein the processing of the composite sound is performed to recognize the user-generated sound of a selected user.

In example 67 the subject matter of example 66 may optionally further comprise wherein the processing comprises suppressing the role of the at least one other user in the captured composite sound to recognize the user-generated sound of the selected user.

In example 68 the subject matter of any one or more of the examples 50 to 67 may optionally further comprise, wherein the adapting of the sound capturing and/or playback configuration is performed based on an output received from a sensor including one or more of the following: a camera, a linear acceleration sensor, an angular acceleration sensor and, a gyroscope.

Example 69 pertains to a method for use with a musical piece, or part thereof, comprising: presenting, by at least one client device to a plurality of users, a corresponding plurality of sequences of musical symbols to be cooperatively played by the plurality of users using a plurality of instruments;

- capturing instrument outputs produced by the plurality of instruments to generate audio data descriptive of the captured instrument outputs;
- analyzing the audio data for determining a level of correspondence between the captured instrument outputs and the plurality of musical symbols presented to the plurality of users; and
- presenting, based on the level of correspondence, an adapted or non-adapted sequence of music symbols at least one of the plurality of players.

In Example 70 the subject matter of Example 69 may optionally further comprise wherein the at least one client device outputs accompanying background music (BGM) that corresponds with the plurality of musical symbols presented to the plurality of users.

In example 71, the subject matter of examples 69 and/or 70 may optionally further comprise wherein the cooperative playing of instruments by the plurality of users includes playing the instruments in timed coordination, e.g., at a same location or at different locations.

In Example 72, the subject matter of any one or more of examples 69 to 71 may optionally further comprise wherein the cooperative playing of instruments by the plurality of users includes playing the instruments (e.g., in different time periods or a same time period for instance in timed coordination or substantially timed coordination), e.g., at a same location or at different locations.

In example 73, the subject matter of any one or more of examples 69 to 72 may optionally further comprise capturing the instrument outputs (e.g., in different time periods or a same time period for instance in timed coordination or substantially timed coordination), e.g., at a same location or at different locations; and merging the captured instrument outputs to arrive at a merged instrument output.

In example 74, the subject matter of example 73 may optionally further comprise analyzing a level of correspondence of the merged instrument output with the plurality of sequences of musical symbols presented to the users.

In example 75, the subject matter of any one or more examples 69 to 74 may optionally further comprise wherein the instrument outputs comprise sounds captured by a microphone and/or audio signals captured by a wired or wireless receiver device.

Example 76 pertains to a system for use with a musical piece, or part thereof, comprising: one or more processors; and one or more memories storing software code portions executable by the one or more processors to cause the system to perform the following:

- presenting, by at least one client device to a plurality of users, a corresponding plurality of sequences of musical symbols to be cooperatively played by the plurality of users using a plurality of instruments;
- capturing instrument outputs produced by the plurality of instruments to generate audio data descriptive of the captured instrument outputs;
- analyzing the audio data for determining a level of correspondence between the captured instrument outputs and the plurality of musical symbols presented to the plurality of users; and
- presenting, based on the level of correspondence, an adapted or non-adapted sequence of music symbols at least one of the plurality of players In Example 77, the subject matter of example 76 may optionally further comprise wherein the at least one client device outputs accompanying background music (BGM) that corresponds with the plurality of musical symbols presented to the plurality of users.

In Example 78, the subject matter of examples 76 and/or 77 may optionally further comprise wherein the cooperative playing of instruments by the plurality of users includes playing the instruments in timed coordination (e.g., synchronously) or substantially timed coordination, e.g., at a same location or at different locations.

In example 79, the subject matter of any one or more of examples 76 to 77 may optionally further comprise wherein the cooperative playing of instruments by the plurality of users includes playing the instruments in different time periods, e.g., at a same location or at different locations.

In example 80, the subject matter of any one or more of the examples 76 to 79 may optionally further comprise capturing the instrument outputs responsively produced by the plurality of users; and merging the captured instrument outputs to arrive at a merged instrument output.

In example 81, the subject matter of example 80 may optionally further comprise analyzing a level of correspondence of the merged sound with the plurality of sequences of musical symbols presented to the users.

In example 82 the subject: matter of any one or more of the examples 76 to 81 may optionally further comprise wherein the instrument outputs comprise sounds captured by a microphone and/or audio signals captured by a wired or wireless receiver device.

Example 83 pertains to a method for use with a musical piece, or part thereof, that is cooperatively played by a first musical instrument according to first sequence of musical symbols, by a second musical instrument according to second sequence of musical symbols, and by a third musical instrument according to third sequence of musical symbols, for use with a first client device associated with the first musical instrument and operated by a first person that is identified by a first person identifier, with a second client device associated with the second musical instrument and operated by a second person that is identified by a second person identifier, and with a third client device associated with the third musical instrument and operated by a third person that is identified by a third person identifier, wherein each of the first, second, and third client devices comprises one of the following: a microphone, a digital signal connection, a sounder, and a presentation or display and communicates over the internet and/or any other communication network with a server device that stores the first, second, and third sequences, the method comprising:

(e.g., synchronously) sending, by the server device to the first, second, and third client devices, respectively the first, second, and third sequences of musical symbols;

receiving, by first, second, and third client devices from the server device, respectively the first, second, and third sequences;

displaying, to the first, second, and third persons by the respective display in the respective first, second, and third client devices, the respective received first, second, and third sequences;

capturing, by the respective microphone in the first, second, and third client devices, respective first, second, and third sounds from the respective first, second, and third musical instruments;

sending, by the first, second, and third client devices to the server device, the respective captured first, second, and third sounds;

receiving, by the server device from the first, second, and third client devices, the respective captured first, second, and third sounds;

analyzing, by the server device, the received captured first, second, and third sounds;

sending, by the server device only to the second and third client devices, the received captured first sound;

receiving, by the second and third client devices from the server device, the received captured first sound;

emitting, by the sounder in the second and third client devices, the received captured first sound;

sending, by the server device only to the third client device, the received captured second sound;

receiving, by the third client device from the server device, the received captured second sound; and emitting, by the sounder in the third client devices, the received captured second sound.

In example 84, the subject matter of 83 may optionally further comprise sending, by the server device to the first client device, the received captured second and third sounds;

receiving, by the first client devices from the server device, the received captured second and third sounds; and emitting, by the sounder in the first client device, the received captured second and third sounds.

In example 85, the subject matter of examples 83 and/or 84 may optionally further comprise sending, by the server device to the second client device, the received captured third sound;

receiving, by the second client device from the server device, the received captured third sound; and emitting, by the sounder in the second client device, the received captured third sound.

In example 86, the subject matter of any one or more examples 83 to 85 may optionally further comprise checking, by the server device, whether the each of the received captured sounds matches the respective sequence; determining, by the server device, the amount of musical symbols in each of the sequences that do not match with the respective captured sound; and updating, by the server device, the skill level value associated with the respective person identifier in response to the amount of the musical symbols that do not match in the respective captured sound.

In example 87, the subject matter of any one or more of examples 83 to 36 may optionally further comprise, for use with a threshold, and wherein the updating comprises raising the skill level value associated with the person identifier in response to the amount of the non-matching musical symbols being less than the threshold.

In example 88, the subject: matter of any one or more of examples 83 to 87 may optionally further comprise for use with a threshold, and wherein the updating comprises lowering the skill level value associated with the person identifier in response to the amount of the non-matching musical symbols being more than the threshold.

Example 89 pertains to a method for use with a musical piece, or part thereof, comprising: presenting, by at least one client device to a plurality of users, a corresponding plurality of sequences of musical symbols to be cooperatively played by the plurality of users using a plurality of instruments; capturing instrument outputs produced by the plurality of instruments to generate audio data descriptive of the captured instrument outputs; analyzing the audio data for determining a level of correspondence between the captured instrument outputs and the plurality of musical symbols presented to the plurality of users; and presenting, based on the level of correspondence, an adapted or non-adapted sequence of music symbols at least one of the plurality of players.

Example 90 includes the subject matter of example 89 and, optionally, wherein the at least one client device outputs accompanying background music (BGM) that corresponds with the plurality of musical symbols presented to the plurality of users.

Example 91 includes the subject roaster of examples 89 and/or 90 and, optionally, wherein the cooperative playing of instruments by the plurality of users includes playing the instruments in timed coordination (e.g., synchronously) or substantially synchronously, at a same location or at different locations.

Example 92 includes the subject matter of any one or more of the examples 89 to 91 and, optionally, wherein the cooperative playing of instruments by the plurality of users includes playing the instruments in different time periods, at a same location or at different locations.

Example 93 includes the subject matter of Example 92 and, optionally, capturing the instrument outputs played by the plurality of users; and merging the captured instrument outputs to arrive at a merged instrument output.

Example 94 includes the subject matter of example 93 and, optionally, analyzing a level of correspondence of the merged instrument output with the plurality of sequences of musical symbols presented to the users.

Example 95 includes the subject matter of any one or more of the examples 89 to 94 and, optionally, wherein the instrument outputs comprise sounds captured by a microphone and/or audio signals captured by a wired or wireless receiver device.

Example 96 pertains to a system for use with a musical piece, or part thereof, comprising: one or more processors; and one or more memories storing software code portions executable by the one or more processors to cause the system to perform the following: presenting, by at least one client device to a plurality of users, a corresponding plurality of sequences of musical symbols to be cooperatively played by the plurality of users using a plurality of instruments; capturing instrument outputs produced by the plurality of instruments to generate audio data descriptive of the captured instrument outputs; analyzing the audio data for determining a level of correspondence between the captured instrument outputs and the plurality of musical symbols presented to the plurality of users; and presenting, based on the level of correspondence, an adapted or non-adapted sequence of music symbols at least one of the plurality of players.

Example 97 includes the subject matter of example 96 and, optionally, wherein the at least one client device outputs accompanying background music (KM) that corresponds with the plurality of musical symbols presented to the plurality of users.

Example 98 includes the subject matter of examples 96 and/or 97 and, optionally, wherein the cooperative playing of instruments by the plurality of users includes playing the instruments in timed coordination (e.g., synchronously or substantially synchronously), at a same location or at different locations.

Example 99 includes the subject matter of any one or more of the Examples 96 to 97 and, optionally, wherein the cooperative playing of instruments by the plurality of users includes playing the instruments in different time periods, at a same location or at different locations.

Example 100 includes the subject matter of any one or more of examples 96 to 99 and, optionally, capturing the instrument outputs played by the plurality of users (e.g., in a same time period or at different time periods, at a same location or different locations); and merging the captured instrument outputs to arrive at a merged instrument output.

Example 101 includes the subject matter of example 100 and, optionally, analyzing a level of correspondence of the merged instrument output with the plurality of sequences of musical symbols presented to the users.

Example 102 includes the subject matter of any one or more of the examples 96 to 101 and, optionally, wherein the instrument outputs comprise sounds captured by a microphone and/or audio signals captured by a wired or wireless receiver device.

Example 103 pertains to a method for use with a musical piece, or part thereof, that is cooperatively played by a first musical instrument according to first sequence of musical symbols, by a second musical instrument according to second sequence of musical symbols, and by a third musical instrument according to third sequence of musical symbols, for use with a first client device associated with the first musical instrument and operated by a first person that is identified by a first person identifier, with a second client device associated with the second musical instrument and operated by a second person that is identified by a second person identifier, and with a third client device associated with the third musical instrument and operated by a third person that is identified by a third person identifier, wherein each of the first, second, and third client devices comprises one of the following: a microphone, a digital signal connection, a sounder, and a presentation or display and communicates over the Internet and/or any other communication network with a server device that stores the first, second, and third sequences, the method comprising: synchronously) sending, by the server device to the first, second, and third client devices, respectively the first, second, and third sequences of musical symbols; receiving, by first, second, and third client devices from the server device, respectively the first, second, and third sequences; displaying, to the first, second, and third persons by the respective display in the respective first, second, and third client devices, the respective received first, second, and third sequences; capturing, by the respective microphone in the first, second, and third client devices, respective first, second, and third sounds from the respective first, second, and third musical instruments; sending, by the first, second, and third client devices to the server device, the respective captured first, second, and third sounds; receiving, by the server device from the first, second, and third client devices, the respective captured first, second, and third sounds; analyzing, by the server device, the received captured first, second, and third sounds; sending, by the server device only to the second and third client devices, the received captured first sound; receiving, by the second and third client devices from the server device, the received captured first: sound; emitting, by the sounder in the second and third client devices, the received captured first sound; sending, by the server device only to the third client device, the received captured second sound; receiving, by the third client device from the server device, the received captured second sound; and emitting, by the sounder in the third client devices, the received captured second sound.

Example 104 includes the subject matter of example 103 and, optionally, by the server device to the first client device, the received captured second and third sounds; receiving, by the first client devices from the server device, the received captured second and third sounds; and emitting, by the sounder in the first client device, the received captured second and third sounds.

Example 105 includes the subject matter of examples 103 and/or 104 and, optionally, sending, by the server device to the second client device, the received captured third sound;

receiving, by the second client device from the server device, the received captured third sound; and emitting, by the sounder in the second client device, the received captured third sound.

Example 106 includes the subject matter of any one or more of examples 103 to 105 and, optionally, checking, by the server device, whether the each of the received captured sounds matches the respective sequence; determining, by the server device, the amount of musical symbols in each of the sequences that do not match with the respective captured sound; and updating, by the server device, the skill level value associated with the respective person identifier in response to the amount of the musical symbols that do not match in the respective captured sound Example 107 includes the subject matter of example 106 and, optionally, for use with a threshold, and wherein the updating comprises raising the skill level value associated with the person identifier in response to the amount of the non-matching musical symbols being less than the threshold.

Example 108 includes the subject matter of examples 106 and, optionally, for use with a threshold, and wherein the updating comprises lowering the skill level value associated with the person identifier in response to the amount: of the non-matching musical symbols being more than the threshold. Example 109 pertains to a system configured to provide a music learning session to a user, comprising;

- a memory for storing data and executable instructions; and
- a processor that is configured to execute the executable instructions to result in performing the following steps:
- presenting the user with a representation of a musical piece to be played by the user with a music instrument;
- receiving an audio signal relating to an instrument output provided by the music instrument played by the user;
- determining a level of correspondence between the received audio signal and the representation of the musical piece presented to the user;
- identifying an audio signal portion for which a determined level of correspondence does not meet a correspondence criterion; and
- determining an error characteristic for the identified audio signal portion.

In some examples, determining the error characteristic may include identifying whether there is a recurrence of the error characteristic for at least one other received audio signal portion. The steps may further include providing a feedback output related to identified recurrences of the error characteristic.

Example 110 includes the subject matter of example 109 and, optionally, wherein the recurrence of the error characteristic is characterized by recurring error patterns.

Example 111 includes the subject matter of examples 109 and/or 110 and, optionally, wherein the steps further comprise providing different feedback outputs for different error characteristics.

Example 112 includes the subject matter of any one or more of the examples 109-111 and, optionally, wherein the feedback output includes displaying the provided representation of the musical piece in association with respective playing positions of the one or more identified recurrences of the error characteristic.

Example 113 includes the subject matter of any one or more of the examples 109-112 and, optionally, wherein the steps comprise continued representation of the musical piece to the user until the user stops playing for a certain time period, or until an end of the musical piece.

Example 114 includes the subject matter of any one or more of the examples 109 to 113 and, optionally, generating one or more playing exercises that are designed to reduce or eliminate an error characteristic in an audio signal received responsive to the playing of an instrument by the user.

Example 115 includes the subject matter of any one or more of the examples 109-114 and, optionally, wherein the one or more playing exercises includes different playing exercises for different error characteristics Example 116 includes the subject matter of any one or more of the examples 109-115 and, optionally, comprising removing the one or more playing exercises when the error characteristic in said audio signal is eliminated or reduced.

Example 117 includes the subject matter of any one or more of the examples 109-116 and, optionally, wherein the steps comprise providing a background music output in timed coordination with the providing of the representation of a musical piece to be played by the user.

Example 118 includes the subject matter of any one or more of the examples 109-117 and, optionally, determining for received audio signals an incidence rate of identified audio signal portions for which the determined level of correspondence does not meet the correspondence criterion;

- determining whether the incidence rate meets a recurrence rate criterion; and
- providing the feedback output, based on whether the incidence rate meets the occurrence rate output.

Example 119 includes the subject matter of any one or more of the examples 109-118 and, optionally, wherein the error characteristic pertains to one or more of the following:

- a mismatch between a pitch of one or more audio signals produced with the musical instrument compared to a pitch of one or more notes displayed to the user by the musical presentation;
- a mismatch in timing of playing of one or more notes with the musical instrument, compared to a timing for playing the one or more notes as displayed to the user by the musical representation;
- cleanliness of one or more notes produced by the musical instrument played by the user;
- or any combination of the above.

Example 120 pertains to a method for providing a music learning session to a user, comprising; presenting a user with a representation of a musical piece to be played by the user with a music instrument;

- receiving an audio signal relating to an instrument output provided by the music instrument played by the user;
- determining a level of correspondence between the received audio signal and the representation of the musical piece presented to the user;
- identifying an audio signal portion for which a determined level of correspondence does not meet a correspondence criterion; and
- determining an error characteristic for the identified audio signal portion.

Example 121 includes the subject matter of example 120 and, optionally, the step of identifying whether there is a recurrence of the error characteristic for at least one other received audio signal portion.

Example 122 includes the subject matter of examples 120 and/or 121 and, optionally, providing a feedback output related to identified recurrences of the error characteristic.

Example 123 includes storing data and executable instructions in a memory; and executing in a processor the executable instructions for performing the steps outlined herein.

Example 124 includes the subject matter of any one or more of the examples 120-123 and, optionally, determining whether error characteristic is characterized by recurring error patterns (or not), and/or determining whether the error characteristic is a random error (or not).

Example 125 includes the subject matter of any one or more of the examples 120-124 and, optionally, wherein the steps further comprise providing different feedback outputs for different error characteristics.

Example 126 includes the subject matter of any one or more of the examples 120-125 and, optionally, wherein the feedback output includes displaying the provided representation of the musical piece in association with respective playing positions of the one or more identified recurrences of the error characteristic.

Example 127 includes the subject matter of any one or more of the examples 120-126 and, optionally, wherein the steps comprise continued representation of the musical piece to the user until the user stops playing for a certain time period, or until an end of the musical piece.

Example 128 includes the subject matter of any one or more of the examples 120-127 and, optionally, generating one or more playing exercises that are designed to reduce or eliminate an error characteristic in an audio signal received responsive to the playing of an instrument by the user.

Example 129 includes the subject matter of any one or more of the examples 120-128 and, optionally, wherein the one or more playing exercises includes different playing exercises for different error characteristics.

Example 130 includes the subject matter of any one or more of the examples 120-129 and, optionally, removing said one or more playing exercises when said error characteristic in said audio signal is eliminated or reduced.

Example 131 includes the subject matter of any one or more of the examples 120-130 and, optionally, wherein the steps comprise providing a background music output in timed coordination with the providing of the representation of a musical piece to be played by the user.

Example 132 includes the subject matter of any one or more of the examples 120-131 and, optionally, determining for received audio signals an incidence rate of identified audio signal portions for which the determined level of correspondence does not meet the correspondence criterion;

determining whether the incidence rate meets a recurrence rate criterion; and providing the feedback output, based on whether the incidence rate meets the occurrence rate output.

Example 133 includes the subject matter of any one or more of the examples 120-132 and, optionally wherein the error characteristic pertains to one or more of the following:

a mismatch between a pitch of one or more audio signals produced with the musical instrument compared to a pitch of one or more notes displayed to the user by the musical presentation;

a mismatch in timing of playing of one or more notes with the musical instrument, compared to a timing for playing the one or more notes as displayed to the user by the musical representation;

cleanliness of one or more notes produced by the musical instrument played by the user;

or any combination of the above.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Any digital computer system, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein. The term "non-transitory" is used to exclude transitory, propagating signals, but to otherwise include any volatile or non-volatile computer memory technology suitable to the application.

Additionally or, alternatively, the methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms 'about' and/or 'close' with respect to a magnitude or a numerical value may imply to he within an inclusive range of 40% to +10% of the respective magnitude or value.

It should be noted that where an embodiment refers to a condition of "above a threshold", this should not be construed as excluding an embodiment referring to a condition of "equal or above a threshold". Analogously, where an embodiment refers to a condition "below a threshold", this should not to be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element:" or "at least one element" for instance may also encompass "one or more elements".

As used herein the term "configuring" and/or 'adapting' for an objective, or a variation thereof, implies using materials and/or components in a manner designed for and/or implemented and/or operable or operative to achieve the objective.

Unless otherwise stated or applicable, the use of the expression "and/or" between the last two members of a list of options for selection indicates that a selection of one or more of the listed options is appropriate and may be made, and may be used interchangeably with the expressions "at least one of the following", "any one of the following" or "one or more of the following", followed by a listing of the various options.

As used herein, the phrase "A, B, C, or any combination of the aforesaid" should be interpreted as meaning all of the following: (i) A or Bar C or any combination of A, B, and C, (ii) at least one of A, B, and C; and (iii) A, and/or B and/or C. This concept is illustrated for three elements (i.e., A, B, C), but extends to fewer and greater numbers of elements (e.g., A, B, C, D, etc.).

It is noted that the terms "operable to" or "operative to" can encompass the meaning of the term "adapted or configured to". In other words, a machine "operable to" or "operative to" perform a task can in some embodiments, embrace a mere capability (e.g., "adapted") to perform the function and, in some other embodiments, a machine that is actually made (e.g., "configured") to perform the function.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 4, from 2 to 4, from 1 to 5, from 2 to 5, from 2 to 6, from 4 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant: to include the first and second indicated numbers and all the fractional and integral numerals therebetween.

It should be appreciated that combination of features disclosed in different embodiments are also included within the scope of the present inventions.

While certain features of the invention have been illustrated and described herein, many modifications, substitutions, changes; and equivalents will now occur to those of ordinary skill in the art. It is, therefore, to be understood that the appended claims are intended to cover all such modifications and changes as fall within the true spirit of the invention.

Any method herein may be in combination with a Virtual Reality (VR) system that may simulate a virtual environment to the person, and any communication with the VR system may be wireless, Any VR system herein may comprise a Head-Mounted Display (HMD), and any client device herein may comprise, may be part of, may consist of, or may be integrated with, the HMD.

Any device herein may serve as a client device in the meaning of client/server architecture, commonly initiating requests for receiving services, functionalities, and resources, from other devices (servers or clients). Each of the these devices may further employ, store, integrate, or operate a client-oriented for end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), Android version 6.0 (Marshmallow), Android version 7.0 (Nougat), Android version 8.0 (Urea), Android version 9.0 (Pie), Android 10, Android 11, iOS (available from Apple Inc., and includes variants such as versions 3-7), Apple iOS version 8, Apple iOS version 9, Apple iOS version 10, Apple iOS version 11, Apple iOS version 12, Apple iOS version 13, Apple iOS version 14, Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using Hyper Text Transfer Protocol (HTTP) that responds to HTTP requests via the Internet, and any request herein may be an HTTP request. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

Examples of web browsers include Microsoft Internet Explorer (available from Microsoft Corporation, headquartered in Redmond, Washington, U.S.A.), Google Chrome that is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A.), Opera Mini™ (developed by Opera Software ASA, headquartered in Oslo, Norway), and Android web browser.

Any of the steps described herein for any method herein may be sequential, and performed in the described order. For example, in a case where a step is performed in response to another step, or upon completion of another step, the steps are executed one after the other. However, in the case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

Any networking protocol may be utilized for exchanging information between the network elements (e.g., clients or servers) within the network (such as the Internet). For example, it is contemplated that communications can be performed using TCP/IP. Generally, HTTP and HTTPS are utilized on top of TCP/IP as the message transport envelope. The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies. As used herein, the term "request" includes, but is not limited to, a message describing an operation to be carried out in the context of a specified resource, such as HTTP GET, POST, PUT, and HEAD commands, and the term "response" includes, but is not limited to, a message containing the result of an executed request, such as an HTML document or a server error message. A request may be an explicit web request that is initiated manually by the user, or may be an implicit request that is initiated by a web client and is transparent: to the user, as an ancillary event corresponding to an explicit web request.

Application software is typically a set of one, or more programs designed to carry out operations for a specific application. Commonly, an application software is dependent on system software that manages and integrates computer capabilities, but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary, or as an open-source software. Most applications are designed to help people perform an activity.

Where certain process steps are described in a particular order or where alphabetic and/or alphanumeric labels are used to identify certain steps, the embodiments are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. They may also be practiced in distributed computing environments where tasks are performed by remote processing, devices that are linked through a communications network.

In a distributed computing environment, program modules may be located in both local and remote memory storage devices. Any single step, group of steps, or a flow chart herein may be realized as a computer program in a centralized fashion, in one computer system or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, will control the computer system, and carry out the methods described herein.

Computer program or application in the present context means any expression, in any language, code or notation, of a set of instructions intended to cause a system having an information processing capability to perform a particular function either directly or after either, or both of the following a) conversion to another language, code or notation; b) reproduction in a different material form. Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems. Some portions of the above description present the techniques described herein in terms of algorithms and symbolic representations of operations on information. These algorithmic descriptions and representations are used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

The corresponding structures, materials, acts, and equivalents of all means plus function elements in the claims below are intended to include any structure, or material, for performing the function in combination with other specifically claimed elements. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present: disclosure.

Any apparatus herein, which may be any of the systems, devices, modules, or functionalities described herein, may be integrated with a smartphone. The integration may be by being enclosed in the same housing, sharing a power source (such as a battery), using the same processor, or any other integration functionality. In one example, the functionality of any apparatus herein, which may be any of the systems, devices, modules, or functionalities described here, is used to improve, to control, or otherwise be used by the smartphone. In one example, a measured or calculated value by any of the systems, devices, modules, or functionalities described herein, is output to the smartphone device or functionality to be used therein. Alternatively or in addition, any of the systems, devices, modules, or functionalities described herein is used as a sensor for the smartphone device or functionality.

A 'nominal' value herein refers to a designed, expected, or target value. In practice, a real or actual value is used, obtained, or exists, which varies within a tolerance from the nominal value, typically without significantly affecting functioning. Common tolerances are 20%, 15%, 10%, 5%, or 1% around the nominal value.

Discussions herein utilizing terms such as, for example, "processing," "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art: to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

Throughout the description and claims of this specification, the word "couple" and variations of that word such as "coupling", "coupled", and "couplable", refers to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example, for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or a set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

As used herein, the term "portable" herein refers to physically configured to be easily carried or moved by a person of ordinary strength using one or two hands, without the need for any special carriers.

Any mechanical attachment of joining two parts herein refers to attaching the parts with sufficient rigidity to reduce or prevent unwanted movement between the attached parts. Any type of fastening means may be used for the attachments, including chemical material such as an adhesive or a glue, or mechanical means such as screw or bolt. An adhesive (used interchangeably with glue, cement, mucilage, or paste) is any substance applied to one surface, or both surfaces, of two separate items that binds them together and resists their separation. Adhesive materials may be reactive and non-reactive adhesives, which refers to whether the adhesive chemically reacts in order to harden, and their raw stock may be of natural or synthetic origin.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to he used in programming or configuring a computing device.

As used herein, the term "Integrated Circuit" (IC) shall include any type of integrated device of any function where the electronic circuit: is manufactured by the patterned diffusion of trace elements into the surface of a thin substrate of semiconductor material (e.g., Silicon), whether single or multiple die, or small or large scale of integration, and irrespective of process or base materials (including, without limitation Si, Site, CMOS and GAs) including, without limitation, applications specific integrated circuits (ASICs), field programmable gate arrays (FPGAs), digital processors (e.g., DSPs, CISC microprocessors, or RISC processors), so-called "system-on-a-chip" (SOC) devices, memory (e.g., DRAM, SRAM, flash memory, ROM), mixed-signal devices, and analog ICs.

The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a mufti-chip module (MCM) may be used, where multiple integrated circuits (ICs), the semiconductor dies, or other discrete components are packaged onto a unifying substrate, facilitating their use as a singlet component (as though a larger IC).

The term "computer-readable medium" (or "machine-readable medium") as used herein is an extensible term that refers to any non-transitory computer readable medium or any memory, that participates in providing instructions to a processor (such as processor 12) for execution, or any mechanism for storing or transmitting information in a form readable by a machine (e.g., a computer). Such a medium may store computer-executable instructions to be executed by a processing element and/or software, and data that is manipulated by a processing element and/or software, and may take many forms, including but not limited to, non-volatile medium, volatile medium, and transmission medium. Transmission media includes coaxial cables, copper wire and fiber optics. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read. Any computer-readable storage medium herein, such as the main memory 15*a*, the storage device 15*c*, the ROM 15*b*, or the storage 33, may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject: matter defined in the appended claims is not: necessarily limited to the specific features or acts described above. Rather, the specific features and acts described above are disclosed as example forms of implementing the claims.

As used herein, the terms "module", "engine" or "component" may refer to specific hardware implementations configured to perform the operations of the module or component and/or software objects or software routines that: may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Any process descriptions or blocks in any logic flowchart herein should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Each of the methods or steps herein, may consist of, include, be part of, be integrated with, or be based on, a part of, or the whole of, the steps, functionalities, or structure (such as software) described in the publications that are incorporated in their entirety herein. Further, each of the components, devices, or elements herein may consist of, integrated with, include, be part of, or be based on, a part of, or the whole of, the components, systems, devices or elements described in the publications that are incorporated in their entirety herein.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific: software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™-2008 entitled: "Standard for information Technology—Portable Operating System Interface (POSIX®) Description", and The Open Group Technical Standard Base Specifications, Issue 7, IEEE STD. 1003.1™, 2013 Edition.

The term "computer" is used generically herein to describe any number of computers, including, but not limited to personal computers, embedded processing elements and systems, software, ASICs, chips, workstations, mainframes, etc. Any computer herein may consist of, or be part of, a handheld computer, including any portable computer that is small enough to be held and operated while holding in one hand or fit into a pocket. Such a device, also referred to as a mobile device, typically has a display screen with touch input and/or miniature keyboard. Non-limiting examples of such devices include a Digital Still Camera (DSC), a Digital video Camera (DVC or digital camcorder), a Personal Digital Assistant (PDA), and mobile phones and Smartphones. The mobile devices may combine video, audio and advanced communication capabilities, such as PAN and MAN. A mobile phone (also known as a cellular phone, cell phone and a hand phone) is a device that can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a Personal Digital Assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS email, Internet access, short-range wireless communications (infrared, Bluetooth), business applications, gaming and photography.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Any selection herein, such as any selection from any list or group, may be based on, or may use, a load balancing, a First-In-First-Out (FIFO) scheme, a Last-In-First-Out (LIFO) scheme, a sequential or cyclic selection, a random selection, or any combination thereof. Any random selection herein may use, or may be based on, one or more random numbers generated by a random number generator. Any random number generator herein may be hardware based, and may be using thermal noise, shot noise, nuclear decaying radiation, photoelectric effect, or quantum phenomena. Alternatively or in addition, any random number generator herein may be software based, and may be based on executing an algorithm for generating pseudo-random numbers.

It will be understood by those within the art that, in general, terms used herein, and especially in the appended claims (e.g., bodies of the appended claims) are generally intended as "open" terms (e.g., the term "including" should be interpreted as "including but not limited to," the term "having," should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a smartphone, a tablet, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modern, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.1.1g, 802.11k, 802.11.n, 802,11r, 302.16, 302.16d, 802.15e, 302.20, 302.21 standards a nd/or future versions and/or derivatives of the above standards, units and/or devices that are part of the above networks, one way and/or two-way radio communication systems, cellular radio-telephone communication systems, a cellular telephone, a wireless telephone, a Personal Communication Systems (PCS) device, a PDA device that incorporates a wireless communication device, a mobile or portable GNSS such as the Global Positioning System (GPS) device, a device that incorporates a GNSS or GPS receiver or transceiver or chip, a device that incorporates an RFD element: or chip, a Multiple Input Multiple Output: (MIMO) transceiver or device, a Single Input Multiple Output (SiMO) transceiver or device, a Multiple input Singe Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Any system or apparatus herein may further be operative for storing, operating, or using, an operating system. Any system herein may comprise a Virtual Machine (VM) for virtualization, and the operating system may be executed as a guest operating system. Any system herein may further comprise a host computer that implements the VM, and the host computer may he operative for executing a hypervisor or a Virtual Machine Monitor (VMM), and the guest operating system may use or may interface virtual hardware. Any virtualization herein, such as any operating system virtualization, may include, may be based on, or may use, full virtualization, para-virtualization, or hardware assisted virtualization.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment, including, for example, C/C++, Fortran, COBOL, PASCAL, Assembly language, markup languages (e.g., HTML, SGML, XML, VoXML), and the like, as well as object-oriented environments, such as the Common Object Request Broker Architecture (CORBA), Java™ (including J2ME, Java Beans, etc.) and the like, as well as in firmware or other implementations. Generally, program modules include routines, subroutines, procedures, definitional statements and macros, programs, objects, components, data structures, etc., that perform particular tasks or implement particular abstract data types. A compiler may be used to create an executable code, or a code may be written using interpreted languages such as PERL, Python, or Ruby.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value: the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that: are linked through a communications network. In a distributed computing environment, program modules may be located in both local and remote memory storage devices.

As used in this application, the term "about" or "approximately" refers to a range of values within plus or minus 10% of the specified number. As used in this application, the term "substantially" means that the actual value is within about 10% of the actual desired value, particularly within about 5% of the actual desired value and especially within about 1% of the actual desired value of any variable, element or limit: set forth herein.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but: is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present: invention is directed upon review of the present disclosure.

All publications, standards, patents, and patent applications cited in this specification are incorporated herein by reference as if each individual publication, patent, or patent application were specifically and individually indicated to he incorporated by reference and set forth in its entirety herein.

What is claimed is:

1. A system configured to provide a music learning session to a user, comprising:

a memory for storing data and executable instructions; and a processor that is configured to execute the executable instructions to result in performing the following steps:

presenting the user with a representation of one or more musical pieces to be played by the user with a music instrument;

receiving an audio signal relating to an instrument output provided by the music instrument played by the user;

determining a level of correspondence between the received audio signal and the representation of the one or more musical pieces presented to the user;

identifying a plurality of audio signal portions for which a determined level of correspondence does not meet a correspondence criterion;

determining an error characteristic for the identified audio signal portions, the error characteristic including at least one recurring error or at least one random error;

wherein the at least one recurring error is identified with respect to two same or similar patterns that are temporally separated from each other in the representation of the one or more musical pieces; and presenting the user, based on the identified at least one recurring error, one or more playing exercises that are designed to reduce or eliminate the at least one recurring error.

2. The system of claim 1, wherein the one or more musical pieces are same or different musical pieces played by the user.

3. The system of claim 1, configured to determine whether a mistake is random or recurring by comparing an incidence rate with a predetermined recurrence rate criterion.

4. The system of claim 1, wherein the feedback output includes displaying the provided representation of the musical piece in association with respective playing positions of the one or more identified recurrences of the error characteristic.

5. The system of claim 4, wherein the steps comprise continued representation of the musical piece to the user until the user stops playing for a certain time period, or until an end of the musical piece.

6. The system of claim 1, wherein the level of correspondence is defined by one or more thresholds of one or more correspondence parameter values.

7. The system of claim 1, wherein the one or more playing exercises includes different playing exercises for different error characteristics.

8. The system of claim 1, comprising generating and/or selecting.

9. The system of claim 1, further comprising:

determining for received audio signals an incidence rate of identified audio signal portions for which the determined level of correspondence does not meet the correspondence criterion;

determining whether the incidence rate meets a recurrence rate criterion; and providing the feedback output, based on whether the incidence rate meets the recurrence rate criterion.

10. The system of claim 1, wherein the error characteristic pertains to one or more of the following:

a mismatch between a pitch of one or more audio signals produced with the musical instrument compared to a pitch of one or more notes displayed to the user by the musical presentation;

a mismatch in timing of playing of one or more notes with the musical instrument, compared to a timing for playing the one or more notes as displayed to the user by the musical representation;

cleanliness of one or more notes produced by the musical instrument played by the user;

or any combination of the above.

11. A method for providing a music learning session to a user, comprising;

storing data and executable instructions in a memory;

executing in a processor the executable instructions for performing the following steps:

presenting the user with a representation of one or more musical pieces to be played by the user with a music instrument;

receiving an audio signal relating to an instrument output provided by the music instrument played by the user;

determining a level of correspondence between the received audio signal and the representation of the one or more musical pieces presented to the user;

identifying a plurality of audio signal portions for which a determined level of correspondence does not meet a correspondence criterion;

determining an error characteristic for the identified audio signal portions;

the error characteristic including at least one recurring error or at least one random error;

wherein the at least one recurring error is identified with respect to two same or similar patterns that are temporally separated from each other in the representation of the one or more musical pieces; and presenting the user, based on the identified at least one recurring error, one or more playing exercises that are designed to reduce or eliminate the at least one recurring error.

12. The method of claim 11, wherein the recurrence of the error characteristic is characterized by recurring error patterns.

13. The method of claim 11, determining whether a mistake is random or recurring by comparing an incidence rate with a predetermined recurrence rate criterion.

14. The method of claim 11, wherein the feedback output includes displaying the provided representation of the musical piece in association with respective playing positions of the one or more identified recurrences of the error characteristic.

15. The method of claim 11, wherein the steps comprise continued representation of the musical piece to the user until the user stops playing for a certain time period, or until an end of the musical piece.

16. The method of claim 11, further comprising generating or selecting one or more playing exercises that are designed to reduce or eliminate an error characteristic in an audio signal received responsive to the playing of an instrument by the user.

17. The method of claim 16, wherein said one or more playing exercises includes different playing exercises for different error characteristics.

18. The method of claim 16, comprising removing said one or more playing exercises when the error characteristic in the audio signal is eliminated or reduced.

19. The method of claim 11, further comprising:

determining for received audio signals an incidence rate of identified audio signal portions for which the determined level of correspondence does not meet the correspondence criterion;

determining whether the incidence rate meets a recurrence rate criterion; and providing the feedback output, based on whether the incidence rate meets the recurrence rate criterion.

20. The method of claim 11, wherein the error characteristic pertains to one or more of the following:

a mismatch between a pitch of one or more audio signals produced with the musical instrument compared to a pitch of one or more notes displayed to the user by the musical presentation;

a mismatch in timing of playing of one or more notes with the musical instrument, compared to a timing for playing the one or more notes as displayed to the user by the musical representation;

cleanliness of one or more notes produced by the musical instrument played by the user;

or any combination of the above.

* * * * *